United States Patent [19]
Nishio et al.

[11] Patent Number: 5,691,851
[45] Date of Patent: Nov. 25, 1997

[54] ZOOM LENS

[75] Inventors: Akihiro Nishio; Makoto Misaka; Takashi Kato, all of Kanagawa-ken, Japan

[73] Assignee: Canon Kabushiki Kaisha, Tokyo, Japan

[21] Appl. No.: 735,571

[22] Filed: Oct. 23, 1996

Related U.S. Application Data

[63] Continuation of Ser. No. 274,307, Jul. 12, 1994, abandoned.

[30] Foreign Application Priority Data

| Jul. 14, 1993 | [JP] | Japan | 5-174316 |
| Aug. 4, 1993 | [JP] | Japan | 5-212197 |
| Nov. 26, 1993 | [JP] | Japan | 5-321401 |
| Nov. 29, 1993 | [JP] | Japan | 5-325842 |
| Nov. 30, 1993 | [JP] | Japan | 5-326224 |
| Mar. 15, 1994 | [JP] | Japan | 6-069920 |
| Mar. 24, 1994 | [JP] | Japan | 6-053766 |
| May 31, 1994 | [JP] | Japan | 6-118544 |
| Jun. 7, 1994 | [JP] | Japan | 6-150316 |
| Jun. 7, 1994 | [JP] | Japan | 6-150317 |

[51] Int. Cl.$^6$ ................................ G02B 15/14
[52] U.S. Cl. ............ 359/683; 359/676; 359/686; 359/689
[58] Field of Search ............ 359/683, 676, 359/689, 686, 687

[56] References Cited

U.S. PATENT DOCUMENTS

| 4,516,839 | 5/1985 | Tokumaru | 359/686 |
| 4,687,302 | 8/1987 | Ikemori et al. | 359/686 |
| 4,776,680 | 10/1988 | Tanaka | 359/686 |
| 4,846,562 | 7/1989 | Tokumaru et al. | 359/686 |
| 4,852,984 | 8/1989 | Takahashi et al. | 359/740 |
| 4,871,243 | 10/1989 | Ogawa et al. | 359/754 |
| 4,896,950 | 1/1990 | Endo et al. | 359/683 |
| 5,042,927 | 8/1991 | Ogawa et al. | 359/683 |
| 5,078,481 | 1/1992 | Nakayama et al. | 359/676 |
| 5,132,848 | 7/1992 | Nishio et al. | 359/686 |
| 5,189,557 | 2/1993 | Endo | 359/683 |
| 5,264,965 | 11/1993 | Hirawaka | 359/686 |
| 5,276,553 | 1/1994 | Tatsuno | 359/686 |
| 5,331,463 | 7/1994 | Yamanashi | 359/689 |

FOREIGN PATENT DOCUMENTS

| 49-23912 | 6/1974 | Japan. |
| 53-34539 | 3/1978 | Japan. |
| 54-14403 | 4/1980 | Japan. |
| 57-163213 | 10/1982 | Japan. |
| 58-4113 | 1/1983 | Japan. |
| 63-241511 | 10/1988 | Japan. |
| 1-193709 | 8/1989 | Japan. |
| 2-201310 | 8/1990 | Japan. |

*Primary Examiner*—Scott J. Sugerman
*Attorney, Agent, or Firm*—Fitzpatrick, Cella, Harper & Scinto

[57] ABSTRACT

A zoom lens is disclosed, comprising a front lens group having a first, a second and a third lens units, totaling at least three lens units, and whose overall refractive power for the wide angle end is positive and a rear lens group having a lens unit of positive refractive power and another lens unit of negative refractive power, wherein when zooming from the wide angle to the telephoto end, the first, the second and the third lens units all axially move in such relation that the overall refractive power of the front lens group is weaker in the telephoto end than in the wide angle end, and the lens units in the rear lens group all axially move in such relation that their separation narrows.

48 Claims, 141 Drawing Sheets

ZOOM LENS

This application is a continuation of application Ser. No. 08/274,307, filed Jul. 12, 1994, now abandoned.

BACKGROUND OF THE INVENTION

1. Field of the Invention

This invention relates to high range, wide angle zoom lenses of reduced size suited to leaf shutter cameras or video cameras and, more particularly, to zoom lenses of excellent portability with the total length (from the front vertex to the image plane) shortened at widened angular field of view.

2. Description of the Related Art

In the field of art of leaf shutter cameras or video cameras, along with the recent tendency to minimize the size of the camera has come demand for zoom lenses of reduced size with the total length shortened. Particularly for the leaf shutter cameras, owing to the development of advanced peripheral technology in terms of the electrical circuit for driving the zoom lens, the size of the camera is getting more and more compact. The photographic lens to be used is, therefore, also required to have the zooming range be high and the bulk and size be nonetheless compact.

In the past, the zoom lenses for the leaf shutter camera were usually of the form comprising two components of positive and negative powers. In other words, the so-called 2-component zoom lenses were the main stream. This 2-component zoom type has merits that the size of the camera is easy to minimize, and the production cost is relatively low, because its zoom configuration is simple and the zooming movements are easy to control. Since the function of varying the focal length is, however, borne by only one component, the zoom ratio is so low as 1.6 to 2.0 or thereabout. If the zoom ratio is unduly increased, the lens system would become bulky and objectionably large and the optical performance could not easily be kept high.

Given the 2-component zoom lens as the base form, the first component may be divided into two lens units of positive refractive power so that the entire system comprises three lens units of plus-plus-minus power arrangement. Such a 3-unit zoom lens aims at a great increase of the zoom ratio, as proposed in, for example, Japanese Laid-Open Patent Applications Nos. Hei 3-282409, Hei 4-37810 and Hei 4-76511.

However, if this type is applied to the zoom lens whose field semi-angle is, for example, 35° or wider, the entrance pupil varies in position to a large extent with zooming. For this reason, a great increase of the zoom ratio cannot be achieved without a difficult problem of suppressing the variation of the aberrations with zooming.

Besides these, zoom lenses employing the multiple-unit technique in widening the field angle and increasing the zoom ratio, or ones whose field semi-angle is about 38° and zoom ratio is about 3.5, have previously proposed in, for example, Japanese Laid-Open Patent Applications Nos. Hei 2-72316 and Hei 3-249614. However, these zoom lens systems are significantly large both in the total length and the diameter at the front members, thus being not always satisfactory as the photographic lens for the compact camera.

Particularly in application to the camera using the external finder, there is a problem that when in the wide angle positions, the lens barrel vignettes the finder field of view. To avoid this, an alternative problem arises that limitations have to be given to the flexibility of design for the finder arrangement and the camera shape.

In general, the zoom lenses have a property that the stronger the refractive power of each lens unit, the shorter the required movement for each lens unit becomes to obtain the equivalent zoom ratio. This leads to a possibility of simultaneously fulfilling the requirements of shortening the total length of the entire system and of increasing the zoom ratio. However, if the refractive power of each lens unit is merely strengthened, the range of variation of the aberrations with zooming would increase largely. Particularly to achieve a great increase of the zoom ratio and a widening of the maximum field angle at once, good stability of optical performance becomes extremely difficult to maintain throughout the entire zooming range.

SUMMARY OF THE INVENTION

According to the present invention, the entire system is constructed with five lens units in total, and appropriate rules of design for the movements, the refractive powers and others of these lens units are set forth. An object of the invention is, therefore, to provide a zoom lens whose field angle is 64° to 74° or thereabout at the wide angle end and whose zoom ratio is about 3.5, while still maintaining a high optical performance throughout the entire zooming range.

A zoom lens of the invention comprises, from front to rear, a first, a second and a third lens units, totaling at least three lens units, which constitute a front lens group having a positive overall refractive power in the wide angle end, and another lens unit of positive refractive power and another lens unit of negative refractive power, totaling two lens units, which constitute a rear lens group, wherein when zooming from the wide angle end to the telephoto end, the first, the second and the third lens units move axially in such relation that the overall refractive power of the front lens group is weaker when in the telephoto end than when in the wide angle end, while the two lens units of the rear lens group move axially in such relation that the separation therebetween narrows.

BRIEF DESCRIPTION OF THE DRAWINGS

FIG. 120 is a lens block diagram of a numerical example 57 of the invention.

Figure 121A:
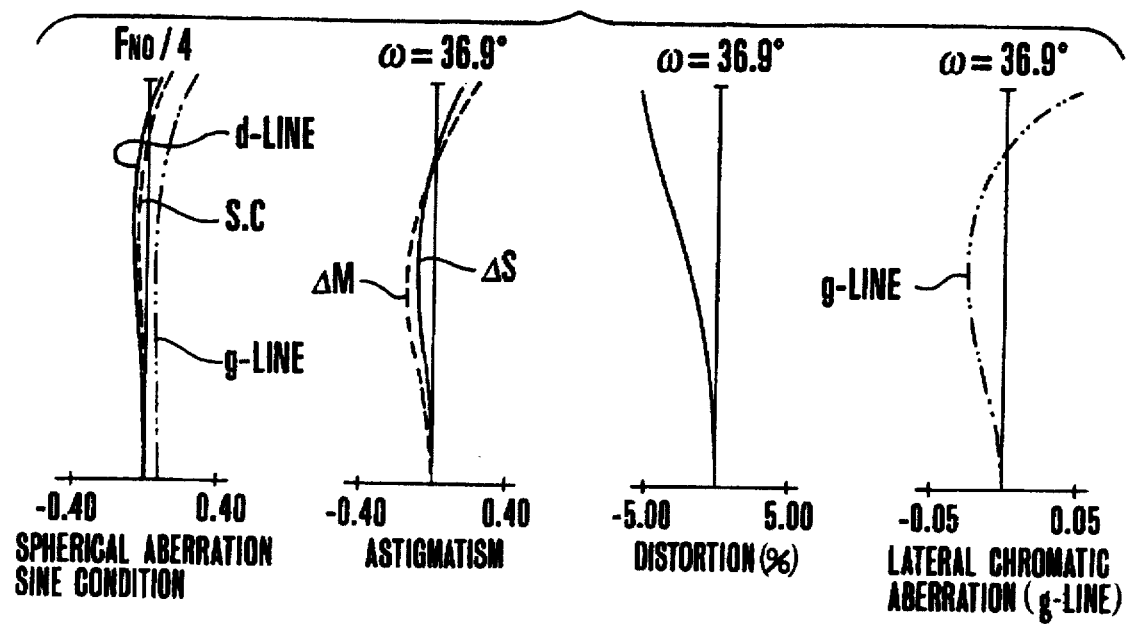
Figure 121B:
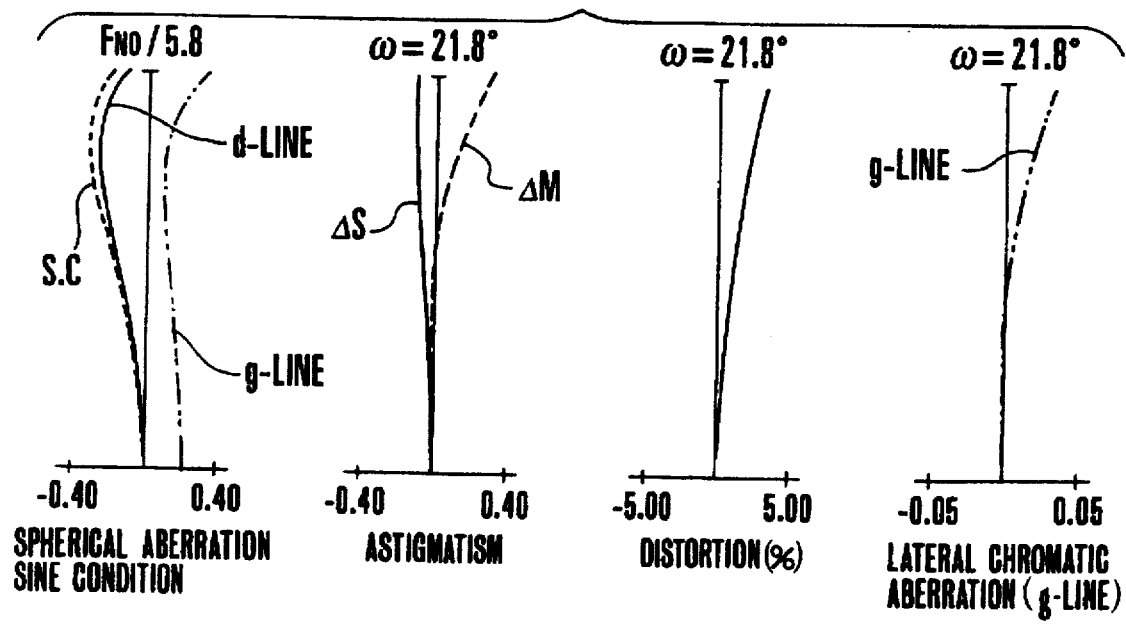
Figure 121C:
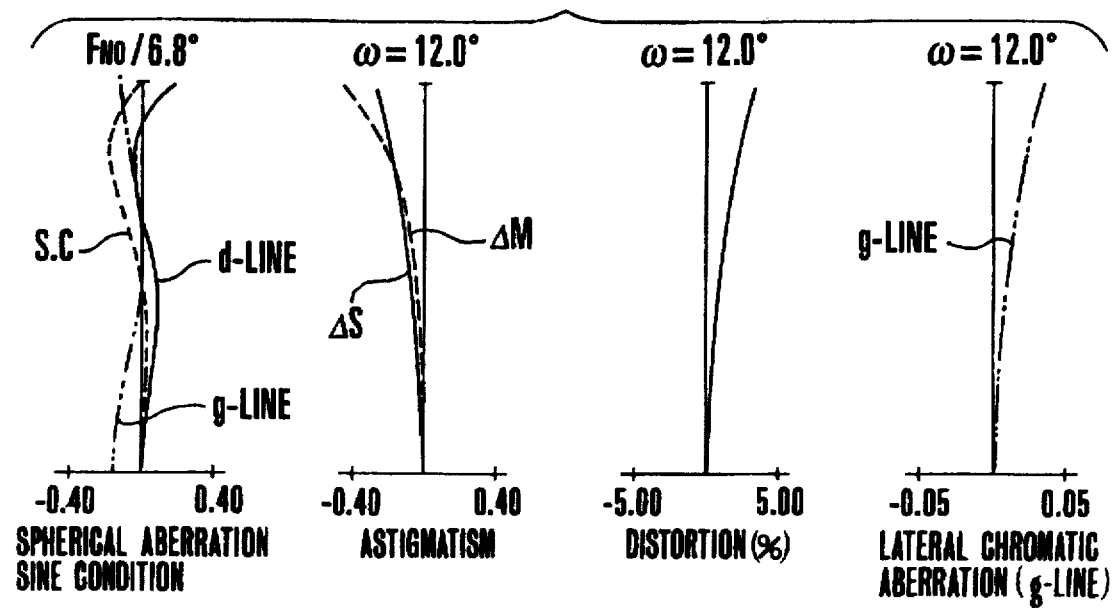

FIGS. 121(A), 121(B) and 121(C) are graphs of the various aberrations of the numerical example 52.

Figure 122A:
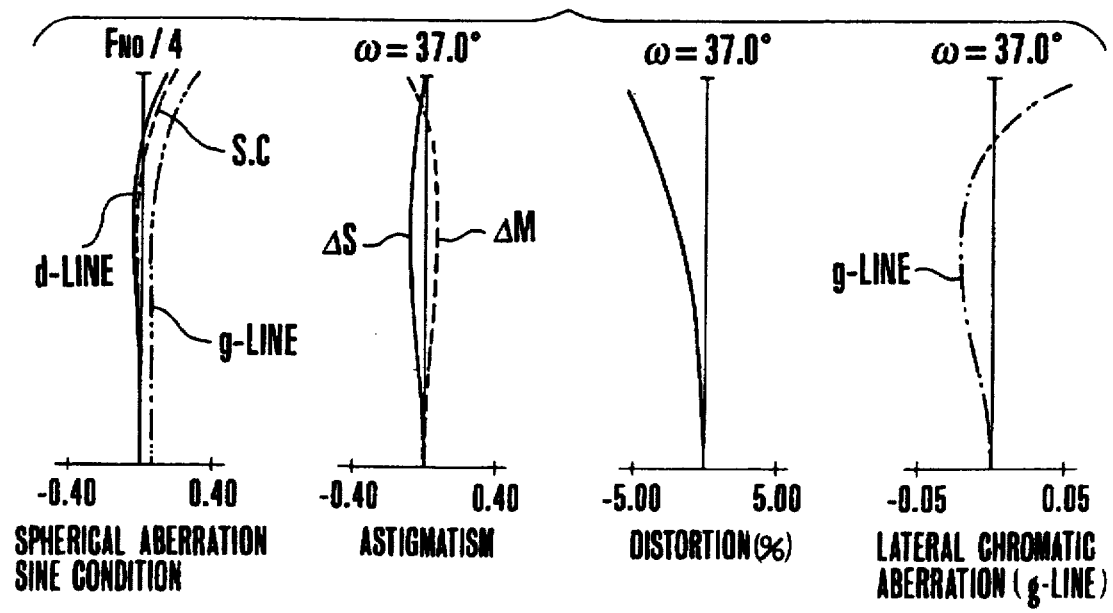
Figure 122B:
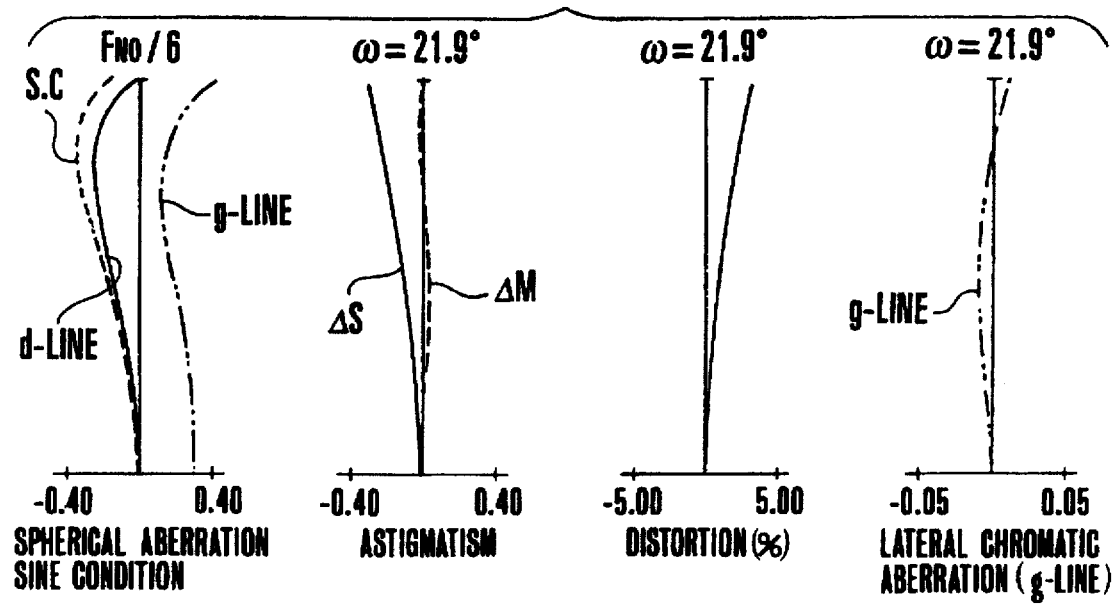
Figure 122C:
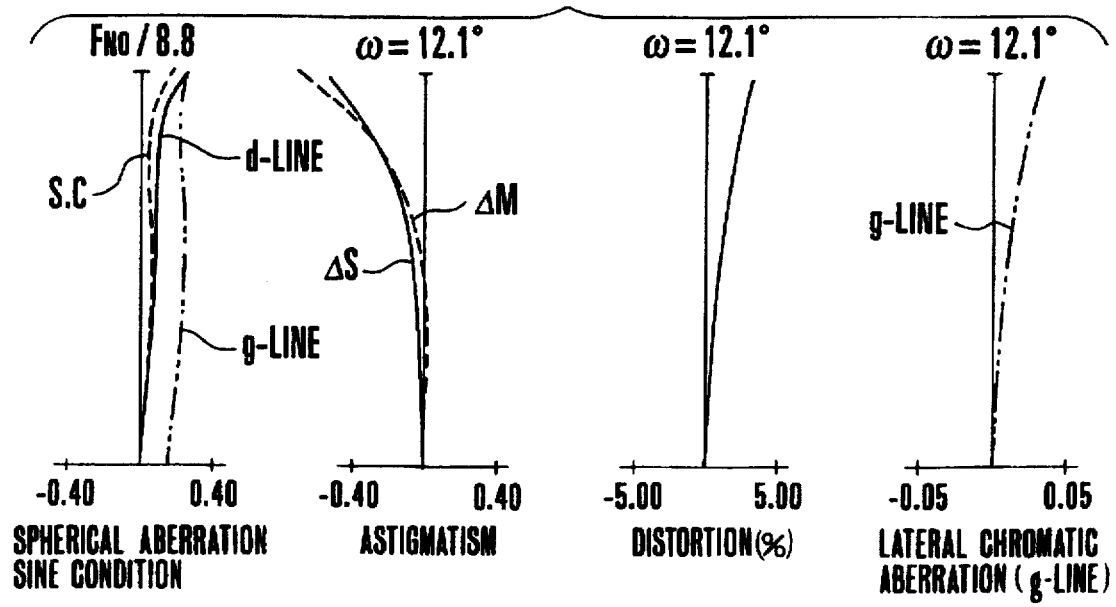

FIGS. 122(A), 122(B) and 122(C) are graphs of the various aberrations of the numerical example 53.

Figure 123A:
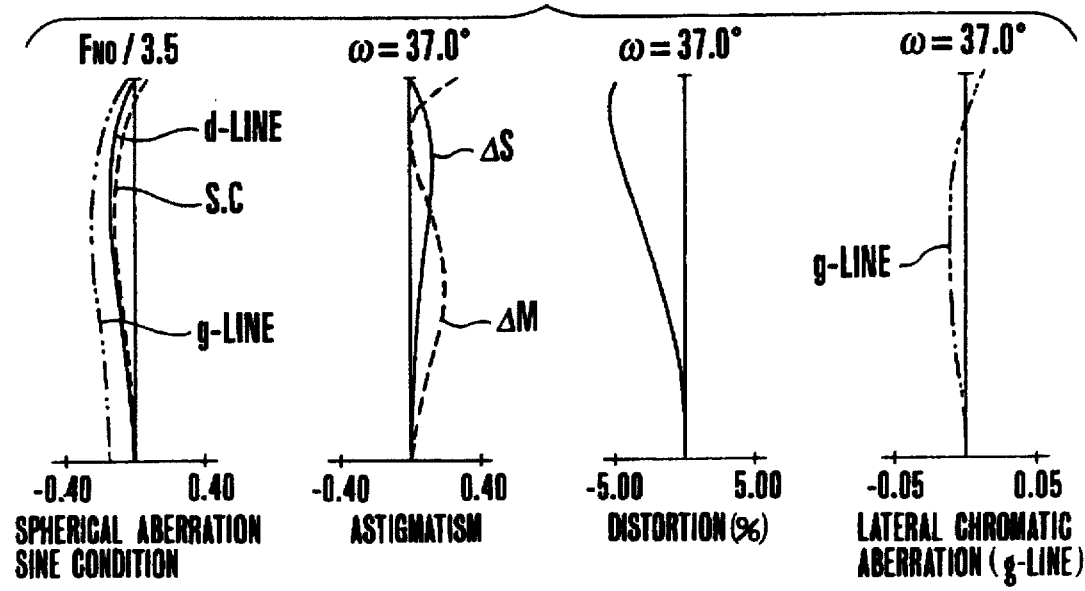
Figure 123B:
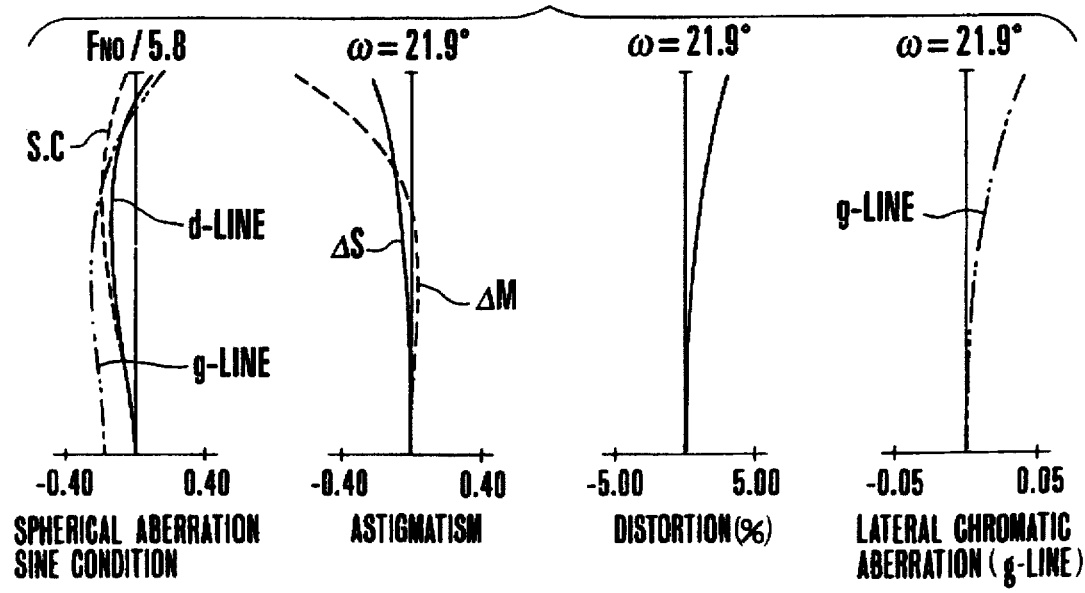
Figure 123C:
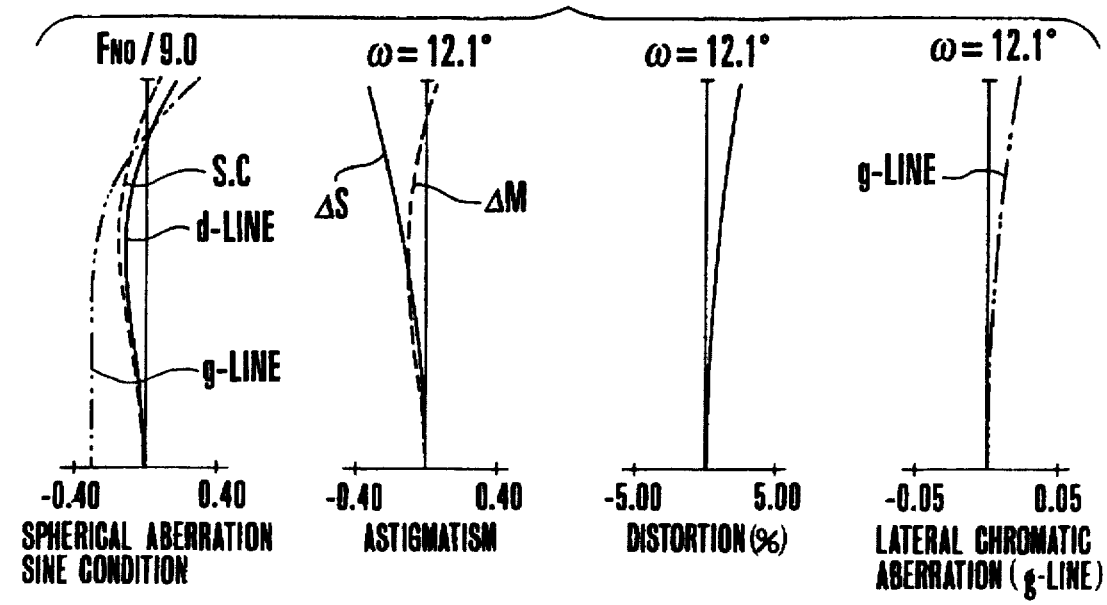

FIGS. 123(A), 123(B) and 123(C) are graphs of the various aberrations of the numerical example 54.

Figure 124A:
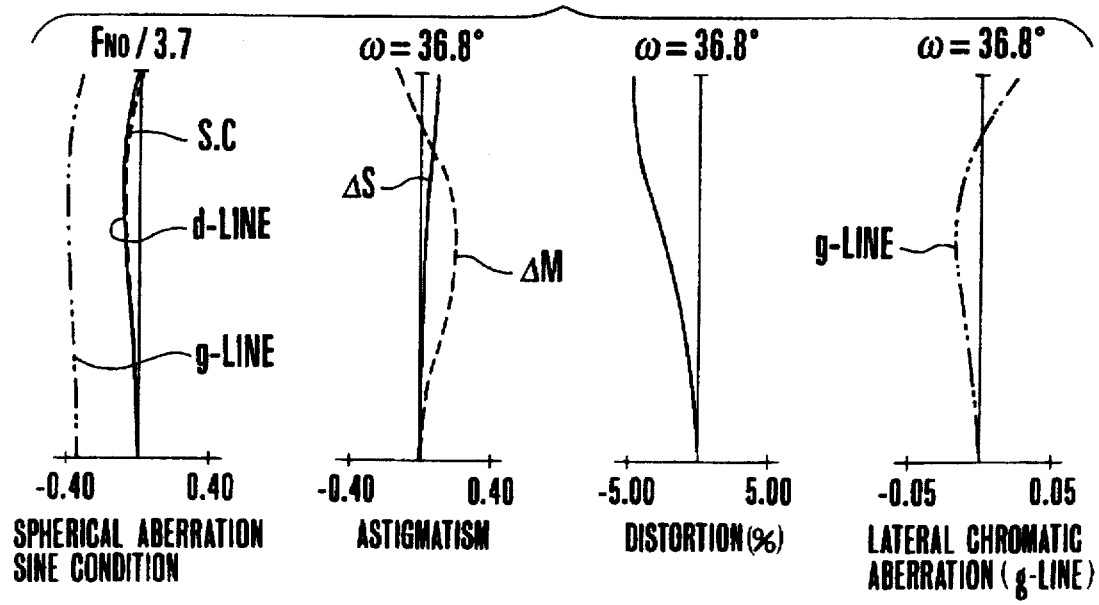
Figure 124B:
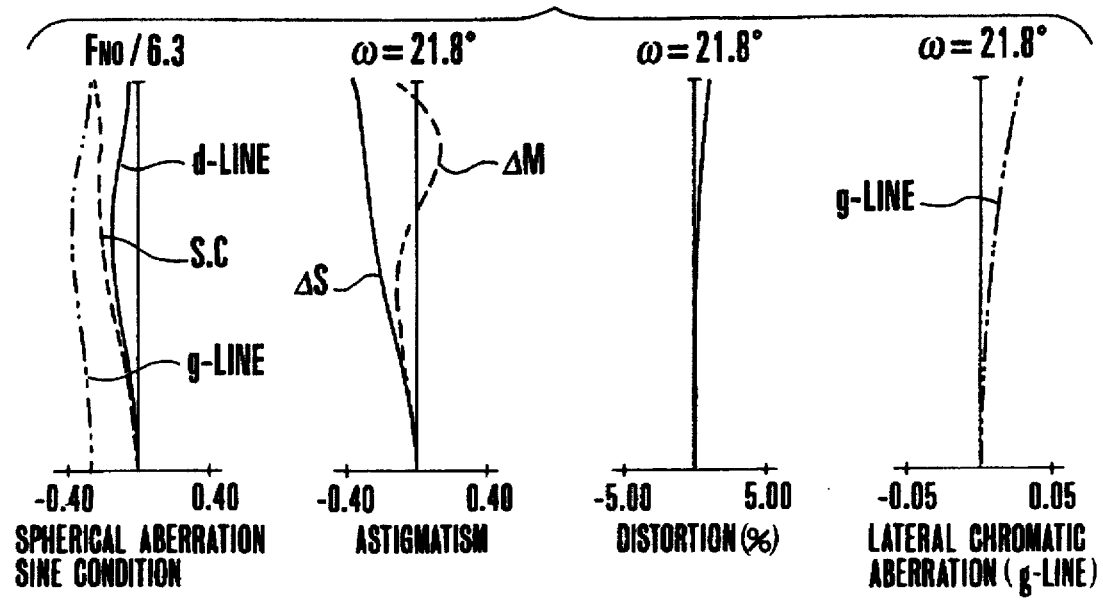
Figure 124C:
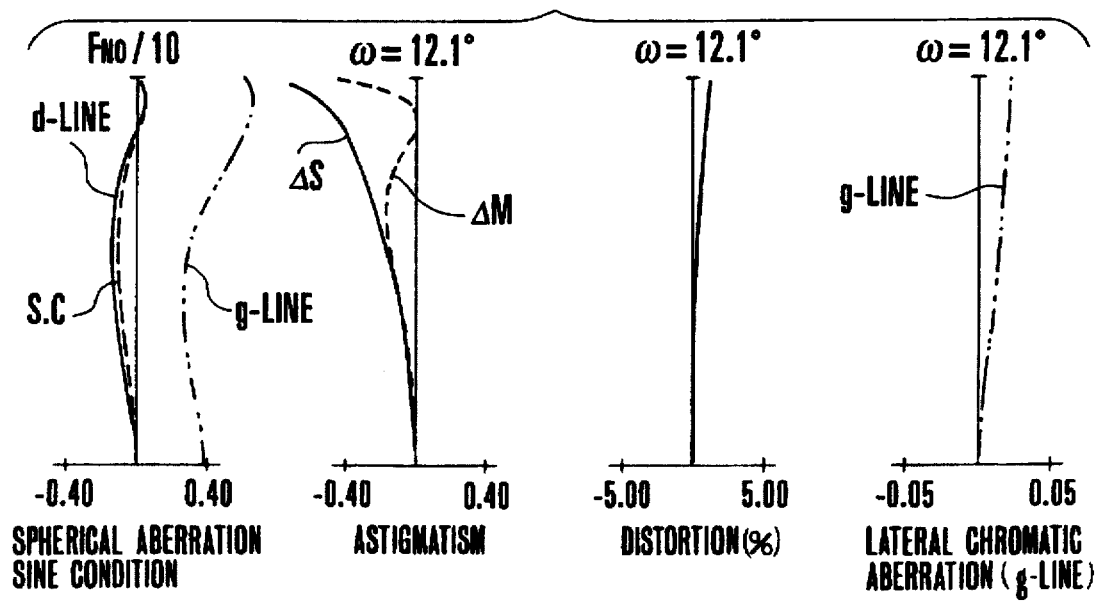

FIGS. 124(A), 124(B) and 124(C) are graphs of the various aberrations of the numerical example 55.

Figure 125A:
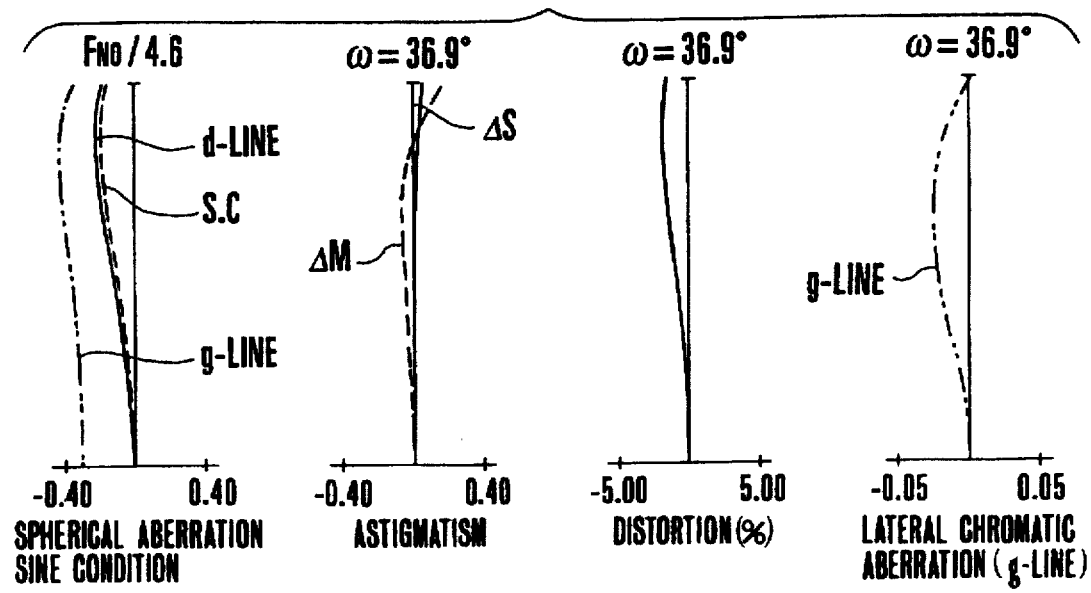
Figure 125B:
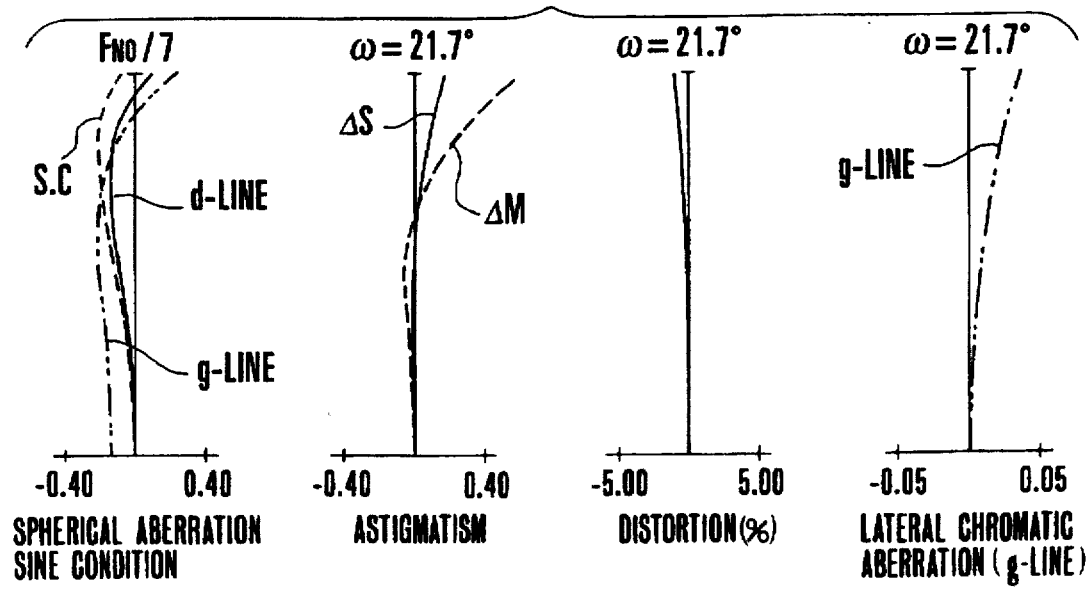
Figure 125C:
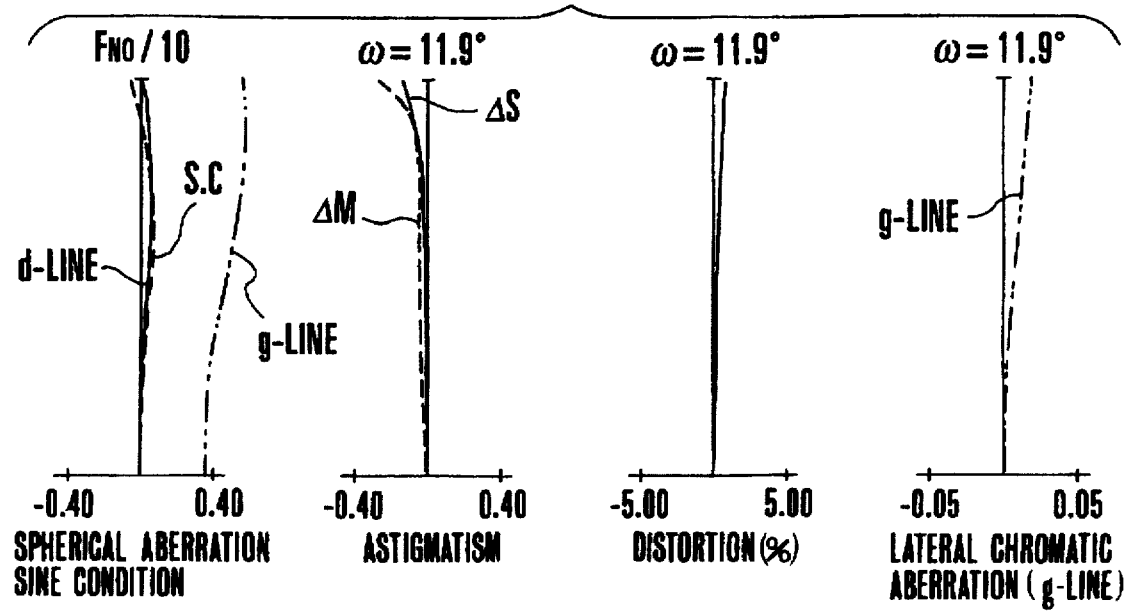

FIGS. 125(A), 125(B) and 125(C).are graphs of the various aberrations of the numerical example 56.

Figure 126A:
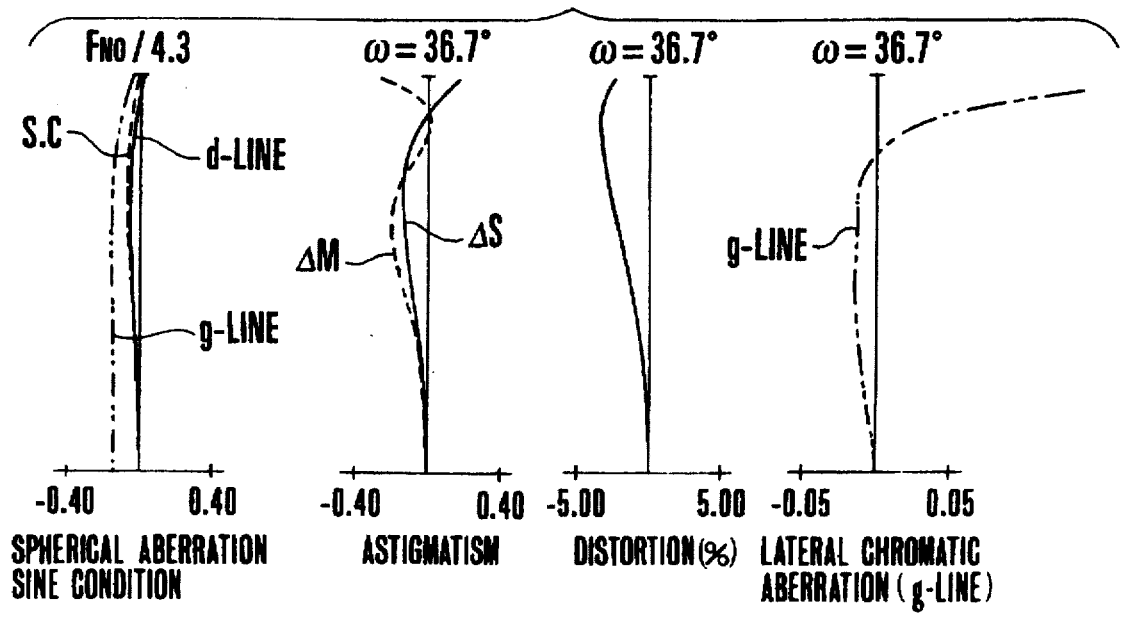
Figure 126B:
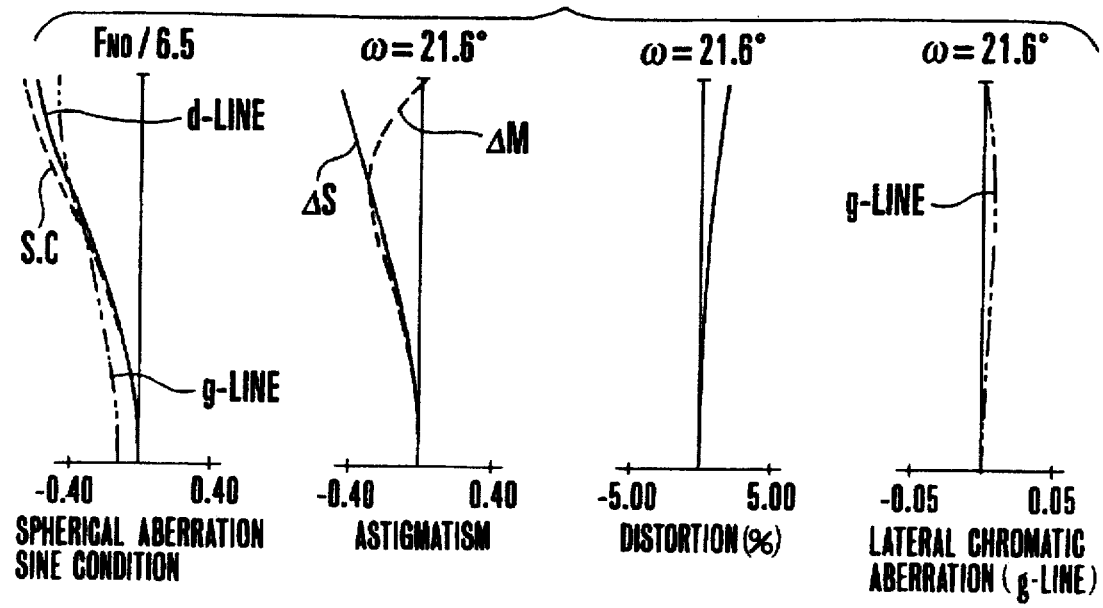
Figure 126C:
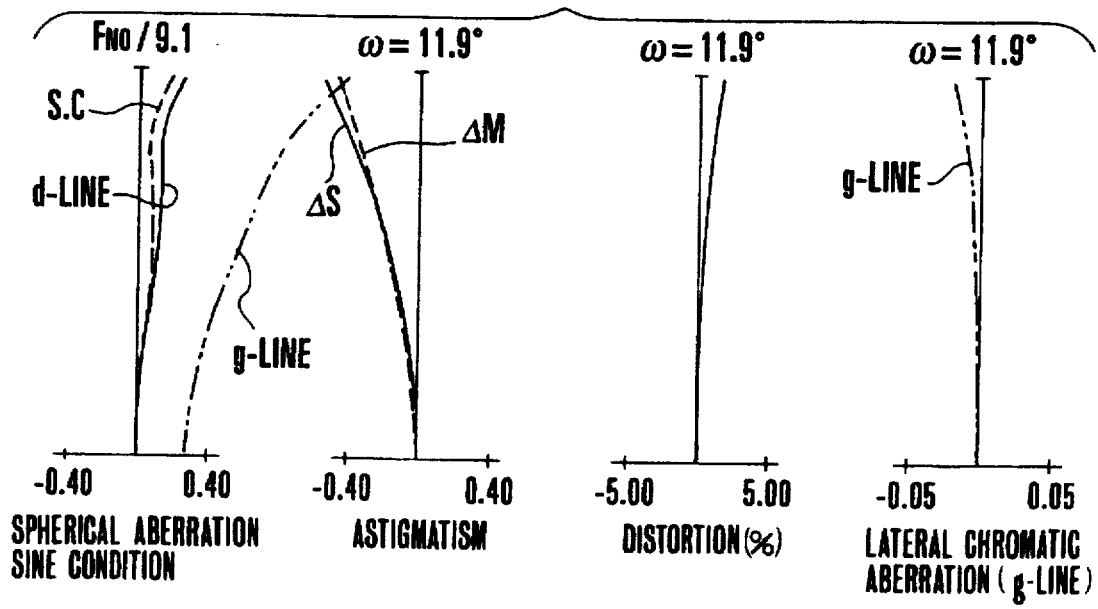

FIGS. 126(A), 126(B) and 126(C) are graphs of the various aberrations of the numerical example 57.

Figure 127:
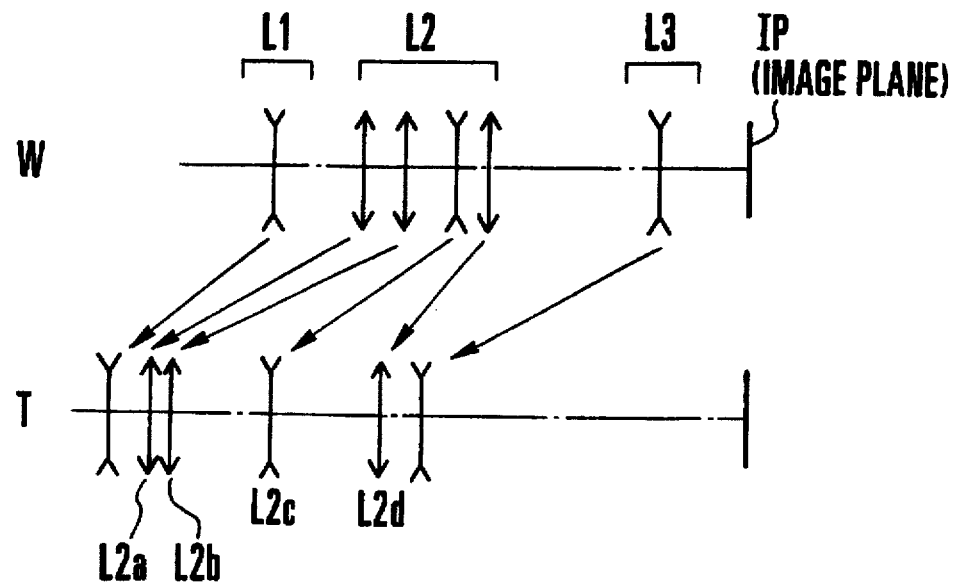

FIG. 127 illustrates the paraxial refractive power arrangements of a zoom lens of the invention.

Figure 128:
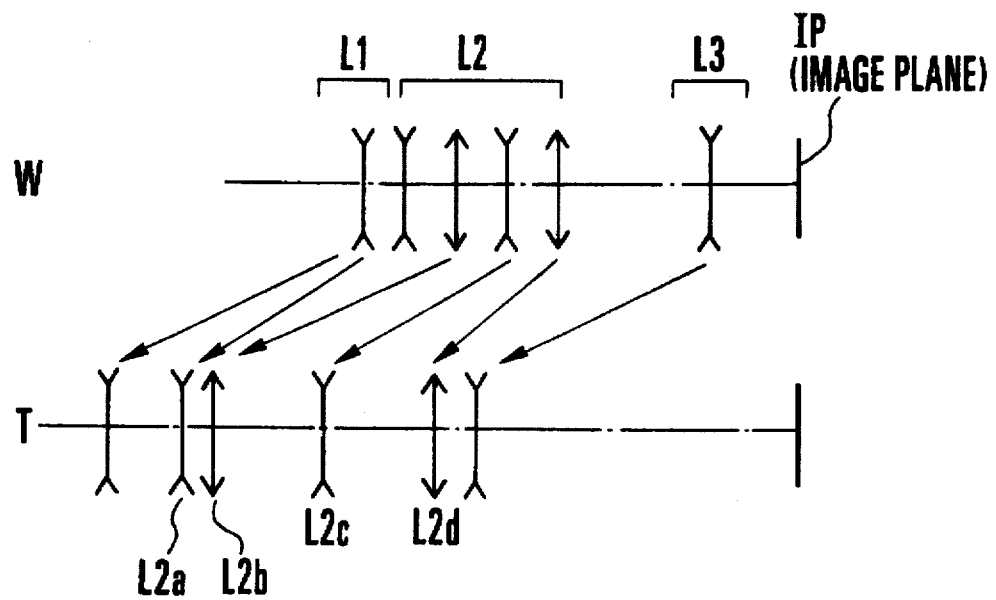

FIG. 128 illustrates the paraxial refractive power arrangements of another zoom lens of the invention.

Figure 129:
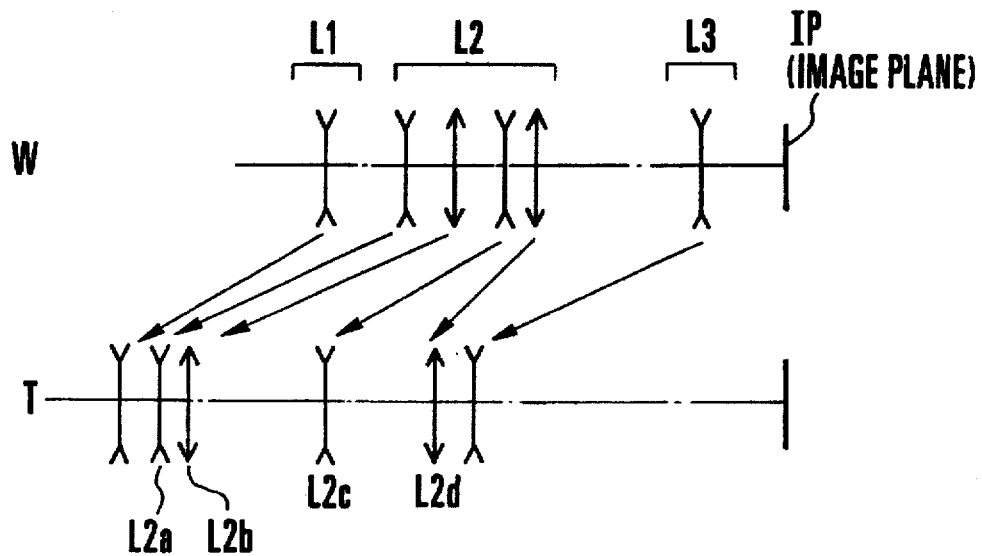

FIG. 129 illustrates the paraxial refractive power arrangements of still another zoom lens of the invention.

Figure 130:
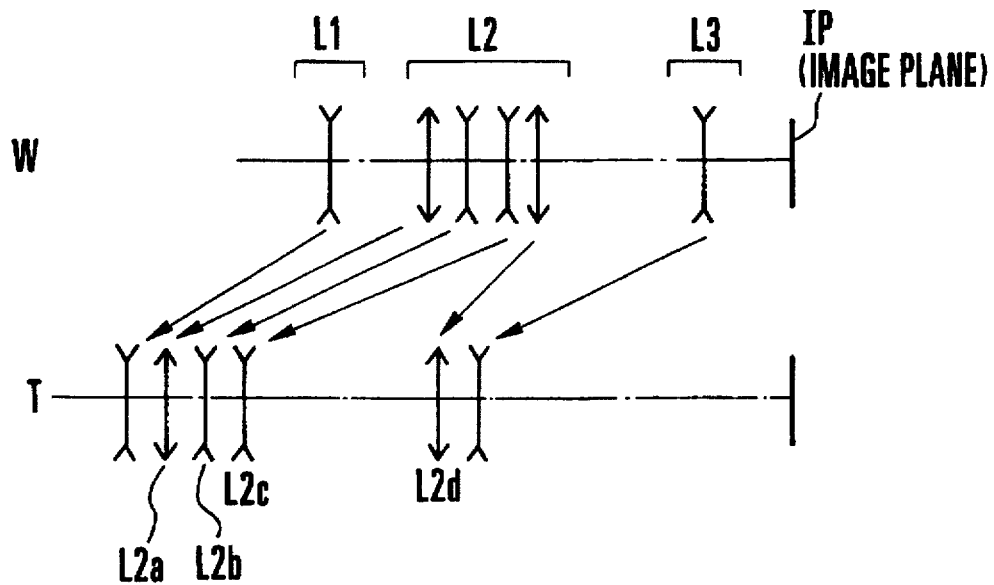

FIG. 130 illustrates the paraxial refractive power arrangements of yet another zoom lens of the invention.

Figure 131:
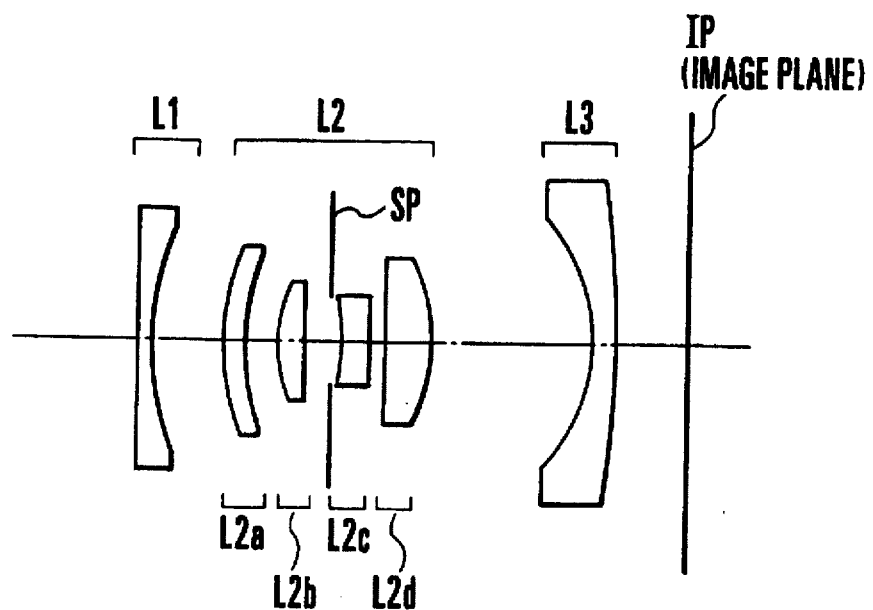

FIG. 131 is a lens block diagram of a numerical example 58 of the invention in the wide angle end.

Figure 132:
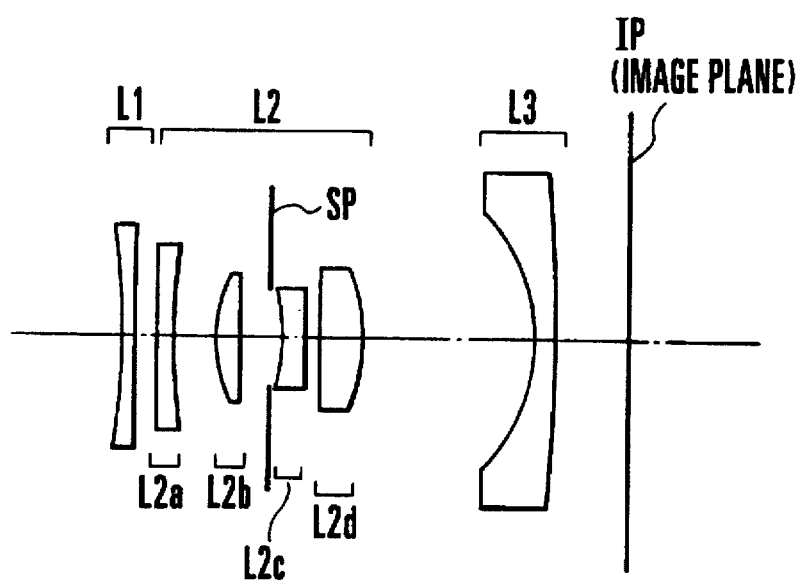

FIG. 132 is a lens block diagram of a numerical example 59 of the invention in the wide angle end.

Figure 133:
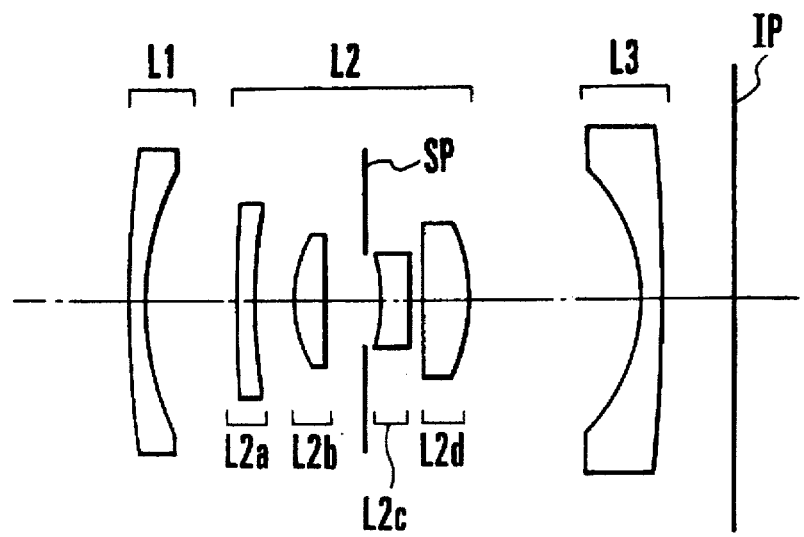

FIG. 133 is a lens block diagram of a numerical example 60 of the invention in the wide angle end.

Figure 134:
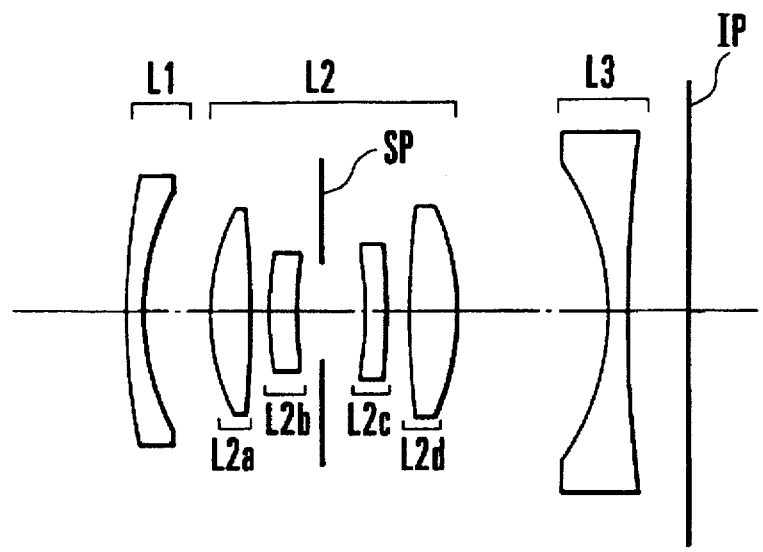

FIG. 134 is a lens block diagram of a numerical example 61 of the invention in the wide angle end.

Figure 135A:
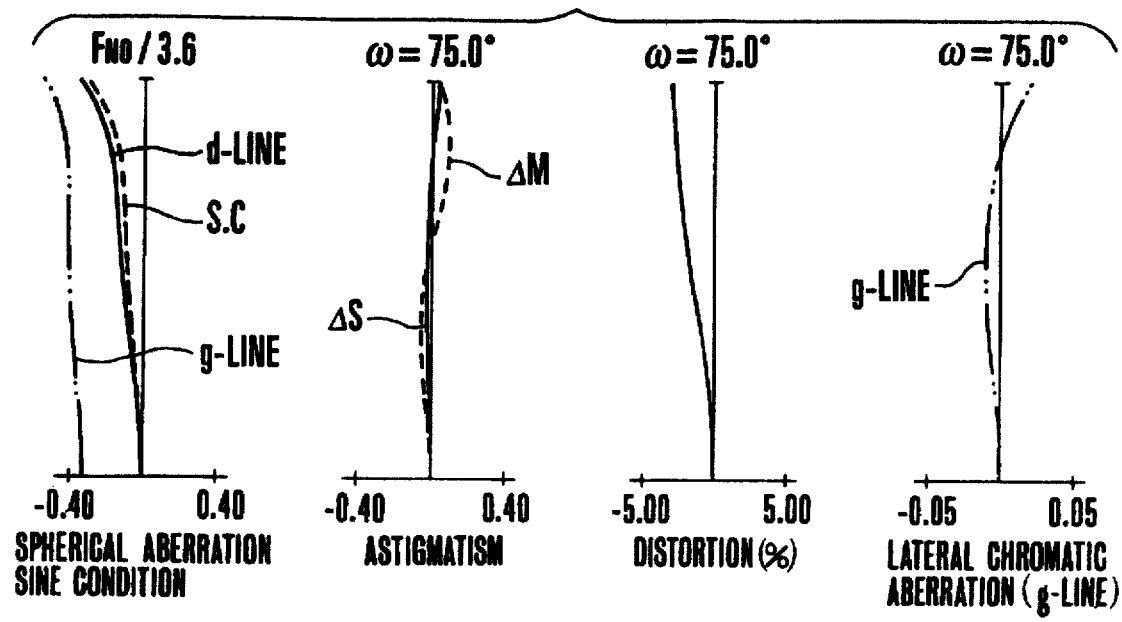
Figure 135B:
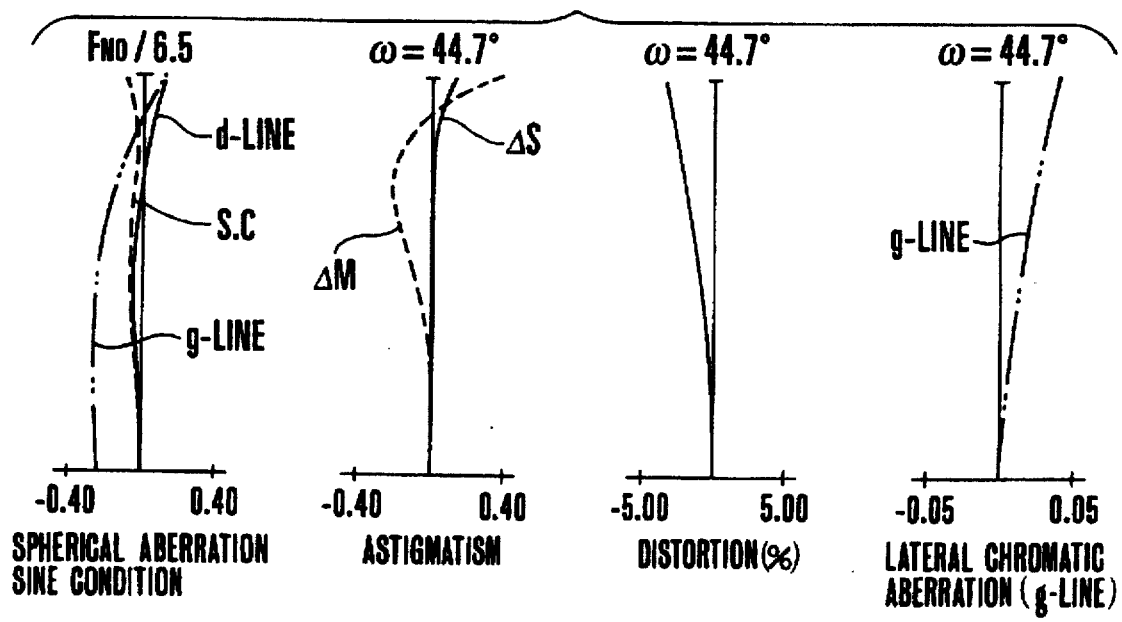
Figure 135C:
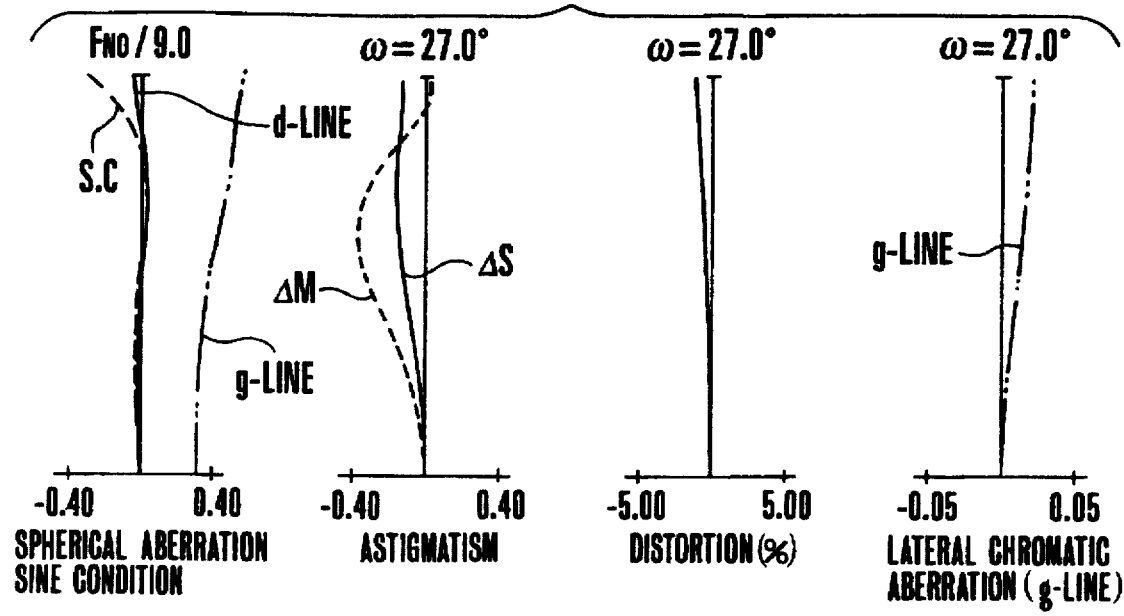

FIGS. 135(A), 135(B) and 135(C) are graphs of the various aberrations of the numerical example 58.

Figure 136A:
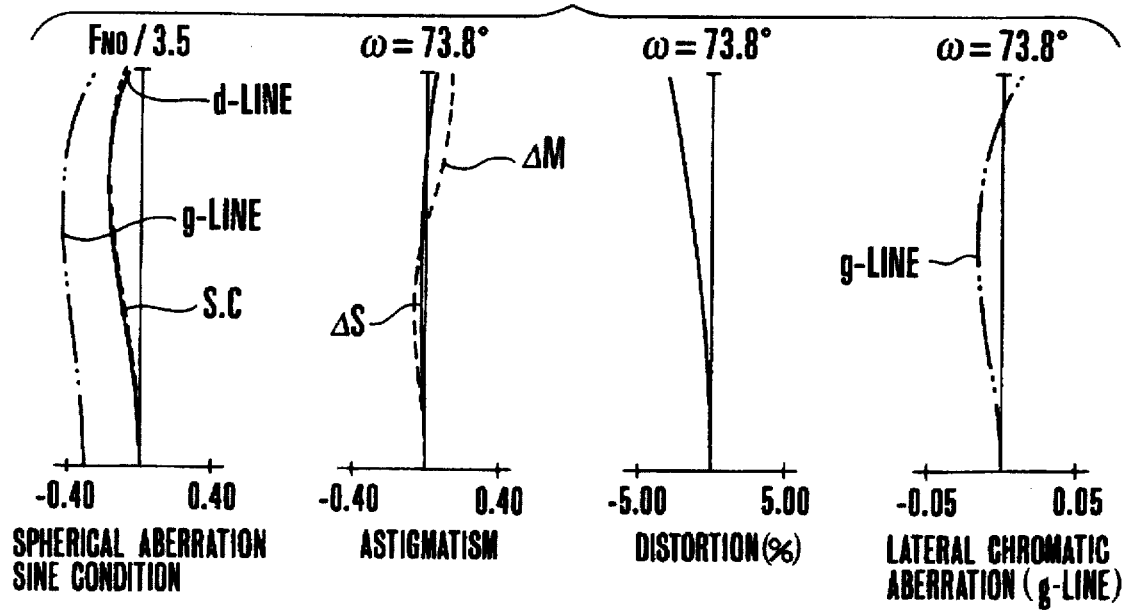
Figure 136B:
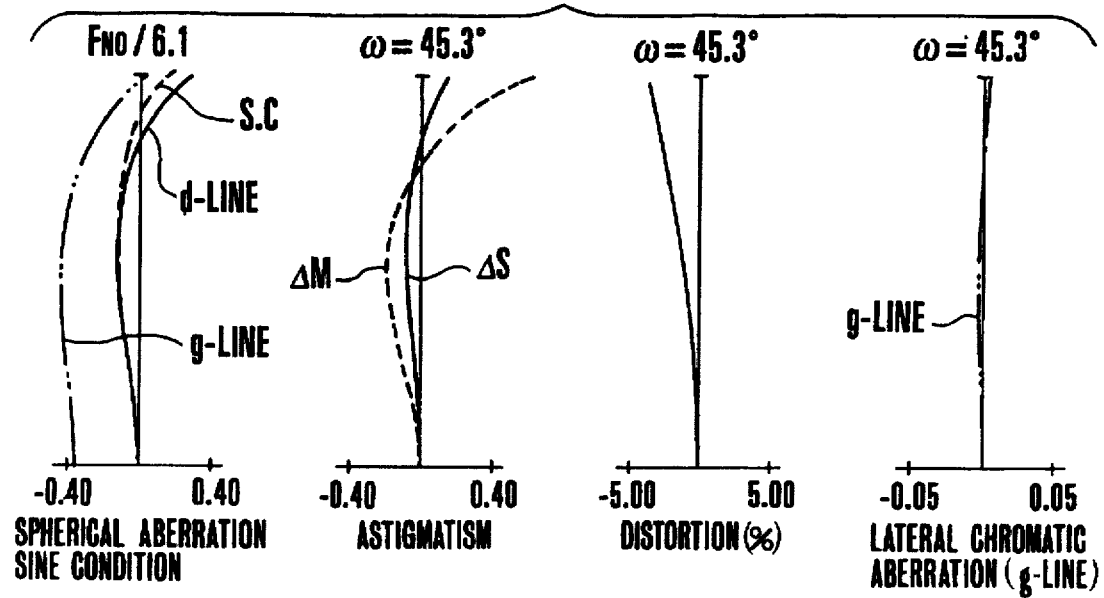
Figure 136C:
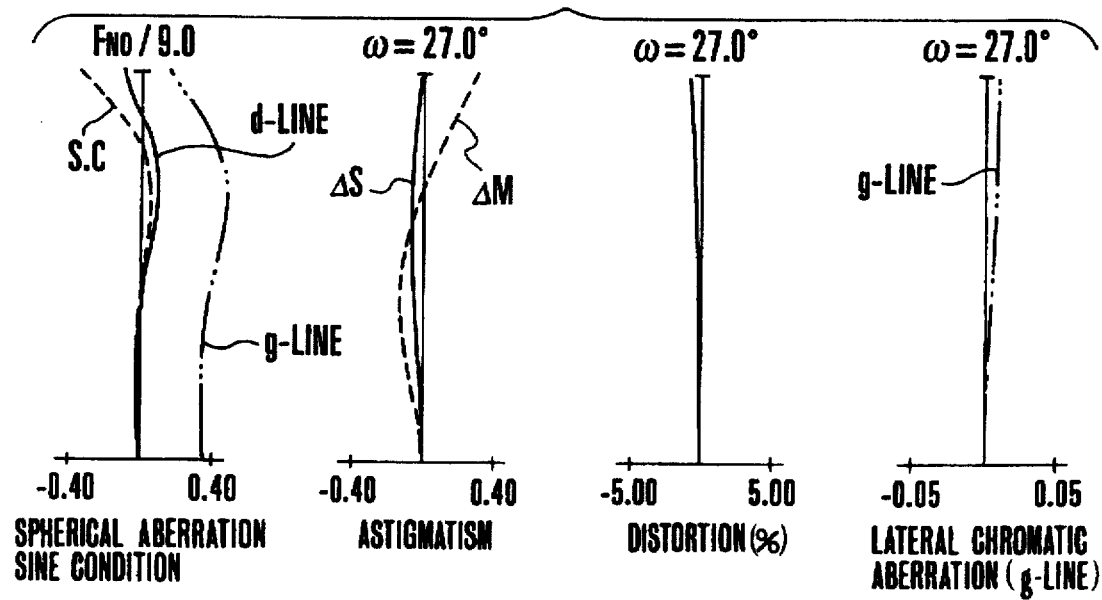

FIGS. 136(A), 136(B) and 136(C) are graphs of the various aberrations of the numerical example 59.

Figure 137A:
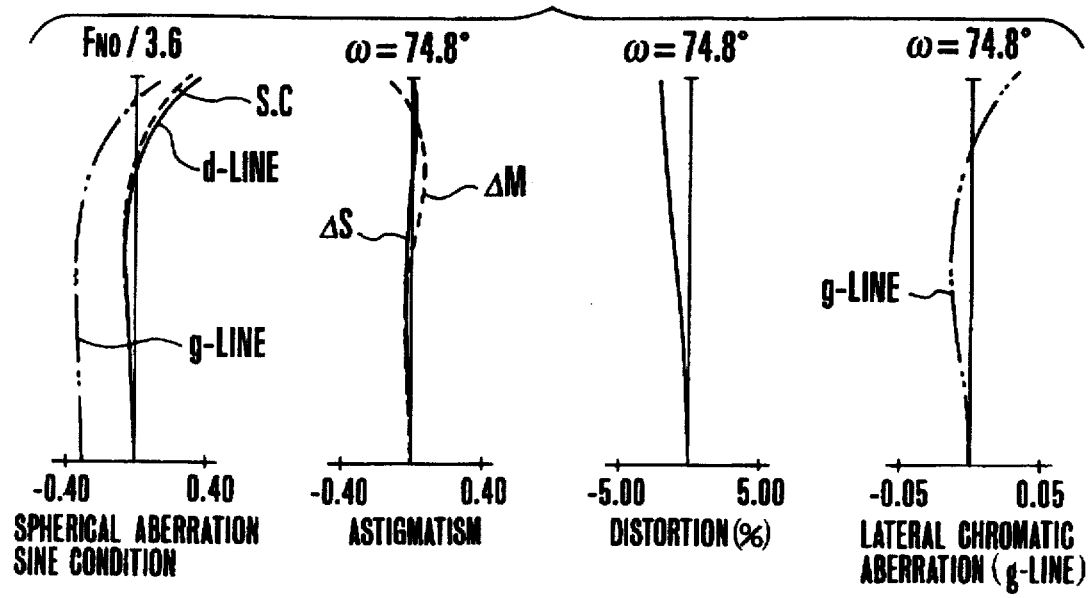
Figure 137B:
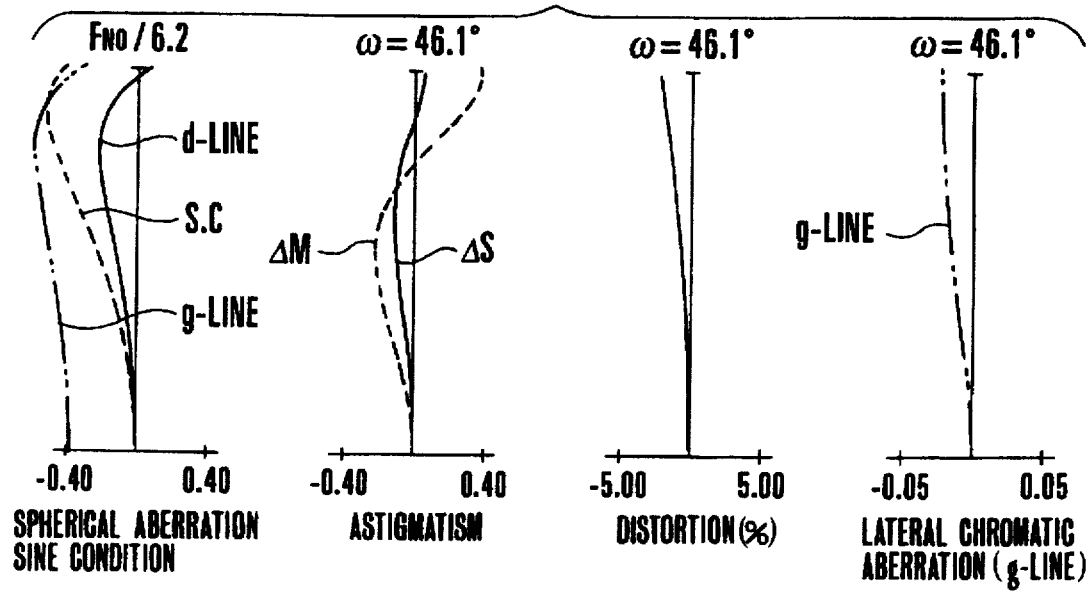
Figure 137C:
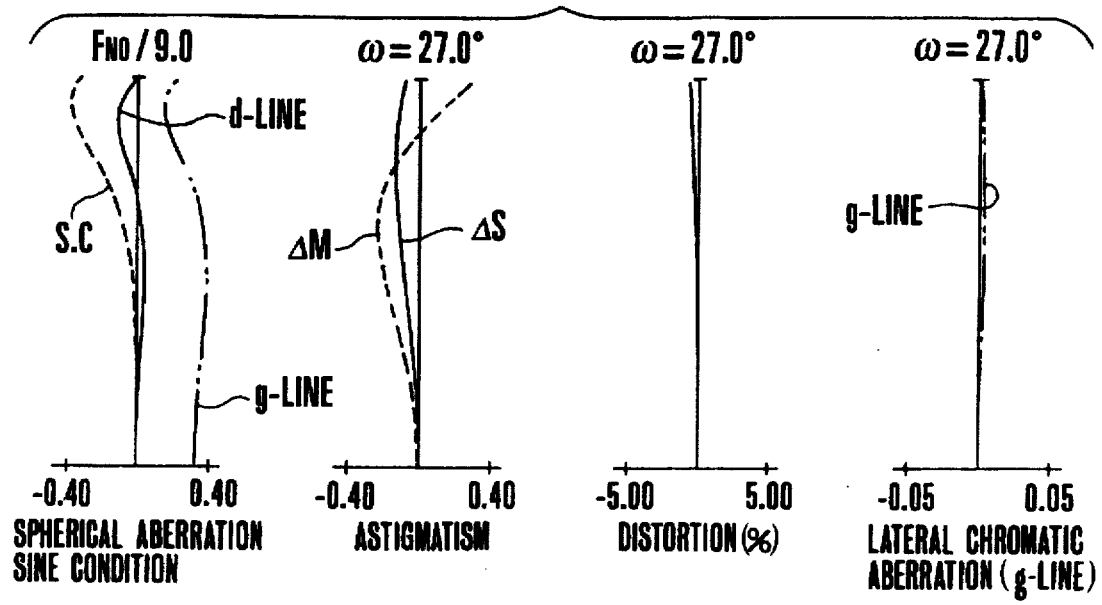

FIGS. 137(A), 137(B) and 137(C) are graphs of the various aberrations of the numerical example 60.

Figure 138A:
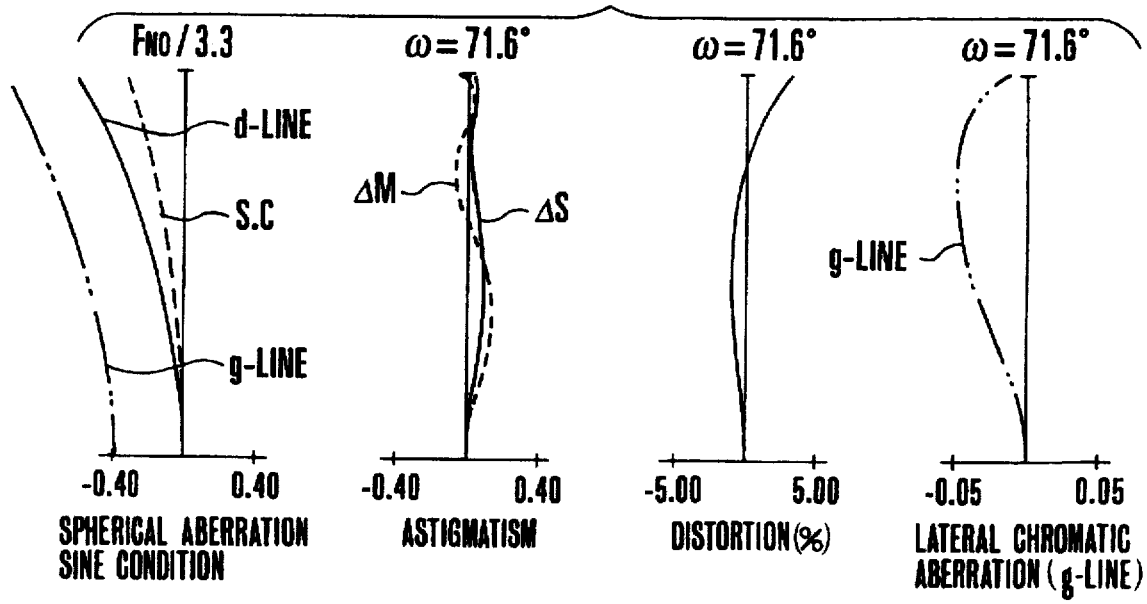
Figure 138B:
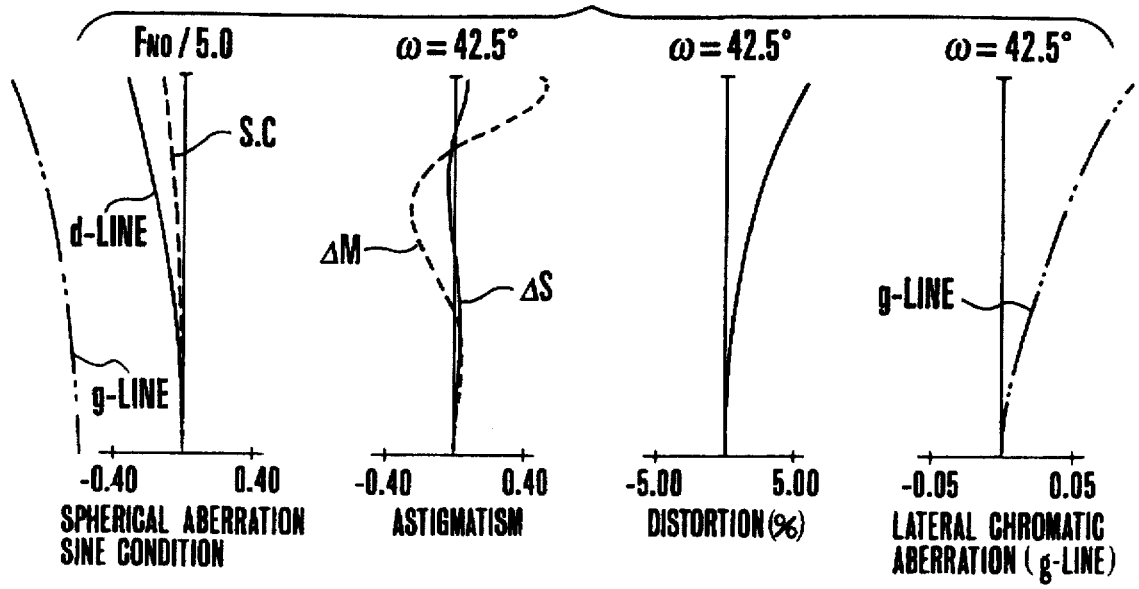
Figure 138C:
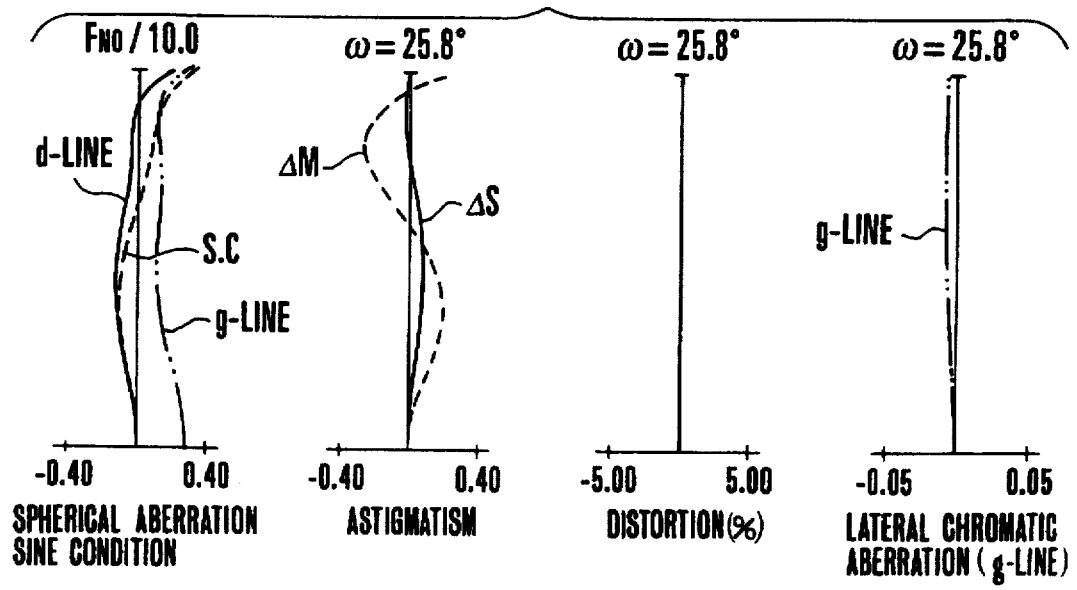

FIGS. 138(A), 138(B) and 138(C) are graphs of the various aberrations of the numerical example 61.

DETAILED DESCRIPTION OF THE PREFERRED EMBODIMENTS

Figure 1:
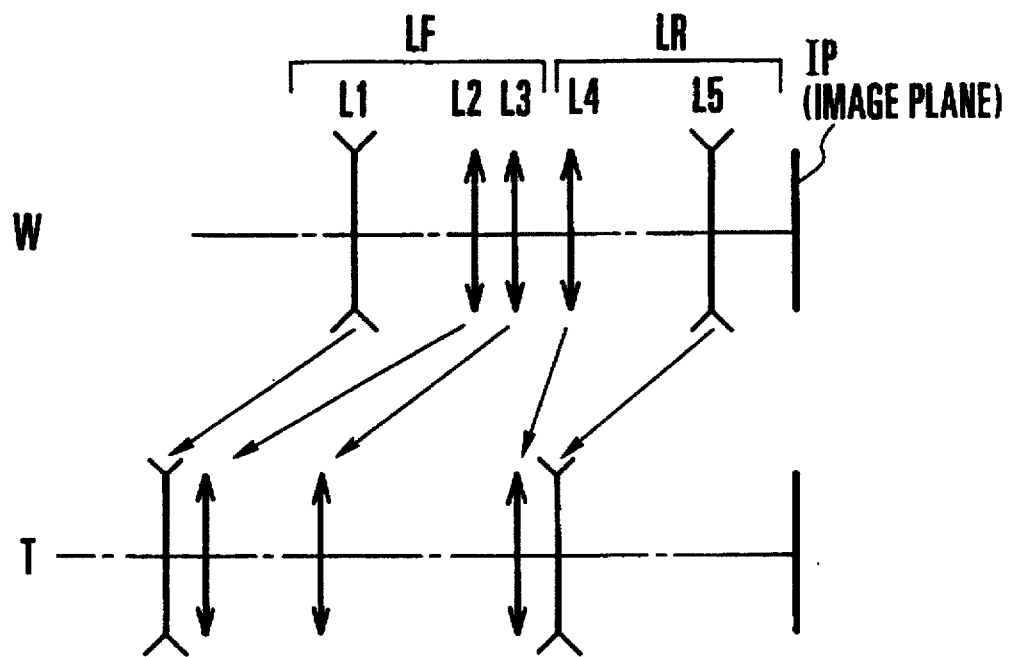
FIG. 1 illustrates the paraxial refractive power arrangements of a zoom lens of the invention.
Figure 2:
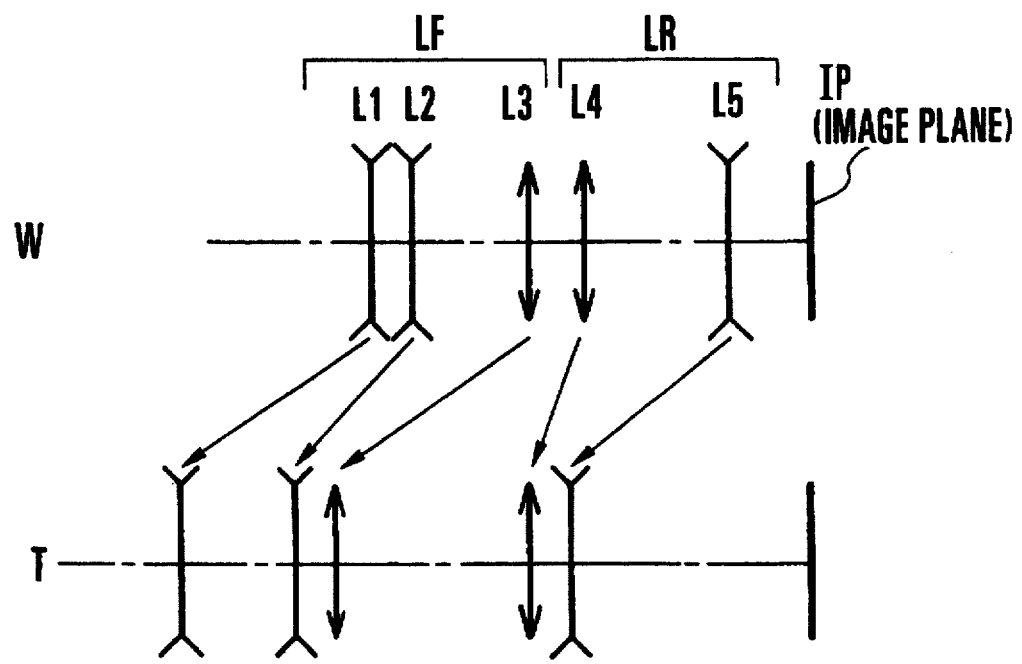
FIG. 2 illustrates the paraxial refractive power arrangements of another zoom lens of the invention.
Figure 3:
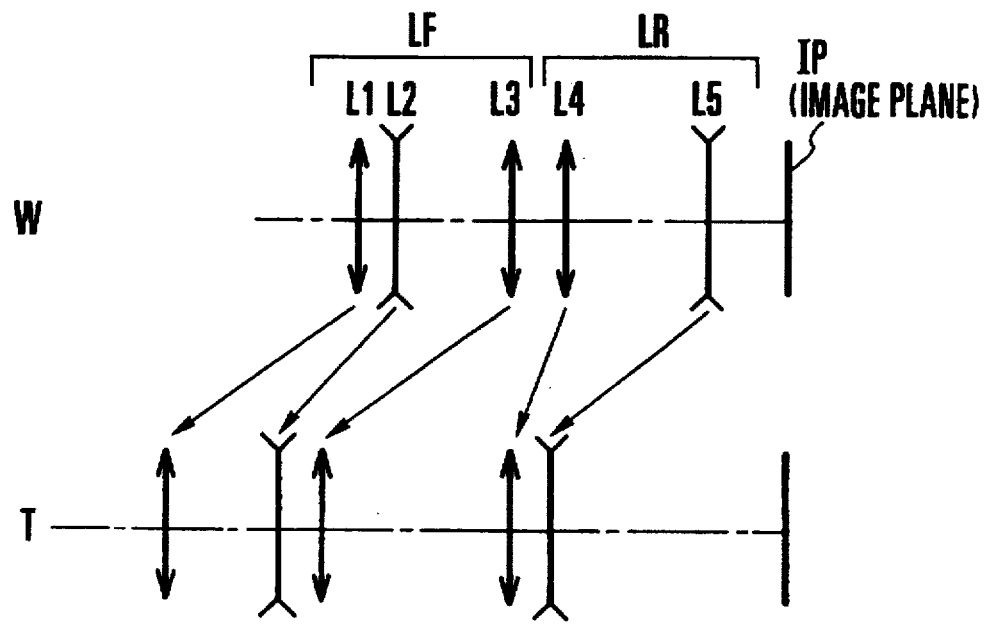
FIG. 3 illustrates the paraxial refractive power arrangements of still another zoom lens of the invention.
Figure 4:
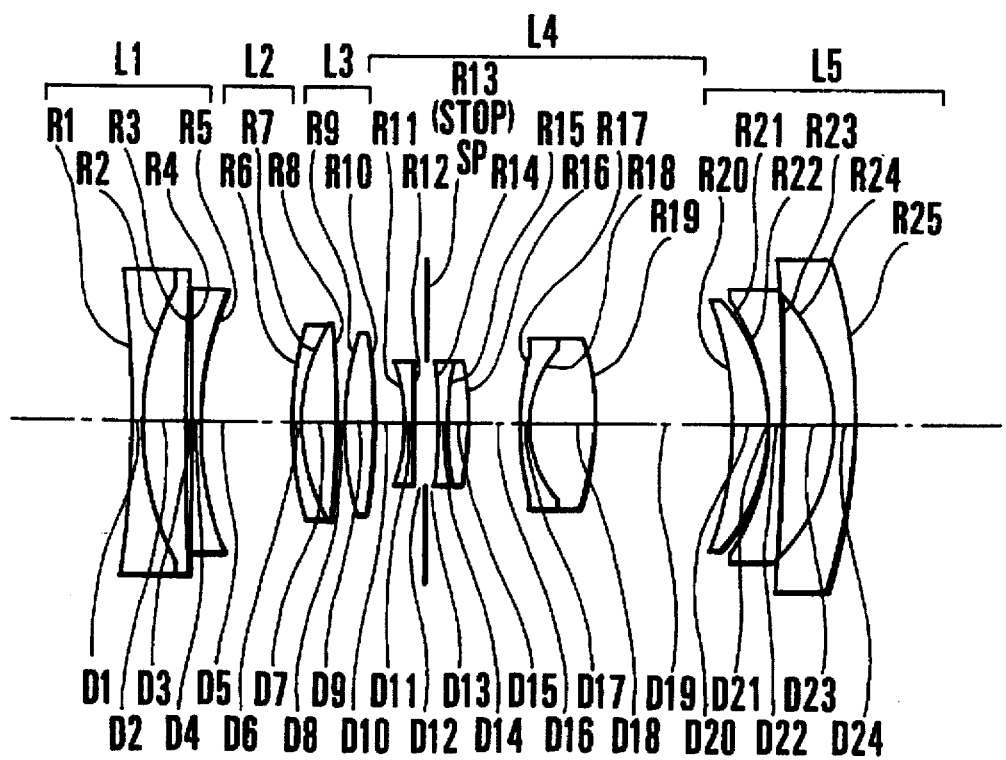
FIG. 4 is a lens block diagram of a numerical example 1 of the invention in the wide angle end.
Figure 5:
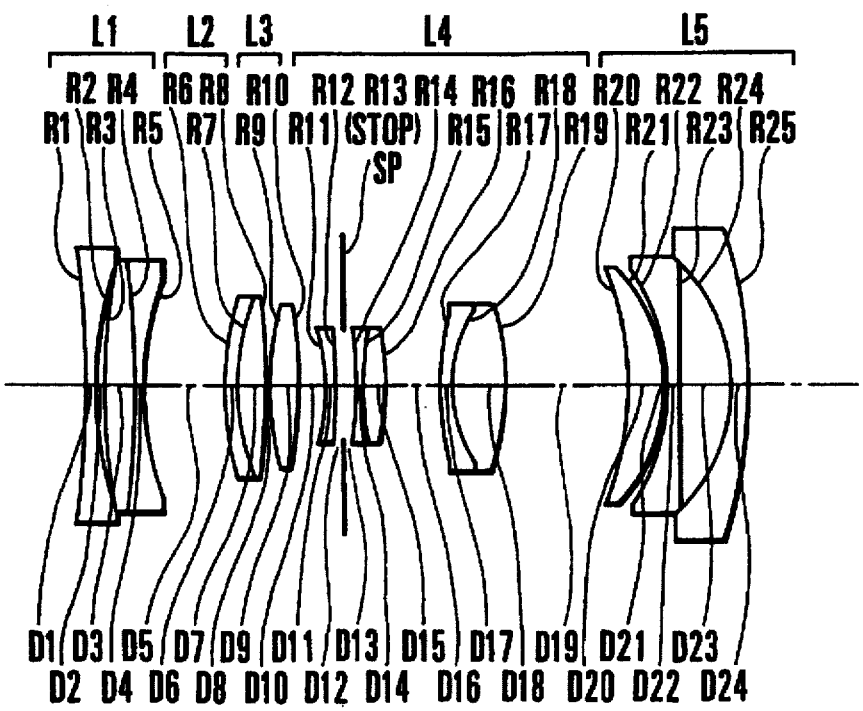
FIG. 5 is a lens block diagram of a numerical example 2 of the invention in the wide angle end.
Figure 6:
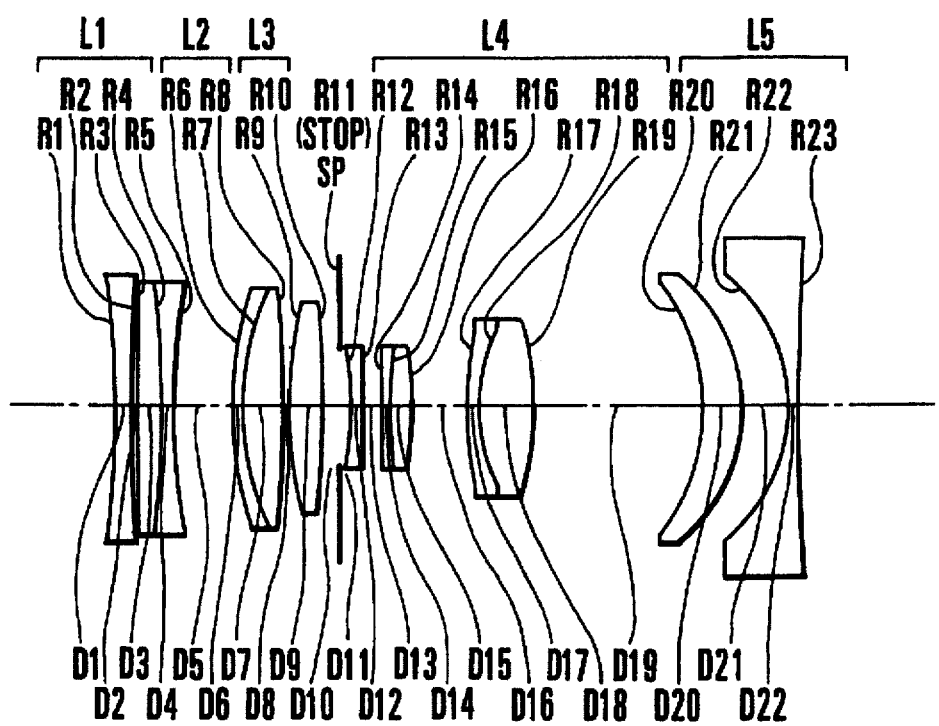
FIG. 6 is a lens block diagram of a numerical example 3 of the invention in the wide angle end.
Figure 7:
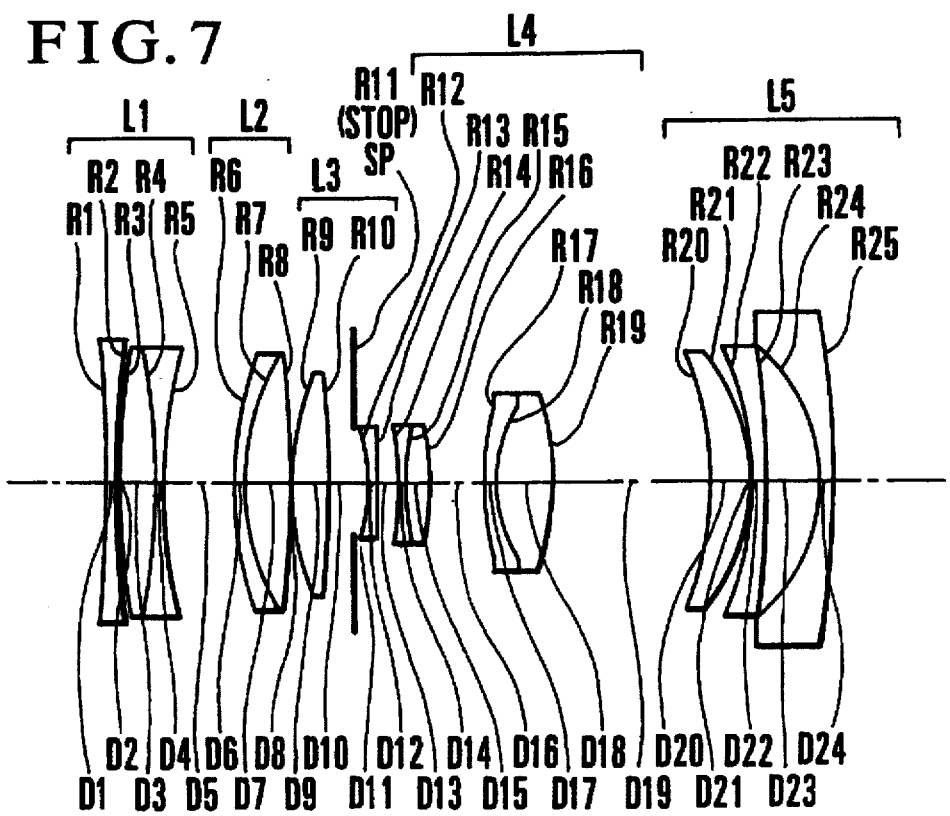
FIG. 7 is a lens block diagram of a numerical example 4 of the invention in the wide angle end.
Figure 8:
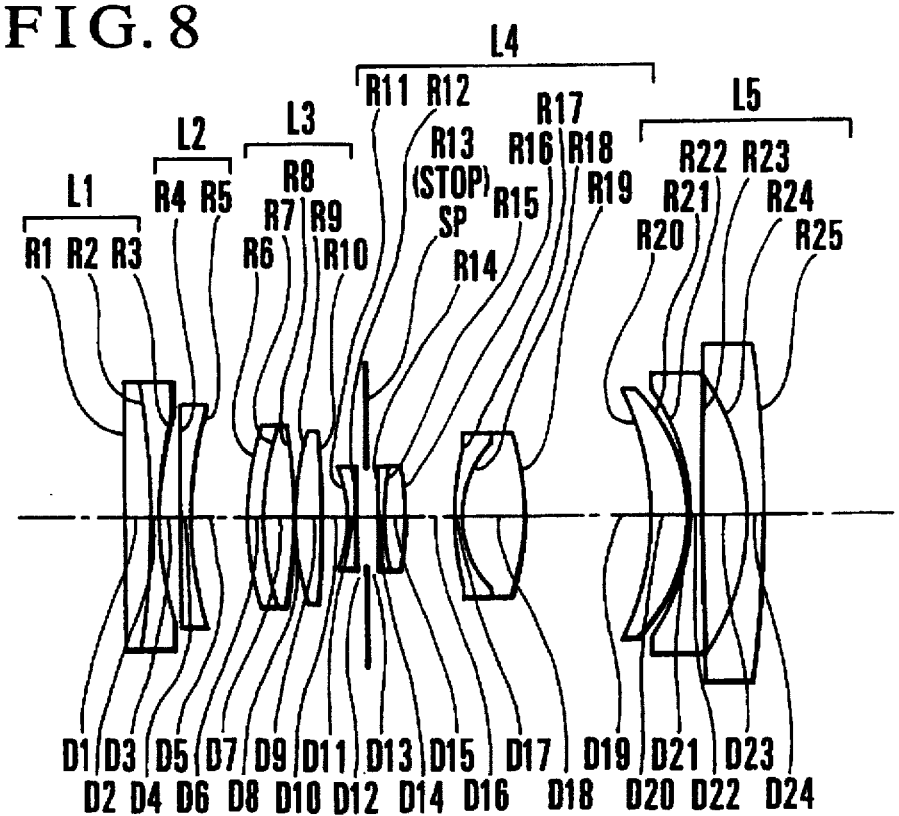
FIG. 8 is a lens block diagram of a numerical example 5 of the invention in the wide angle end.
Figure 9:
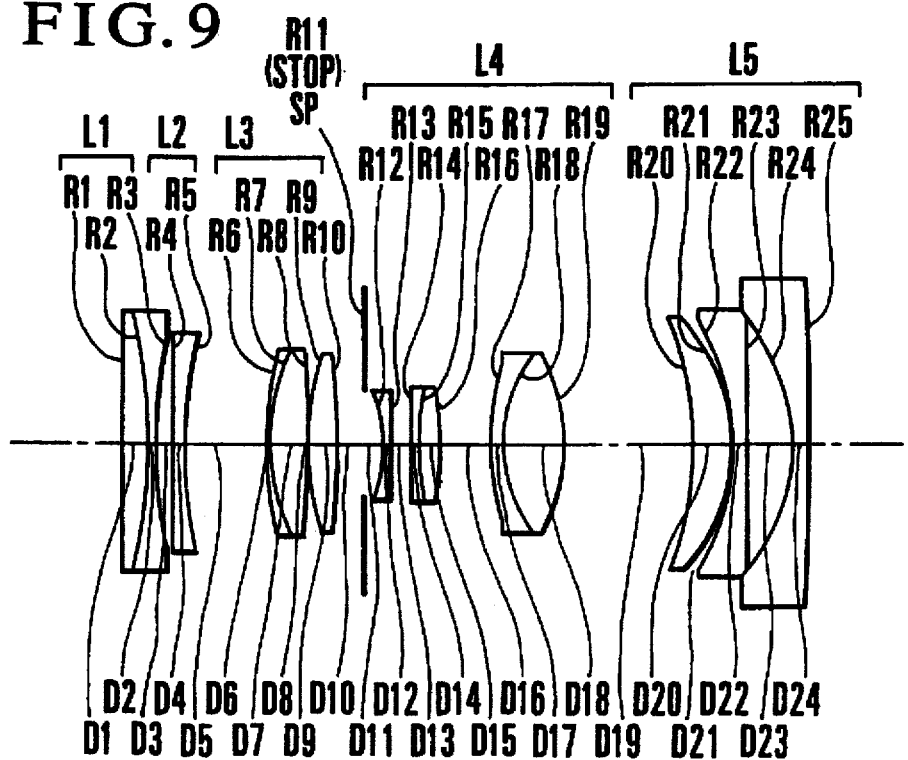
FIG. 9 is a lens block diagram of a numerical example 6 of the invention in the wide angle end.
Figure 10:
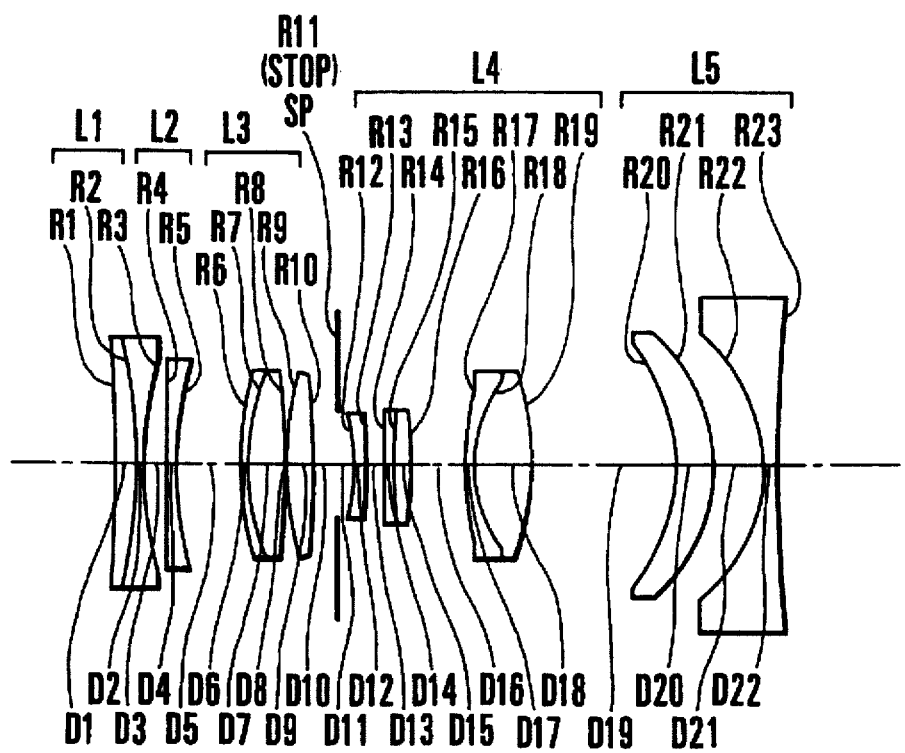
FIG. 10 is a lens block diagram of a numerical example 7 of the invention in the wide angle end.
Figure 11:
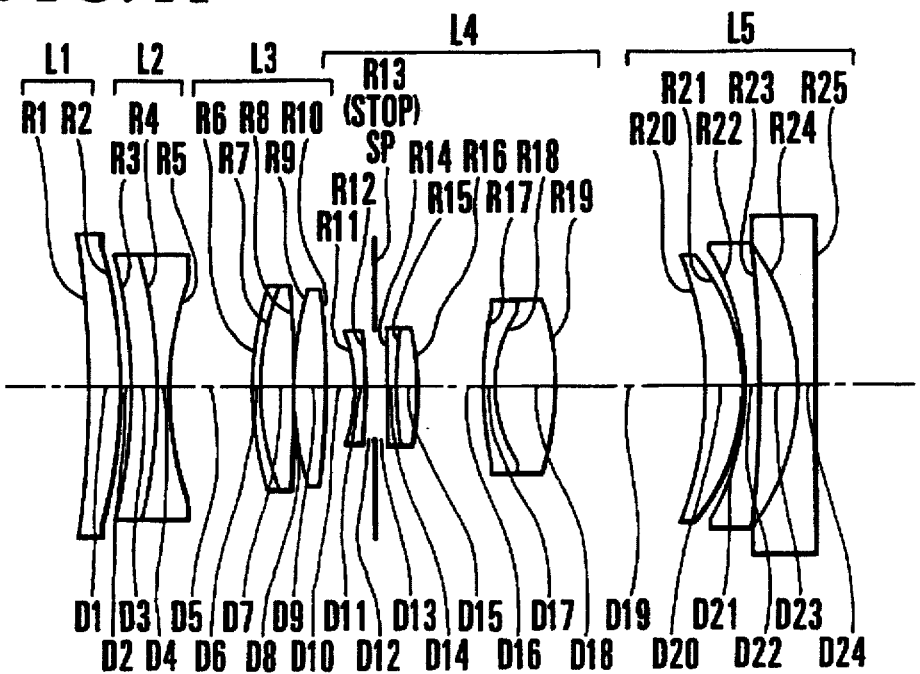
FIG. 11 is a lens block diagram of a numerical example 8 of the invention in the wide angle end.
Figure 12:
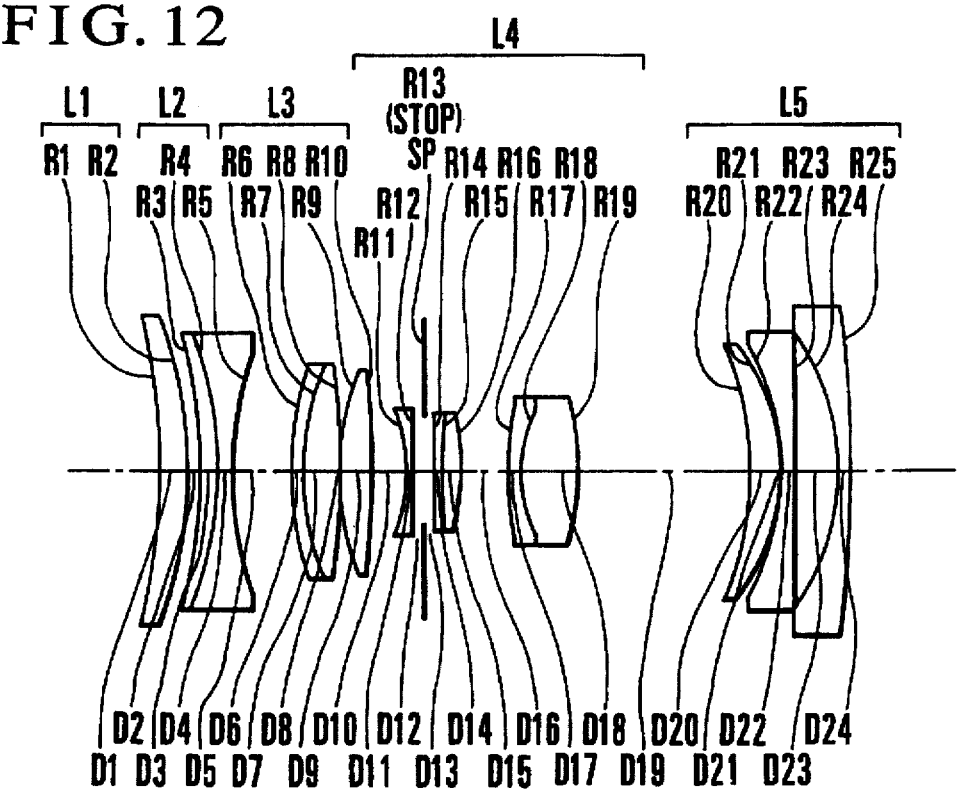
FIG. 12 is a lens block diagram of a numerical example 9 of the invention in the wide angle end.
Figure 13:
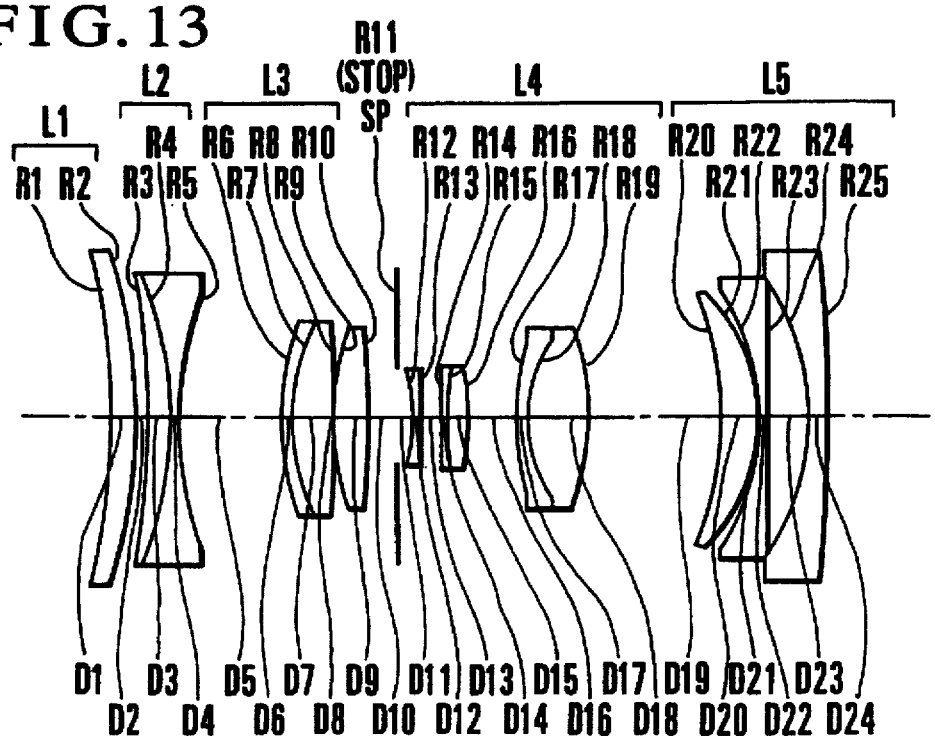
FIG. 13 is a lens block diagram of a numerical example 10 of the invention in the wide angle end.
Figure 14:
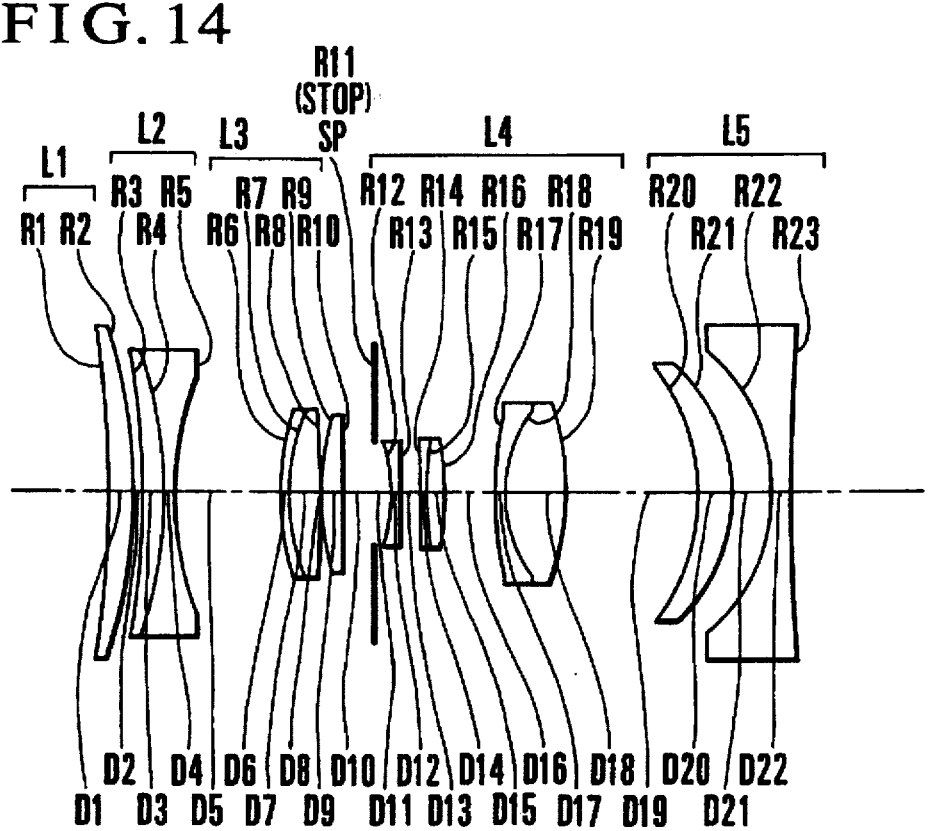
FIG. 14 is a lens block diagram of a numerical example 11 of the invention in the wide angle end.
Figure 15:
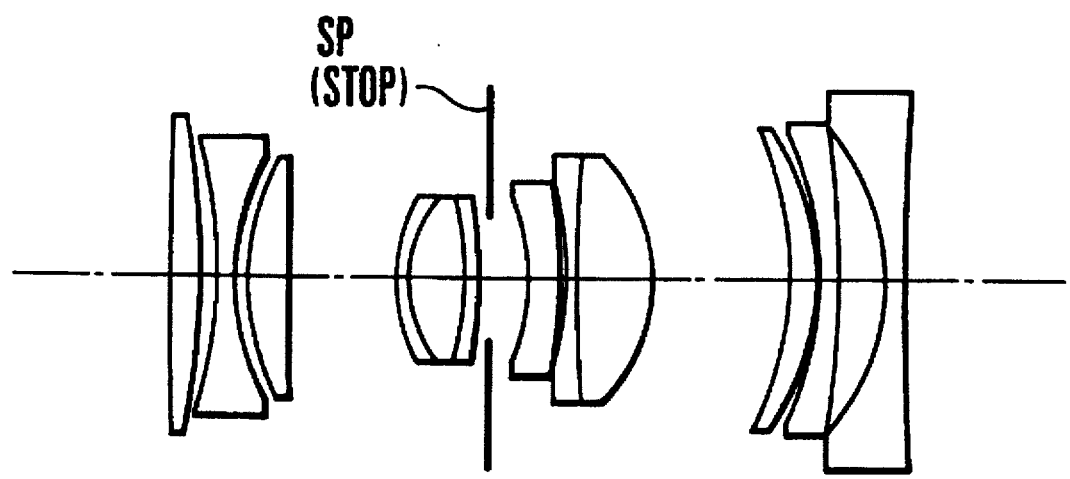
FIG. 15 is a lens block diagram of a numerical example 12 of the invention in the wide angle end.
Figure 16A:
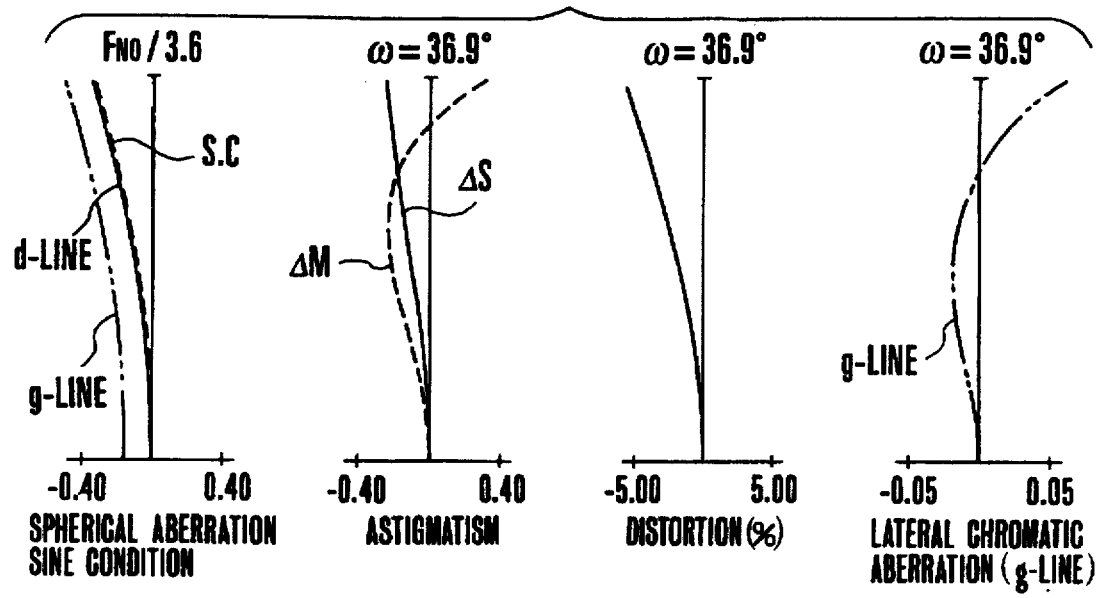
FIGS. 16(A), 16(B) and 16(C) are graphs of the various aberrations of the numerical example 1 of the invention.
Figure 16B:
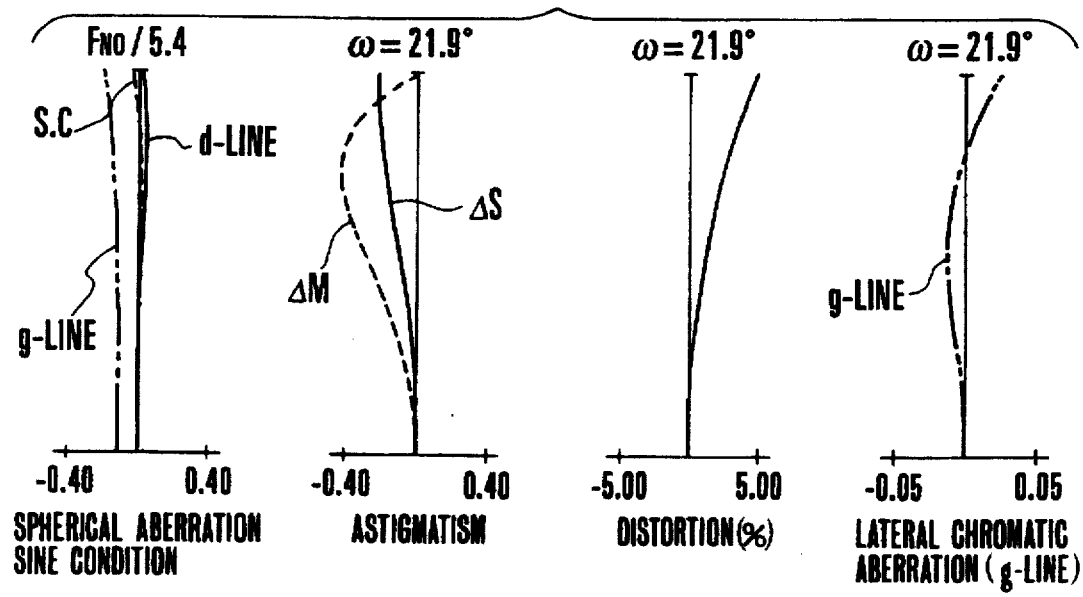
Figure 16C:
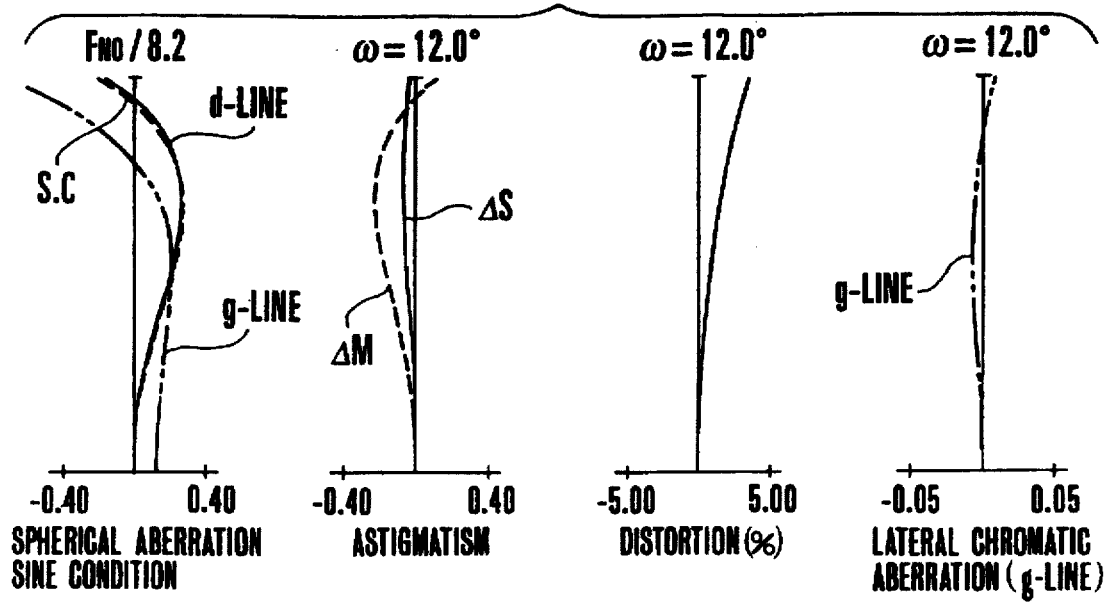
Figure 17A:
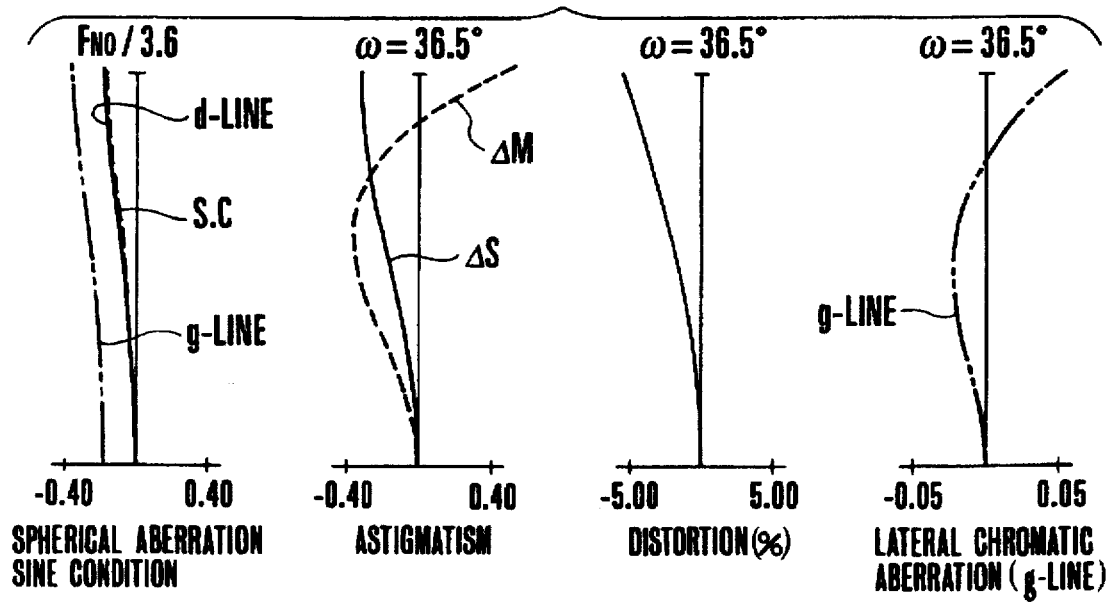
FIGS. 17(A), 17(B) and 17(C) are graphs of the various aberrations of the numerical example 2 of the invention.
Figure 17B:
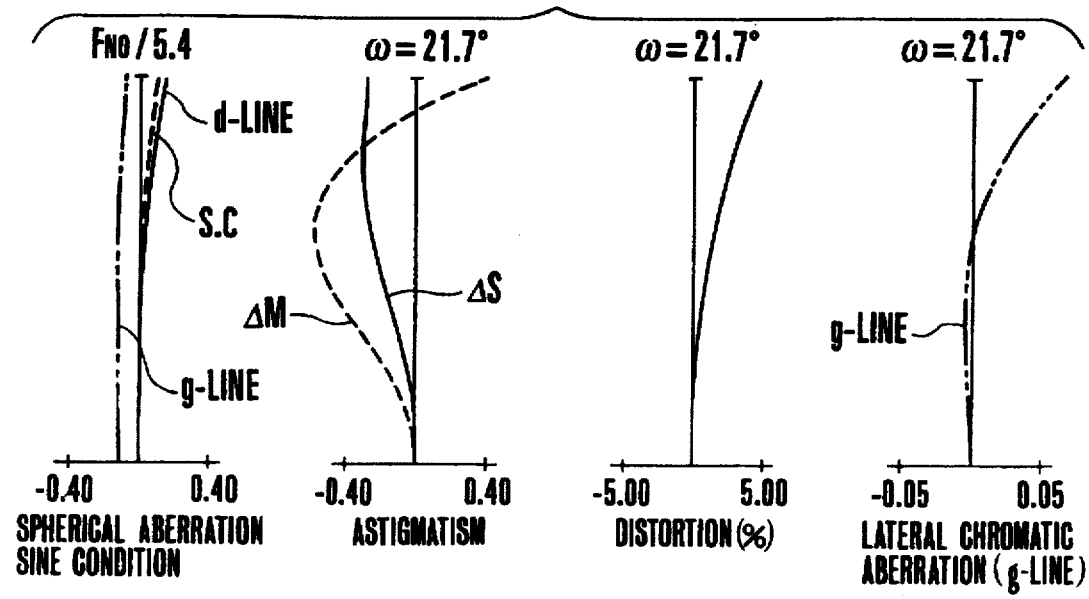
Figure 17C:
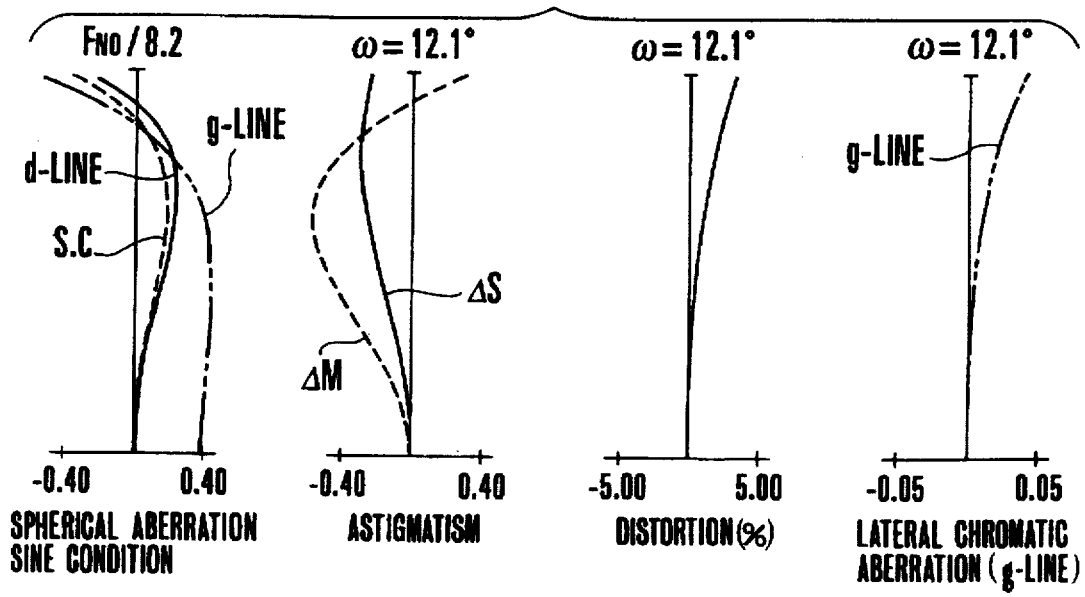
Figure 18A:
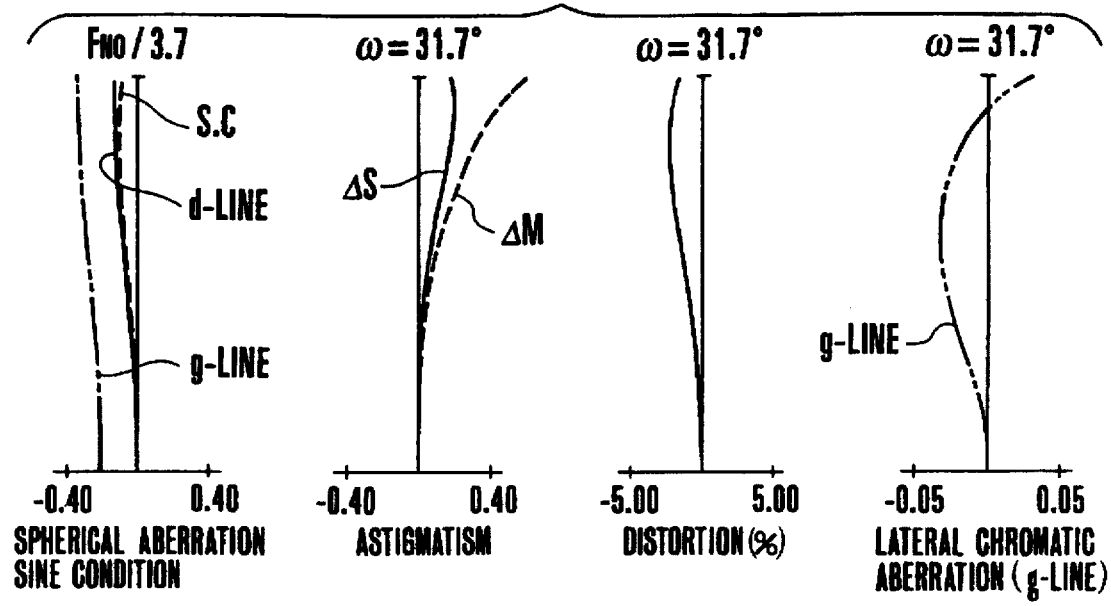
FIGS. 18(A), 18(B) and 18(C) are graphs of the various aberrations of the numerical example 3 of the invention.
Figure 18B:
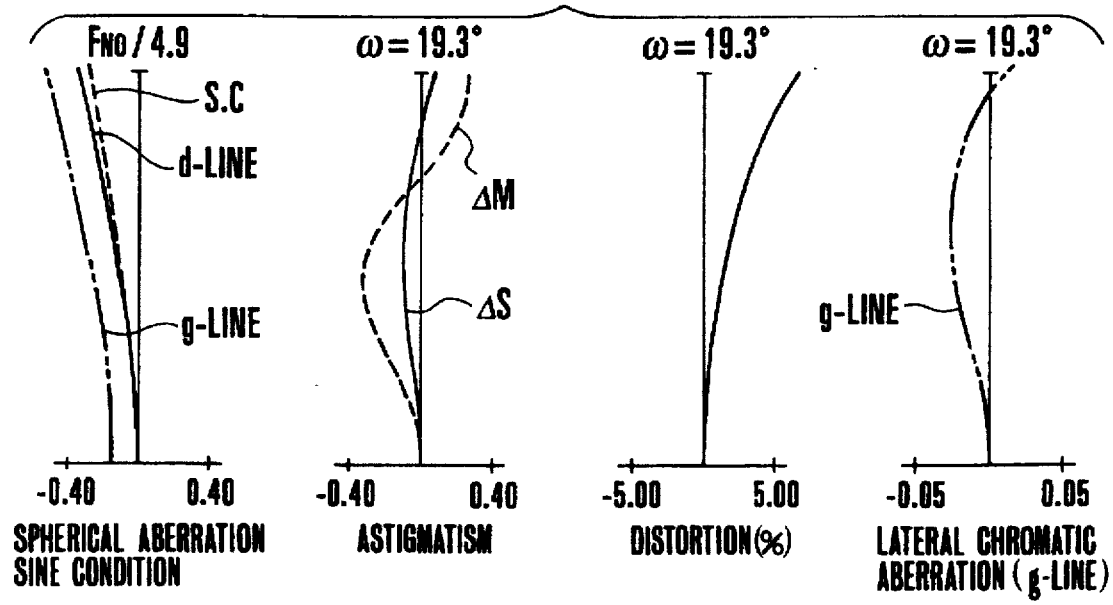
Figure 18C:
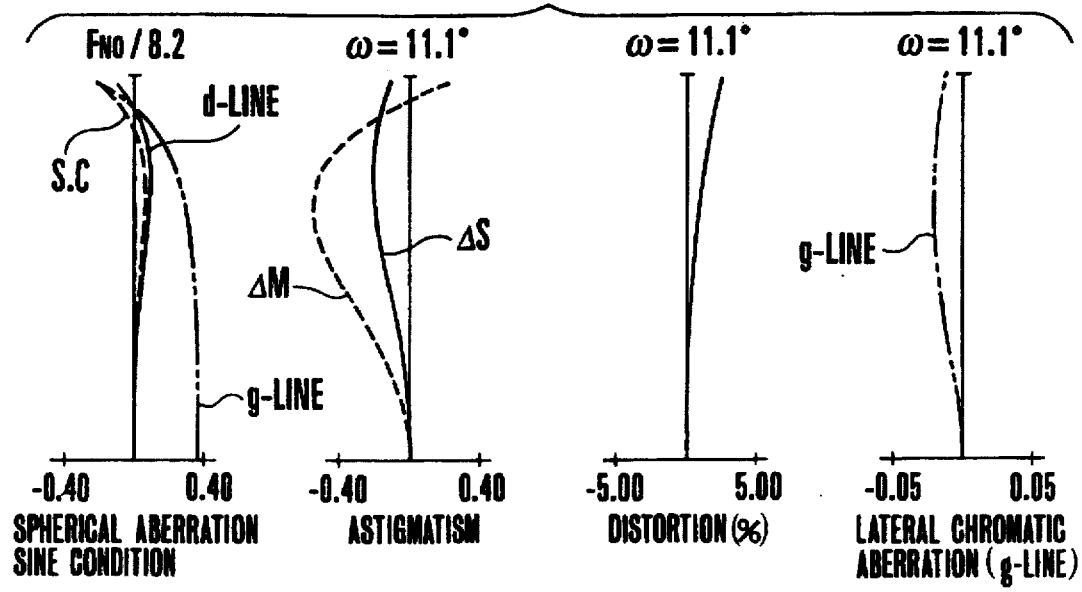
Figure 19A:
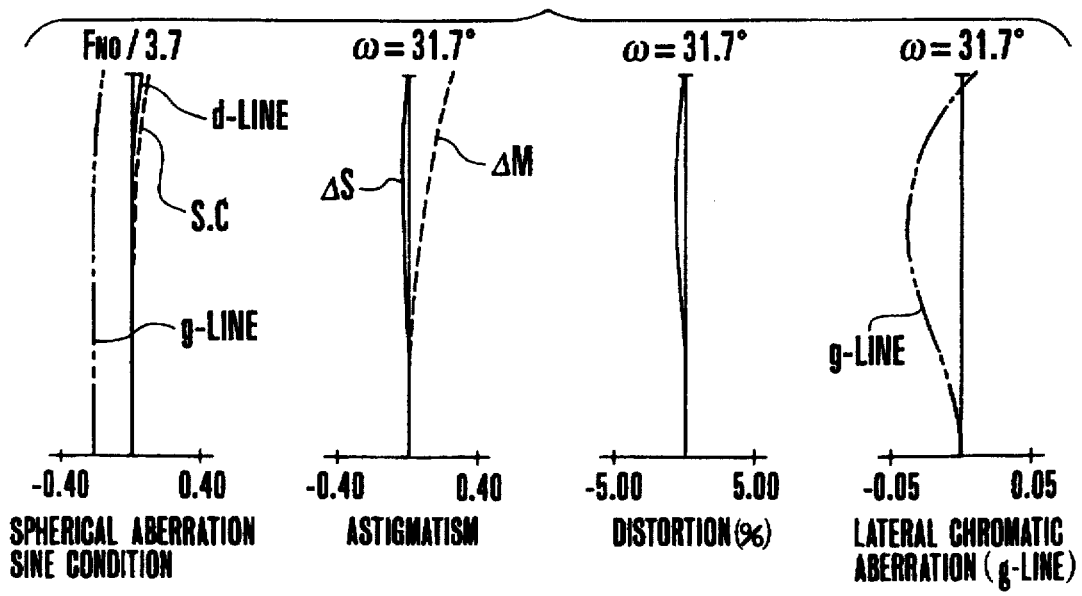
FIGS. 19(A), 19(B) and 19(C) are graphs of the various aberrations of the numerical example 4 of the invention.
Figure 19B:
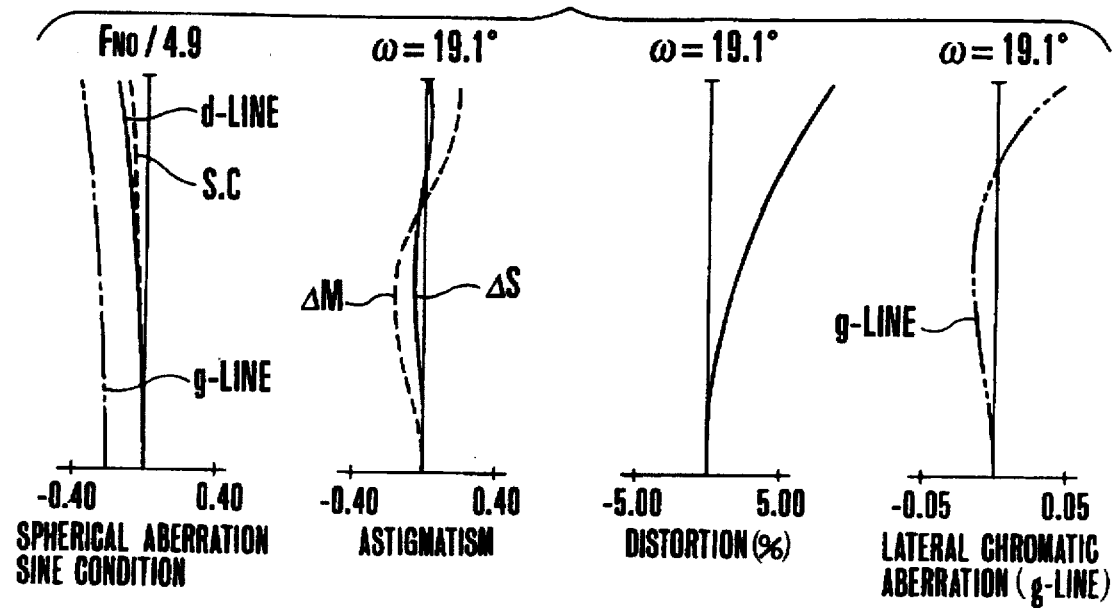
Figure 19C:
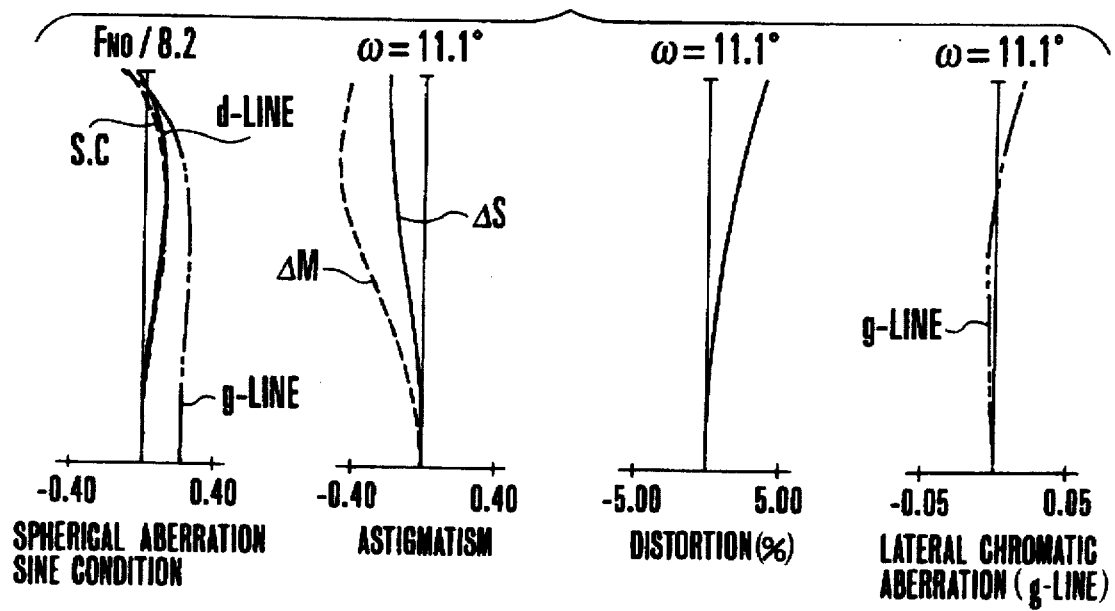
Figure 20A:
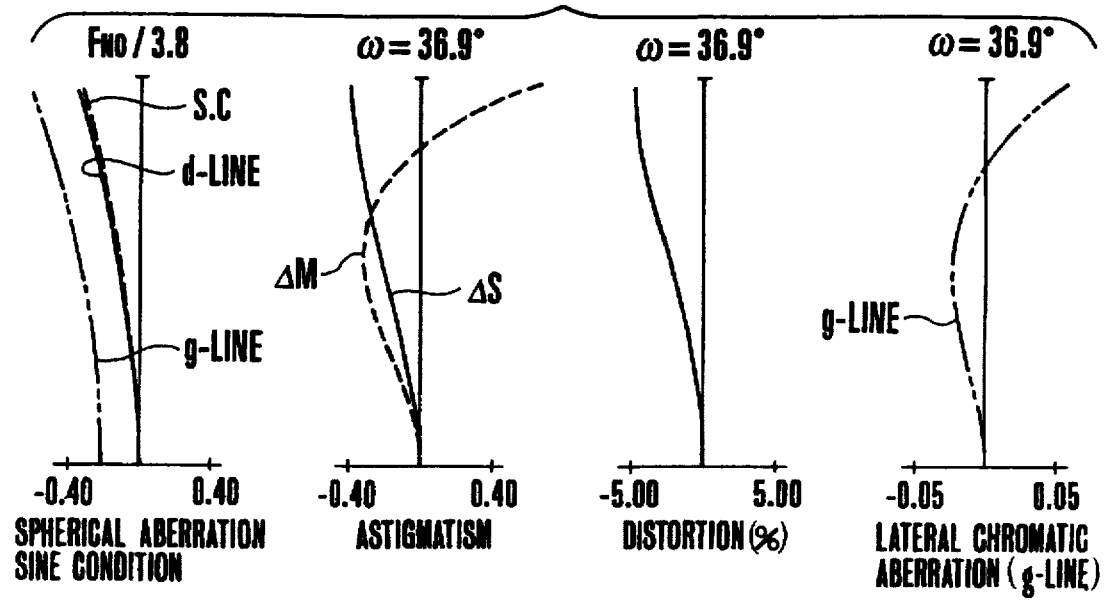
FIGS. 20(A), 20(B) and 20(C) are graphs of the various aberrations of the numerical example 5 of the invention.
Figure 20B:
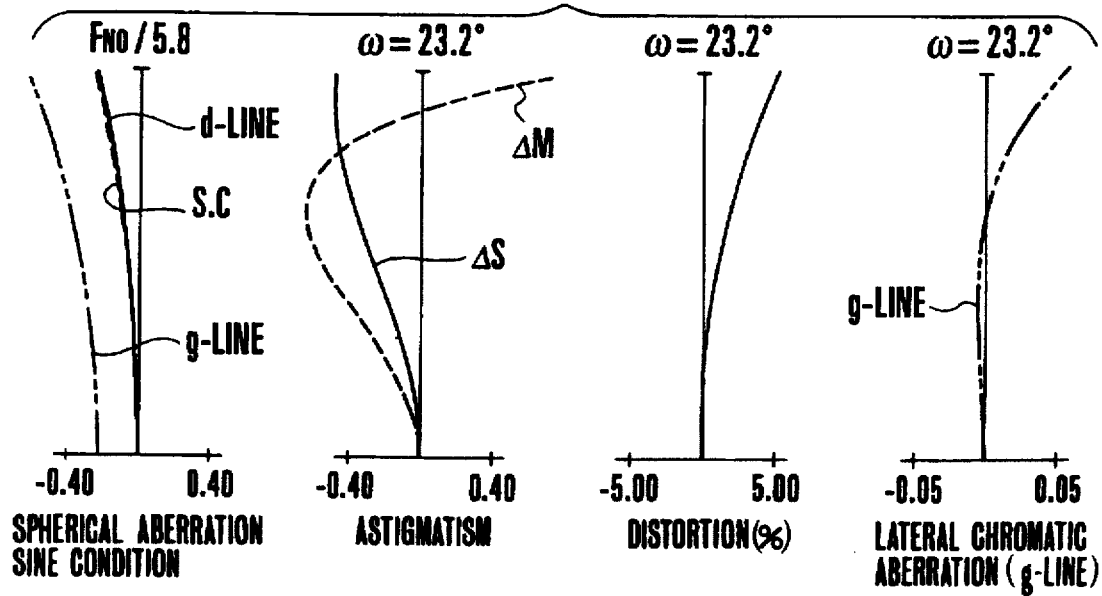
Figure 20C:
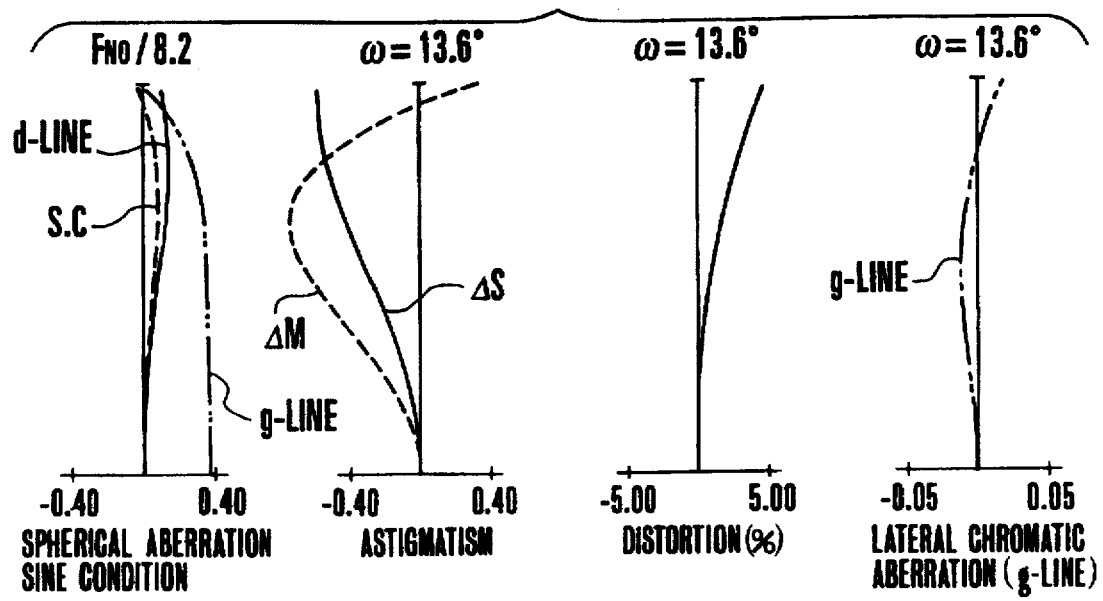
Figure 21A:
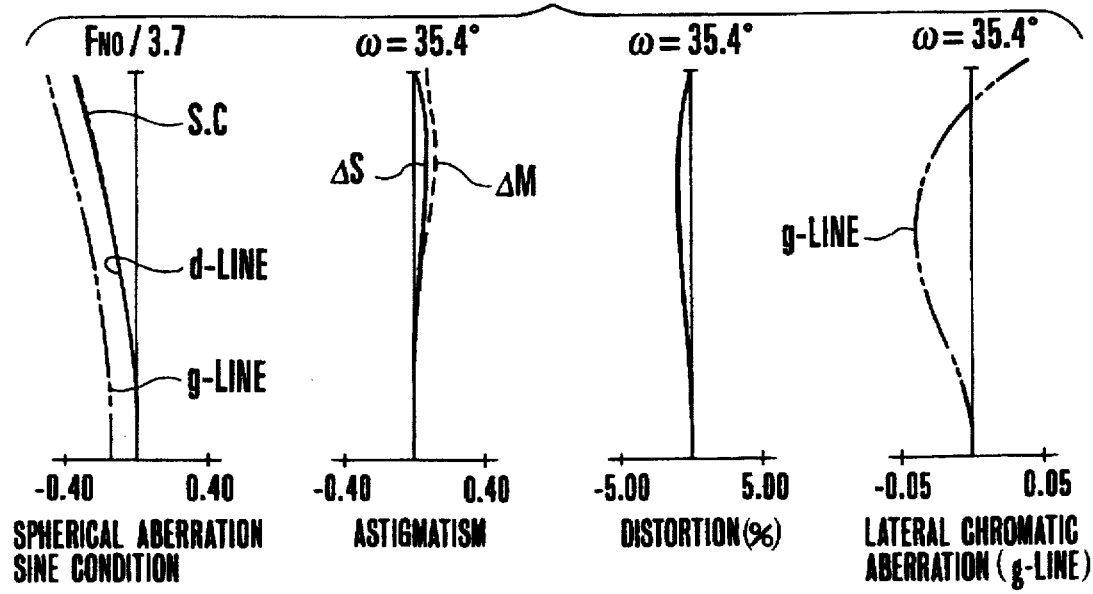
FIGS. 21(A), 21(B) and 21(C) are graphs of the various aberrations of the numerical example 6 of the invention.
Figure 21B:
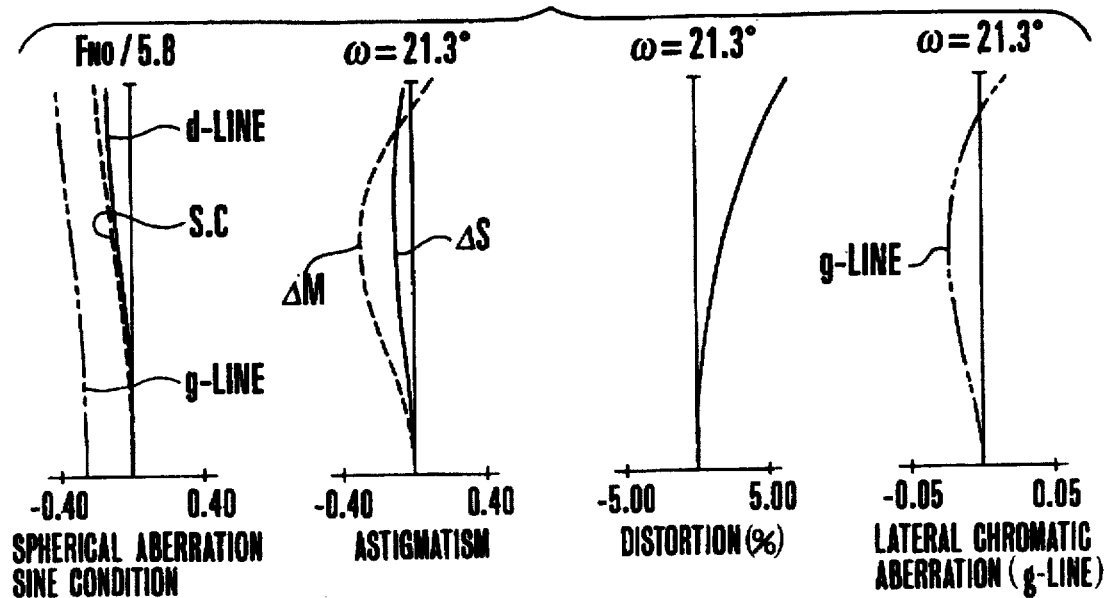
Figure 21C:
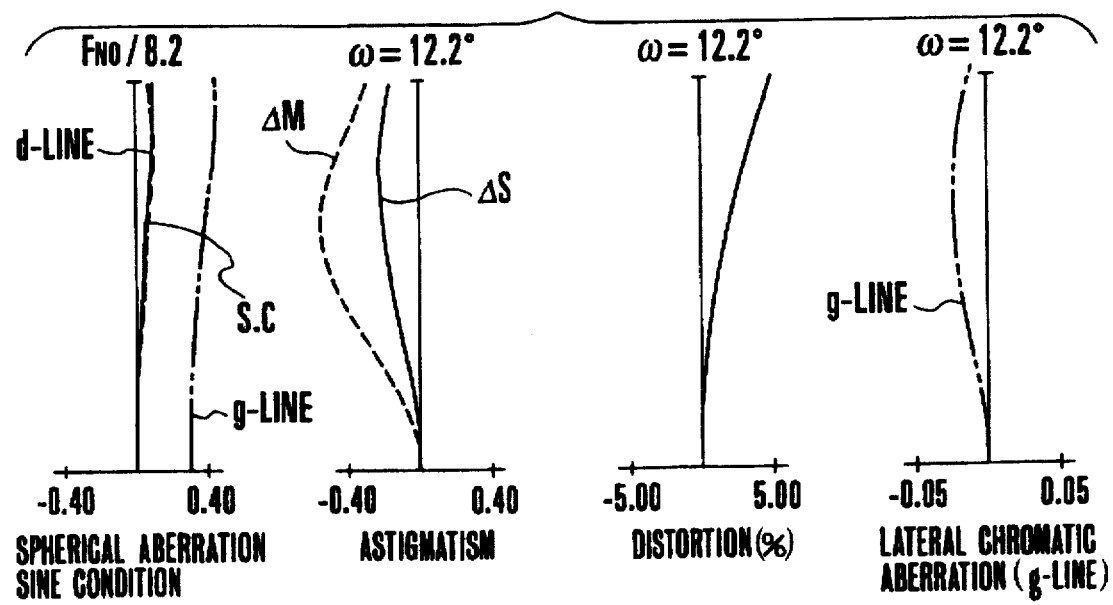
Figure 22A:
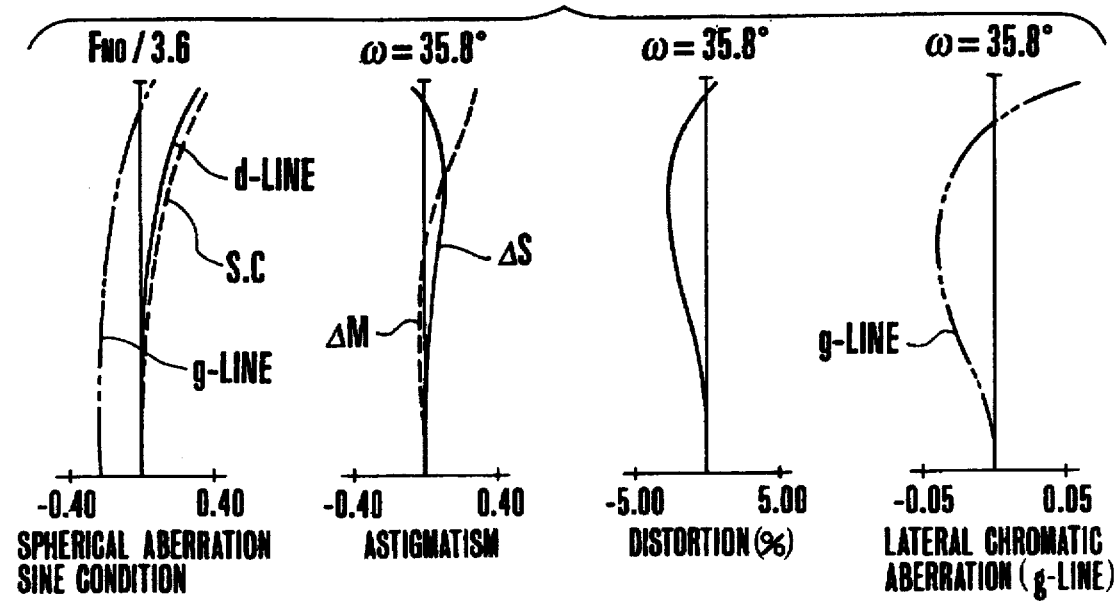
FIGS. 22(A), 22(B) and 22(C) are graphs of the various aberrations of the numerical example 7 of the invention.
Figure 22B:
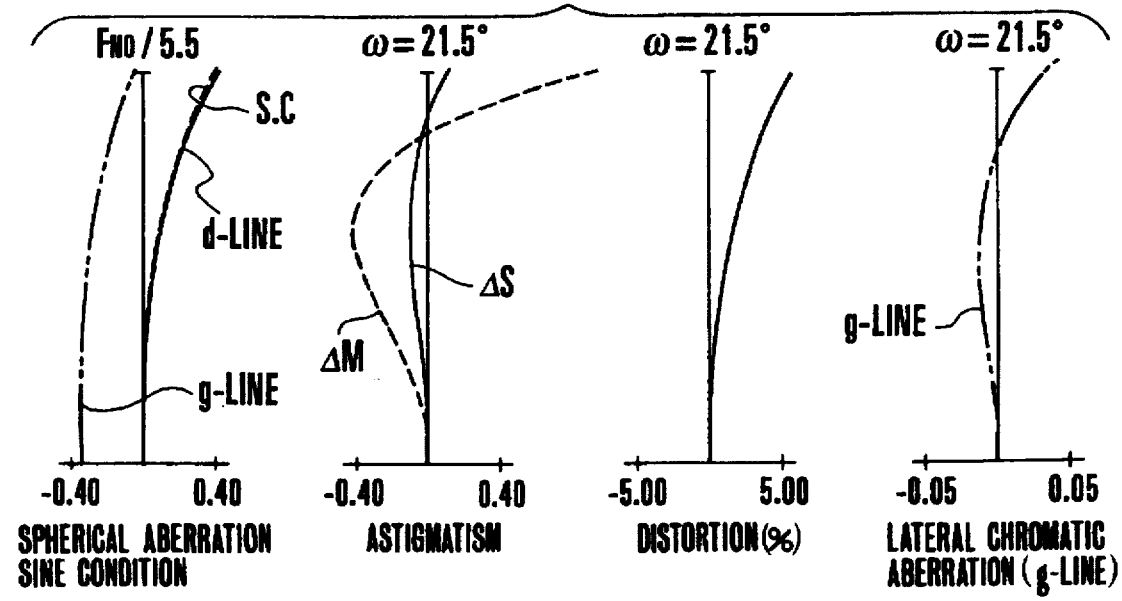
Figure 22C:
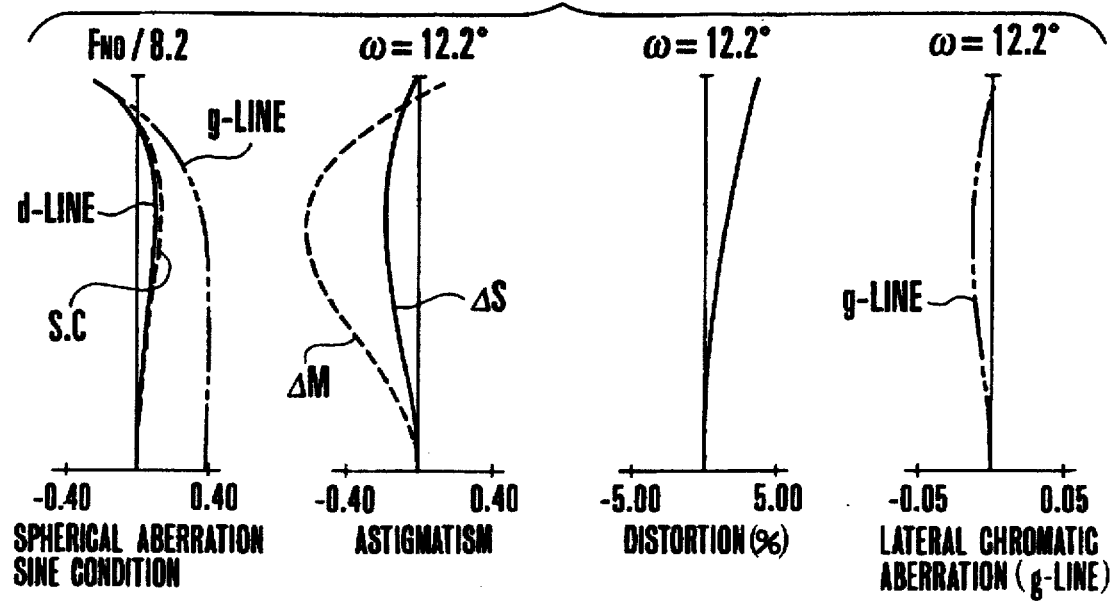
Figure 23A:
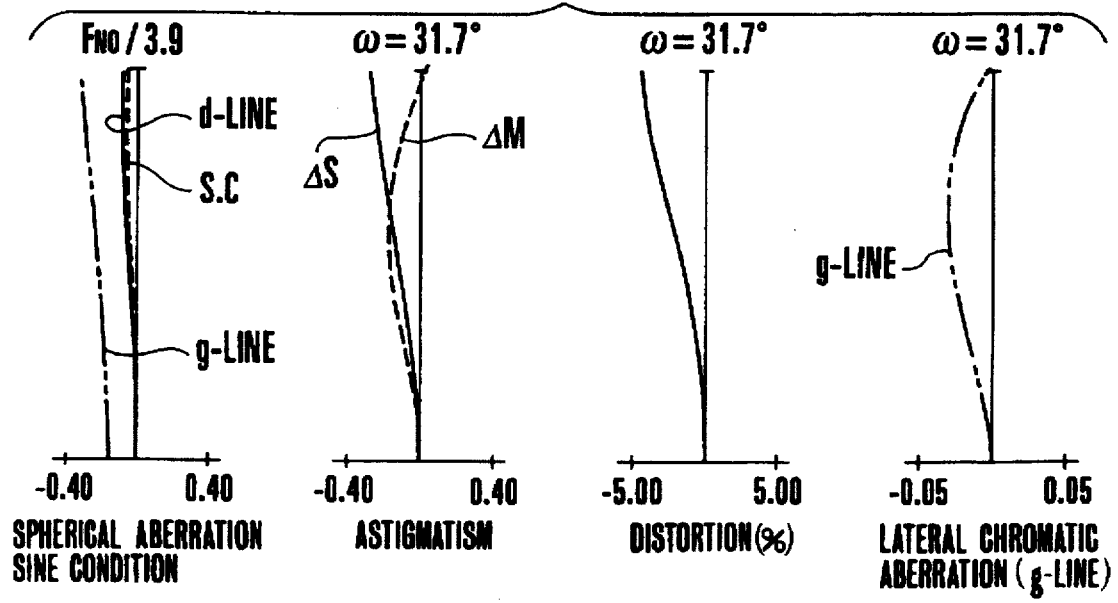
FIGS. 23(A), 23(B) and 23(C) are graphs of the various aberrations of the numerical example 8 of the invention.
Figure 23B:
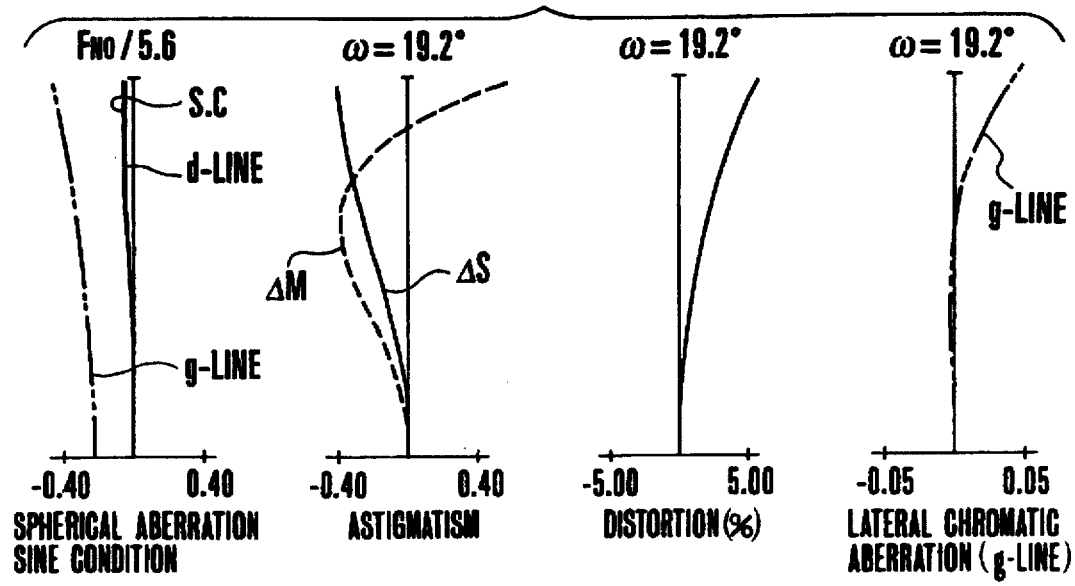
Figure 23C:
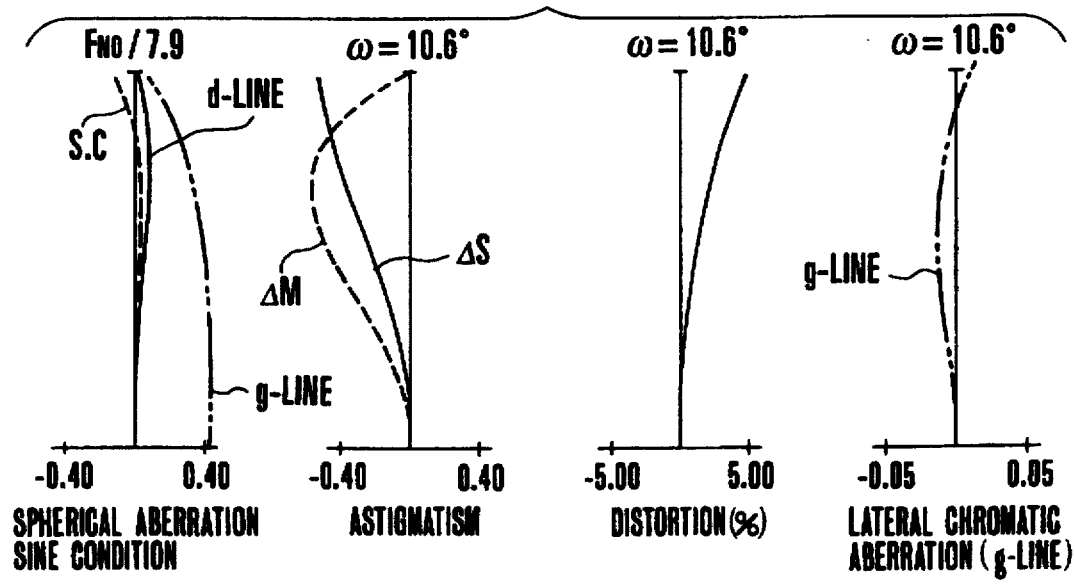
Figure 24A:
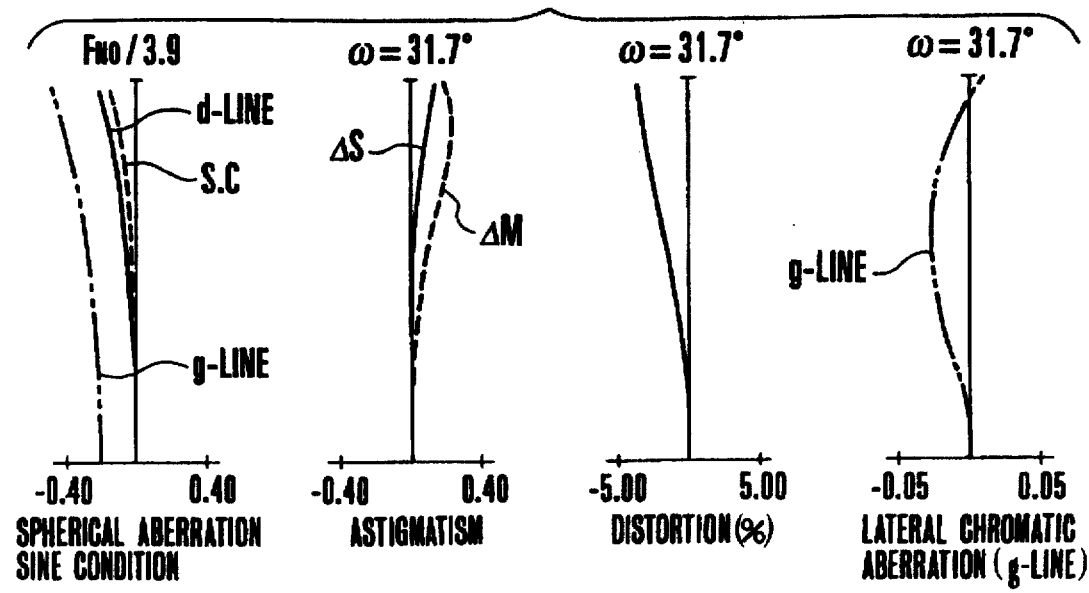
FIGS. 24(A), 24(B) and 24(C) are graphs of the various aberrations of the numerical example 9 of the invention.
Figure 24B:
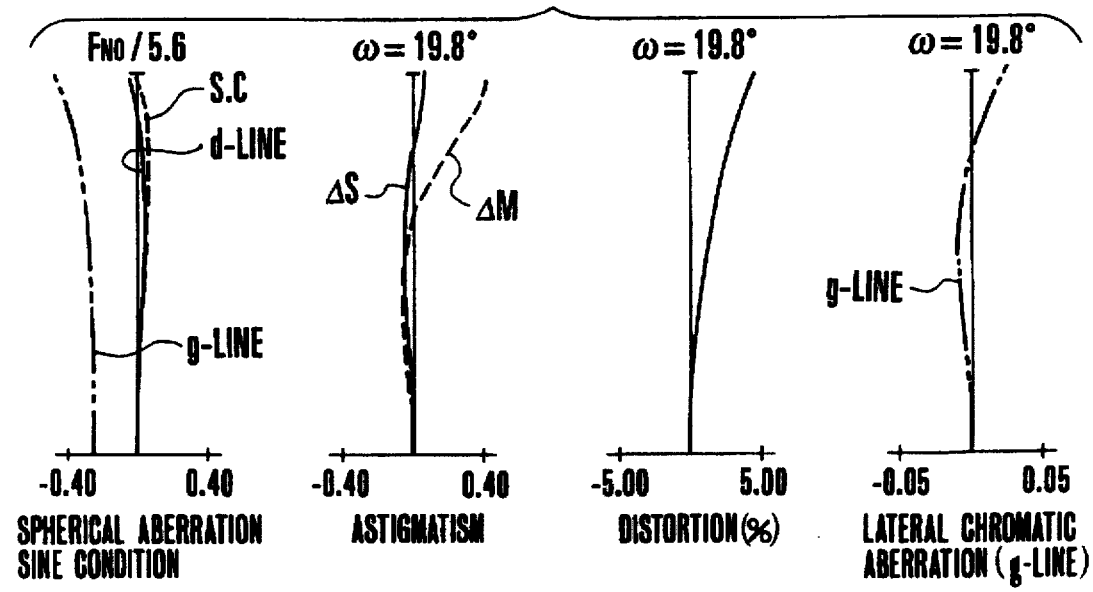
Figure 24C:
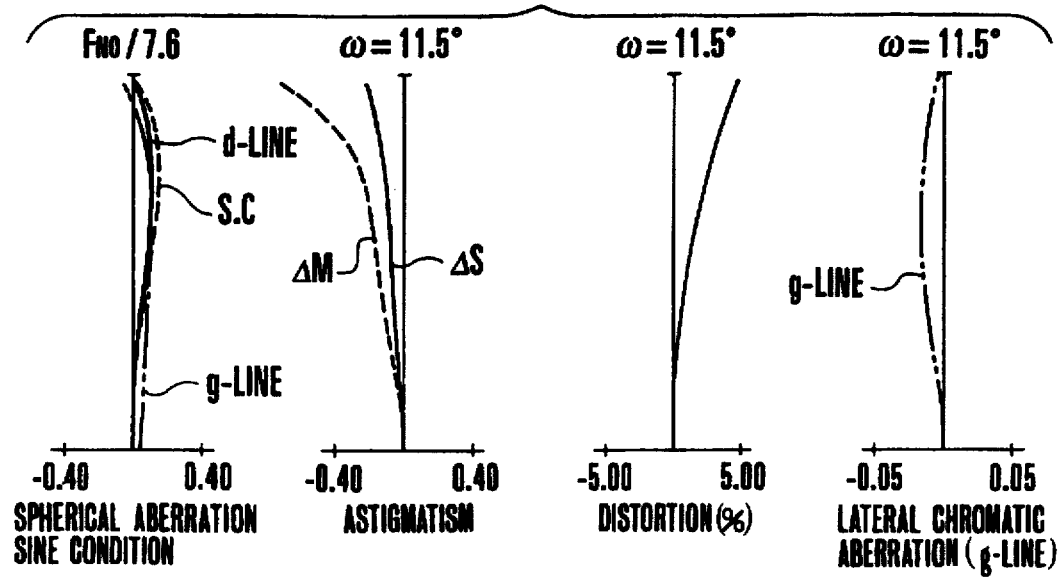
Figure 25A:
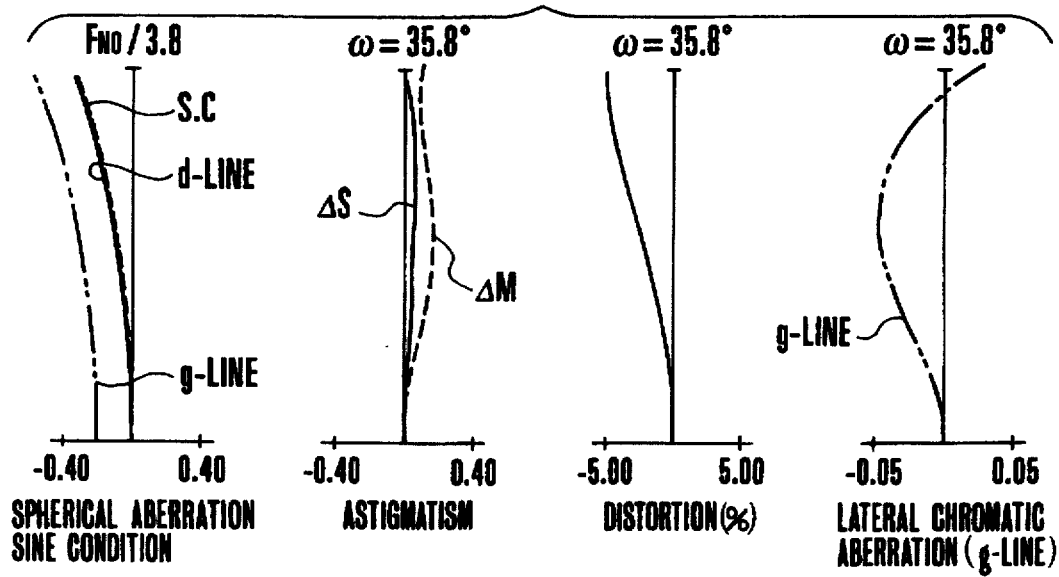
FIGS. 25(A), 25(B) and 25(C) are graphs of the various aberrations of the numerical example 10 of the invention.
Figure 25B:
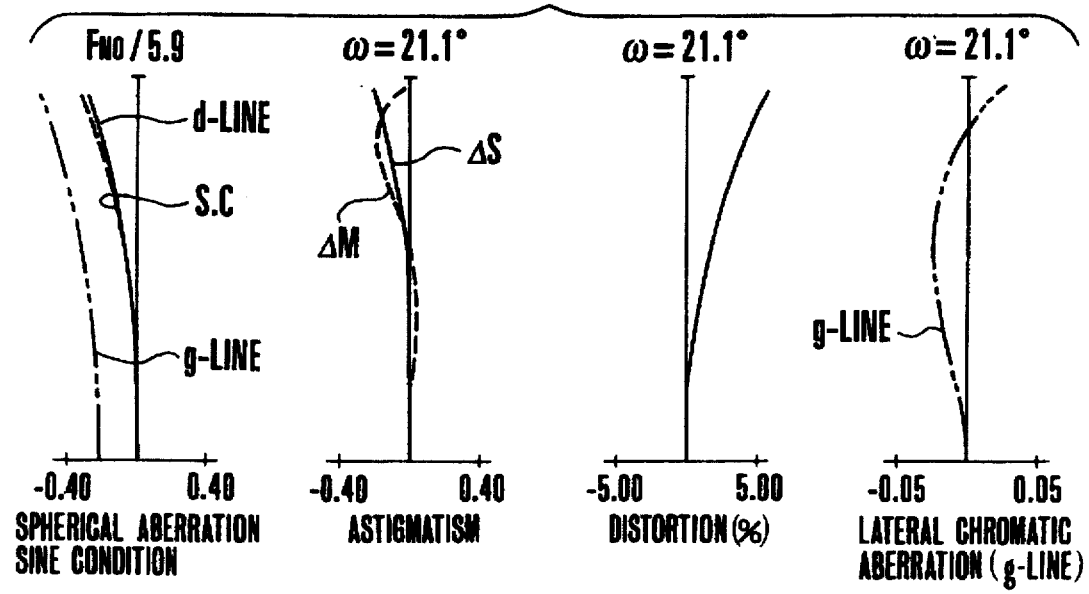
Figure 25C:
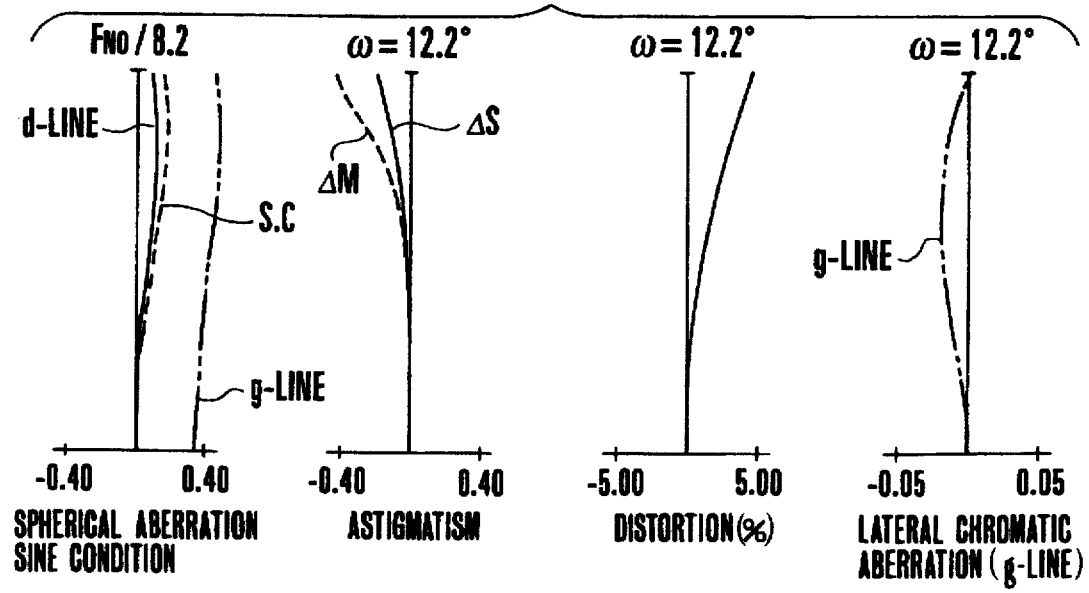
Figure 26A:
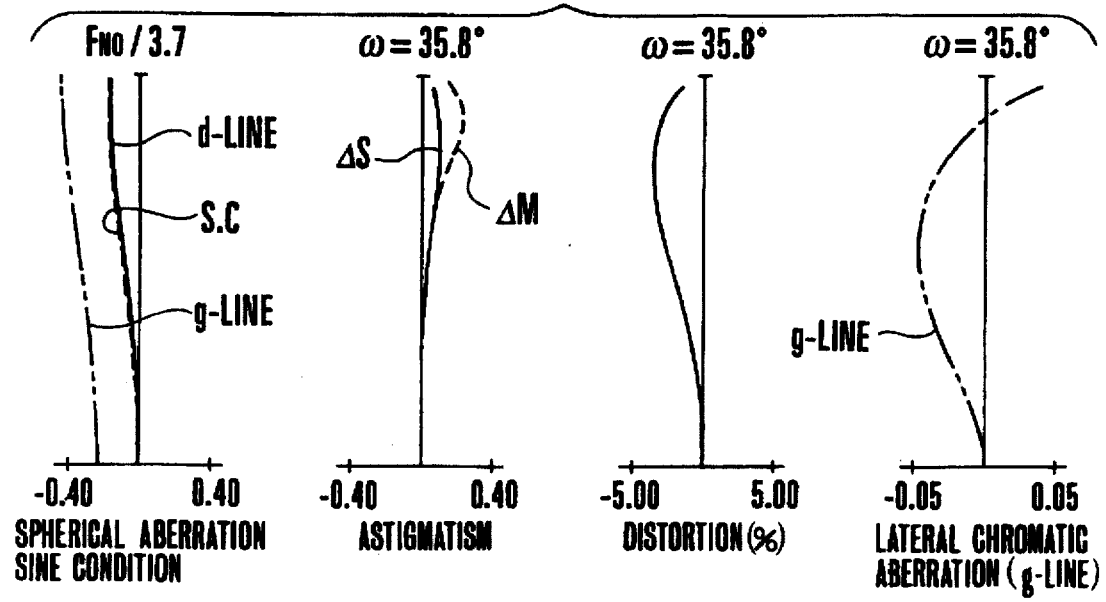
FIGS. 26(A), 26(B) and 26(C) are graphs of the various aberrations of the numerical example 11 of the invention.
Figure 26B:
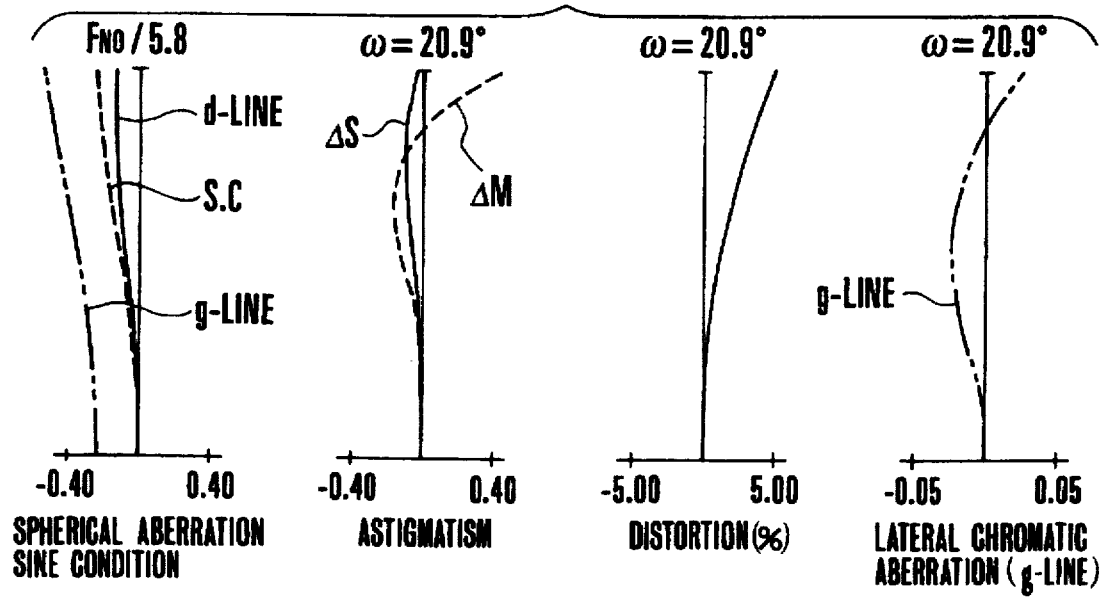
Figure 26C:
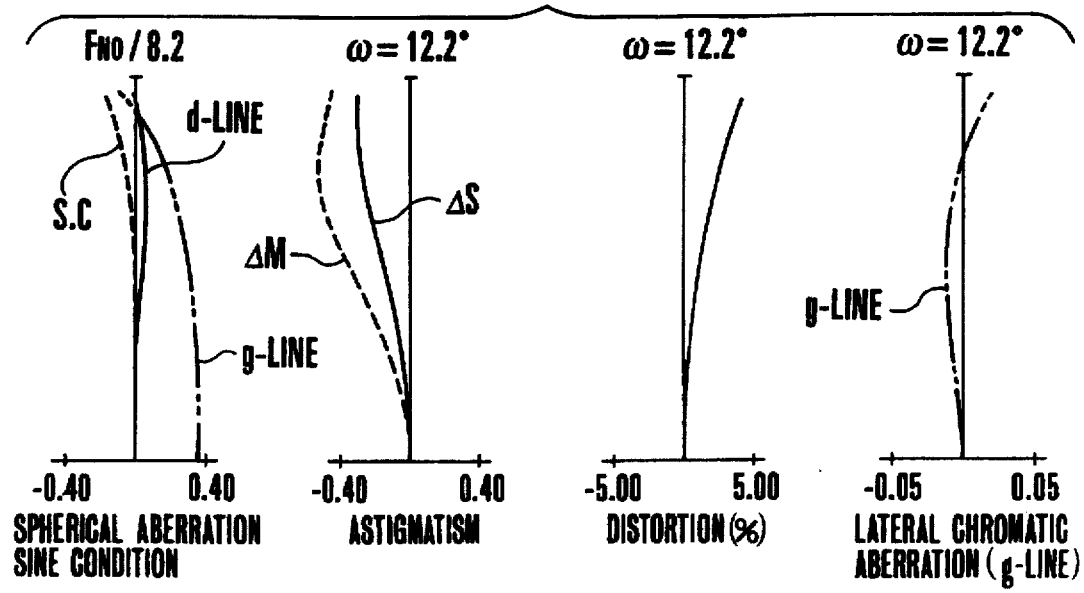
Figure 27A:
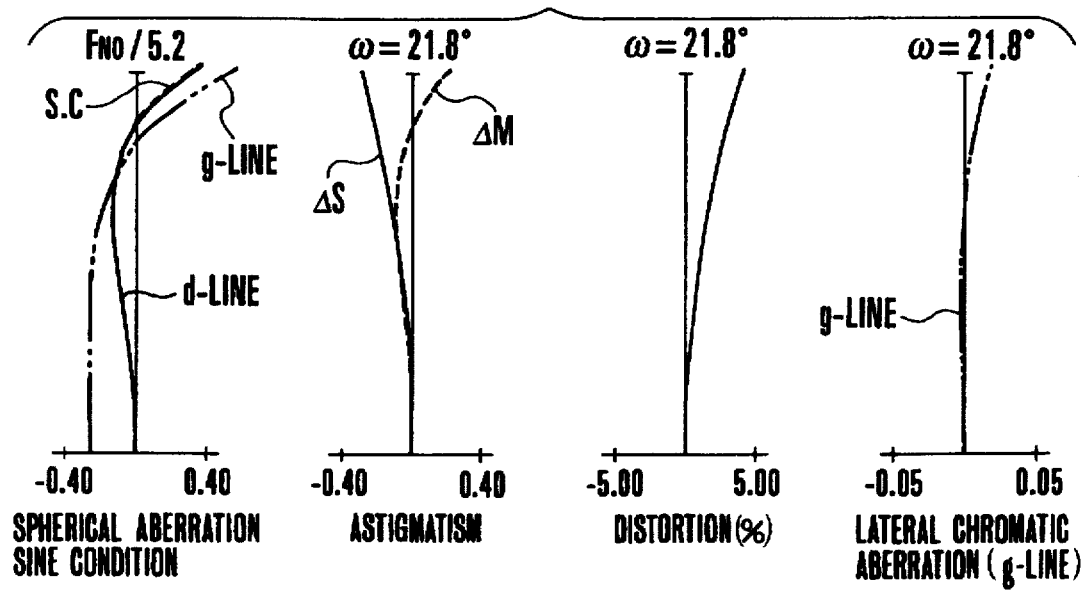
FIGS. 27(A), 27(B) and 27(C) are graphs of the various aberrations of the numerical example 12 of the invention.
Figure 27B:
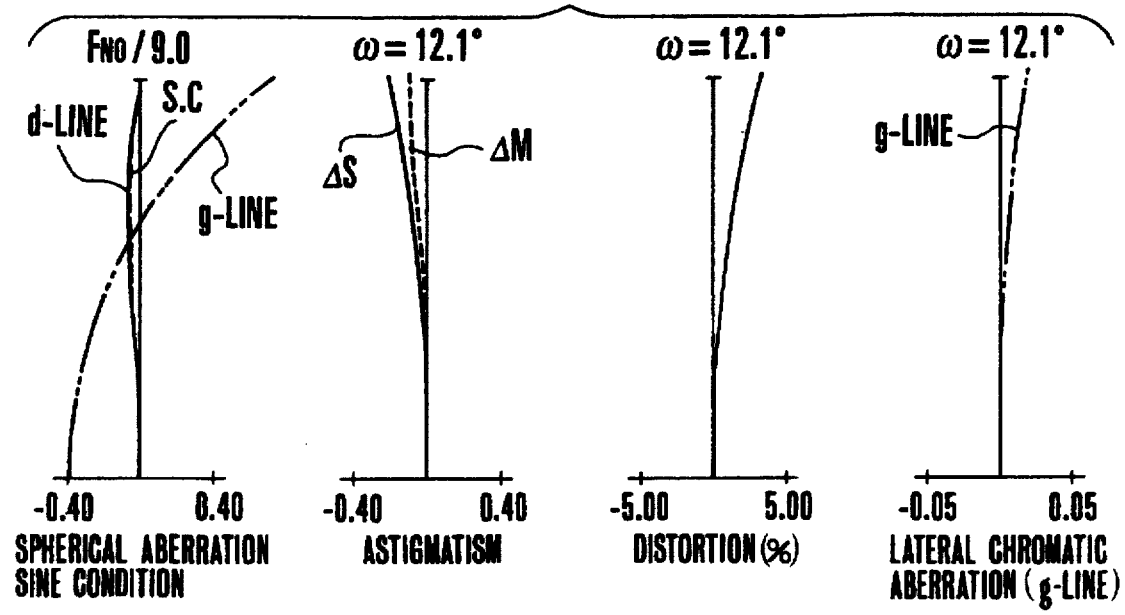
Figure 27C:
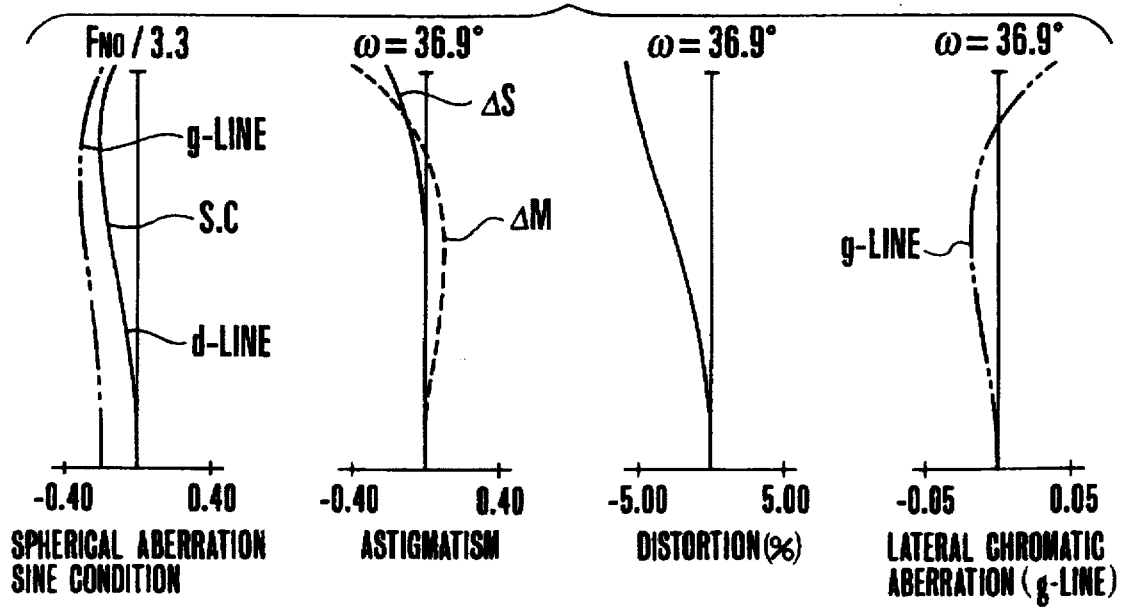

FIG. 1, FIG. 2 and FIG. 3 show examples of an embodiment of zoom lenses according to the invention. In FIGS. 1 to 3, the paraxial refractive power arrangement varies with zooming from the wide angle end W to the telephoto end T. FIG. 4 through FIG. 15 are longitudinal section views of numerical examples 1 to 12 of zoom lenses of the invention in the wide angle end respectively.

FIGS. 16(A), 16(B) and 16(C) through FIGS. 27(A), 27(B) and 27(C) are graphic representations of the various aberrations of the numerical examples 1 to 12 respectively. Of these graphs, the ones whose figure numbers are suffixed (A) are in the wide angle, the ones (B) in an intermediate position and the ones (C) in the telephoto end.

In the drawings, the lens system comprises a front lens group LF of positive refractive power and a rear lens group LR. Reference character SP stands for a stop and reference character IP for an image plane. Reference character Li (i=1–5) denotes the i-th lens unit, when counted from the object side. The arrows indicate the directions to which the lens units move when zooming from the wide angle end W to the telephoto end T.

The front lens group LF has a first lens unit L1, a second lens unit L2 and a third lens unit L3, thus including at least three lens units. Their refractive powers, when in the wide angle end, are combined to be positive. The rear lens group LR has a fourth lens unit L4 of positive refractive power and a fifth lens unit L5 of negative refractive power, totaling two lens units.

As zooming from the wide angle end to the telephoto end, the first, second and third lens units move in such relation as to vary each other's separations so that the overall refractive power of the front lens group is weaker when in the telephoto end than when in the wide angle end, while simultaneously moving the fourth and fifth lens units in such relation that their separation narrows.

Another feature of the present embodiment is that the combined refractive power of the first and second lens units in the wide angle end is negative and the refractive power of the third lens unit is positive. Again, the fourth lens unit moves forward to effect focusing to suit from an infinitely distance object to a close object.

In the zoom lens of the present embodiment, the focal length f of the entire lens system is expressed by the following equation:

$$f = fA \cdot \beta 4 \cdot \beta 5 \quad (\beta 4 > 0, \beta 5 > 0) \tag{a}$$

where fA is the overall focal length of the front lens group and βi is the lateral magnification of the i-th lens unit.

In the present embodiment, as is understandable from the equation (a), to vary the focal length, the magnifications β4 and β5 are made to have large values and at the same time the front lens group is made to have a long overall focal length fA, (to weaken the overall refractive power). This permits the function of varying the focal length to operate with an improved efficiency. Also, the separation between the fourth lens unit of positive power and the fifth lens unit of negative power is made to decrease when zooming goes from the wide angle end to the telephoto end. This gives the fifth lens unit an effect of varying the focal length. With the help of these features, the great increase of the zoom ratio is achieved with ease.

In particular, the present embodiment aims at widening the field angle to such extent that the shortest focal length of the entire system is smaller than the diagonal length of the image format. To this purpose, the paraxial refractive power arrangements shown in FIGS. 1 to 3 are adopted.

Specifically speaking, in the example of FIG. 1, the front lens group comprises a first lens unit of negative refractive power, a second lens unit of positive refractive power and a third lens unit of positive refractive power, wherein when zooming from the wide angle end to the telephoto end, all these lens units move axially in such relation that the separation between the first and second lens units decreases and the separation between the second and third lens units increases.

In the example of FIG. 2, the front lens group comprises a first lens unit of negative refractive power, a second lens unit of negative refractive power and a third lens unit of positive refractive power, wherein when zooming from the wide angle end to the telephoto end, all these lens units move axially in such relation that the separation between the first and second lens units increases and the separation between the second and third lens units decreases.

In the example of FIG. 3, the front lens group comprises a first lens unit of positive refractive power, a second lens unit of negative refractive power and a third lens unit of positive refractive power, wherein when zooming from the wide angle end to the telephoto end, all these lens units move axially in such relation that the separation between the first and second lens units increases and the separation between the second and third lens units decreases.

In connection with each of the examples of FIGS. 1 to 3, it should be noted that the first and third lens units are moved in unison for the purpose of simplifying the operating mechanism. They may otherwise be moved in differential relation as will be described later in connection with the numerical example 12. In this, the degree of freedom of the design can be increased.

The zoom lens of the invention is then constructed by setting forth additional conditions. Letting the focal length of the i-th lens unit, when counted from the object side, be denoted by fi, the shortest focal length of the entire lens system by fW, and the lateral magnification of the i-th lens unit in the wide angle end with an object at infinity by βiW, $$0.5 < |f5|/fW < 1.5 \tag{1}$$

$$1.1 < \beta 5W < 1.7 \tag{2}$$

are satisfied.

In the present embodiment, with the zoom lens of the character described above, when the conditions (1) and (2) are satisfied, the size of the entire lens system is minimized in such a manner as to obtain a high optical performance throughout the entire zooming range.

The technical significance of each of the above-described conditions is explained below.

The inequalities of condition (1) are concerned with the negative refractive power of the fifth lens unit and have an aim chiefly to improve the effect of varying the focal length. When the upper limit of the condition (1) is exceeded, as this implies that the negative refractive power of the fifth lens unit is too weak, the zooming movement of this lens unit contributes to a weak variation of the focal length. As a result, the movement of each of the other lens units must be increased to obtain the predetermined zoom ratio. Hence, the total length of the lens system is caused to increase largely.

When the lower limit of the condition (1) is exceeded, the lens system when in the wide angle end behaves to function too strongly as the telephoto type, since the overall refractive power of the first to the fourth lens units is positive and the refractive power of the fifth lens unit is negative.

From this reason, the lens system gets too short of a back focal distance. Such a result invites a large increase of the outer diameter of the fifth lens unit to secure the corner illumination at a predetermined level. In turn, because the fifth lens unit takes too much strong a refractive power, field curvature and astigmatism of higher orders are produced, which are difficult to correct well.

The inequalities of condition (2) are concerned with the lateral magnification of the fifth lens unit in the wide angle end.

Now, we have an equation for the back focal distance BfW of the lens system when in the wide angle end, as expressed by $$BfW = f5 \cdot (1 - \beta 5W)$$

In the present embodiment, therefore, along with the condition (1), by defining a proper range for the factor in the condition (2), a good compromise is made between the reduction of the total length of the entire lens system and the correction of all aberrations.

When the upper limit of the condition (2) is exceeded, as this implies that the back focal distance becomes longer than necessary, the entire lens system gets a total length so increased as not to favor the achievement of an improved compact form. When the lower limit is exceeded, on the other hand, the back focal distance is hard to be maintained at a positive value. Therefore, the fifth lens unit can no longer be formed and arranged without stress. So, it becomes impossible to correct the aberrations well.

To achieve a valuable increase of the maximum image angle in such a manner that the variation with zooming of the aberrations is limited to a minimum, while still permitting high optical performance to be secured over the entire area of the image frame, it is preferred to design each lens unit as follows:

(i) The numerical values of the factors in above-described conditions (1) and (2) preferably fall within the following range:

$$0.45 < f5 \cdot (1 - \beta 5W)/fW < 0.2 \qquad (3)$$

When either of the upper and lower limits of the condition (3) is exceeded, no good balance can be taken between the compactness of the lens system and the stability of the optical performance.

(ii) The zoom lens of the present embodiment may be considered to comprise the front component and the rear component or to be the 2-component zoom lens. If so, we get an equation for the overall refractive power $\phi 12$ or overall focal length $f12$ of the entire lens system, given by the following expression:

$$\phi 12 = 1/f12 = \phi 1 + \phi 2 - \phi 1 \cdot \phi 2 \cdot e \qquad (b)$$

where $\phi i$ is the refractive power of the i-th lens group and e is the interval between the principal points of the first and second lens groups.

The equation (b) teaches that if the front lens group and the rear lens group, when in the wide angle end, take somewhat strong positive refractive powers, all that needs to shorten the focal length $f12$ is only make small the principal point interval "e". But, the principal point interval "e" cannot be made small as desired without limit, because the front and rear lens groups should not mechanically interfere with each other at their confronting lens surfaces.

On this account, in the present embodiment, for the wide angle end, the overall refractive power of the first and second lens units in the front lens group is made negative. These lens units are followed after an appreciable distance by the third lens unit of positive refractive power. With the help of such a lens arrangement, the front lens group takes, as a whole, the form of the retrofocus type, thereby bringing its rear principal point further to the image side. Under this condition, the principal point interval "e" is minimized. Thus, the desired increase of the maximum field angle is achieved with the prevention of the mechanical interference of the confronting lens surfaces mentioned above.

Another advantage arising from the front lens group taking the retrofocus type is that, as the entrance pupil is placed nearer to the image plane, the lens system whole approaches a symmetrical type, thus assisting in good correction of aberrations in the wide angle region. Also because the third and fourth lens units both have positive refractive powers, it is advantageous that, as is seen from the equation (b), the third and fourth lens units are made to move away from each other when zooming from the wide angle end to the telephoto end, thus enhancing the efficiency of variation of the focal length.

Further, if to desire a high range, compact optical system, it is recommended that all the lens units in the front lens group take more front positions when in the telephoto end when than in the wide angle end, for any two of these lens units are prevented from interfering with each other, when the efficiency with which the front and rear lens groups vary the focal length is improved.

(iii) It is preferred to satisfy the following conditions:

$$0.2 < fW \cdot \phi_{123W} < 1.0 \qquad (4)$$

$$0.6 < f3/fW < 2.2 \qquad (5)$$

where $\phi_{123W}$ is the overall refractive power for the wide angle end of the front lens group.

The inequalities of condition (4) are concerned with the refractive power of the front lens group. When the upper limit of the condition (4) is exceeded, as this implies that the refractive power of the front lens group in the wide angle end is so strong that the entire system functions as a strong telephoto system, it becomes difficult to obtain a positive value of the back focal distance. At the same time, the front lens group produces large spherical aberration in a direction to be under-corrected, which is difficult to correct by any design of the other lens units. When the lower limit is exceeded, the entire system gets a long total length. At the same time, the shortest focal length has to be retained at the desired value by strengthening the positive refractive power of the rear lens group. Because of this, it becomes difficult to get a good balance of all aberrations throughout the entire zooming range.

The inequalities of condition (5) are concerned with the positive refractive power of the third lens unit. When the upper limit of the condition (5) is exceeded, the refractive power of the third lens unit becomes weak. Therefore, the total zooming movement of this lens unit increases to increase the size of the lens system. When the lower limit is exceeded, the third lens unit produces strong spherical aberrations of higher order, which are difficult to correct.

In the present embodiment, particularly for the wide angle end, a shortening of the total length of the entire lens system is achieved. Nonetheless the optical performance has to be improved. To this purpose, it is better to alter the upper and lower limits of the above-described conditions (4) and (5) as follows:

$$0.35 < fW \cdot \phi_{123W} < 0.85 \qquad (4a)$$

$$0.8 < f3/fW < 1.9 \qquad (5a)$$

(iv) Letting the focal length of the i-th lens unit be denoted by fi and the lateral magnification of the i-th lens unit in the wide angle end by β1W, it is preferred to satisfy the following conditions:

$$0.8 < \phi 4/fW < 1.6 \quad (6)$$

$$0.25 < \beta 4W < 0.65 \quad (7)$$

The inequalities of condition (6) are concerned with the refractive power of the fourth lens unit in the wide angle end. When the upper limit of the condition (6) is exceeded, the fourth lens unit gets a weak refractive power. To obtain the predetermined value of the shortest focal length, the negative lens units may be weakened in refractive power. In this case, the entire system gets a longer total length. For another case, the positive lens units in the front lens group are strengthened in refractive power. This causes production of spherical aberrations of higher order when in the telephoto end, which are difficult to correct. When the refractive power of the fourth lens unit is too strong as exceeding the lower limit, the fourth and fifth lens units function as too strong a telephoto type. In some case, the back focal distance is hardly obtained. In other cases, the fourth lens unit produces large aberrations, which are difficult to correct by any design of the other lens units.

The inequalities of condition (7) are concerned with the lateral magnification for the wide angle end of the fourth lens unit. When the upper limit of the condition (7) is exceeded, the back focal distance is hardly reached in the wide angle end. As a result, a considerable increase of the outer diameter of the fourth lens unit is invited. When the lower limit is exceeded, the other lens units get stronger refractive powers to obtain the predetermined focal length. The resultant variation with zooming of aberrations is, therefore, difficult to correct.

(v) The fourth lens unit of positive refractive power includes at least one positive and at least one negative lenses. These lenses are better formed to such shapes that the frontmost lens surface is of concave curvature toward the object side, and the rearmost lens surface is of convex curvature toward the image side. It is also desirable to introduce an aspheric sphere into the rearmost lens surface. If so, the variation with zooming of the aberrations and the image aberrations over the entire area of the image frame can be easily corrected well.

(vi) The fifth lens unit of negative refractive power includes at least one negative and at least one positive lenses having concave surfaces facing the object side. Letting the mean value of the Abbe numbers of the positive lenses in the fifth lens unit be denoted by ν5P and the mean value of the Abbe numbers of the negative lenses in the fifth lens unit by ν5N, it is preferred to satisfy the following condition:

$$12 < \nu 5N - \nu P < 35 \quad (8)$$

When either of the upper and lower limits of the condition (8) is violated, chromatic aberrations vary to a large extent with zooming, which is difficult to correct by the other lens units.

(vii) The stop is preferably positioned in one of the air spaces between the rearmost lens surfaces of the third and fourth lens units, for the entrance pupil can take an appropriate position to advantageously suppress the variation of aberrations with zooming. Further, the stop moves axially either in differential relation to the other lens units or in unison with one of the other lens units. This makes it possible to keep the stop in the neighborhood of the entrance pupil that axially moves with zooming, which is advantageous at preventing variation of curvature of field from occurring when the stop has a small aperture.

Assuming that the stop takes its place within the fourth lens unit and focusing is performed by the fourth lens unit, then the stop is made to remain axially stationary during focusing. This is advantageous at reducing the drive torque for the focusing lens unit by an amount which would otherwise be necessary to move the diaphragm mechanism.

(viii) The fourth lens unit is preferably divided into two or more parts which move axially in differential relation to each other when zooming or focusing, because the variation of the aberrations with zooming or focusing can be lessened.

(ix) In the present embodiment, for the focusing purposes, the fourth lens unit is used as a rule. In this case, it moves forward as the object distance decreases from infinity to a minimum. It is, of course, possible to use any other lens unit or units. For example, the front lens group may be moved forward. Even in this case, good results are effected.

Another example of modification is that if the back focal distance is long enough in the wide angle end, focusing may be performed by moving the fifth lens unit toward the image side. In this case, an advantage is produced that reduces the outer diameter of the first lens unit. Again, two or more of the first to the fifth lens units may otherwise be moved simultaneously to effect focusing.

Next, numerical examples 1 to 12 of the invention are shown. In the numerical data for the examples 1 to 12, Ri is the radius of curvature of the i-th lens surface, when counted from the object side, Di is the i-th axial lens thickness or air separation, and Ni and νi are respectively the refractive index and Abbe number of the glass of the i-th lens element.

The values of the factors in the above-described conditions for the numerical examples 1 to 12 are listed in Table-1.

The shape of an aspheric surface is expressed in the coordinates with an X axis in the axial direction and an H axis in the perpendicular direction to the optical axis, the direction in which light advances being taken as positive, by the following equation:

$$X = (1 - R)H^2/(1 + \sqrt{1 - (1+k)(H/R)^2}) + AH^2 + BH^4 + CH^6 + DH^8 + EH^{10}$$

where R is the radius of the osculating sphere and A, B, C, D and E are the aspheric coefficients.

NUMERICAL EXAMPLE 1

| f = 28.84~101.48 | Fno = 1:3.6~8.2 | 2ω = 73.8°~24.1° | |
|---|---|---|---|
| R1 = −107.63 | D1 = 1.30 | N1 = 1.80400 | ν1 = 46.6 |
| R2 = 29.11 | D2 = 3.50 | N2 = 1.80518 | ν2 = 25.4 |
| R3 = 188.37 | D3 = 0.38 | | |
| R4 = 248.08 | D4 = 1.10 | N3 = 1.60342 | ν3 = 38.0 |
| R5 = 33.55 | D5 = Variable | | |
| R6 = 33.40 | D6 = 1.00 | N4 = 1.84666 | ν4 = 23.8 |
| R7 = 19.67 | D7 = 2.70 | N5 = 1.48749 | ν5 = 70.2 |
| R8 = −176.19 | D8 = Variable | | |
| R9 = 29.75 | D9 = 2.80 | N6 = 1.56873 | ν6 = 63.2 |
| R10 = −53.64 | D10 = Variable | | |
| R11 = −19.54 | D11 = 0.87 | N7 = 1.64769 | ν7 = 33.8 |
| R12 = −93.56 | D12 = 1.00 | | |
| R13 = (Stop) | D13 = 1.00 | | |
| R14 = −57.06 | D14 = 0.78 | N8 = 1.48749 | ν8 = 70.2 |
| R15 = 36.54 | D15 = 2.10 | N9 = 1.84666 | ν9 = 23.8 |

-continued

| | | | |
|---|---|---|---|
| R16 = −45.52 | D16 = 4.85 | | |
| R17 = 34.65 | D17 = 1.10 | N10 = 1.84666 | ν10 = 23.8 |
| R18 = 12.82 | D18 = 5.50 | N11 = 1.58313 | ν11 = 59.4 |
| R19 = −23.25 | D19 = Variable | | |
| R20 = −33.52 | D20 = 3.00 | N12 = 1.84666 | ν12 = 23.8 |
| R21 = −17.94 | D21 = 0.15 | | |
| R22 = −20.79 | D22 = 1.30 | N13 = 1.83481 | ν13 = 42.7 |
| R23 = −171.17 | D23 = 4.39 | | |
| R24 = −17.91 | D24 = 1.50 | N14 = 1.78590 | 14 = 44.2 |
| R25 = −73.32 | | | |

Aspheric Coefficient: R19

| K = −3.37 × 10⁻¹ | A = 0 | B = 1.15 × 10⁻⁵ |
|---|---|---|
| C = −2.60 × 10⁻⁸ | D = −2.60 × 10⁻¹⁰ | E = 0 |

| Variable | Focal Length | | |
|---|---|---|---|
| Separation | 28.84 | 53.76 | 101.48 |
| D5 | 8.23 | 4.52 | 0.96 |
| D8 | 0.80 | 4.51 | 8.07 |
| D10 | 2.60 | 11.64 | 21.21 |
| D19 | 12.21 | 5.69 | 0.79 |

NUMERICAL EXAMPLE 2 f = 29.25–101.00   Fno = 1:3.6–8.2   2ω = 73.0°–24.2°

| | | | |
|---|---|---|---|
| R1 = −136.48 | D1 = 1.30 | N1 = 1.80400 | ν1 = 46.6 |
| R2 = 44.39 | D2 = 0.41 | | |
| R3 = 53.68 | D3 = 3.00 | N2 = 1.80518 | ν2 = 25.4 |
| R4 = −226.68 | D4 = 1.10 | N3 = 1.66998 | ν3 = 39.3 |
| R5 = 35.15 | D5 = Variable | | |
| R6 = 36.05 | D6 = 1.00 | N4 = 1.84666 | ν4 = 23.8 |
| R7 = 22.91 | D7 = 2.70 | N5 = 1.48749 | ν5 = 70.2 |
| R8 = −148.68 | D8 = Variable | | |
| R9 = 29.98 | D9 = 2.80 | N6 = 1.56873 | ν6 = 63.2 |
| R10 = −61.97 | D10 = Variable | | |
| R11 = −20.25 | D11 = 0.87 | N7 = 1.64769 | ν7 = 33.8 |
| R12 = −96.09 | D12 = 1.00 | | |
| R13 = (Stop) | D13 = 1.00 | | |
| R14 = −49.89 | D14 = 0.78 | N8 = 1.48749 | ν8 = 70.2 |
| R15 = 41.40 | D15 = 2.10 | N9 = 1.84666 | ν9 = 23.8 |
| R16 = −42.55 | D16 = 5.60 | | |
| R17 = 31.32 | D17 = 1.10 | N10 = 1.84666 | ν10 = 23.8 |
| R18 = 12.25 | D18 = 5.50 | N11 = 1.58313 | ν11 = 59.4 |
| R19 = −25.47 | D19 = Variable | | |
| R20 = −31.70 | D20 = 3.50 | N12 = 1.84666 | ν12 = 23.8 |
| R21 = −17.94 | D21 = 0.20 | | |
| R22 = −22.10 | D22 = 1.30 | N13 = 1.80610 | ν13 = 41.0 |
| R23 = −317.84 | D23 = 4.89 | | |
| R24 = −18.10 | D24 = 1.50 | N14 = 1.78590 | ν14 = 44.2 |
| R25 = −63.65 | | | |

Aspheric Coefficient: R19

| K = −1.81 × 10⁻¹ | A = 0 | B = 8.60 × 10⁻⁶ |
|---|---|---|
| C = 9.07 × 10⁻⁸ | D = −1.91 × 10⁻⁹ | E = 0 |

| Variable | Focal Length | | |
|---|---|---|---|
| Separation | 29.25 | 54.30 | 101.00 |
| D5 | 8.06 | 4.58 | 0.94 |
| D8 | 0.80 | 4.28 | 7.92 |
| D10 | 2.60 | 11.52 | 20.99 |
| D19 | 12.31 | 5.61 | 0.92 |

NUMERICAL EXAMPLE 3 f = 35.00–110.00   Fno = 1:3.7–8.2   2ω = 63.4°–22.3°

| | | | |
|---|---|---|---|
| R1 = −112.16 | D1 = 1.30 | N1 = 1.80400 | ν1 = 46.6 |
| R2 = 139.61 | D2 = 0.41 | | |
| R3 = 163.84 | D3 = 3.00 | N2 = 1.80518 | ν2 = 25.4 |
| R4 = −107.84 | D4 = 1.10 | N3 = 1.66998 | ν3 = 39.3 |
| R5 = 76.56 | D5 = Variable | | |
| R6 = 36.05 | D6 = 1.00 | N4 = 1.84666 | ν4 = 23.8 |
| R7 = 25.55 | D7 = 3.80 | N5 = 1.48749 | ν5 = 70.2 |
| R8 = −389.95 | D8 = Variable | | |
| R9 = 45.54 | D9 = 3.20 | N6 = 1.56873 | ν6 = 63.2 |
| R10 = −160.77 | D10 = Variable | | |
| R11 = (Stop) | D11 = 1.30 | | |
| R12 = −20.88 | D12 = 0.87 | N7 = 1.64769 | ν7 = 33.8 |
| R13 = −233.98 | D13 = 2.00 | | |
| R14 = −159.29 | D14 = 0.78 | N8 = 1.48749 | ν8 = 70.2 |
| R15 = 46.64 | D15 = 2.10 | N9 = 1.84666 | ν9 = 23.8 |
| R16 = −49.54 | D16 = 5.60 | | |
| R17 = 35.02 | D17 = 1.10 | N10 = 1.84666 | 10 = 23.8 |
| R18 = 14.70 | D18 = 5.50 | N11 = 1.58313 | ν11 = 59.4 |
| R19 = −28.48 | D19 = Variable | | |
| R20 = −19.90 | D20 = 3.50 | N12 = 1.84666 | ν12 = 23.8 |
| R21 = −17.24 | D21 = 4.50 | | |
| R22 = −16.95 | D22 = 1.50 | N13 = 1.77250 | ν13 = 49.6 |
| R23 = 483.96 | | | |

Aspheric Coefficient: R19

| K = 8.88 × 10⁻¹ | A = 0 | B = 1.21 × 10⁻⁵ |
|---|---|---|
| C = 1.06 × 10⁻⁷ | D = −1.47 × 10⁻⁹ | E = 0 |

Aspheric Coefficient: R22

| K = 0 | A = 0 | B = 8.13 × 10⁻⁶ |
|---|---|---|
| C = 2.25 × 10⁻⁸ | D = −1.09 × 10⁻¹¹ | E = 0 |

| Variable | Focal Length | | |
|---|---|---|---|
| Separation | 35.00 | 61.62 | 110.00 |
| D5 | 5.67 | 3.16 | 0.90 |
| D8 | 0.94 | 3.45 | 5.71 |
| D10 | 1.75 | 18.58 | 21.90 |
| D19 | 16.96 | 8.39 | 2.47 |

NUMERICAL EXAMPLE 4 f = 35.00–110.12   Fno = 1:3.7–8.2   2ω = 63.4°–22.2°

| | | | |
|---|---|---|---|
| R1 = −209.03 | D1 = 1.30 | N1 = 1.80400 | ν1 = 46.6 |
| R2 = 127.91 | D2 = 0.41 | | |
| R3 = 143.81 | D3 = 3.00 | N2 = 1.80518 | ν2 = 25.4 |
| R4 = −90.07 | D4 = 1.10 | N3 = 1.66998 | ν3 = 39.3 |
| R5 = 50.47 | D5 = Variable | | |
| R6 = 36.53 | D6 = 1.00 | N4 = 1.84666 | ν4 = 23.8 |
| R7 = 25.31 | D7 = 3.80 | N5 = 1.48749 | ν5 = 70.2 |
| R8 = −1105.62 | D8 = Variable | | |
| R9 = 36.04 | D9 = 3.20 | N6 = 1.56873 | ν6 = 63.2 |
| R10 = −160.41 | D10 = Variable | | |
| R11 = (Stop) | D11 = 1.30 | | |
| R12 = −21.36 | D12 = 0.87 | N7 = 1.64769 | ν7 = 33.8 |
| R13 = −289.38 | D13 = 2.00 | | |
| R14 = −78.97 | D14 = 0.78 | N8 = 1.48749 | ν8 = 70.2 |
| R15 = 46.97 | D15 = 2.10 | N9 = 1.84666 | ν9 = 23.8 |
| R16 = −48.67 | D16 = 5.60 | | |
| R17 = 32.95 | D17 = 1.10 | N10 = 1.84666 | ν10 = 23.8 |
| R18 = 14.36 | D18 = 5.50 | N11 = 1.58313 | ν11 = 59.4 |
| R19 = −27.03 | D19 = Variable | | |
| R20 = −30.81 | D20 = 3.50 | N12 = 1.84666 | ν12 = 23.8 |
| R21 = −19.27 | D21 = 0.20 | | |

-continued

| | | | |
|---|---|---|---|
| R22 = −30.53 | D22 = 1.30 | N13 = 1.80610 | ν13 = 41.0 |
| R23 = −115.65 | D23 = 4.89 | | |
| R24 = −18.03 | D24 = 1.50 | N14 = 1.78590 | ν14 = 44.2 |
| R25 = −118.71 | | | |

Aspheric Coefficient: R19

| | | |
|---|---|---|
| K = 3.77 × 10$^{-1}$ | A = 0 | B = 1.57 × 10$^{-5}$ |
| C = 3.17 × 10$^{-8}$ | D = −8.36 × 10$^{-10}$ | E = 0 |

| Variable | Focal Length | | |
|---|---|---|---|
| Separation | 35.00 | 62.65 | 110.12 |
| D5 | 6.86 | 3.28 | 0.94 |
| D8 | 0.93 | 4.50 | 6.85 |
| D10 | 2.26 | 19.08 | 23.81 |
| D19 | 15.29 | 6.95 | 1.24 |

NUMERICAL EXAMPLE 5 f = 28.84~89.41   Fno = 1:3.8~8.2   2ω = 73.8°~27.2°

| | | | |
|---|---|---|---|
| R1 = −217.48 | D1 = 2.00 | N1 = 1.80518 | ν1 = 25.4 |
| R2 = −103.00 | D2 = 1.20 | N2 = 1.69680 | ν2 = 55.5 |
| R3 = 48.69 | D3 = Variable | | |
| R4 = 154.19 | D4 = 1.30 | N3 = 1.65844 | ν3 = 50.9 |
| R5 = 37.47 | D5 = Variable | | |
| R6 = 29.87 | D6 = 1.00 | N4 = 1.84666 | ν4 = 23.8 |
| R7 = 23.19 | D7 = 2.90 | N5 = 1.48749 | ν5 = 70.2 |
| R8 = −101.43 | D8 = 0.30 | | |
| R9 = 33.35 | D9 = 2.30 | N6 = 1.60311 | ν6 = 60.7 |
| R10 = −173.29 | D10 = Variable | | |
| R11 = −17.33 | D11 = 0.87 | N7 = 1.64769 | ν7 = 33.8 |
| R12 = −64.01 | D12 = 1.00 | | |
| R13 = (Stop) | D13 = 1.00 | | |
| R14 = −1012.52 | D14 = 0.70 | N8 = 1.48749 | ν8 = 70.2 |
| R15 = 39.15 | D15 = 1.80 | N9 = 1.84666 | ν9 = 23.8 |
| R16 = −37.96 | D16 = 5.17 | | |
| R17 = 40.91 | D17 = 1.10 | N10 = 1.84666 | ν10 = 23.8 |
| R18 = 11.63 | D18 = 5.60 | N11 = 1.58313 | ν11 = 59.4 |
| R19 = −23.69 | D19 = Variable | | |
| R20 = −29.78 | D20 = 3.60 | N12 = 1.84666 | ν12 = 23.8 |
| R21 = −18.07 | D21 = 0.20 | | |
| R22 = −22.10 | D22 = 1.30 | N13 = 1.74320 | ν13 = 49.3 |
| R23 = 634.28 | D23 = 4.38 | | |
| R24 = −22.75 | D24 = 1.50 | N14 = 1.72916 | ν14 = 54.7 |
| R25 = −113.54 | | | |

Aspheric Coefficient: R19

| | | |
|---|---|---|
| K = −1.96 × 10$^{-1}$ | A = 0 | B = 1.09 × 10$^{-5}$ |
| C = 8.05 × 10$^{-8}$ | D = −2.53 × 10$^{-9}$ | E = 0 |

| Variable | Focal Length | | |
|---|---|---|---|
| Separation | 28.84 | 50.48 | 89.41 |
| D3 | 1.53 | 4.05 | 6.28 |
| D5 | 5.87 | 3.35 | 1.12 |
| D10 | 2.60 | 11.33 | 24.44 |
| D20 | 11.67 | 5.58 | 1.12 |

NUMERICAL EXAMPLE 6 f = 30.43~100.00   Fno = 1:3.7~8.2   2ω = 70.8°~24.4°

| | | | |
|---|---|---|---|
| R1 = −677.46 | D1 = 2.00 | N1 = 1.80518 | ν1 = 25.4 |
| R2 = −69.17 | D2 = 1.20 | N2 = 1.69680 | ν2 = 55.5 |
| R3 = 63.43 | D3 = Variable | | |
| R4 = 3704.92 | D4 = 1.30 | N3 = 1.65844 | ν3 = 50.9 |
| R5 = 45.60 | D5 = Variable | | |
| R6 = 32.60 | D6 = 1.00 | N4 = 1.84666 | ν4 = 23.8 |
| R7 = 22.08 | D7 = 3.20 | N5 = 1.48749 | ν5 = 70.2 |
| R8 = −224.31 | D8 = 0.30 | | |
| R9 = 36.51 | D9 = 2.70 | N6 = 1.60311 | ν6 = 60.7 |
| R10 = −122.67 | D10 = Variable | | |
| R11 = (Stop) | D11 = Variable | | |
| R12 = −17.93 | D12 = 0.87 | N7 = 1.64769 | ν7 = 33.8 |
| R13 = −71.56 | D13 = 2.00 | | |
| R14 = −228.00 | D14 = 0.70 | N8 = 1.48749 | ν8 = 70.2 |
| R15 = 44.17 | D15 = 1.80 | N9 = 1.84666 | ν9 = 23.8 |
| R16 = −46.21 | D16 = 5.17 | | |
| R17 = 39.16 | D17 = 1.10 | N10 = 1.84666 | ν10 = 23.8 |
| R18 = 13.54 | D18 = 5.60 | N11 = 1.58313 | ν11 = 59.4 |
| R19 = −22.09 | D19 = Variable | | |
| R20 = −36.36 | D20 = 3.60 | N12 = 1.84666 | ν12 = 23.8 |
| R21 = −18.73 | D21 = 0.20 | | |
| R22 = −22.97 | D22 = 1.30 | N13 = 1.78590 | ν13 = 44.2 |
| R23 = −161.56 | D23 = 4.50 | | |
| R24 = −18.57 | D24 = 1.50 | N14 = 1.72916 | ν14 = 54.7 |
| R25 = −232.78 | | | |

Aspheric Coefficient: R19

| | | |
|---|---|---|
| K = −3.97 × 10$^{-1}$ | A = 0 | B = 1.18 × 10$^{-5}$ |
| C = 7.44 × 10$^{-8}$ | D = −1.47 × 10$^{-9}$ | E = 0 |

| Variable | Focal Length | | |
|---|---|---|---|
| Separation | 30.43 | 55.51 | 100.00 |
| D3 | 1.50 | 1.50 | 4.73 |
| D5 | 7.34 | 7.34 | 4.11 |
| D10 | 2.58 | 9.48 | 21.60 |
| D11 | 1.70 | 5.52 | 7.12 |
| D19 | 12.55 | 4.96 | 0.80 |

NUMERICAL EXAMPLE 7 f = 30.00~100.00   Fno = 1:3.6~8.2   2ω = 71.6°~24.4°

| | | | |
|---|---|---|---|
| R1 = −228.47 | D1 = 2.00 | N1 = 1.80518 | ν1 = 25.4 |
| R2 = −61.62 | D2 = 1.20 | N2 = 1.69680 | ν2 = 55.5 |
| R3 = 60.27 | D3 = Variable | | |
| R4 = 300.46 | D4 = 1.30 | N3 = 1.65844 | ν3 = 50.9 |
| R5 = 47.91 | D5 = Variable | | |
| R6 = 32.90 | D6 = 1.00 | N4 = 1.84666 | ν4 = 23.8 |
| R7 = 22.76 | D7 = 3.20 | N5 = 1.48749 | ν5 = 70.2 |
| R8 = −264.26 | D8 = 0.30 | | |
| R9 = 34.66 | D9 = 2.50 | N6 = 1.60311 | ν6 = 60.7 |
| R10 = −148.49 | D10 = Variable | | |
| R11 = (Stop) | D11 = 1.70 | | |
| R12 = −18.05 | D12 = 0.87 | N7 = 1.64769 | ν7 = 33.8 |
| R13 = −63.03 | D13 = 2.00 | | |
| R14 = −167.30 | D14 = 0.70 | N8 = 1.48749 | ν8 = 70.2 |
| R15 = 46.92 | D15 = 1.80 | N9 = 1.84666 | ν9 = 23.8 |
| R16 = −49.81 | D16 = 5.17 | | |
| R17 = 36.08 | D17 = 1.10 | N10 = 1.84666 | ν10 = 23.8 |
| R18 = 14.30 | D18 = 5.60 | N11 = 1.58313 | ν11 = 59.4 |
| R19 = −24.31 | D19 = Variable | | |
| R20 = −19.49 | D20 = 3.60 | N12 = 1.84666 | ν12 = 23.8 |
| R21 = −16.47 | D21 = 4.50 | | |
| R22 = −16.05 | D22 = 1.50 | N13 = 1.77250 | ν13 = 49.6 |
| R23 = 185.92 | | | |

Aspheric Coefficient: R19

| $K = -6.76 \times 10^{-1}$ | $A = 0$ | $B = 1.7138 \times 10^{-5}$ |
|---|---|---|
| $C = 7.38 \times 10^{-8}$ | $D = -1.15 \times 10^{-9}$ | $E = 0$ |

Aspheric Coefficient: R22

| $K = 0$ | $A = 0$ | $B = 1.69 \times 10^{-5}$ |
|---|---|---|
| $C = 3.53 \times 10^{-8}$ | $D = -1.80 \times 10^{-8}$ | $E = 0$ |

| Variable | Focal Length | | |
|---|---|---|---|
| Separation | 30.00 | 55.05 | 100.00 |
| D3 | 1.50 | 1.59 | 6.33 |
| D5 | 5.91 | 5.83 | 1.08 |
| D10 | 2.58 | 14.76 | 27.74 |
| D19 | 13.77 | 5.15 | 1.23 |

NUMERICAL EXAMPLE 8

$f = 35.00\text{–}115.28 \quad Fno = 1:3.9\text{–}7.9 \quad 2\omega = 63.4°\text{–}21.3°$

| R1 = −118.09 | D1 = 3.00 | N1 = 1.48749 | ν1 = 70.2 |
|---|---|---|---|
| R2 = −60.06 | D2 = Variable | | |
| R3 = −58.51 | D3 = 2.40 | N2 = 1.74077 | ν2 = 27.8 |
| R4 = −61.41 | D4 = 1.50 | N3 = 1.60311 | ν3 = 60.7 |
| R5 = 38.15 | D5 = Variable | | |
| R6 = 34.34 | D6 = 1.20 | N4 = 1.84666 | ν4 = 23.8 |
| R7 = 27.04 | D7 = 3.20 | N5 = 1.48749 | ν5 = 70.2 |
| R8 = −319.69 | D8 = 0.15 | | |
| R9 = 45.60 | D9 = 2.80 | N6 = 1.65160 | ν6 = 58.5 |
| R10 = 166.18 | D10 = Variable | | |
| R11 = −20.70 | D11 = 1.00 | N7 = 1.64769 | ν7 = 33.8 |
| R12 = −62.94 | D12 = 1.10 | | |
| R13 = (Stop) | D13 = 1.10 | | |
| R14 = 6539.41 | D14 = 0.85 | N8 = 1.48749 | ν8 = 70.2 |
| R15 = 48.84 | D15 = 2.18 | N9 = 1.84666 | ν9 = 23.8 |
| R16 = −45.73 | D16 = 6.59 | | |
| R17 = 51.35 | D17 = 1.10 | N10 = 1.84666 | ν10 = 23.8 |
| R18 = 13.56 | D18 = 6.00 | N11 = 1.58313 | ν11 = 59.4 |
| R19 = −31.86 | D19 = Variable | | |
| R20 = −39.44 | D20 = 3.80 | N12 = 1.84666 | ν12 = 23.8 |
| R21 = −20.59 | D21 = 0.15 | | |
| R22 = −26.82 | D22 = 1.40 | N13 = 1.74320 | ν13 = 49.3 |
| R23 = −184.23 | D23 = 3.83 | | |
| R24 = −25.14 | D24 = 1.60 | N14 = 1.72000 | ν14 = 50.3 |
| R25 = 3454.63 | | | |

Aspheric Coefficient: R19

| $K = -1.96 \times 10^{-1}$ | $A = 0$ | $B = 5.69 \times 10^{-6}$ |
|---|---|---|
| $C = 2.67 \times 10^{-8}$ | $D = -6.80 \times 10^{-10}$ | $E = 0$ |

| Variable | Focal Length | | |
|---|---|---|---|
| Separation | 35.00 | 62.21 | 115.28 |
| D2 | 1.12 | 3.95 | 7.44 |
| D5 | 7.85 | 5.02 | 1.53 |
| D10 | 2.87 | 14.95 | 31.69 |
| D19 | 14.78 | 6.57 | 0.86 |

NUMERICAL EXAMPLE 9

$f = 35.00\text{–}106.00 \quad Fno = 1:3.9\text{–}7.6 \quad 2\omega = 63.4°\text{–}23.1°$

| R1 = −79.23 | D1 = 2.50 | N1 = 1.48749 | ν1 = 70.2 |
|---|---|---|---|
| R2 = −53.54 | D2 = Variable | | |
| R3 = −62.78 | D3 = 2.00 | N2 = 1.76182 | ν2 = 26.5 |
| R4 = −39.42 | D4 = 1.30 | N3 = 1.63854 | ν3 = 55.4 |
| R5 = 36.74 | D5 = Variable | | |
| R6 = 30.48 | D6 = 1.00 | N4 = 1.84666 | ν4 = 23.8 |
| R7 = 22.22 | D7 = 3.80 | N5 = 1.48749 | ν5 = 70.2 |
| R8 = −240.21 | D8 = 0.30 | | |
| R9 = 36.74 | D9 = 2.80 | N6 = 1.60311 | ν6 = 60.7 |
| R10 = −166.62 | D10 = Variable | | |
| R11 = −18.91 | D11 = 0.87 | N7 = 1.64769 | ν7 = 33.8 |
| R12 = −123.06 | D12 = 1.00 | | |
| R13 = (Stop) | D13 = 1.00 | | |
| R14 = −156.26 | D14 = 0.70 | N8 = 1.48749 | ν8 = 70.2 |
| R15 = 42.83 | D15 = 1.80 | N9 = 1.84666 | ν9 = 23.8 |
| R16 = −36.50 | D16 = 4.97 | | |
| R17 = 46.04 | D17 = 1.10 | N10 = 1.84666 | ν10 = 23.8 |
| R18 = 13.31 | D18 = 5.90 | N11 = 1.58313 | ν11 = 59.4 |
| R19 = −27.43 | D19 = Variable | | |
| R20 = −33.93 | D20 = 3.20 | N12 = 1.84666 | ν12 = 23.8 |
| R21 = −19.80 | D21 = 0.20 | | |
| R22 = −23.32 | D22 = 1.30 | N13 = 1.74320 | ν13 = 49.3 |
| R23 = −249.42 | D23 = 3.90 | | |
| R24 = −24.35 | D24 = 1.50 | N14 = 1.72000 | ν14 = 50.3 |
| R25 = −128.73 | | | |

Aspheric Coefficient: R19

| $K = 5.69 \times 10^{-1}$ | $A = 0$ | $B = 1.26 \times 10^{-5}$ |
|---|---|---|
| $C = 1.04 \times 10^{-9}$ | $D = -1.93 \times 10^{-9}$ | $E = 0$ |

| Variable | Focal Length | | |
|---|---|---|---|
| Separation | 35.00 | 60.25 | 106.00 |
| D2 | 1.10 | 2.38 | 4.06 |
| D5 | 5.82 | 4.53 | 2.85 |
| D10 | 3.51 | 14.32 | 28.26 |
| D19 | 16.84 | 8.50 | 1.99 |

NUMERICAL EXAMPLE 10

$f = 30.00\text{–}100.01 \quad Fno = 1:3.8\text{–}8.2 \quad 2\omega = 71.6°\text{–}24.4°$

| R1 = −75.51 | D1 = 2.50 | N1 = 1.48749 | ν1 = 70.2 |
|---|---|---|---|
| R2 = −60.06 | D2 = Variable | | |
| R3 = −86.13 | D3 = 2.00 | N2 = 1.76182 | ν2 = 26.5 |
| R4 = −46.48 | D4 = 1.30 | N3 = 1.63854 | ν3 = 55.4 |
| R5 = 37.68 | D5 = Variable | | |
| R6 = 28.74 | D6 = 1.00 | N4 = 1.84666 | ν4 = 23.8 |
| R7 = 20.87 | D7 = 3.80 | N5 = 1.48749 | ν5 = 70.2 |
| R8 = −2684.27 | D8 = 0.30 | | |
| R9 = 38.29 | D9 = 2.80 | N6 = 1.60311 | ν6 = 60.7 |
| R10 = −217.74 | D10 = Variable | | |
| R11 = (Stop) | D11 = 1.50 | | |
| R12 = −18.69 | D12 = 0.87 | N7 = 1.64769 | ν7 = 33.8 |
| R13 = −126.83 | D13 = 2.00 | | |
| R14 = −485.52 | D14 = 0.70 | N8 = 1.48749 | ν8 = 70.2 |
| R15 = 45.24 | D15 = 1.80 | N9 = 1.84666 | ν9 = 23.8 |
| R16 = −40.48 | D16 = 4.97 | | |
| R17 = 40.96 | D17 = 1.10 | N10 = 1.84666 | ν10 = 23.8 |
| R18 = 13.82 | D18 = 5.90 | N11 = 1.58313 | ν11 = 59.4 |
| R19 = −23.92 | D19 = Variable | | |
| R20 = −31.77 | D20 = 3.20 | N12 = 1.84666 | ν12 = 23.8 |
| R21 = −19.52 | D21 = 0.20 | | |
| R22 = −23.46 | D22 = 1.30 | N13 = 1.74320 | ν13 = 49.3 |
| R23 = −245.47 | D23 = 3.90 | | |
| R24 = −23.35 | D24 = 1.50 | N14 = 1.72000 | ν14 = 50.3 |
| R25 = −226.34 | | | |

Aspheric Coefficient: R19

| K = 2.79 | A = 0 | B = 4.36 × 10$^{-5}$ |
|---|---|---|
| C = 3.06 × 10$^{-8}$ | D = 7.74 × 10$^{-10}$ | E = 0 |

| Variable | Focal Length | | |
|---|---|---|---|
| Separation | 30.00 | 56.16 | 100.01 |
| D2 | 1.10 | 3.17 | 8.13 |
| D5 | 10.06 | 7.99 | 3.02 |
| D10 | 2.92 | 15.02 | 25.61 |
| D19 | 12.90 | 4.99 | 1.58 |

NUMERICAL EXAMPLE 11 f = 30.00–100.00   Fno = 1:3.7–8.2   2ω = 71.6°–24.4°

| R1 = −156.75 | D1 = 2.50 | N1 = 1.48749 | ν1 = 70.2 |
| R2 = −61.45 | D2 = Variable | | |
| R3 = −76.43 | D3 = 2.00 | N2 = 1.76182 | ν2 = 26.5 |
| R4 = −43.96 | D4 = 1.30 | N3 = 1.63854 | ν3 = 55.4 |
| R5 = 36.02 | D5 = Variable | | |
| R6 = 28.46 | D6 = 1.00 | N4 = 1.84666 | ν4 = 23.8 |
| R7 = 20.87 | D7 = 2.80 | N5 = 1.48749 | ν5 = 70.2 |
| R8 = 2361.46 | D8 = 0.30 | | |
| R9 = 34.03 | D9 = 2.00 | N6 = 1.60311 | ν6 = 60.7 |
| R10 = 699.53 | D10 = Variable | | |
| R11 = (Stop) | D11 = 1.50 | | |
| R12 = −17.52 | D12 = 0.87 | N7 = 1.64769 | ν7 = 33.8 |
| R13 = −114.73 | D13 = 2.00 | | |
| R14 = −358.48 | D14 = 0.70 | N8 = 1.48749 | ν8 = 70.2 |
| R15 = 50.31 | D15 = 1.80 | N9 = 1.84666 | ν9 = 23.8 |
| R16 = −38.06 | D16 = 4.97 | | |
| R17 = 37.70 | D17 = 1.10 | N10 = 1.84666 | ν10 = 23.8 |
| R18 = 14.09 | D18 = 5.90 | N11 = 1.58313 | ν11 = 59.4 |
| R19 = −23.75 | D19 = Variable | | |
| R20 = −20.64 | D20 = 3.20 | N12 = 1.84666 | ν12 = 23.8 |
| R21 = −17.20 | D21 = 4.00 | | |
| R22 = −16.56 | D22 = 1.70 | N13 = 1.77250 | ν13 = 49.6 |
| R23 = 253.94 | | | |

Aspheric Coefficient: R19

| K = 3.13 × 10$^{-1}$ | A = 0 | B = 4.79 × 10$^{-5}$ |
|---|---|---|
| C = 2.18 × 10$^{-7}$ | D = 1.05 × 10$^{-10}$ | E = 0 |

Aspheric Coefficient: R22

| K = 0 | A = 0 | B = 1.69 × 10$^{-5}$ |
|---|---|---|
| C = 7.54 × 10$^{-8}$ | D = −9.87 × 10$^{-11}$ | E = 0 |

| Variable | Focal Length | | |
|---|---|---|---|
| Separation | 30.00 | 56.61 | 100.00 |
| D2 | 1.10 | 4.14 | 9.20 |
| D5 | 9.98 | 6.94 | 1.87 |
| D10 | 3.08 | 12.15 | 22.63 |
| D19 | 12.75 | 5.14 | 1.94 |

NUMERICAL EXAMPLE 12 f = 28.85–101.00   Fno = 1:3.3–9.0   2ω = 73.7°–24.2°

| R1 = 424.11 | D1 = 2.40 | N1 = 1.51633 | ν1 = 64.2 |
| R2 = −60.06 | D2 = Variable | | |
| R3 = −38.54 | D3 = 1.20 | N2 = 1.80400 | ν2 = 46.6 |
| R4 = 19.56 | D4 = 1.35 | | |
| R5 = 21.49 | D5 = 2.90 | N3 = 1.84666 | ν3 = 23.8 |
| R6 = 176.01 | D6 = Variable | | |
| R7 = 15.65 | D7 = 0.90 | N4 = 1.84666 | ν4 = 23.8 |
| R8 = 11.27 | D8 = 4.50 | N5 = 1.48749 | ν5 = 70.2 |
| R9 = −21.44 | D9 = 0.90 | N6 = 1.84666 | ν6 = 23.8 |
| R10 = −29.88 | D10 = Variable | | |
| R11 = (Stop) | D11 = 3.00 | | |
| R12 = −24.67 | D12 = 2.55 | N7 = 1.80518 | ν7 = 25.4 |
| R13 = −47.29 | D13 = 0.50 | | |
| R14 = −36.54 | D14 = 1.00 | N8 = 1.65160 | ν8 = 58.5 |
| R15 = 155.75 | D15 = 5.80 | N9 = 1.77250 | ν9 = 49.6 |
| R16 = −14.23 | D16 = Variable | | |
| R17 = −28.76 | D17 = 2.30 | N10 = 1.84666 | ν10 = 23.8 |
| R18 = −20.20 | D18 = 0.30 | | |
| R19 = −25.76 | D19 = 1.30 | N11 = 1.69680 | ν11 = 55.5 |
| R20 = −80.69 | D20 = 3.51 | | |
| R21 = −18.83 | D21 = 1.50 | N12 = 1.77250 | ν12 = 49.6 |
| R22 = 431.90 | | | |

Aspheric Coefficient: R12

| K = 4.96 | A = 0 | B = −6.07 × 10$^{-5}$ |
|---|---|---|
| C = 3.60 × 10$^{-7}$ | D = 3.33 × 10$^{-9}$ | E = 0 |

Aspheric Coefficient: R16

| K = −2.66 | A = 0 | B = −1.12 × 10$^{-4}$ |
|---|---|---|
| C = 1.63 × 10$^{-7}$ | D = −1.37 × 10$^{-9}$ | E = 0 |

| Variable | Focal Length | | |
|---|---|---|---|
| Separation | 28.85 | 53.98 | 101.00 |
| D2 | 1.23 | 2.21 | 5.15 |
| D6 | 8.73 | 4.75 | 0.81 |
| D10 | 0.79 | 4.84 | 8.26 |
| D16 | 10.75 | 4.72 | 0.85 |

TABLE 1

| Conditions | Numerical Examples | | | | | |
|---|---|---|---|---|---|---|
| | 1 | 2 | 3 | 4 | 5 | 6 |
| f5/fW | 0.71 | 0.73 | 0.75 | 0.70 | 0.78 | 0.73 |
| β5W | 1.41 | 1.39 | 1.27 | 1.32 | 1.37 | 1.37 |
| fW · φ$_{123W}$ | 0.67 | 0.66 | 0.50 | 0.55 | 0.51 | 0.48 |
| f3/fW | 1.18 | 1.23 | 1.79 | 0.88 | 0.91 | 1.01 |
| f4/fW | 1.20 | 1.09 | 1.21 | 1.08 | 1.13 | 1.05 |
| β4W | 0.48 | 0.48 | 0.39 | 0.43 | 0.38 | 0.35 |
| ν5N−ν5P | 19.7 | 18.8 | 25.8 | 23.3 | 28.2 | 25.7 |

| Conditions | Numerical Examples | | | | | |
|---|---|---|---|---|---|---|
| | 7 | 8 | 9 | 10 | 11 | 12 |
| f5/fW | 0.80 | 0.85 | 0.79 | 0.81 | 0.85 | 0.69 |
| β5W | 1.29 | 1.28 | 1.31 | 1.34 | 1.32 | 1.47 |
| fW · φ$_{123W}$ | 0.44 | 0.53 | 0.55 | 0.54 | 0.46 | 0.75 |
| f3/fW | 1.03 | 0.94 | 0.88 | 1.08 | 1.16 | 1.04 |
| f4/fW | 1.10 | 1.24 | 1.17 | 1.12 | 1.06 | 1.11 |
| β4W | 0.34 | 0.41 | 0.42 | 0.40 | 0.35 | 0.51 |
| ν5N−ν5P | 25.8 | 26.0 | 26.0 | 26.0 | 25.8 | 28.8 |

Another embodiment of the invention which is improved over the zoom lens shown in FIG. 3 is described by reference to FIG. 28 to FIGS. 40(A), 40(B) and 40(C).

In here, a zoom lens is disclosed, comprising as described before, from front to rear, a first lens unit of positive refractive power, a second lens unit of negative refractive power and a third lens unit of positive refractive power, these three lens units constituting a front lens group whose overall refractive power for the wide angle end is positive, a fourth lens unit of positive refractive power and a fifth lens unit of negative refractive power, these two lens units constituting a rear lens group, wherein when zooming from the wide angle end to the telephoto end, the first, second and third lens units move axially in such relation that the refractive power of the front lens group is weaker when in the telephoto end than when in the wide angle end, while simultaneously moving the fourth and fifth lens units axially in such relation that their separation decreases. Letting the focal length of the i-th lens unit be denoted by fi, the shortest focal length of the entire system by fW and the lateral magnification for the wide angle end of the i-th lens unit by $\beta iW$, the zoom lens satisfies the following conditions:

$$0.45 < |f5/fw| < 1.5 \quad (9)$$

$$1.1 < \beta 5W < 1.9 \quad (10)$$

Figure 28:
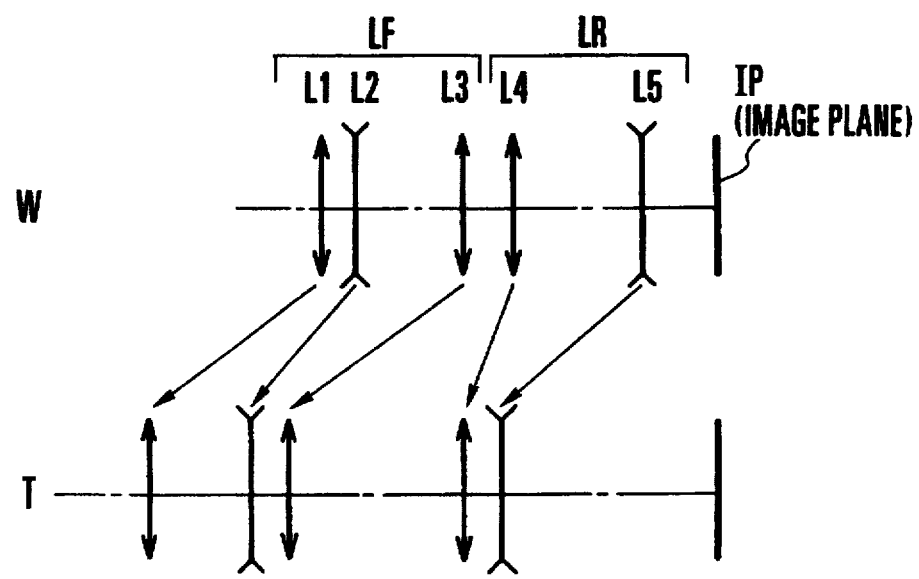
FIG. 28 illustrates the paraxial refractive power arrangements of a zoom lens of the invention.
Figure 29:
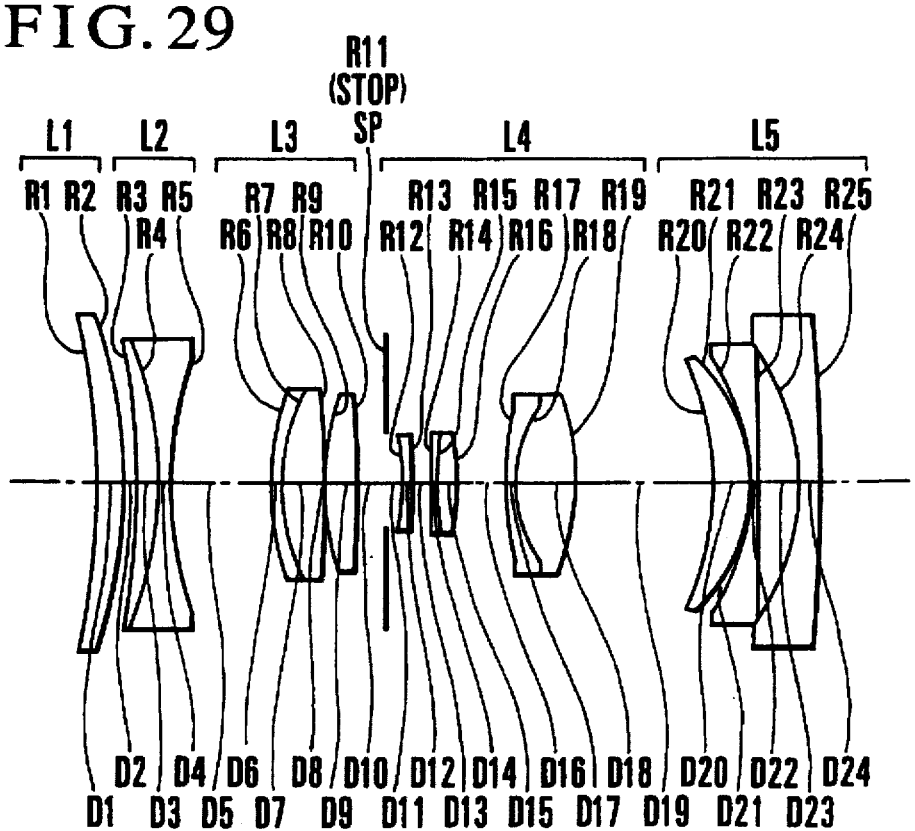
FIG. 29 is a block diagram of a numerical example 13 of the invention in the wide angle end.
Figure 30:
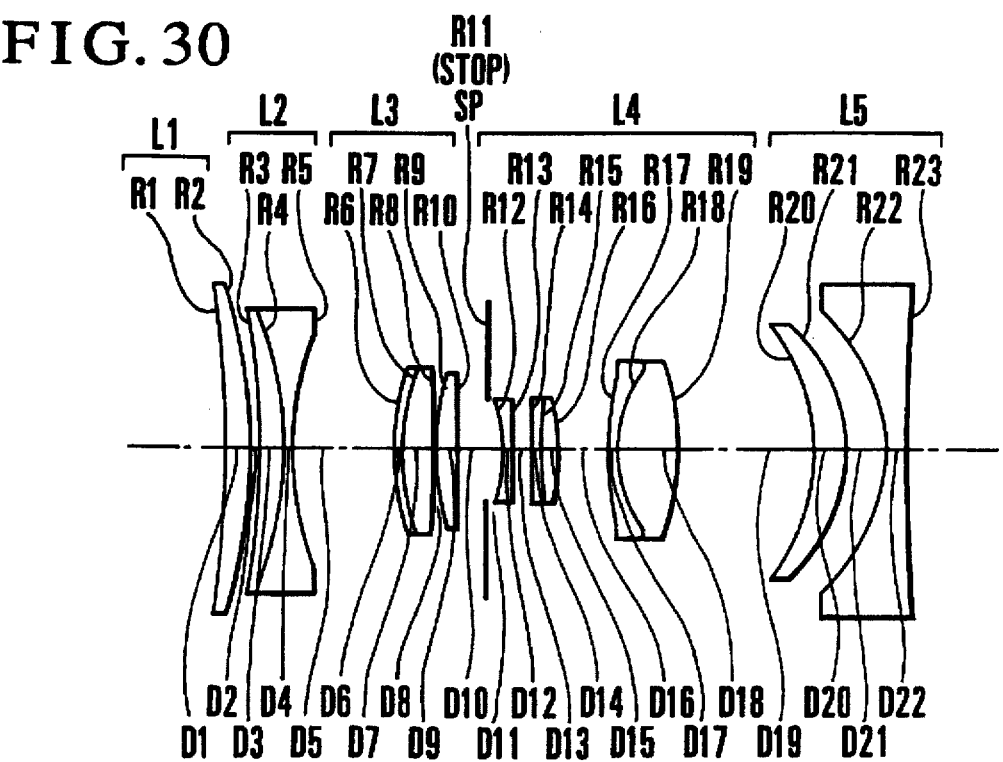
FIG. 30 is a block diagram of a numerical example 14 of the invention in the wide angle end.
Figure 31:
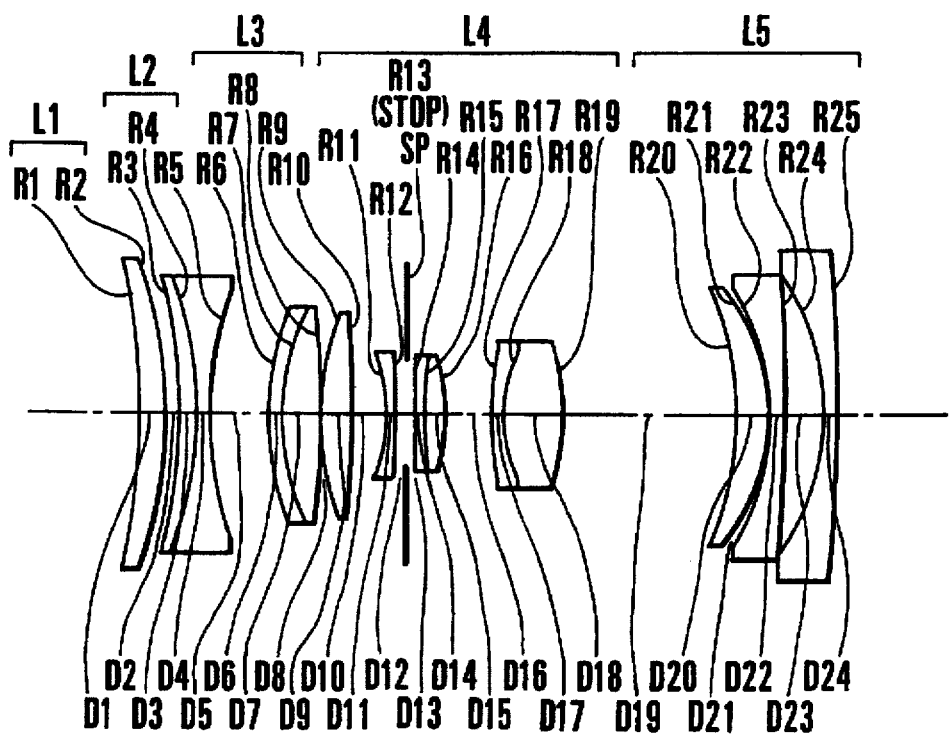
FIG. 31 is a block diagram of a numerical example 15 of the invention in the wide angle end.
Figure 32:
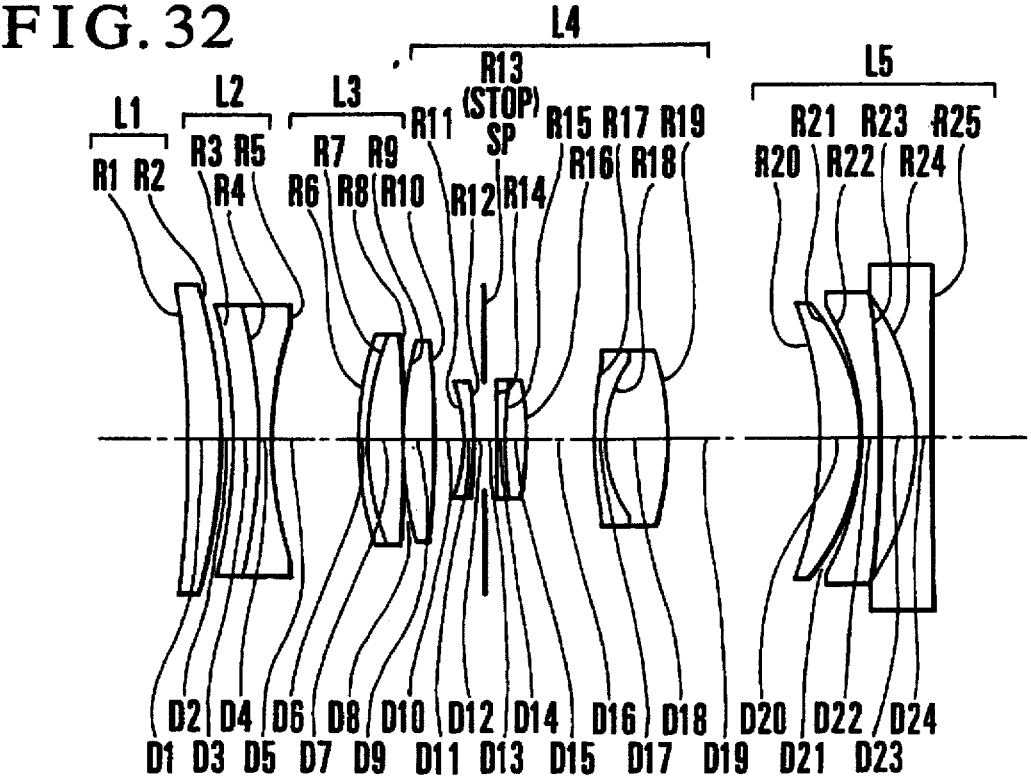
FIG. 32 is a block diagram of a numerical example 16 of the invention in the wide angle end.
Figure 33:
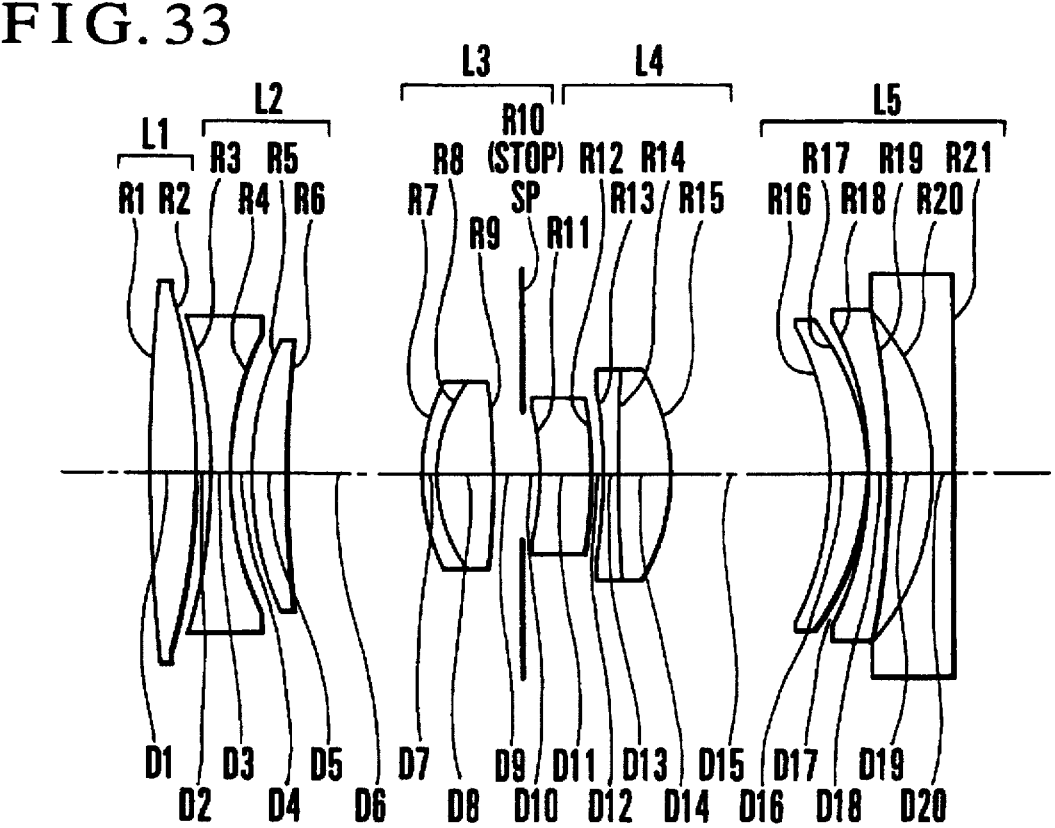
FIG. 33 is a block diagram of a numerical example 17 of the invention in the wide angle end.
Figure 34:
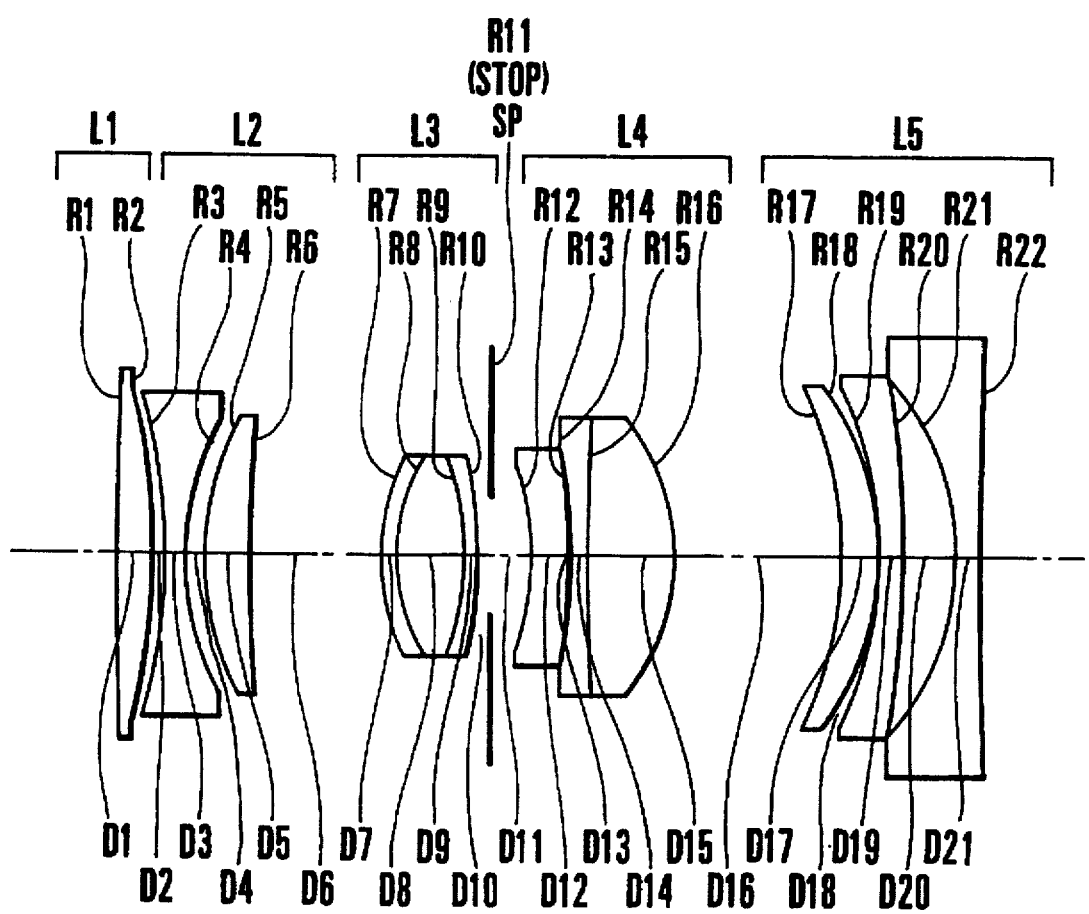
FIG. 34 is a block diagram of a numerical example 18 of the invention in the wide angle end.
Figure 35A:
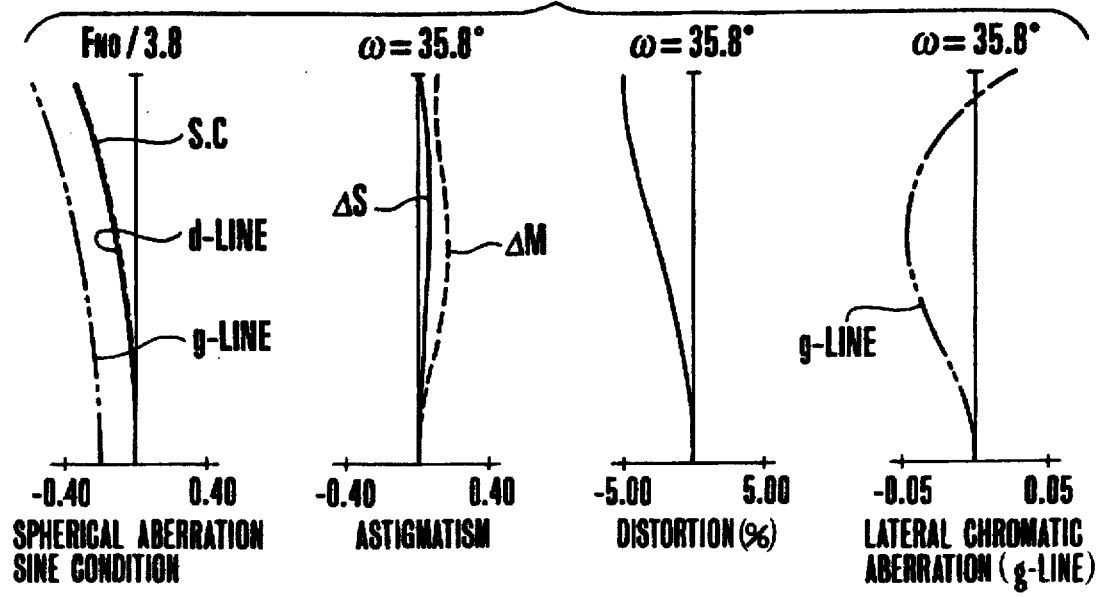
FIGS. 35(A), 35(B) and 35(C) are graphs of the various aberrations of the numerical example 13.
Figure 35B:
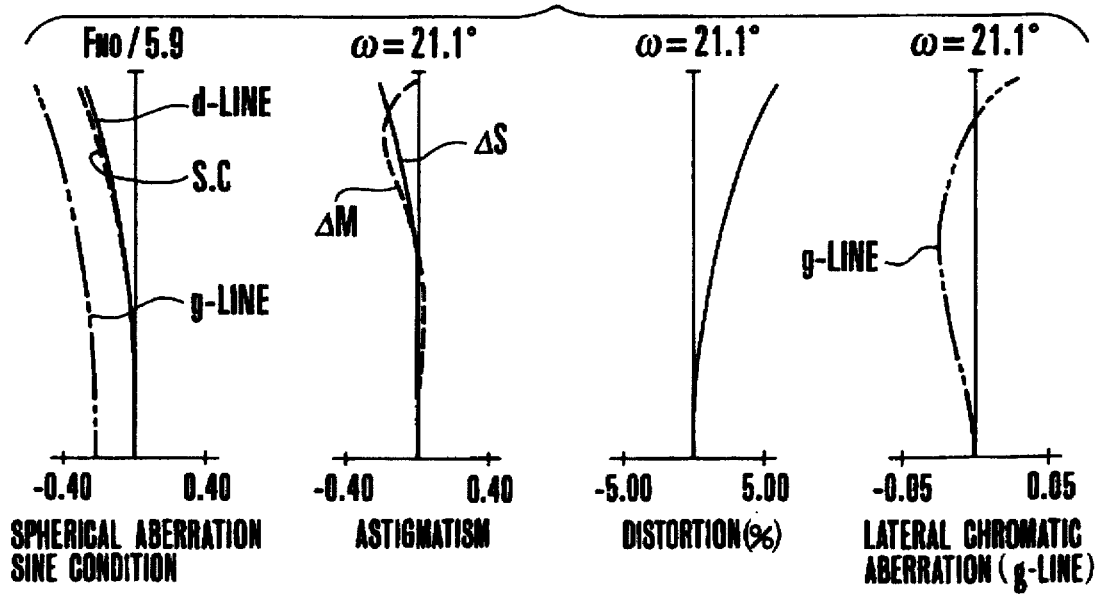
Figure 35C:
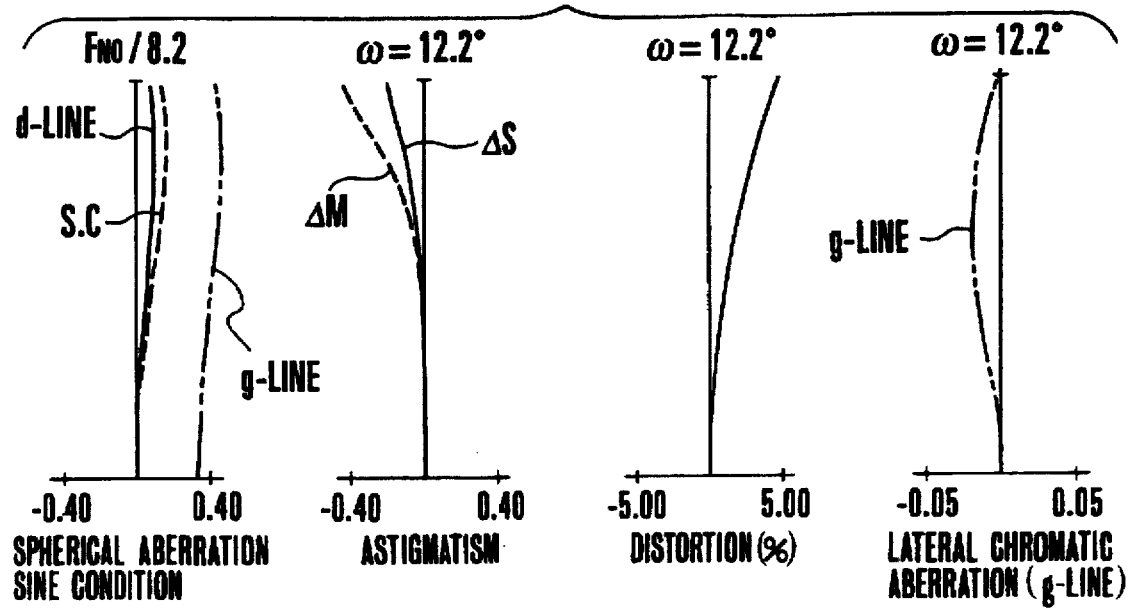
Figure 36A:
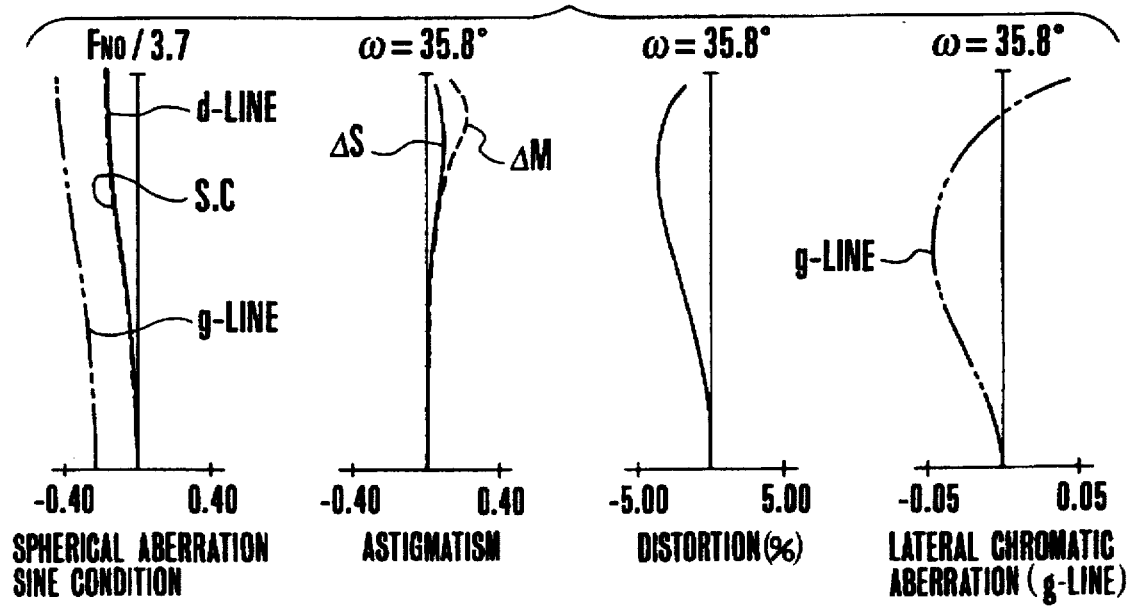
FIGS. 36(A), 36(B) and 36(C) are graphs of the various aberrations of the numerical example 14.
Figure 36B:
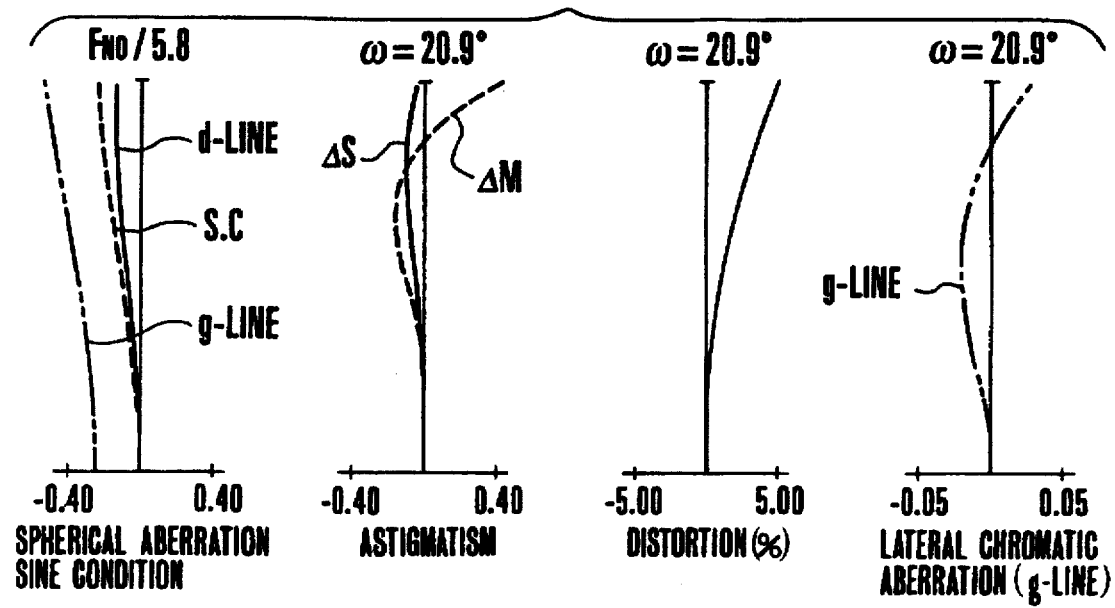
Figure 36C:
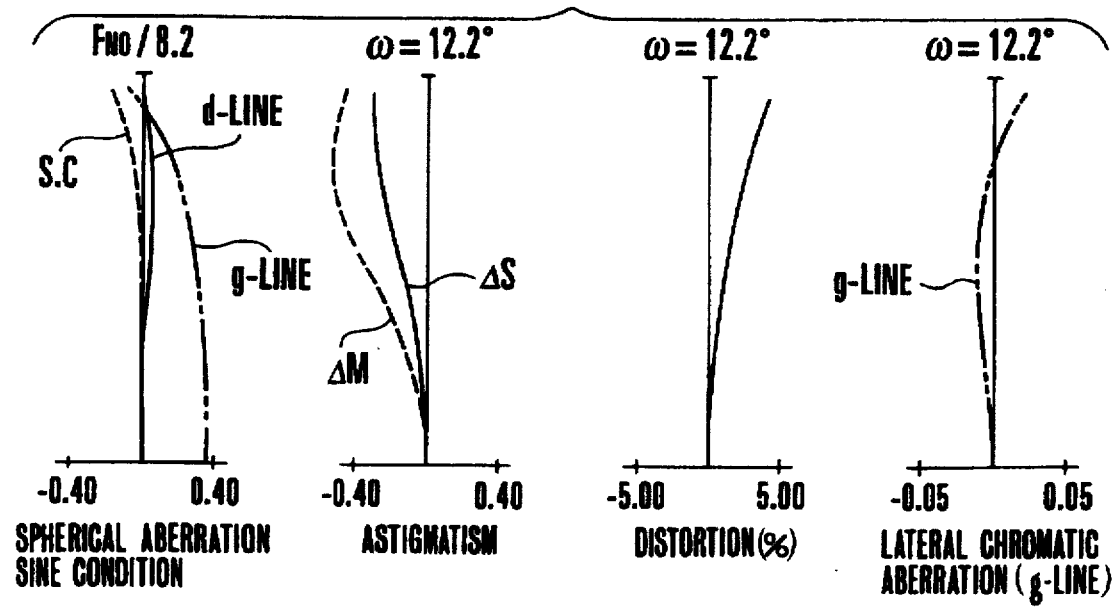
Figure 37A:
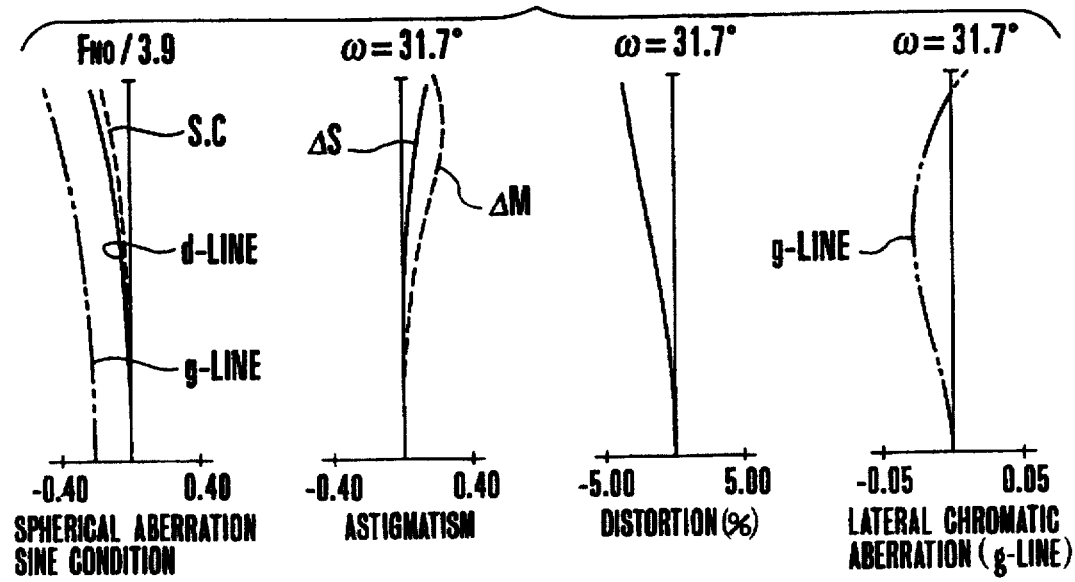
FIGS. 37(A), 37(B) and 37(C) are graphs of the various aberrations of the numerical example 15.
Figure 37B:
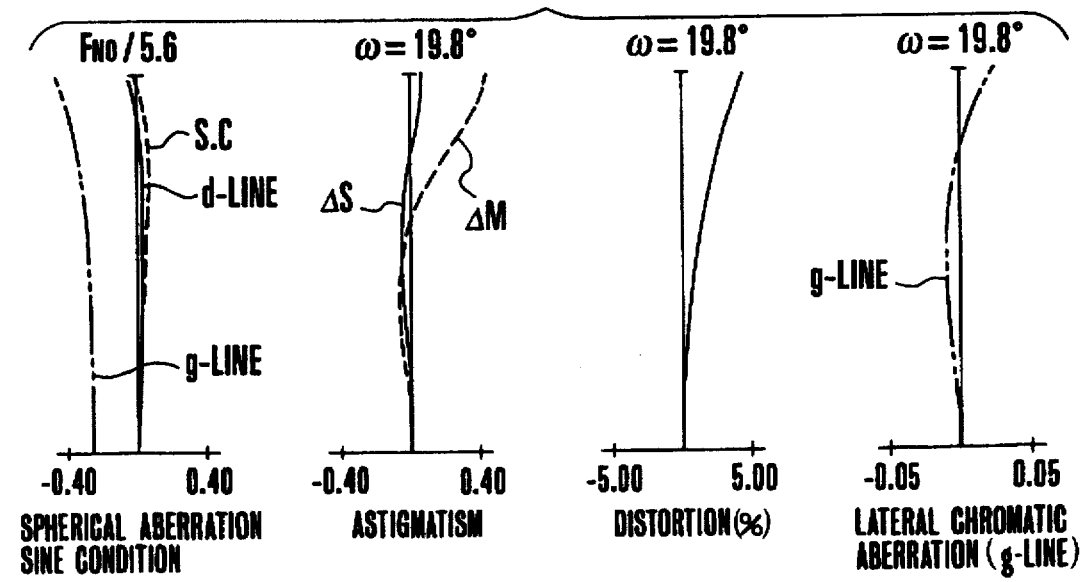
Figure 37C:
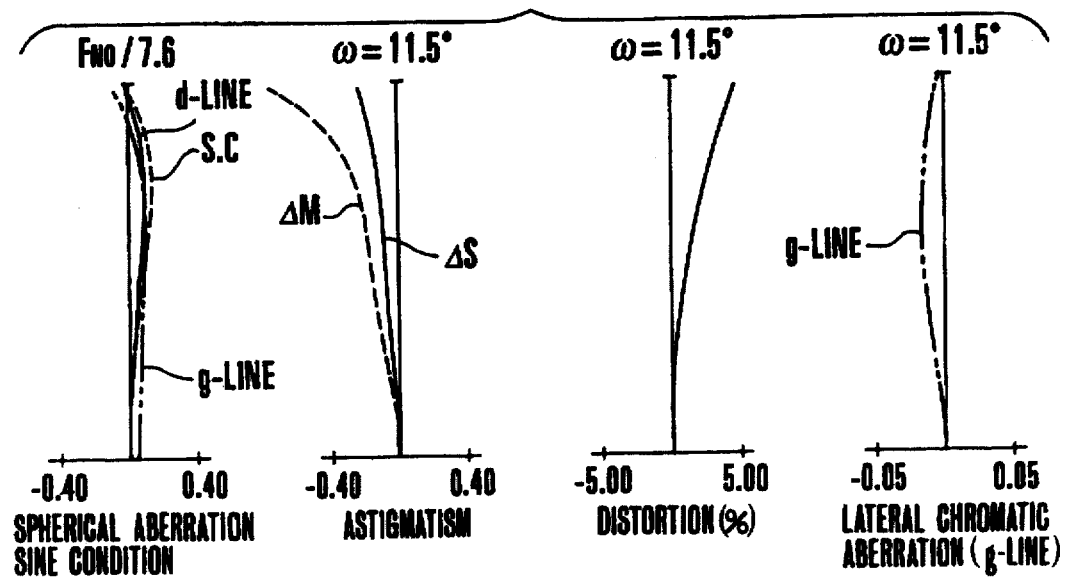
Figure 38A:
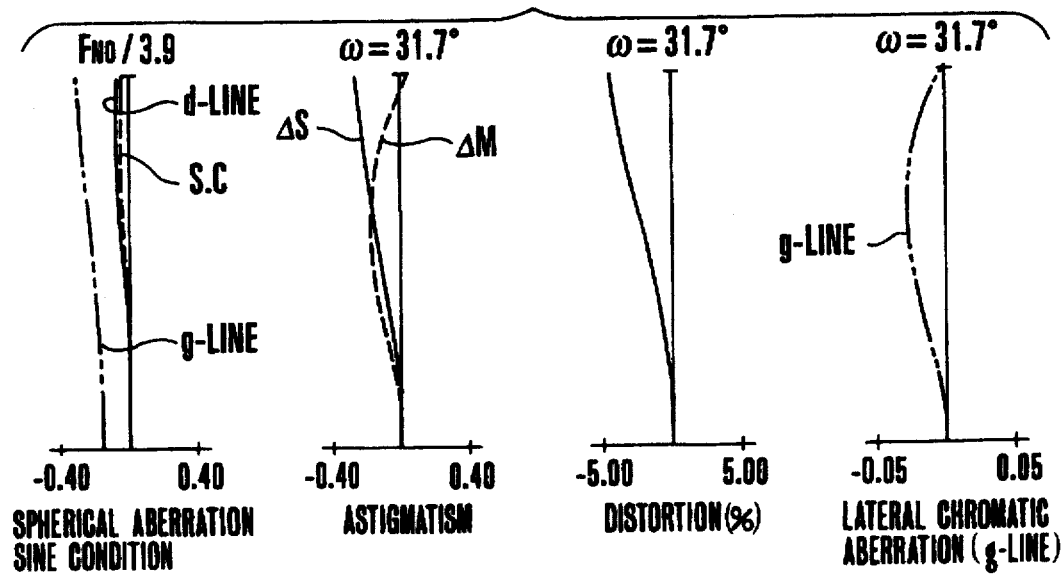
FIGS. 38(A), 38(B) and 38(C) are graphs of the various aberrations of the numerical example 16.
Figure 38B:
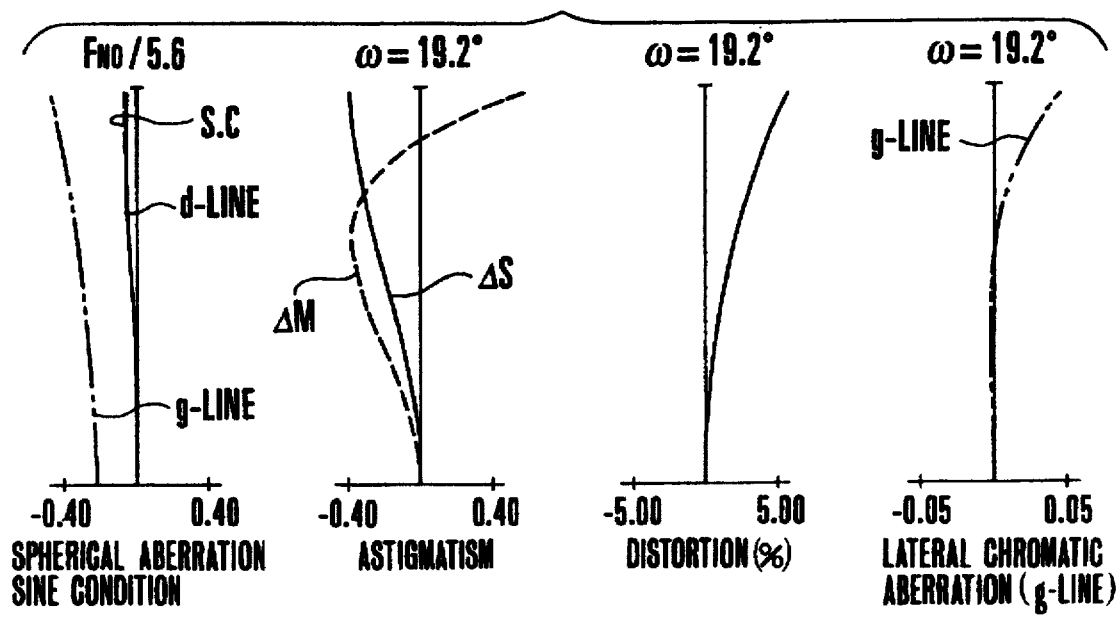
Figure 38C:
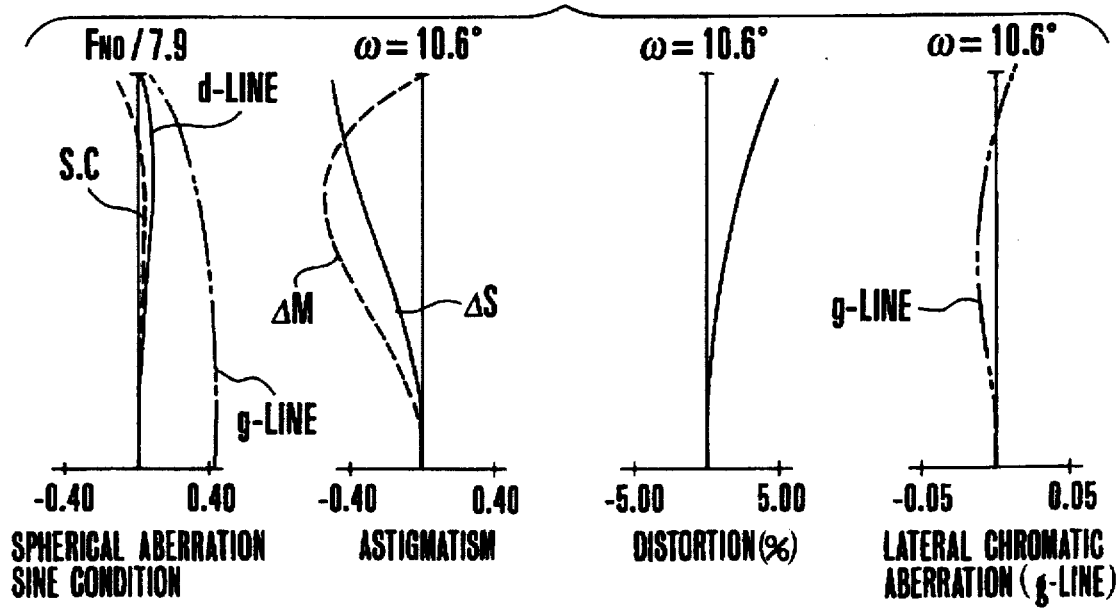
Figure 39A:
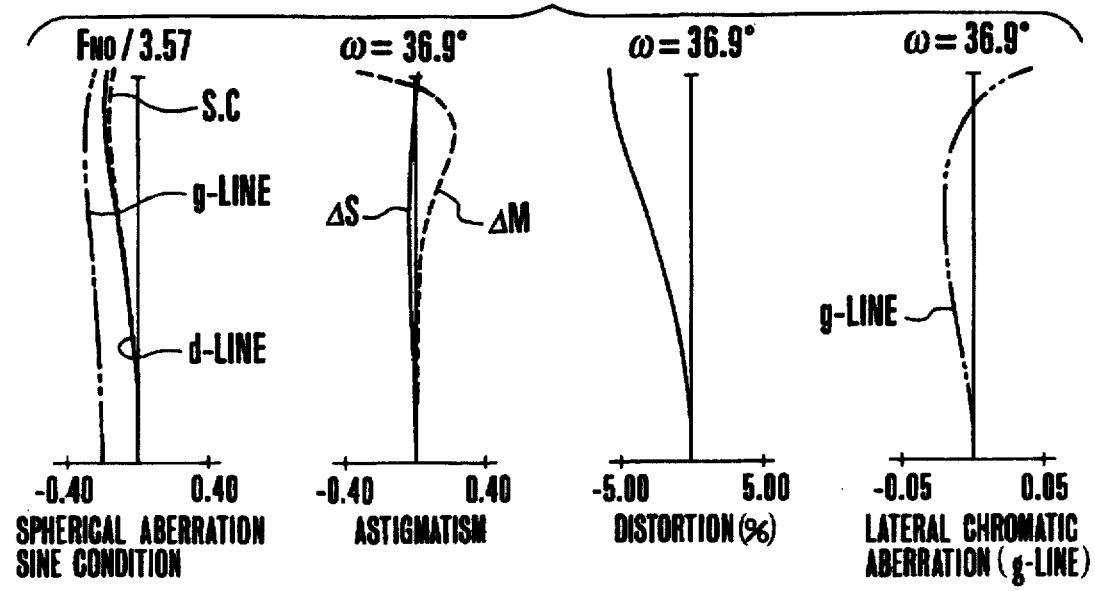
FIGS. 39(A), 39(B) and 39(C) are graphs of the various aberrations of the numerical example 17.
Figure 39B:
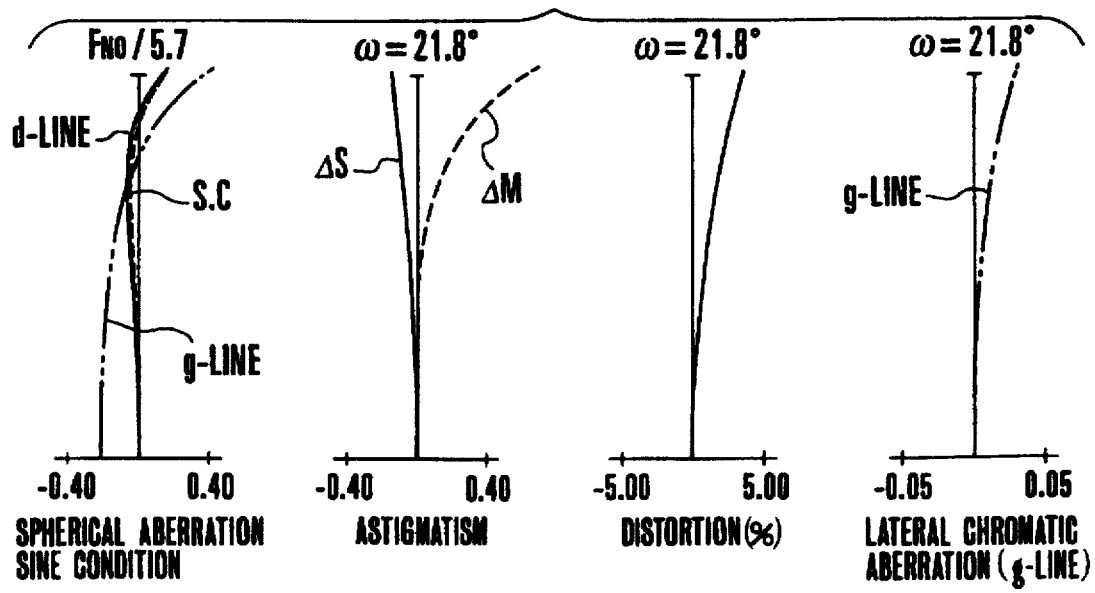
Figure 39C:
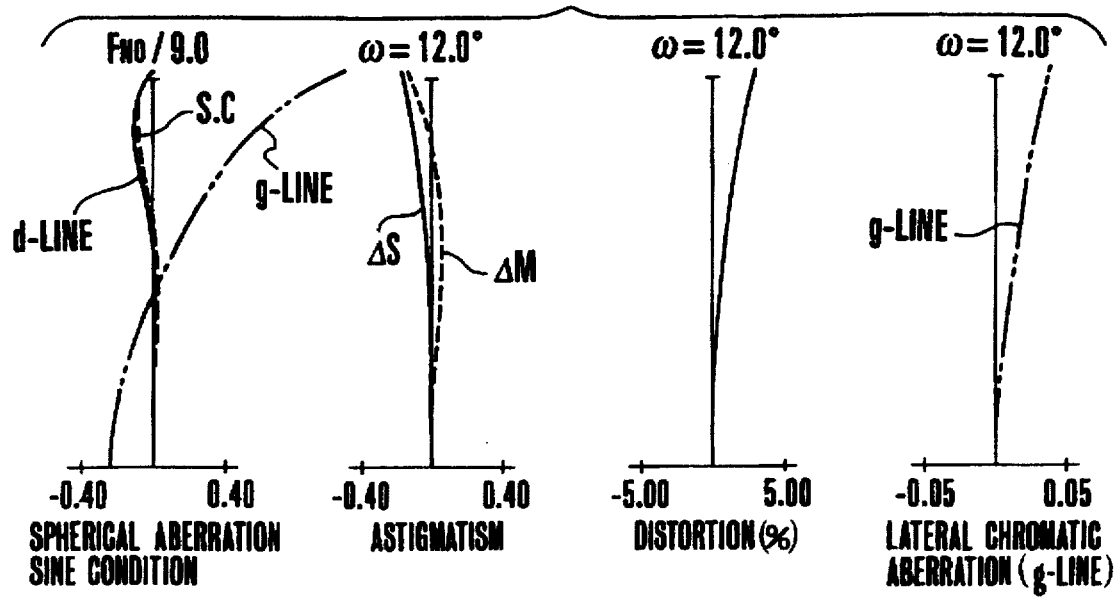
Figure 40A:
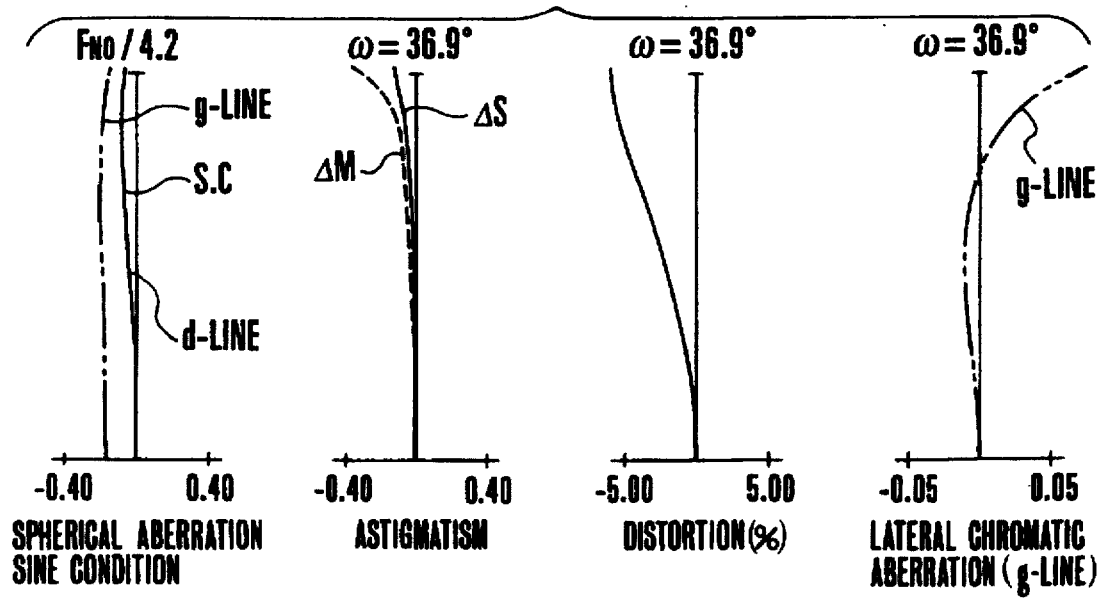
FIGS. 40(A), 40(B) and 40(C) are graphs of the various aberrations of the numerical example 18.
Figure 40B:
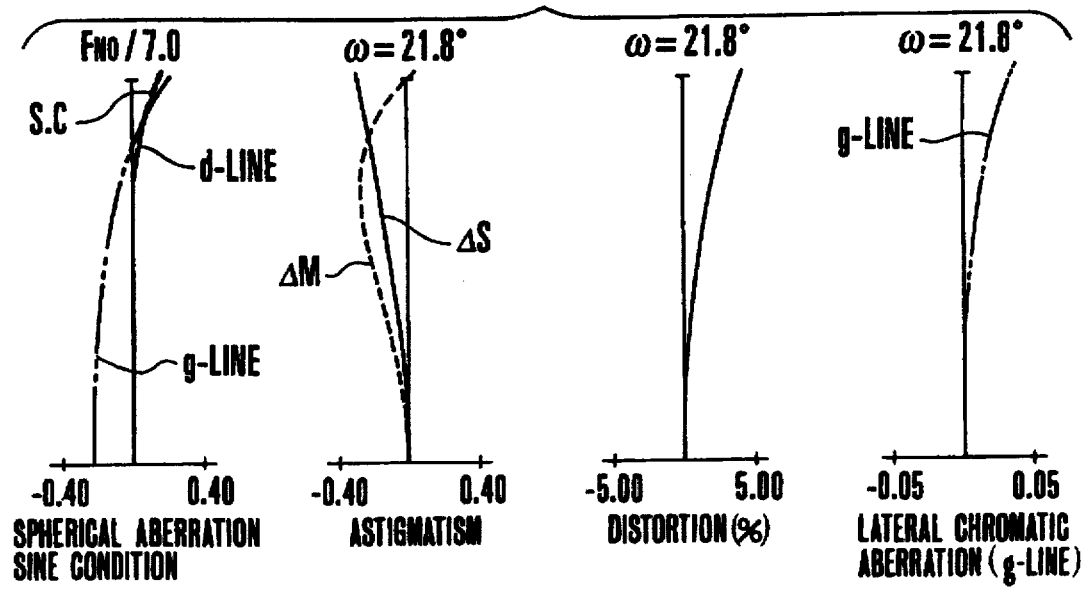
Figure 40C:
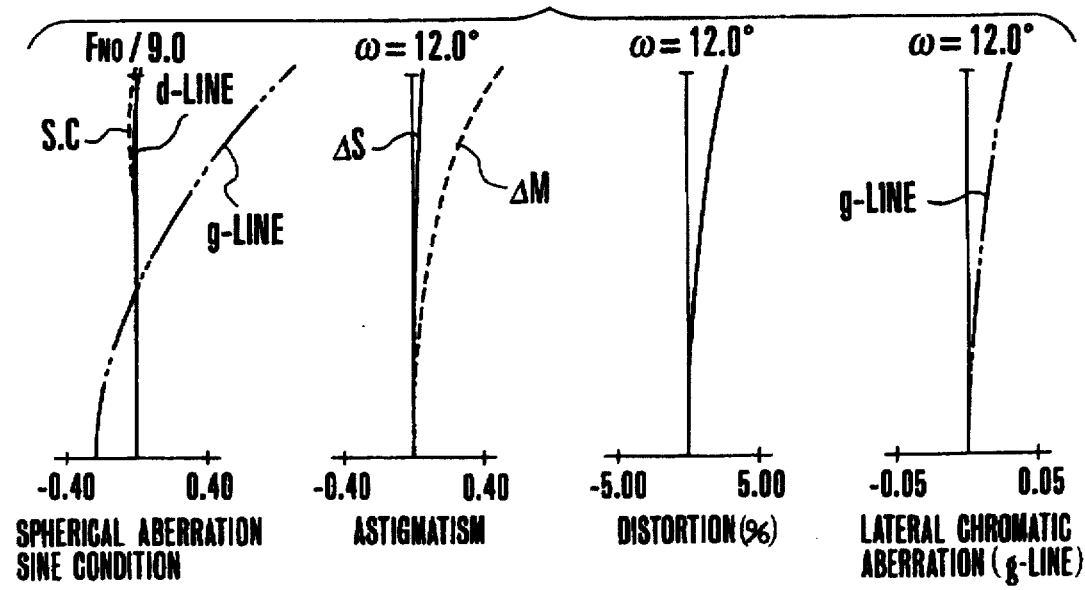

FIG. 28 illustrates the variation of the paraxial refractive power arrangement of this embodiment of the zoom lens with zooming from the wide angle end W to the telephoto end W. FIG. 29 through FIG. 34 are longitudinal section views of numerical examples 13 to 18 of zoom lenses of the invention in the wide angle end. FIGS. 35(A) to 35(C) through FIGS. 40(A) to 40(C) are graphic representations of the various aberrations of the numerical examples 13 to 18 of the invention respectively.

In the drawings, reference character LF denotes the front lens group of positive refractive power, and reference character LR denotes the rear lens group. SP stands for a stop and IP for an image plane. Reference character Li (i=1–5) denotes the i-th lens unit. The arrows indicate the directions in which the lens units move as zooming from the wide angle end to the telephoto end.

The front lens group LF has the first lens unit L1 of positive refractive power, the second lens unit L2 of negative refractive power and the third lens unit L3 of positive refractive power, totaling three lens units. In the wide angle end, the overall refractive power of the front lens group takes a positive value. The rear lens group LR has the fourth lens unit L4 of positive refractive power and the fifth lens unit L5 of negative refractive power, totaling two lens units.

As zooming goes from the wide angle end to the telephoto end, the first, second and third lens units all move axially forward in such relation that the second lens unit varies its relative position to the other lens units and that the overall refractive power of the front lens group is weaker when in the telephoto end than when in the wide angle end. The fourth and fifth lens units also move axially forward in such relation that their separation narrows. At this time, the third and fourth lens units move in such relation that their separation increases with zooming from the wide angle end to the telephoto end. The combined system of the third and fourth lens units are considered as an independent zoom lens which increases its focal length in response to that zooming operation. The focal length and the lateral magnification for the wide angle end of the fifth lens unit are then specified by the conditions (9) and (10), thereby giving advantageous contribution to increases of the zoom ratio and the maximum field angle to the predetermined values. An improvement of the compactness of the entire lens system is thus achieved. If desired, the ranges of the conditions (9) and (10) may be narrowed as follows:

$$0.6 < |f5/fW| < 0.9 \quad (9a)$$

$$1.2 < \beta 5W < 1.55 \quad (10a)$$

By adopting such ranges, a further improvement of the optical performance can be achieved.

In the present embodiment, for the wide angle end, the overall refractive power of the first and second lens units is negative. Since the refractive power of the third lens unit is positive, the front lens group as a whole becomes a retrofocus type. The use of this feature brings the front principal point to a nearer position to the image plane. So, the requirements of preventing the front and rear lens groups from mechanically interfering with each other and of increasing the maximum field angle become easy to fulfill at once. Another feature is that, as the first lens unit is made to have a positive refractive power and the second lens unit to have a negative refractive power, the combined system of such first and second lens units has its rear principal point brought to a more frontal position, thereby giving an advantage of shortening the physical length of the front lens group that is of the retrofocus type. Another advantage arising from the first lens unit taking the positive refractive power is that positive distortion is well corrected in the wide angle end. Focusing to suit from an infinitely distant object down to a close object is performed by moving the fourth lens unit forward.

In the zoom lens of the present embodiment, the focal length f of the entire system is expressed by the following equation:

$$f = fA \cdot \beta 4 \cdot \beta 5 (\beta 4 > 0, \beta 5 > 0)$$

where fA is the overall focal length of the front lens group and $\beta i$ is the lateral magnification of the i-th lens unit.

For this zoom lens, as is understandable from that equation, the variation of the focal length from the wide angle end to the telephoto end operates with a higher efficiency when the lateral magnifications $\beta 4$ and $\beta 5$ are made larger in value and the overall focal length fA of the front lens group is made longer, (or the overall refractive power of the front lens group is weakened). In addition, the separation between the fourth lens unit of positive refractive power and the fifth lens unit of negative refractive power is made narrower when in the telephoto end than when in the wide angle end, thereby permitting the fifth lens unit to produce an effect of varying the focal length. So, the zoom ratio becomes easy to increase. For the rear lens group, the divergence or negative refractive power is made stronger when in the telephoto end. So, along with the front lens group of positive refractive power, it forms the telephoto type. Thus, the entire lens system is constructed in compact form.

In the present embodiment, by adopting the paraxial refractive power arrangement as shown in FIG. 28, the maximum field angle is increased to such a value that the shortest focal length is smaller than the diagonal length of the image frame.

Specifically speaking, the front lens group comprises a first lens unit of positive refractive power, a second lens unit of negative refractive power and a third lens unit of positive refractive power, wherein when zooming from the wide angle end to the telephoto end, all the lens units move forward in such relation that the separation between the first and second lens unit increases and the separation between the second and third lens unit decreases. Thus, the front lens group gives a higher contribution to the variation of the focal length.

It is to be noted that, in the present embodiment, for the purpose of simplifying the structure of the operating mechanism, the first and third lens units are moved in unison. They may otherwise be moved in differential relation. According to this, the degree of freedom on design can be increased.

In the present embodiment, with such construction and arrangement of the lens units, when the conditions (9) and (10) are satisfied, a high optical performance is obtained throughout the entire zooming range, while still maintaining minimization of the bulk and size of the entire lens system to be achieved.

The technical significance of each of the above-described conditions is explained below.

The inequalities of condition (9) are concerned with the negative refractive power of the fifth lens unit and have an aim chiefly to improve the efficiency with which the focal length varies. When the negative refractive power of the fifth lens unit is weaker than the upper limit of the condition (9), that lens unit lessens its contribution to the effect of varying the focal length. As a result, the movement of each lens unit has to increase to obtain the desired zoom ratio. So, the complete lens gets an increased total length.

When the lower limit of the condition (9) is exceeded, the complete lens, when in the wide angle end, functions as too strong of a telephoto type system, because the first to the fourth lens units have a positive overall refractive power and the fifth lens unit has a negative refractive power.

From this reason, as a result, the lens system gets too short of a back focal distance. To secure a certain corner illumination, therefore, a large increase of the outer diameter of the fifth lens unit is invited. As another result, that lens unit gets too strong of a refractive power, causing production of higher order field curvature and astigmatism, which are difficult to correct.

The inequalities of condition (10) are concerned with the lateral magnification of the fifth lens unit.

Now, we have an equation for the back focal distance BfW for the wide angle end of the lens system as expressed by:

$$BfW = f5 \cdot (1-\beta 5W)$$

So, according to the present embodiment, within the framework of the condition (9), a proper range is given for the factor of the condition (10) to make a good compromise between the reduction of the total length of the entire lens system and the correction of aberrations.

When the upper limit of the condition (10) is exceeded, the back focal distance becomes longer than necessary. As the total length of the entire system increases, the difficulty of improving the compactness increases. When the lower limit is exceeded, the back focal distance becomes too short and the outer diameter of the fifth lens unit increases objectionably.

It should be pointed out that, in the present embodiment, while the variation of aberrations with zooming is lessened, the maximum field angle not only is increased, but also the image aberrations are corrected for high optical performance over the entire area of the image frame. For this purpose, additional features for the lens units are set forth as follows:

(i) It is preferred to satisfy the following conditions:

$$0.3 < fW \cdot \phi_{123W} < 1.2 \tag{11}$$

$$0.6 < |f2/fW| < 3.0 \tag{12}$$

where $\phi_{123W}$ is the overall refractive power for the wide angle end of the front lens group.

The inequalities of condition (11) are concerned with the refractive power of the front lens group. When the upper limit of the condition (11) is exceeded, as this implies that the refractive power of the front lens group in the wide angle end is too strong, the complete lens functions as too strong of a telephoto system. Therefore, it becomes difficult to obtain a positive back focal distance. When the lower limit is exceeded, as this implies that the refractive power of the front lens group is too weak, the entire lens system gets a longer total length. To avoid this, the rear lens group has to be strengthened in refractive power. Or otherwise, the desired value of the shortest focal length could not be retained. Therefore, it becomes difficult to keep all aberrations in good balance over the entire zooming range.

The inequalities of condition (12) are concerned with the negative refractive power of the second lens unit. When the upper limit of the condition (12) is exceeded, as this implies that the refractive power of the second lens unit is too weak, the total zooming movement of the second lens unit increases to increase the size of the entire lens system. When the lower limit is exceeded, as this implies that the refractive power of the second lens unit is too strong, large spherical aberrations of a higher order are produced, which are difficult to correct.

Particularly for the wide angle end, the total length of the entire system is shortened. In the present embodiment, the aberration correction has to improve for high optical performance. For this purpose, it is better to alter the upper and lower limits of the conditions (11) and (12) as follows:

$$0.35 < fW \cdot \phi_{123W} < 0.9 \tag{11a}$$

$$0.75 < |f2/fW| < 2.0 \tag{12a}$$

(ii) It is preferred to satisfy the following conditions:

$$0.6 < \beta 3/fW < 2.0 \tag{13}$$

$$0.2 < (\phi_{123W}/\phi_{123T}) / Z < 0.8 \tag{14}$$

$$0.25 < \beta 4W < 0.7 \tag{15}$$

$$0.1 < f5 \cdot (1-\beta 5W)/fW < 0.36 \tag{16}$$

where $\phi_{123T}$ is the overall focal length for the telephoto end of the front lens group and Z is the zoom ratio.

The inequalities of condition (13) are concerned with the positive refractive power of the third lens unit. When the upper limit of the condition (13) is exceeded, as this implies that the refractive power of the third lens unit is too weak, the total zooming movement of the lens unit increases to increase the size of the entire system. When the lower limit is exceeded, as this implies that the refractive power of the third lens unit is too strong, it become necessary to compensate this by strengthening the negative refractive power of the second lens unit, or by increasing the total zooming movement of the second lens unit. In addition, the share of the zoom ratio on the rear lens group has to increase. So, it should be avoided.

The inequalities of condition (14) are concerned with the ratio of variation of the focal length of the front lens group. When the upper limit is exceeded, the front lens group gets too large of a contribution to the variation of the focal length becomes. This means that the refractive powers of the lens units in the front lens group have to increase, or that the total zooming movement of each of the lens unit has to increase. When the lower limit is exceeded, the rear lens group gets too large of a contribution to the variation of the focal length. To secure the predetermined value of the zoom ratio, the total zooming movement of each of the lens units in the rear lens group comes to increase objectionably.

The inequalities of condition (15) are concerned with the lateral magnification for the wide angle end of the fourth lens unit. When the upper limit of the condition (15) is exceeded, the back focal distance, when in the wide angle end, is hardly taken sufficient. As a result, the fifth lens unit gets a large outer diameter. When the lower limit is exceeded, the refractive powers of the other lens units increase to obtain the predetermined values of the focal length. Therefore, it becomes difficult to correct the variation of aberrations with zooming. Further, the focal length of the front lens group has to be made even longer, causing the total length of the entire system to increase objectionably.

If desired, it is better to narrow the ranges of the conditions (13), (14) and (15) as follows:

$$0.8 < \sqrt{3}/fW < 1.25 \quad (13a)$$

$$0.25 < (\phi_{123W}/\phi_{123T})/Z < 0.5 \quad (14a)$$

$$0.2 < \beta 4W < 0.4 \quad (15a)$$

When these are satisfied, the balance between the reduction of the size of the lens system and the improvement of the optical performance can be made better.

The inequalities of condition (16) give appropriate ranges for the refractive power and lateral magnification of the fifth lens unit to fulfill the chief aim of obtaining the predetermined value of the back focal distance. When the upper limit is exceeded, the back focal distance, when in the wide angle end, becomes longer than necessary, causing the total length of the entire system to increase. When the lower limit is exceeded, the predetermined value for the wide angle end of the back focal distance not only becomes difficult to obtain, but also the outer diameter of the fifth lens unit increases objectionably.

(iii) The fourth lens unit of positive refractive power has at least one positive and at least one negative lenses. These lenses are better formed to such a shape that the frontmost lens surface is of concave curvature toward the object side and the rearmost lens surface is of convex curvature toward the image side.

(iv) The zoom lens of the present embodiment is provided with an aspherical lens. If the aspheric surface is introduced into, for example, the fourth lens unit, it is made easy to correct curvature of field and spherical aberration in the telephoto end, to maintain good stability of aberrations with zooming, and to correct image aberrations over the entire area of the image frame. In the present embodiment, the last surface of the fourth lens unit is made aspherical. If introduced into the fifth lens unit, off-axial aberrations can be corrected well.

(v) The fifth lens unit of negative refractive power includes at least one negative and at least one positive lenses having concave surface facing the object side, satisfying the following condition:

$$12 < v5N - v5P < 35 \quad (17)$$

where v5P is the mean value of the Abbe numbers of the materials of the positive lenses in the fifth lens unit, and v5N is the mean value of the Abbe number of the materials of the negative lenses in the fifth lens unit.

When either of the upper and lower limits of the condition (17) is violated, the chromatic aberrations varies to a large extent with zooming, which is difficult to correct by any design of the other lens units.

(vi) The stop is preferably positioned in one of the spaces between the rearmost lens surfaces of the third and fourth lens units. With this, the entrance pupil can take an appropriate position to suppress the variation of aberrations with zooming. When zooming, the stop may be moved either in differential relation to the other lens units, or in unison with one of the other lens units. If so, it becomes possible for the stop to take its place in the neighborhood of the entrance pupil that changes its position with zooming, thereby giving an advantage of preventing the field curvature from varying when the stop has a small aperture.

If, as focusing is performed by the fourth lens unit, the fourth lens unit contains the stop, it is preferred that the stop is made axially stationary during focusing, because the driving torque for the diaphragm mechanism can be reduced by an amount which would be otherwise necessary to shift the stop with focusing.

(vii) The fourth lens unit is preferably divided into two or more parts which move axially in differential relation when zooming or focusing, because the variation of aberrations with zooming or focusing can be lessened.

(viii) In the present embodiment, it is assumed that the fourth lens unit is selected to be used in focusing from an infinitely distant object to an object at a minimum distance, as it moves forward. Any other lens unit or units may be used instead. For example, the front lens group may be used, as it moves forward.

Again, if the back focal distance in the wide angle end is long enough, the fifth lens unit may be used. In this case, it moves toward the image side. An advantage of this case is to reduce the outer diameter of the first lens unit. It is also possible to move two or more of the first to fifth lens units simultaneously.

Next, numerical examples 13 to 18 of the invention are shown. The values of the factors in the above-described conditions for the numerical examples 13 to 18 are also listed in Table-2.

NUMERICAL EXAMPLE 13

$f = 30.00 \sim 100.01 \quad Fno = 1:3.8 \sim 8.2 \quad 2\omega = 71.6° \sim 24.4°$

| R1 = −75.51 | D1 = 2.50 | N1 = 1.48749 | v1 = 70.2 |
|---|---|---|---|
| R2 = −60.06 | D2 = Variable | | |
| R3 = −86.13 | D3 = 2.00 | N2 = 1.76182 | v2 = 26.5 |
| R4 = −46.48 | D4 = 1.30 | N3 = 1.63854 | v3 = 55.4 |
| R5 = 37.68 | D5 = Variable | | |
| R6 = 28.74 | D6 = 1.00 | N4 = 1.84666 | v4 = 23.8 |
| R7 = 20.87 | D7 = 3.80 | N5 = 1.48749 | v5 = 70.2 |
| R8 = −2684.27 | D8 = 0.30 | | |
| R9 = 36.29 | D9 = 2.80 | N6 = 1.60311 | v6 = 60.7 |
| R10 = −217.74 | D10 = Variable | | |
| R11 = (Stop) | D11 = 1.50 | | |
| R12 = −18.69 | D12 = 0.87 | N7 = 1.64769 | v7 = 33.8 |
| R13 = −126.83 | D13 = 2.00 | | |
| R14 = −485.52 | D14 = 0.70 | N8 = 1.48749 | v8 = 70.2 |
| R15 = 45.24 | D15 = 1.80 | N9 = 1.84666 | v9 = 23.8 |
| R16 = −40.48 | D16 = 4.97 | | |
| R17 = 40.96 | D17 = 1.10 | N10 = 1.84666 | v10 = 23.8 |
| R18 = 13.82 | D18 = 5.90 | N11 = 1.58313 | v11 = 59.4 |
| R19 = −23.92 | D19 = Variable | | |
| R20 = −31.77 | D20 = 3.20 | N12 = 1.84666 | v12 = 23.8 |
| R21 = −19.52 | D21 = 0.20 | | |
| R22 = −23.46 | D22 = 1.30 | N13 = 1.74320 | v13 = 49.3 |
| R23 = −245.47 | D23 = 3.90 | | |
| R24 = −23.35 | D24 = 1.50 | N14 = 1.72000 | v14 = 50.3 |
| R25 = −226.34 | | | |

Aspheric Coefficient: R19

| K = 2.79 | A = 0 | B = 4.36 × 10⁻⁵ |
|---|---|---|
| C = 3.06 × 10⁻⁶ | D = 7.74 × 10⁻¹⁰ | E = 0 |

| Variable | Focal Length | | |
|---|---|---|---|
| Separation | 30.00 | 56.16 | 100.01 |
| D2 | 1.10 | 3.17 | 8.13 |
| D5 | 10.06 | 7.99 | 3.02 |
| D10 | 2.92 | 15.02 | 25.61 |
| D19 | 12.90 | 4.99 | 1.58 |

NUMERICAL EXAMPLE 14 f = 30.00~100.00   Fno = 1:3.7~8.2   2ω = 71.6°~24.4°

| | | | |
|---|---|---|---|
| R1 = −156.75 | D1 = 2.50 | N1 = 1.48749 | ν1 = 70.2 |
| R2 = −61.45 | D2 = Variable | | |
| R3 = −76.43 | D3 = 2.00 | N2 = 1.76182 | ν2 = 26.5 |
| R4 = −43.96 | D4 = 1.30 | N3 = 1.63854 | ν3 = 55.4 |
| R5 = 36.02 | D5 = Variable | | |
| R6 = 28.46 | D6 = 1.00 | N4 = 1.84666 | ν4 = 23.8 |
| R7 = 20.87 | D7 = 2.80 | N5 = 1.48749 | ν5 = 70.2 |
| R8 = 2361.46 | D8 = 0.30 | | |
| R9 = 34.03 | D9 = 2.00 | N6 = 1.60311 | ν6 = 60.7 |
| R10 = 699.53 | D10 = Variable | | |
| R11 = (Stop) | D11 = 1.50 | | |
| R12 = −17.52 | D12 = 0.87 | N7 = 1.64769 | ν7 = 33.8 |
| R13 = −114.73 | D13 = 2.00 | | |
| R14 = −358.48 | D14 = 0.70 | N8 = 1.48749 | ν8 = 70.2 |
| R15 = 50.31 | D15 = 1.80 | N9 = 1.84666 | ν9 = 23.8 |
| R16 = −38.06 | D16 = 4.97 | | |
| R17 = 37.70 | D17 = 1.10 | N10 = 1.84666 | ν10 = 23.8 |
| R18 = 14.09 | D18 = 5.90 | N11 = 1.58313 | ν11 = 59.4 |
| R19 = −23.75 | D19 = Variable | | |
| R20 = −20.64 | D20 = 3.20 | N12 = 1.84666 | ν12 = 23.8 |
| R21 = −17.20 | D21 = 4.00 | | |
| R22 = −16.56 | D22 = 1.70 | N13 = 1.77250 | ν13 = 49.6 |
| R23 = 253.94 | | | |

Aspheric Coefficient: R19

| | | |
|---|---|---|
| K = 3.13 × 10⁻¹ | A = 0 | B = 4.79 × 10⁻⁵ |
| C = 2.18 × 10⁻⁷ | D = 1.05 × 10⁻¹⁰ | E = 0 |

$K = 3.13 \times 10^{-1}$, $A = 0$, $B = 4.79 \times 10^{-5}$, $C = 2.18 \times 10^{-7}$, $D = 1.05 \times 10^{-10}$, $E = 0$

Aspheric Coefficient: R22

$K = 0$, $A = 0$, $B = 1.69 \times 10^{-5}$, $C = 7.54 \times 10^{-8}$, $D = -9.87 \times 10^{-11}$, $E = 0$

| Variable Separation | Focal Length | | |
|---|---|---|---|
| | 30.00 | 56.61 | 100.00 |
| D2 | 1.10 | 4.14 | 9.20 |
| D5 | 9.98 | 6.94 | 1.87 |
| D10 | 3.08 | 12.75 | 22.63 |
| D19 | 12.75 | 5.14 | 1.94 |

NUMERICAL EXAMPLE 15 f = 35.00~106.00   Fno = 1:3.9~7.6   2ω = 63.4°~23.1°

| | | | |
|---|---|---|---|
| R1 = −79.23 | D1 = 2.50 | N1 = 1.48749 | ν1 = 70.2 |
| R2 = −53.54 | D2 = Variable | | |
| R3 = −62.78 | D3 = 2.00 | N2 = 1.76182 | ν2 = 26.5 |
| R4 = −39.42 | D4 = 1.30 | N3 = 1.63854 | ν3 = 55.4 |
| R5 = 36.74 | D5 = Variable | | |
| R6 = 30.48 | D6 = 1.00 | N4 = 1.84666 | ν4 = 23.8 |
| R7 = 22.22 | D7 = 3.80 | N5 = 1.48749 | ν5 = 70.2 |
| R8 = −240.21 | D8 = 0.30 | | |
| R9 = 36.74 | D9 = 2.80 | N6 = 1.60311 | ν6 = 60.7 |
| R10 = −166.62 | D10 = Variable | | |
| R11 = −18.91 | D11 = 0.87 | N7 = 1.64769 | ν7 = 33.8 |
| R12 = −123.06 | D12 = 1.00 | | |
| R13 = (Stop) | D13 = 1.00 | | |
| R14 = −156.26 | D14 = 0.70 | N8 = 1.48749 | ν8 = 70.2 |
| R15 = 42.83 | D15 = 1.80 | N9 = 1.84666 | ν9 = 23.8 |
| R16 = −36.50 | D16 = 4.97 | | |
| R17 = 46.04 | D17 = 1.10 | N10 = 1.84666 | ν10 = 23.8 |
| R18 = 13.31 | D18 = 5.90 | N11 = 1.58313 | ν11 = 59.4 |
| R19 = −27.43 | D19 = Variable | | |
| R20 = −33.93 | D20 = 3.20 | N12 = 1.84666 | ν12 = 23.8 |
| R21 = −19.80 | D21 = 0.20 | | |
| R22 = −23.32 | D22 = 1.30 | N13 = 1.74320 | ν13 = 49.3 |
| R23 = −249.42 | D23 = 3.90 | | |
| R24 = −24.35 | D24 = 1.50 | N14 = 1.72000 | ν14 = 50.3 |
| R25 = −128.73 | | | |

Aspheric Coefficient: R19

$K = 5.69 \times 10^{-1}$, $A = 0$, $B = 1.26 \times 10^{-5}$, $C = 1.04 \times 10^{-9}$, $D = -1.93 \times 10^{-9}$, $E = 0$

| Variable Separation | Focal Length | | |
|---|---|---|---|
| | 35.00 | 60.25 | 106.00 |
| D2 | 1.10 | 2.38 | 4.06 |
| D5 | 5.82 | 4.53 | 2.85 |
| D10 | 3.51 | 14.32 | 28.26 |
| D19 | 16.84 | 8.50 | 1.99 |

NUMERICAL EXAMPLE 16 f = 35.00~115.28   Fno = 1:3.9~7.9   2ω = 63.4°~21.3°

| | | | |
|---|---|---|---|
| R1 = −118.09 | D1 = 3.00 | N1 = 1.48749 | ν1 = 70.2 |
| R2 = −60.06 | D2 = Variable | | |
| R3 = −58.51 | D3 = 2.40 | N2 = 1.74077 | ν2 = 27.8 |
| R4 = −61.41 | D4 = 1.50 | N3 = 1.60311 | ν3 = 60.7 |
| R5 = 38.15 | D5 = Variable | | |
| R6 = 34.34 | D6 = 1.20 | N4 = 1.84666 | ν4 = 23.8 |
| R7 = 27.04 | D7 = 3.20 | N5 = 1.48749 | ν5 = 70.2 |
| R8 = −319.69 | D8 = 0.15 | | |
| R9 = 45.60 | D9 = 2.80 | N6 = 1.65160 | ν6 = 58.5 |
| R10 = −166.18 | D10 = Variable | | |
| R11 = −20.70 | D11 = 1.00 | N7 = 1.64769 | ν7 = 33.8 |
| R12 = −62.94 | D12 = 1.10 | | |
| R13 = (Stop) | D13 = 1.10 | | |
| R14 = 6539.41 | D14 = 0.85 | N8 = 1.48749 | ν8 = 70.2 |
| R15 = 48.84 | D15 = 2.18 | N9 = 1.84666 | ν9 = 23.8 |
| R16 = −45.73 | D16 = 6.59 | | |
| R17 = 51.35 | D17 = 1.10 | N10 = 1.84666 | ν10 = 23.8 |
| R18 = 13.56 | D18 = 6.00 | N11 = 1.58313 | ν11 = 59.4 |
| R19 = −31.86 | D19 = Variable | | |
| R20 = −39.44 | D20 = 3.80 | N12 = 1.84666 | ν12 = 23.8 |
| R21 = −20.59 | D21 = 0.15 | | |
| R22 = −26.82 | D22 = 1.40 | N13 = 1.74320 | ν13 = 49.3 |
| R23 = −184.23 | D23 = 3.83 | | |
| R24 = −25.14 | D24 = 1.60 | N14 = 1.72000 | ν14 = 50.3 |
| R25 = 3454.63 | | | |

Aspheric Coefficient $K = -1.96 \times 10^{-1}$, $A = 0$, $B = 5.69 \times 10^{-6}$, $C = 2.67 \times 10^{-8}$, $D = -6.80 \times 10^{-10}$, $E = 0$

| Variable Separation | Focal Length | | |
|---|---|---|---|
| | 35.00 | 62.21 | 115.28 |
| D2 | 1.12 | 3.95 | 7.44 |
| D5 | 7.85 | 5.02 | 1.53 |
| D10 | 2.87 | 14.95 | 31.69 |
| D19 | 14.78 | 6.57 | 0.86 |

NUMERICAL EXAMPLE 17

| f = 28.86–101.51 | Fno = 1:3.57–9.00 | 2ω = 73.7°–24.1° | |
|---|---|---|---|
| R1 = 157.01 | D1 = 3.00 | N1 = 1.51633 | ν1 = 64.2 |
| R2 = –53.10 | D2 = Variable | | |
| R3 = –36.16 | D3 = 1.30 | N2 = 1.80400 | ν2 = 46.6 |
| R4 = 22.09 | D4 = 1.47 | | |
| R5 = 23.23 | D5 = 2.50 | N3 = 1.84665 | ν3 = 23.8 |
| R6 = 111.27 | D6 = Variable | | |
| R7 = 14.89 | D7 = 0.90 | N4 = 1.84665 | ν4 = 23.8 |
| R8 = 10.80 | D8 = 4.10 | N5 = 1.49699 | ν5 = 81.6 |
| R9 = –48.02 | D9 = Variable | | |
| R10 = (Stop) | D10 = 1.30 | | |
| R11 = –23.66 | D11 = 3.42 | N6 = 1.80518 | ν6 = 25.4 |
| R12 = –49.46 | D12 = 0.91 | | |
| R13 = –39.81 | D13 = 1.00 | N7 = 1.65159 | ν7 = 58.5 |
| R14 = 120.33 | D14 = 3.70 | N8 = 1.77249 | ν8 = 49.6 |
| R15 = –14.40 | D.15 = Variable | | |
| R16 = –25.86 | D16 = 2.30 | N9 = 1.84665 | ν9 = 23.8 |
| R17 = –19.73 | D17 = 0.30 | | |
| R18 = –26.17 | D18 = 1.30 | N10 = 1.69679 | ν10 = 55.5 |
| R19 = –71.00 | D19 = 3.04 | | |
| R20 = –18.67 | D20 = 1.50 | N11 = 1.77249 | ν11 = 49.6 |
| R21 = –1220.31 | | | |

Aspheric Coefficient: R11

K = 5.04  A = 0  B = –4.96 × $10^{-5}$
C = –1.08 × $10^{-7}$  D = –1.67 × $10^{-9}$  E = 0

Aspheric Coefficient: R15

K = –2.77  A = 0  B = –1.10 × $10^{-4}$
C = 1.43 × $10^{-7}$  D = 1.38 × $10^{-10}$  E = 0

| Variable | Focal Length | | |
|---|---|---|---|
| Separation | 28.86 | 54.13 | 101.51 |
| D2 | 1.10 | 1.47 | 3.38 |
| D6 | 9.38 | 5.75 | 0.80 |
| D9 | 1.94 | 5.81 | 8.87 |
| D15 | 11.23 | 4.69 | 0.79 |

NUMERICAL EXAMPLE 18

| f = 28.80–101.93 | Fno = 1:4.20–9.00 | 2ω = 73.8°–24.0° | |
|---|---|---|---|
| R1 = 261.44 | D1 = 2.40 | N1 = 1.51633 | ν1 = 64.2 |
| R2 = –50.37 | D2 = Variable | | |
| R3 = –34.45 | D3 = 1.20 | N2 = 1.80400 | ν2 = 46.6 |
| R4 = 19.52 | D4 = 1.35 | | |
| R5 = 21.12 | D5 = 2.90 | N3 = 1.84665 | ν3 = 23.8 |
| R6 = 153.65 | D6 = Variable | | |
| R7 = 15.59 | D7 = 0.90 | N4 = 1.84665 | ν4 = 23.8 |
| R8 = 11.39 | D8 = 4.50 | N5 = 1.48749 | ν5 = 70.2 |
| R9 = –20.96 | D9 = 0.90 | N6 = 1.84665 | ν6 = 23.8 |
| R10 = –29.92 | D10 = 0.80 | | |
| R11 = (Stop) | D11 = Variable | | |
| R12 = –24.41 | D12 = 2.48 | N7 = 1.80518 | ν7 = 25.4 |
| R13 = –46.79 | D13 = 0.23 | | |
| R14 = –39.64 | D14 = 1.00 | N8 = 1.65159 | ν8 = 58.5 |
| R15 = 137.86 | D15 = 5.80 | N9 = 1.77249 | ν9 = 49.6 |
| R16 = –14.51 | D16 = Variable | | |
| R17 = –28.30 | D17 = 2.30 | N10 = 1.84665 | ν10 = 23.8 |
| R18 = –19.96 | D18 = 0.30 | | |
| R19 = –25.92 | D19 = 1.30 | N11 = 1.69679 | ν11 = 55.5 |
| R20 = –87.84 | D20 = 3.58 | | |
| R21 = –18.45 | D21 = 1.50 | N12 = 1.77249 | ν12 = 49.6 |
| R22 = 320.35 | | | |

Aspheric Coefficient: R12

K = 5.02  A = 0  B = –6.76 × $10^{-5}$
C = –3.34 × $10^{-7}$  D = –5.05 × $10^{-9}$  E = 0

Aspheric Coefficient: R16

K = –2.65  A = 0  B = –1.12 × $10^{-4}$
C = 1.24 × $10^{-7}$  D = –1.10 × $10^{-9}$  E = 0

| Variable | Focal Length | | |
|---|---|---|---|
| Separation | 28.80 | 54.18 | 101.93 |
| D2 | 0.98 | 1.71 | 3.51 |
| D6 | 8.81 | 4.74 | 0.94 |
| D11 | 2.80 | 6.44 | 9.76 |
| D16 | 10.82 | 5.05 | 1.32 |

TABLE 2

| Conditions | Numerical Examples | | | | | |
|---|---|---|---|---|---|---|
| | 13 | 14 | 15 | 16 | 17 | 18 |
| \|f5/fW\| | 0.81 | 0.85 | 0.79 | 0.85 | 0.71 | 0.66 |
| β5W | 1.34 | 1.32 | 1.31 | 1.28 | 1.45 | 1.47 |
| fW · $\phi_{123W}$ | 0.54 | 0.46 | 0.55 | 0.53 | 0.79 | 0.75 |
| \|f2/fW\| | 1.43 | 1.33 | 1.07 | 1.07 | 1.26 | 1.28 |
| f3/fW | 1.08 | 1.16 | 0.88 | 0.94 | 1.00 | 1.03 |
| $(\phi_{123W}/\phi_{123T})$/Z | 0.41 | 0.44 | 0.39 | 0.43 | 0.34 | 0.31 |
| β3W | 0.40 | 0.35 | 0.42 | 0.41 | 0.32 | 0.31 |
| f5 · (1 – β5W)/fW | 0.28 | 0.27 | 0.24 | 0.24 | 0.55 | 0.51 |
| ν5N–ν5P | 26.0 | 25.8 | 26.0 | 26.0 | 28.8 | 28.8 |

Another embodiment of the invention which is improved over the zoom lens shown in FIG. 3 is described by reference to FIG. 41 to FIGS. 56(A), 56(B) and 56(C).

This zoom lens is characterized by comprising, from front to rear, a first lens unit of negative refractive power, a second lens unit of positive refractive power and a third lens unit of positive refractive power, these three lens units constituting a front lens group whose overall refractive power for the wide angle end is positive, a fourth lens unit of positive refractive power and a fifth lens unit of negative refractive power, these two lens units constituting a rear lens group, wherein when zooming from the wide angle end to the telephoto end, the first, second and third lens units move axially in such relation that the overall refractive power of the front lens group is weaker when in the telephoto end than when in the wide angle end, while simultaneously moving the fourth and fifth lens units axially in such relation that their separation decreases.

Figure 41:
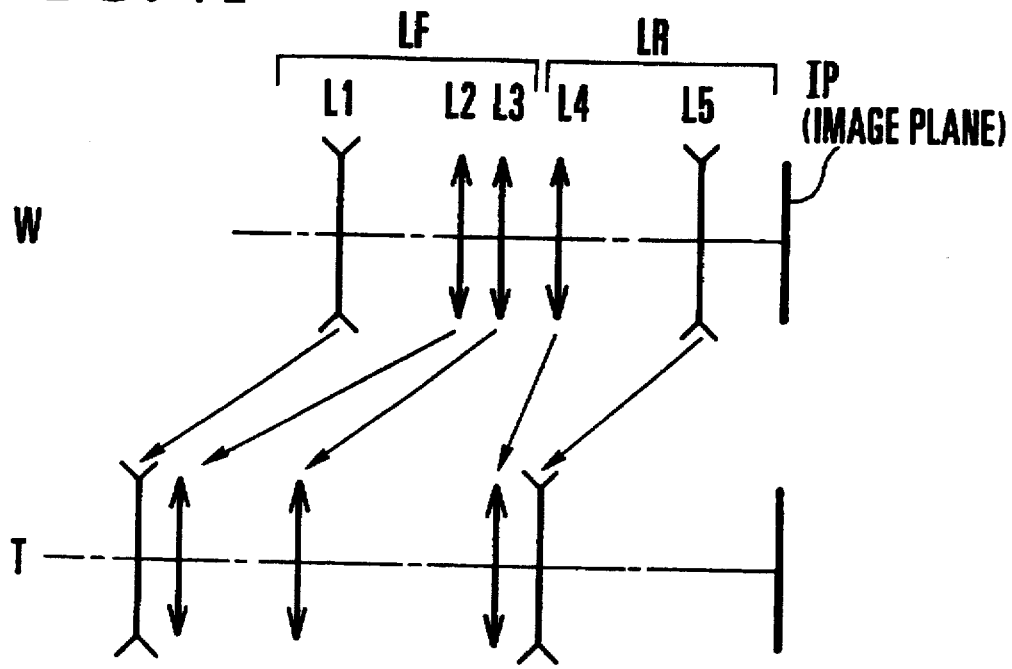
FIG. 41 illustrates the paraxial refractive power arrangements of a zoom lens of the invention.
Figure 42:
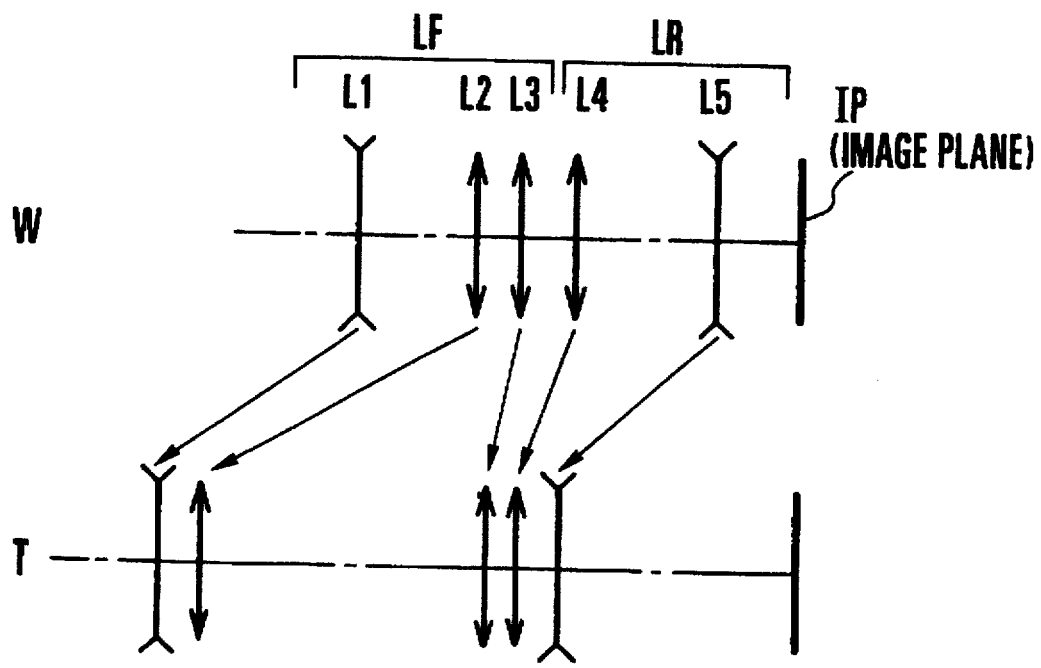
FIG. 42 illustrates the paraxial refractive power arrangements of another zoom lens of the invention.
Figure 43:
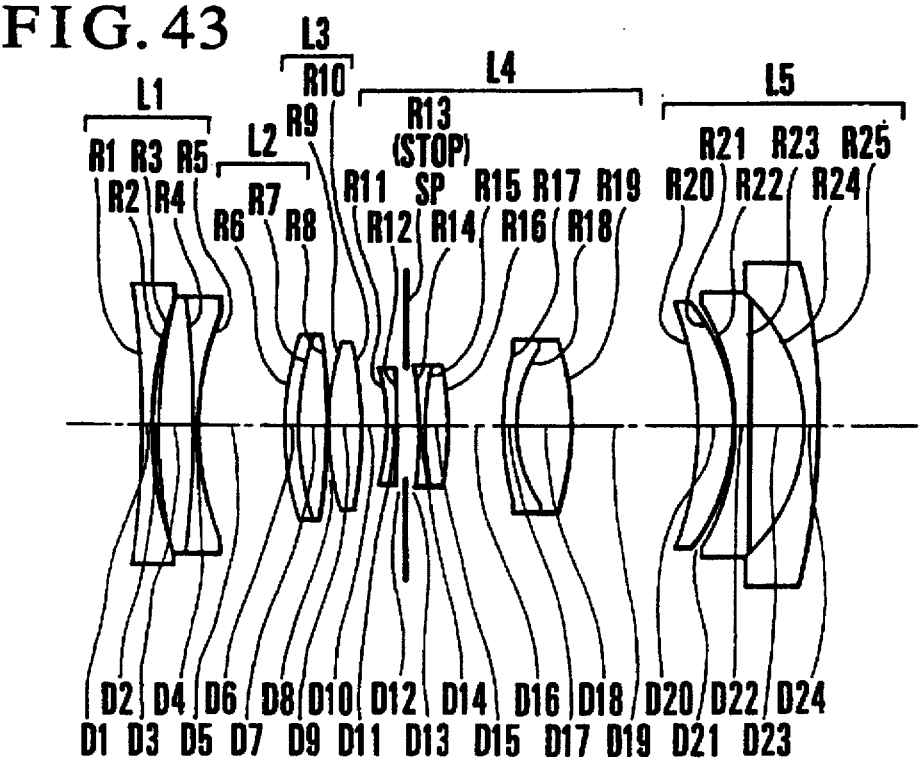
FIG. 43 is a block diagram of a numerical example 19 of the invention in the wide angle end.
Figure 44:
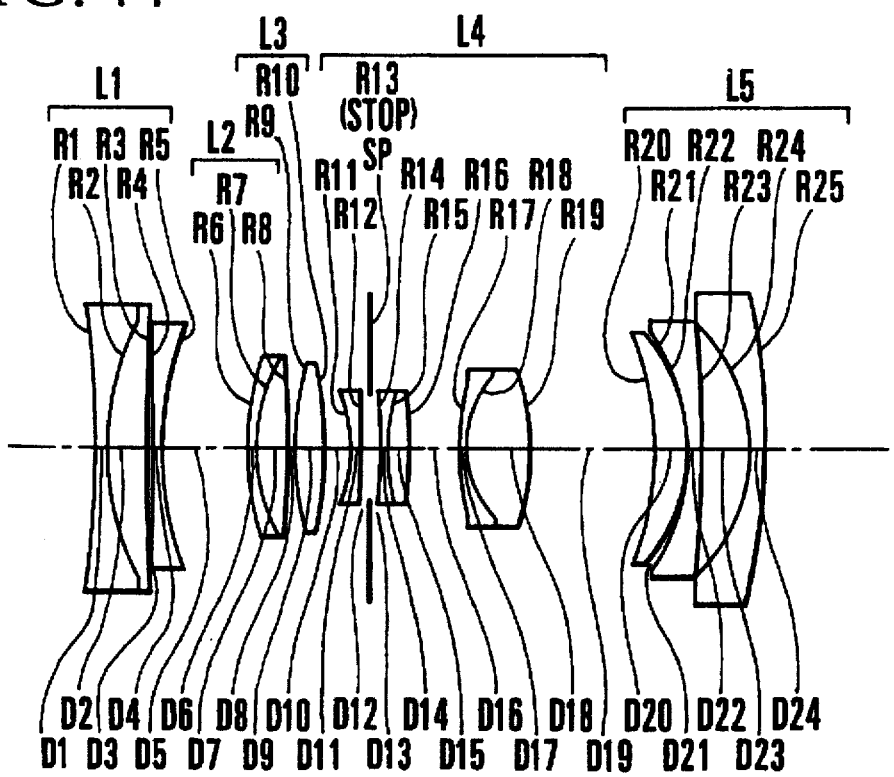
FIG. 44 is a block diagram of a numerical example 20 of the invention in the wide angle end.
Figure 45:
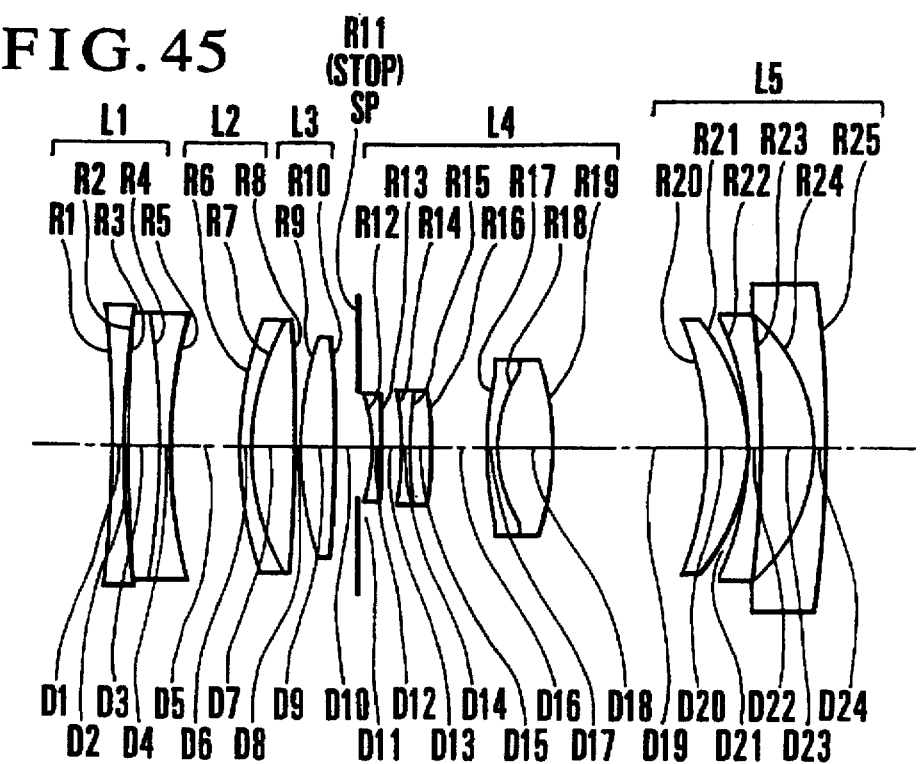
FIG. 45 is a block diagram of a numerical example 21 of the invention in the wide angle end.
Figure 46:
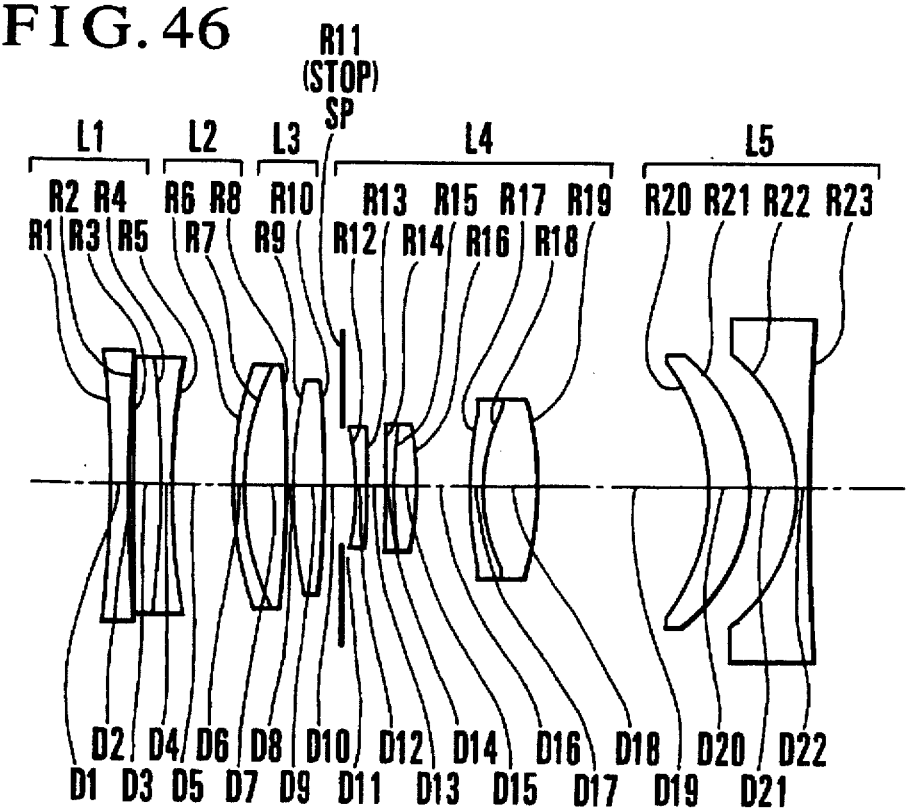
FIG. 46 is a block diagram of a numerical example 22 of the invention in the wide angle end.
Figure 47:
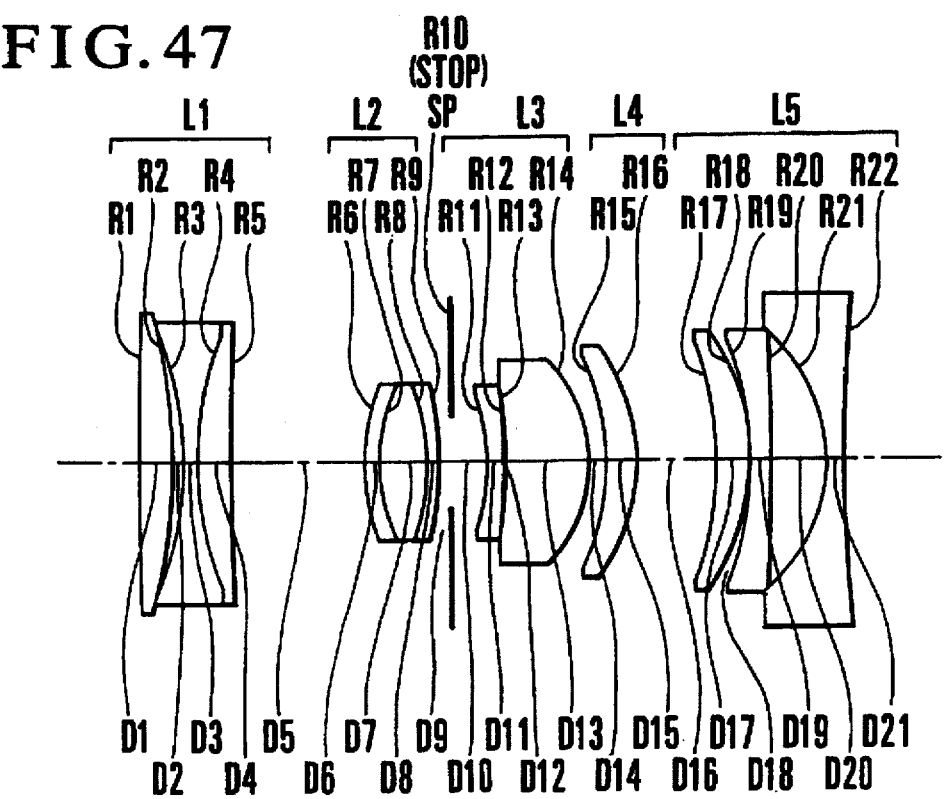
FIG. 47 is a block diagram of a numerical example 23 of the invention in the wide angle end.
Figure 48:
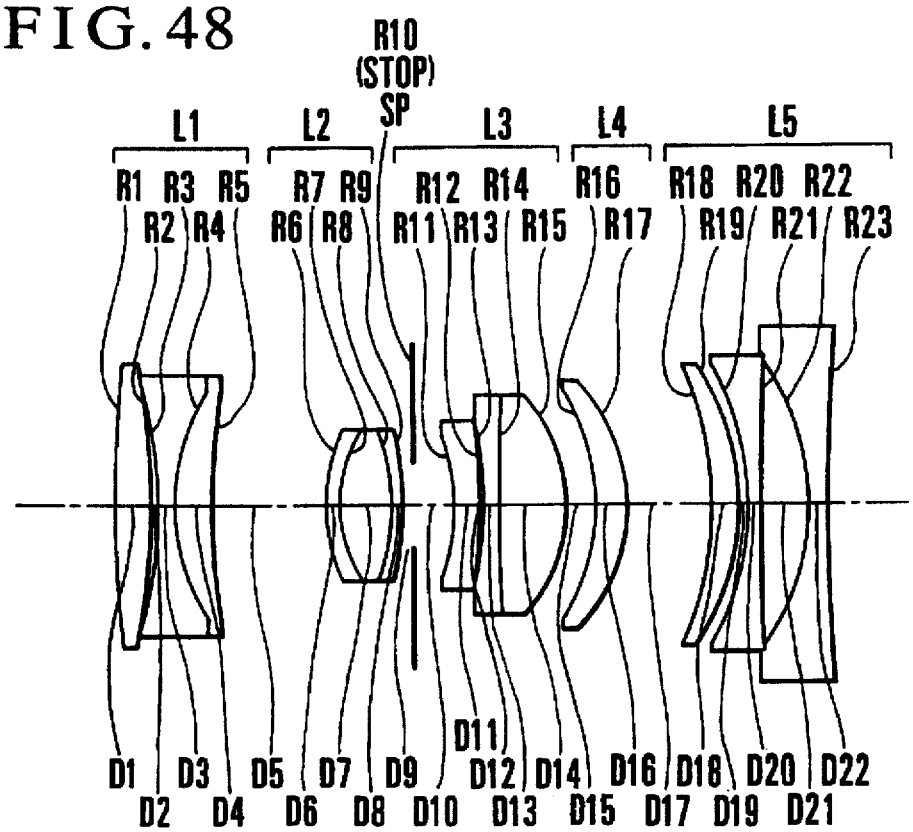
FIG. 48 is a block diagram of a numerical example 24 of the invention in the wide angle end.
Figure 49:
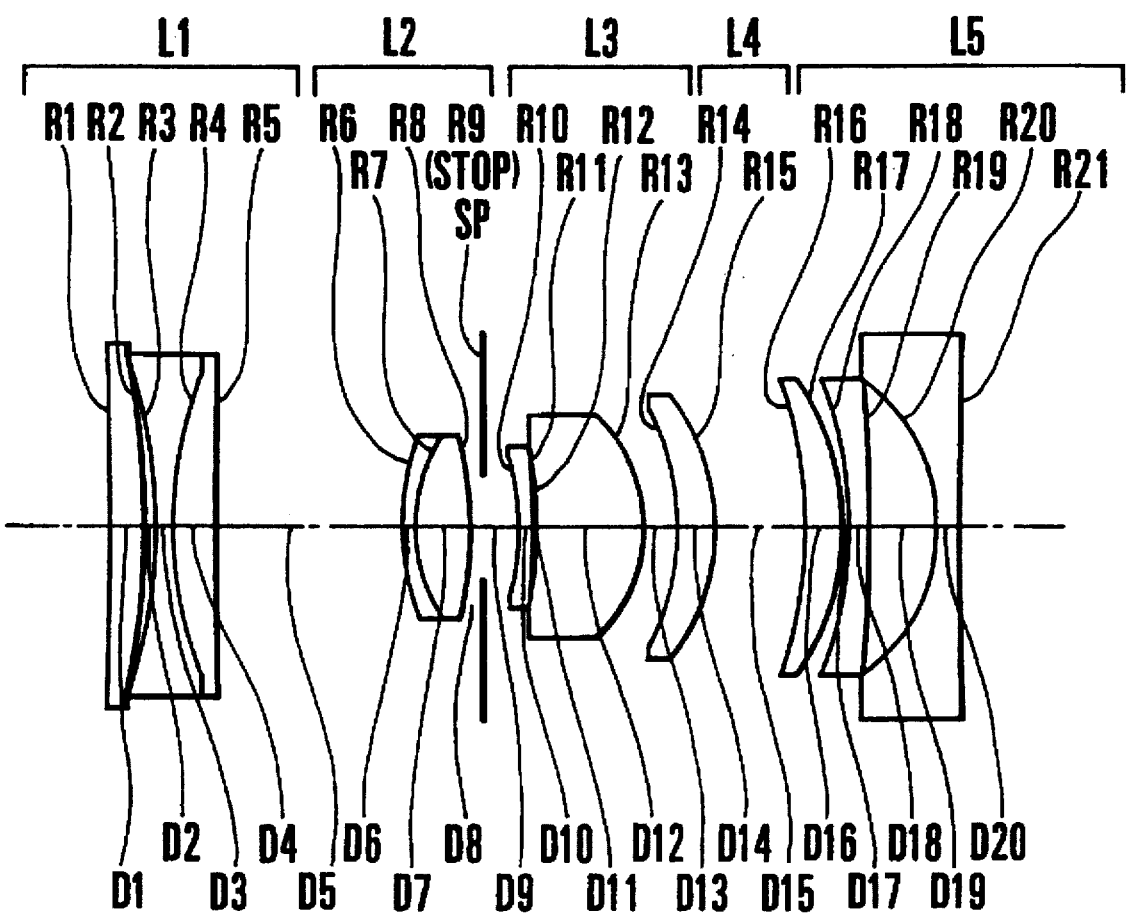
FIG. 49 is a block diagram of a numerical example 25 of the invention in the wide angle end.
Figure 50A:
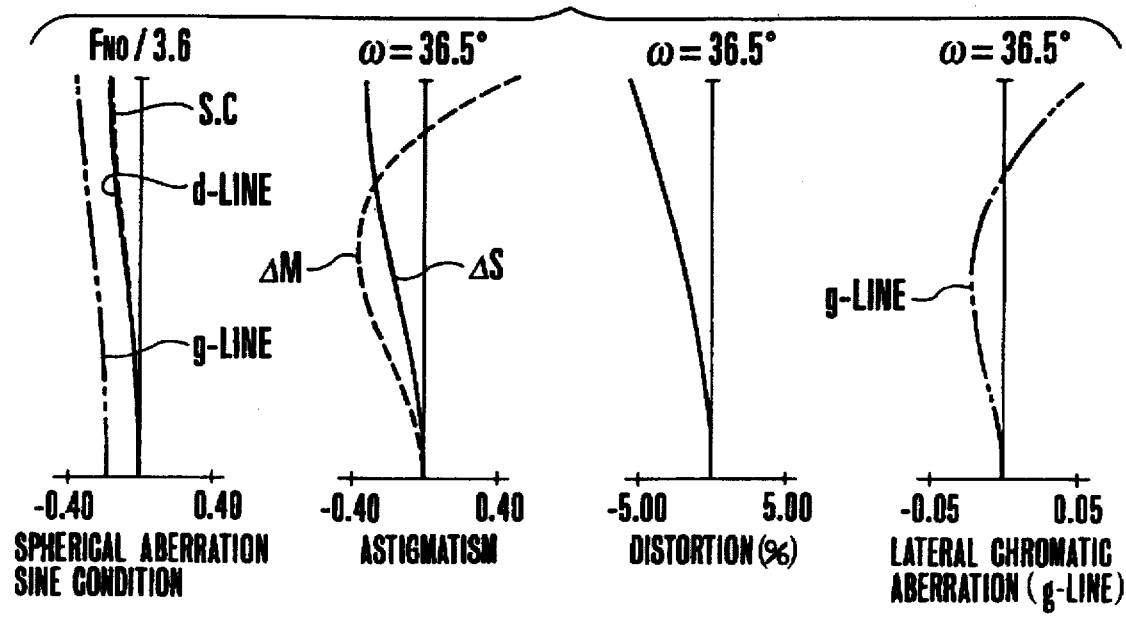
FIGS. 50(A), 50(B) and 50(C) are graphs of the various aberrations of the numerical example 19 of the invention.
Figure 50B:
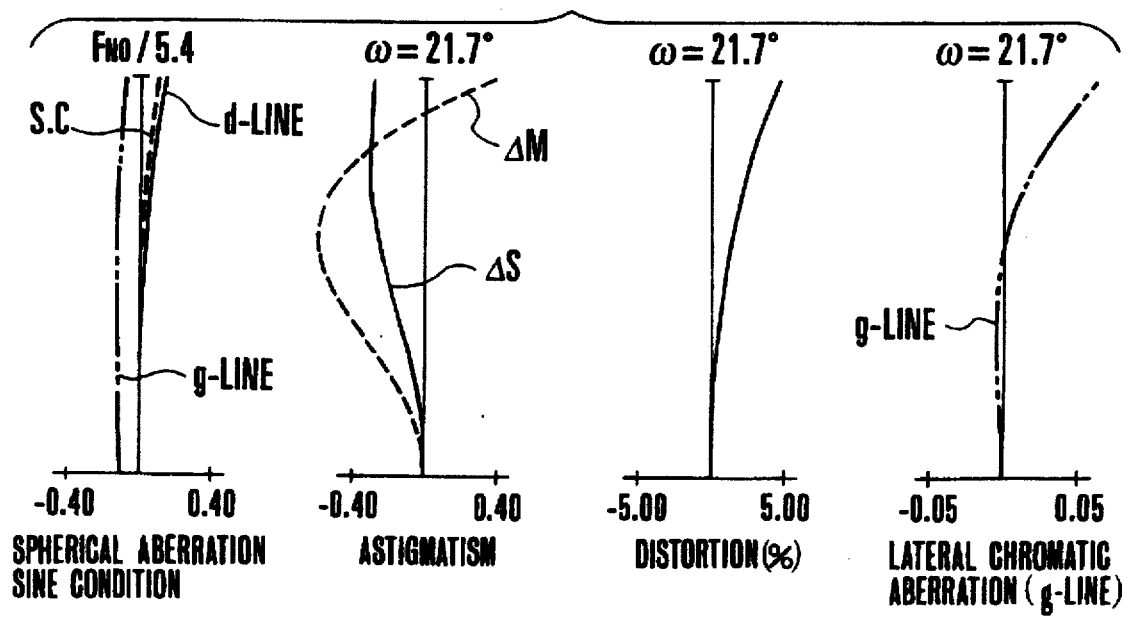
Figure 50C:
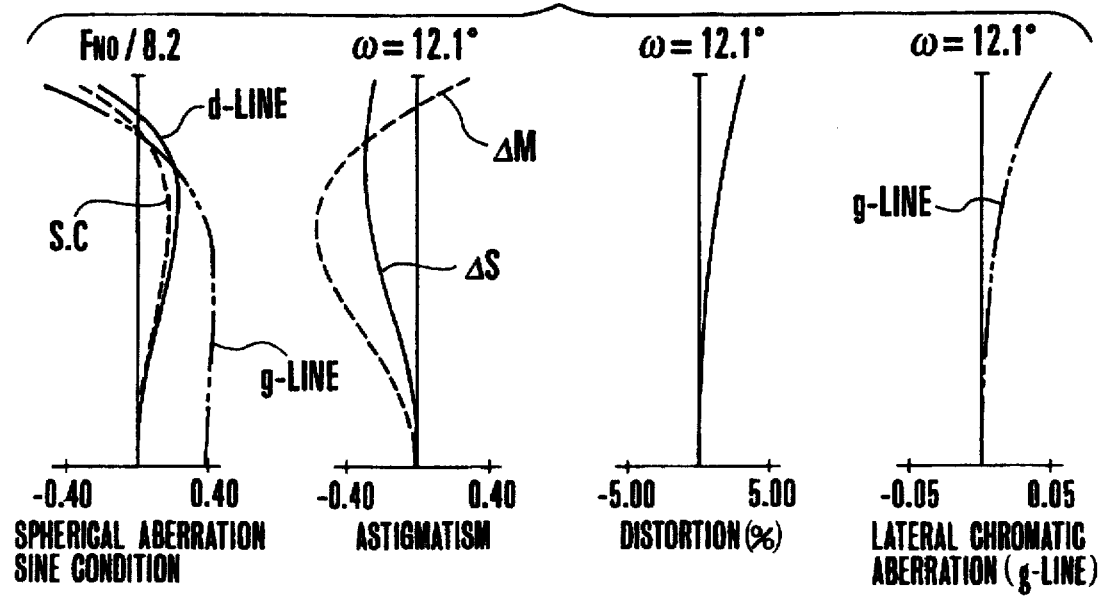
Figure 51A:
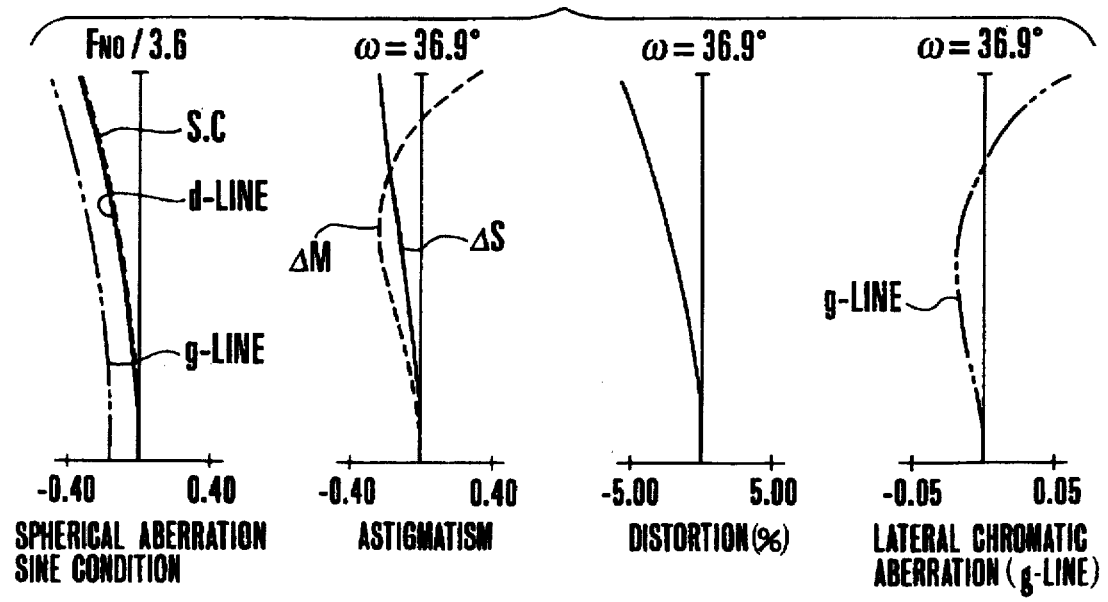
FIGS. 51(A), 51(B) and 51(C) are graphs of the various aberrations of the numerical example 20 of the invention.
Figure 51B:
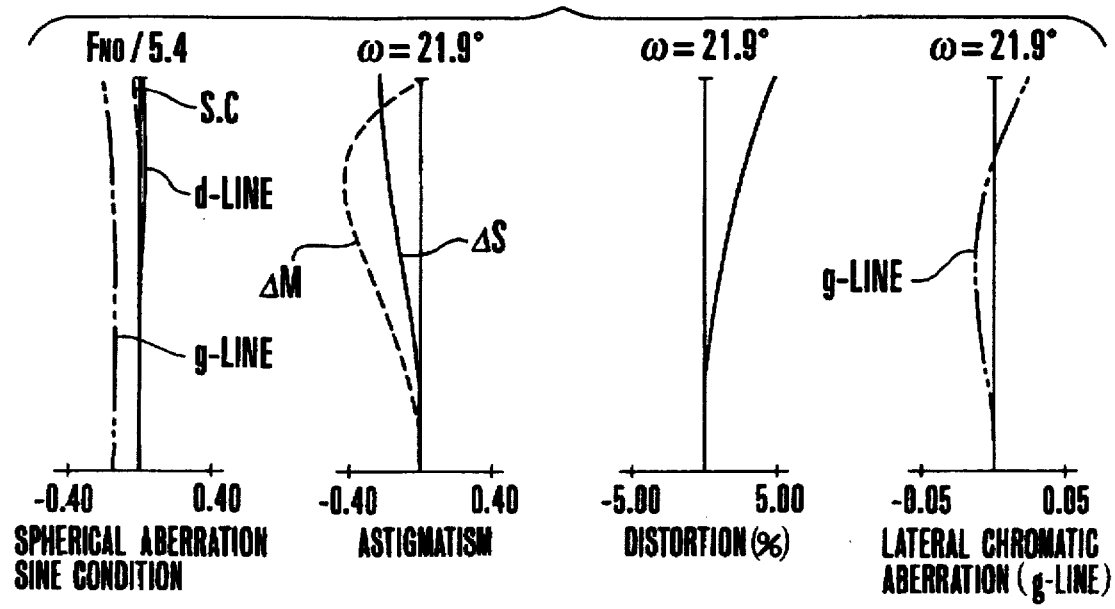
Figure 51C:
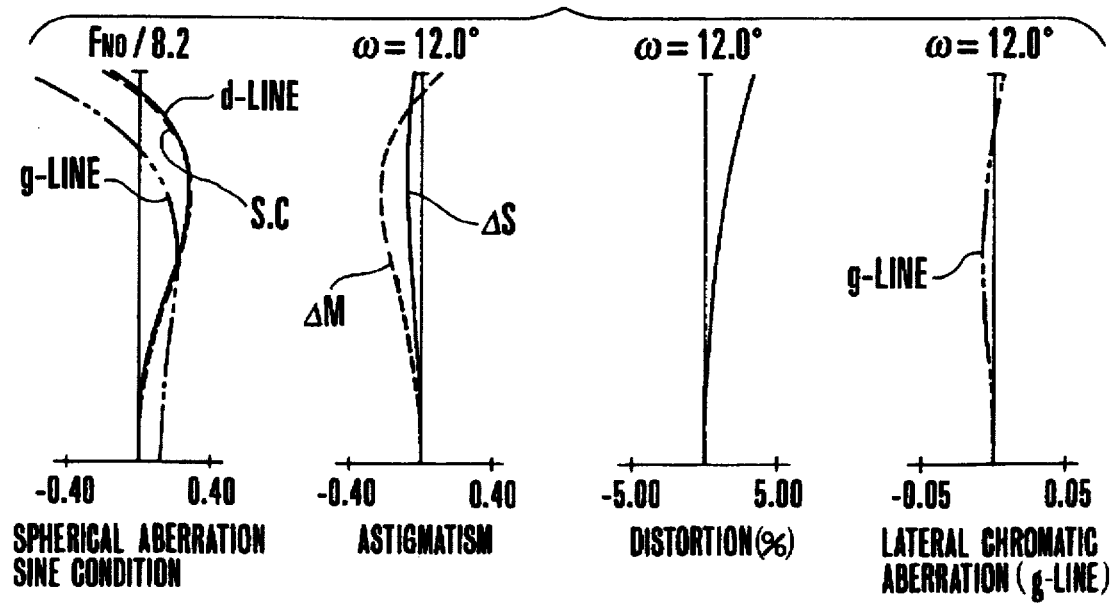
Figure 52A:
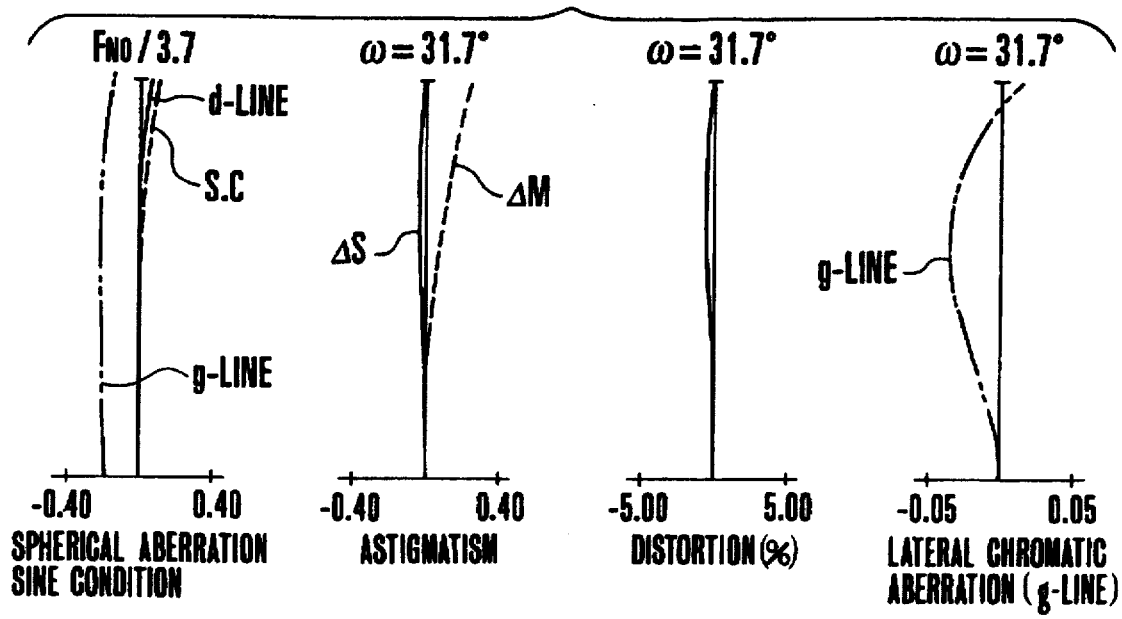
FIGS. 52(A), 52(B) and 52(C) are graphs of the various aberrations of the numerical example 21 of the invention.
Figure 52B:
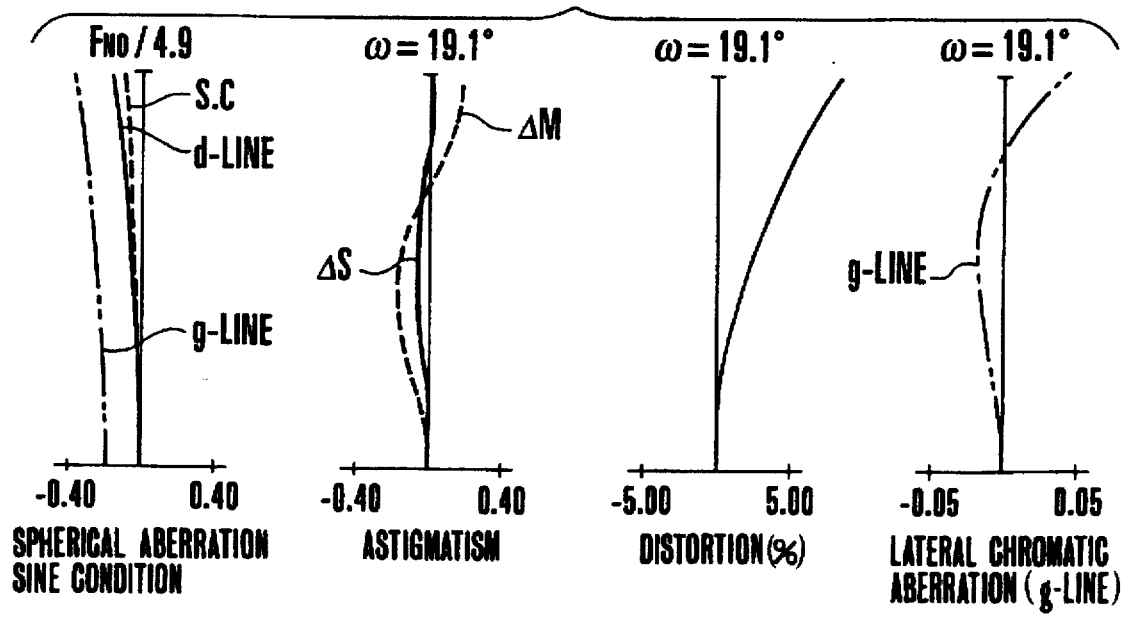
Figure 52C:
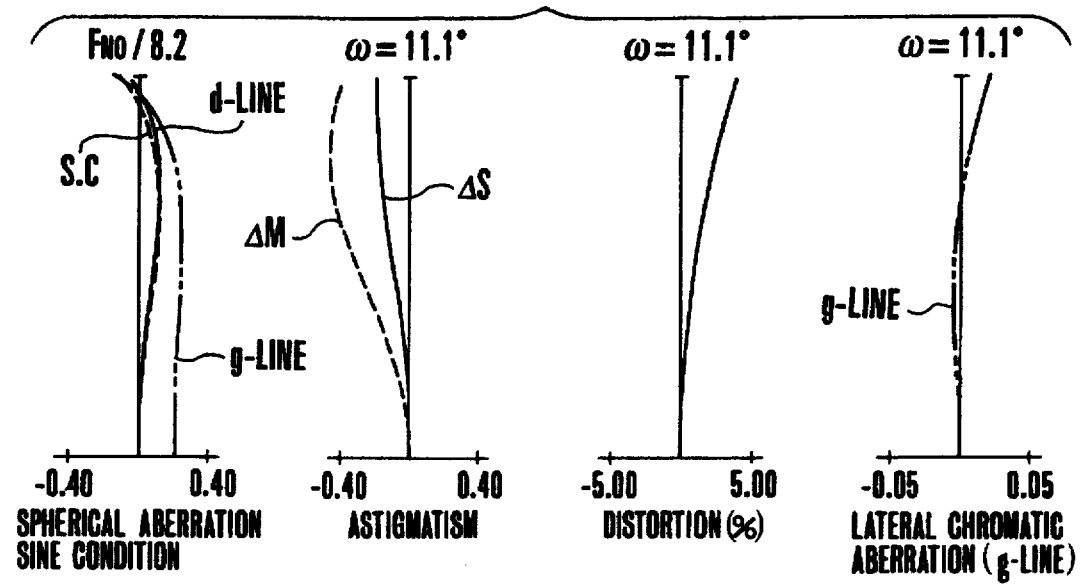
Figure 53A:
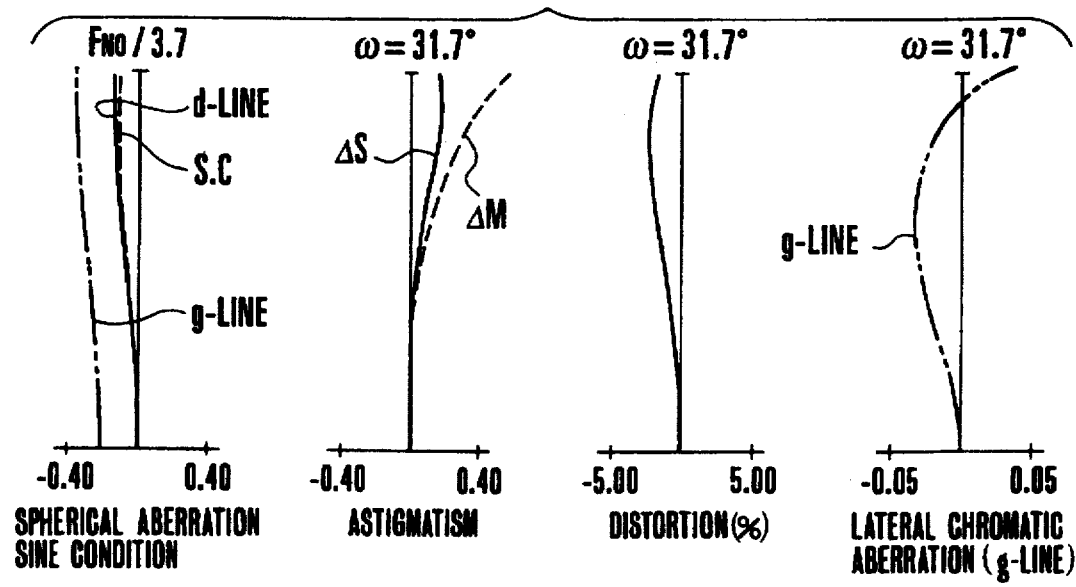
FIGS. 53(A), 53(B) and 53(C) are graphs of the various aberrations of the numerical example 22 of the invention.
Figure 53B:
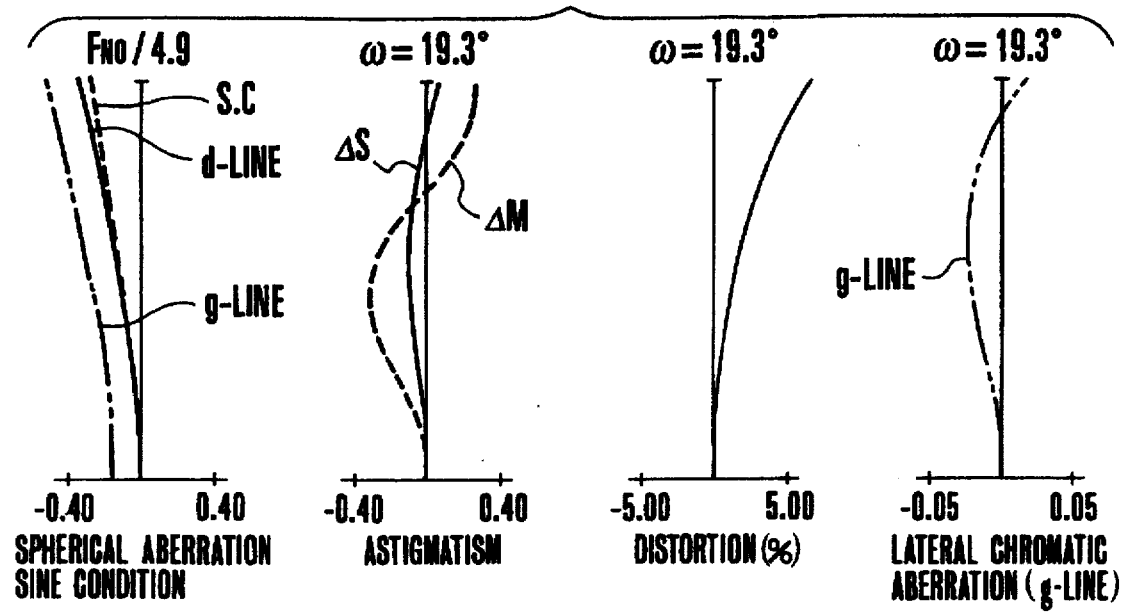
Figure 53C:
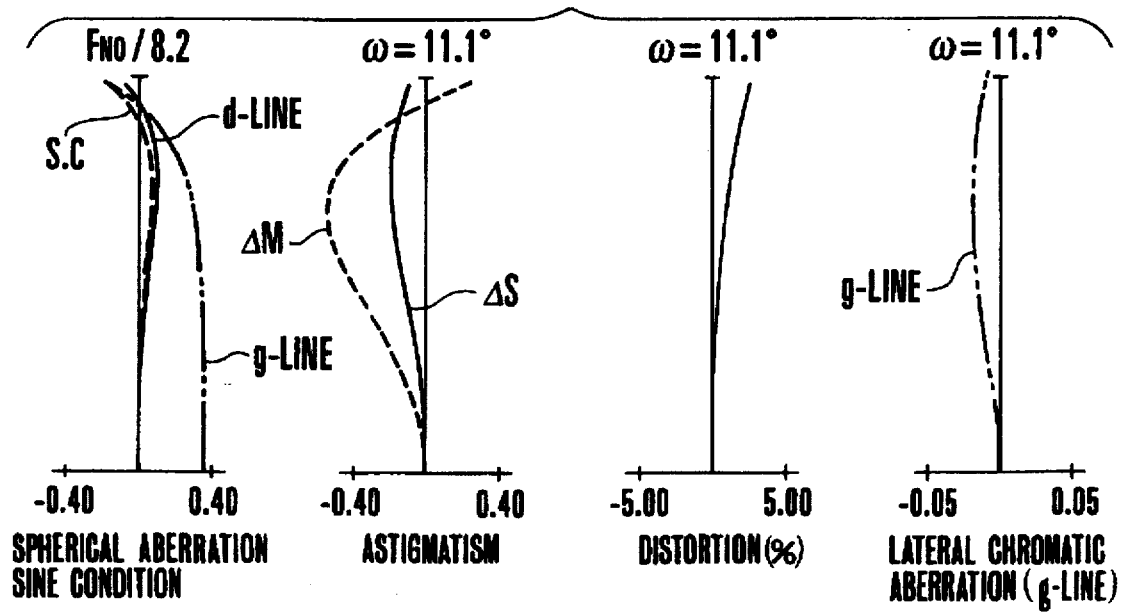
Figure 54A:
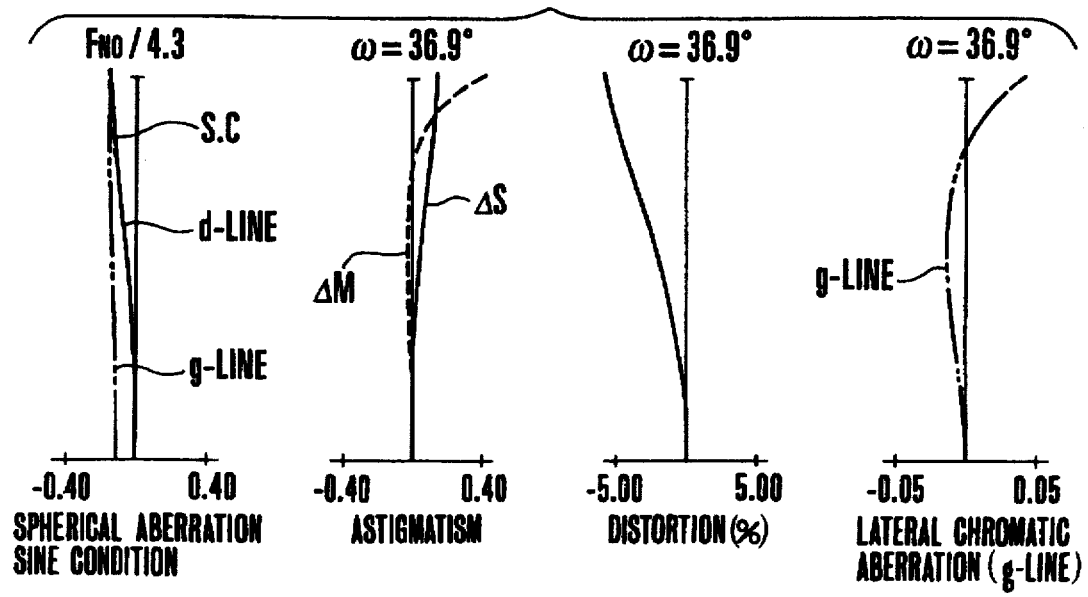
FIGS. 54(A), 54(B) and 54(C) are graphs of the various aberrations of the numerical example 23 of the invention.
Figure 54B:
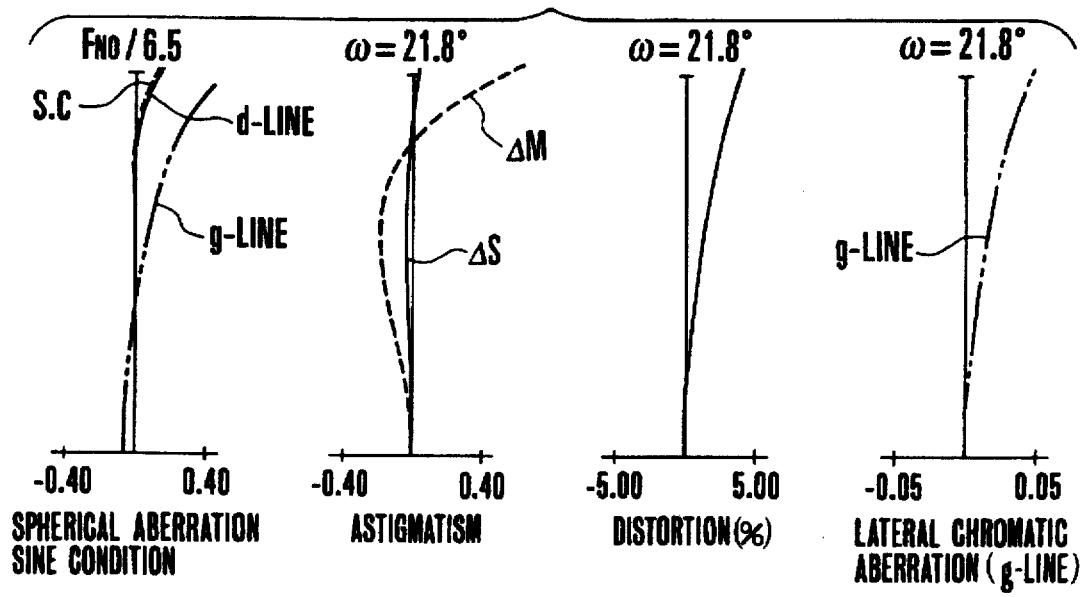
Figure 54C:
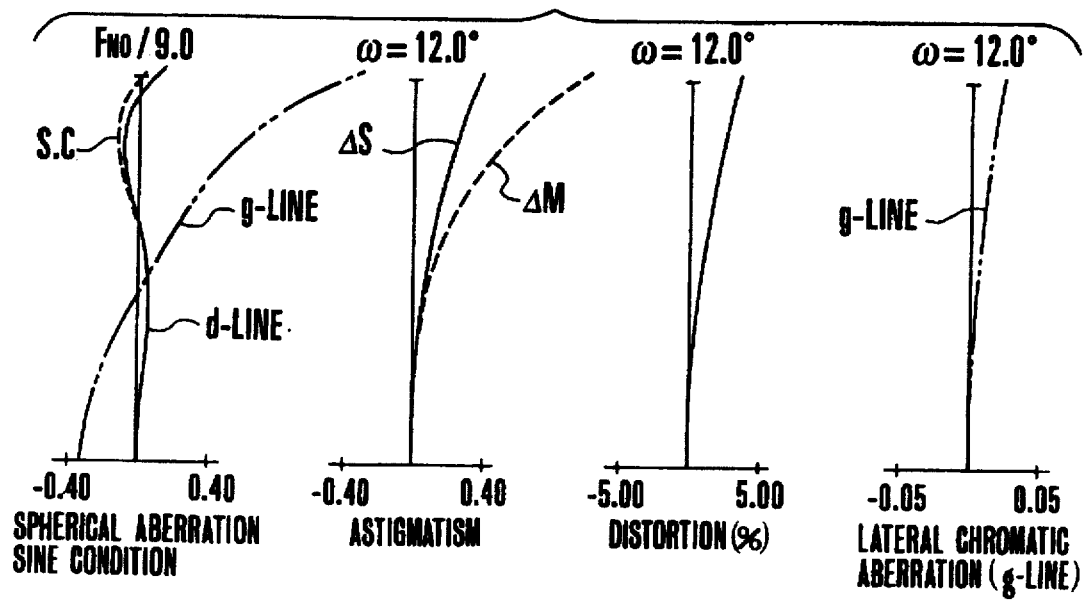
Figure 55A:
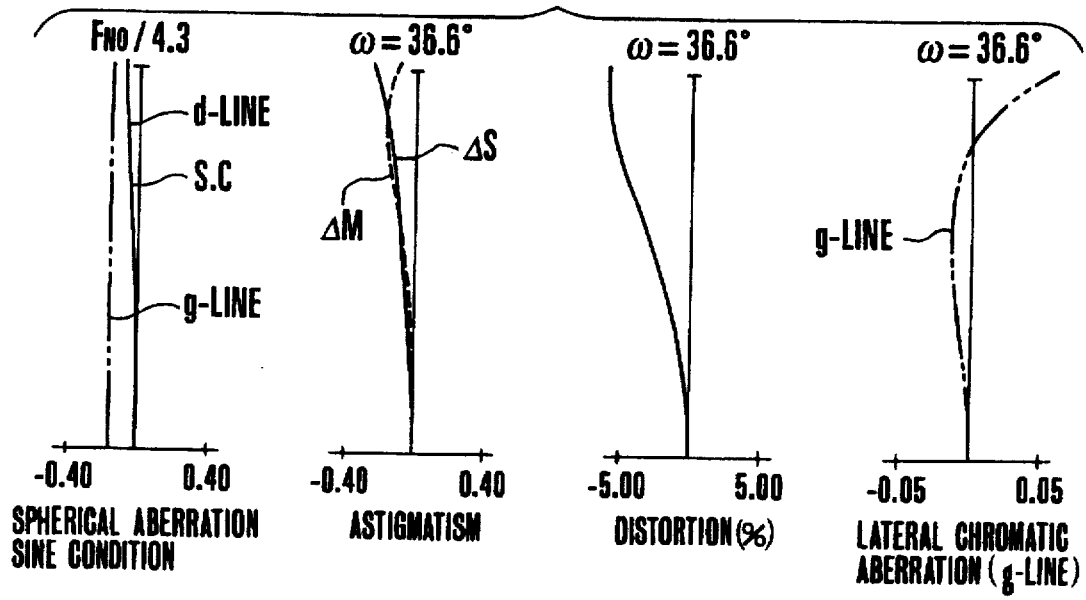
FIGS. 55(A), 55(B) and 55(C) are graphs of the various aberrations of the numerical example 24 of the invention.
Figure 55B:
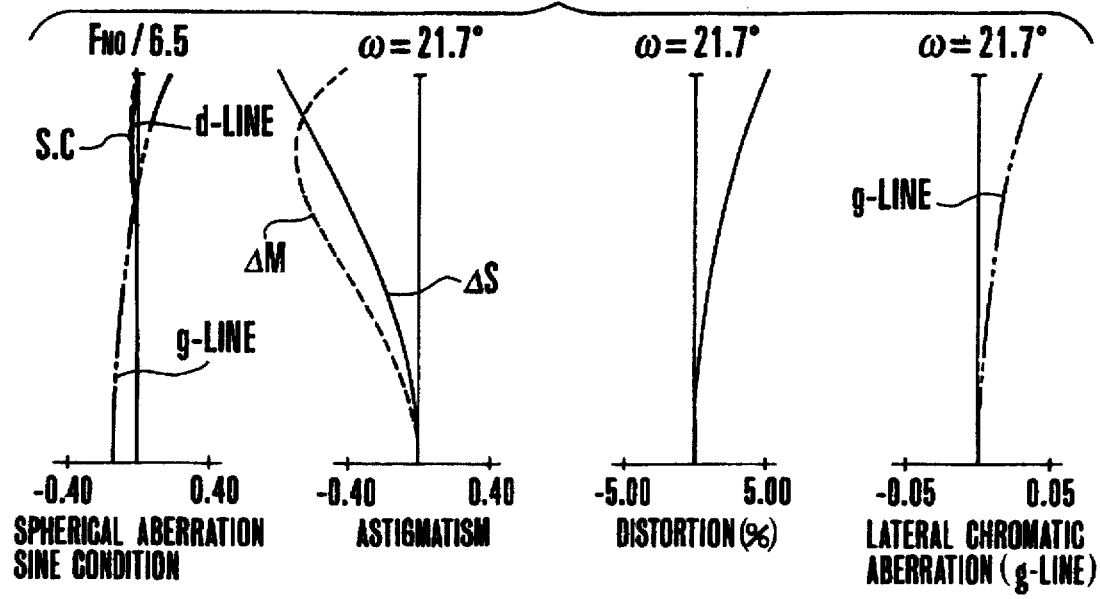
Figure 55C:
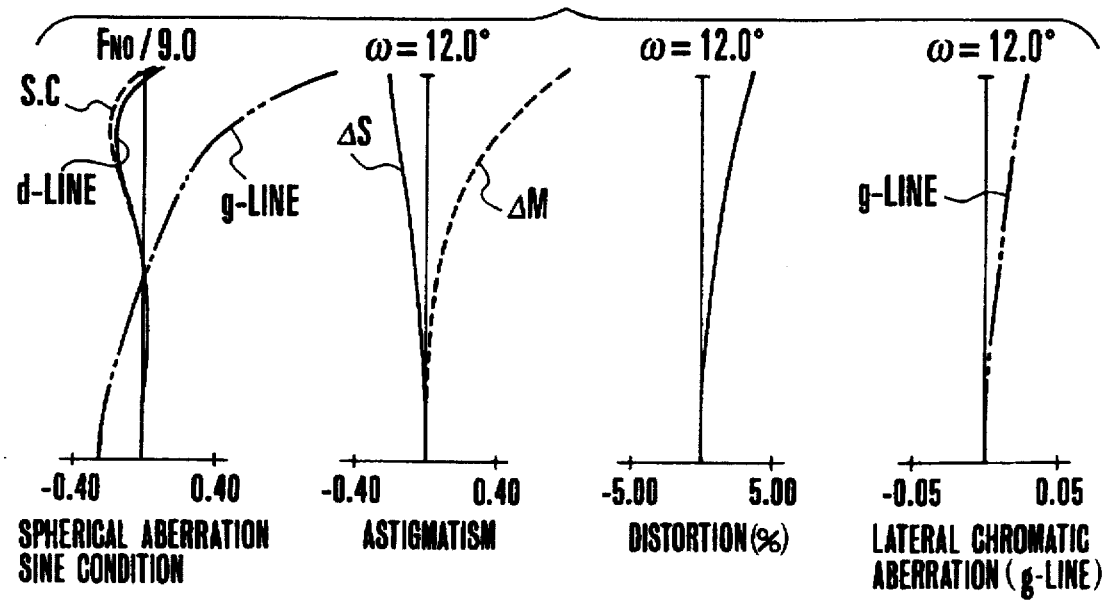
Figure 56A:
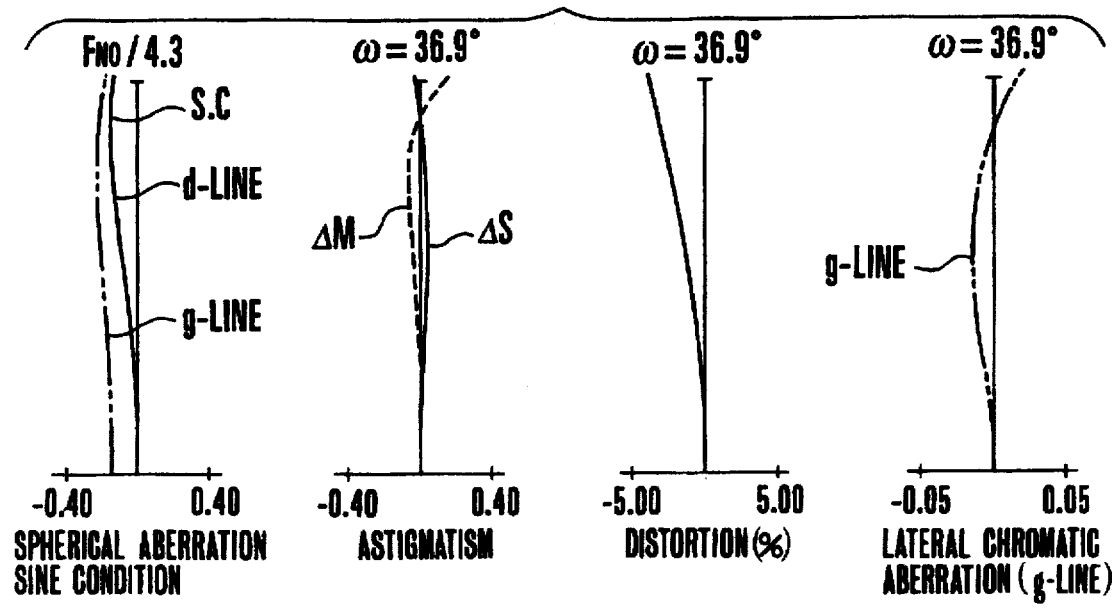
FIGS. 56(A) 56(B) and 56(C) are graphs of the various aberrations of the numerical example 25 of the invention.
Figure 56B:
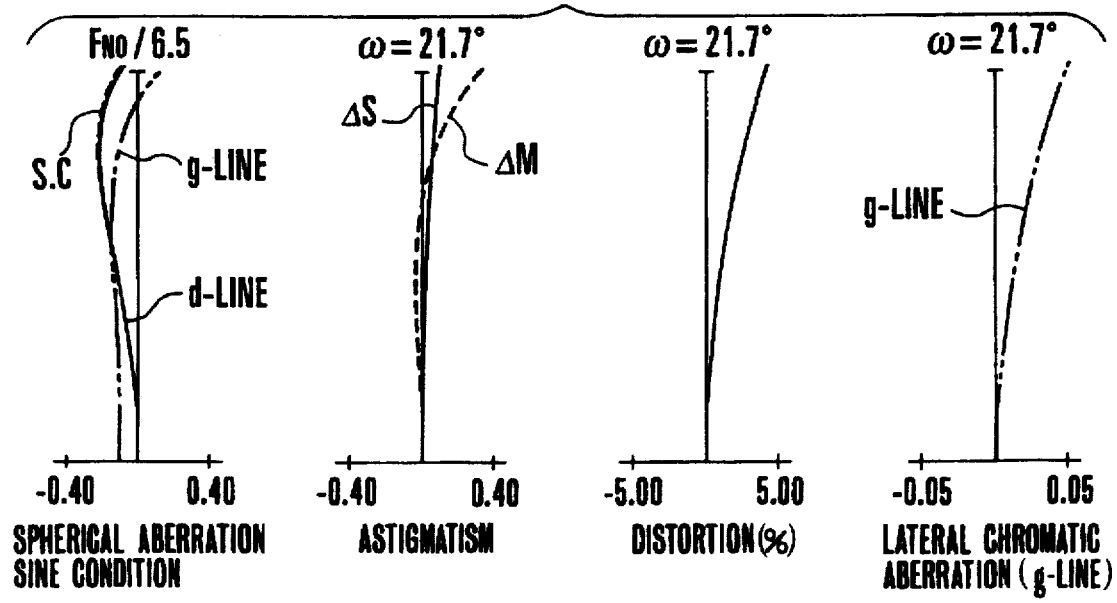
Figure 56C:
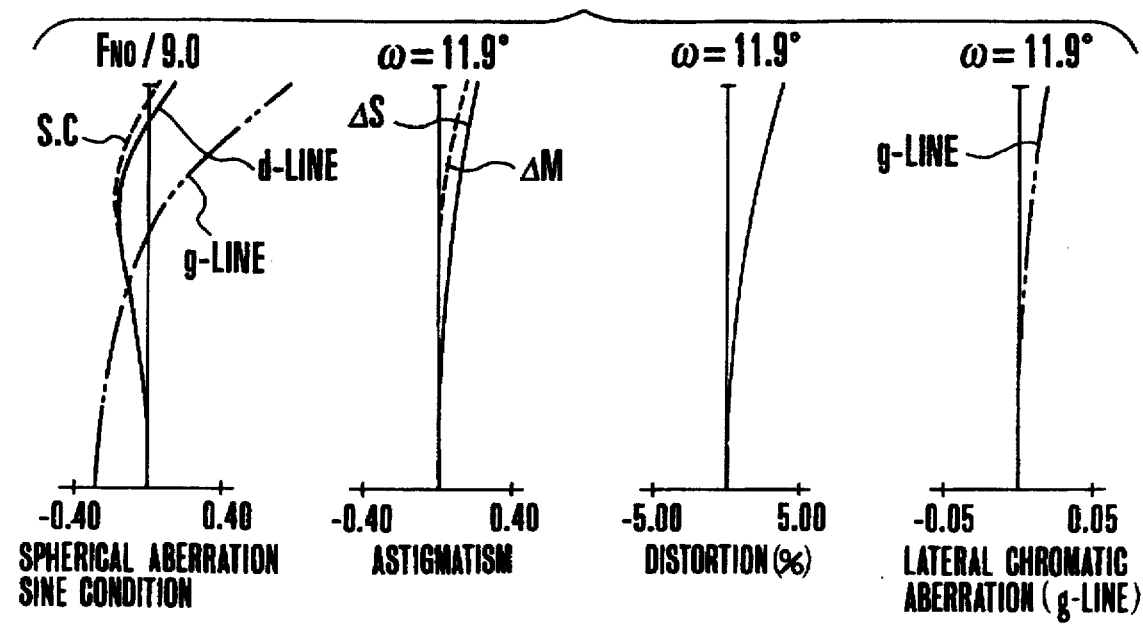

FIG. 41 illustrates the paraxial refractive power arrangements of numerical examples 19 to 22 of the zoom lens of the invention. FIG. 42 illustrates the paraxial refractive power arrangements of numerical examples 23 to 25 of the zoom lens of the invention. In FIG. 41 and FIG. 42, label W designates the wide angle end, and label T designates the telephoto end.

FIG. 43 through FIG. 49 are longitudinal section views of the numerical examples 19 to 25 of zoom lenses of the invention in the wide angle end. FIGS. 50(A) to 50(C) through FIGS. 56(A) to 56(C) are graphic representations of the various aberrations of the numerical examples 19 to 25 of the invention respectively.

In the drawings, reference character LF denotes the front lens group of positive refractive power, and reference character LR denotes the rear lens group. SP stands for a stop and IP for an image plane. Reference character Li (i=1–5) denotes the i-th lens unit. The arrows indicate the directions in which the lens units move axially as zooming from the wide angle end to the telephoto end.

The front lens group LF has the first lens unit L1, the second lens unit L2 and the third lens unit L3, totaling three lens units and, when in the wide angle end, is positive in the overall refractive power. The rear lens group LR has the fourth lens unit L4 of positive refractive power and the fifth lens unit L5 of negative refractive power, totaling two lens units.

As zooming goes from the wide angle end to the telephoto end, the first, second and third lens units all move axially forward in such relation that the second lens unit varies its relative position to the other lens units and that the overall refractive power of the front lens group is weaker when in the telephoto end than when in the wide angle end. The fourth and fifth lens units also move axially forward in such relation that their separation narrows. At this time, in the numerical examples 19 to 22, the separation between the third and fourth lens units is longer when in the telephoto end than when in the wide angle end. The combined system of the third and fourth lens units, as considered to be an independent zoom lens, increases its focal length in response to that zooming operation.

In the numerical examples 23 to 25, on the other hand, because the refractive power of the fourth lens unit is relatively weak, it is better to make an arbitrary locus of movement of the fourth lens unit during zooming, so that aberrations are well corrected throughout the entire zooming range. In the numerical examples 23 to 25, the separation between the third and fourth lens units is shorter when in the telephoto end than when in the wide angle end, for an advantage is produced to achieve a shortening of the total length for the telephoto end of the entire system.

In the present embodiment, for the wide angle end, the first lens unit of positive refractive power is followed after a wide space by the second lens unit of positive refractive power and the third lens unit of positive refractive power. The front lens group is thus made to be a retrofocus type as a whole. By this, the front principal point of the front lens group is brought to a nearer position to the image plane, making it easier to increase the maximum field angle, while preventing the front and rear lens groups from mechanically interfering with each other at their confronting surfaces. Another feature is that the second and third lens units are made to have positive refractive powers. As the front lens group, when in the wide angle end, is of the retrofocus type, its strong positive refractive power is thus distributed over the second and third lens units. This also contributes to an increase of the maximum field angle. The fourth lens unit is moved forward to effect focusing to suit from an infinitely distant object down to a close object.

In the zoom lens of the present embodiment, the focal length f of the entire system is expressed by the following equation:

$$f = fA \cdot \beta 4 \cdot \beta 5 \quad (\beta 4 > 0, \beta 5 > 0)$$

where fA is the overall focal length of the front lens group and βi is the lateral magnification of the i-th lens unit.

In the present embodiment, as is understandable from this equation, the focal length is made to vary from the wide angle end to the telephoto end at a high rate by taking large values of the lateral magnifications β4 and β5 and by elongating the overall focal length fA of the front lens group (or weakening the overall refractive power of the front lens group). In addition, the separation between the fourth lens unit of positive refractive power and the fifth lens unit of negative refractive power is made narrower (to decrease) when in the telephoto end than when in the wide angle end. With this, the fifth lens unit is given a focal length varying effect, making it easier to increase the zoom ratio. For the rear lens group, the divergence or negative refractive power is made even stronger when in the telephoto end. So, along with the front lens group of positive refractive power, it forms a system of the telephoto type. In such a manner, the minimization of the size of the entire lens system is achieved.

In particular, the adopted paraxial refractive power arrangement in the present embodiment is that shown in FIG. 41, which assures increase of the maximum field angle to such a value that the shortest focal length is smaller than the diagonal length of the image frame.

Specifically speaking, the front lens group comprises a first lens unit of negative refractive power, a second lens unit of positive refractive power and a third lens unit of positive refractive power, wherein when zooming from the wide angle end to the telephoto end, all these lens units move forward in such relation that the separation between the first and second lens units decreases and the separation between the second and third lens units increases.

In connection with the numerical examples 19 to 22, it is to be noted that, for the purpose of simplifying the structure of the operating mechanism, the first and third lens units are moved in unison. However, they may otherwise be moved in differential relation to increase the degree of freedom on design.

In the present embodiment, such construction and arrangement of the lens units is combined with the following conditions:

$$0.4 < |f5/fW| < 1.5 \quad (18)$$

$$1.1 < \beta 5 \, W < 1.9 \quad (19)$$

where f5 is the focal length of the fifth lens unit, fW is the shortest focal length of the entire system and β5W is the lateral magnification for the wide angle end of the fifth lens unit.

When these conditions are satisfied, improved results are attained in the reduction of the size of the entire system and the maintenance of high optical performance over the entire zooming range.

The technical significance of each of the above-described conditions is explained below.

The inequalities of condition (18) are concerned with the negative refractive power of the fifth lens unit and have an aim chiefly to carry out the variation of the focal length advantageously. When the negative refractive power of the fifth lens unit is weaker than the upper limit of the condition (18), that lens unit lessens its contribution to the effect of varying the focal length. As a result, the movement of each lens unit has to increase. Or otherwise, the predetermined value of the zoom ratio could not be obtained. So, the entire lens system gets an increased total length.

Conversely when the lower limit of the condition (18) is exceeded, the entire lens system functions as too strong a telephoto type system in the wide angle end, because the first to the fourth lens units have a positive overall refractive power and the fifth lens unit has a negative refractive power.

From this reason, as a result, the lens system gets too short of a back focal distance. To secure a certain corner illumination, therefore, the outer diameter of the fifth lens unit has to increase greatly. At the same time, because that lens unit gets too strong of a refractive power, higher order field curvature and astigmatism are produced which are difficult to correct.

The inequalities of condition (19) are concerned with the lateral magnification of the fifth lens unit.

Now, the back focal distance BfW for the wide angle end of the lens system is expressed by:

$$BfW = f5 \cdot (1 - \beta 5W)$$

In the present embodiment, therefore, along with the condition (18), the factor of the condition (19) is taken at an appropriate value to make a good compromise between the total length of the entire lens system and the aberration correction.

When the image magnification is greater than the upper limit of the condition (19), the back focal distance becomes long, but the first to fourth lens units get too strong of refractive powers to minimize the variation of aberrations. Conversely when the image magnification is weaker than the lower limit, it becomes difficult to obtain the predetermined value of the back focal distance. Further, the outer diameter of the fifth lens unit increases objectionably.

It should be pointed out that, in the present embodiment, while maintaining good stability of aberrations against zooming, the maximum field angle is increased. In addition, the image aberrations are corrected for high optical performance over the entire area of the image frame. For this purpose, additional features for the lens units are set forth as follows:

(i) It is preferred to satisfy the following conditions:

$$0.3 < fW \cdot \phi_{123W} < 1.8 \tag{20}$$

$$0.6 < f3/fW < 2.5 \tag{21}$$

where $\phi_{123W}$ is the overall refractive power for the wide angle end of the front lens group.

The inequalities of condition (20) are concerned with the refractive power of the front lens group. When the upper limit of the condition (20) is exceeded, as this implies that the refractive power of the front lens group in the wide angle end is too strong, the telephoto function of the lens system becomes strong. Therefore, it becomes difficult to obtain a positive value of the back focal distance. When the lower limit is exceeded, as this implies that the refractive power of the front lens group weakens, the entire lens system gets a longer total length, and, at the same time, because the positive refractive power of the rear lens group is strengthened to retain the desired value of the shortest focal length, it becomes difficult to keep all aberrations in good balance over the entire zooming range.

The inequalities of condition (21) are concerned with the positive refractive power of the third lens unit. When the upper limit of the condition (21) is exceeded, as this implies that the refractive power of the third lens unit is too weak, the total zooming movement of the third lens unit increases to increase the size of the entire lens system. When the lower limit is exceeded, the third lens unit produces large spherical aberrations of higher order, which are difficult to correct.

It is to be noted that, in the present embodiment, particularly for the wide angle end, the total length of the entire system is shortened. Despite this, the aberration correction is further improved for high optical performance by altering the upper and lower limits of the conditions (20) and (21) as follows:

$$0.4 < fW \cdot \phi_{123W} 1.5 \tag{20a}$$

$$0.9 < f3/fW < 2.0 \tag{21a}$$

(ii) It is preferred to satisfy the following conditions:

$$0.8 < |f1/fW| < 5.0 \tag{22}$$

$$0.7 < f2/fW < 6.0 \tag{23}$$

$$0.15 < (\phi_{123W}/\phi_{123T})/Z < 0.8 \tag{24}$$

$$0.25 < \beta 4W < 1.2 \tag{25}$$

$$0.1 < f5 \cdot (1-\beta 5W)/fW < 0.7 \tag{26}$$

where $\phi_{123T}$ is the overall focal length for the telephoto end of the front lens group and Z is the zoom ratio.

The inequalities of condition (22) are concerned with the ratio of the refractive powers for the wide angle end of the entire system and the first lens unit. When the upper limit of the condition (22) is exceeded, as this implies that the refractive power of the first lens unit is too weak, the entire system gets a long total length. When the lower limit is exceeded, such a strong refractive power of the first lens unit makes it difficult to secure the predetermined value of the back focal distance in the wide angle end.

The inequalities of condition (23) are concerned with the ratio of the refractive powers for the wide angle end of the entire system and the second lens unit. When the upper limit of the condition (23) is exceeded, as this implies that the refractive power of the second lens unit is too weak, the total zooming movement of the lens unit increases to increase the size of the entire system. When the lower limit is exceeded, such a strong refractive power of the second lens unit causes the refractive power of the third lens unit also to become strong, which in turn causes spherical aberration to correct with objectionably increased difficulty.

The inequalities of condition (24) are concerned with the ratio of variation of the focal length of the front lens group. When the upper limit of the condition (24) is exceeded, the front lens group has to take a large share of the variation of the focal length of the entire system. In turn, it results in some cases that the refractive powers of the lens units in the front lens group increase greatly, or in other cases that the total zooming movement of each of the lens unit increase greatly. When the lower limit is exceeded, the rear lens group has to take a large share of the zoom ratio. To secure the predetermined value of the zoom ratio, the total zooming movement of each of the lens units in the rear lens group comes to increase objectionably.

The inequalities of condition (25) are concerned with the lateral magnification for the wide angle end of the fourth lens unit. When the upper limit of the condition (25) is exceeded, the back focal distance for the wide angle end can be hardly be at a desired value. As a result, the fifth lens unit gets a large outer diameter. When the lower limit is exceeded, the refractive powers of the other lens units increase to obtain the predetermined values of the focal length. Therefore, it becomes difficult to correct the variation of aberrations with zooming. Further, the focal length of the front lens group has to be made even longer, causing the total length of the entire system to increase objectionably.

The inequalities of condition (26) give a proper range for the refractive power and lateral magnification of the fifth lens unit and have an aim chiefly to obtain the predetermined value of the back focal distance. When the upper limit of the condition (26) is exceeded, the back focal distance becomes longer than necessary in the wide angle end, causing the total length of the entire system to increase largely. When the lower limit is exceeded, it becomes difficult to obtain the predetermined value of the back focal distance in the wide angle end. Moreover, the outer diameter of the fifth lens unit comes to increase. So, it should be avoided.

Again, particularly for a case that the third and fourth lens units have relatively strong refractive powers, if the lateral magnification $\beta 4W$ of the fourth lens unit falls within the following range, $$0.25 < \beta 4W < 0.6$$

it is desirable from the standpoint of achieving a compact, excellent optical system to alter the ranges for the factors of the conditions (20) and (23) as follows:

$$0.3 < fW \cdot \phi_{123W} < 0.9 \quad (20b)$$

$$1.8 \leq f2/fW < 6.0 \quad (23b)$$

For another case that the third lens unit has a relatively strong refractive power and the fourth lens unit has a relatively weak refractive power, if the lateral magnification β4W of the fourth lens unit falls within the following range:

$$0.6 \leq \beta 4W < 1.2$$

it is desirable from the standpoint of achieving a compact, excellent optical system to alter the ranges for the factors of the conditions (20) and (23) as follows:

$$0.9 \leq fW \cdot \phi 123W < 1.8 \quad (20c)$$

$$0.7 < f2/fW < 1.8 \quad (23c)$$

(iii) The first lens unit of negative refractive power has at least one positive and at least one negative lens. Of these, the negative lenses are better formed to such shapes that the rear lens surfaces are concave in curvature toward the image side.

(iv) If an aspheric surface is introduced into the zoom lens of the present embodiment, it is recommended that the aspheric surface is positioned on the object side of the stop and formed to such a shape that the positive refractive power gets progressively weaker (or the negative refractive power gets progressively stronger) as the distance from the optical axis increases. If so, it becomes easy to correct curvature of field and spherical aberration in the telephoto end, to maintain good stability of aberrations with zooming, and to correct image aberrations over the entire area of the image frame. If introduced into the fifth lens unit, it becomes possible to correct mainly off-axial aberrations.

(v) The fifth lens unit of negative refractive power includes at least one negative and at least one positive lens having a concave surface facing the object side and preferably satisfies the following condition:

$$12 < v5N - v5P < 35 \quad (27)$$

where v5P and v5N are the mean values of the Abbe numbers of the materials of the positive and negative lenses in the fifth lens unit respectively. When either of the upper and lower limits of the condition (27) is violated, the chromatic aberrations vary to a large extent with zooming, which is difficult to correct by any design of the other lens units.

(vi) The stop is preferably positioned in one of the spaces between the rearmost lens surfaces of the third and fourth lens units. With this, the entrance pupil can take an appropriate position to suppress the variation of aberrations with zooming. When zooming, the stop may be moved either in differential relation to the other lens units, or in unison with one of the other lens units. If so, it becomes possible for the stop to take its place in the neighborhood of the entrance pupil that changes its position with zooming, thereby giving an advantage of preventing the field curvature from varying when the stop has a small aperture.

If, as focusing is performed by the fourth lens unit, the fourth lens unit contains the stop, it is preferred that the stop is made axially stationary during focusing, because the driving torque for the diaphragm mechanism can be reduced by an amount which would be otherwise necessary to shift the stop with focusing.

(vii) The fourth lens unit is preferably divided into two or more parts which move axially in differential relation when focusing, because the variation of aberrations not only with zooming but also with focusing can be lessened.

(viii) In the numerical examples 19 to 22 of the invention, the fourth lens unit is used for focusing, and, the numerical examples 23 to 25, the third and fourth lens units are used in unified form for focusing. In either case, the focusing unit or units move forward as the object distance decreases from infinity to a minimum. Any other lens unit or units may be used instead. For example, the front lens group is moved forward.

Again, if the back focal distance in the wide angle end is long enough, the fifth lens unit may be used. In this case, it moves toward the image side, thereby giving an advantage of reducing the outer diameter of the first lens unit. It is also possible to move two or more of the first to fifth lens units simultaneously.

Next, numerical examples 19 to 25 of the invention are shown. The values of the factors in the above-described conditions for the numerical examples 19 to 25 are also listed in Table-3.

NUMERICAL EXAMPLE 19 f = 29.25–101.00  Fno = 1:3.6–8.2  2ω = 73.0°–24.2°

| | | | | |
|---|---|---|---|---|
| R1 = −136.48 | D1 = 1.30 | N1 = 1.80400 | v1 = 46.6 |
| R2 = 44.39 | D2 = 0.41 | | |
| R3 = 53.68 | D3 = 3.00 | N2 = 1.80518 | v2 = 25.4 |
| R4 = −226.68 | D4 = 1.10 | N3 = 1.66998 | v3 = 39.3 |
| R5 = 35.15 | D5 = Variable | | |
| R6 = 36.05 | D6 = 1.00 | N4 = 1.84666 | v4 = 23.8 |
| R7 = 22.91 | D7 = 2.70 | N5 = 1.48749 | v5 = 70.2 |
| R8 = −148.68 | D8 = | | |
| R9 = 29.98 | D9 = 2.80 | N6 = 1.56873 | v6 = 63.2 |
| R10 = −61.97 | D10 = Variable | | |
| R11 = −20.25 | D11 = 0.87 | N7 = 1.64769 | v7 = 33.8 |
| R12 = −96.09 | D12 = 1.00 | | |
| R13 = (Stop) | D13 = 1.00 | | |
| R14 = −49.89 | D14 = 0.78 | N8 = 1.48749 | v8 = 70.2 |
| R15 = 41.40 | D15 = 2.10 | N9 = 1.84666 | v9 = 23.8 |
| R16 = −42.55 | D16 = 5.60 | | |
| R17 = 31.32 | D17 = 1.10 | N10 = 1.84666 | v10 = 23.8 |
| R18 = 12.25 | D18 = 5.50 | N11 = 1.58313 | v11 = 59.4 |
| R19 = −25.47 | D19 = Variable | | |
| R20 = −31.70 | D20 = 3.50 | N12 = 1.84666 | v12 = 23.8 |

Aspheric Coefficient: R19

| K = −1.81 × 10⁻¹ | A = 0 | B = 8.60 × 10⁻⁶ |
|---|---|---|
| C = 9.07 × 10⁻⁸ | D = −1.91 × 10⁻⁹ | E = 0 |

| Variable | Focal Length | | |
|---|---|---|---|
| Separation | 29.25 | 54.30 | 101.00 |
| D5 | 8.06 | 4.58 | 0.94 |
| D8 | 0.80 | 4.28 | 7.92 |
| D10 | 2.60 | 11.52 | 20.99 |
| D19 | 12.31 | 5.61 | 0.92 |

NUMERICAL EXAMPLE 20

| f = 28.84~101.48 | Fno = 1:3.6~8.2 | 2ω = 73.8°~24.1° |
|---|---|---|

| R1 = −107.63 | D1 = 1.30 | N1 = 1.80400 | ν1 = 46.6 |
| R2 = 29.11 | D2 = 3.50 | N2 = 1.80518 | ν2 = 25.4 |
| R3 = 188.37 | D3 = 0.38 | | |
| R4 = 248.08 | D4 = 1.10 | N3 = 1.60342 | ν3 = 38.0 |
| R5 = 33.55 | D5 = Variable | | |
| R6 = 33.40 | D6 = 1.00 | N4 = 1.84666 | ν4 = 23.8 |
| R7 = 19.67 | D7 = 2.70 | N5 = 1.48749 | ν5 = 70.2 |
| R8 = −176.19 | D8 = Variable | | |
| R9 = 29.75 | D9 = 2.80 | N6 = 1.56873 | ν6 = 63.2 |
| R10 = −53.64 | D10 = Variable | | |
| R11 = −19.54 | D11 = 0.87 | N7 = 1.64769 | ν7 = 33.8 |
| R12 = −93.56 | D12 = 1.00 | | |
| R13 = (Stop) | D13 = 1.00 | | |
| R14 = −57.06 | D14 = 0.78 | N8 = 1.48749 | ν8 = 70.2 |
| R15 = 36.54 | D15 = 2.10 | N9 = 1.84666 | ν9 = 23.8 |
| R16 = −45.52 | D16 = 4.85 | | |
| R17 = 34.65 | D17 = 1.10 | N10 = 1.84666 | ν10 = 23.8 |
| R18 = 12.82 | D18 = 5.50 | N11 = 1.58313 | ν11 = 59.4 |
| R19 = −23.25 | D19 = Variable | | |
| R20 = −33.52 | D20 = 3.00 | N12 = 1.84666 | ν12 = 23.8 |
| R21 = −17.94 | D21 = 0.15 | | |
| R22 = −20.79 | D22 = 1.30 | N13 = 1.83481 | ν13 = 42.7 |
| R23 = −171.17 | D23 = 4.39 | | |
| R24 = −17.91 | D24 = 1.50 | N14 = 1.78590 | ν14 = 44.2 |
| R25 = −73.32 | | | |

Aspheric Coefficient: R19

| $K = -3.37 \times 10^{-1}$ | $A = 0$ | $B = 1.15 = 10^{-5}$ |
| $C = -2.60 \times 10^{-8}$ | $D = -2.60 \times 10^{-10}$ | $E = 0$ |

| Variable | Focal Length | | |
|---|---|---|---|
| Separation | 28.84 | 53.76 | 101.48 |
| D5 | 8.23 | 4.52 | 0.95 |
| D8 | 0.80 | 4.51 | 8.07 |
| D10 | 2.60 | 11.64 | 21.21 |
| D19 | 12.21 | 5.69 | 0.79 |

NUMERICAL EXAMPLE 21

| f = 35.00~110.12 | Fno = 1:3.7~8.2 | 2ω = 63.4°~22.2° |
|---|---|---|

| R1 = −209.03 | D1 = 1.30 | N1 = 1.80400 | ν1 = 46.6 |
| R2 = 127.91 | D2 = 0.41 | | |
| R3 = 143.81 | D3 = 3.00 | N2 = 1.80518 | ν2 = 25.4 |
| R4 = −90.07 | D4 = 1.10 | N3 = 1.66998 | ν3 = 39.3 |
| R5 = 50.47 | D5 = Variable | | |
| R6 = 36.53 | D6 = 1.00 | N4 = 1.84666 | ν4 = 23.8 |
| R7 = 25.31 | D7 = 3.80 | N5 = 1.48749 | ν5 = 70.2 |
| R8 = −1105.62 | D8 = Variable | | |
| R9 = 36.04 | D9 = 3.20 | N6 = 1.56873 | ν6 = 63.2 |
| R10 = −160.41 | D10 = Variable | | |
| R11 = (Stop) | D11 = 1.30 | | |
| R12 = −21.36 | D12 = 0.87 | N7 = 1.64769 | ν7 = 33.8 |
| R13 = −289.38 | D13 = 2.00 | | |
| R14 = −78.97 | D14 = 0.78 | N8 = 1.48749 | ν8 = 70.2 |
| R15 = 46.97 | D15 = 2.10 | N9 = 1.84666 | ν9 = 23.8 |
| R16 = −48.67 | D16 = 5.60 | | |
| R17 = 32.95 | D17 = 1.10 | N10 = 1.84666 | ν10 = 23.8 |
| R18 = 14.36 | D18 = 5.50 | N11 = 1.58313 | ν11 = 59.4 |
| R19 = −27.03 | D19 = Variable | | |
| R20 = −30.81 | D20 = 3.50 | N12 = 1.84666 | ν12 = 23.8 |
| R21 = −19.27 | D21 = 0.20 | | |
| R22 = −30.53 | D22 = 1.30 | N13 = 1.80610 | ν13 = 41.0 |
| R23 = −115.65 | D23 = 4.89 | | |
| R24 = −18.03 | D24 = 1.50 | N14 = 1.78590 | ν14 = 44.2 |
| R25 = −118.71 | | | |

Aspheric Coefficient: R19

| $K = 3.77 \times 10^{-1}$ | $A = 0$ | $B = 1.57 \times 10^{-5}$ |
| $C = 3.17 \times 10^{-8}$ | $D = -8.36 \times 10^{-10}$ | $E = 0$ |

| Variable | Focal Length | | |
|---|---|---|---|
| Separation | 35.00 | 62.65 | 110.12 |
| D5 | 6.86 | 3.28 | 0.94 |
| D8 | 0.93 | 4.50 | 6.85 |
| D10 | 2.26 | 19.08 | 23.81 |
| D19 | 15.29 | 6.95 | 1.24 |

NUMERICAL EXAMPLE 22

| f = 35.00~110.00 | Fno = 1:3.7~8.2 | 2ω = 63.4°~22.3° |
|---|---|---|

| R1 = −112.16 | D1 = 1.30 | N1 = 1.80400 | ν1 = 46.6 |
| R2 = 139.61 | D2 = 0.41 | | |
| R3 = 163.84 | D3 = 3.00 | N2 = 1.80518 | ν2 = 25.4 |
| R4 = −107.84 | D4 = 1.10 | N3 = 1.66998 | ν3 = 39.3 |
| R5 = 76.56 | D5 = Variable | | |
| R6 = 36.05 | D6 = 1.00 | N4 = 1.84666 | ν4 = 23.8 |
| R7 = 25.55 | D7 = 3.80 | N5 = 1.48749 | ν5 = 70.2 |
| R8 = −389.95 | D8 = Variable | | |
| R9 = 45.54 | D9 = 3.20 | N6 = 1.56873 | ν6 = 63.2 |
| R10 = −160.77 | D10 = Variable | | |
| R11 = (Stop) | D11 = 1.30 | | |
| R12 = −20.88 | D12 = 0.87 | N7 = 1.64769 | ν7 = 33.8 |
| R13 = −233.98 | D13 = 2.00 | | |
| R14 = −159.29 | D14 = 0.78 | N8 = 1.48749 | ν8 = 70.2 |
| R15 = 46.64 | D15 = 2.10 | N9 = 1.84666 | ν9 = 23.8 |
| R16 = −49.54 | D16 = 5.60 | | |
| R17 = 35.02 | D17 = 1.10 | N10 = 1.84666 | ν10 = 23.8 |
| R18 = 14.70 | D18 = 5.50 | N11 = 1.58313 | ν11 = 59.4 |
| R19 = −28.48 | D19 = Variable | | |
| R20 = −19.90 | D20 = 3.50 | N12 = 1.84666 | ν12 = 23.8 |
| R21 = −17.24 | D21 = 4.50 | | |
| R22 = −16.95 | D22 = 1.50 | N13 = 1.77250 | ν13 = 49.6 |
| R23 = 483.96 | | | |

Aspheric Coefficient: R19

| $K = 8.88 \times 10^{-1}$ | $A = 0$ | $B = 1.21 \times 10^{-5}$ |
| $C = 1.06 \times 10^{-7}$ | $D = -1.47 \times 10^{-9}$ | $E = 0$ |

Aspheric Coefficient: R22

| $K = 0$ | $A = 0$ | $B = 8.13 \times 10^{-6}$ |
| $C = 2.25 \times 10^{-8}$ | $D = 1.09 \times 10^{-11}$ | $E = 0$ |

| Variable | Focal Length | | |
|---|---|---|---|
| Separation | 35.00 | 61.62 | 110.00 |
| D5 | 5.67 | 3.16 | 0.90 |
| D8 | 0.94 | 3.45 | 5.71 |
| D10 | 1.75 | 18.58 | 21.90 |
| D19 | 16.96 | 8.39 | 2.47 |

NUMERICAL EXAMPLE 23

| f = 28.80–101.96 | Fno = 1:4.30–9.00 | 2ω = 73.8°–24.0° | | |
|---|---|---|---|---|
| R1 = −4116.96 | D1 = 2.60 | N1 = 1.51741 | ν1 = 52.4 |
| R2 = −51.61 | D2 = 0.88 | | | |
| R3 = −32.32 | D3 = 1.20 | N2 = 1.77249 | ν2 = 49.6 |
| R4 = 28.95 | D4 = 2.80 | N3 = 1.84665 | ν3 = 23.8 |
| R5 = 265.48 | D5 = Variable | | | |
| R6 = 18.85 | D6 = 1.00 | N4 = 1.84665 | ν4 = 23.8 |
| R7 = 13.87 | D7 = 4.00 | N5 = 1.48749 | ν5 = 70.2 |
| R8 = −21.28 | D8 = 1.00 | N6 = 1.84665 | ν6 = 23.8 |
| R9 = −27.55 | D9 = Variable | | | |
| R10 = (Stop) | D10 = 3.00 | | | |
| R11 = −25.23 | D11 = 1.36 | N7 = 1.80518 | ν7 = 25.4 |
| R12 = −47.39 | D12 = 0.14 | | | |
| R13 = −36.10 | D13 = 6.85 | N8 = 1.67790 | ν8 = 55.3 |
| R14 = −12.22 | D14 = Variable | | | |
| R15 = −19.48 | D15 = 2.50 | N9 = 1.58312 | ν9 = 59.4 |
| R16 = −16.04 | D16 = Variable | | | |
| R17 = −32.40 | D17 = 3.00 | N10 = 1.76181 | ν10 = 26.6 |
| R18 = −18.03 | D18 = 0.17 | | | |
| R19 = −25.42 | D19 = 1.30 | N11 = 1.69679 | ν11 = 55.5 |
| R20 = −921.97 | D20 = 4.59 | | | |
| R21 = −14.26 | D21 = 1.50 | N12 = 1.71299 | ν12 = 53.8 |
| R22 = 190.18 | | | | |

Aspheric Coefficient: R11

| K = 4.91 | A = 0 | B = −1.20 × 10$^{-4}$ |
|---|---|---|
| C = −6.48 × 10$^{-7}$ | D = −1.53 × 10$^{-8}$ | E = 0 |

Aspheric Coefficient: R15

| K = 1.19 | A = 0 | B = 2.27 × 10$^{-5}$ |
|---|---|---|
| C = 1.48 × 10$^{-7}$ | D = 1.04 × 10$^{-9}$ | E = 0 |

| Variable Separation | Focal Length | | |
|---|---|---|---|
| | 28.80 | 54.19 | 101.96 |
| D5 | 11.17 | 7.84 | 0.92 |
| D9 | 1.00 | 4.57 | 7.36 |
| D14 | 1.62 | 1.28 | 0.71 |
| D16 | 6.51 | 2.36 | 0.71 |

NUMERICAL EXAMPLE 24

| f = 29.11–101.99 | Fno = 1:4.30–9.00 | 2ω = 73.2°–23.9° | | |
|---|---|---|---|---|
| R1 = 95.83 | D1 = 3.20 | N1 = 1.51633 | ν1 = 64.2 |
| R2 = −53.56 | D2 = 0.61 | | | |
| R3 = −35.06 | D3 = 1.20 | N2 = 1.80400 | ν2 = 46.6 |
| R4 = 17.05 | D4 = 3.28 | N3 = 1.84665 | ν3 = 23.8 |
| R5 = 74.99 | D5 = Variable | | | |
| R6 = 15.96 | D6 = 1.00 | N4 = 1.84665 | ν4 = 23.8 |
| R7 = 11.49 | D7 = 4.30 | N5 = 1.48749 | ν5 = 70.2 |
| R8 = −19.95 | D8 = 1.00 | N6 = 1.84665 | ν6 = 23.8 |
| R9 = −27.33 | D9 = Variable | | | |
| R10 = (Stop) | D10 = 3.50 | | | |
| R11 = −24.67 | D11 = 2.30 | N7 = 1.80518 | ν7 = 25.4 |
| R12 = −46.17 | D12 = 0.19 | | | |
| R13 = −34.22 | D13 = 1.20 | N8 = 1.65159 | ν8 = 58.5 |
| R14 = 356.16 | D14 = 5.50 | N9 = 1.74319 | ν9 = 49.3 |
| R15 = −13.76 | D15 = Variable | | | |
| R16 = −19.38 | D16 = 2.50 | N10 = 1.51633 | ν10 = 64.2 |
| R17 = −15.27 | D17 = Variable | | | |
| R18 = −31.26 | D18 = 2.30 | N11 = 1.84665 | ν11 = 23.8 |
| R19 = −20.72 | D19 = 0.71 | | | |
| R20 = −24.00 | D20 = 1.30 | N12 = 1.69679 | ν12 = 55.5 |
| R21 = 837.91 | D21 = 3.73 | | | |
| R22 = −21.23 | D22 = 1.50 | N13 = 1.77249 | ν13 = 49.6 |
| R23 = 171.78 | | | | |

Aspheric Coefficient: R11

| K = −4.71 | A = 0 | B = −8.41 × 10$^{-5}$ |
|---|---|---|
| C = −1.40 × 10$^{-7}$ | D = −8.96 × 10$^{-9}$ | E = 0 |

Aspheric Coefficient: R15

| K = −2.63 | A = 0 | B = −1.15 × 10$^{-4}$ |
|---|---|---|
| C = 2.26 × 10$^{-7}$ | D = −1.31 × 10$^{-9}$ | E = 0 |

| Variable Separation | Focal Length | | |
|---|---|---|---|
| | 29.11 | 54.49 | 101.99 |
| D5 | 9.33 | 5.66 | 0.90 |
| D9 | 0.80 | 5.05 | 8.28 |
| D15 | 2.47 | 1.70 | 1.00 |
| D17 | 7.08 | 2.85 | 0.75 |

Numerical example 25

| f = 28.80–102.40 | Fno = 1:4.30–9.00 | 2ω = 73.8°–23.9° | | |
|---|---|---|---|---|
| R1 = −357.21 | D1 = 2.50 | N1 = 1.51741 | ν1 = 52.4 |
| R2 = −55.11 | D2 = 0.70 | | | |
| R3 = −36.84 | D3 = 1.20 | N2 = 1.77249 | ν2 = 49.6 |
| R4 = 32.93 | D4 = 2.80 | N3 = 1.84666 | ν3 = 23.8 |
| R5 = 400.74 | D5 = Variable | | | |
| R6 = 19.18 | D6 = 1.00 | N4 = 1.84666 | ν4 = 23.8 |
| R7 = 12.66 | D7 = 3.70 | N5 = 1.48749 | ν5 = 70.2 |
| R8 = −31.67 | D8 = 0.80 | | | |
| R9 = (Stop) | D9 = Variable | | | |
| R10 = −23.72 | D10 = 1.00 | N6 = 1.80518 | ν6 = 25.4 |
| R11 = −48.78 | D11 = 0.18 | | | |
| R12 = −33.17 | D12 = 7.30 | N7 = 1.65844 | ν7 = 50.9 |
| R13 = −11.89 | D13 = Variable | | | |
| R14 = −19.99 | D14 = 2.50 | N8 = 1.58312 | ν8 = 59.4 |
| R15 = −15.94 | D15 = Variable | | | |
| R16 = −34.31 | D16 = 2.90 | N9 = 1.76182 | ν9 = 26.5 |
| R17 = −18.06 | D17 = 0.39 | | | |
| R18 = −26.91 | D18 = 1.30 | N10 = 1.83480 | ν10 = 42.7 |
| R19 = −140.63 | D19 = 4.84 | | | |
| R20 = −13.09 | D20 = 1.50 | N11 = 1.71299 | ν11 = 53.8 |
| R21 = 882.45 | | | | |

Aspheric Coefficient: R10

| K = 4.60 | A = 0 | B = −1.07 × 10$^{-4}$ |
|---|---|---|
| C = −8.17 × 10$^{-7}$ | D = −1.35 × 10$^{-8}$ | E = 0 |

Aspheric Coefficient: R14

| K = 1.27 | A = 0 | B = 1.56 × 10⁻⁵ |
| C = 1.44 × 10⁻⁷ | D = 1.18 × 10⁻⁹ | E = 0 |

| Variable Separation | Focal Length | | |
| --- | --- | --- | --- |
| | 28.80 | 54.31 | 102.40 |
| D 5 | 13.10 | 9.37 | 0.79 |
| D 9 | 2.50 | 5.69 | 8.93 |
| D13 | 2.53 | 1.38 | 0.76 |
| D15 | 6.39 | 2.56 | 0.78 |

TABLE-3

| Conditions | numerical Examples | | | | | | |
| --- | --- | --- | --- | --- | --- | --- | --- |
| | 19 | 20 | 21 | 22 | 23 | 24 | 25 |
| $|f5/fW|$ | 0.73 | 0.71 | 0.70 | 0.75 | 0.53 | 0.57 | 0.55 |
| $\beta 5W$ | 1.39 | 1.41 | 1.32 | 1.27 | 1.59 | 1.51 | 1.57 |
| $fW \cdot \phi_{123W}$ | 0.66 | 0.67 | 0.57 | 0.50 | 1.44 | 1.35 | 1.38 |
| $f3/fW$ | 1.23 | 1.18 | 1.49 | 1.79 | 1.13 | 1.17 | 1.23 |
| $|f1/fW|$ | 1.22 | 1.25 | 1.73 | 1.82 | 2.40 | 2.11 | 2.71 |
| $f2/fW$ | 3.05 | 3.46 | 2.98 | 2.64 | 1.07 | 1.00 | 1.13 |
| $(\phi_{123W}/\phi_{123T})/Z$ | 0.36 | 0.34 | 0.36 | 0.36 | 0.22 | 0.22 | 0.22 |
| $\beta 4W$ | 0.48 | 0.48 | 0.43 | 0.39 | 0.90 | 0.89 | 0.88 |
| $f5 \cdot (1 - \beta 5W)/fW$ | 0.29 | 0.29 | 0.22 | 0.20 | 0.31 | 0.28 | 0.31 |
| $\nu 5N - \nu 5P$ | 18.8 | 19.7 | 18.8 | 25.8 | 28.1 | 28.8 | 21.8 |

Another embodiment of the invention which is improved over the zoom lens shown in FIG. 2 is described by reference to FIG. 57 to FIGS. 63(A), 63(B) and 63(C).

A zoom lens of the present embodiment is characterized by comprising, from front to rear, a first lens unit of negative refractive power, a second lens unit of negative refractive power and a third lens unit of positive refractive power, these three lens units constituting a front lens group whose overall refractive power for the wide angle end is positive, a fourth lens unit of positive refractive power and a fifth lens unit of negative refractive power, these two lens units constituting a rear lens group, wherein when zooming from the wide angle end to the telephoto end, the first, second and third lens units move axially in such relation that the refractive power of the front lens group is weaker when in the telephoto end than when in the wide angle end, while simultaneously moving the fourth and fifth lens units axially in such relation that their separation decreases.

Figure 57:
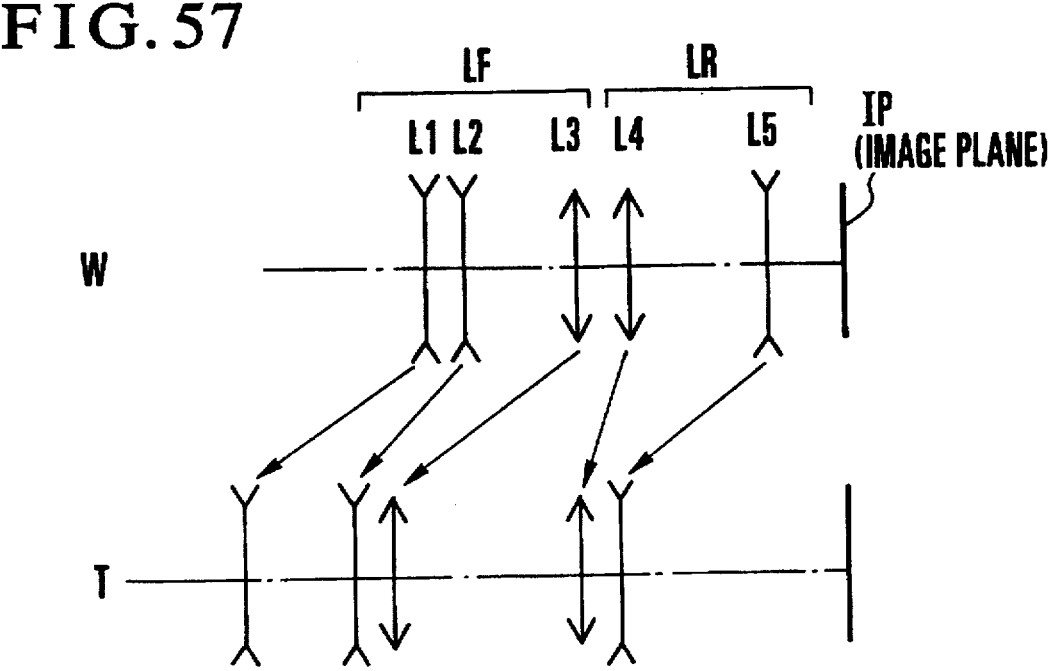
FIG. 57 illustrates the paraxial refractive power arrangements of a zoom lens of the invention.
Figure 58:
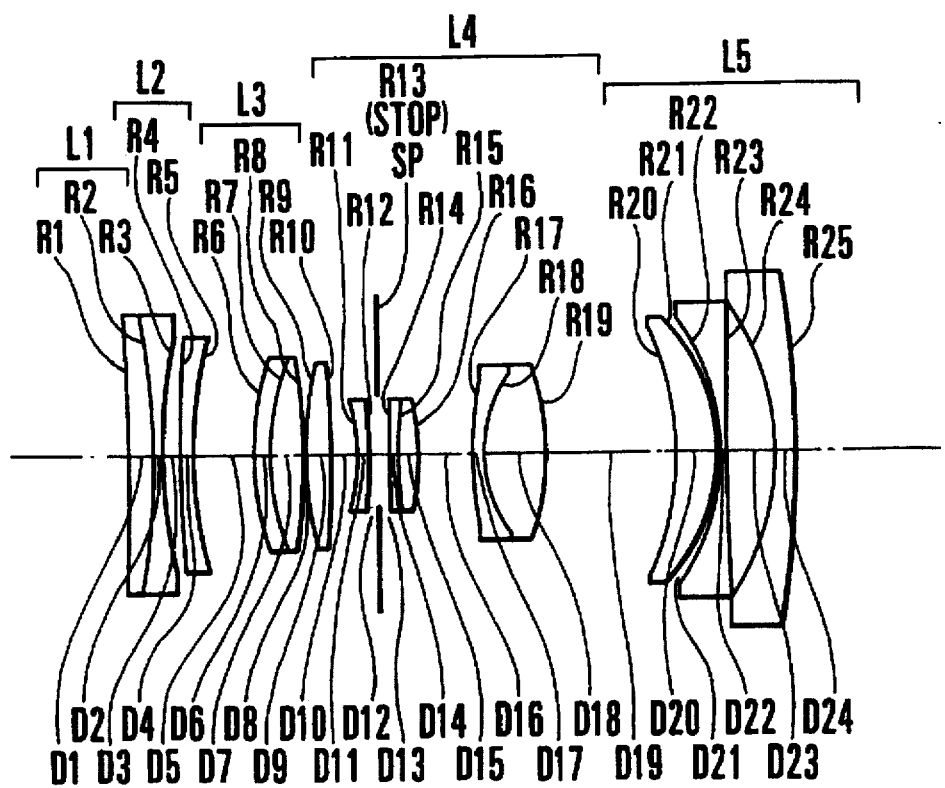
FIG. 58 is a lens block diagram of a numerical example 26 of the invention in the wide angle end.
Figure 59:
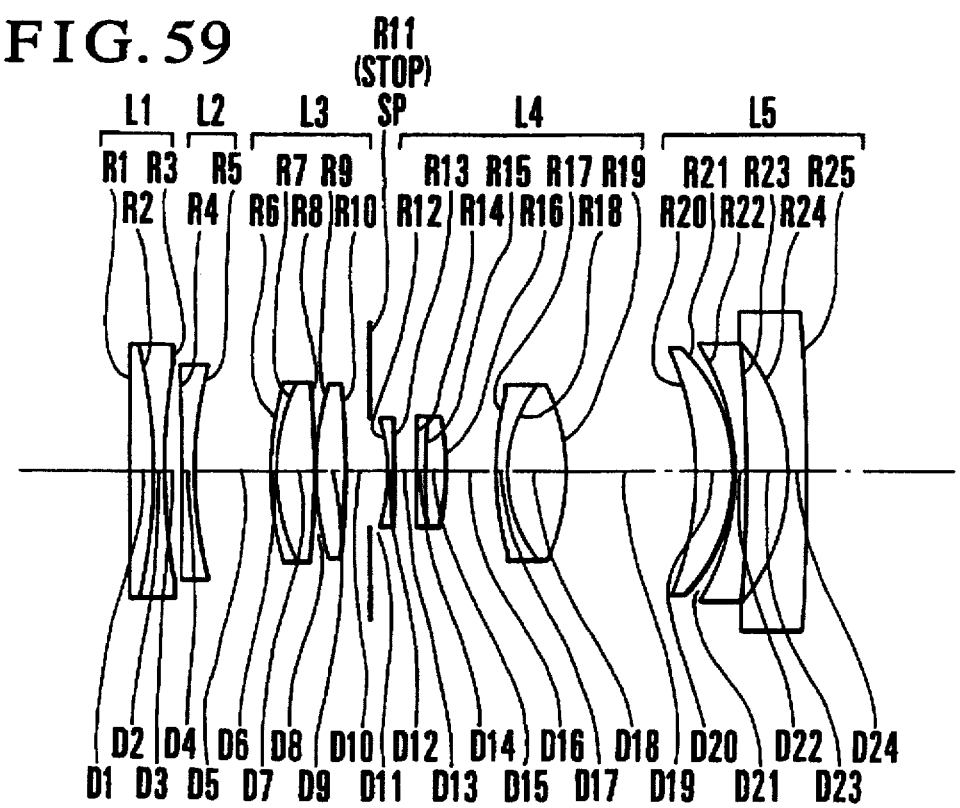
FIG. 59 is a lens block diagram of a numerical example 27 of the invention in the wide angle end.
Figure 60:
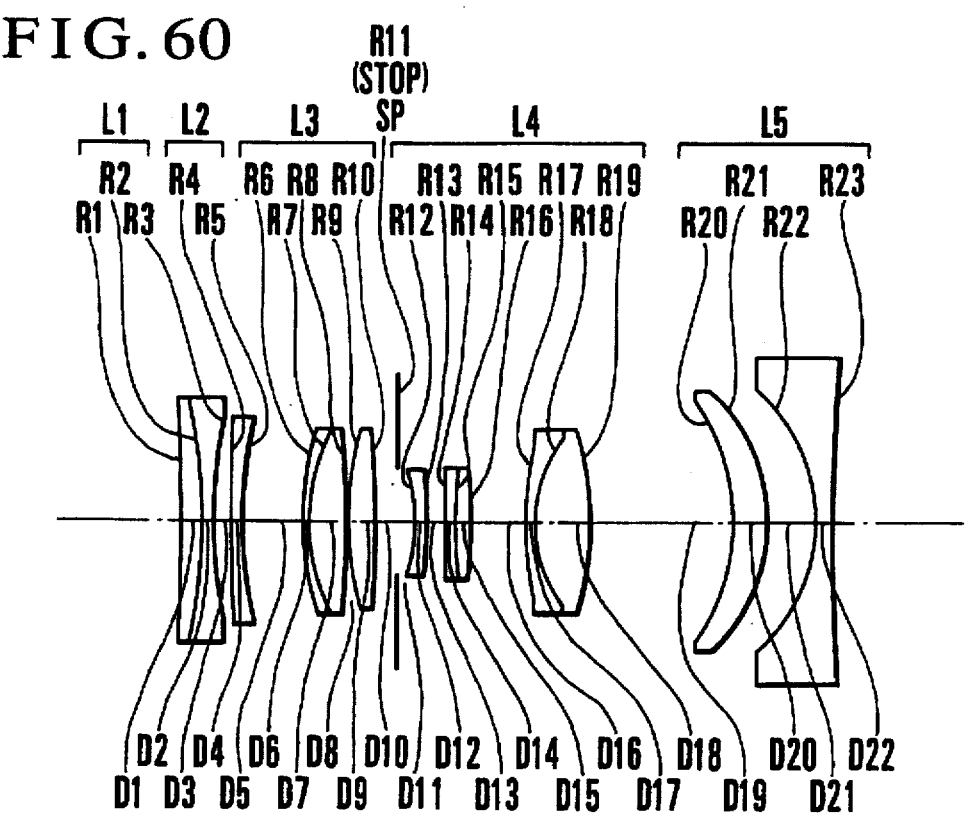
FIG. 60 is a lens block diagram of a numerical example 28 of the invention in the wide angle end.
Figure 61A:
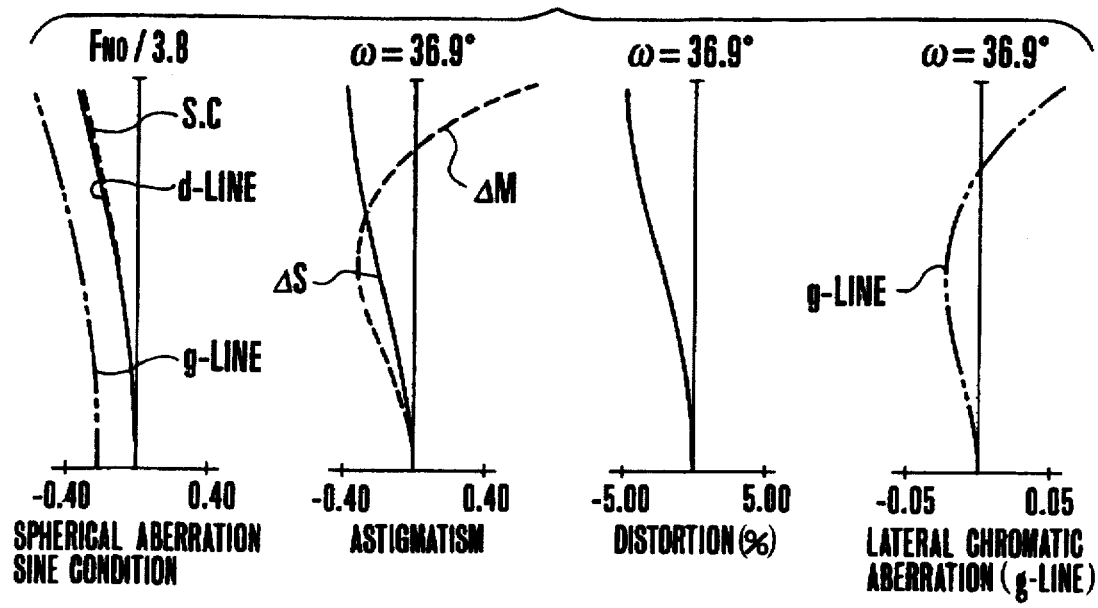
FIGS. 61(A), 61(B) and 61(C) are graphs of the various aberrations of the numerical example 26 of the invention.
Figure 61B:
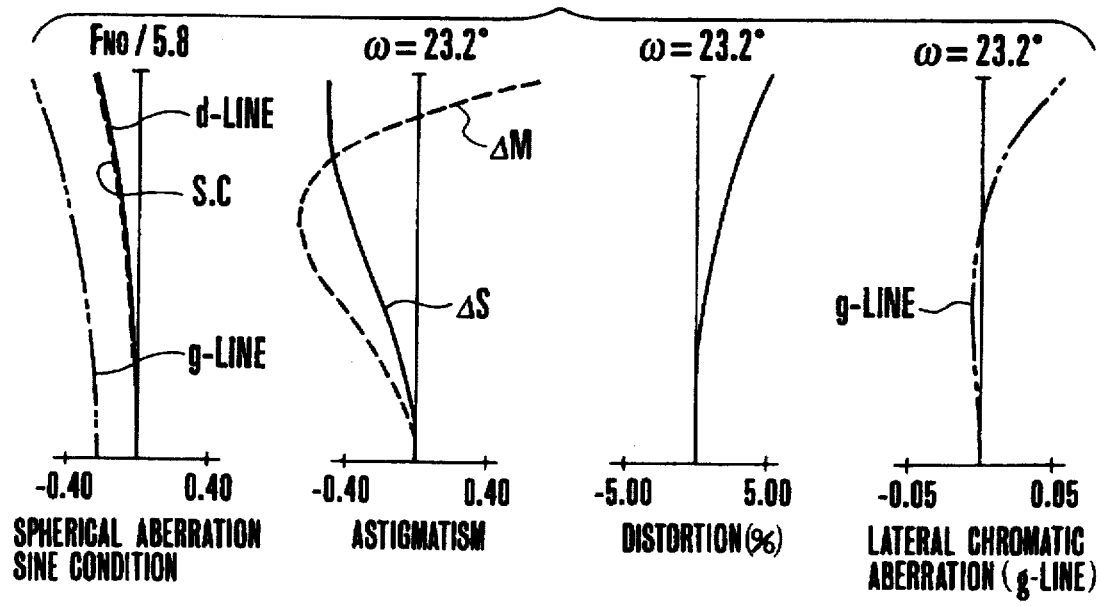
Figure 61C:
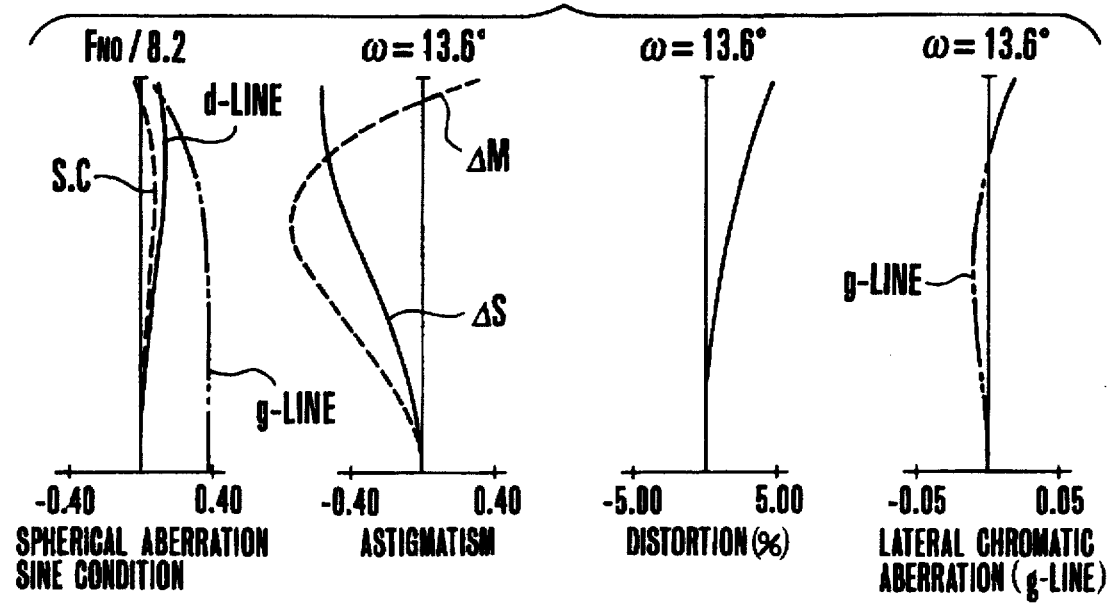
Figure 62A:
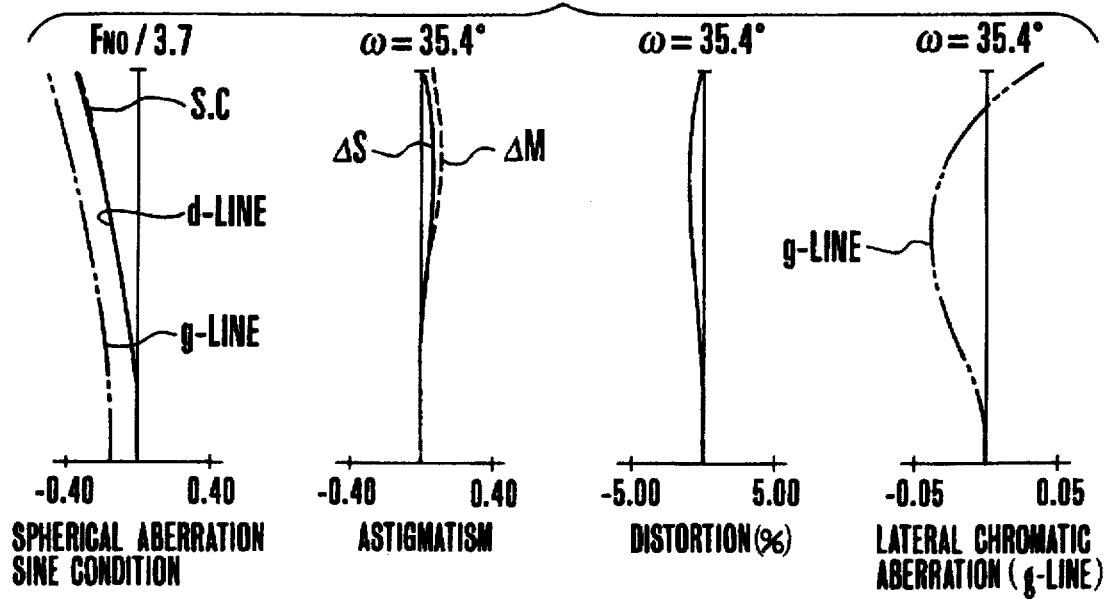
FIGS. 62(A), 62(B) and 62(C) are graphs of the various aberrations of the numerical example 27 of the invention.
Figure 62B:
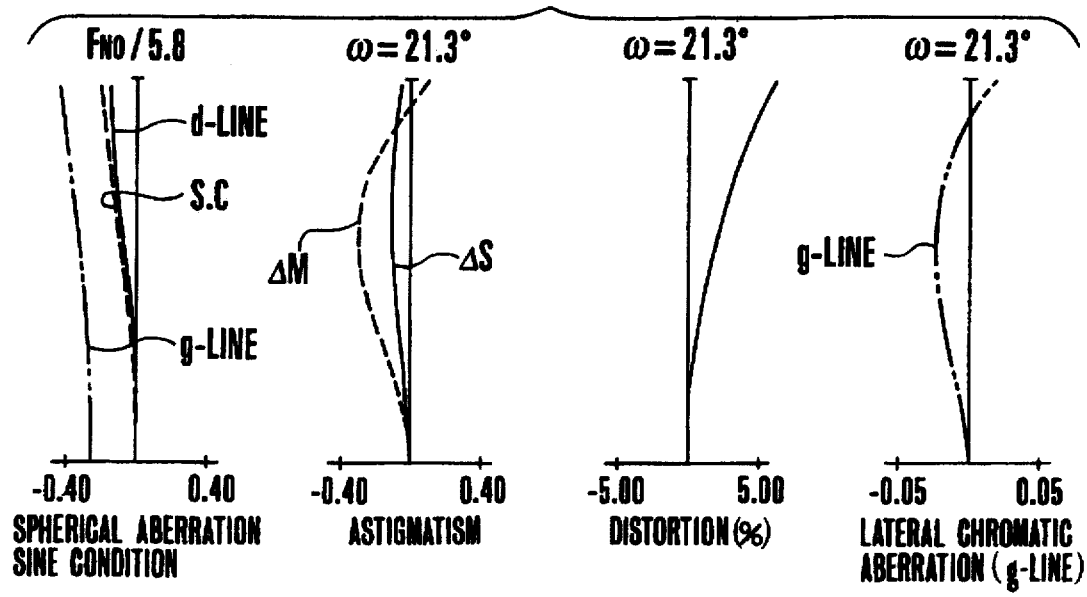
Figure 62C:
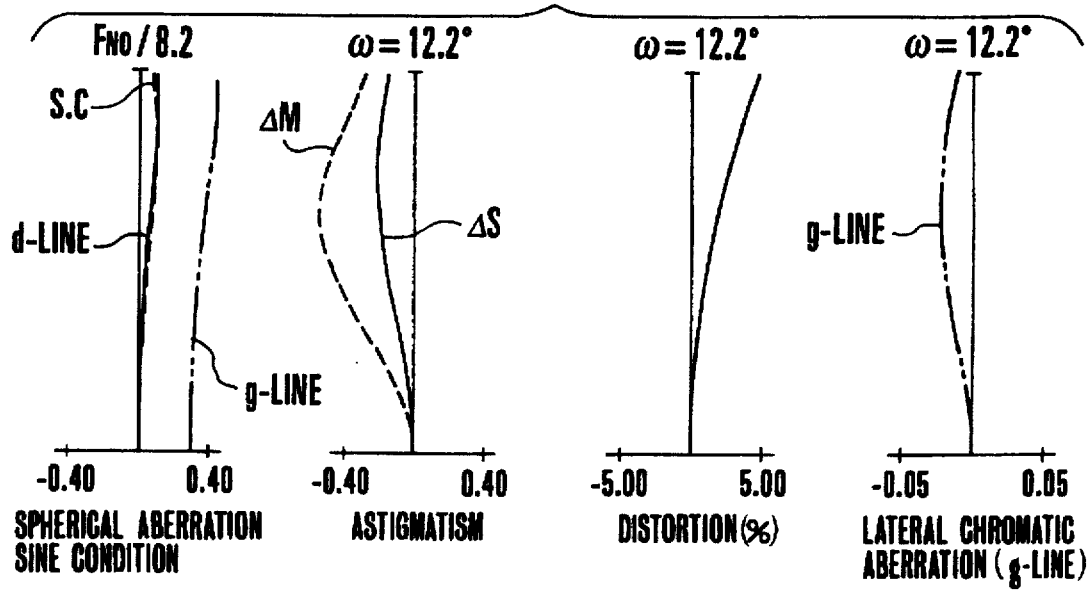
Figure 63A:
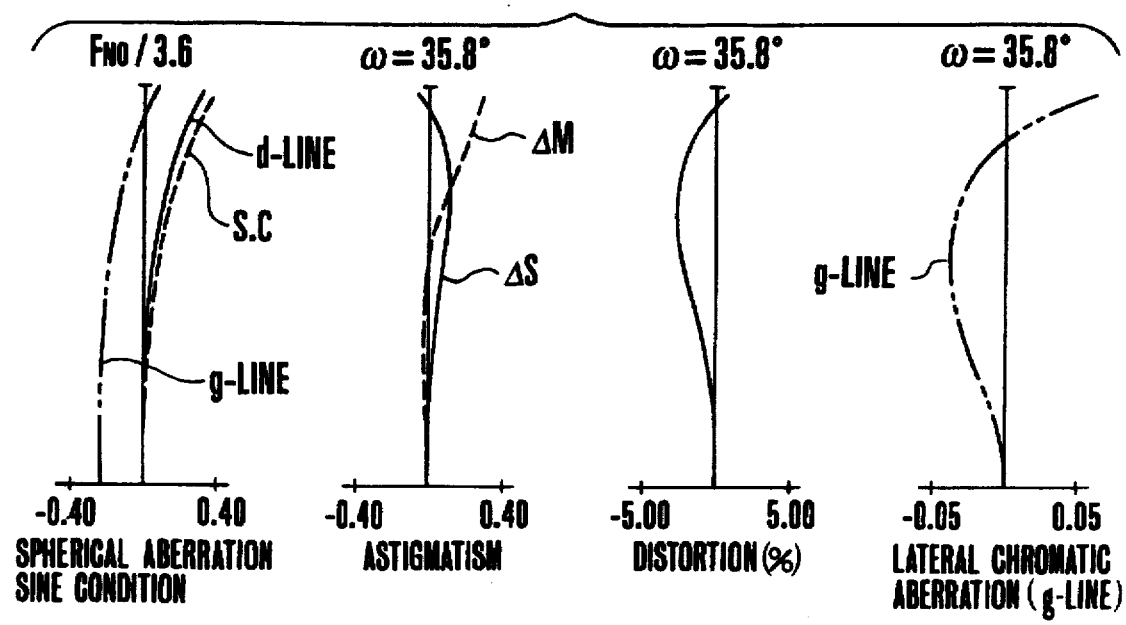
FIGS. 63(A), 63(B) and 63(C) are graphs of the various aberrations of the numerical example 28 of the invention.
Figure 63B:
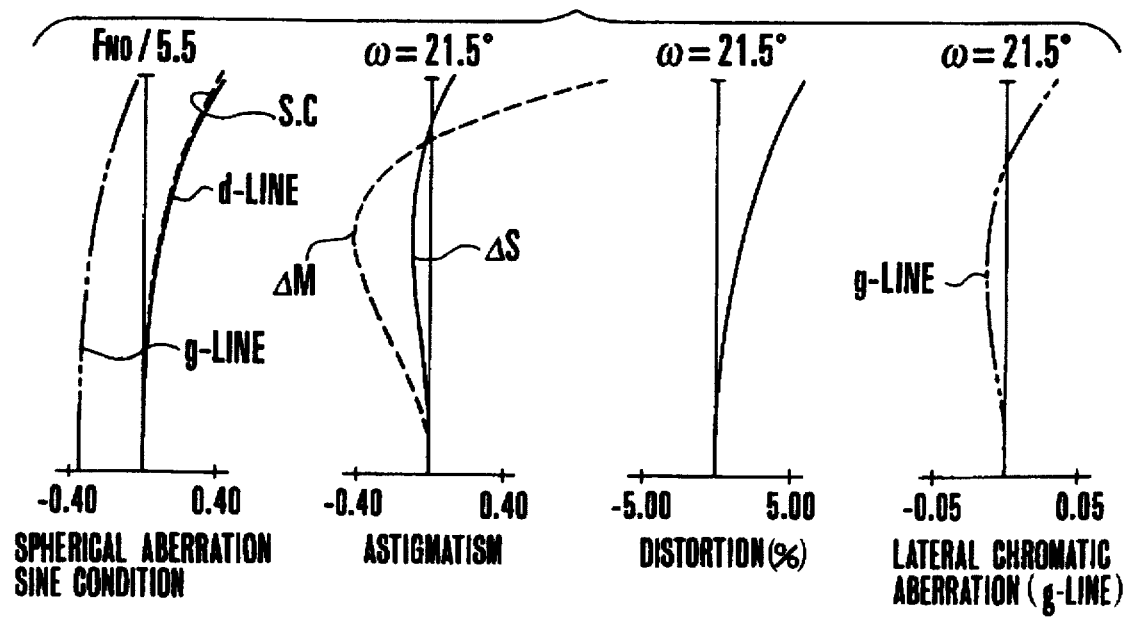
Figure 63C:
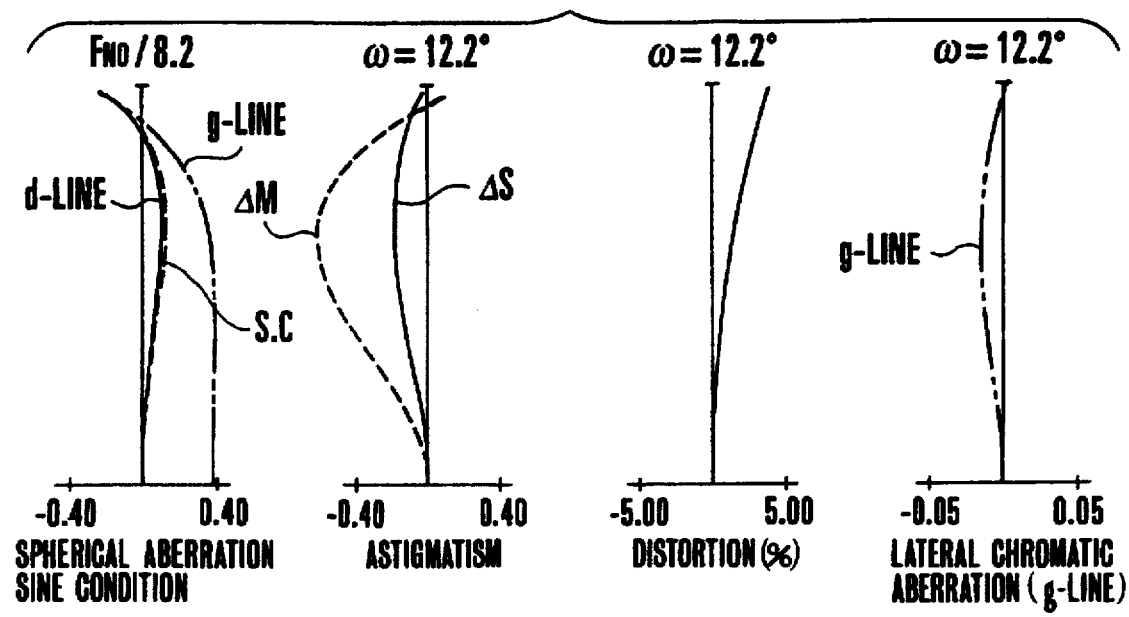

FIG. 57 illustrates the variation of the paraxial refractive power arrangement of this embodiment of the zoom lens with zooming from the wide angle end W to the telephoto end T. FIG. 58 through FIG. 60 are longitudinal section views of numerical examples 26 to 28 of zoom lenses of the invention in the wide angle end. FIGS. 61(A) to 61(C) through FIGS. 63(A) to 63(C) are graphic representations of the various aberrations of the numerical examples 26 to 28 of the invention respectively.

In the drawings, reference character LF denotes the front lens group of positive refractive power, and reference character LR denotes the rear lens group. SP stands for a stop and IP for an image plane. Reference character Li (i=1–5) denotes the i-th lens unit. The arrows indicate the directions in which the lens units move as zooming from the wide angle end to the telephoto end.

The front lens group LF has the first lens unit L1 of negative refractive power, the second lens unit L2 of negative refractive power and the third lens unit L3 of positive refractive power, totaling three lens units. In the wide angle end, the overall refractive power of the front lens group takes a positive value. The rear lens group LR has the fourth lens unit L4 of positive refractive power and the fifth lens unit L5 of negative refractive power, totaling two lens units.

As zooming goes from the wide angle end to the telephoto end, the first, second and third lens units all move axially forward in such relation that the second lens unit varies its relative position to the other lens units and that the overall refractive power of the front lens group is weaker when in the telephoto end than when in the wide angle end. The fourth and fifth lens units also move axially forward in such relation that their separation narrows. At this time, the third and fourth lens units move in such relation that their separation increases with zooming from the wide angle end to the telephoto end. The combined system of the third and fourth lens units, as considered to be an independent zoom lens, increases its focal length in response to that zooming operation.

In the present embodiment, for the wide angle end, the overall refractive power of the first and second lens units is negative. Since the refractive power of the third lens unit is positive, the front lens group as a whole becomes retrofocus type. The use of this feature brings the front principal point to a nearer position to the image plane. So, the requirements of preventing the front and rear lens groups from mechanically interfering with each other at their confronting surfaces, and of increasing the maximum field angle become easy to fulfill at once. Another feature is that the first and second lens units are made to have negative refractive powers. For the wide angle end, the front lens group takes the form of the retrofocus type. Hence, its strong negative refractive power can be distributed over the first and second lens units, thereby making it easier to achieve the much desired increase of the maximum field angle. Still another feature is that the fourth lens unit is moved forward to effect focusing to suit from an infinitely distant object down to a close object.

In the zoom lens of the present embodiment, the focal length f of the entire system is expressed by the following equation:

$$f = fA \cdot \beta 4 \cdot \beta 5 (\beta 4 > 0, \beta 5 > 0)$$

where fA is the overall focal length of the front lens group and $\beta i$ is the lateral magnification of the i-th lens unit.

As is understandable from this equation, for the range of variation of the focal length from the wide angle end to the telephoto end, the magnifications $\beta 4$ and $\beta 5$ are made larger in value and the overall focal length fA of the front lens group is made longer, (or the overall refractive power of the front lens group is weakened), thereby permitting the focal length to vary with a higher efficiency. In addition, the separation between the fourth lens unit of positive refractive power and the fifth lens unit of negative refractive power is made narrower (to decrease) when in the telephoto end than when in the wide angle end, thus giving even the fifth lens unit an effect of varying the focal length. So, the zoom ratio becomes easy to increase. For the rear lens group, the divergence or negative refractive power is made stronger when in the telephoto end. So, along with the front lens group of positive refractive power, it forms the telephoto type, thus assuring minimization of the size of the entire lens system.

In particular, in the present embodiment, by adopting the paraxial refractive power arrangement as shown in FIG. 57, the maximum field angle is increased to such a value that the shortest focal length is smaller than the diagonal length of the image frame.

Specifically speaking, the front lens group comprises a first lens unit of negative refractive power, a second lens unit of negative refractive power and a third lens unit of positive refractive power, wherein when zooming from the wide angle end to the telephoto end, all the lens units axially move forward in such relation that the separation between the first and second lens units increases and the separation between the second and third lens units decreases. By this, the contribution of the front lens group to the variation of the focal length is heightened.

It is to be noted that, in the present embodiment, for the purpose of simplifying the structure of the operating mechanism, the first and third lens units are assumed to move in unison. They may otherwise be moved in differential relation. According to this modification, the degree of freedom on design can be increased.

In the present embodiment, within the framework of such construction and arrangement of the lens units, letting the focal length of the i-th lens unit be denoted by fi, the shortest focal length of the entire system by fW and the lateral magnification for the wide angle end of the i-th lens unit by $\beta i$, the following conditions are set forth:

$$0.5 < |f5|/fW < 1.5 \quad (28)$$

$$1.1 < \beta 5W < 1.8 \quad (29)$$

When these conditions are satisfied, further improved results are attained in the compact form of the entire lens system and the stability of high optical performance throughout the entire zooming range.

The technical significance of each of the above-described conditions is explained below.

The inequalities of condition (28) are concerned with the negative refractive power of the fifth lens unit and have an aim chiefly to improve the efficiency with which the focal length varies. When the negative refractive power of the fifth lens unit is weaker than the upper limit of the condition (28), that lens unit produces a weaker effect of varying the focal length. As a result, the movement of each lens unit has to increase to obtain the predetermined value of the zoom ratio. So, the total length of the entire system is caused to increase.

When the lower limit of the condition (28) is exceeded, the telephoto function of the entire lens system becomes too strong in the wide angle end, because the first to the fourth lens units have a positive overall refractive power and the fifth lens unit has a negative refractive power.

From this reason, as a result, the lens system gets too short of a back focal distance. To secure a certain corner illumination, therefore, the outer diameter of the fifth lens unit has to increase. As another result, that lens unit gets too strong of a refractive power, causing production of higher order field curvature and astigmatism, which are difficult to correct.

The inequalities of condition (29) are concerned with the lateral magnification for the wide angle end of the fifth lens unit.

Now, the back focal distance BfW for the wide angle end of the lens system is expressed by:

$$BfW = f5 \cdot (1 - \beta 5W)$$

So, according to the present embodiment, within the framework of the condition (28), a proper range is given for the factor of the condition (29) to make a good compromise between the reduction of the total length of the entire lens system and the correction of various aberrations.

When the upper limit of the condition (29) is exceeded, the back focal distance becomes long, but the first to the fourth lens units get too strong of refractive powers, causing the variation of aberrations to increase. When the image magnification is smaller than the lower limit, it becomes difficult to obtain the predetermined value of the back focal distance, and the outer diameter of the fifth lens unit increases objectionably.

It should be pointed out that, in the present embodiment, while the variation of aberrations with zooming is limited to a minimum, the maximum field angle is increased. Nonetheless, the image aberrations are well corrected for high optical performance over the entire area of the image frame. To this purpose, additional features for the lens units are set forth as follows:

(i) It is preferred to satisfy the following conditions:

$$0.3 < fW \cdot \phi_{123W} < 0.9 \quad (30)$$

$$0.6 < f3/fW < 2.0 \quad (31)$$

where $\phi_{123W}$ is the overall refractive power for the wide angle end of the front lens group.

The inequalities of condition (30) are concerned with the refractive power of the front lens group. When the upper limit of the condition (30) is exceeded, as this implies that the refractive power of the front lens group in the wide angle end is too strong, the telephoto function of the system becomes so strong that the back focal distance is hard to keep at a positive value. When the lower limit is exceeded, as this implies that the refractive power of the front lens group is too weak, the entire lens system gets a longer total length. To avoid this, the rear lens group has to be strengthened in refractive power. Or otherwise, the desired value of the shortest focal length could not be retained. Therefore, it becomes difficult to keep all aberrations in good balance over the entire zooming range.

The inequalities of condition (31) are concerned with the positive refractive power of the third lens unit. When the upper limit of the condition (31) is exceeded, as this implies that the refractive power of the third lens unit is too weak, the total zooming movement of the third lens unit increases to increase the size of the entire lens system. When the lower limit is exceeded, as this implies that the refractive power of the third lens unit is too weak, the third lens unit produces large spherical aberrations of higher order, which are difficult to correct.

It is to be noted that, in the present embodiment, particularly for the wide angle end, the total length of the entire system is shortened. Despite this, improvements of the optical performance have to be achieved. For this purpose, it is better to alter the upper and lower limits of the conditions (30) and (31) as follows:

$$0.35 < fW \cdot \phi_{123W} < 0.80 \quad (30a)$$

$$0.75 < f3/fW < 1.8 \quad (31a)$$

(ii) It is preferred to satisfy the following conditions:

$$1.0 < |f1|/fW < 6.0 \quad (32)$$

$$1.0 < |f2|/fW < 6.0 \quad (33)$$

$$0.25 < (\phi_{123W}/\phi_{123T}) \cdot Z < 0.8 \quad (34)$$

$$0.25 < \beta 4W < 0.55 \quad (35)$$

$$0.1 < f5 \cdot (1 - \beta 5W)/fW < 0.7 \quad (36)$$

where $\phi_{123T}$ is the overall focal length for the telephoto end of the front lens group and Z is the zoom ratio.

The inequalities of condition (32) are concerned with the ratio of the refractive powers for the wide angle end of the entire system and the first lens unit. When the upper limit of condition (32) is exceeded, as this implies that the refractive power of the first lens unit is too weak, the entire system gets a long total length. When the lower limit is exceeded, as this implies that the refractive power of the first lens unit is too strong, it becomes difficult to obtain the predetermined value of the back focal distance in the wide angle end.

The inequalities of condition (33) are concerned with the ratio of the refractive powers for the wide angle end of the entire system and the second lens unit. When the upper limit of the condition (33) is exceeded, as this implies that the refractive power of the second lens unit is too weak, the total zooming movement of the lens unit increases to increase the size of the entire system. When the lower limit is exceeded, such a strong refractive power of the second lens unit causes the third lens unit also to get a strong refractive power, which in turn increases of the difficulty of correcting spherical aberration.

The inequalities of condition (34) are concerned with the zoom ratio of the front lens group. When the upper limit is exceeded, the share of the variation of the focal length of the entire system by the front lens group becomes too large. In some cases, therefore, the refractive powers of the lens units in the group haves group have to increase greatly. In other cases, the total zooming movement of each of the lens unit has to increase. When the lower limit is exceeded, the share of the variation of the focal length of the entire system by the rear lens group becomes too large. To secure the predetermined value of the zoom ratio of the entire system, the total zooming movement of each of the lens units in the rear lens group comes to increase objectionably.

The inequalities of condition (35) are concerned with the lateral magnification for the wide angle end of the fourth lens unit. When the upper limit of the condition (35) is exceeded, the back focal distance, when in the wide angle end, hardly takes an appreciable value. As a result, the fifth lens unit gets a large outer diameter. When the lower limit is exceeded, the refractive powers of the other lens units increase to obtain the predetermined values of the focal length. Therefore, it becomes difficult to correct the variation of aberrations with zooming. Further, the focal length of the front lens group has to be made even longer, causing the total length of the entire system to increase objectionably.

The inequalities of condition (36) give appropriate ranges for the refractive power and lateral magnification of the fifth lens unit to fulfill the chief aim of obtaining the predetermined value of the back focal distance. When the upper limit is exceeded, the back focal distance, when in the wide angle end, becomes longer than necessary, causing the total length of the entire system to increase. When the lower limit is exceeded, the predetermined value of the back focal distance not only becomes difficult to obtain in the wide angle end, but also the outer diameter of the fifth lens unit increases objectionably.

(iii) The fourth lens unit of positive refractive power has at least one positive and at least one negative lens. These lenses are better formed to such a shape that the frontmost lens surface turns its concave curvature toward the object side and the rearmost lens surface turns its convex curvature toward the image side.

(iv) If, as the zoom lens of the present embodiment is provided with an aspherical lens, the aspheric sphere is introduced into the rearmost surface in the fourth lens unit, it is made easy to correct curvature of field and spherical aberration in the telephoto end, to maintain good stability of aberration correction against zooming, and to correct image aberrations over the entire area of the image frame. If introduced into the fifth lens unit, off-axial aberrations can be corrected well.

(v) The fifth lens unit of negative refractive power has at least one negative and at least one positive lenses having a concave surface facing the object side, satisfying the following condition:

$$12 < \nu 5N - \nu 5P < 35 \quad (37)$$

where $\nu 5P$ and $\nu 5N$ are the mean values of the Abbe numbers of the materials of the positive and negative lenses in the fifth lens unit respectively.

When either of the upper and lower limits of the condition (37) is violated, the chromatic aberrations vary to large extent with zooming, which is difficult to correct by any design of the other lens units.

(vi) The stop is preferably positioned in one of the spaces between the rearmost lens surfaces of the third and fourth lens units. With this, the entrance pupil can take an appropriate position to suppress the variation of aberrations with zooming. When zooming, the stop may be moved either in differential relation to the other lens units, or in unison with one of the other lens units. If so, it becomes possible for the stop to take its place in the neighborhood of the entrance pupil that changes its position with zooming, thereby giving an advantage of preventing the field curvature from varying when the stop has a small aperture.

If, as focusing is performed by the fourth lens unit, the fourth lens unit contains the stop, it is preferred that the stop is made axially stationary during focusing, because the driving torque for the diaphragm mechanism can be reduced by an amount which would be otherwise necessary to shift the stop with focusing.

(vii) The fourth lens unit is preferably divided into two or more parts which move axially in differential relation when zooming or focusing, because the variation of aberrations with zooming or focusing can be lessened.

(viii) In the present embodiment, it is assumed that the fourth lens unit is selected to be used in focusing from an infinitely distant object to an object at a minimum distance, as it moves forward. Any other lens unit or units may be used instead. For example, the front lens group may be used, as it moves forward.

Again, if the back focal distance in the wide angle end is long enough, the fifth lens unit may be used. In this case, it moves toward the image side. An advantage of this case is to reduce the outer diameter of the first lens unit. It is also possible to move two or more of the first to fifth lens units simultaneously.

Next, numerical examples 26 to 28 of the invention are shown. The values of the factors in the above-described conditions for the numerical examples 26 to 28 are also listed in Table-4.

NUMERICAL EXAMPLE 26

| | | |
|---|---|---|
| f = 28.84~89.41 | Fno = 1:3.8~8.2 | $2\omega = 73.8°\text{~}27.2°$ |
| R 1 = −217.48 | D 1 = 2.00 | N 1 = 1.80518  $\nu$ 1 = 25.4 |
| R 2 = −103.00 | D 2 = 1.20 | N 2 = 1.69680  $\nu$ 2 = 55.5 |
| R 3 = 48.69 | D 3 = Variable | |
| R 4 = 154.19 | D 4 = 1.30 | N 3 = 1.65844  $\nu$ 3 = 50.9 |
| R 5 = 37.47 | D 5 = Variable | |
| R 6 = 29.87 | D 6 = 1.00 | N 4 = 1.84666  $\nu$ 4 = 23.8 |
| R 7 = 23.19 | D 7 = 2.90 | N 5 = 1.48749  $\nu$ 5 = 70.2 |
| R 8 = −101.43 | D 8 = 0.30 | |
| R 9 = 33.35 | D 9 = 2.30 | N 6 = 1.60311  $\nu$ 6 = 60.7 |
| R10 = −173.29 | D10 = Variable | |
| R11 = −17.33 | D11 = 0.87 | N 7 = 7.64769  $\nu$ 7 = 33.8 |
| R12 = −64.01 | D12 = 1.00 | |
| R13 = (Stop) | D13 = 1.00 | |
| R14 = −1012.52 | D14 = 0.70 | N 8 = 1.48749  $\nu$ 8 = 70.2 |
| R15 = 39.15 | D15 = 1.80 | N 9 = 1.84666  $\nu$ 9 = 23.8 |
| R16 = −37.96 | D16 = 5.17 | |
| R17 = 40.91 | D17 = 1.10 | N10 = 1.84666  $\nu$ 10 = 23.8 |
| R18 = 11.63 | D18 = 5.60 | N11 = 1.58313  $\nu$ 11 = 59.4 |

-continued

| | | |
|---|---|---|
| R19 = −23.69 | D19 = Variable | |
| R20 = −29.78 | D20 = 3.60 | N12 = 1.84666  ν 12 = 23.8 |
| R21 = −18.07 | D21 = 0.20 | |
| R22 = −22.10 | D22 = 1.30 | N13 = 1.74320  ν 13 = 49.3 |
| R23 = 634.28 | D23 = 4.38 | |
| R24 = −22.75 | D24 = 1.50 | N14 = 1.72916  ν 14 = 54.7 |
| R25 = −113.54 | | |

Aspheric Coefficient: R19

| | | |
|---|---|---|
| K = −1.96 × 10⁻¹ | A = 0 | B = 1.09 × 10⁻⁵ |
| C = 8.05 × 10⁻⁸ | D = −2.53 × 10⁻⁹ | E = 0 |

| Variable | Focal Length | | |
|---|---|---|---|
| Separation | 28.80 | 50.48 | 89.41 |
| D 3 | 1.53 | 4.05 | 6.28 |
| D 5 | 5.87 | 3.35 | 1.12 |
| D10 | 2.60 | 11.33 | 24.44 |
| D20 | 11.67 | 5.58 | 1.12 |

NUMERICAL EXAMPLE 27

| f = 30.43~100.00 | Fno = 1:3.7~8.2 | 2ω = 70.8°~24.4° |
|---|---|---|
| R 1 = −677.46 | D 1 = 2.00 | N 1 = 1.80518  ν 1 = 25.4 |
| R 2 = −69.17 | D 2 = 1.20 | N 2 = 1.69680  ν 2 = 55.5 |
| R 3 = 63.43 | D 3 = Variable | |
| R 4 = 3704.92 | D 4 = 1.30 | N 3 = 1.65844  ν 3 = 50.9 |
| R 5 = 45.60 | D 5 = Variable | |
| R 6 = 32.60 | D 6 = 1.00 | N 4 = 1.84666  ν 4 = 23.8 |
| R 7 = 22.08 | D 7 = 3.20 | N 5 = 1.48749  ν 5 = 70.2 |
| R 8 = −224.31 | D 8 = 0.30 | |
| R 9 = 36.51 | D 9 = 2.70 | N 6 = 1.60311  ν 6 = 60.7 |
| R10 = −122.67 | D10 = Variable | |
| R11 = (Stop) | D11 = Variable | |
| R12 = −17.93 | D12 = 0.87 | N 7 = 1.64769  ν 7 = 33.8 |
| R13 = −71.56 | D13 = 2.00 | |
| R14 = −228.00 | D14 = 0.70 | N 8 = 1.48749  ν 8 = 70.2 |
| R15 = 44.17 | D15 = 1.80 | N 9 = 1.8466.6  ν 9 = 23.8 |
| R16 = −46.21 | D16 = 5.17 | |
| R17 = 39.16 | D17 = 1.10 | N10 = 1.84666  ν 10 = 23.8 |
| R18 = 13.54 | D18 = 5.60 | N11 = 1.58313  ν 11 = 59.4 |
| R19 = −22.09 | D19 = Variable | |
| R20 = −36.36 | D20 = 3.60 | N12 = 1.84666  ν 12 = 23.8 |
| R21 = −18.73 | D21 = 0.20 | |
| R22 = −22.97 | D22 = 1.30 | N13 = 1.78590  ν 13 = 44.2 |
| R23 = −161.56 | D23 = 4.50 | |
| R24 = −18.57 | D24 = 1.50 | N14 = 1.72916  ν 14 = 54.7 |
| R25 = −232.78 | | |

Aspheric Coefficient: R19

| | | |
|---|---|---|
| K = −3.97 × 10⁻¹ | A = 0 | B = 1.18 × 10⁻⁵ |
| C = 7.44 × 10⁻⁸ | D = −1.47 × 10⁻⁹ | E = 0 |

| Variable | Focal Length | | |
|---|---|---|---|
| Separation | 30.43 | 55.51 | 100.00 |
| D 3 | 1.50 | 1.50 | 4.73 |
| D 5 | 7.34 | 7.34 | 4.11 |
| D10 | 2.58 | 9.48 | 21.60 |
| D11 | 1.70 | 5.52 | 7.12 |
| D19 | 12.55 | 4.96 | 0.80 |

NUMERICAL EXAMPLE 28

| f = 30.00~100.00 | Fno = 1:3.6~8.2 | 2ω = 71.6°~24.4° |
|---|---|---|
| R 1 = −228.47 | D 1 = 2.00 | N 1 = 1.80518  ν 1 = 25.4 |
| R 2 = −61.62 | D 2 = 1.20 | N 2 = 1.69680  ν 2 = 55.5 |
| R 3 = 60.27 | D 3 = Variable | |
| R 4 = 300.46 | D 4 = 1.30 | N 3 = 1.65844  ν 3 = 50.9 |
| R 5 = 47.91 | D 5 = Variable | |
| R 6 = 32.90 | D 6 = 1.00 | N 4 = 1.84666  ν 4 = 23.8 |
| R 7 = 22.76 | D 7 = 3.20 | N 5 = 1.48749  ν 5 = 70.2 |
| R 8 = −264.26 | D 8 = 0.30 | |
| R 9 = 34.66 | D 9 = 2.50 | N 6 = 1.60311  ν 6 = 60.7 |
| R10 = −148.49 | D10 = Variable | |
| R11 = (Stop) | D11 = 1.70 | |
| R12 = −18.05 | D12 = 0.87 | N 7 = 1.64769  ν 7 = 33.8 |
| R13 = −63.03 | D13 = 2.00 | |
| R14 = −167.30 | D14 = 0.70 | N 8 = 1.48749  ν 8 = 70.2 |
| R15 = 46.92 | D15 = 1.80 | N 9 = 1.84666  ν 9 = 23.8 |
| R16 = −49.81 | D16 = 5.17 | |
| R17 = 36.08 | D17 = 1.10 | N10 = 1.84666  ν 10 = 23.8 |
| R18 = 14.30 | D18 = 5.60 | N11 = 1.58313  ν 11 = 59.4 |
| R19 = −24.31 | D19 = Variable | |
| R20 = −19.49 | D20 = 3.60 | N12 = 1.84666  ν 12 = 23.8 |
| R21 = −16.47 | D21 = 4.50 | |
| R22 = −16.05 | D22 = 1.50 | N13 = 1.77250  ν 13 = 49.6 |
| R23 = 185.92 | | |

Aspheric Coefficient: R19

| | | |
|---|---|---|
| K = −6.76 × 10⁻¹ | A = 0 | B = 1.7138 × 10⁻⁸ |
| C = 7.38 × 10⁻⁸ | D = −1.15 × 10⁻⁹ | E = 0 |

Aspheric Coefficient: R22

| | | |
|---|---|---|
| K = 0 | A = 0 | B = 1.69 × 10⁻⁵ |
| C = 3.53 × 10⁻⁸ | D = −1.80 × 10⁻⁸ | E = 0 |

| Variable | Focal Length | | |
|---|---|---|---|
| Separation | 30.00 | 55.05 | 100.00 |
| D 3 | 1.50 | 1.59 | 6.33 |
| D 5 | 5.91 | 5.83 | 1.08 |
| D10 | 2.58 | 14.76 | 27.74 |
| D19 | 13.77 | 5.15 | 1.23 |

TABLE 4

| | Numerical Examples | | |
|---|---|---|---|
| Conditions | 26 | 27 | 28 |
| \|f5/fW\| | 0.78 | 0.72 | 0.80 |
| β5W | 1.37 | 1.37 | 1.29 |
| fW · φ₁₂₃W | 0.52 | 0.48 | 0.44 |
| f3/fW | 0.91 | 1.01 | 1.03 |
| \|f1/fW\| | 2.03 | 3.10 | 2.49 |
| \|f2/fW\| | 2.62 | 2.30 | 2.89 |
| (φ₁₂₃W/φ₁₂₃T)/Z | 0.40 | 0.35 | 0.36 |
| β4W | 0.38 | 0.35 | 0.34 |
| f5 · (1 − β5W/fW) | 0.29 | 0.27 | 0.23 |
| ν5N − ν5P | 28.2 | 25.7 | 25.8 |

Yet another embodiment of the invention in which further improvements are made is described by reference to FIG. 64 to FIGS. 72(A), 72(B) and 72(C).

In here, a zoom lens comprises, from front to rear, a first lens unit of positive refractive power, a second lens unit of negative refractive power and a third lens unit of positive refractive power, a fourth lens unit of positive refractive power and a fifth lens unit of negative refractive power, all these lenses taking more front positions when in the telephoto end than when in the wide angle end, the zoom lens being characterized in that, letting the separation for the wide angle end between the i-th and (i+1)st lens units be denoted by DiW, the separation for the telephoto end between the i-th and (i+1)st lens units by DiT, the shortest and longest focal lengths of the entire system by fW and fT respectively, and the separation between the first and second lens units at a zooming position where the focal length of the entire system is $(fW \cdot fT)^{1/2}$ by D1M, the following conditions are satisfied:

$$D1W < D1M$$

$$D1T < D1M$$

$$D2W > D2T$$

$$D3W < D3T$$

$$D4W > D4T$$

Figure 64:
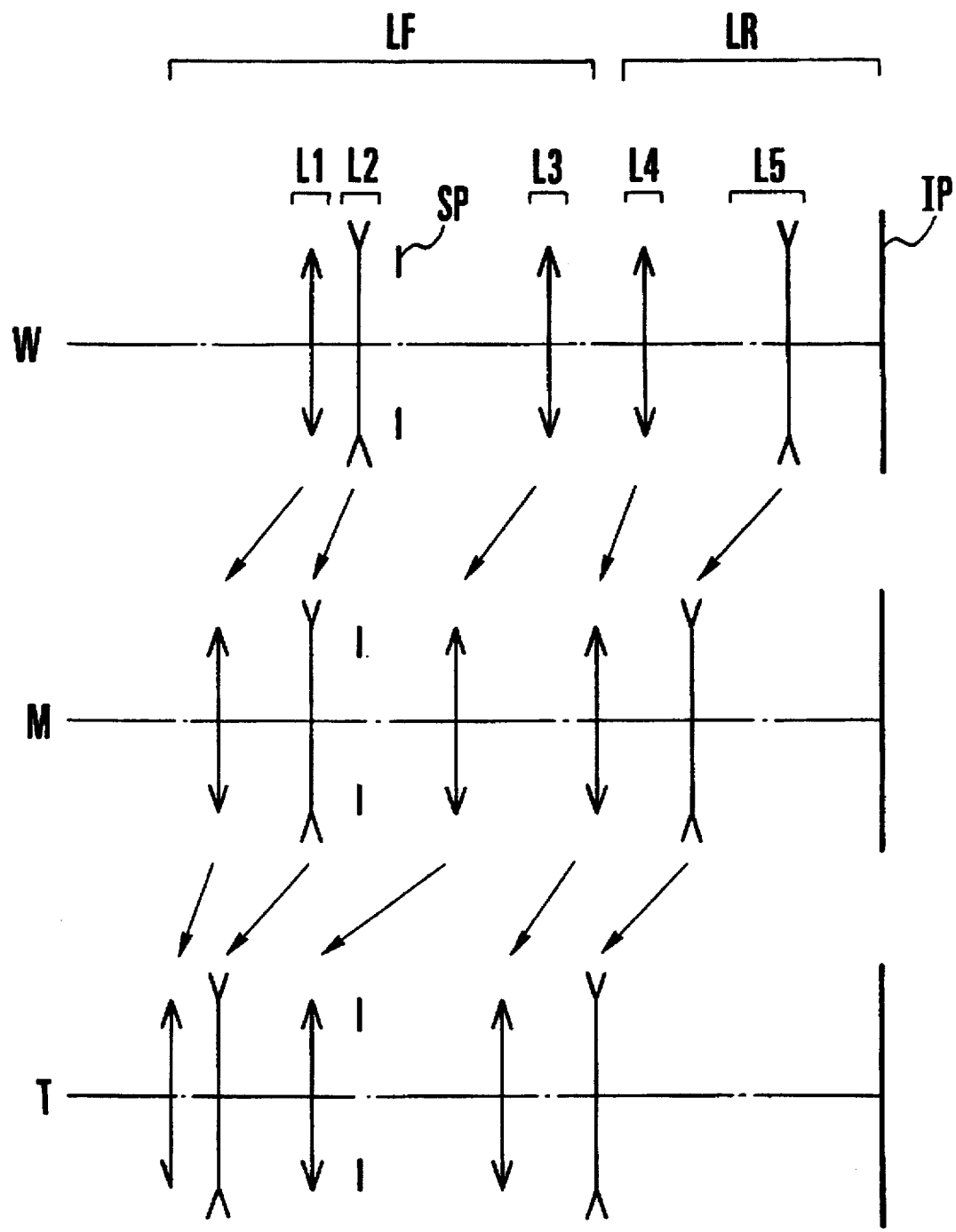
FIG. 64 illustrates the paraxial refractive power arrangements of a zoom lens of the invention.
Figure 65:
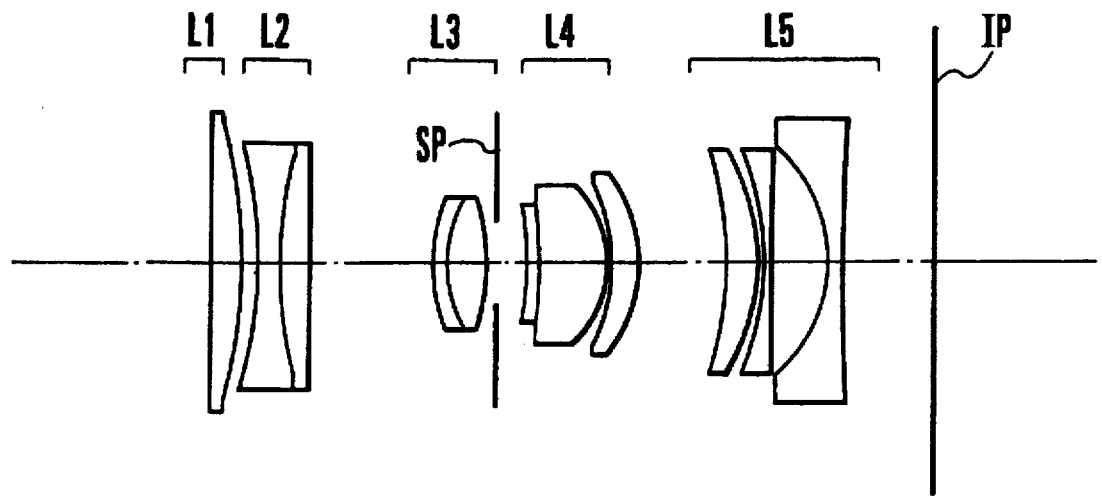
FIG. 65 is a block diagram of a numerical example 29 of the invention in the wide angle end.
Figure 66:
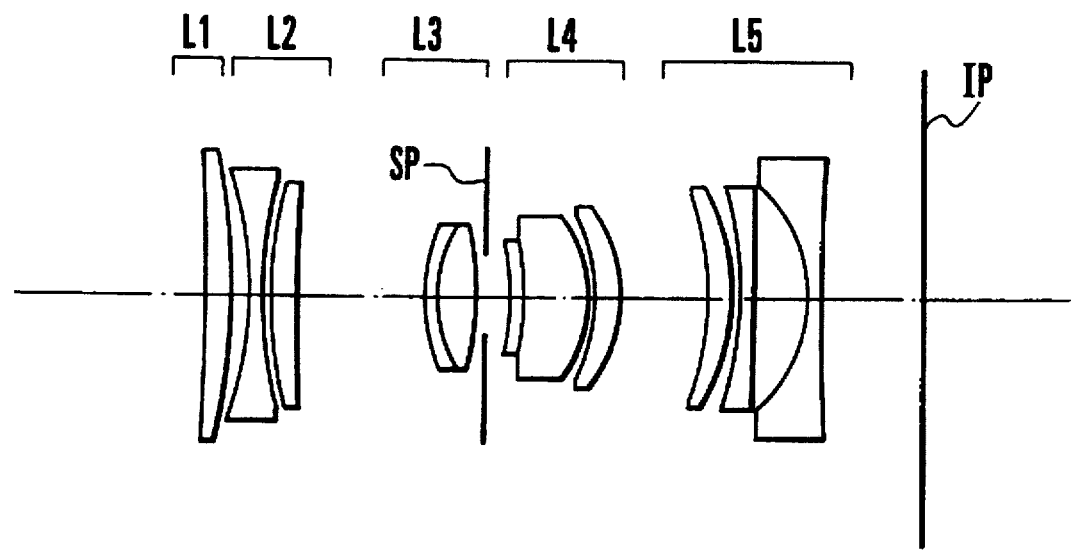
FIG. 66 is a block diagram of a numerical example 30 of the invention in the wide angle end.
Figure 67:
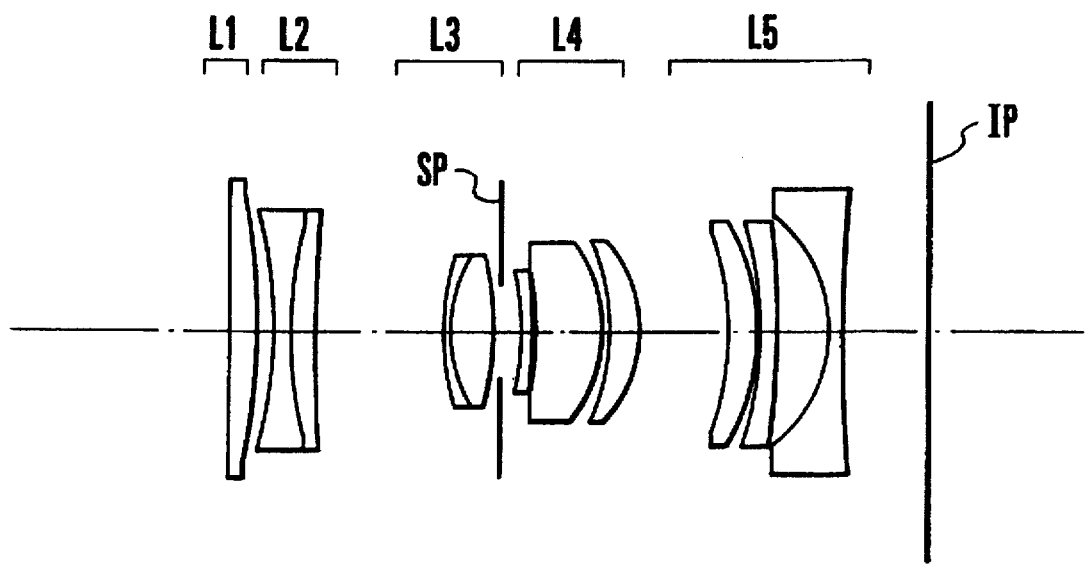
FIG. 67 is a block diagram of a numerical example 31 of the invention in the wide angle end.
Figure 68:
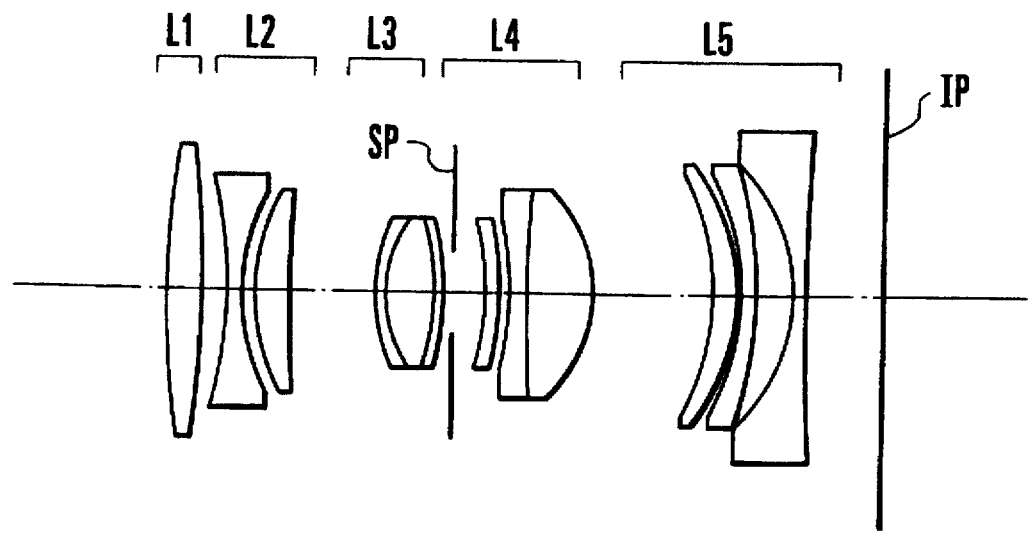
FIG. 68 is a block diagram of a numerical example 32 of the invention in the wide angle end.
Figure 69A:
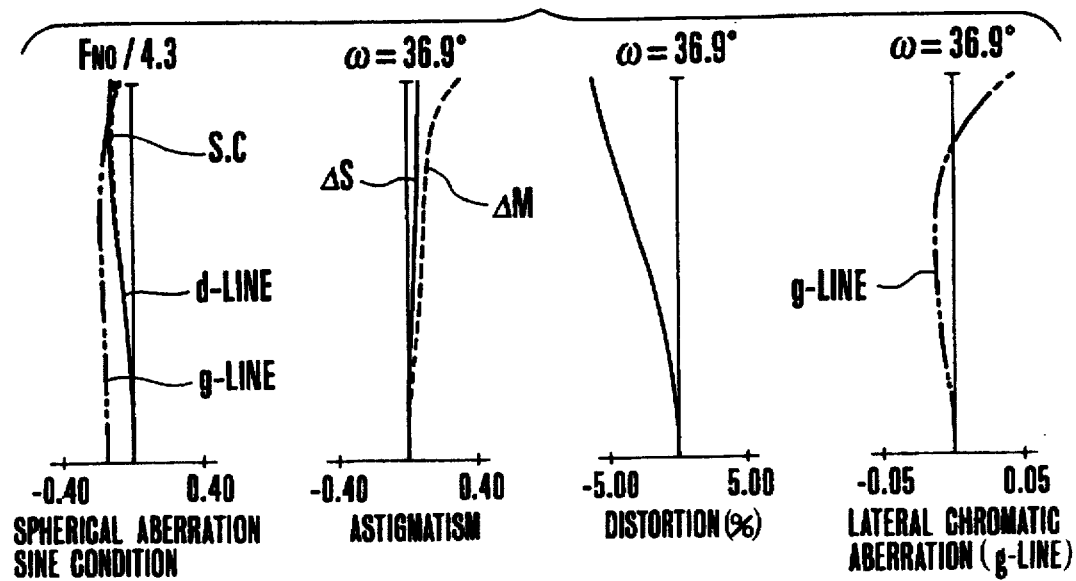
FIGS. 69(A), 69(8) and 69(C) are graphs of the various aberrations of the numerical example 29 of the invention.
Figure 69B:
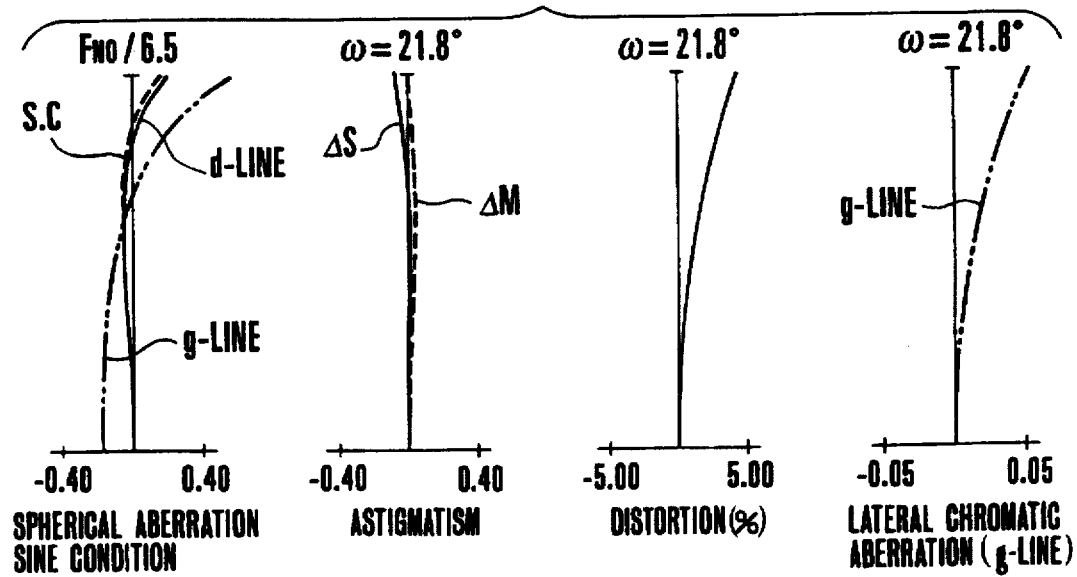
Figure 69C:
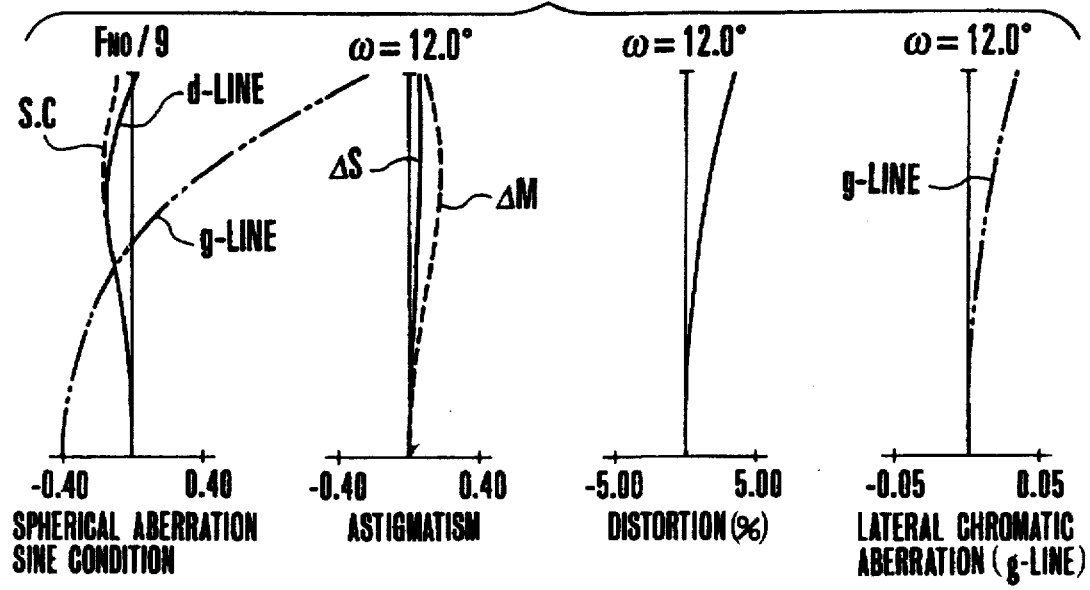
Figure 70A:
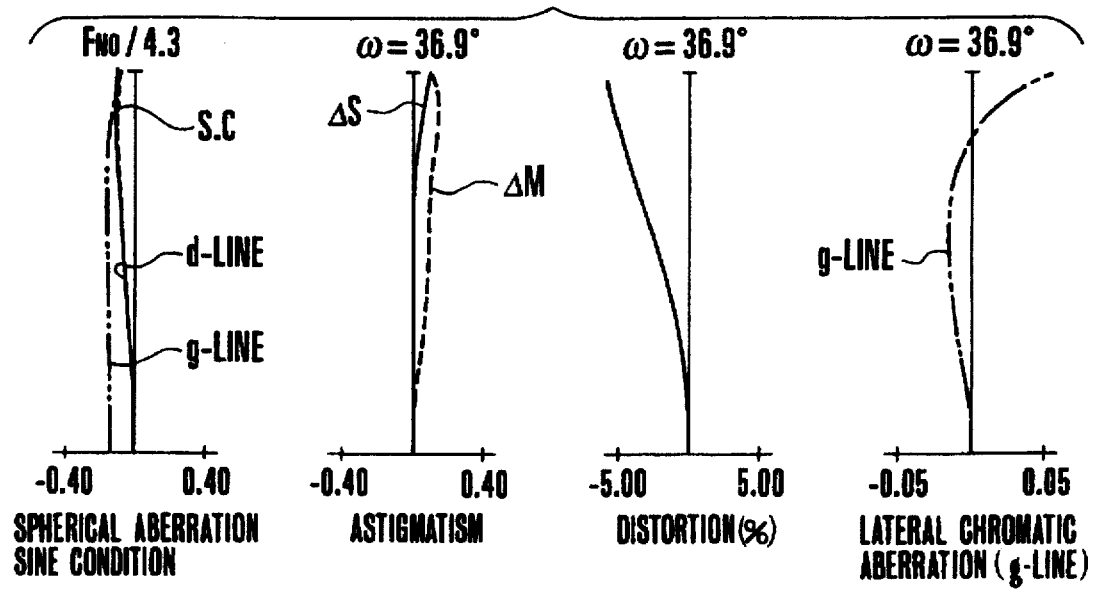
FIGS. 70(A), 70(B) and 70(C) are graphs of the various aberrations of the numerical example 30 of the invention.
Figure 70B:
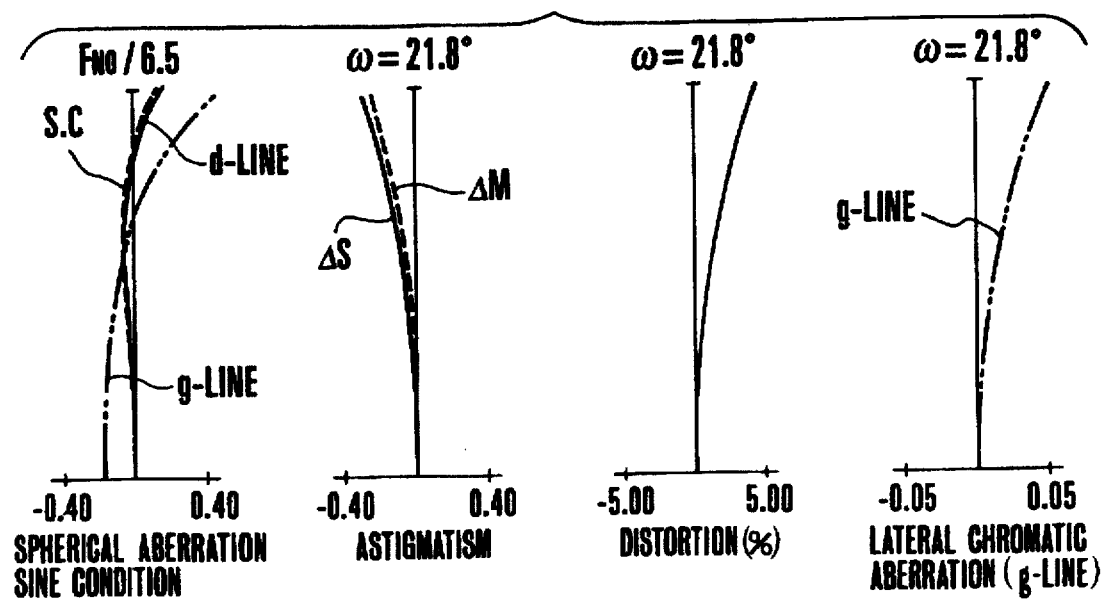
Figure 70C:
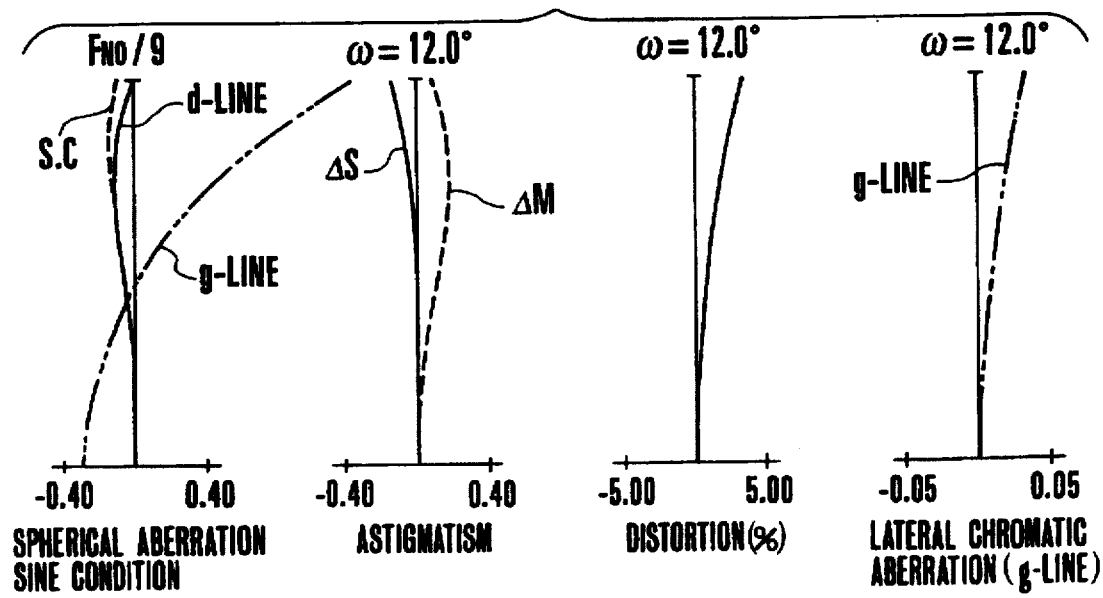
Figure 71A:
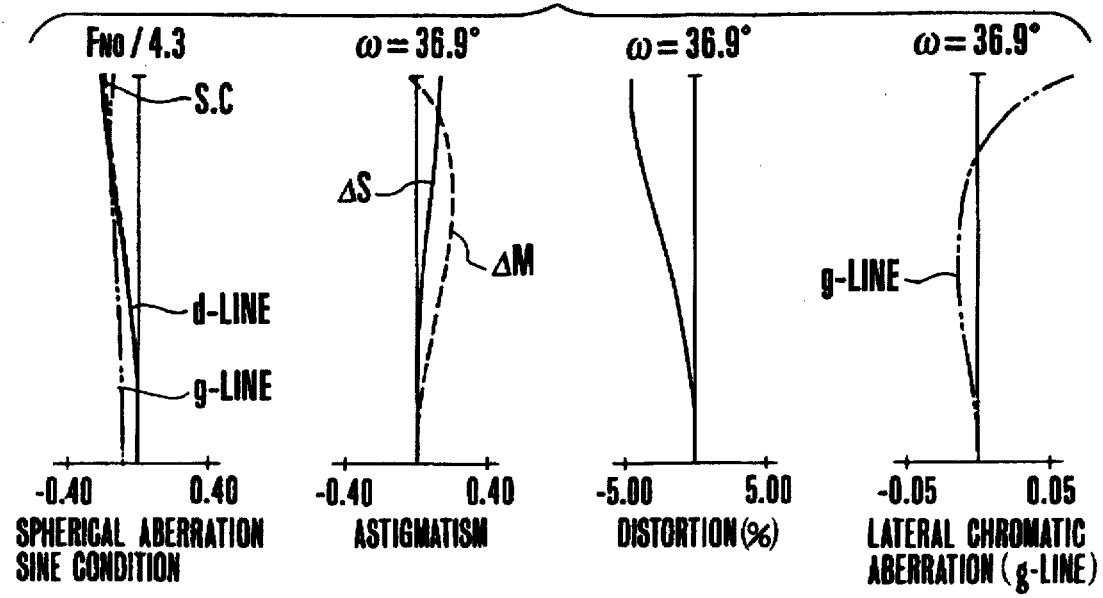
FIGS. 71(A), 71(B) and 71(C) are graphs of the various aberrations of the numerical example 31 of the invention.
Figure 71B:
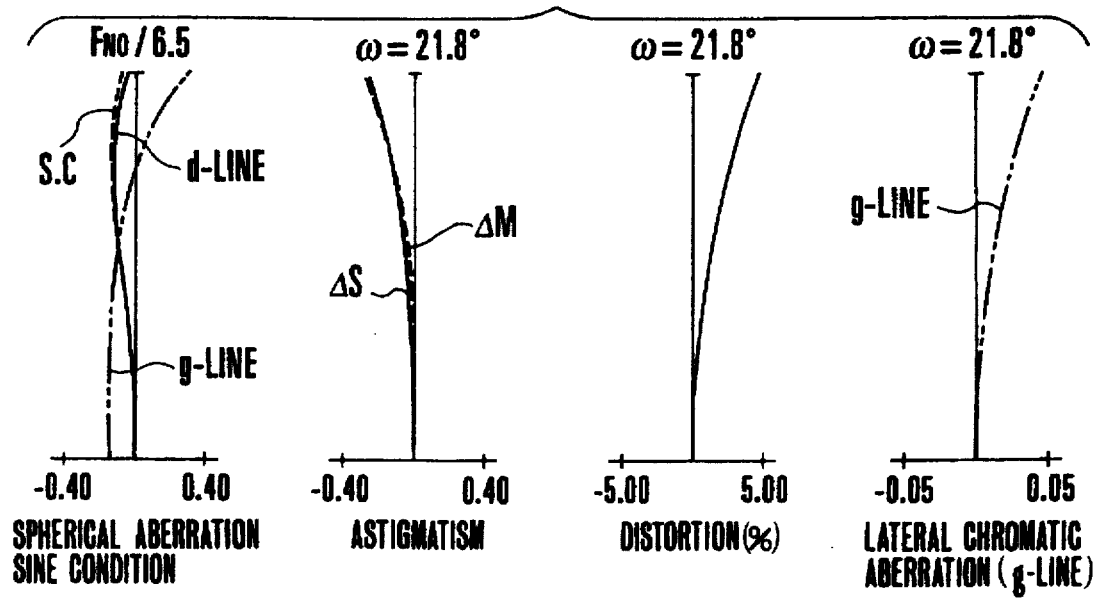
Figure 71C:
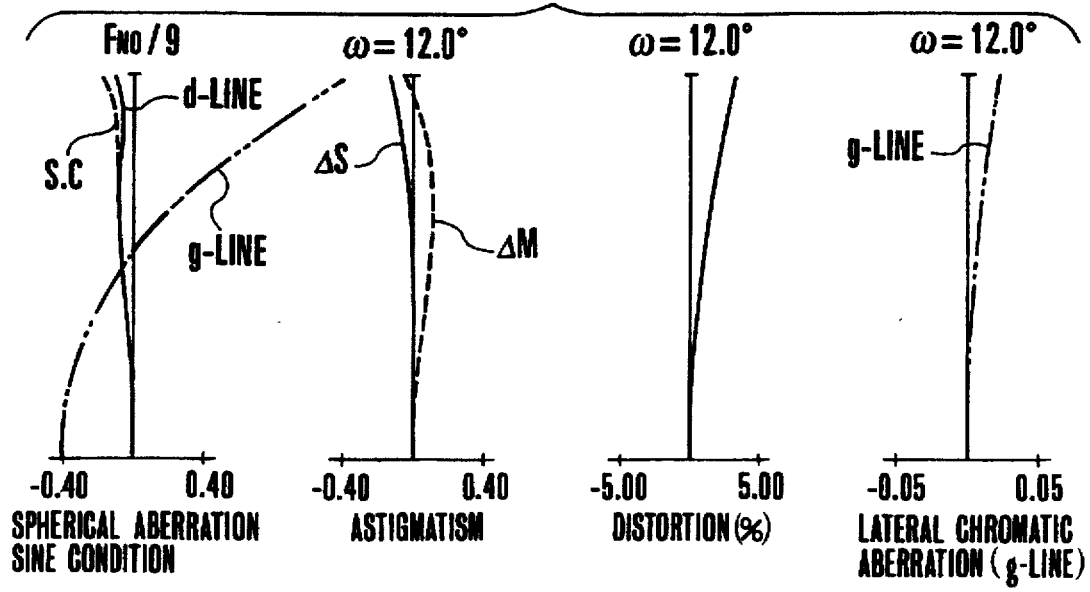
Figure 72A:
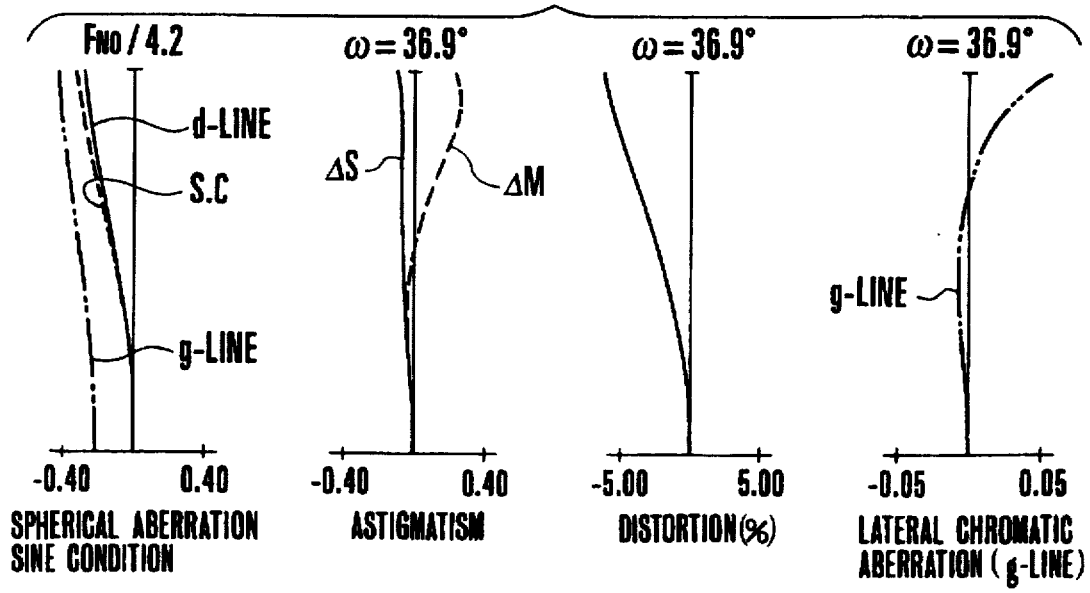
FIGS. 72(A), 72(B) and 72(C) are graphs of the various aberrations of the numerical example 32 of the invention.
Figure 72B:
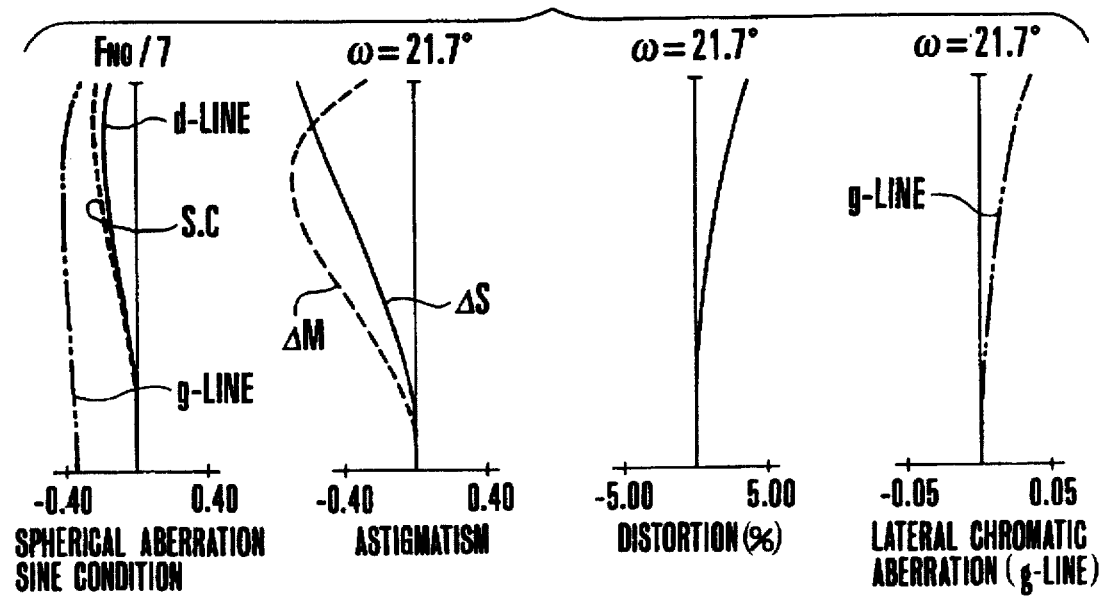
Figure 72C:
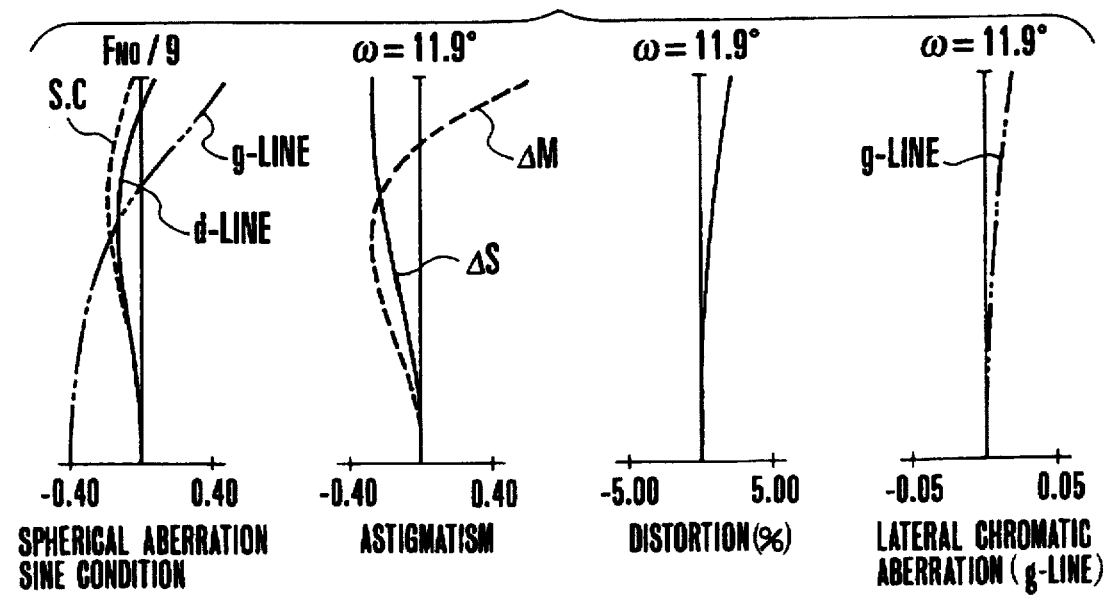

FIG. 64 illustrates the paraxial refractive power arrangements of this embodiment of the zoom lens in the wide angle end W, an intermediate position M and the telephoto end T. FIGS. 65 to 68 are longitudinal section views of numerical examples 29 to 32 of zoom lenses of the invention in the wide angle end respectively. FIGS. 69(A) to 69(C) through FIGS. 72(A) to 72(C) are graphic representations of the various aberrations of the numerical examples 29 to 32 of the invention.

In the drawings, reference character LF denotes the front lens group of positive refractive power, and reference character LR denotes the rear lens group. SP stands for a stop and IP for an image plane. Reference character Li (i=1–5) denotes the i-th lens unit. The arrows indicate the directions in which the lens units move as zooming from the wide angle end to the telephoto end.

The front lens group LF has the first lens unit L1 of positive refractive power, the second lens unit L2 of negative refractive power and the third lens unit L3 of positive refractive power, totaling three lens units. In the wide angle end, its overall refractive power takes a positive value. The rear lens group LR has the fourth lens unit L4 of positive refractive power and the fifth lens unit L5 of negative refractive power, totaling two lens units.

Zooming from the wide angle end to the telephoto end is carried out in such a manner as to satisfy the conditions described above. The first, second and third lens units all move axially forward in such relation that the second lens unit varies its relative position to the other lens units and that the overall refractive power of the front lens group is weaker when in the telephoto end than when in the wide angle end. The fourth and fifth lens units also move axially forward in such relation that their separation narrows. At this time, the third and fourth lens units move in such relation that their separation increases with zooming from the wide angle end to the telephoto end. The combined system of the third and fourth lens units as considered to be an independent zoom lens increases its focal length in response to that zooming operation.

It is desirable to set forth additional conditions for the focal length f5 and the lateral magnification β5W for the wide angle end of the fifth lens unit as follows:

$$0.45 < |f5/fW| < 1.5 \quad (38)$$

$$1.1 < \beta5W < 1.9 \quad (39)$$

When the focal length and the lateral magnification for the wide angle end of the fifth lens unit lie in the ranges of the conditions (38) and (39), the size of the entire lens system is minimized, while still permitting increase of the zoom ratio to a predetermined value and widening of the maximum angular field of view to be achieved advantageously.

Again, for more desirable results, it is better to alter the ranges of the conditions (38) and (39) as follows:

$$0.5 < |f5/fW| < 0.9 \quad (38a)$$

$$1.2 < \beta5W < 1.7 \quad (39a)$$

When such ranges are adopted, a further improvement of the optical performance can be achieved.

In the present embodiment, for the wide angle end, the overall refractive power of the first and second lens units is negative. Since the refractive power of the third lens unit is positive, the front lens group as a whole becomes a retrofocus type. The use of this feature brings the front principal point to a nearer position to the image plane. So, the requirements of preventing the front and rear lens groups from mechanically interfering with each other and of increasing the maximum field angle become easy to fulfill at once. Another feature is that, as the first lens unit is made to have a positive refractive power and the second lens unit to have a negative refractive power, the combined system of such first and second lens units has its rear principal point brought to a more front position, thereby giving an advantage of shortening the physical length of the front lens group that is of the retrofocus type. Another advantage arising from the first lens unit taking the positive refractive power is that positive distortion is well corrected in the wide angle end. The fourth lens unit is moved forward to effect focusing to suit from an infinitely distant object down to a close object. In the zoom lens of the present embodiment, the focal length f of the entire system is expressed by the following equation:

$$f = fA \cdot \beta4 \cdot \beta5 (\beta4 > 0, \beta5 > 0)$$

where fA is the overall focal length of the front lens group and βi is the lateral magnification of the i-th lens unit.

For this zoom lens, as is understandable from that equation, the variation of the focal length from the wide angle end to the telephoto end operates with a higher efficiency when the lateral magnifications β4 and β5 are made larger in value and the overall focal length fA of the front lens group is made longer, (or the overall refractive power of the front lens group is weakened). In addition, the separation between the fourth lens unit of positive refractive power and the fifth lens unit of negative refractive power is made narrower when in the telephoto end than when in the wide angle end, thereby giving the fifth lens unit an effect of varying the focal length. Thus, the zoom ratio becomes easy to increase. For the rear lens group, the divergence or negative refractive power is made stronger when in the telephoto end. So, along with the front lens group of positive refractive power, it forms the telephoto type. Thus, a minimization of the size of the entire lens system is achieved.

In the present embodiment, by adopting the paraxial refractive power arrangement as shown in FIG. 64, the maximum field angle is increased to such a value that the shortest focal length is smaller than the diagonal length of the image frame.

Specifically speaking, the front lens group comprises a first lens unit of positive refractive power, a second lens unit of negative refractive power and a third lens unit of positive refractive power, wherein when zooming from the wide angle end to the telephoto end, all the lens units axially move forward in such relation that the separation between the first and second lens units first increases in a region of from the wide angle end to the intermediate position and then decreases in a region of from the intermediate position to the telephoto end and that the separation between the second and third lens units decreases. Thus, the front lens group gives a higher contribution to the variation of the focal length and its effect of correcting aberrations is increased.

To assure increase of the maximum field angle of the lens system, it has been the common practice that a lens unit of negative refractive power is arranged at the frontmost position to secure an appropriate back focal distance and to position the entrance pupil plane at or near the center of the axial length of the lens system, thereby giving an advantage of obtaining good imaging performance. With the premise of minimizing the size of the lens system, to produce that advantage, it is, however, necessary that the frontmost lens unit be made somewhat strong in the negative refractive power. As a result, large negative distortion is produced.

From this reason, according to the present embodiment, the first lens unit is made to have a positive refractive power and the second lens unit is made to have a strong negative refractive power. Thus, an effect of canceling their distortions is obtained. Also, the first and second lens units approach each other when in the wide angle end, thereby preventing an increase of the diameter of the first lens unit which would otherwise result from securing the certain level of corner illumination.

Another feature is that the separation between the first and second lens units is made wider in the intermediate region of the zooming range. With this, the spherical aberration the first lens unit produces is well corrected by the second lens unit. Then, in the telephoto region, the first and second lens units approach each other again, thereby shortening the total length of the entire system. This is advantageous at achieving an improvement of the compactness of the optical system.

Also, if D1W≧D1T is further satisfied, a more advantageous result is attained when the total length of the entire system is shortened in the telephoto end.

In the present embodiment, with such construction and arrangement of the lens units, when the conditions (38) and (39) are satisfied, a high optical performance is obtained throughout the entire zooming range, while still maintaining minimization of the size of the entire lens system to be achieved.

The technical significance of each of the above-described conditions is explained below.

The inequalities of condition (38) are concerned with the negative refractive power of the fifth lens unit and have an aim chiefly to improve the efficiency with which the focal length varies. When the negative refractive power of the fifth lens unit is weaker than the upper limit of the condition (38), that lens unit lessens its contribution to the effect of varying the focal length. As a result, the movement of each lens unit has to increase to obtain the predetermined value of the zoom ratio. Thus, the entire lens system gets an increased total length.

When the lower limit of the condition (38) is exceeded, the entire lens system gets too strong of a telephoto type function in the wide angle end, because the first to the fourth lens units have a positive overall refractive power and the fifth lens unit has a negative refractive power.

From this reason, as a result, the lens system gets too short of a back focal distance. To secure a certain corner illumination, therefore, a large increase of the outer diameter of the fifth lens unit is invited. As another result, that lens unit gets too strong of a refractive power, causing production of higher order field curvature and astigmatism, which are difficult to correct.

The inequalities of condition (39) are concerned with the lateral magnification for the wide angle end of the fifth lens unit.

Now, the back focal distance BfW for the wide angle end of the lens system is expressed by:

$$BfW = f5 \cdot (1-\beta 5W)$$

So, according to the present embodiment, within the framework of the condition (38), a proper range is given for the factor of the condition (39) to make a good compromise between the reduction of the total length of the entire lens system and the correction of aberrations.

When the upper limit of the condition (39) is exceeded, the back focal distance becomes longer than necessary. As the total length of the entire system increases, the difficulty of improving the compactness increases. When the lower limit is exceeded, the back focal distance becomes too short and the outer diameter of the fifth lens unit increases objectionably.

It should be pointed out that, in the present embodiment, while the variation of aberrations with zooming is lessened, the maximum field angle not only is increased, but also the image aberrations are corrected for high optical performance over the entire area of the image frame. For this purpose, additional features for the lens units are set forth as follows:

(i) It is preferred to satisfy the following conditions:

$$0.3 < fW \cdot \phi_{123W} < 1.2 \tag{40}$$

$$0.6 < |f2|/fW < 3.0 \tag{41}$$

where $\phi_{123W}$ is the overall refractive power for the wide angle end of the front lens group.

The inequalities of condition (40) are concerned with the refractive power of the front lens group. When the upper limit of the condition (40) is exceeded, as this implies that the refractive power of the front lens group in the wide angle end is too strong, the telephoto function of the entire lens system becomes too strong. Therefore, it becomes difficult to obtain a positive value of the back focal distance. When the lower limit is exceeded, as this implies that the refractive power of the front lens group is too weak, the entire lens system gets a longer total length. To avoid this, the rear lens group has to be strengthened in refractive power. Or otherwise, the desired value of the shortest focal length could not be retained. Therefore, it becomes difficult to keep all aberrations in good balance over the entire zooming range.

The inequalities of condition (41) are concerned with the negative refractive power of the second lens unit. When the upper limit of the condition (41) is exceeded, as this implies that the refractive power of the second lens unit is too weak, the total zooming movement of the second lens unit increases to increase the size of the entire lens system. When the lower limit is exceeded, as this implies that the refractive power of the second lens unit is too strong, large spherical aberrations of higher order are produced, which are difficult to correct.

It is to be noted that, in the present embodiment, particularly for the wide angle end, the total length of the entire system is shortened. The aberration correction has, despite this, to be improved for high optical performance. For this purpose, it is better to alter the upper and lower limits of the conditions (40) and (41) as follows:

$$0.35 < fW \cdot \phi_{123W} < 0.9 \tag{40a}$$

$$0.75 < |f2|/fW < 2.0 \tag{41a}$$

(ii) It is preferred to satisfy the following conditions:

$$0.6 < f3/fW < 2.0 \tag{42}$$

$$0.2 < (\phi_{123W}/\phi_{123T})/Z < 0.8 \tag{43}$$

$$0.25 < \beta 4W < 0.7 \tag{44}$$

$$0.1 < f5 \cdot (1-\beta 5W)/fW < 0.6 \tag{45}$$

where $\phi_{123T}$ is the overall focal length for the telephoto end of the front lens group and Z is the zoom ratio.

The inequalities of condition (42) are concerned with the positive refractive power of the third lens unit. When the upper limit of the condition (42) is exceeded, as this implies that the refractive power of the third lens unit is too weak, the total zooming movement of the lens unit increases to increase the size of the entire system. When the lower limit is exceeded, as this implies that the refractive power of the third lens unit is too strong, it is in some cases that the negative refractive power of the second lens unit has to be strengthened. In other cases, the total zooming movement of the second lens unit has to be increased. In addition, the share of the zoom ratio on the rear lens group has to increase. So, it should be avoided.

The inequalities of condition (43) are concerned with the zoom ratio of the focal length of the front lens group. When the upper limit is exceeded, the share of the zoom ratio of the entire system by the front lens group becomes too large, causing the refractive powers of the lens units in the front lens group to become strong, or the total zooming movement of each of the lens unit to increase. When the lower limit is exceeded, the share of the zoom ratio by the rear lens group becomes too large, causing the total zooming movement of each of the lens units in the rear lens group to increase in order to secure the predetermined value of the zoom ratio.

The inequalities of condition (44) are concerned with the lateral magnification for the wide angle end of the fourth lens unit. When the upper limit of the condition (44) is exceeded, the back focal distance hardly reaches an appreciable value. As a result, the fifth lens unit gets a large outer diameter. When the lower limit is exceeded, the refractive powers of the other lens units has to increase to obtain the predetermined values of the focal length. Therefore, it becomes difficult to correct the variation of aberrations with zooming. Further, the focal length of the front lens group has to be made even longer, causing the total length of the entire system to increase objectionably.

If desired, it is better to narrow the ranges of the conditions (42), (43) and (44) as follows:

$$0.8 < \sqrt{\beta/fW} < 1.25 \quad (42a)$$

$$0.25 < (\phi_{123W}/\phi_{123T})/Z < 0.5 \quad (43a)$$

$$0.35 < \beta 4W < 0.6 \quad (44a)$$

When these are satisfied, the balance between the reduction of the size of the lens system and the improvement of the optical performance can be made better.

The inequalities of condition (45) give appropriate ranges for the refractive power and lateral magnification of the fifth lens unit to fulfill the chief aim of obtaining the predetermined value of the back focal distance. When the upper limit of the condition (45) is exceeded, the back focal distance, when in the wide angle end, becomes longer than necessary, causing the total length of the entire system to increase. When the lower limit is exceeded, the predetermined value for the wide angle end of the back focal distance not only becomes difficult to obtain, but also the outer diameter of the fifth lens unit increases objectionably.

(iii) The fourth lens unit of positive refractive power has at least one positive and at least one negative lenses. These lenses are better formed to such a shape that the frontmost lens surface turns its concave curvature toward the object side and the rearmost lens surface turns its convex curvature toward the image side.

(iv) The zoom lens of the present embodiment is provided with an aspherical lens. If the aspheric surface is introduced into, for example, the fourth lens unit, it correct curvature of field and spherical aberration in the telephoto end, to maintain good stability of aberrations with zooming, and to correct image aberrations over the entire area of the image frame. In the present embodiment, the last surface of the fourth lens unit is made aspherical. If introduced into the fifth lens unit, off-axial aberrations can mainly be corrected well.

(v) The fifth lens unit of negative refractive power has at least one negative and at least one positive lenses having a concave surface facing the object side, satisfying the following condition:

$$12 < v5N - v5P < 35 \quad (46)$$

where v5P and v5N are the mean values of the Abbe numbers of the materials of the positive and negative lenses in the fifth lens unit respectively.

When either of the upper and lower limits of the condition (46) is violated, the chromatic aberrations varies to large extent with zooming, which is difficult to correct by any design of the other lens units.

(vi) The stop is preferably positioned in one of the spaces between the rearmost lens surfaces of the third and fourth lens units. With this, the entrance pupil can take an appropriate position to suppress the variation of aberrations with zooming. When zooming, the stop may be moved either in differential relation to the other lens units, or in unison with one of the other lens units. If so, it becomes possible for the stop to take its place in the neighborhood of the entrance pupil that changes its position with zooming, thereby giving an advantage of preventing the field curvature from varying when the stop has a small aperture.

If, as focusing is performed by the fourth lens unit, the fourth lens unit contains the stop, it is preferred that the stop is made axially stationary during focusing, because the driving torque for the diaphragm mechanism can be reduced by an amount which would be otherwise necessary to shift the stop with focusing.

(vii) The fourth lens unit is preferably divided into two or more parts which move axially in differential relation when zooming or focusing, because the variation of aberrations with zooming or focusing can be lessened.

(viii) In the present embodiment, it is assumed that the fourth lens unit is used for focusing from an infinitely distant object to an object at a minimum distance, as it moves forward. Any other lens unit or units may be used instead. For example, the front lens group may be moved forward.

Again, if the back focal distance in the wide angle end is long enough, the fifth lens unit may be used. In this case, it moves toward the image side. An advantage of this case is to reduce the outer diameter of the first lens unit. It is also possible to move two or more of the first to fifth lens units simultaneously.

Next, numerical examples 29 to 32 of the invention are shown. The values of the factors in the above-described conditions for the numerical examples 29 to 32 are also listed in Table 5.

NUMERICAL EXAMPLE 29

| f = 28.80~101.90 | Fno = 4.30~9.00 | 2ω = 73.8~24.0 | |
|---|---|---|---|
| R1 = 1305.921 | D1 = 2.50 | N1 = 1.620041 | ν1 = 36.3 |
| R2 = −60.453 | D2 = Variable | | |
| R3 = −34.199 | D3 = 1.20 | N2 = 1.772499 | ν2 = 49.6 |
| R4 = 34.454 | D4 = 2.50 | N3 = 1.846660 | ν3 = 23.8 |
| R5 = 135.863 | D5 = Variable | | |
| R6 = 18.596 | D6 = 1.00 | N4 = 1.846660 | ν4 = 23.8 |
| R7 = 12.708 | D7 = 3.70 | N5 = 1.487490 | ν5 = 70.2 |
| R8 = −30.454 | D8 = 0.80 | | |
| R9 = (Stop) | D9 = Variable | | |
| *R10 = −24.367 | D10 = 1.00 | N6 = 1.805181 | ν6 = 25.4 |
| R11 = −46.096 | D11 = 0.28 | | |
| R12 = −27.205 | D12 = 6.16 | N7 = 1.568832 | ν7 = 56.3 |
| R13 = −11.621 | D13 = 0.30 | | |
| *R14 = −20.149 | D14 = 2.40 | N8 = 1.583126 | ν8 = 59.4 |
| R15 = −14.006 | D15 = Variable | | |
| R16 = −33.298 | D16 = 2.80 | N9 = 1.761821 | ν9 = 26.5 |
| R17 = −18.088 | D17 = 0.43 | | |
| R18 = −30.265 | D18 = 1.30 | N10 = 1.804000 | ν10 = 46.6 |
| R19 = −197.975 | D19 = 4.54 | | |
| R20 = −14.487 | D20 = 1.50 | N11 = 1.712995 | ν11 = 53.8 |
| R21 = 215.820 | | | |

| Variable | Focal Length | | |
|---|---|---|---|
| Separation | 28.80 | 54.17 | 101.90 |
| D2 | 1.64 | 2.31 | 1.61 |
| D5 | 12.14 | 7.86 | 0.86 |
| D9 | 2.84 | 5.39 | 10.10 |
| D15 | 7.97 | 3.28 | 0.79 |

Aspheric Coefficient

| | | | | | | |
|---|---|---|---|---|---|---|
| R10 | k = 4.42453 | A = 0 | B = −1.28975e−04 | C = −1.15371e−06 | D = −1.24010e−08 | E = 0 |
| R14 | k = 1.27475 | A = 0 | B = 1.20420e−05 | C = 3.42533e−07 | D = −1.13640e−10 | E = 0 |

NUMERICAL EXAMPLE 30

| f = 28.80~101.83 | Fno = 4.30~9.00 | 2ω = 73.8~24.0 | |
|---|---|---|---|
| R1 = −581.199 | D1 = 2.50 | N1 = 1.620041 | ν1 = 36.3 |
| R2 = −66.069 | D2 = Variable | | |
| R3 = −35.436 | D3 = 1.20 | N2 = 1.772499 | ν2 = 49.6 |
| R4 = 34.543 | D4 = 0.73 | | |
| R5 = 37.396 | D5 = 2.50 | N3 = 1.846660 | ν3 = 23.8 |
| R6 = 305.468 | D6 = Variable | | |
| R7 = 18.621 | D7 = 1.00 | N4 = 1.846660 | ν4 = 23.8 |
| R8 = 12.655 | D8 = 3.70 | N5 = 1.487490 | ν5 = 70.2 |
| R9 = −30.834 | D9 = 0.80 | | |
| *R10 = (Stop) | D10 = Variable | | |
| R11 = −24.370 | D11 = 1.00 | N6 = 1.805181 | ν6 = 25.4 |
| R12 = −47.651 | D12 = 0.30 | | |
| R13 = −27.132 | D13 = 6.11 | N7 = 1.568832 | ν7 = 56.3 |
| *R14 = −11.667 | D14 = 0.30 | | |
| R15 = −20.135 | D15 = 2.40 | N8 = 1.583126 | ν8 = 59.4 |
| R16 = −14.010 | D16 = Variable | | |
| R17 = −33.117 | D17 = 2.80 | N9 = 1.761821 | ν9 = 26.5 |
| R18 = −18.472 | D18 = 0.44 | | |
| R19 = −34.054 | D19 = 1.30 | N10 = 1.804000 | ν10 = 46.6 |
| R20 = −290.703 | D20 = 4.61 | | |
| R21 = −14.115 | D21 = 1.50 | N11 = 1.712995 | ν11 = 53.8 |
| R22 = 217.933 | | | |

-continued

| Variable | Focal Length | | |
|---|---|---|---|
| Separation | 28.80 | 54.15 | 101.83 |
| D2 | 1.62 | 2.35 | 1.62 |
| D6 | 11.85 | 7.30 | 0.74 |
| D10 | 2.46 | 5.63 | 10.26 |
| D16 | 7.98 | 3.33 | 0.66 |

Aspheric Coefficient

| | | | | | |
|---|---|---|---|---|---|
| R10 | k = 4.32160 | A = 0 | B = −1.27119e-04 | C = −1.16606e-06 | D = −1.11319e-08 | E = 0 |
| R14 | k = 1.27796 | A = 0 | B = 1.28096e-05 | C = 3.36944e-07 | D = 2.31897e-10 | E = 0 |

NUMERICAL EXAMPLE 31

| f = 28.80~101.92 | Fno = 4.30~9.00 | 2ω = 73.8~24.0 |
|---|---|---|

| | | | |
|---|---|---|---|
| R1 = −2676.553 | D1 = 2.70 | N1 = 1.620041 | ν1 = 36.3 |
| R2 = −62.055 | D2 = Variable | | |
| R3 = −32.412 | D3 = 1.20 | N2 = 1.772499 | ν2 = 49.6 |
| R4 = 35.498 | D4 = 2.20 | N3 = 1.846660 | ν3 = 23.8 |
| R5 = 233.581 | D5 = Variable | | |
| R6 = 18.701 | D6 = 1.00 | N4 = 1.846660 | ν4 = 23.8 |
| R7 = 12.635 | D7 = 3.70 | N5 = 1.487490 | ν5 = 70.2 |
| R8 = −26.993 | D8 = 0.80 | | |
| R9 = (Stop) | D9 = Variable | | |
| *R10 = −24.318 | D10 = 1.00 | N6 = 1.805181 | ν6 = 25.4 |
| R11 = −54.847 | D11 = 0.33 | | |
| R12 = −27.761 | D12 = 6.15 | N7 = 1.568832 | ν7 = 56.3 |
| R13 = −11.539 | D13 = 0.30 | | |
| *R14 = −20.096 | D14 = 2.40 | N8 = 1.583126 | ν8 = 59.4 |
| R15 = −14.000 | D15 = Variable | | |
| R16 = −32.265 | D16 = 2.40 | N9 = 1.846660 | ν9 = 23.8 |
| R17 = −19.601 | D17 = 0.30 | | |
| R18 = −38.070 | D18 = 1.30 | N10 = 1.804000 | ν10 = 46.6 |
| R19 = −549.177 | D19 = 4.72 | | |
| R20 = −14.579 | D20 = 1.50 | N11 = 1.696797 | ν11 = 55.5 |
| R21 = 148.117 | | | |

| Variable | Focal Length | | |
|---|---|---|---|
| Separation | 28.80 | 54.18 | 101.92 |
| D2 | 2.06 | 2.88 | 1.93 |
| D5 | 11.63 | 7.42 | 1.23 |
| D9 | 2.45 | 4.54 | 7.97 |
| D15 | 8.24 | 3.40 | 0.72 |

Aspheric Coefficient

| | | | | | |
|---|---|---|---|---|---|
| R10 | k = 4.43474 | A = 0 | B = −1.30628e-04 | C = −1.19449e-06 | D = −1.10915e-08 | E = 0 |
| R14 | k = 1.23309 | A = 0 | B = 1.35869e-05 | C = 3.45466e-07 | D = 4.40662e-10 | E = 0 |

NUMERICAL EXAMPLE 32

| f = 28.80~102.63 | Fno = 4.20~9.00 | 2ω = 73.8~23.8 |
|---|---|---|

| | | | |
|---|---|---|---|
| R1 = 100.846 | D1 = 3.00 | N1 = 1.516330 | ν1 = 64.2 |
| R2 = −180.148 | D2 = Variable | | |
| R3 = −41.487 | D3 = 1.20 | N2 = 1.804000 | ν2 = 46.6 |
| R4 = 19.911 | D4 = 1.35 | | |
| R5 = 20.774 | D5 = 2.90 | N3 = 1.846659 | ν3 = 23.8 |
| R6 = 166.857 | D6 = Variable | | |

-continued

| | | | |
|---|---|---|---|
| R7 = 15.950 | D7 = 0.90 | N4 = 1.846659 | v4 = 23.8 |
| R8 = 11.166 | D8 = 4.50 | N5 = 1.487490 | v5 = 70.2 |
| R9 = −21.994 | D9 = 0.90 | N6 = 1.846659 | v6 = 23.8 |
| R10 = −30.135 | D10 = Variable | | |
| R11 = (Stop) | D11 = 2.80 | | |
| *R12 = −24.735 | D12 = 1.36 | N7 = 1.805181 | v7 = 25.4 |
| R13 = −44.271 | D13 = 1.01 | | |
| R14 = −39.308 | D14 = 1.77 | N8 = 1.651597 | v8 = 58.5 |
| R15 = 137.586 | D15 = 5.95 | N9 = 1.772499 | v9 = 49.6 |
| *R16 = −14.625 | D16 = Variable | | |
| R17 = −24.242 | D17 = 2.30 | N10 = 1.846659 | v10 = 23.8 |
| R18 = −18.865 | D18 = 0.16 | | |
| R19 = −24.892 | D19 = 1.30 | N11 = 1.696797 | v11 = 55.5 |
| R20 = −54.220 | D20 = 3.60 | | |
| R21 = −17.318 | D21 = 1.50 | N12 = 1.772499 | v12 = 49.6 |
| R22 = 494.506 | | | |

| Variable | Focal Length | | |
|---|---|---|---|
| Separation | 28.80 | 54.37 | 102.63 |
| D2 | 2.53 | 3.23 | 2.26 |
| D6 | 8.17 | 4.15 | 0.76 |
| D10 | 1.00 | 4.75 | 8.46 |
| D16 | 10.95 | 4.69 | 0.57 |

Aspheric Coefficient

| | | | | | |
|---|---|---|---|---|---|
| R12 | k = 4.11165 | A = 0 | B = −6.82575e-05 | C = −4.02411e-07 | D = −5.03624e-09 | E = 0 |
| R16 | k = −2.61917 | A = 0 | B = −1.12560e-04 | C = 2.26658e-07 | D = −1.86755e-09 | E = 0 |

TABLE 5

| | Numerical Examples | | | |
|---|---|---|---|---|
| Conditions | 29 | 30 | 31 | 32 |
| \|f5/fW\| | 0.81 | 0.61 | 0.61 | 0.68 |
| β5W | 1.56 | 1.59 | 1.55 | 1.42 |
| fW · φ$_{123w}$ | 0.69 | 0.72 | 0.75 | 0.72 |
| \|f2/fW\| | 1.29 | 1.29 | 1.36 | 1.63 |
| f3/fW | 1.06 | 1.06 | 1.01 | 1.07 |
| (φ$_{123w}$/φ$_{123Tyz}$) | 0.37 | 0.36 | 0.36 | 0.30 |
| β4W | 0.44 | 0.45 | 0.48 | 0.51 |
| f5 · (1 − β5W)/fW | 0.34 | 0.35 | 0.33 | 0.28 |
| v5N − v5P | 23.7 | 23.7 | 27.3 | 28.8 |

Another embodiment of the invention in which further improvements are made is described by reference to FIG. 73 through FIGS. 89(A) to 89(C).

This zoom lens has a first lens unit of negative refractive power, a second lens unit of positive refractive power, a third lens unit of negative refractive power, a fourth lens unit of positive refractive power and a fifth lens unit of negative refractive power arranged in this order from the object side, being characterized in that all these lens units axially move in such relation that, when in the telephoto end as zoomed from the wide angle end, the separation between the first and second lens units is shorter, the separation between the second and third lens units is longer, the separation between the third and fourth lens units is longer and the separation between the fourth lens unit and the fifth lens unit is shorter.

Figure 73:
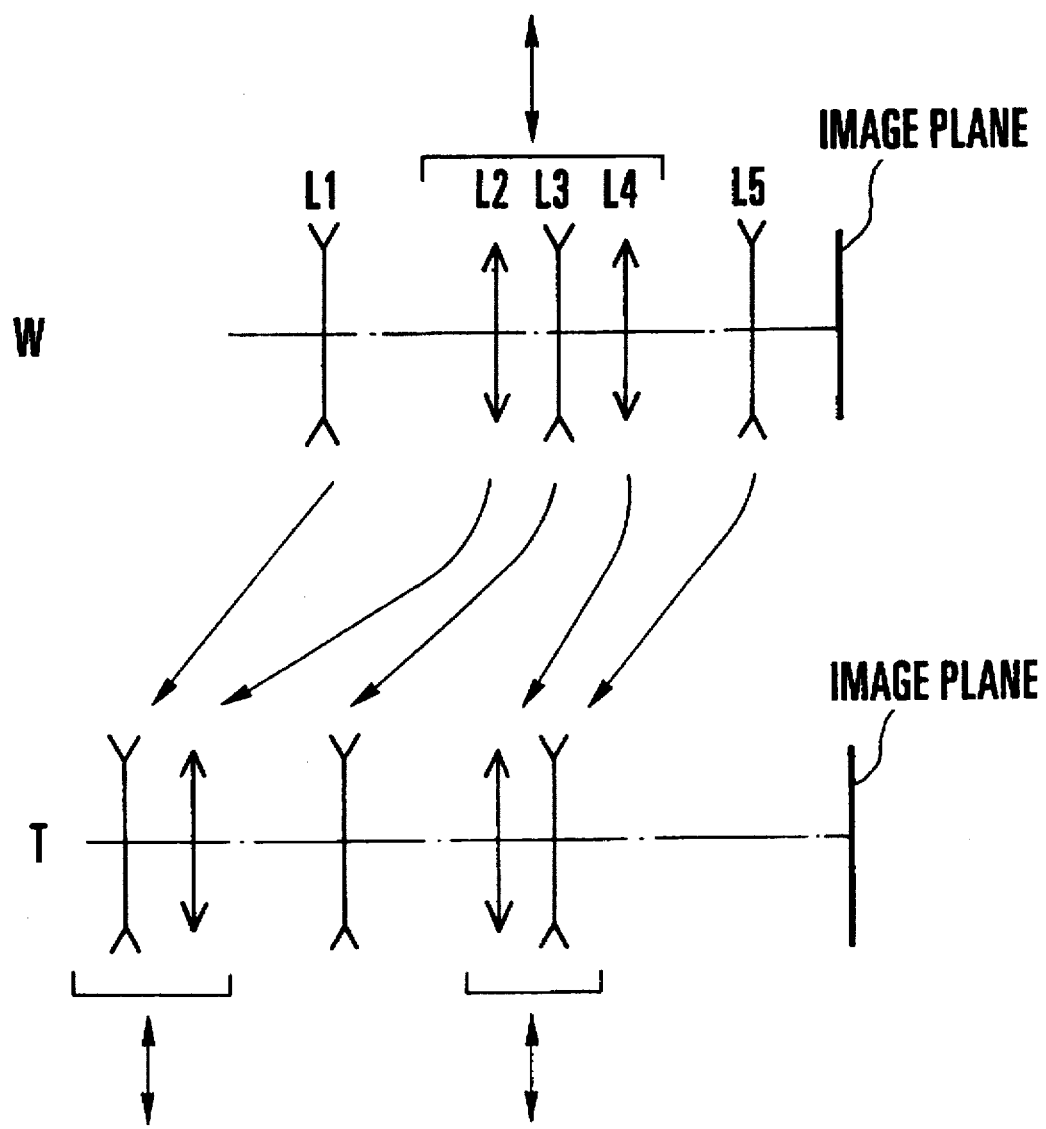
FIG. 73 illustrates the paraxial refractive power arrangements of a zoom lens of the invention.
Figure 74:
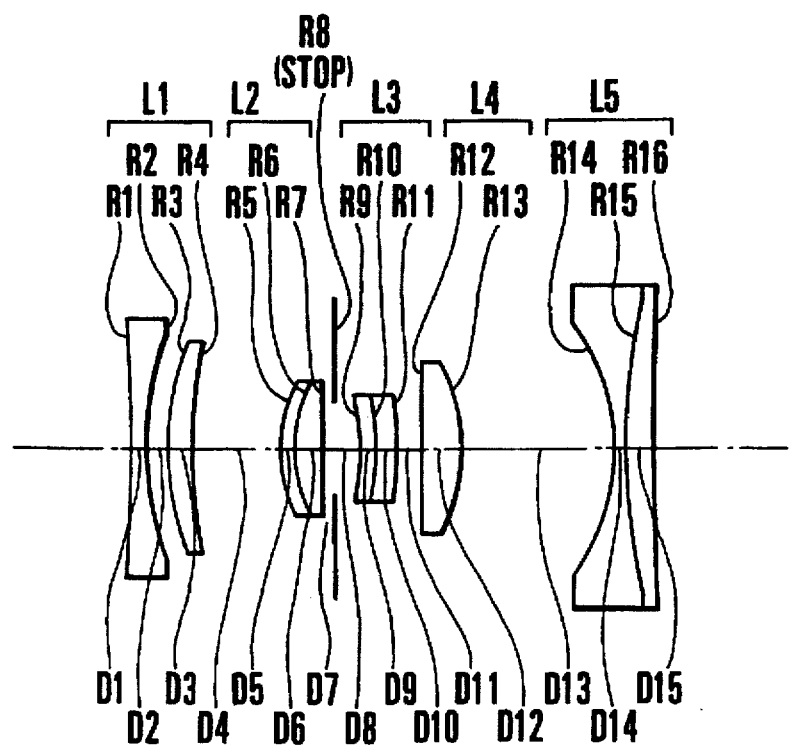
FIG. 74 is a block diagram of a numerical example 33 of the invention in the wide angle end.
Figure 75:
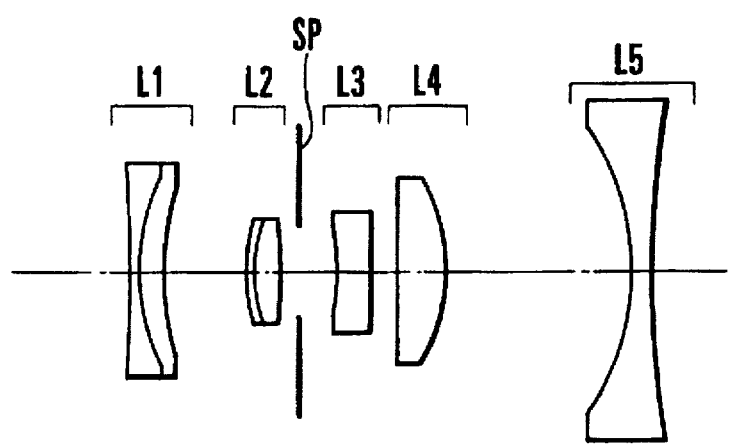
FIG. 75 is a block diagram of a numerical example 34 of the invention in the wide angle end.
Figure 76:
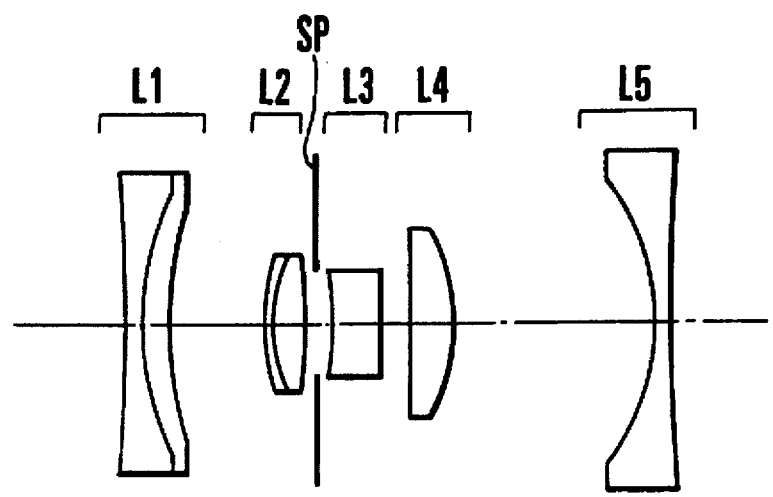
FIG. 76 is a block diagram of a numerical example 35 of the invention in the wide angle end.
Figure 77:
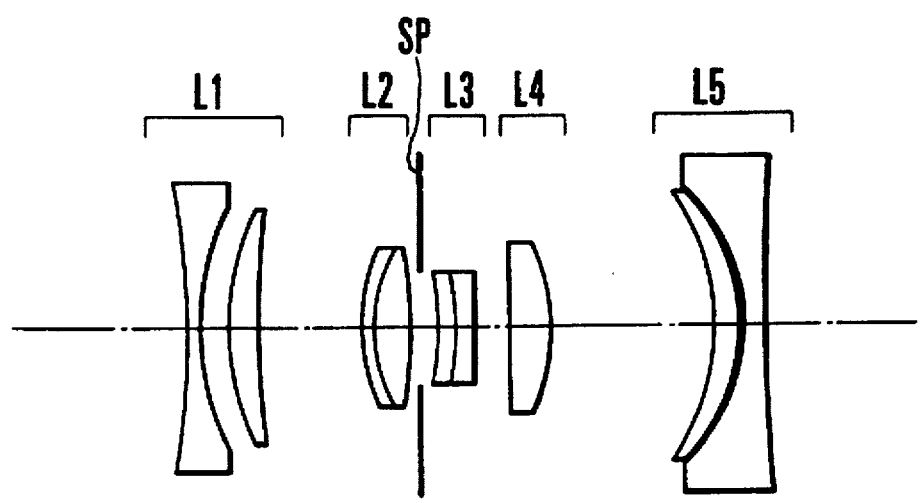
FIG. 77 is a block diagram of a numerical example 36 of the invention in the wide angle end.
Figure 78:
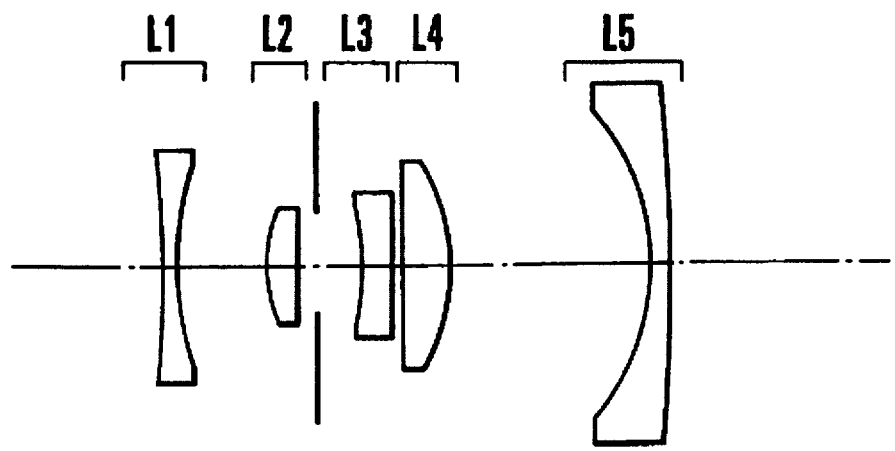
FIG. 78 is a block diagram of a numerical example 37 of the invention in the wide angle end.
Figure 79:
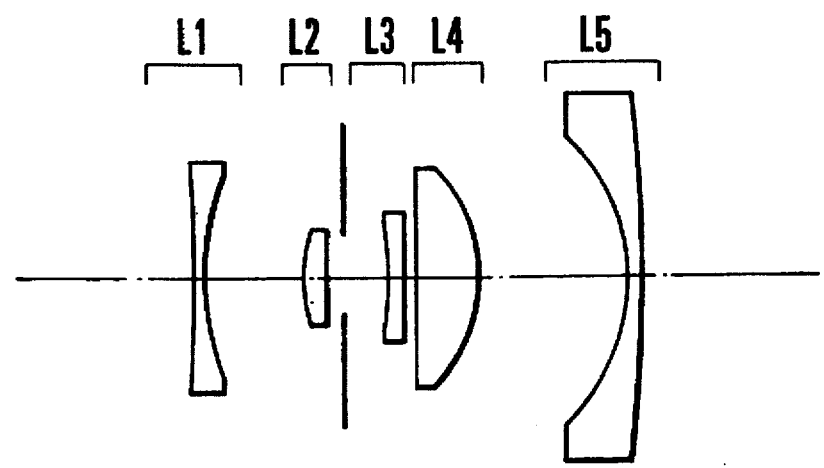
FIG. 79 is a block diagram of a numerical example 38 of the invention in the wide angle end.
Figure 80:
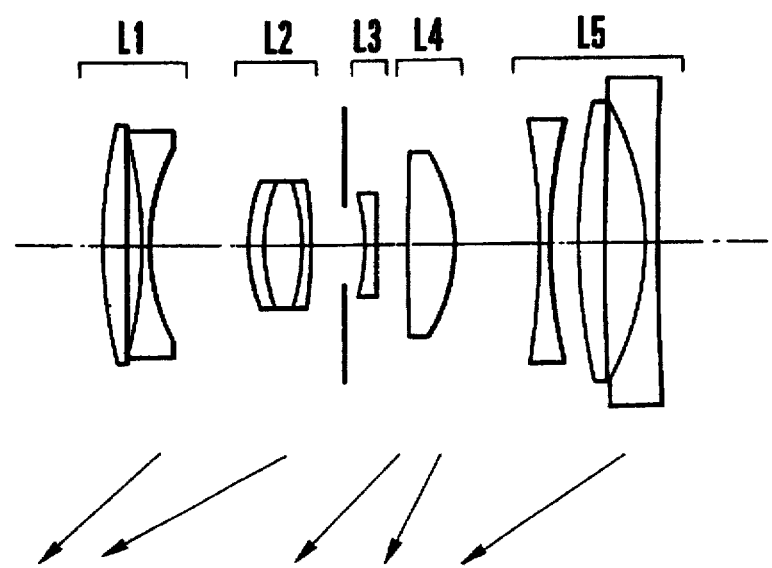
FIG. 80 is a block diagram of a numerical example 39 of the invention in the wide angle end.
Figure 81:
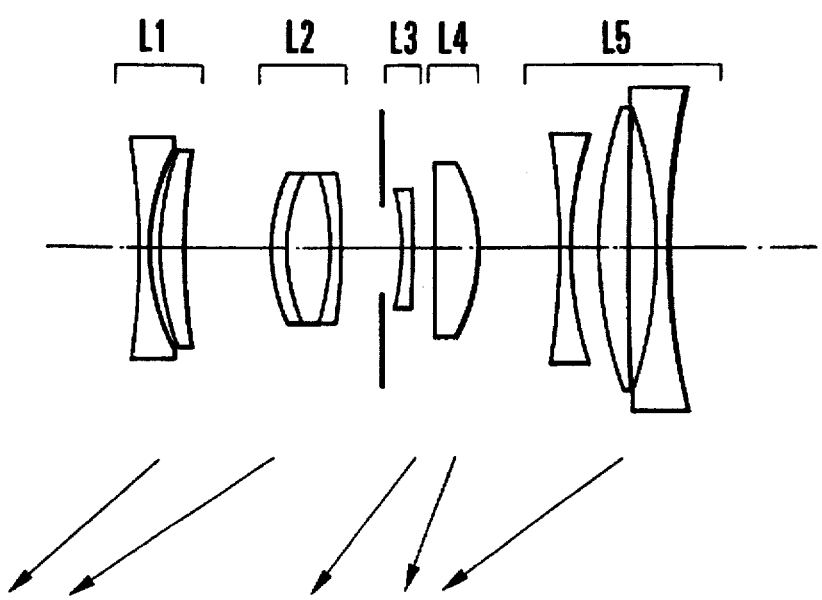
FIG. 81 is a block diagram of a numerical example 40 of the invention in the wide angle end.
Figure 82A:
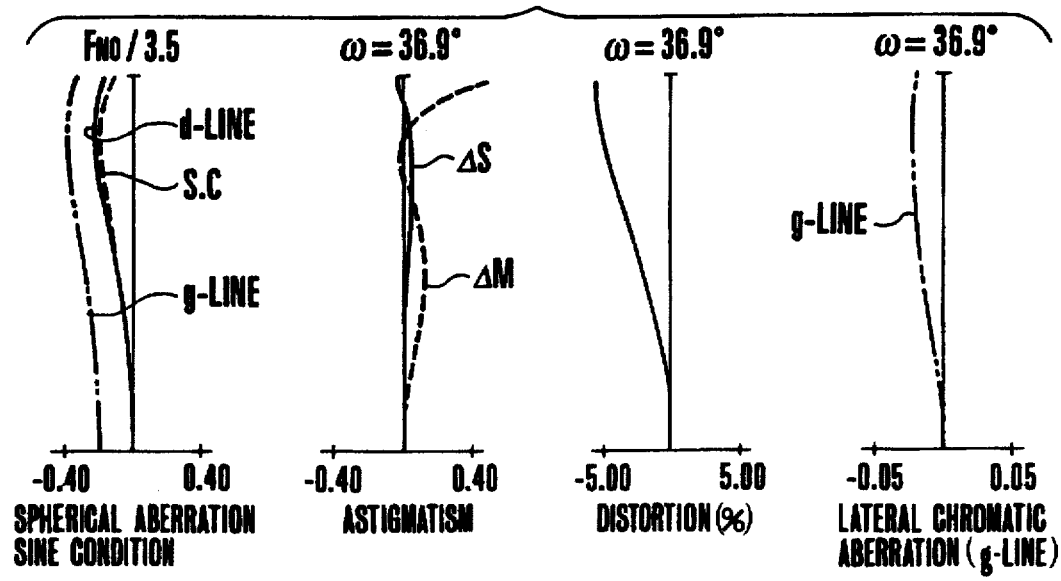
FIGS. 82(A), 82(B) and 82(C) are graphs of the various aberrations of the numerical example 33.
Figure 82B:
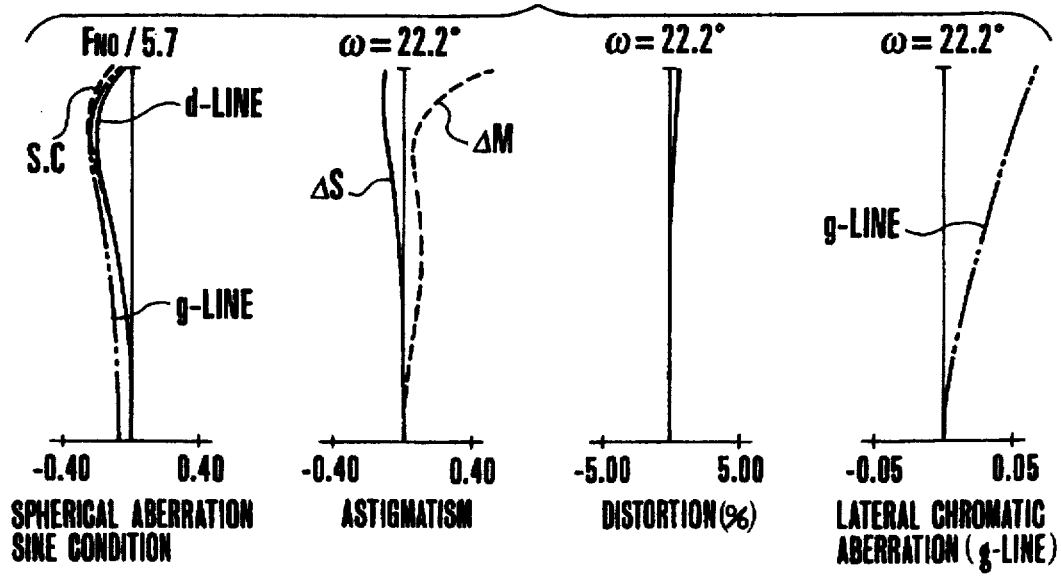
Figure 82C:
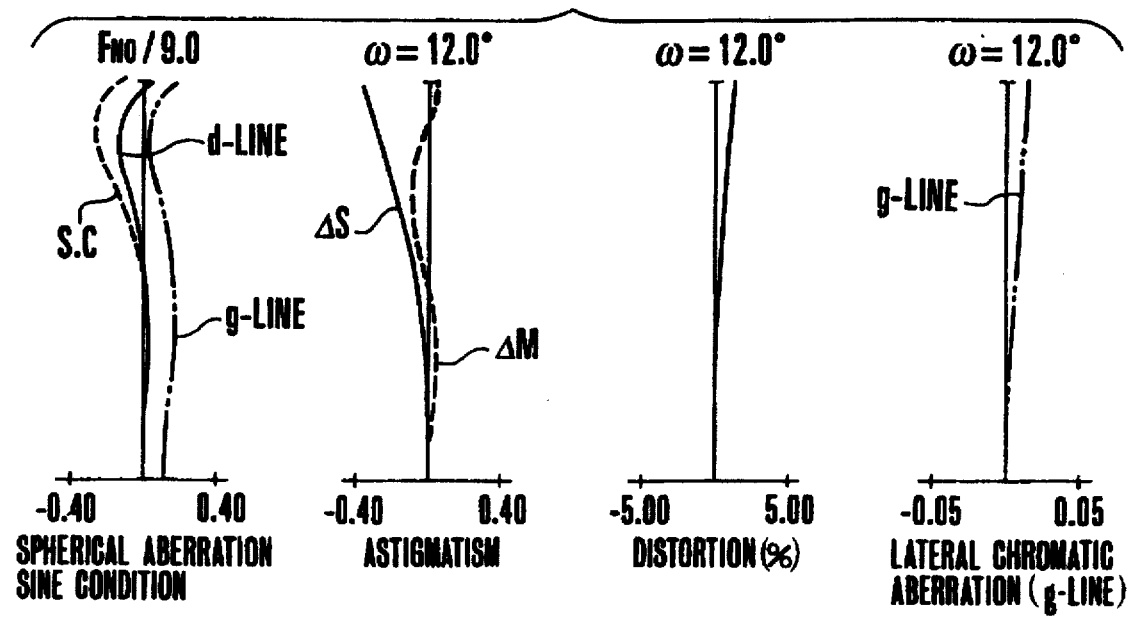
Figure 83A:
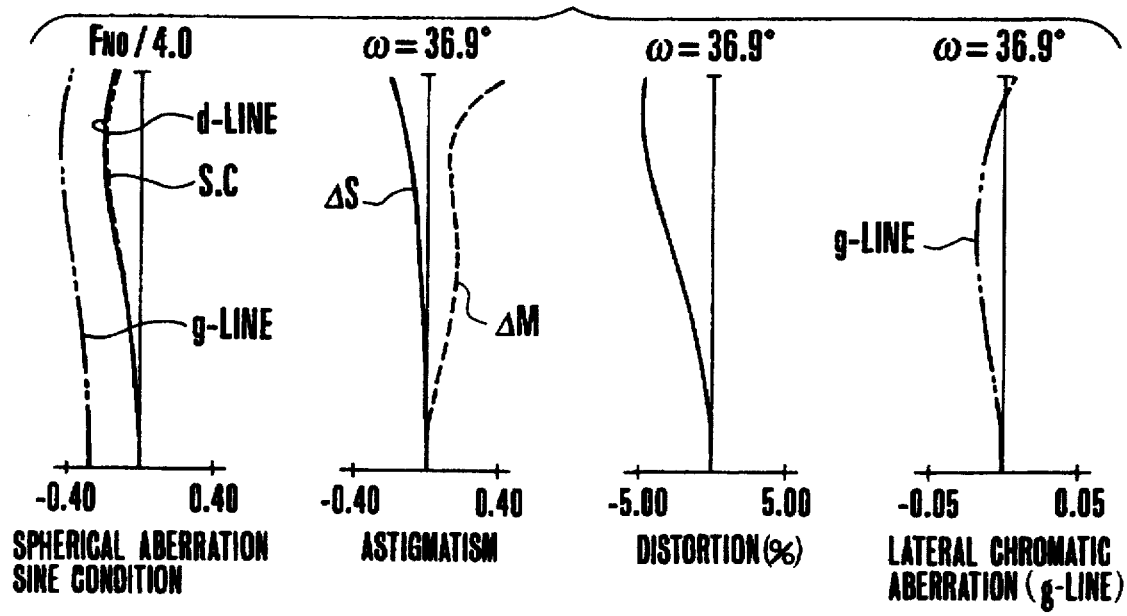
FIGS. 83(A), 83(B) and 83(C) are graphs of the various aberrations of the numerical example 34.
Figure 83B:
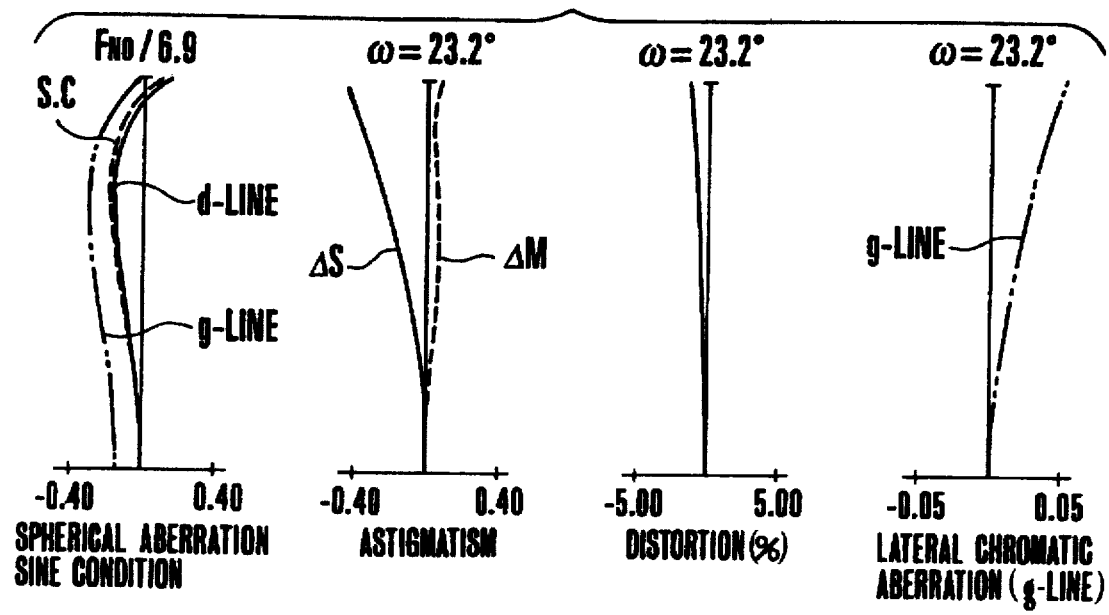
Figure 83C:
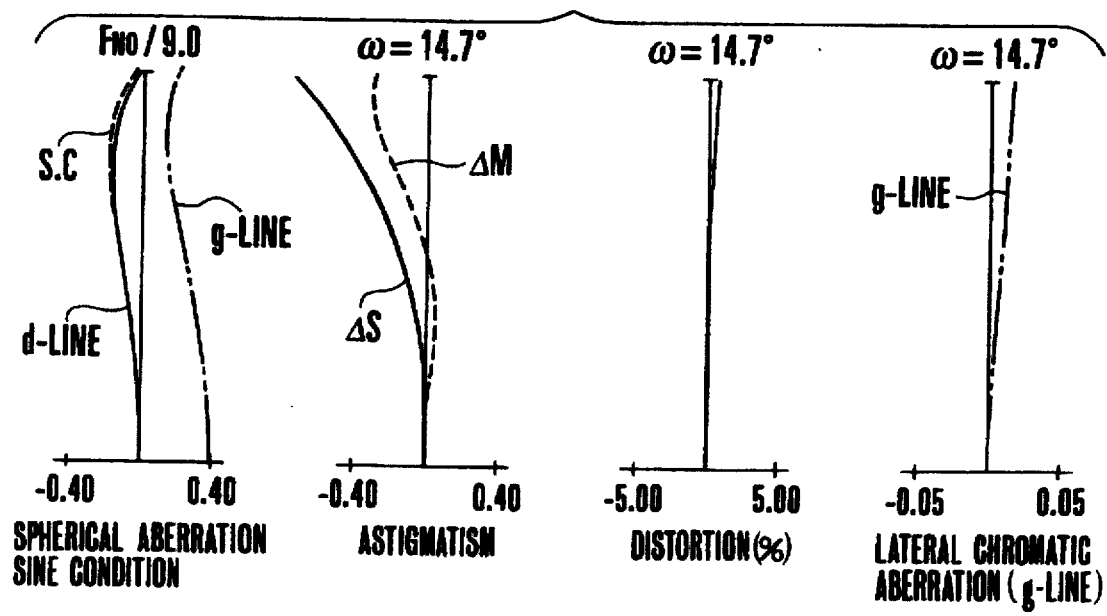
Figure 84A:
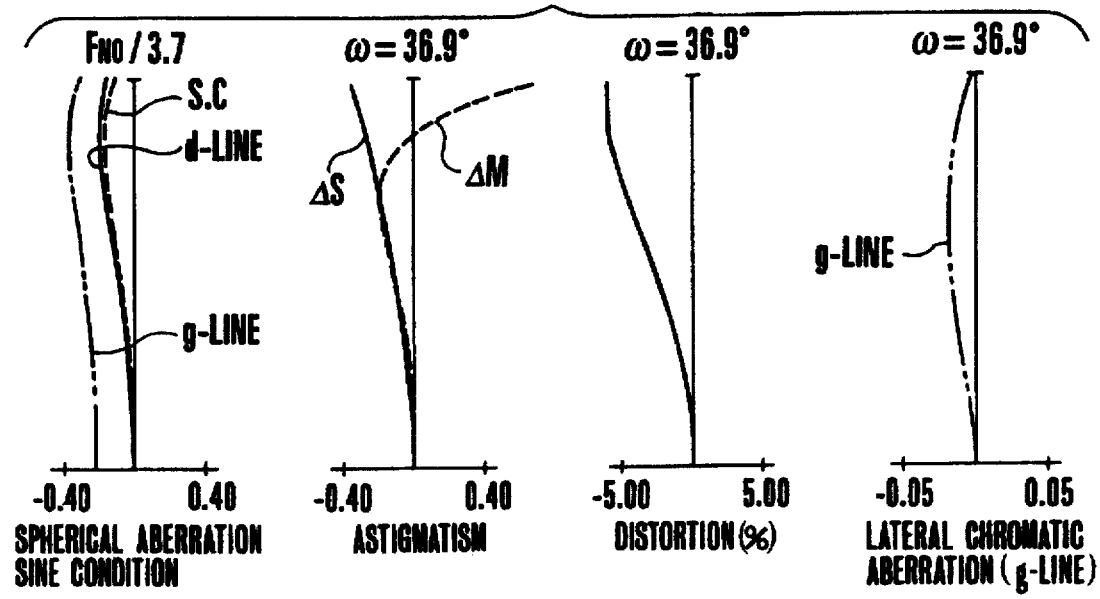
FIGS. 84(A), 84(B) and 84(C) are graphs of the various aberrations of the numerical example 35.
Figure 84B:
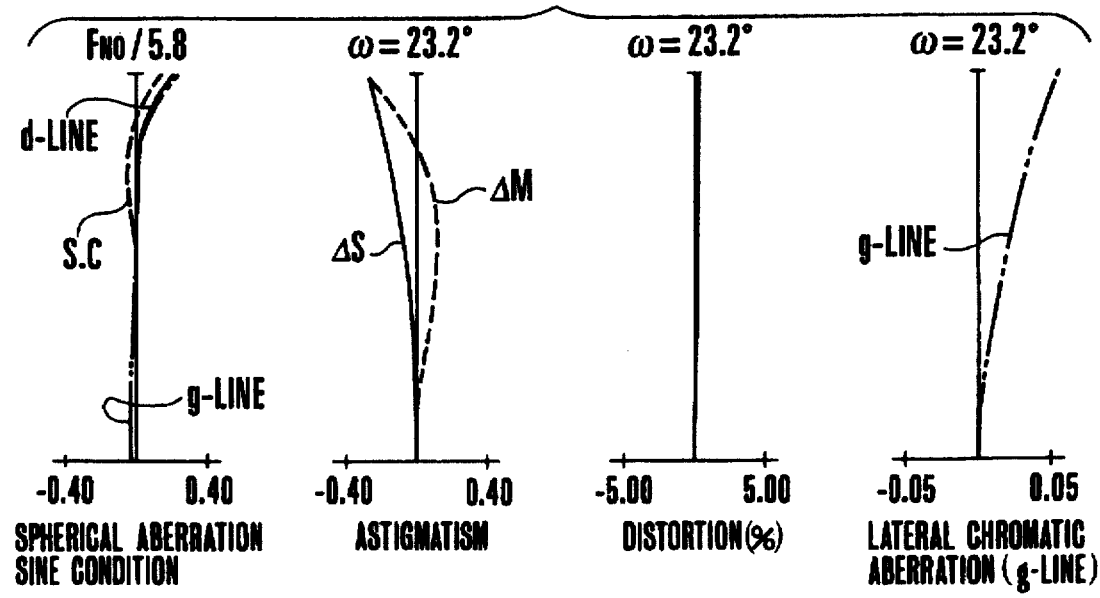
Figure 84C:
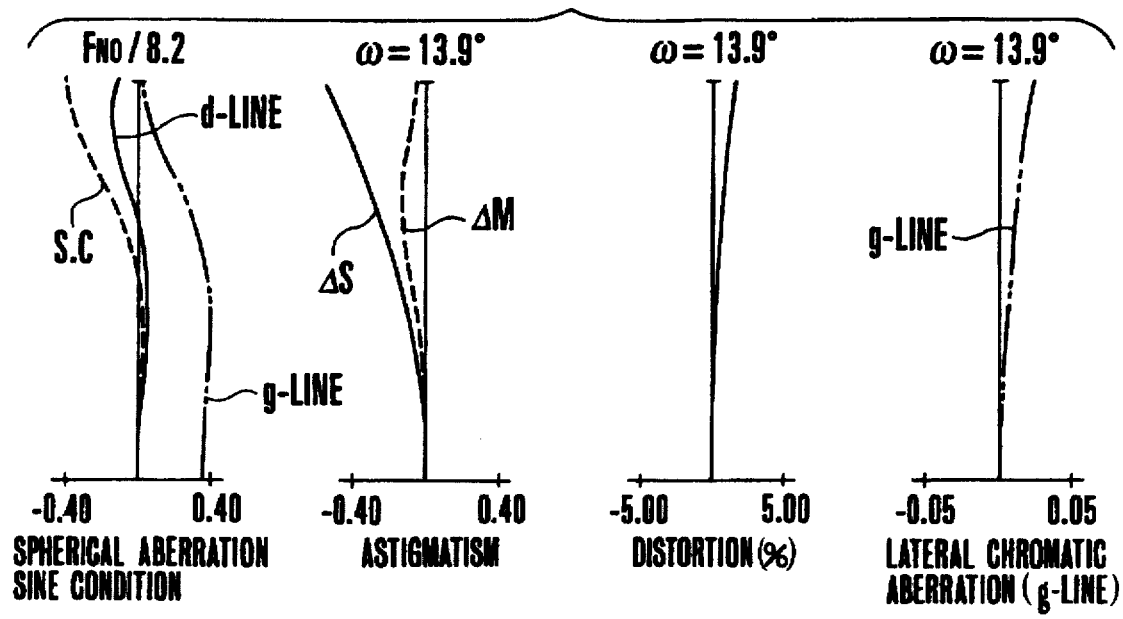
Figure 85A:
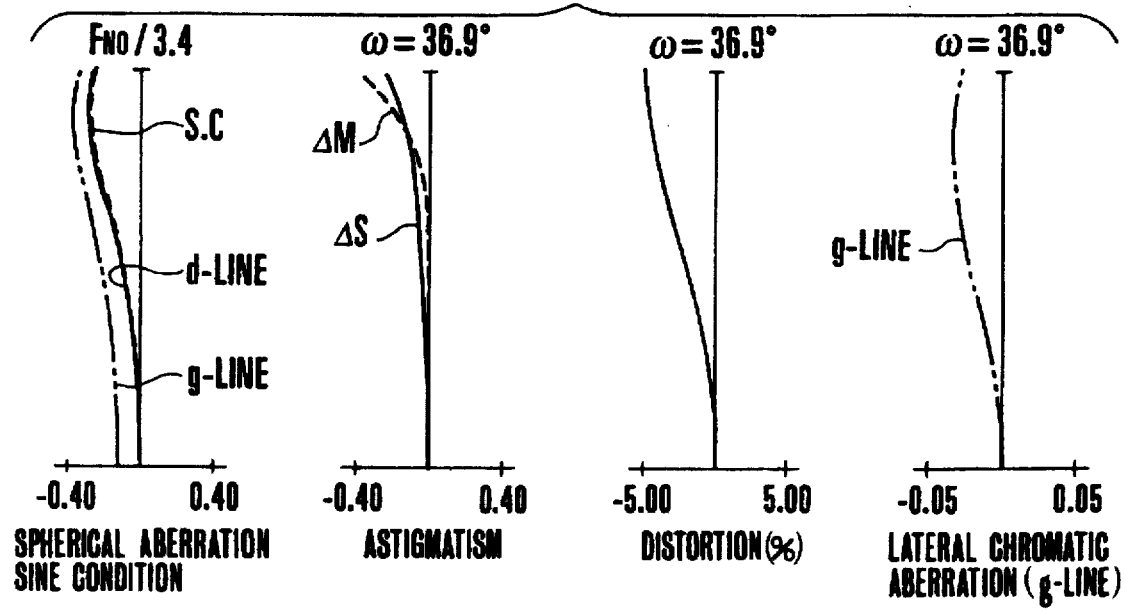
FIGS. 85(A), 85(B) and 85(C) are graphs of the various aberrations of the numerical example 36.
Figure 85B:
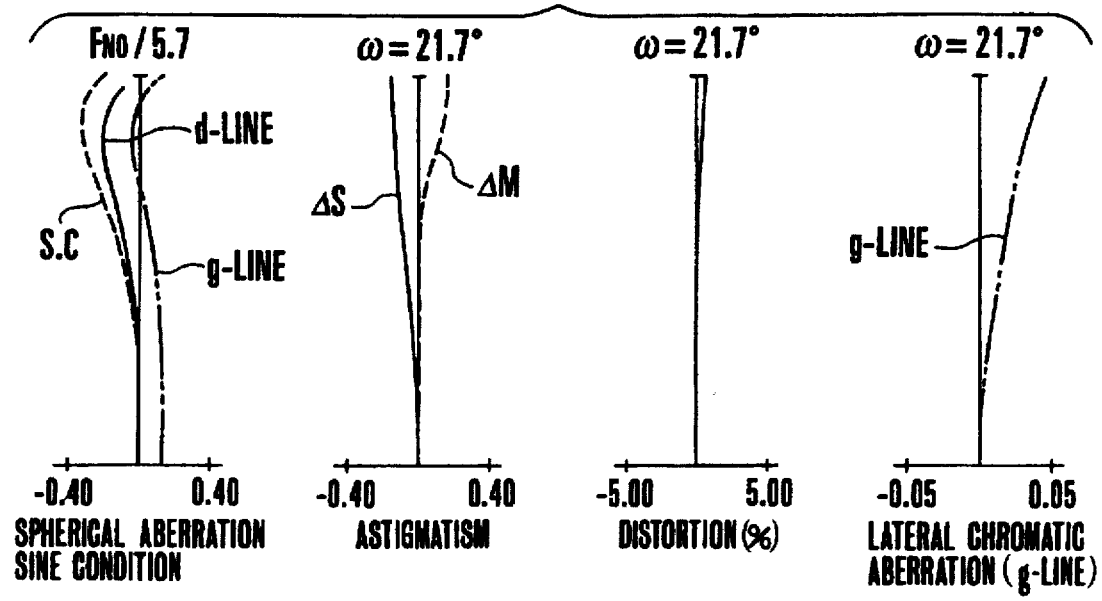
Figure 85C:
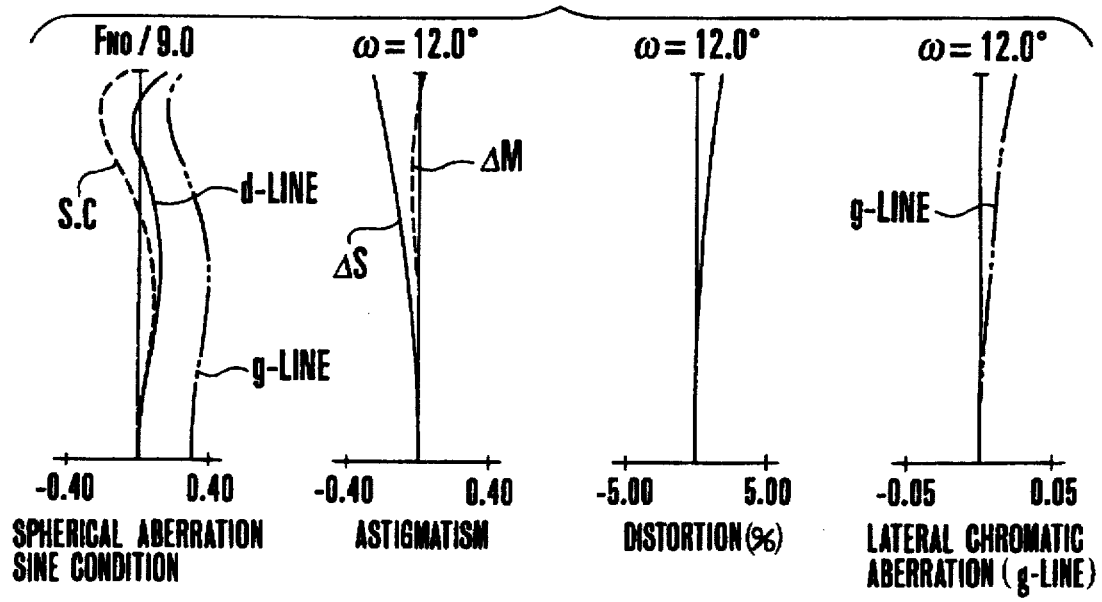
Figure 86A:
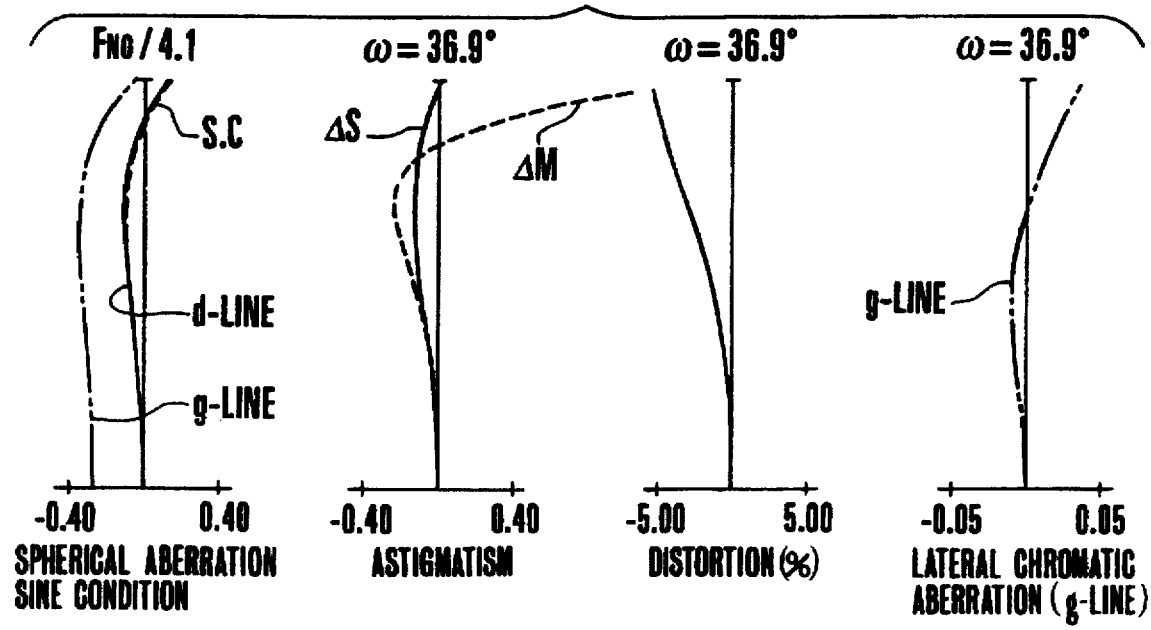
FIGS. 86(A), 86(B) and 86(C) are graphs of the various aberrations of the numerical example 37.
Figure 86B:
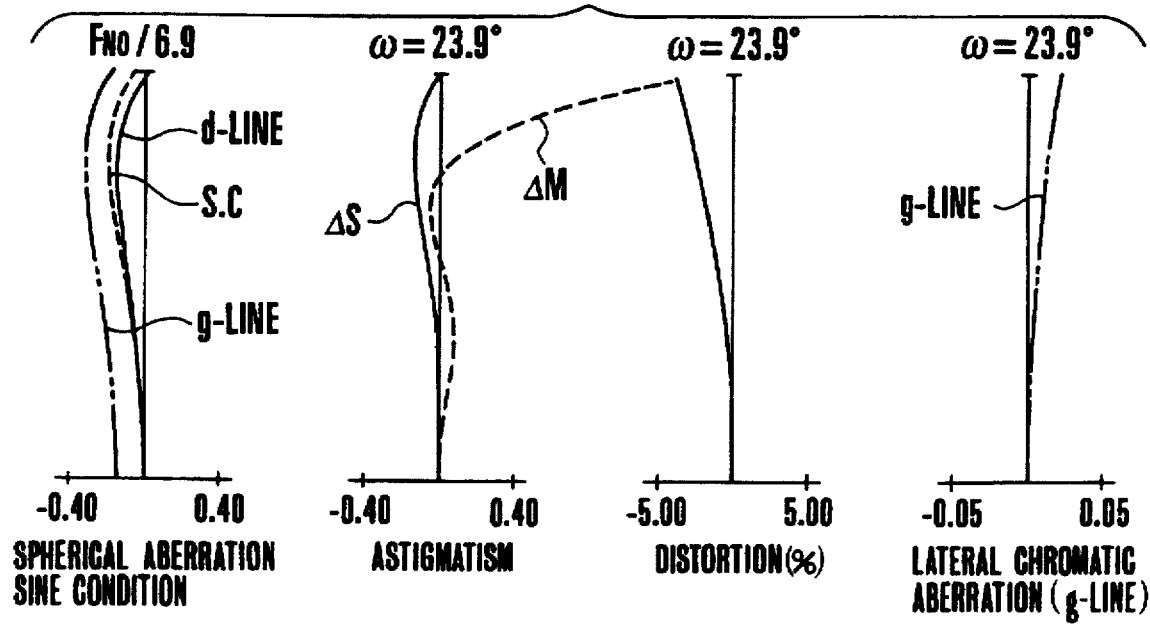
Figure 86C:
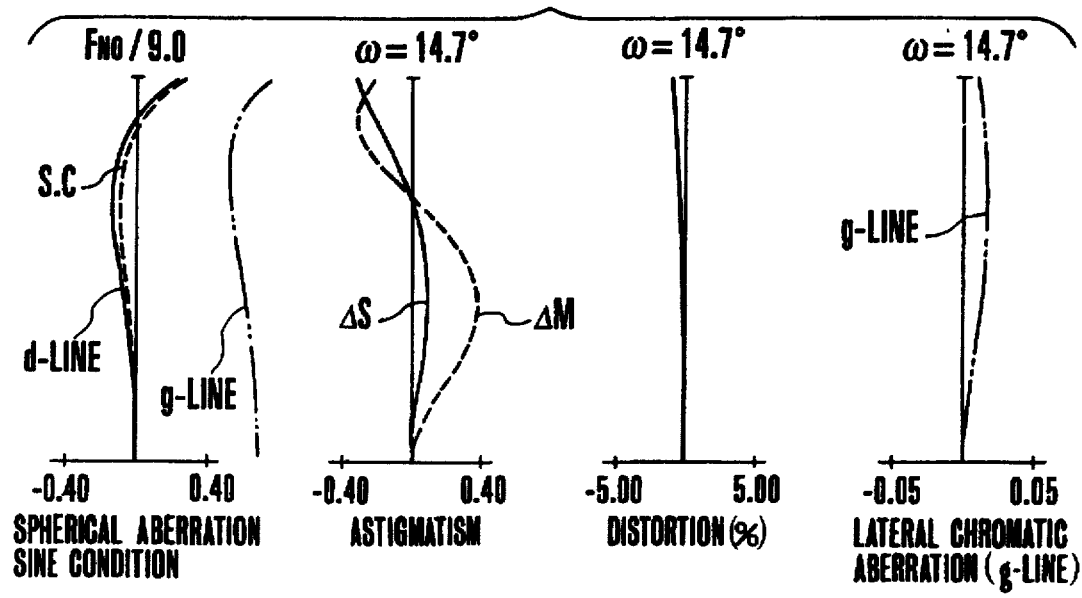
Figure 87A:
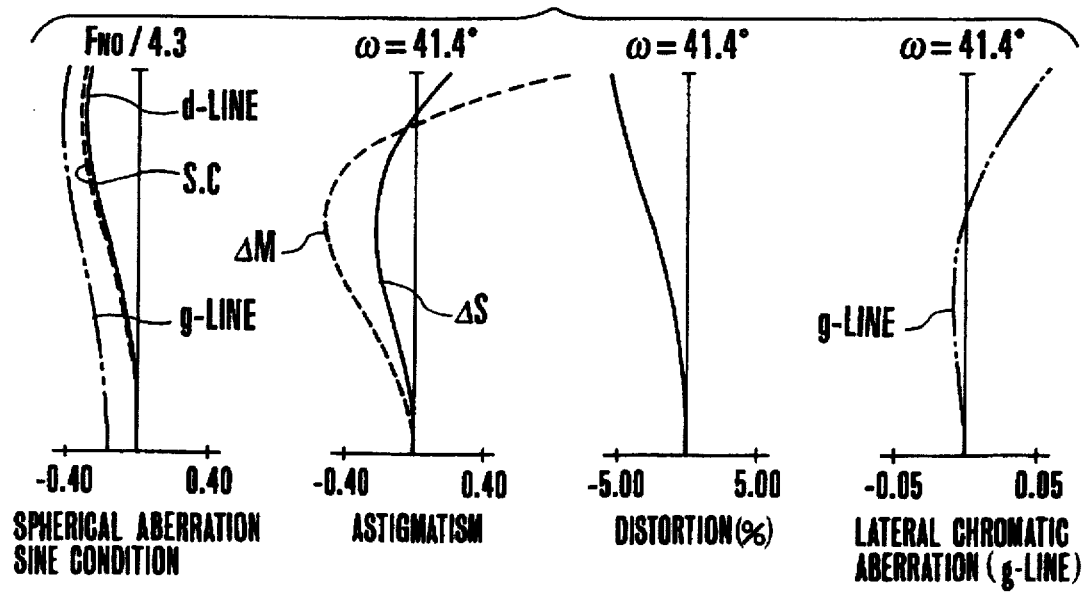
FIGS. 87(A), 87(B) and 87(C) are graphs of the various aberrations of the numerical example 38.
Figure 87B:
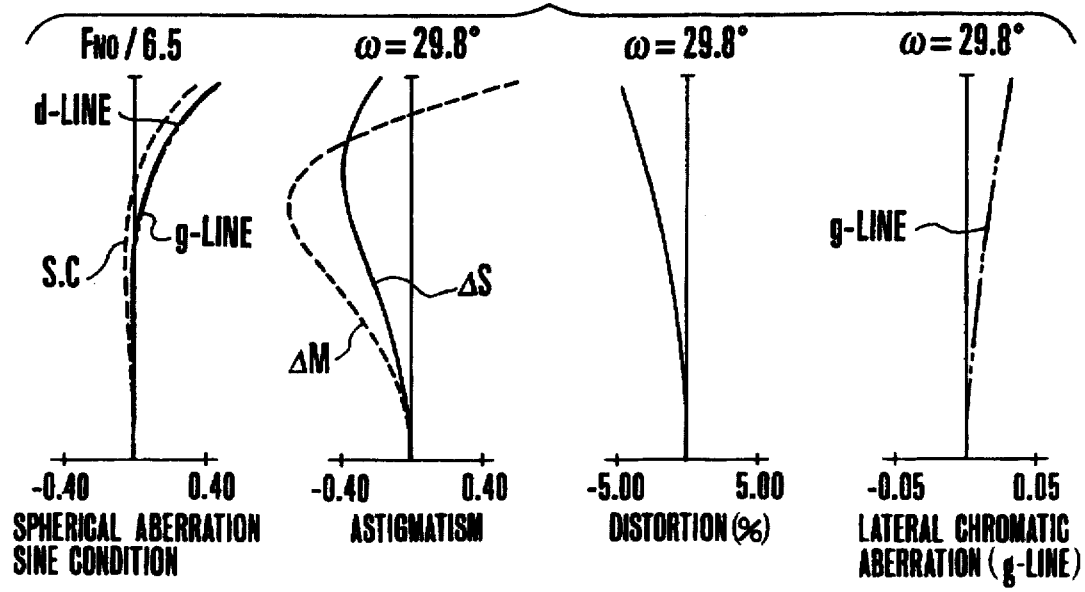
Figure 87C:
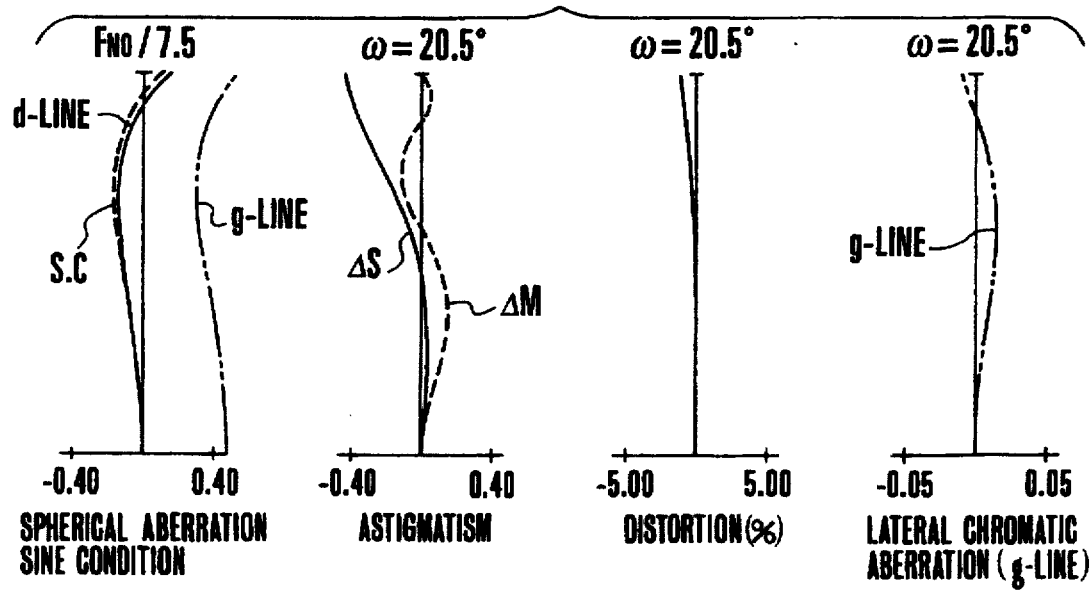
Figure 88A:
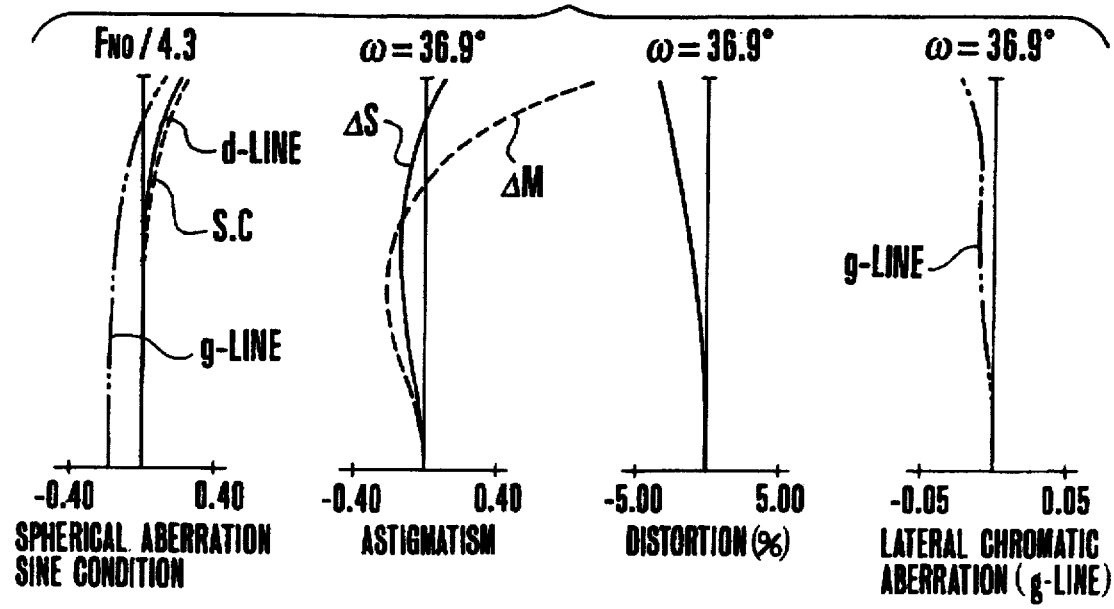
FIGS. 88(A), 88(B) and 88(C) are graphs of the various aberrations of the numerical example 39.
Figure 88B:
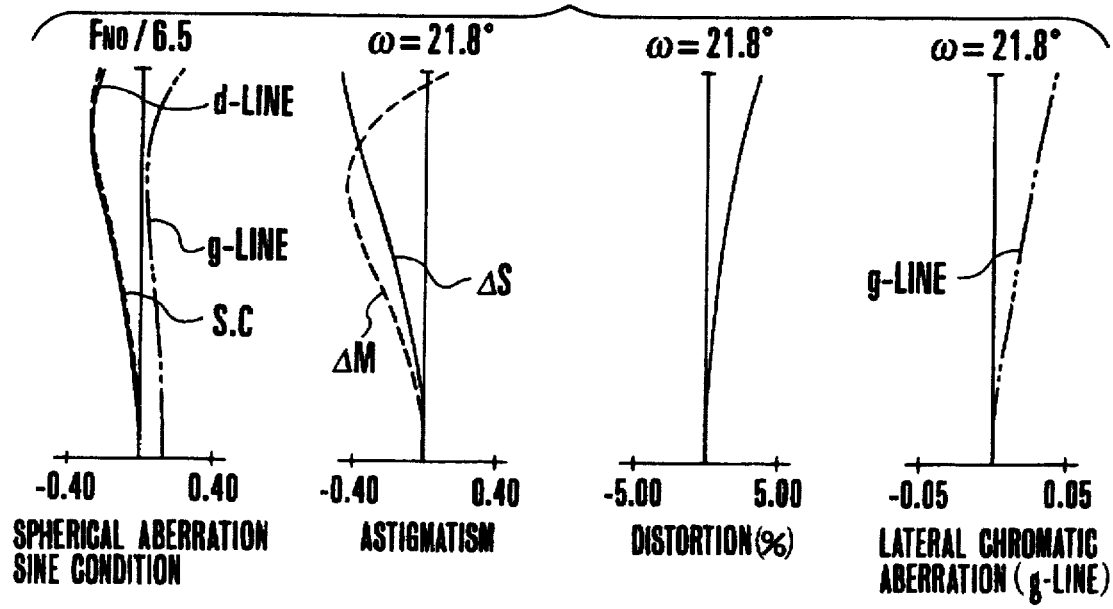
Figure 88C:
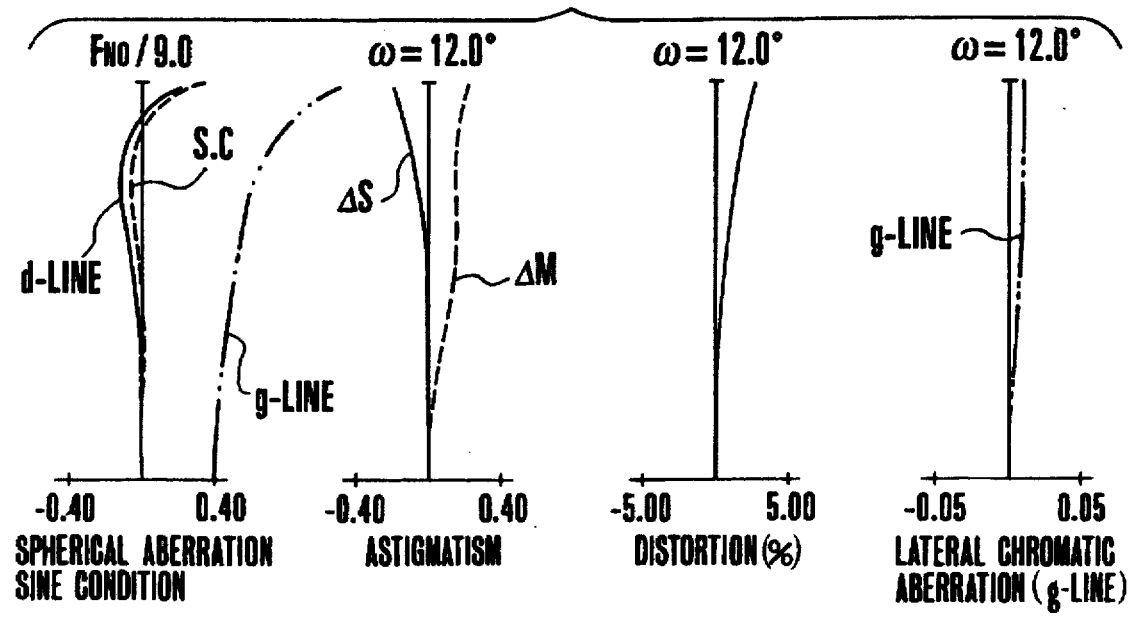
Figure 89A:
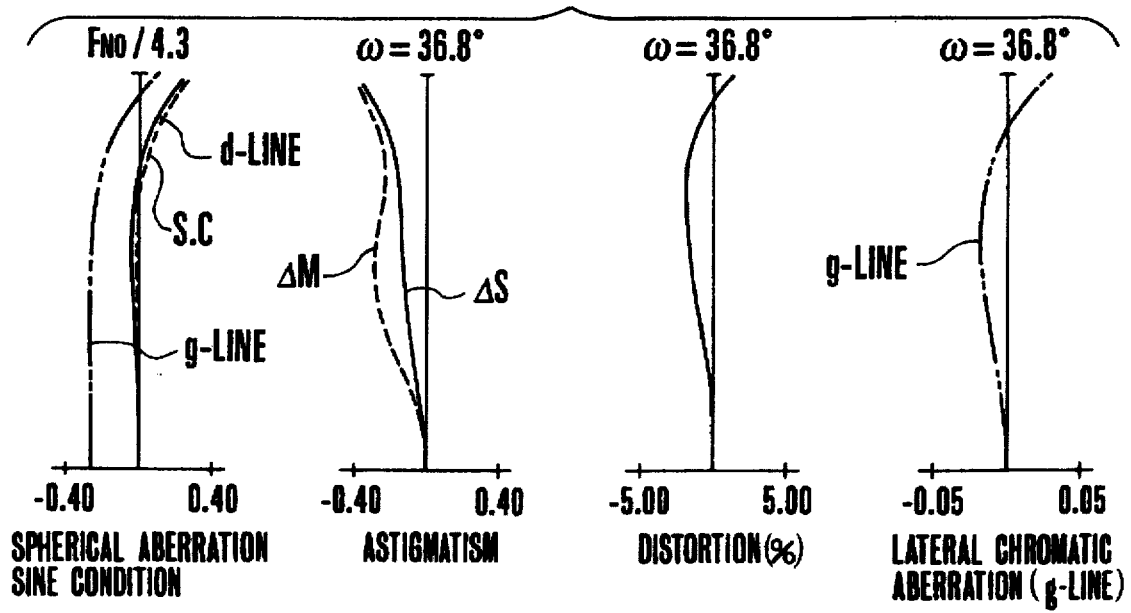
FIGS. 89(A), 89(B) and 89(C) are graphs of the various aberrations of the numerical example 40.
Figure 89B:
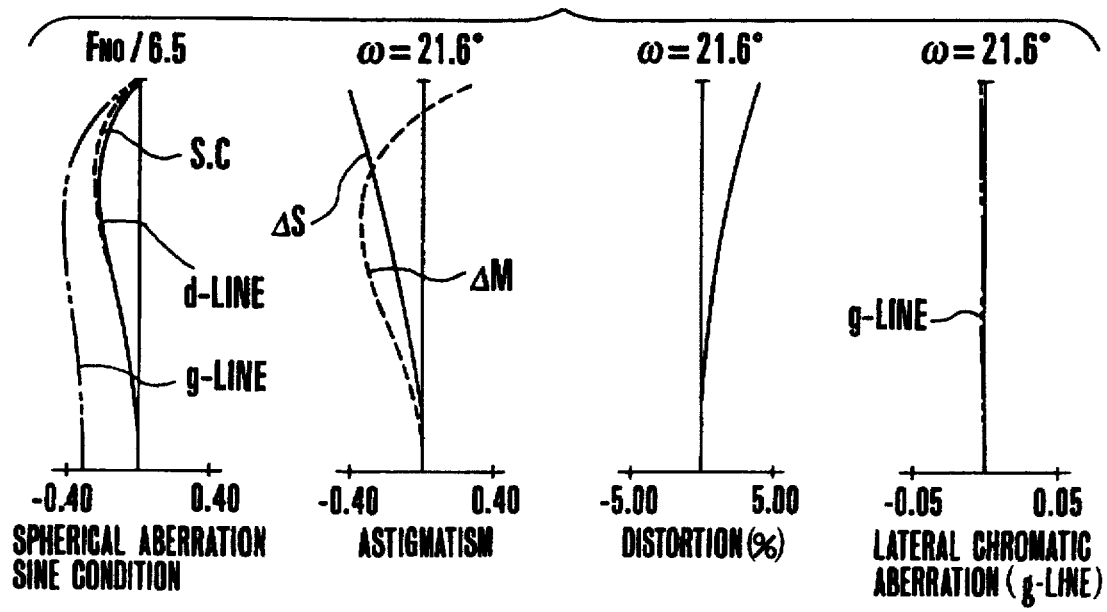
Figure 89C:
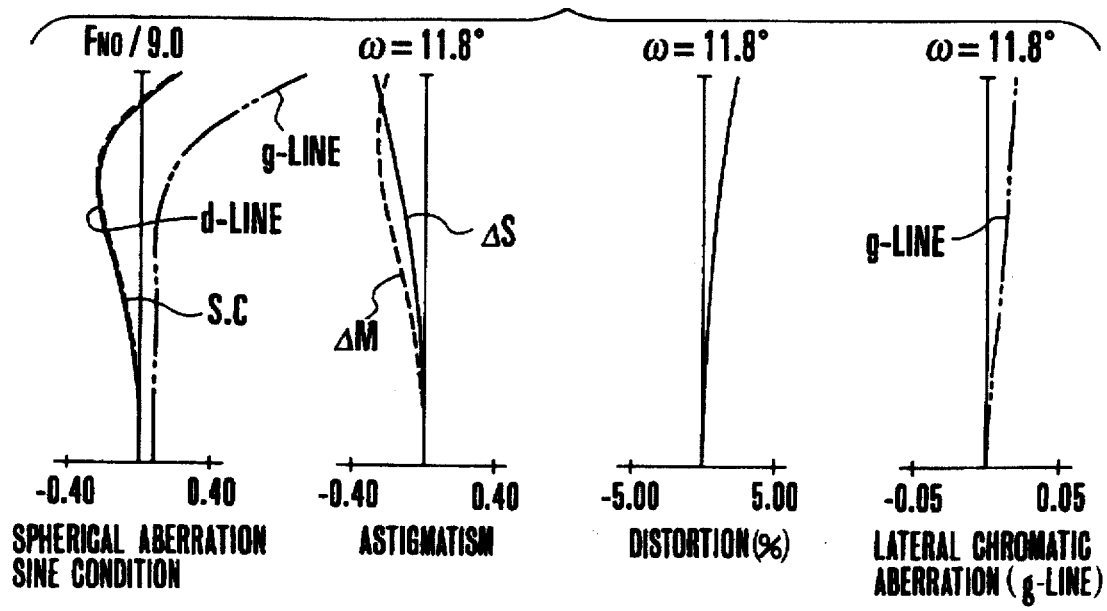
Figure 90:
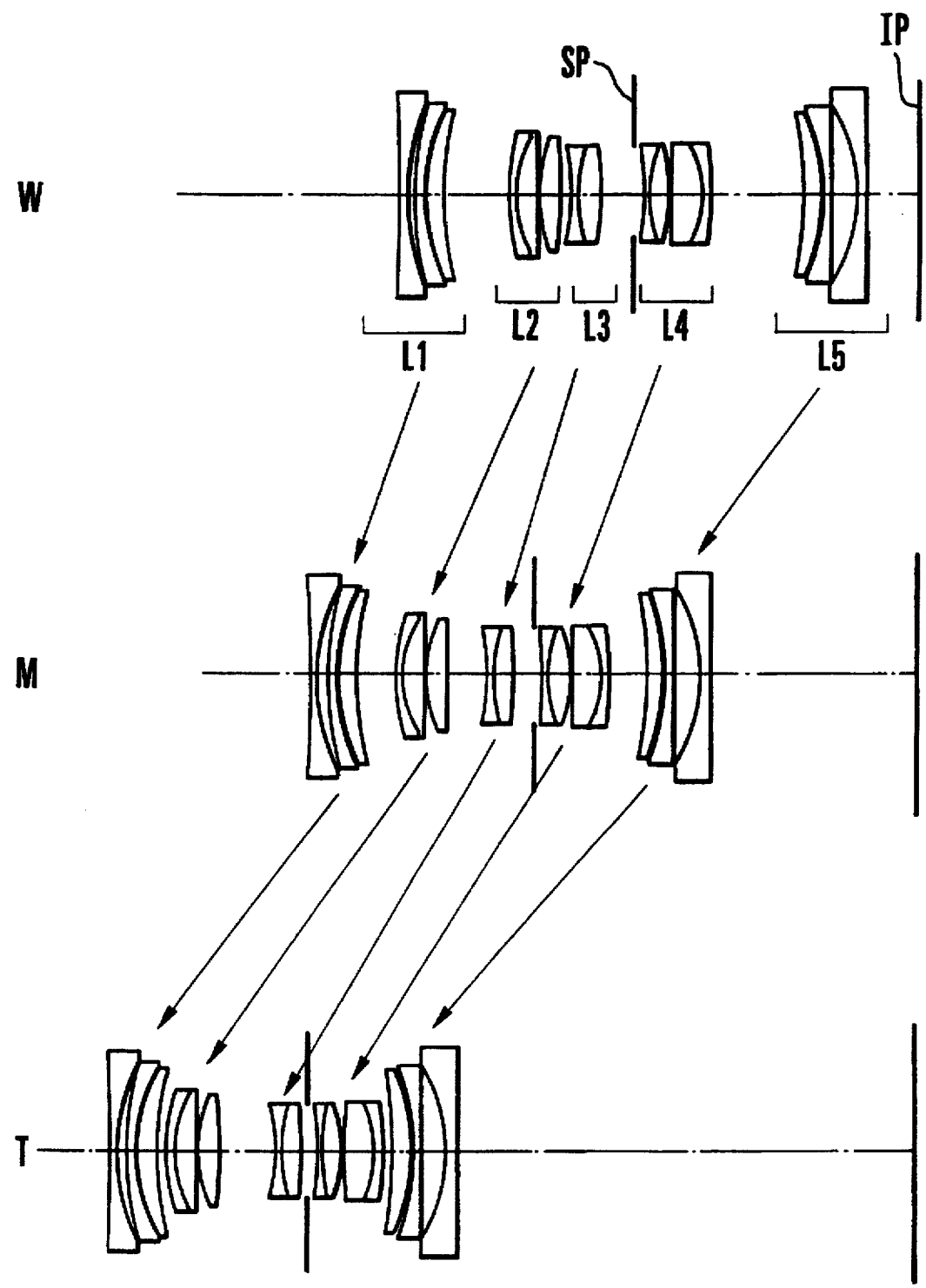
FIG. 90 is lens block diagrams of a numerical example 41 of the invention.
Figure 91:
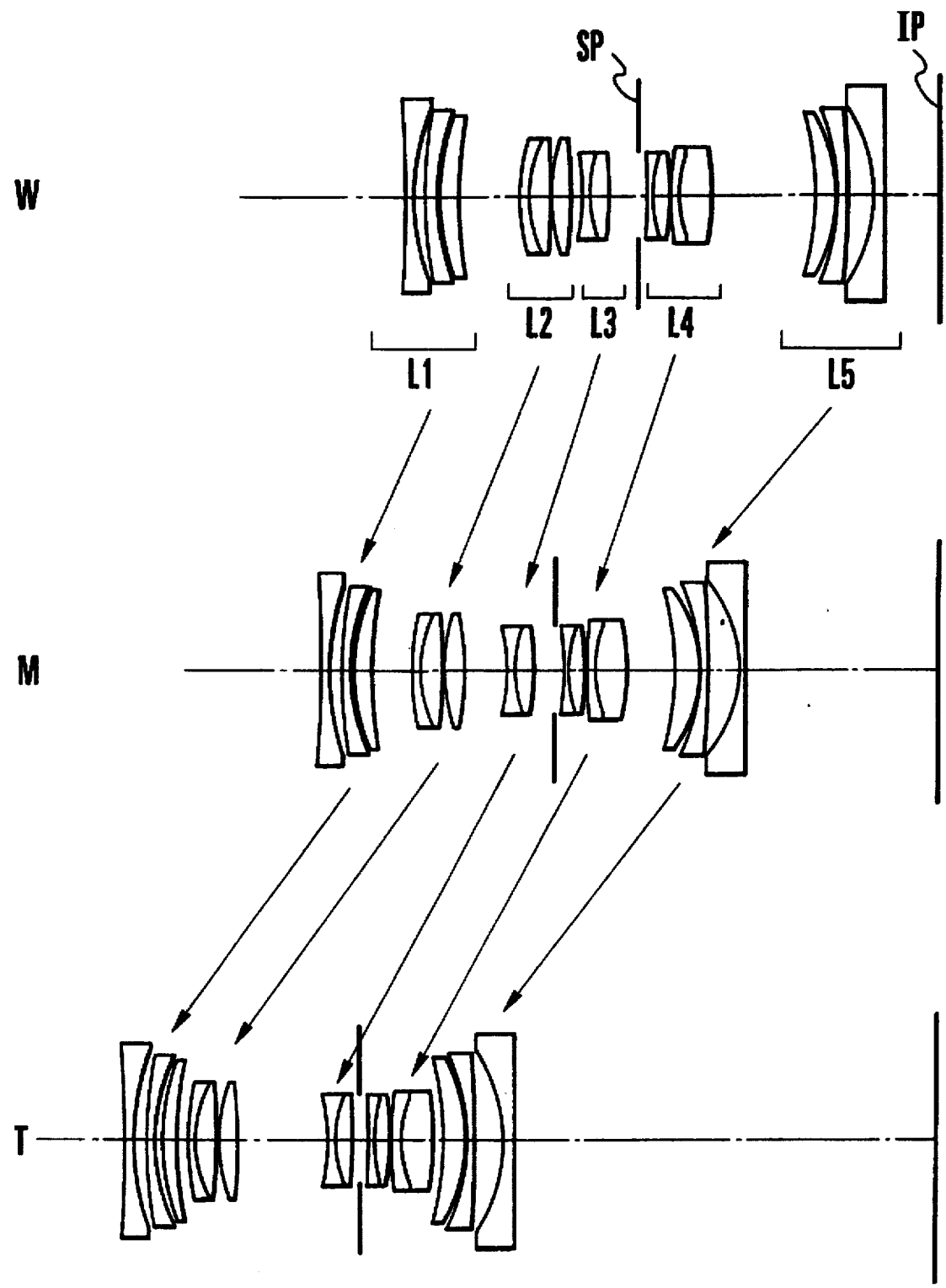
FIG. 91 are lens block diagrams of a numerical example 42 of the invention.
Figure 92:
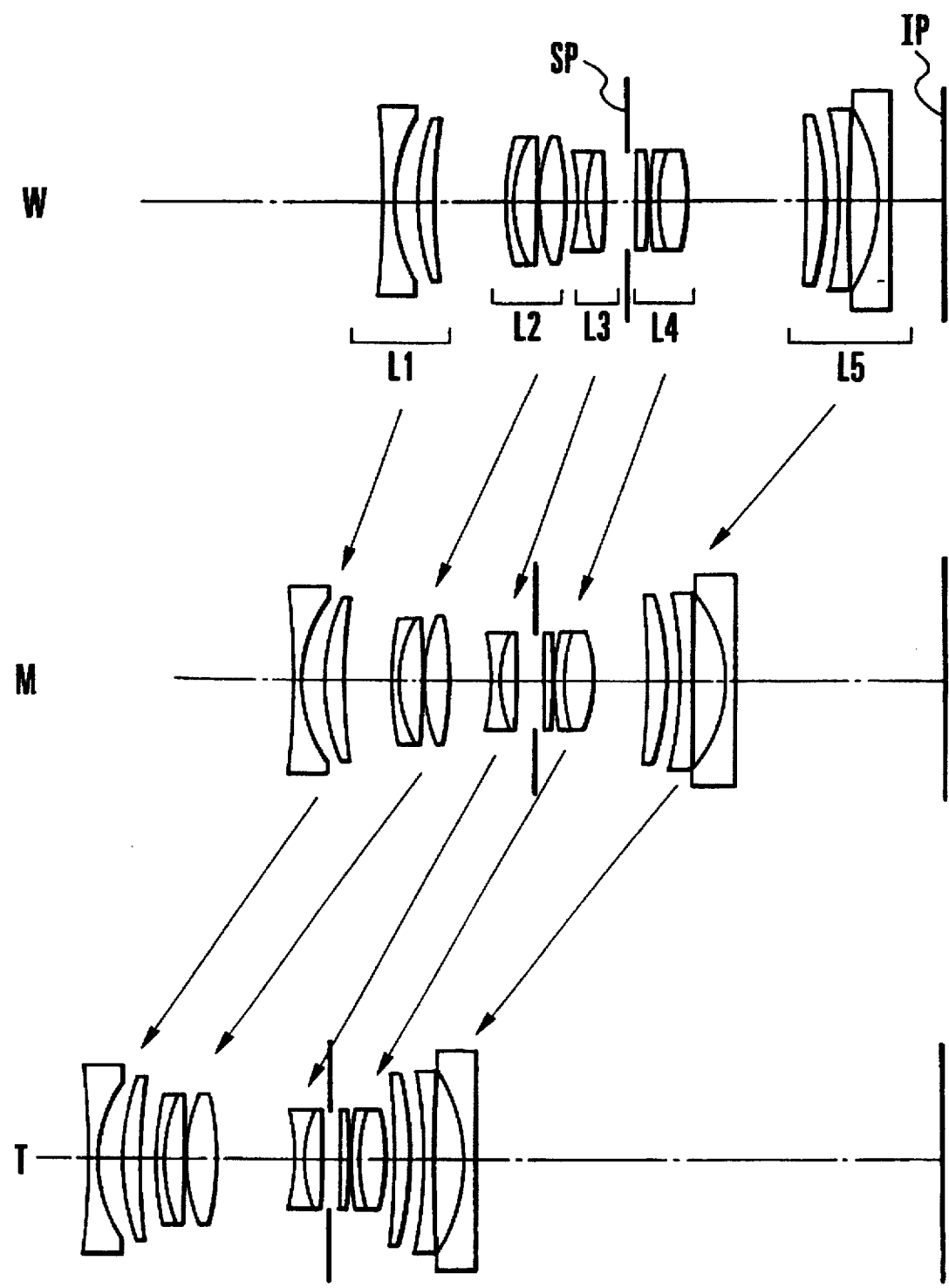
FIG. 92, are lens block diagrams of a numerical example 43 of the invention.
Figure 93:
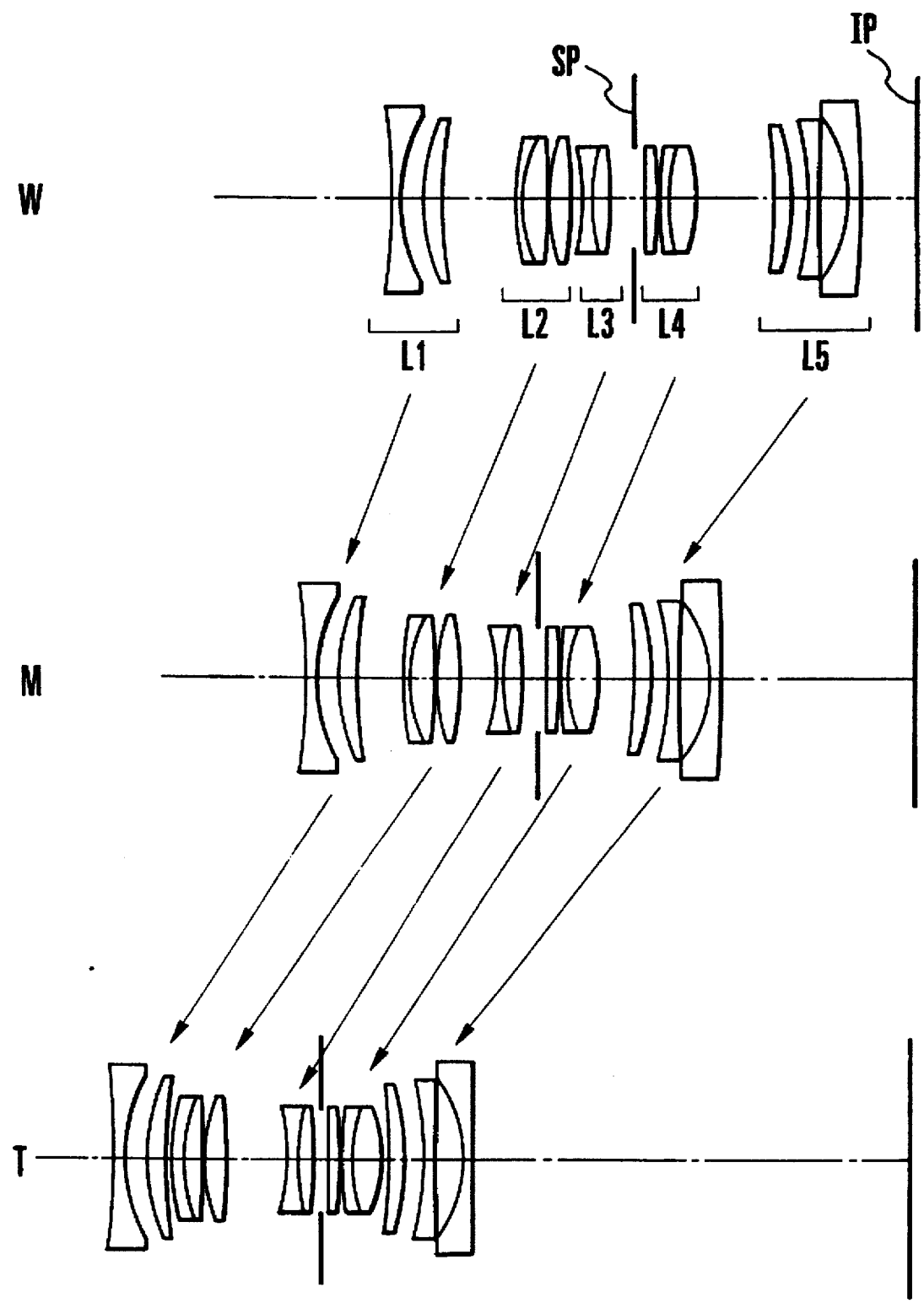
FIG. 93 are lens block diagrams of a numerical example 44 of the invention.
Figure 94:
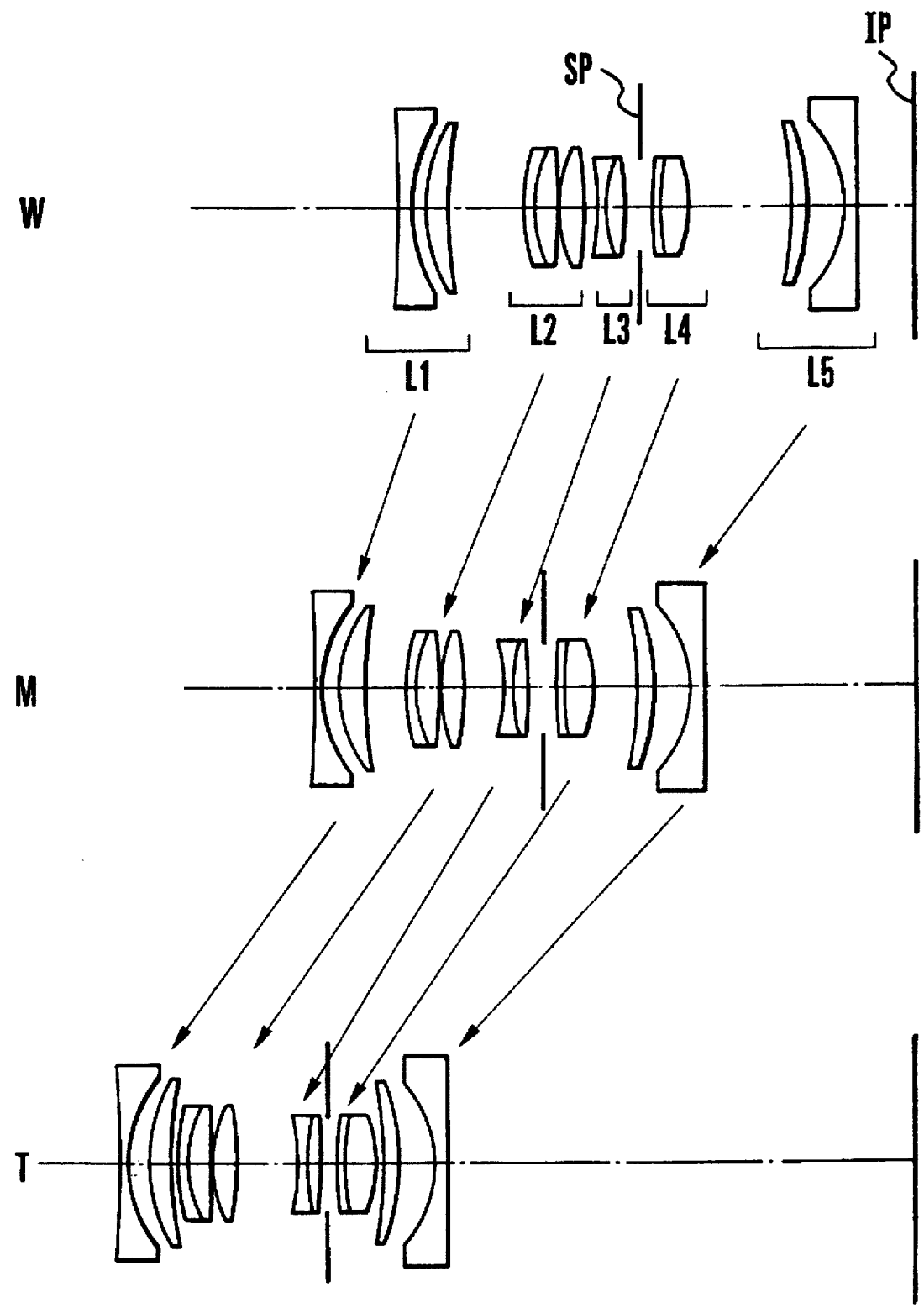
FIG. 94 are lens block diagrams of a numerical example 45 of the invention.
Figure 95:
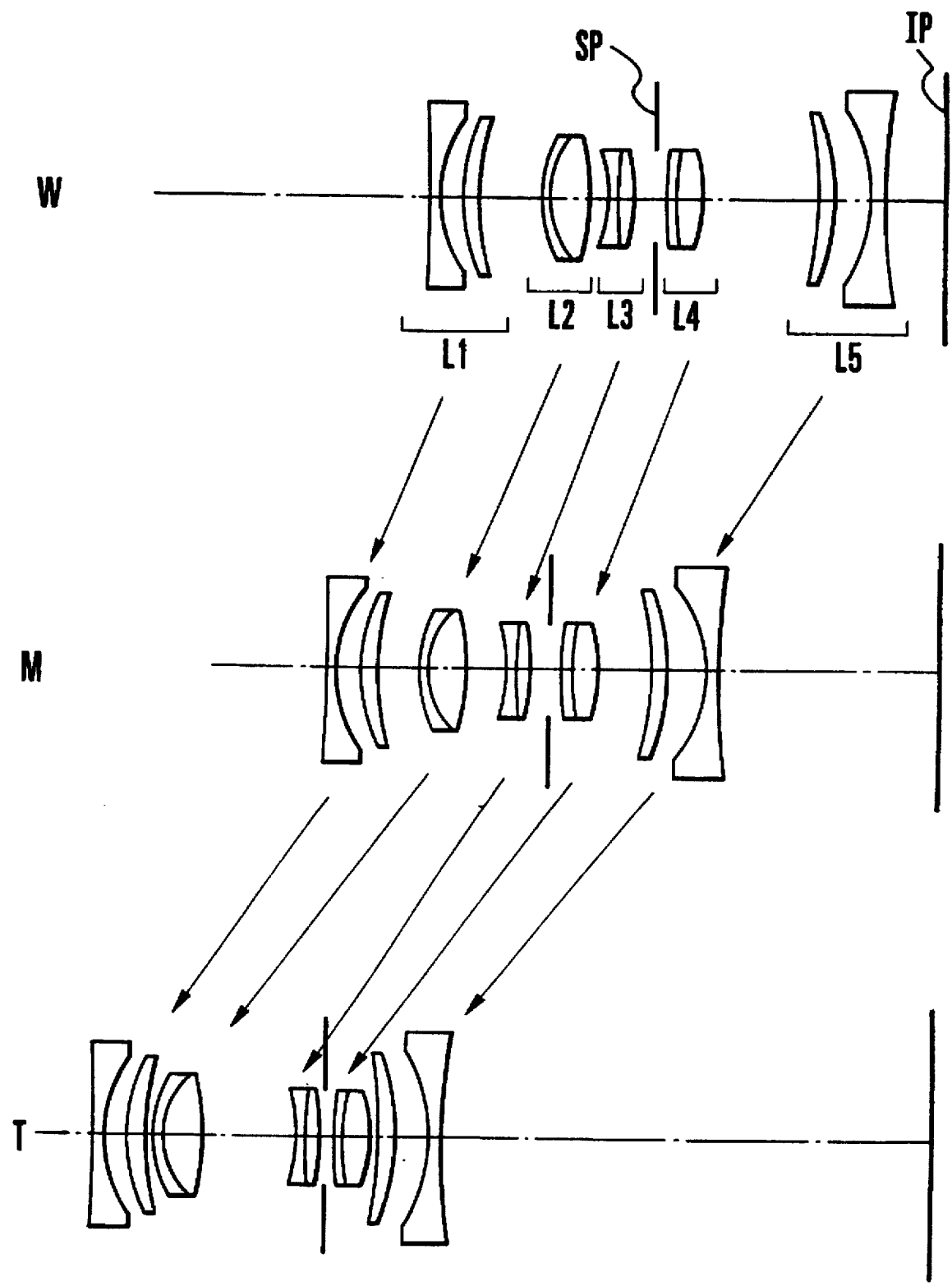
FIG. 95 are lens block diagrams of a numerical example 46 of the invention.
Figure 96:
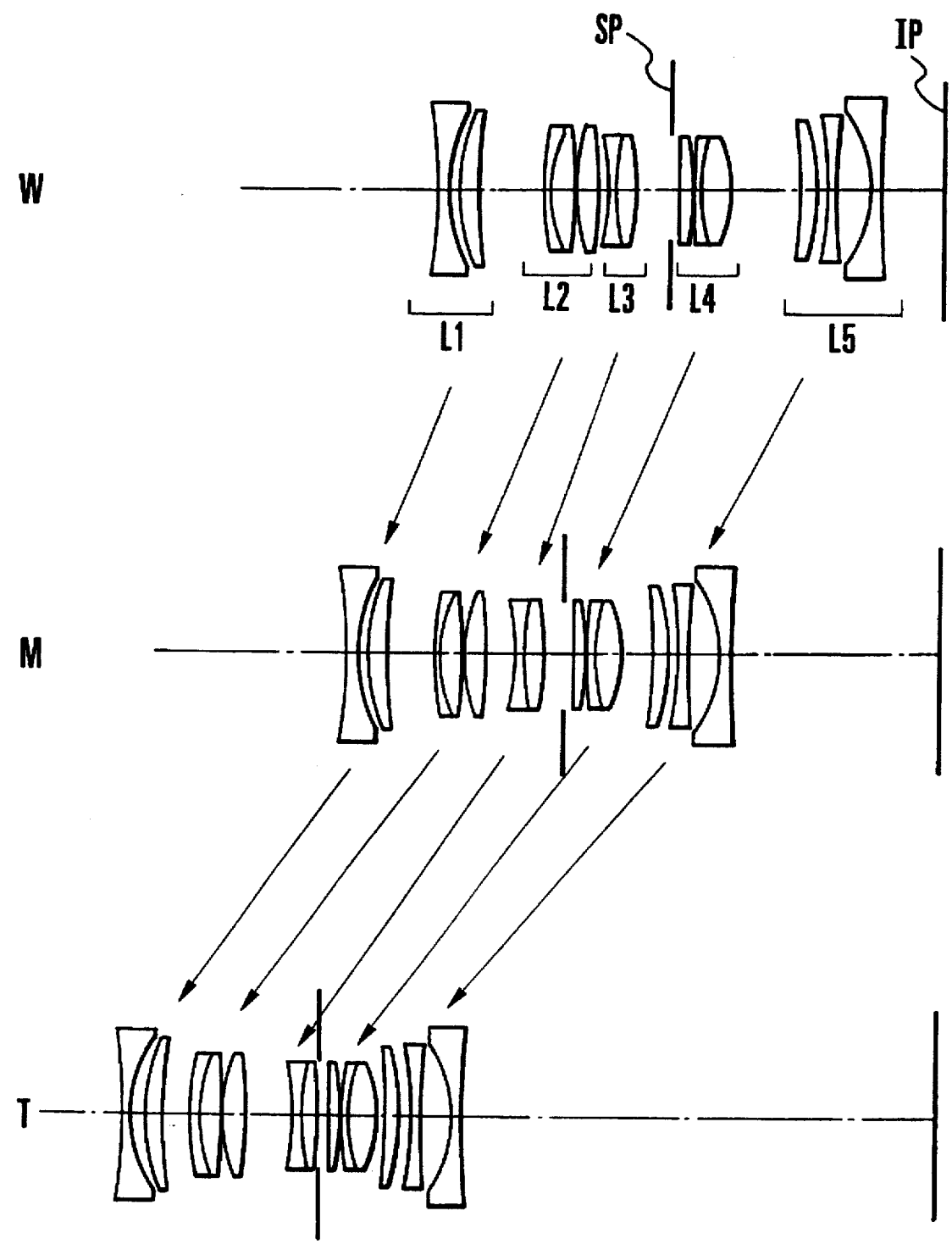
FIG. 96 are lens block diagrams of a numerical example 47 of the invention.
Figure 97:
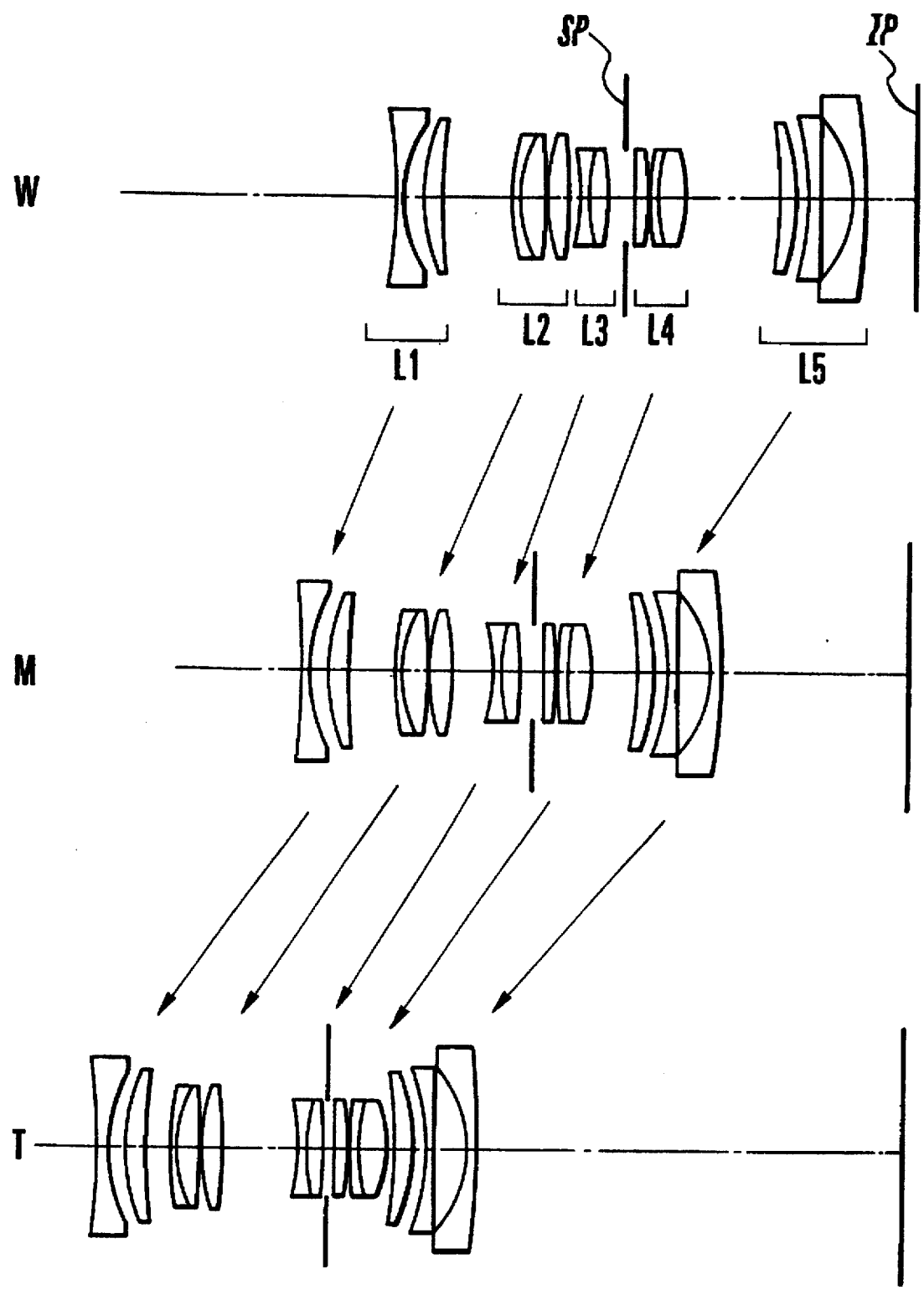
FIG. 97 are lens block diagrams of a numerical example 48 of the invention.
Figure 98:
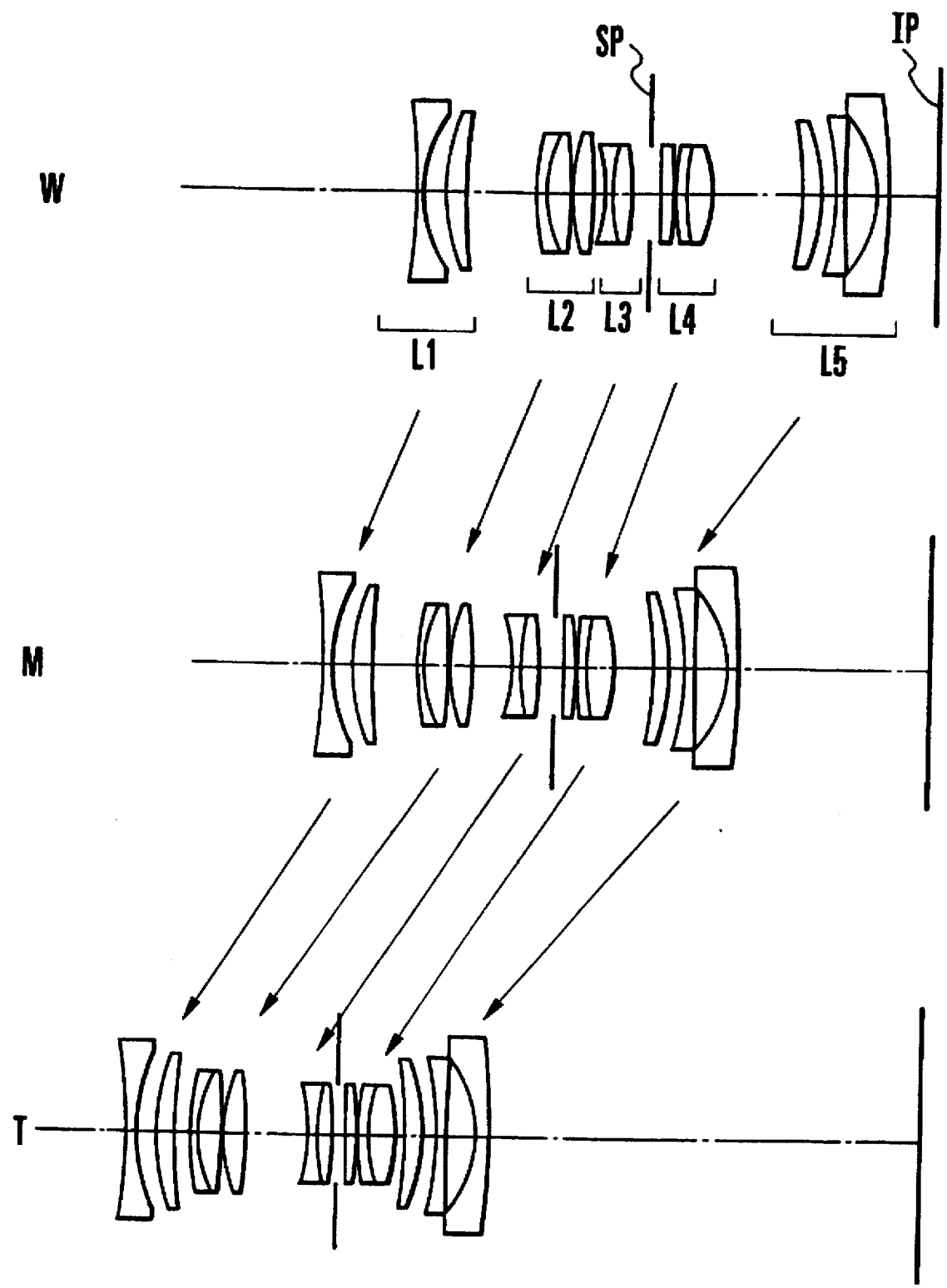
FIG. 98 are lens block diagrams of a numerical example 49 of the invention.
Figure 99:
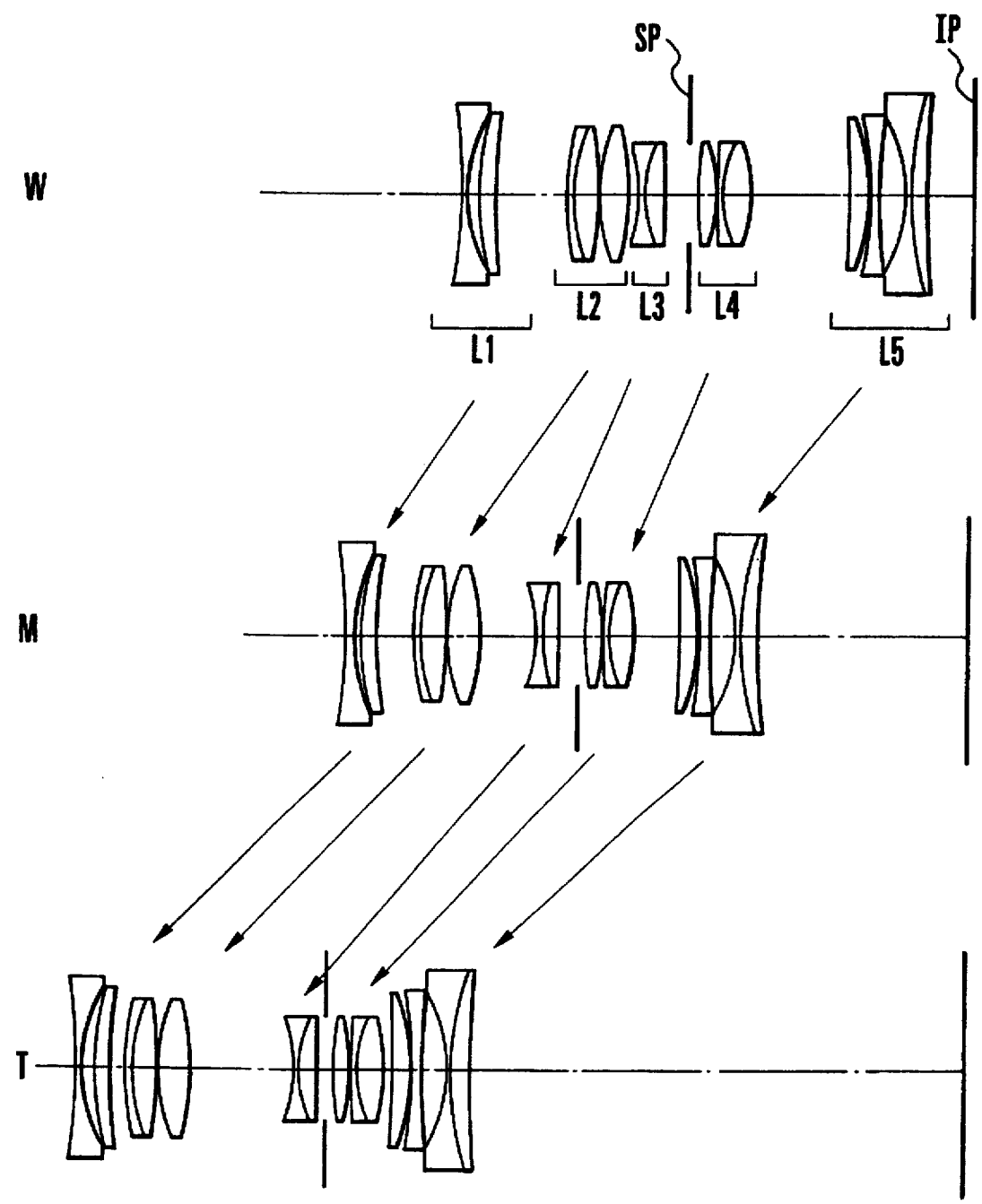
FIG. 99 are lens block diagrams of a numerical example 50 of the invention.
Figure 100:
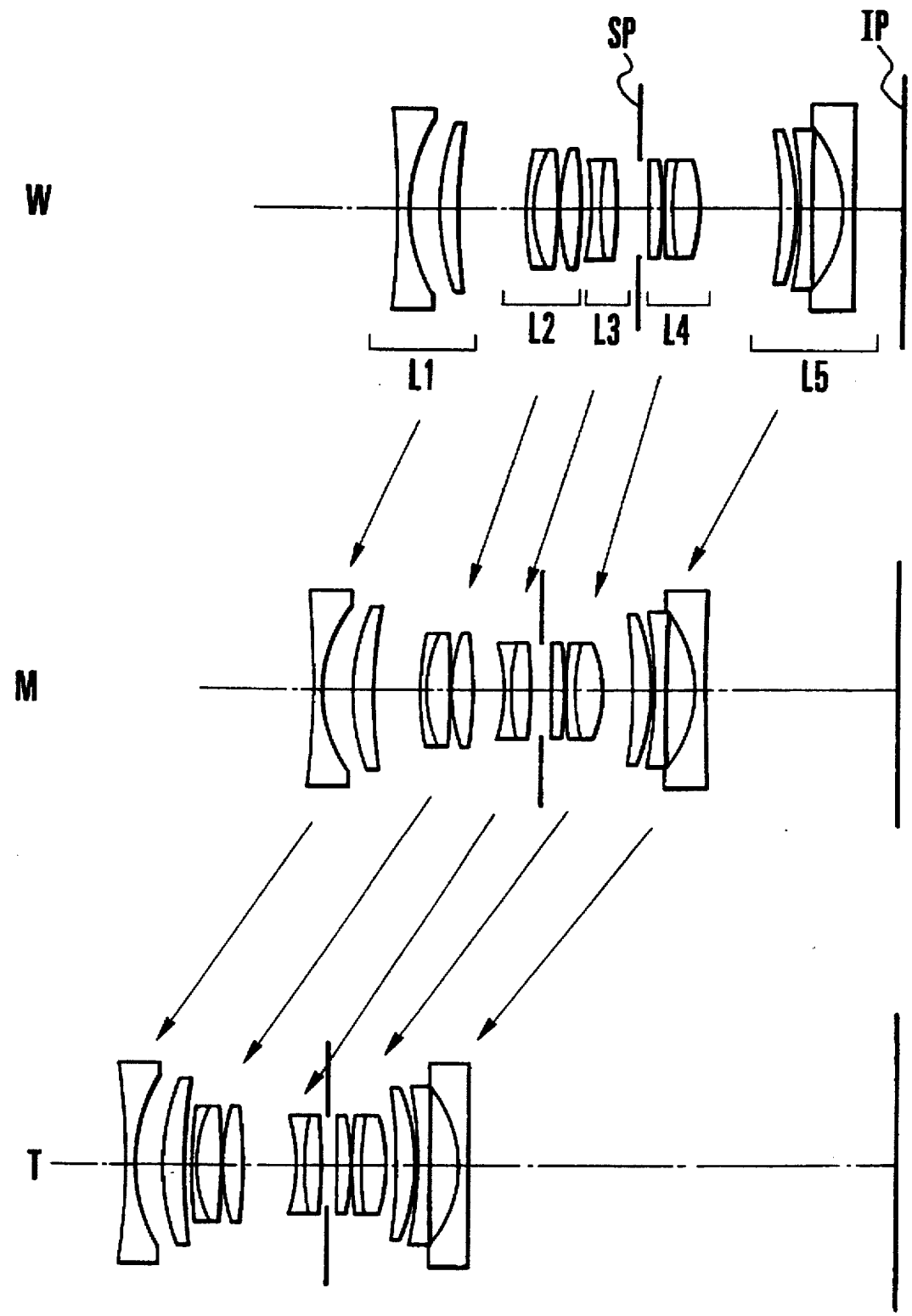
FIG. 100 are lens block diagrams of a numerical example 51 of the invention.
Figure 101A:
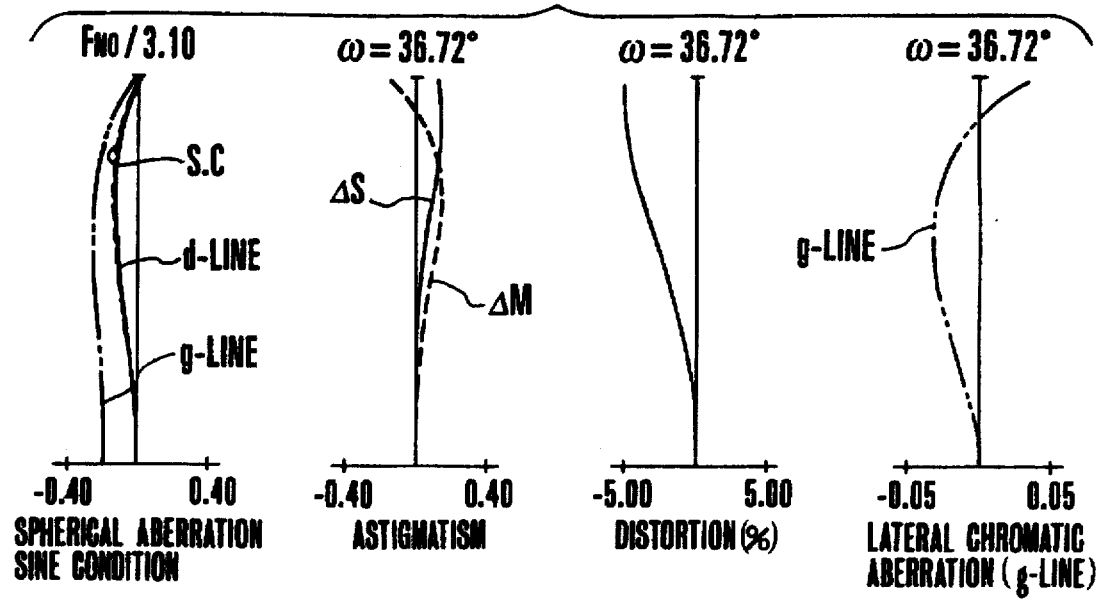
FIGS. 101(A), 101(B) and 101(C) are graphs of the various aberrations of the numerical example 41.
Figure 101B:
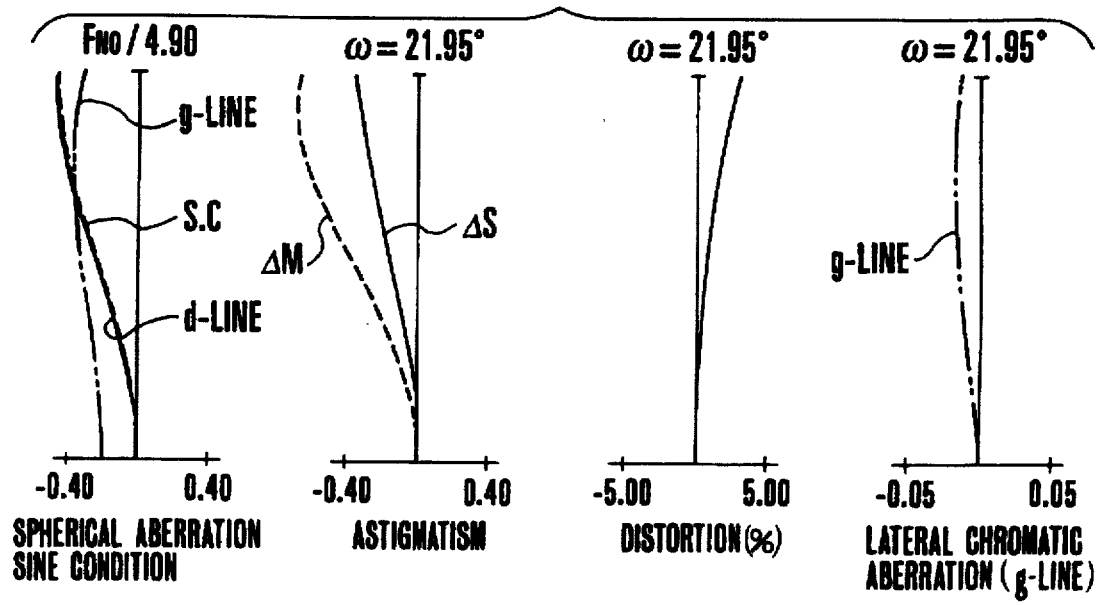
Figure 101C:
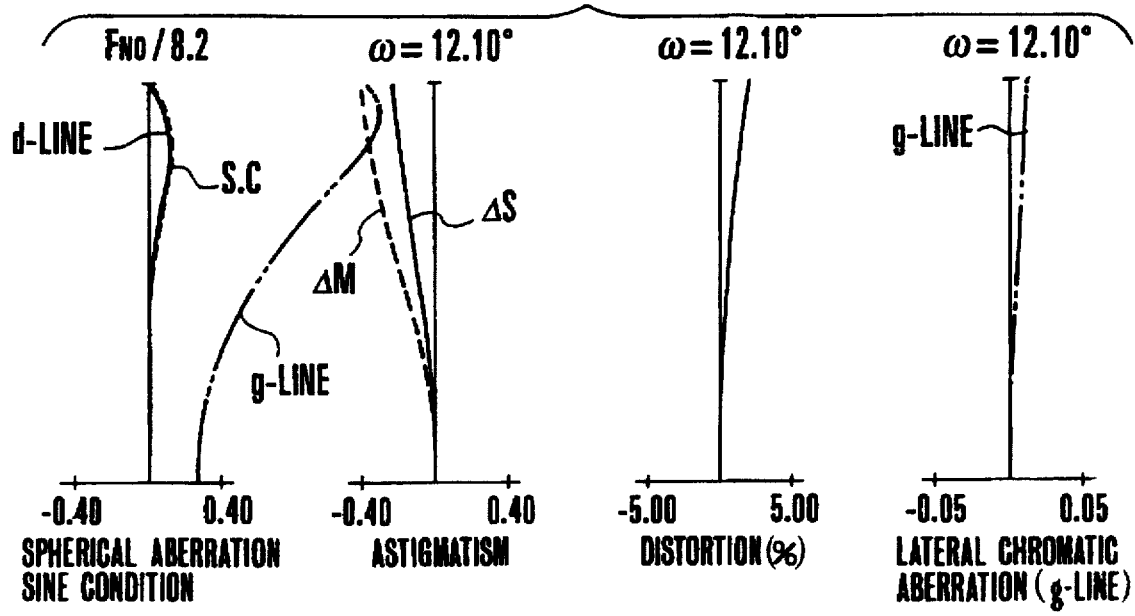
Figure 102A:
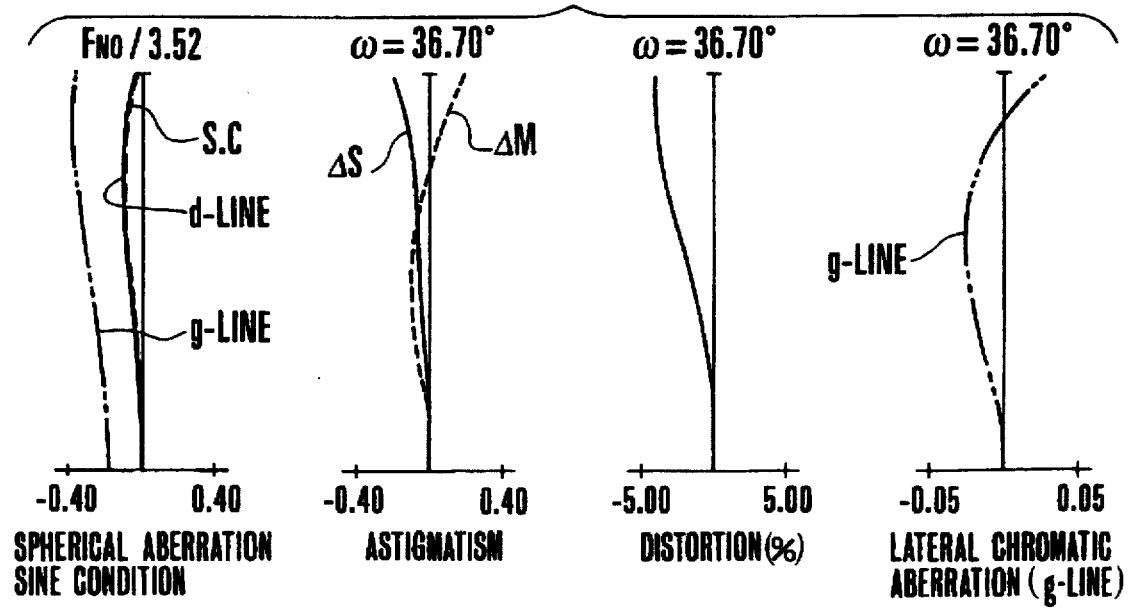
FIGS. 102(A), 102(B) and 102(C) are graphs of the various aberrations of the numerical example 42.
Figure 102B:
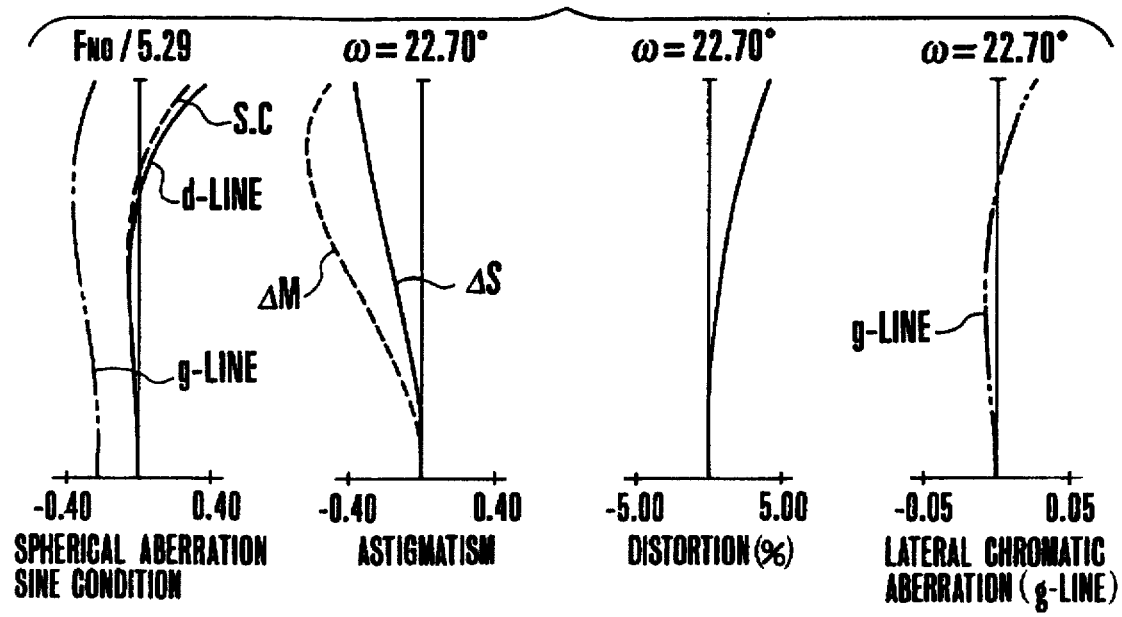
Figure 102C:
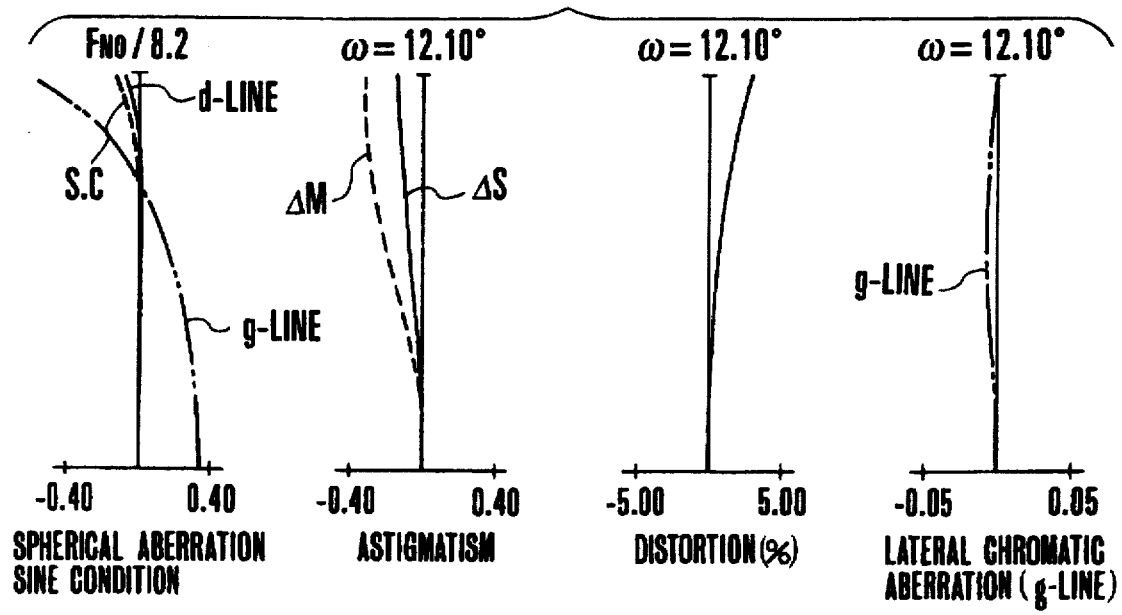
Figure 103A:
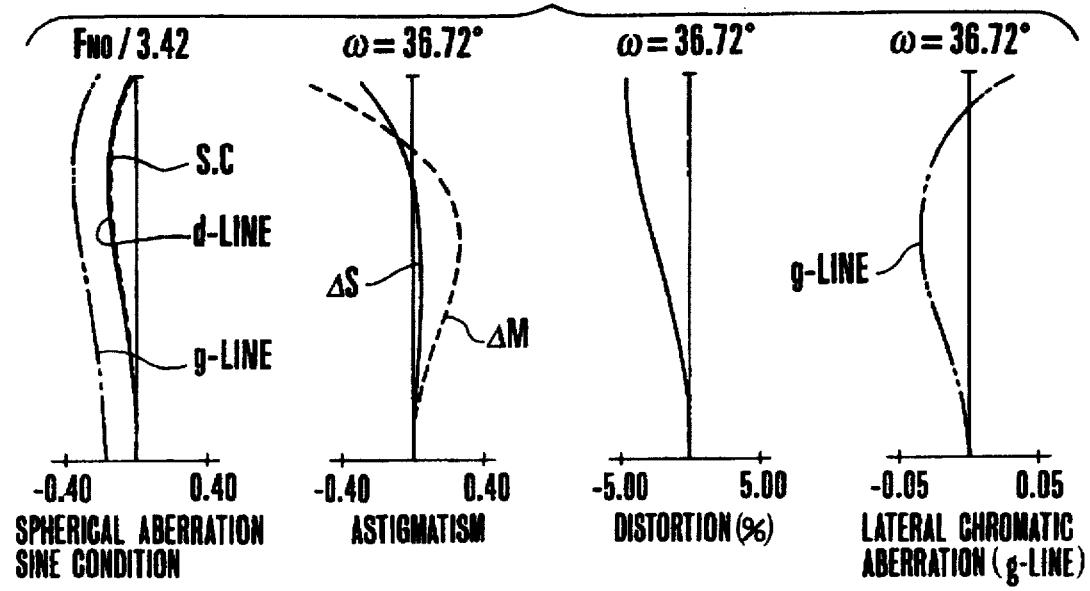
FIGS. 103(A), 103(B) and 103(C) are graphs of the various aberrations of the numerical example 43.
Figure 103B:
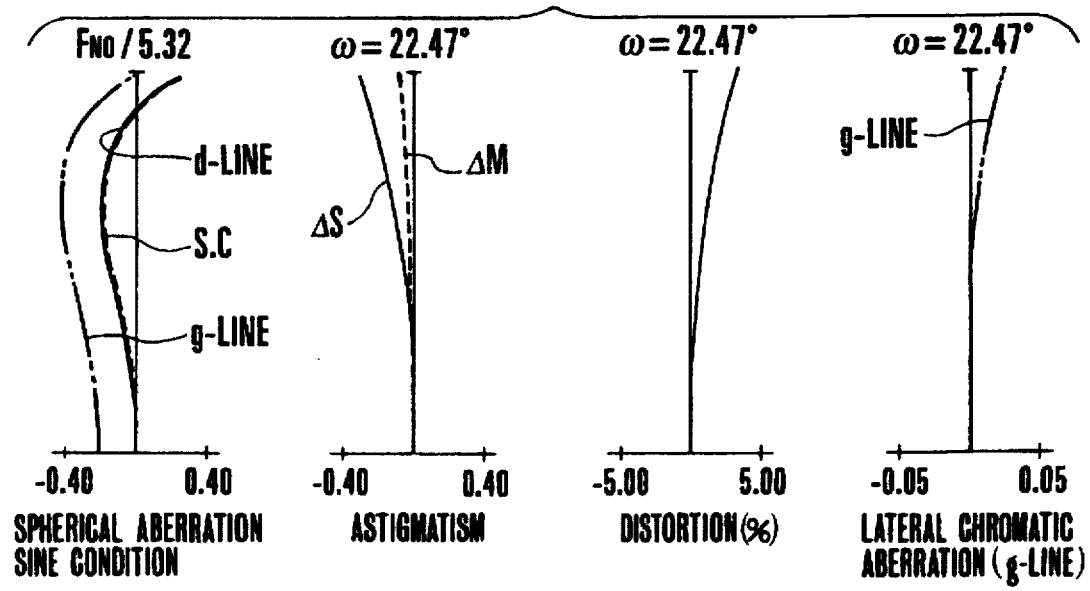
Figure 103C:
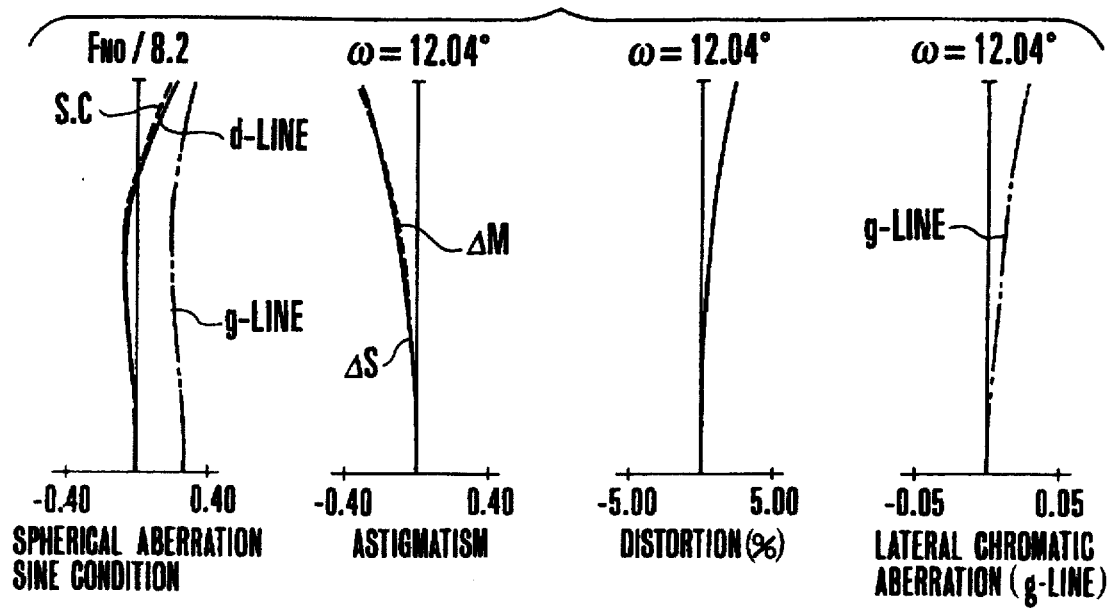
Figure 104A:
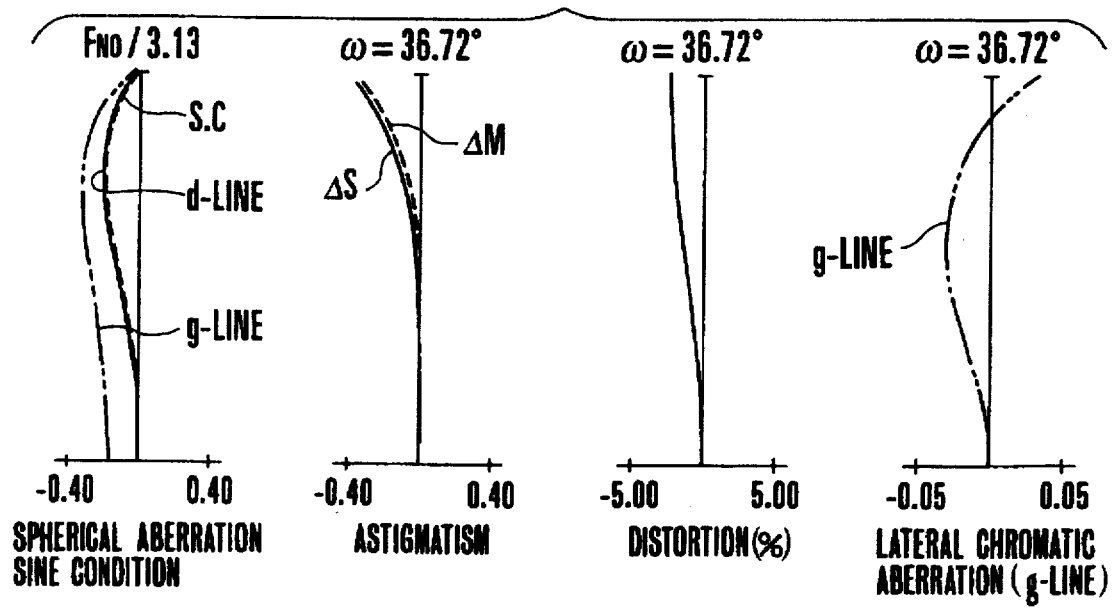
FIGS. 104(A), 104(B) and 104(C) are graphs of the various aberrations of the numerical example 44.
Figure 104B:
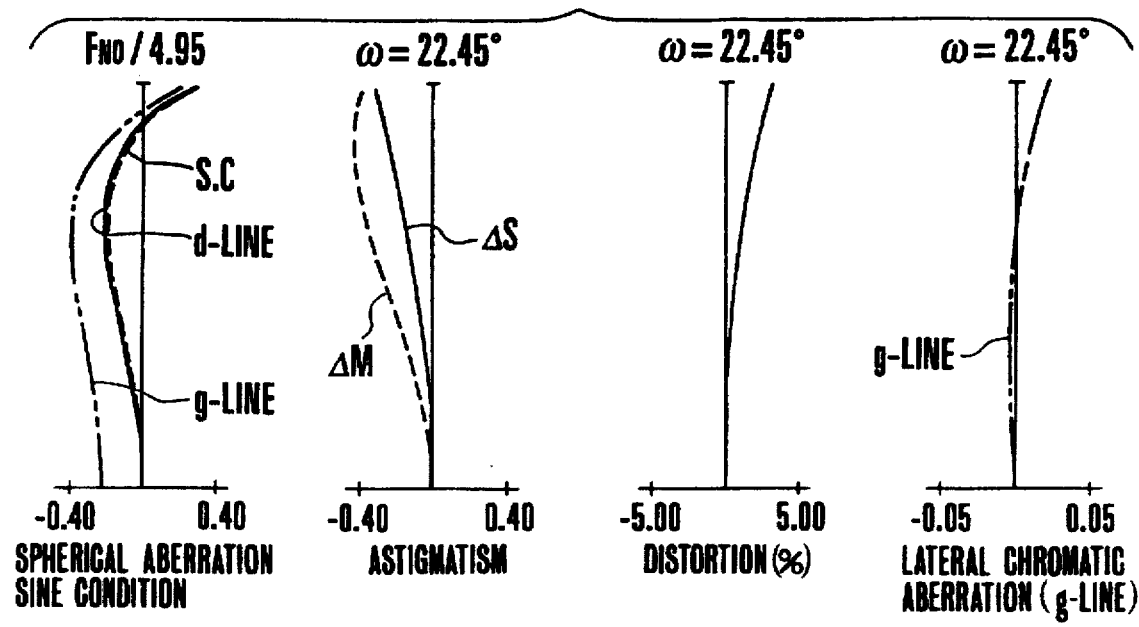
Figure 104C:
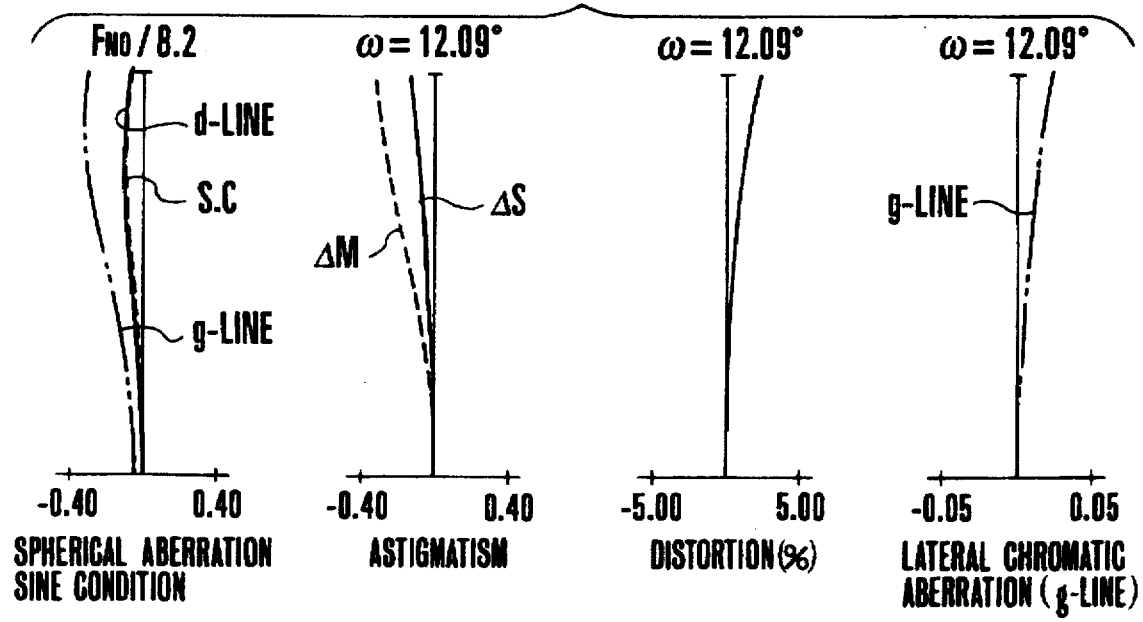
Figure 105A:
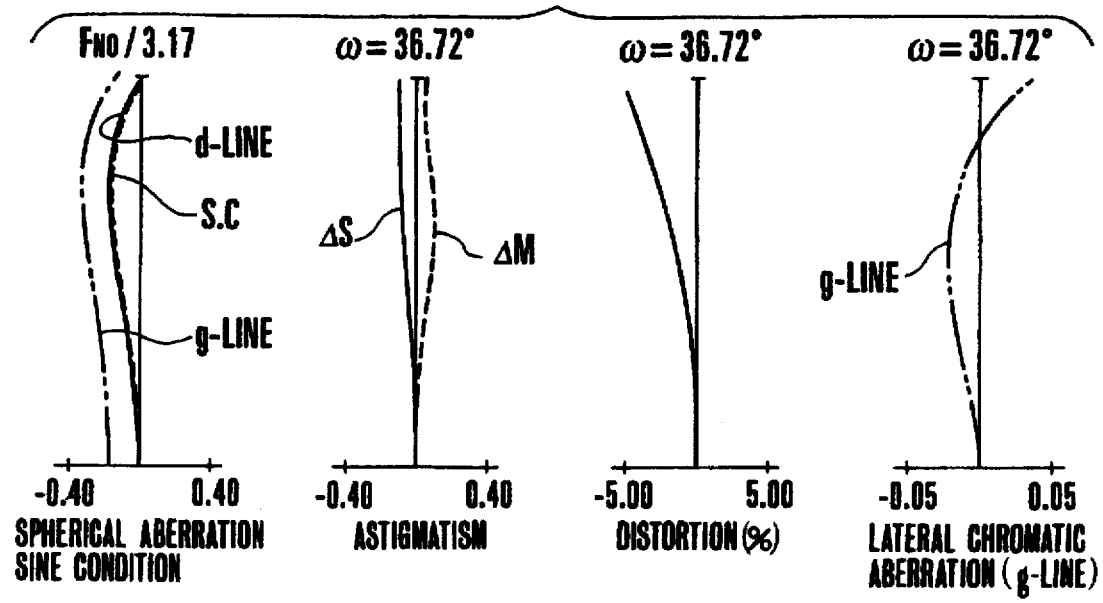
FIGS. 105(A), 105(B) and 105(C) are graphs of the various aberrations of the numerical example 45.
Figure 105B:
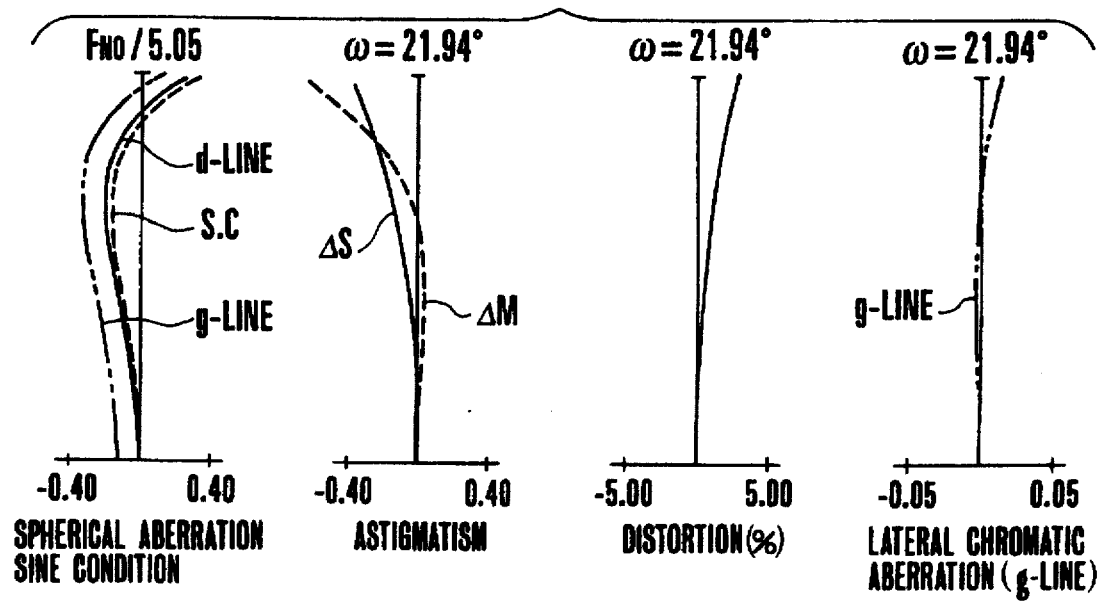
Figure 105C:
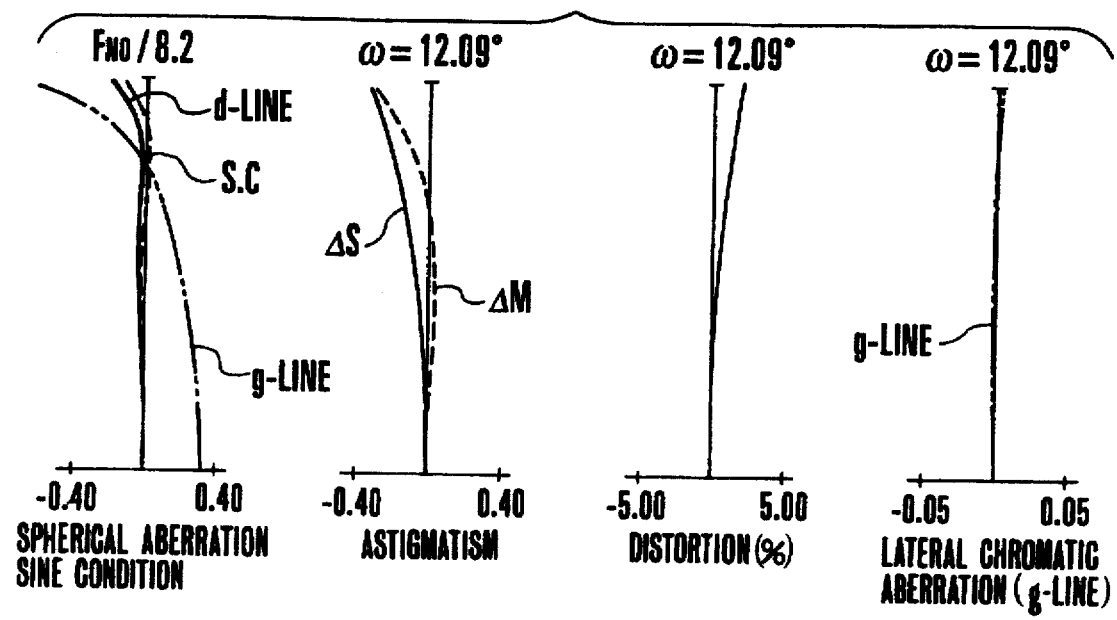
Figure 106A:
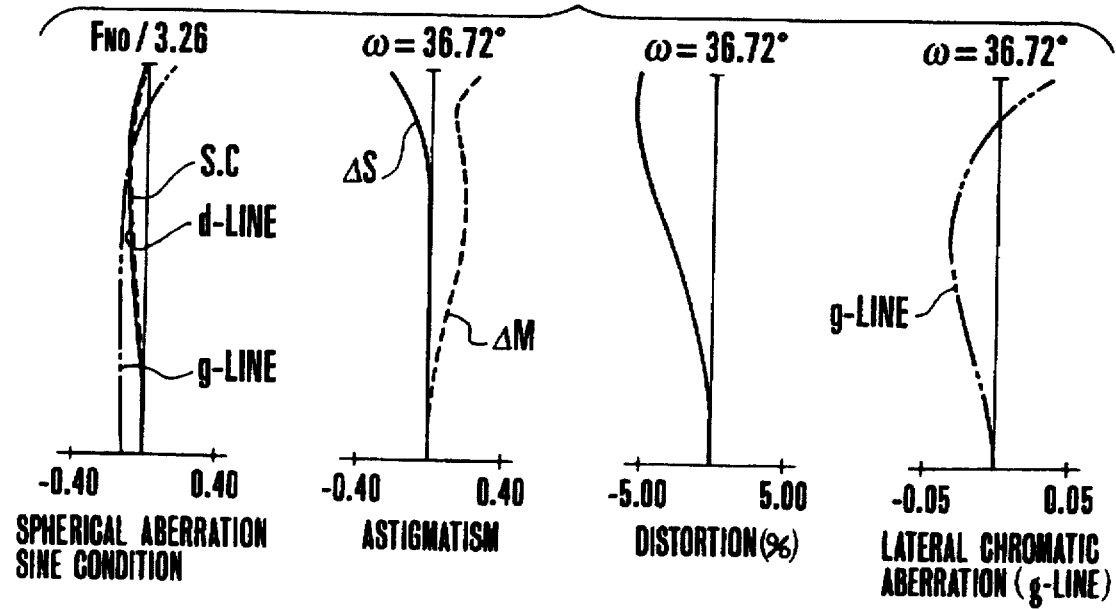
FIGS. 106(A), 106(B) and 106(C) are graphs of the various aberrations of the numerical example 46.
Figure 106B:
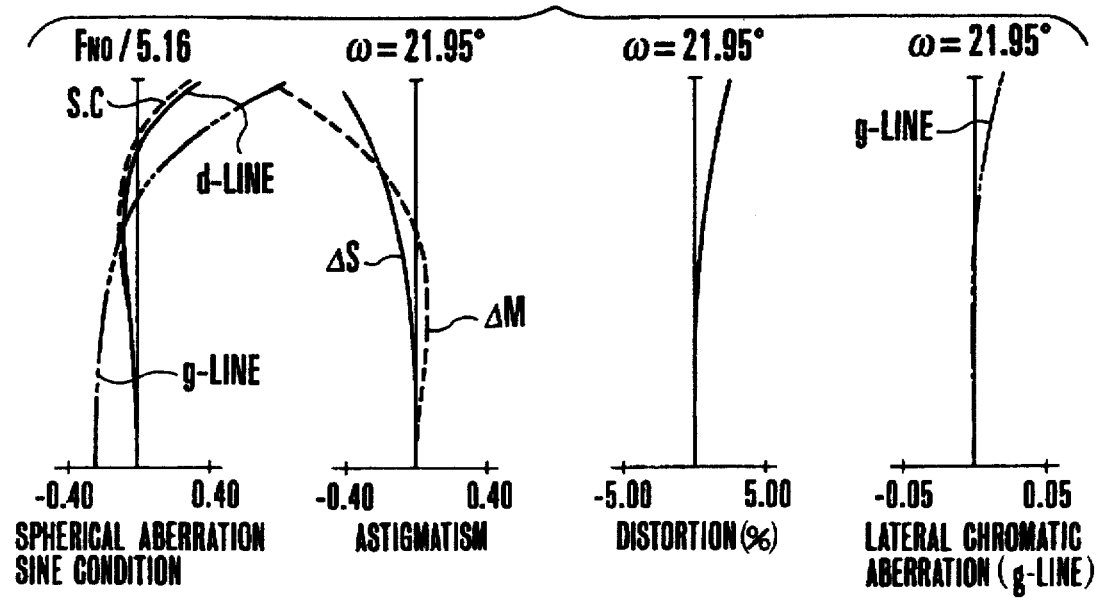
Figure 106C:
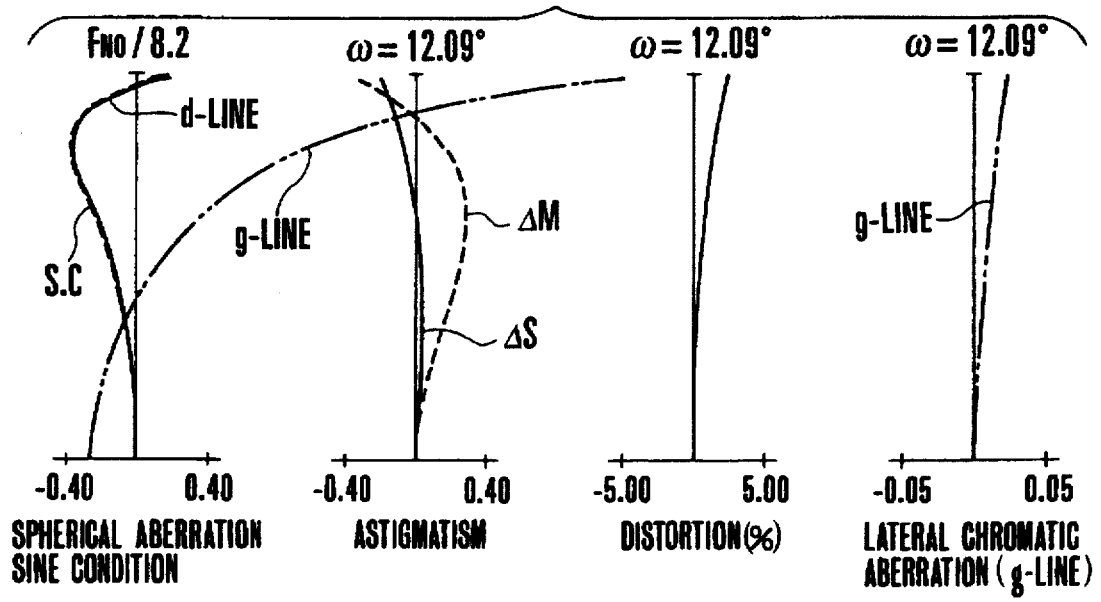
Figure 107A:
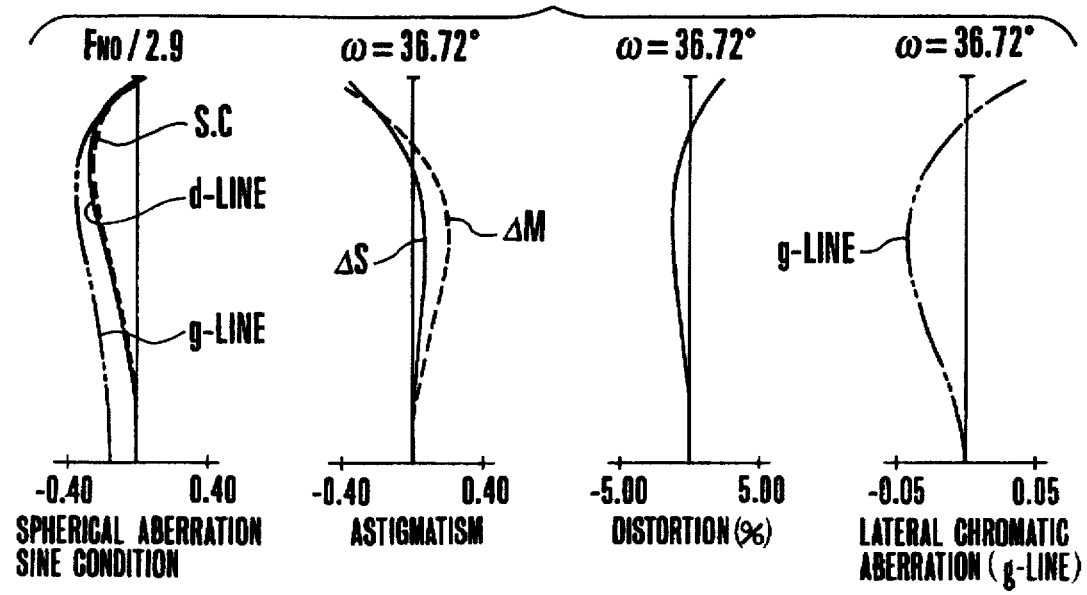
FIGS. 107(A), 107(B) and 107(C) are graphs of the various aberrations of the numerical example 47.
Figure 107B:
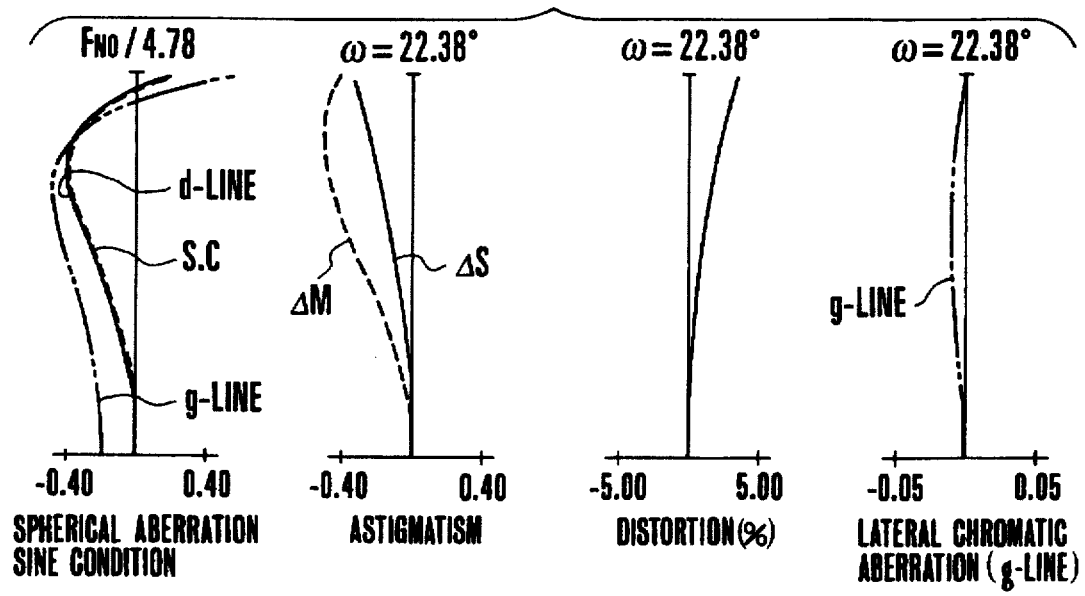
Figure 107C:
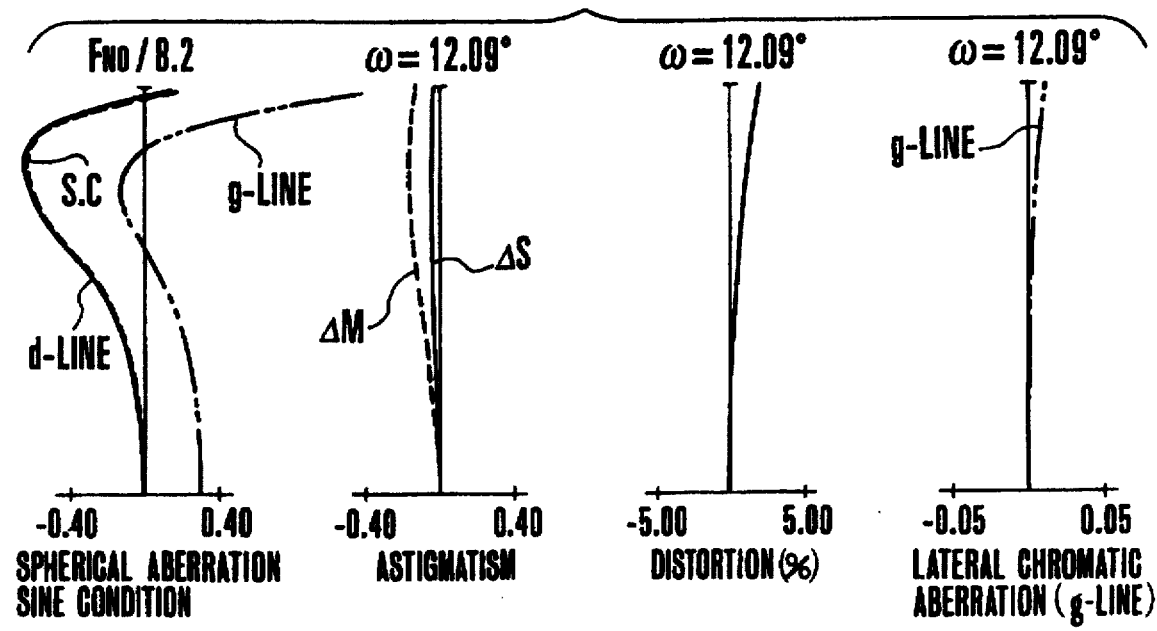
Figure 108A:
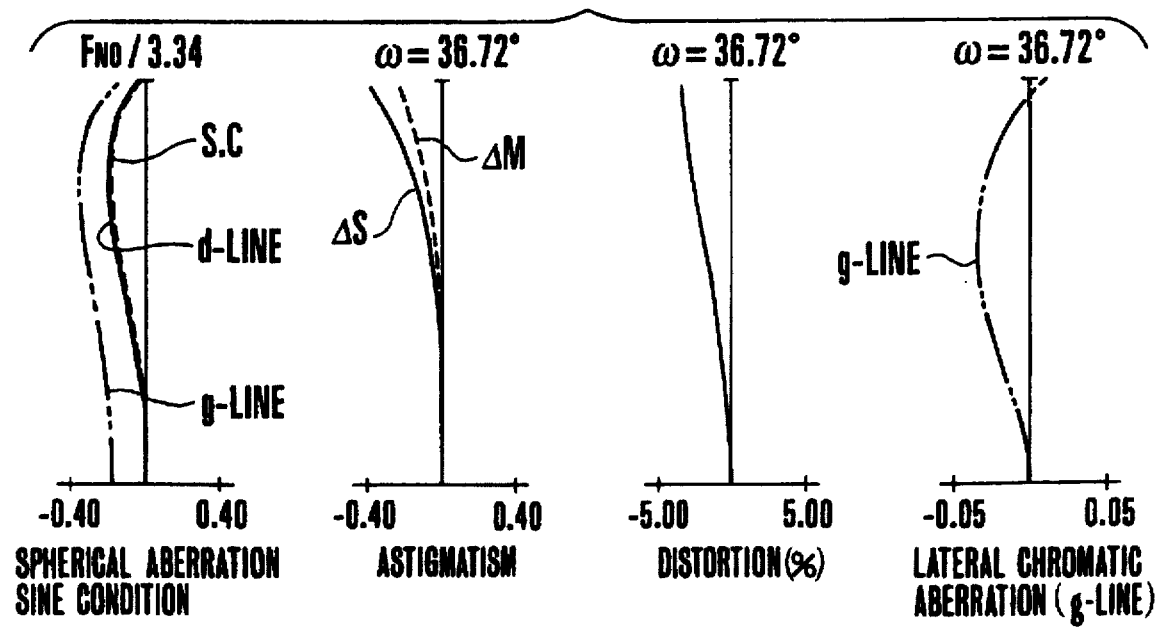
FIGS. 108(A), 108(B) and 108(C) are graphs of the various aberrations of the numerical example 48.
Figure 108B:
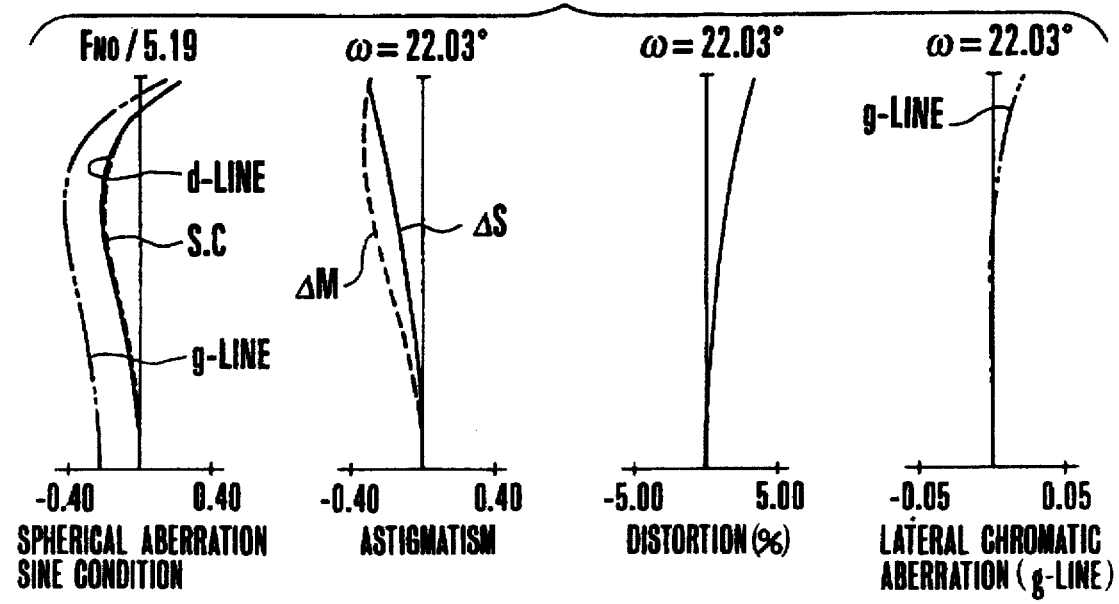
Figure 108C:
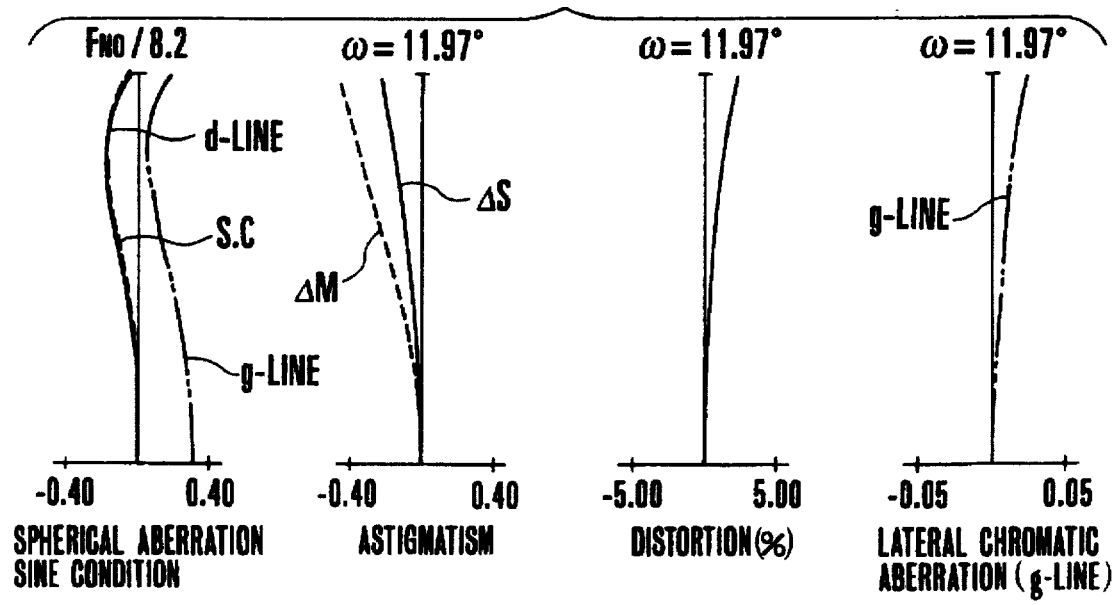
Figure 109A:
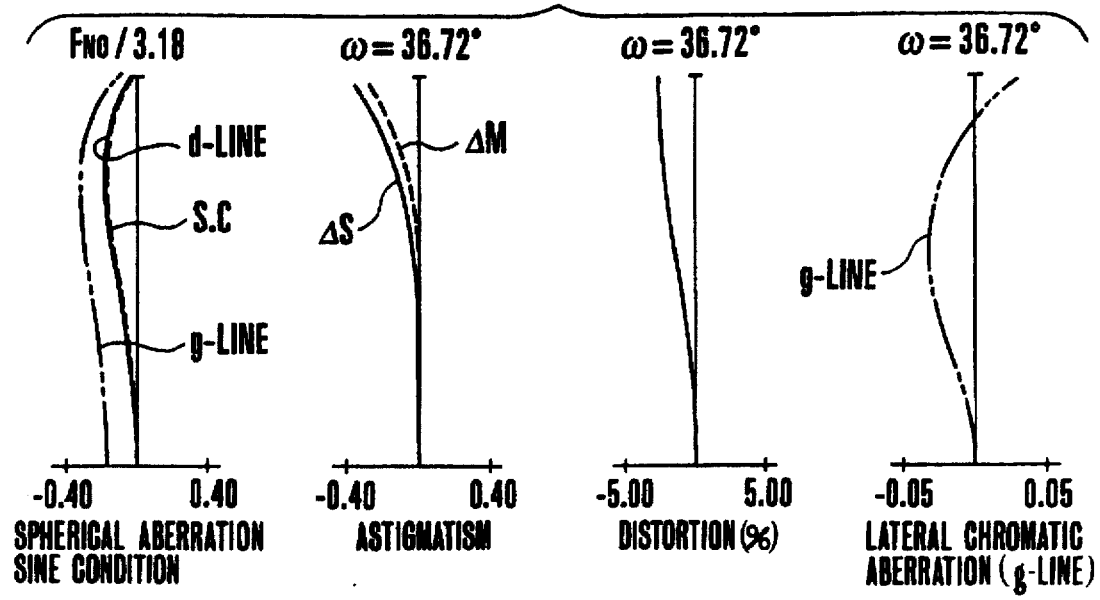
FIGS. 109(A), 109(B) and 109(C) are graphs of the various aberrations of the numerical example 49.
Figure 109B:
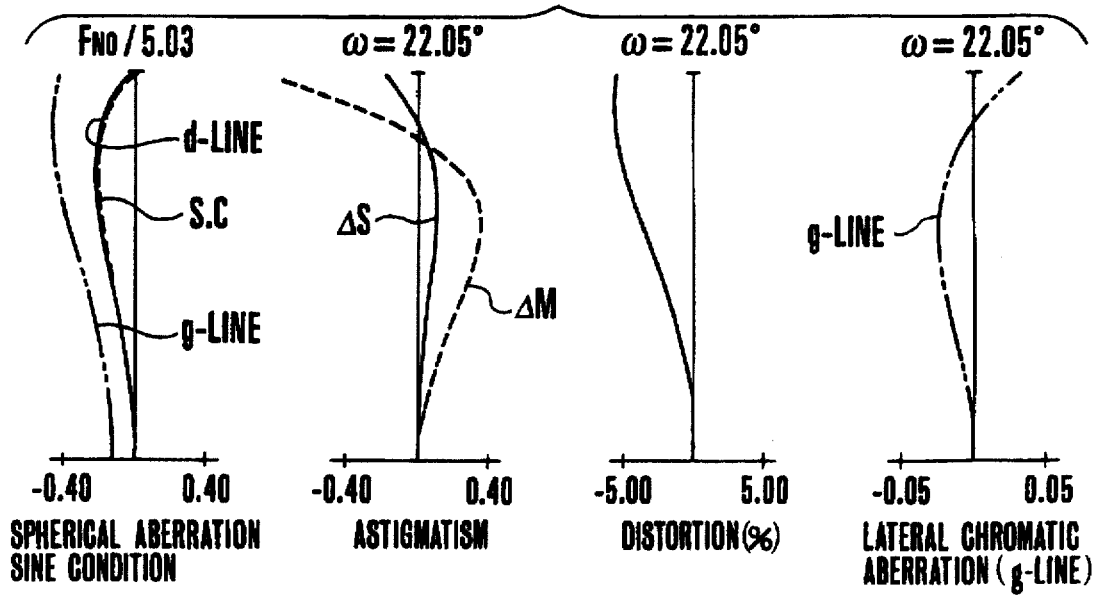
Figure 109C:
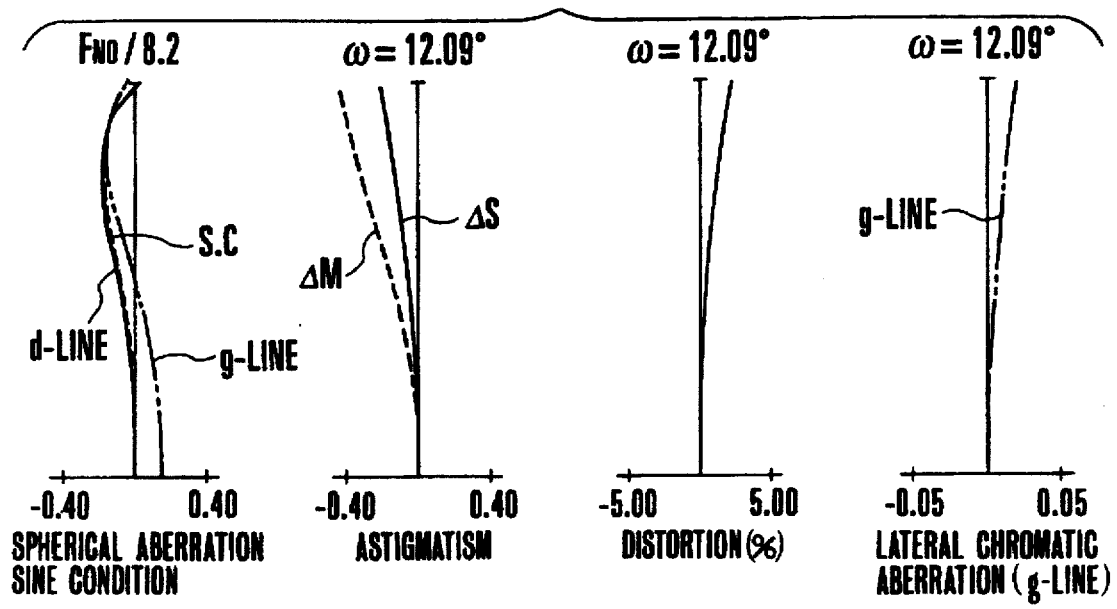
Figure 110A:
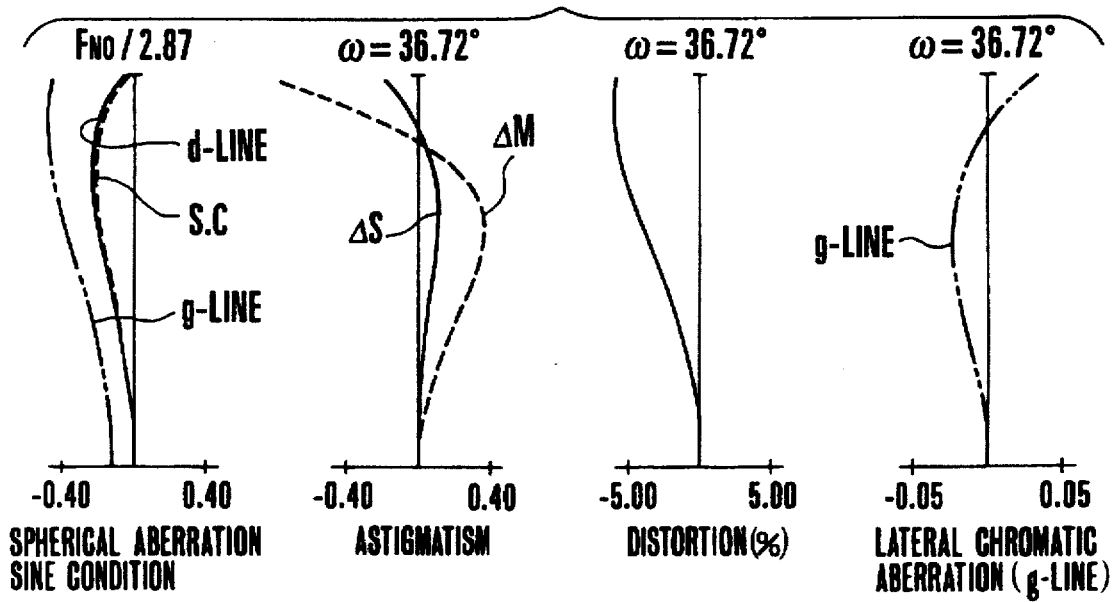
FIGS. 110(A), 110(B) and 110(C) are graphs of the various aberrations of the numerical example 50.
Figure 110B:
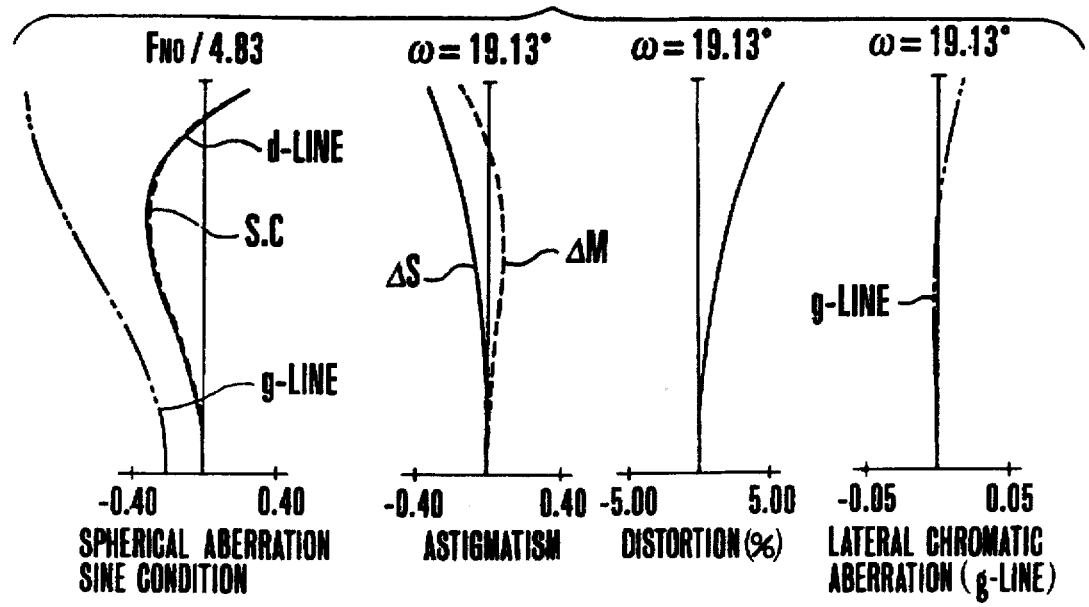
Figure 110C:
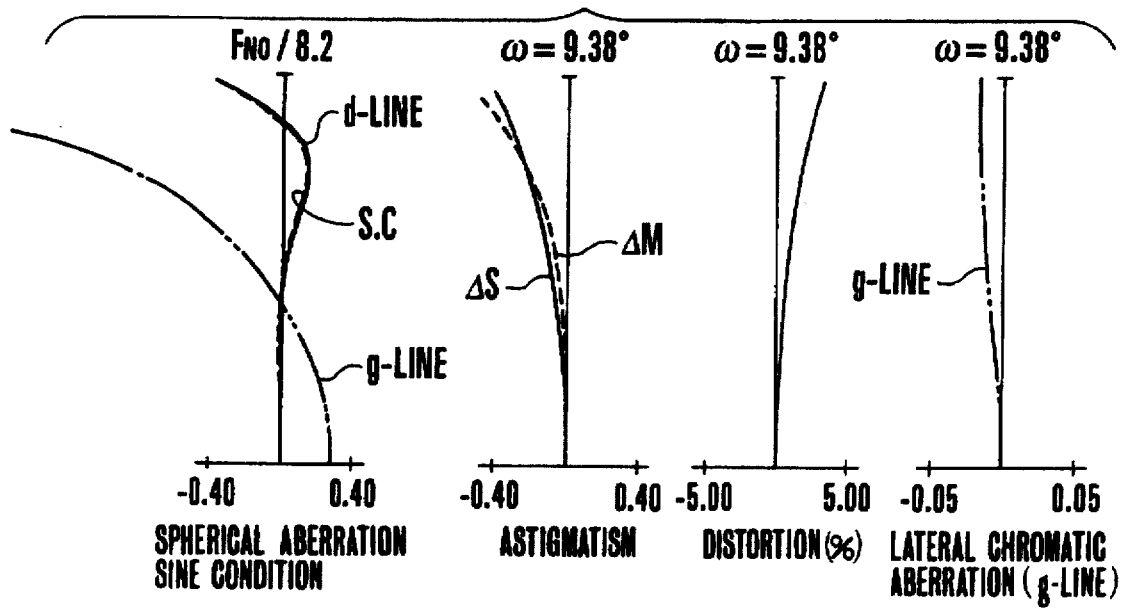
Figure 111A:
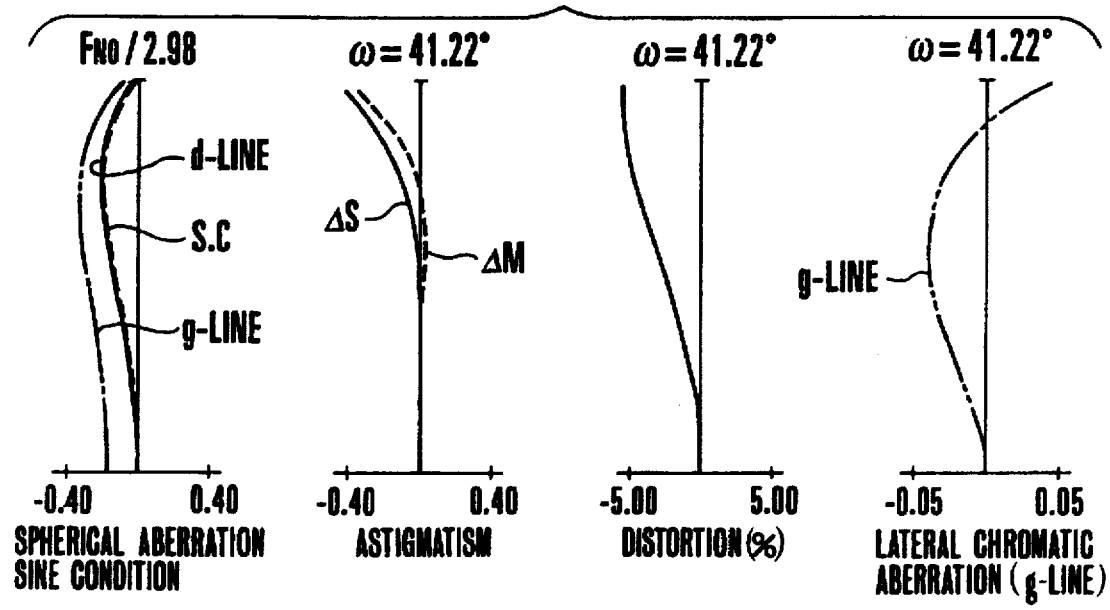
FIGS. 111(A), 111(B) and 111(C) are graphs of the various aberrations of the numerical example 51.
Figure 111B:
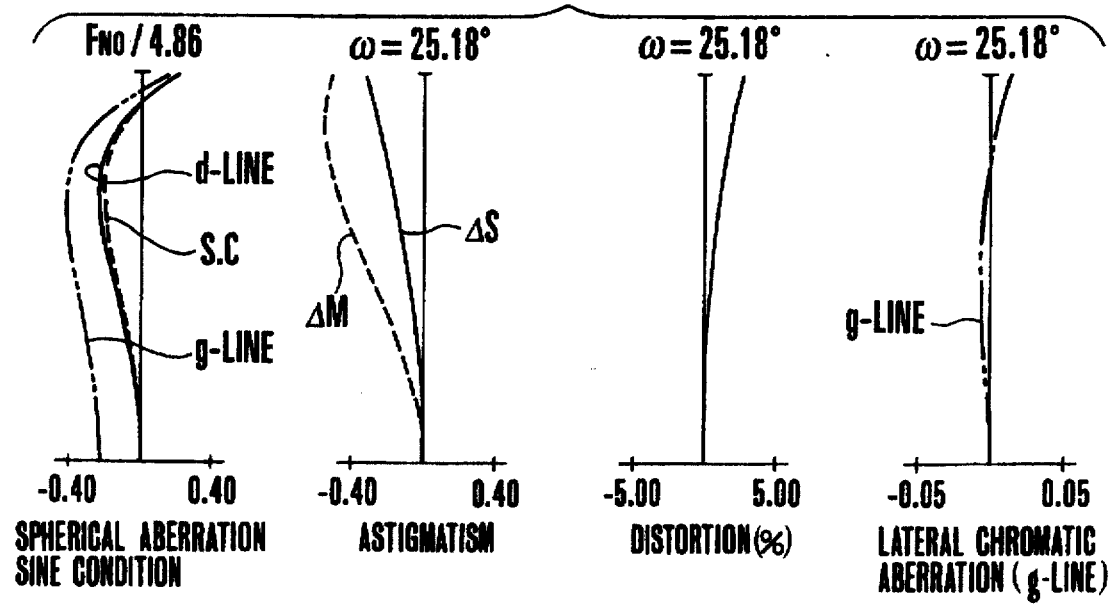
Figure 111C:
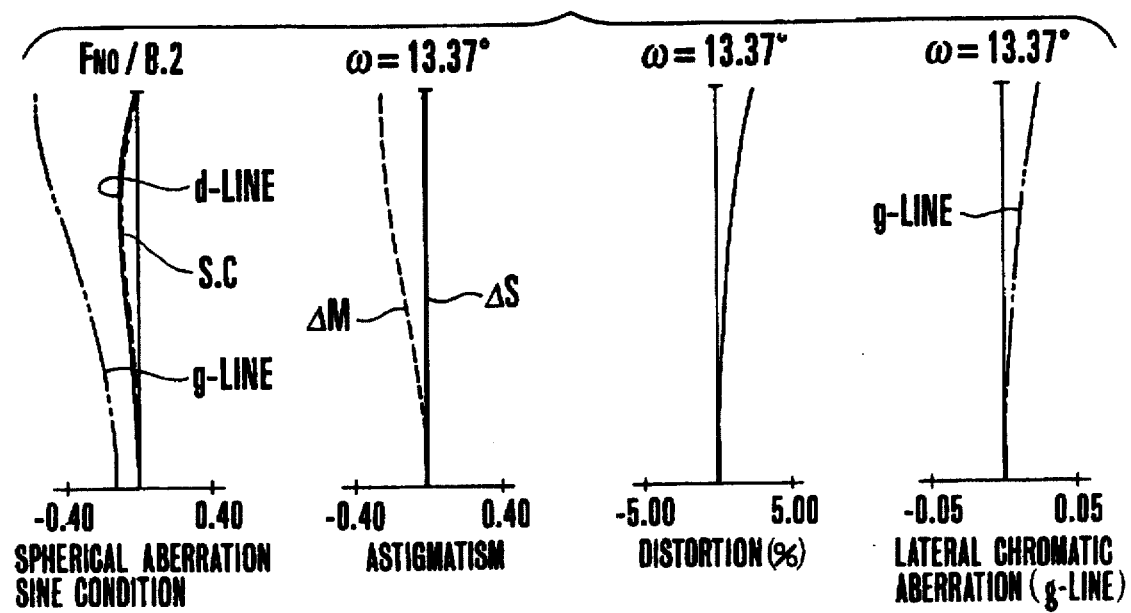

FIG. 73 illustrates the variation of the paraxial refractive power arrangement of the zoom lens with zooming from the wide angle end W to the telephoto end T according to the present embodiment. FIG. 74 through FIG. 81 are longitudinal section views of numerical examples 33 to 40 of zoom lenses of the invention in the wide angle end respectively.

FIGS. 82(A) to 82(C) through FIGS. 89(A) to 89(C) are graphic representations of the aberrations of the numerical examples 33 to 40.

In the drawings, reference character L1 denotes the first lens unit of negative refractive power, reference character L2 denotes the second lens unit of positive refractive power, reference character L3 denotes the third lens unit of negative refractive power, reference character L4 denotes the fourth lens unit of positive refractive power and reference character L5 denotes the fifth lens unit of negative refractive power. Reference character SP stands for a stop and reference character IP for an image plane. The arrows indicate the directions in which the lens units move axially with zooming from the wide angle end to the telephoto end.

In the present embodiment, as zooming from the wide angle end to the telephoto end, all the lens units move forward in such relation that the separation between the first and second lens units decreases, the separation between the second and third lens units increases, the separation between the third and fourth lens units increases and the separation between the fourth and fifth lens units decreases. This assures minimization of the size of the total length of the entire system and increase of the zoom ratio to a predetermined value, while still permitting high optical performance to be obtained throughout the entire zooming range.

In the prior art, it has been the common practice that the compact, high range zoom lens is constructed with three lens units of plus-plus-minus refractive power arrangement. With the use of this 3-component type, when to achieve increase of the maximum field angle and reduction of the size of the entire lens system, it becomes necessary for the first and second lens units to have their positive refractive powers made stronger.

In general, however, the stronger the refractive power of the lens unit and the wider the maximum field angle, the more asymmetric the entire lens system becomes and the larger the aberrations get. For this reason, it becomes difficult to simultaneously fulfill the requirements of minimizing the bulk and size of the entire system and of maintaining high optical performance.

In the present embodiment, on the other hand, as shown in FIG. 73 on the line W, for the wide angle end, the first lens unit of negative refractive power is followed after a somewhat long space by the next three lens units, namely, the second, third and fourth lens units, which are arranged so close to each other (hereinafter called an "M group") that the overall refractive power is positive, and then after another somewhat long space by the fifth lens unit of negative refractive power.

On this account, the entire system when in the wide angle end takes a symmetric form of the negative, positive and negative lens components, whereby the refractive power of the M group is strengthened to increase the maximum field angle and to reduce the size. Nonetheless, all aberrations are corrected well. Since the first lens unit of negative refractive power and the M group of positive refractive power are arranged in spaced relation by the appreciably long distance, because the retrofocus type configuration is formed, it is made easy to secure the back focal distance, which constitutes a problem at the time of increasing the maximum field angle.

For the opposite or telephoto end, as shown in FIG. 73 on the line T, the separation between the first and second lens units and the separation between the fourth and fifth lens units are made shorter than when in the wide angle end. Further, the overall focal length of the first and second lens units is made positive, and the overall focal length of the fourth and fifth lens units is made positive.

In general, for the two components in total, or the 2-component zoom lens, the refractive power $\phi 12$ of the entire system is expressed by $$\phi 12 = \phi 1 + \phi 2 - e \cdot \phi 1 \cdot \phi 2 \quad (a)$$

where $\phi 1$ and $\phi 2$ are the refractive powers of the first and second components respectively and e is the interval between the principal points of the first and second components.

In here, as shown in FIG. 73 on the line T, the first and second lens units have their refractive powers of opposite sign, and the fourth and fifth lens units have their refractive powers of opposite sign. As is understandable from the equation (a), therefore, the overall refractive power of each other's lens units becomes smaller (the overall focal length becomes longer) in each of these groups. This is combined with the function of increasing the magnifications of the second and fifth lens units to improve the efficiency with which the longest focal length of the entire system increases. Thus, it is made possible to increases the zoom ratio. Even for the telephoto end, the entire system takes a symmetric form in respect to the lens unit arrangement. Thus, aberrations are corrected well.

The present embodiment then sets forth the following conditions:

$$|1/\beta 3W| \leq 1.0 \quad (47)$$

$$|1/\beta 3T| \leq 1.0 \quad (48)$$

where $\beta 3W$ and $\beta 3T$ are the lateral magnifications for the wide angle and telephoto ends of the third lens unit respectively.

The before-described equation (a) teaches that increasing the longest focal length is favored by narrowing the separation between the third lens unit of negative refractive power and the fourth lens unit of positive refractive power. With the use of such a lens unit arrangement, however, because the lens form becomes asymmetric in the telephoto end, good correction of aberrations becomes difficult to perform. To maintain good stability of aberration correction throughout the entire zooming range, therefore, the total number of lens elements has to increase. As a result, the size of the entire lens system increases largely.

The inequalities of conditions (47) and (48) have an aim to correct various aberrations in such a manner that the total number of lens elements is reduced to assure minimization of the size of the entire lens system.

Since, in the zoom lens according to the present embodiment, the back focal distance is longer when in the telephoto end than when in the wide angle end, the exit pupil from the last lens surface shifts its position toward the object side when zooming to the telephoto end. To balance the on-axial and off-axial aberrations, it is effective to adjust the heights of incidence of the on-axial and off-axial light beams on the distant lens units from the pupil position in accordance with variation of the separations between the lens units. Particularly with regard to the above-described light beams, it is desired that the height of incidence of the off-axial one is made somewhat higher than that of incidence of the on-axial one. From this reason, for the telephoto end, the separation between the third and fourth lens units has to be made longer than that for the wide angle end, as will be seen from the before-described relationship of the exit pupil position.

However, a longer separation for the telephoto end between the third and fourth lens units than that for the wide angle end is disadvantageous at increasing the longest focal length (gives a greater effect to decreasing the magnification), as has been described in connection with the equation (a).

For this reason, in the present embodiment, the lateral magnification of the third lens unit is made to fall within the range given by the conditions (47) and (48). Or otherwise it would constitute a reducing system. With this, even if the separation between the third and fourth lens units is longer when in the telephoto end than when in the wide angle end, no effect of reducing the magnification is produced. Thus, the balance between the on-axial and off-axial aberrations is maintained excellent throughout the entire zooming range.

Meanwhile, when the conditions (47) and (48) are not satisfied, the difficulty of achieving minimization of the size of the entire lens system and great increase of the zoom ration increases objectionably.

If desired, the conditions (47) and (48) are better altered to the following ranges for achievement of a further improvement of the optical performance:

$$|1/\beta 3W| \leq 0.6 \quad (47a)$$

$$|1/\beta 3T| \leq 0.6 \quad (48a)$$

To make a good compromise between the reduction of the size of the entire lens system and stability of optical performance, the present embodiment sets forth additional conditions. Letting the focal length of the i-th lens unit be denoted by fi and the shortest and longest focal lengths of the entire system by fW and fT respectively, it is better to satisfy the following conditions:

$$0.27 < f2/\sqrt{fW \cdot fT} < 0.8 \quad (49)$$

$$0.2 < f4/\sqrt{fW \cdot fT} < 0.6 \quad (50)$$

The inequalities of condition (49) are concerned with the ratio of the focal length of the second lens unit to the focal length for an intermediate zooming position of the entire lens system. When the upper limit is exceeded, as this implies that the refractive power of the second lens unit is too weak, the total zooming movement of the second lens unit has to increase to obtain a predetermined value of the zoom ratio, that is, to make a predetermined contribution to the effect of increasing the zoom ratio. Moreover, to assure prevention of the first lens unit from mechanically interfering with it in the telephoto end, it becomes necessary to widen the separation between the first and second lens units by a surplus amount in the wide angle end. As a result, the total length of the entire system and the diameter of the front lens members are caused to increase simultaneously.

When the refractive power of the second lens unit is strengthened from the lower limit, the total length of the entire system gets shorter, but it produces spherical aberrations of higher order and coma, which are difficult to correct.

The inequalities of condition (50) are concerned with the ratio of the focal length of the fourth lens unit to the focal length for an intermediate zooming position of the entire system. When the upper limit is exceeded, as this implies that the refractive power of the fourth lens unit is too weak, necessity arises that the separation between the fourth and fifth lens units be widened to obtain a predetermined value of the shortest focal length, causing the total length of the entire system to increase objectionably.

When the refractive power is stronger then the lower limit, limitations have to be laid on the forms of the lenses in the fifth lens unit to retain a positive value of the back focal distance. Therefore, it becomes difficult to maintain good stability of optical performance throughout the entire zooming range.

It is to be noted that, in the present embodiment, an iris stop is assumed to be used in adjusting the light amount. It is then desirable to position the stop in the space between the frontmost surface of the second lens unit and the frontmost surface of the fourth lens unit, for the entrance pupil takes an appropriate position to minimize the outer diameter of the lenses in the first lens units, while suppressing the variation of aberrations with zooming.

To obtain high optical performance throughout the entire zooming range, the present embodiment sets forth the following additional conditions:

$$0.55 < f_{234W}/fW < 0.9 \quad (51)$$

$$0.02 < |fW^2/(f1 \cdot fT)| < 0.55 \quad (52)$$

$$0.05 < |fW^2/(f5 \cdot fT)| < 0.45 \quad (53)$$

where $f_{234W}$ is the overall focal length for the wide angle end of the second, third and fourth lens units.

The inequalities of condition (51) are concerned with the ratio of the overall focal length of the second, third and fourth lens units to the shortest focal length of the entire system and have an aim chiefly to simultaneously fulfill the requirements of minimizing the size of the entire lens system and of maintaining good stability of optical performance. When the upper limit of the condition (51) is exceeded, either the separation between the first and second lens units or the separation between the fourth and fifth lens units has to widen to retain the refractive power of the entire lens system. Or otherwise the predetermined value of the shortest focal length could not be obtained. Thus, the total length of the entire system is caused to increase.

When the lower limit is exceeded, on the other hand, as this implies that the overall refractive power of the second, third and fourth lens units is too strong, large negative spherical aberration is produced, which is difficult to correct well.

The inequalities of conditions (52) and (53) are concerned with the zoom ratio of the lens system and respectively with the ratios of the refractive powers of the first and fifth lens units to the shortest focal length of the entire system. When the upper limit of the condition (52) is exceeded, as this implies that the refractive power of the first lens unit is too strong, negative distortion and field curvature increase greatly. This is undesirable.

When the lower limit is exceeded, the outer diameter of the first lens unit and the total length of the entire system increase objectionably.

When the upper limit of the condition (53) is exceeded, as this implies that the refractive power of the fifth lens unit is too strong, it becomes difficult to correct various aberrations, because limitations are imposed on the forms of the lenses in the fifth lens units to obtain a positive value of the back focal distance. When the lower limit is exceeded, the effect of varying the focal length to the equivalent movement of the fifth lens unit is caused to decrease so that the total length for the telephoto end of the entire system increases objectionably.

In the present embodiment, it is preferred that the first lens unit is constructed with inclusion of at least one negative lens having a concave surface facing the image side, the third lens unit with inclusion of at least one negative lens having a concave surface facing the object side, the fourth lens unit in the form of a positive lens having a convex surface of strong refracting power facing the image side, and the fifth lens unit with inclusion of at least one negative lens having a concave surface facing the object side. With this, not only good stability of optical performance throughout the entire zooming range, but also the image aberrations over the entire area of the image frame are well corrected. To further improve the optical performance and the image aberrations, it is recommended to introduce an aspheric surface into the lens unit.

Particularly in the present embodiment, one aspheric surface is introduced into every one of the third, fourth and fifth lens units to thereby achieve the improvement of the image quality. The aspheric surface in the fourth lens unit is preferably formed to such a shape that the refractive power gets progressively weaker as the distance from the optical axis increases. It is particularly better to select the lens surface of convex curvature toward the image side. More lens surfaces may be selected to introduce the aspheric sphere with an advantage of further improving the optical performance.

The present embodiment is assumed to move all the lens units in differential relation. It is to be understood that two or more lens units may otherwise be moved in unison. According to this, the operating mechanism is simplified in structure.

For a case that the lens system has the stop, the stop may be made to move either in differential relation to all the lens units, or in unison with one of the lens units. If so, the stop can be kept in the neighborhood of the entrance pupil that moves when zooming, thereby giving an advantage of preventing variation of field curvature from occurring when the stop has a small aperture.

It is to be noted that, in the present embodiment, for the focusing purposes, any lens unit may be used, provided that the lateral magnification of the focusing lens unit does not become unity at any station during zooming.

For a case that the first lens unit has a considerably strong refractive power, it is preferred to use this lens unit in focusing, because the method of moving the first lens unit forward maintains constant the focusing amount for the equivalent object distance at any station during zooming, for a simplification of the operating mechanism can be expected.

For another case that, when in the wide angle end, the back focal distance is left long enough, it is recommended to use the method of moving the fifth lens unit toward the image side. In this case, an advantage of reducing the outer diameter of the first lens unit is produced. Even the method of moving two or more of the first to the fifth lens units simultaneously may be used.

It is to be noted that if the focusing lens unit contains the stop, it is preferred that the stop remains axially stationary during focusing, because the driving torque is reduced by an amount which would otherwise be necessary to move the diaphragm mechanism when focusing.

Next, numerical examples 33 to 40 of the invention are shown. The values of the factors of the above-described conditions for the numerical examples 33 to 40 are also listed in a Table-6.

NUMERICAL EXAMPLE 33

| f = 28.84~101.45 | Fno = 1:3.5~9 | 2ω = 73.8°~24.1° |
|---|---|---|

| R1 = −129.95 | D1 = 1.3 | N1 = 1.48749 | ν1 = 70.02 |
| R2 = 29.51 | D2 = 1.99 | | |
| R3 = 29.12 | D3 = 2.2 | N2 = 1.84666 | ν2 = 23.8 |
| R4 = 29.39 | D4 = Variable | | |
| R5 = 14.00 | D5 = 1.1 | N3 = 1.84666 | ν3 = 23.8 |
| R6 = 11.92 | D6 = 3.0 | N4 = 1.48749 | ν4 = 70.2 |
| R7 = −234.68 | D7 = Variable | | |
| R8 = (Stop) | D8 = 2.5 | | |
| R9 = −19.70 | D9 = 1.5 | N5 = 1.69320 | ν5 = 33.7 |
| R10 = −21.42 | D10 = 2.0 | N6 = 1.84666 | ν6 = 23.8 |
| R11 = −62.22 | D11 = Variable | | |
| R12 = 25202.75 | D12 = 4.1 | N7 = 1.77250 | ν7 = 49.6 |
| R13 = −15.62 | D13 = Variable | | |
| R14 = −18.26 | D14 = 1.5 | N8 = 1.69680 | ν8 = 55.5 |
| R16 = 218.48 | D15 = 2.3 | N9 = 1.84666 | ν9 = 23.8 |

| Variable | Focal Length | | |
|---|---|---|---|
| Separation | 28.84 | 53.10 | 101.45 |
| D4 | 9.00 | 14.18 | 0.80 |
| D7 | 1.00 | 6.08 | 8.04 |
| D11 | 2.27 | 4.78 | 9.15 |
| D13 | 14.06 | 4.20 | 0.95 |

Aspheric Coefficient

| | | | | | |
|---|---|---|---|---|---|
| R9 | K = 5.081 | A = 0 | B = −2.434 × $10^{-6}$ | C = 6.462 × $10^{-7}$ | D = 0 |
| R13 | K = −2.521 | A = 0 | B = −5.677 × $10^{-5}$ | C = 1.319 × $10^{-7}$ | D = 0 |
| R14 | K = 4.719 × $10^{-1}$ | A = 0 | B = 2.780 × $10^{-5}$ | C = 8.034 × $10^{-8}$ | D = 0 |

NUMERICAL EXAMPLE 34

| f = 28.84~82.5 | Fno = 1:4~9 | 2ω = 73.8°~29.4° |
|---|---|---|

| R 1 = −123.61 | D 1 = 1.1 | N 1 = 1.48749 | ν 1 = 70.2 |
| R 2 = 22.07 | D 2 = 2.0 | N 2 = 1.69895 | ν 2 = 30.1 |
| R 3 = 24.81 | D 3 = Variable | | |
| R 4 = 14.41 | D 4 = 1.1 | N 3 = 1.84666 | ν 3 = 23.8 |
| R 5 = 14.12 | D 5 = 2.3 | N 4 = 1.48749 | ν 4 = 70.2 |
| R 6 = −97.46 | D 6 = Variable | | |
| R 7 = (Stop) | D 7 = 3.5 | | |
| R 8 = −20.74 | D 8 = 3.7 | N 5 = 1.80518 | ν 5 = 25.4 |
| R 9 = −80.11 | D 9 = Variable | | |
| R10 = 807.66 | D10 = 5.0 | N 6 = 1.69680 | ν 6 = 55.5 |
| R11 = −15.60 | D11 = Variable | | |
| R12 = −23.37 | D12 = 1.8 | N 7 = 1.51633 | ν 7 = 64.2 |
| R13 = 113.71 | | | |

| Variable | Focal Length | | |
|---|---|---|---|
| Separation | 28.84 | 50.41 | 82.50 |
| D 8 | 8.00 | 11.03 | 0.80 |
| D 6 | 1.81 | 4.98 | 6.63 |
| D 9 | 2.20 | 3.83 | 8.79 |
| D11 | 17.50 | 2.30 | 1.11 |

Aspheric Coefficient

| | | | | | |
|---|---|---|---|---|---|
| R8 | K = 5.582 | A = 0 | B = −3.622 × $10^{-6}$ | C = 6.476 × $10^{-8}$ | D = 0 |
| R11 | K = −1.859 | A = 0 | B = −4.280 × $10^{-5}$ | C = 3.515 × $10^{-10}$ | D = 0 |
| R12 | K = 1.069 | A = 0 | B = 1.488 × $10^{-5}$ | C = 1.182 × $10^{-8}$ | D = 0 |

NUMERICAL EXAMPLE 35

| f = 28.84–87.45 | Fno = 1:3.7–8.2 | 2ω = 73.8°~27.8° |
|---|---|---|
| R 1 = −109.72 | D 1 = 1.1 | N 1 = 1.48748  ν 1 = 70.2 |
| R 2 = 24.66 | D 2 = 2.5 | N 2 = 1.72825  ν 2 = 28.5 |
| R 3 = 33.81 | D 3 = Variable | |
| R 4 = 15.87 | D 4 = 1.0 | N 3 = 1.84666  ν 3 = 23.8 |
| R 5 = 14.55 | D 5 = 2.5 | N 4 = 1.48749  ν 4 = 70.2 |
| R 6 = −65.38 | D 6 = Variable | |
| R 7 = (Stop) | D 7 = 1.5 | |
| R 8 = −20.90 | D 8 = 4.3 | N 5 = 1.80518  ν 5 = 25.4 |
| R 9 = −163.07 | D 9 = Variable | |
| R10 = −4235.61 | D10 = 4.0 | N 6 = 1.77250  ν 6 = 49.6 |
| R11 = −15.55 | D11 = Variable | |
| R12 = −20.96 | D12 = 1.5 | N 7 = 1.60311  ν 7 = 60.7 |
| R13 = 210.55 | | |

| Variable | Focal Length | | |
|---|---|---|---|
| Separation | 28.84 | 50.51 | 87.45 |
| D 3 | 8.08 | 10.66 | 0.80 |
| D 6 | 1.00 | 5.66 | 8.51 |
| D 9 | 2.30 | 4.19 | 8.92 |
| D11 | 17.11 | 5.04 | 1.20 |

Aspheric Coefficient

| | | | | |
|---|---|---|---|---|
| R8  | K = 5.877  | A = 0 | B = −7.777 × $10^{-6}$ | C = 6.647 × $10^{-7}$ | D = 0 |
| R11 | K = −1.389 | A = 0 | B = −2.774 × $10^{-5}$ | C = 3.946 × $10^{-9}$ | D = 0 |
| R12 | K = 1.037  | A = 0 | B = 1.854 × $10^{-5}$  | C = 6.720 × $10^{-8}$ | D = 0 |

NUMERICAL EXAMPLE 36

| f = 28.84–101.42 | Fno = 1:3.4–9 | 2ω = 73.8°~24.1° |
|---|---|---|
| R 1 = −65.07 | D 1 = 1.3 | N 1 = 1.48749  ν 1 = 70.2 |
| R 2 = 23.64 | D 2 = 2.72 | |
| R 3 = 26.42 | D 3 = 2.2 | N 2 = 1.69895  ν 2 = 30.1 |
| R 4 = 58.53 | D 4 = Variable | |
| R 5 = 14.74 | D 5 = 1.0 | N 3 = 1.84666  ν 3 = 23.8 |
| R 6 = 12.31 | D 6 = 3.2 | N 4 = 1.48749  ν 4 = 70.2 |
| R 7 = −51.23 | D 7 = Variable | |
| R 8 = (Stop) | D 8 = 1.5 | |
| R 9 = −21.12 | D 9 = 1.5 | N 5 = 1.69320  ν 5 = 33.7 |
| R10 = 29.42 | D10 = 2.0 | N 6 = 1.84666  ν 6 = 23.8 |
| R11 = −107.14 | D11 = Variable | |
| R12 = −262.99 | D12 = 3.6 | N 7 = 1.77250  ν 7 = 49.6 |
| R13 = −16.08 | D13 = Variable | |
| R14 = −20.02 | D14 = 2.5 | N 8 = 1.84666  ν 8 = 23.8 |
| R15 = −15.59 | D15 = 0.27 | |
| R16 = −15.13 | D16 = 2.0 | N 9 = 1.77250  ν 9 = 49.6 |
| R17 = 375.01 | | |

| Variable | Focal Length | | |
|---|---|---|---|
| Separation | 28.84 | 54.29 | 101.42 |
| D 4 | 9.00 | 12.58 | 0.80 |
| D 7 | 1.00 | 4.96 | 6.42 |
| D11 | 2.78 | 5.15 | 5.81 |
| D18 | 14.06 | 4.07 | 0.75 |

Aspheric Coefficient

| | | | | | |
|---|---|---|---|---|---|
| R9 | K = 4.986 | A = 0 | B = -3.292 × $10^{-6}$ | C = 5.482 × $10^{-7}$ | D = 0 |
| R13 | K = -3.210 | A = 0 | B = -7.421 × $10^{-5}$ | C = 2.271 × $10^{-7}$ | D = 0 |
| R14 | K = -7.195 × $10^{-1}$ | A = 0 | B = -1.991 × $10^{-6}$ | C = -5.659 × $10^{-8}$ | D = 0 |

NUMERICAL EXAMPLE 37 f = 28.84~82.59　　Fno = 1:4.1~9.0　　2ω = 73.8°~29.4°
R 1 = -91.64　　D 1 = 1.3　　N 1 = 1.49700　ν 1 = 81.6
R 2 = 32.58　　D 2 = Variable
R 3 = 13.99　　D 3 = 2.5　　N 2 = 1.61800　ν 2 = 63.4
R 4 = 149.34　　D 4 = Variable
R 5 = (Stop)　　D 5 = 4.05
R 6 = -20.75　　D 6 = 2.8　　N 3 = 1.80518　ν 3 = 25.4
R 7 = -128.00　　D 7 = Variable
R 8 = -3864.74　　D 8 = 4.5　　N 4 = 1.77250　ν 4 = 49.6
R 9 = -16.22　　D 9 = Variable
R10 = -19.92　　D10 = 1.8　　N 5 = 1.65844　ν 5 = 50.9
R11 = -148.20

| Variable | Focal Length | | |
|---|---|---|---|
| Separation | 28.84 | 48.81 | 82.59 |
| D 2 | 8.00 | 15.93 | 0.80 |
| D 4 | 1.69 | 6.52 | 6.97 |
| D 7 | 0.67 | 6.31 | 9.53 |
| D 9 | 17.33 | 0.53 | 0.93 |

Aspheric Coefficient

| | | | | |
|---|---|---|---|---|
| R6 | K = 5.916 | A = 0　B = -2.317 × $10^{-5}$ | C = 1.248 × $10^{-7}$ | D = -1.129 × $10^{-8}$ |
| R9 | K = -1.654 | A = 0　B = -4.728 × $10^{-5}$ | C = 3.065 × $10^{-9}$ | D = 2.003 × $10^{-8}$ |
| R10 | K = 6.679 × $10^{-1}$ | A = 0　B = 4.738 × $10^{-6}$ | C = 9.728 × $10^{-8}$ | D = 1.586 × $10^{-10}$ |

NUMERICAL EXAMPLE 38 f = 24.5~58.02　　Fno = 1:4.2~7.5　　2ω = 82.9°~40.9°
R 1 = -131.38　　D 1 = 1.1　　N 1 = 1.48749　ν 1 = 70.2
R 2 = 23.63　　D 2 = Variable
R 3 = 12.94　　D 3 = 2.0　　N 2 = 1.65160　ν 2 = 58.5
R 4 = 211.88　　D 4 = Variable
R 5 = (Stop)　　D 5 = 4.16
R 6 = -18.95　　D 6 = 1.3　　N 3 = 1.80518　ν 3 = 25.4
R 7 = 324.51　　D 7 = Variable
R 8 = 198.78　　D 8 = 5.6　　N 4 = 1.77250　ν 4 = 49.6
R 9 = -13.46　　D 9 = Variable
R10 = -16.90　　D10 = 1.4　　N 5 = 1.60729　ν 5 = 49.2
R11 = -116.03

| Variable | Focal Length | | |
|---|---|---|---|
| Separation | 24.50 | 37.70 | 58.02 |
| D 2 | 8.61 | 13.49 | 0.80 |
| D 4 | 1.44 | 4.47 | 5.24 |
| D 7 | 0.80 | 3.50 | 5.98 |
| D 9 | 13.33 | 0.63 | 1.24 |

Aspheric Coefficient

| R6 | K = 6.135 | A = 0 | B = −3.311 × 10⁻⁵ | C = −9.547 × 10⁻⁷ | D = −6.930 × 10⁻⁹ |
| R9 | K = −2.592 | A = 0 | B = −1.308 × 10⁻⁴ | C = 3.294 × 10⁻⁷ | D = −1.223 × 10⁻⁹ |
| R10 | K = 2.602 × 10⁻¹ | A = 0 | B = −9.223 × 10⁻⁶ | C = 2.078 × 10⁻⁷ | D = −5.088 × 10⁻¹⁰ |

NUMERICAL EXAMPLE 39 f = 28.79–101.62　　Fno = 4.33–9.06　　2Ω = 73.8°–24.0°

| | | | |
|---|---|---|---|
| R 1 = 46.92 | D 1 = 2.4 | N 1 = 1.84665 | ν 1 = 23.8 |
| R 2 = 696.28 | D 2 = 1.2 | | |
| R 3 = −47.73 | D 3 = 1.2 | N 2 = 1.67790 | ν 2 = 54.9 |
| R 4 = 20.89 | D 4 = Variable | | |
| R 5 = 15.63 | D 5 = 1.8 | N 3 = 1.80609 | ν 3 = 41.0 |
| R 6 = 17.84 | D 6 = 3.5 | N 4 = 1.58913 | ν 4 = 61.2 |
| R 7 = −18.10 | D 7 = 1.0 | N 5 = 1.84665 | ν 5 = 23.8 |
| R 8 = −35.34 | D 8 = Variable | | |
| R 9 = (Stop) | D 9 = 2.0 | | |
| R10 = −9.80 | D10 = 1.2 | N 6 = 1.80518 | ν 2 = 25.4 |
| R11 = −116.90 | D11 = Variable | | |
| R12 = 176.03 | D12 = 4.9 | N 7 = 1.73077 | ν 3 = 40.6 |
| R13 = −14.46 | D13 = Variable | | |
| R14 = −74.45 | D14 = 1.2 | N 8 = 1.77249 | ν 4 = 49.6 |
| R15 = 45.43 | D15 = 2.53 | | |
| R16 = 58.77 | D16 = 2.5 | N 9 = 1.69894 | ν 4 = 30.1 |
| R17 = 215.43 | D17 = 3.6 | | |
| R18 = −30.22 | D18 = 1.5 | N10 = 1.74319 | ν 4 = 49.3 |
| R19 = 698.70 | | | |

| Variable | Focal Length | | |
|---|---|---|---|
| Separation | 28.79 | 54.09 | 101.62 |
| D 4 | 9.50 | 7.39 | 1.23 |
| D 8 | 3.14 | 5.68 | 7.07 |
| D11 | 2.89 | 4.94 | 6.92 |
| D13 | 7.80 | 1.85 | 1.05 |

Aspheric Coefficient

R4
K = 4.532 × 10⁻¹　A = 0　B = −1.965 × 10⁻⁵　C = 6.603 × 10⁻⁹
D = −6.817 × 10⁻¹⁰
R10
K = 4.209　A = 0　B = −5.143 × 10⁻⁵　C = 2.654 × 10⁻⁸
D = −8.482 × 10⁻⁹
R13
K = −2.834　A = 0　B = −8.895 × 10⁻⁵　C = 2.645 × 10⁻⁷
D = −6.889 × 10⁻¹⁰

NUMERICAL EXAMPLE 40 f = 28.87–103.36　　Fno = 4.33–9.10　　2Ω = 73.7°–23.6°

| | | | |
|---|---|---|---|
| R 1 = −76.34 | D 1 = 1.1 | N 1 = 1.77249 | ν 1 = 49.6 |
| R 2 = 20.23 | D 2 = 1.06 | | |
| R 3 = 26.80 | D 3 = 2.2 | N 2 = 1.84665 | ν 2 = 23.8 |
| R 4 = 61.92 | D 4 = Variable | | |
| R 5 = 14.89 | D 5 = 1.8 | N 3 = 1.80609 | ν 3 = 41.0 |
| R 6 = 17.27 | D 6 = 4.1 | N 4 = 1.58913 | ν 4 = 61.2 |
| R 7 = −20.19 | D 7 = 1.0 | N 5 = 1.84665 | ν 5 = 23.8 |
| R 8 = −39.85 | D 8 = Variable | | |
| R 9 = (Stop) | D 9 = 2.0 | | |
| R10 = −19.62 | D10 = 1.2 | N 6 = 1.80518 | ν 2 = 25.4 |
| R11 = −75.74 | D11 = Variable | | |
| R12 = ∞ | D12 = 4.3 | N 7 = 1.73077 | ν 3 = 40.6 |
| R13 = −14.99 | D13 = Variable | | |
| R14 = −55.87 | D14 = 1.2 | N 8 = 1.77249 | ν 4 = 49.6 |
| R15 = 39.08 | D15 = 2.29 | | |
| R16 = 37.64 | D16 = 3.0 | N 9 = 1.69894 | ν 4 = 30.1 |
| R17 = 501.91 | D17 = 2.55 | | |
| R18 = −38.05 | D18 = 1.5 | N10 = 1.77249 | ν 4 = 49.6 |
| R19 = 76.42 | | | |

| Variable | Focal Length | | |
|---|---|---|---|
| Separation | 28.87 | 54.63 | 103.36 |
| D 4 | 8.30 | 4.73 | 1.18 |
| D 8 | 4.08 | 5.97 | 7.36 |
| D11 | 2.08 | 4.09 | 5.36 |
| D13 | 7.62 | 3.04 | 1.04 |

Aspheric Coefficient

R1
K = 3.590　A = 0　B = 2.794 × 10⁻⁶　C = −3.319 × 10⁻⁸
D = 2.792 × 10⁻¹¹
R10
K = 3.662　A = 0　B = −8.666 × 10⁻⁶　C = −4.160 × 10⁻⁷
D = −1.636 × 10⁻⁸
R13
K = −2.779　A = 0　B = −9.948 × 10⁻⁵　C = 1.987 × 10⁻⁷
D = −9.509 × 10⁻¹⁰

TABLE 6

| | Numerical Examples | | | | | | | |
|---|---|---|---|---|---|---|---|---|
| Conditions | 33 | 34 | 35 | 36 | 37 | 38 | 39 | 40 |
| \|1/β 3W\| | 0.07 | 0.23 | 0.37 | 0.05 | 0.20 | 0.34 | 0.05 | 0.16 |
| \|1/β 3T\| | 0.06 | 0.36 | 0.24 | 0.17 | 0.22 | 0.43 | 0.25 | 0.05 |
| $\frac{f2}{\sqrt{fW \cdot ft}}$ | 0.56 | 0.53 | 0.55 | 0.49 | 0.51 | 0.56 | 0.39 | 0.37 |
| $\frac{f4}{\sqrt{fW \cdot ft}}$ | 0.37 | 0.45 | 0.40 | 0.41 | 0.43 | 0.44 | 0.34 | 0.38 |
| $\frac{f_{234W}}{fW}$ | 0.74 | 0.77 | 0.74 | 0.75 | 0.74 | 0.77 | 0.68 | 0.69 |
| $\left\|\frac{fW^2}{f1 \cdot fT}\right\|$ | 0.33 | 0.23 | 0.15 | 0.10 | 0.21 | 0.25 | 0.23 | 0.24 |
| $\left\|\frac{fW^2}{f5 \cdot fT}\right\|$ | 0.33 | 0.27 | 0.30 | 0.34 | 0.29 | 0.32 | 0.39 | 0.41 |

Another embodiment in which further improvements are made is described by reference to FIG. 90 through FIGS. 113(A) to 113(C).

This zoom lens has a first lens unit of negative refractive power, a second lens unit of positive refractive power, a third lens unit of negative refractive power, a fourth lens unit of positive refractive power and a fifth lens unit of negative refractive power arranged in this order from the object side, being characterized in that, letting the separation for the wide angle end between the i-th and (i+1)st lens units be denoted by DiW and the separation for the telephoto end between the i-th and (i+1)st lens units by DiT, the following conditions are satisfied:

$D1T-D1W<0$ $0<D2T-D2W$ $D3T-D3W<0$ $D4T-D4W<0$

FIG. 90 through FIG. 100 are longitudinal section views of numerical examples 41 to 51 of zoom lenses of the invention respectively. FIGS. 101(A) to 101(C) through FIGS. 111(A) to 111(C) are graphic representations of the numerical examples 41 to 51. Of the aberration graphs, the ones whose figure numbers are suffixed (A) are in the wide angle end, the ones (B) in an intermediate position and the ones (C) in the telephoto end.

In the drawings, reference character L1 denotes the first lens unit of negative refractive power, reference character L2 denotes the second lens unit of positive refractive power, reference character L3 denotes the third lens unit of negative refractive power, reference character L4 denotes the fourth lens unit of positive refractive power and reference character L5 denotes the fifth lens unit of negative refractive power. SP stands for a stop and IP for an image plane. The arrows indicate the direction in which these lens units axially move forward when zooming from the wide angle end to the telephoto end.

In the present embodiment, when zooming from the wide angle end to the telephoto end, all the lens units move in such relation that, as hinted by the before-described inequalities, the separation between the first and second lens units decreases, the separation between the second and third lens units increases, the separation between the third and fourth lens units decreases and the separation between the fourth and fifth lens units decreases. This assures minimization of the bulk and size of the entire lens system despite the hold of a predetermined zoom ratio, while still permitting high optical performance to be obtained throughout the entire zooming range.

In general, increasing of the refractive powers of some lens units leads to strengthening the asymmetric property of the entire lens system, which causes many aberrations to increase largely. This is valid even when the maximum field angle increases. For this reason, it becomes difficult to obtain good optical performance in such a manner that the bulk and size of the entire lens system are minimized.

On this account, in the present embodiment, as shown in FIGS. 90 through 100, for the wide angle end, the first lens unit of negative refractive power is followed after a somewhat long distance by the second, third and fourth lens units, these three lens units constituting a group of positive refractive power (hereinafter called the "M" group), thus forming a configuration of the retrofocus type. After another somewhat long distance therefrom, the fifth lens unit whose refractive power is negative then follows. The stop SP is positioned in a space between the third and fourth lens units.

With this, when in the wide angle end, the first to the fifth lens units are considered to form, as a whole, a complete zoom lens comprising negative, positive and negative components. Moreover, with respect to the stop SP, an almost symmetric configuration takes place. Despite the strengthened refractive power of the M group and the widened maximum field angle, therefore, good correction of all aberrations can be done with the limitation of the size to a minimum. Particularly the negative distortion the first lens unit produces at the widened maximum field angle is well corrected by the fifth unit. Since the first lens unit of negative refractive power and the M group of positive refractive power are arranged in spaced relation by the appreciably long distance, because they takes the form of the retrofocus type, another advantage is produced that it is easy to secure the back focal distance which constitutes a problem for widening the maximum field angle.

For the telephoto end, on the other hand, as shown in FIGS. 90 through 100, the separation between the first and second lens units is made shorter than that for the wide angle end. Another feature is that the overall refractive power of the first and second lens units is made positive.

Still another feature is that the separation between the second and third lens units is made wider than that for the wide angle end so that the overall refractive power of the third, fourth and fifth lens units becomes negative. The lens system is thus made as a whole to form the telephoto type. By this, the aberrations are well corrected for high optical performance in such a manner that the total length of the entire system is shortened and that the F-number is kept at a fast speed.

Next explanation is given to the variation of the overall refractive power of the third, fourth and fifth lens units. In the general case of the two components, or in the 2-component zoom lens, letting the refractive powers of the first and second components be denoted by $\phi1$ and $\phi2$ respectively, and the interval between the principal points of the first and second lens components by "e", the refractive power $\phi12$ of the entire system is expressed by the following equation:

$$\phi12=\phi1+\phi2-e\cdot\phi1\cdot\phi2$$

In here, if the refractive power $\phi1$ and the refractive power $\phi2$ are of opposite sign, what needs to strengthen the negative refractive power $\phi12$ is only make small the principal point interval "e".

Since, in the present embodiment, the third lens unit is negative in refractive power, the fourth lens unit is positive and the fifth lens unit is negative, these lens units are made to move to effect zooming in such relation that their separations are shorter when in the telephoto end than when in the wide angle end. Hence, for the telephoto end, the entire lens system is made to be the telephoto type.

The above-described features or conditions suffice for achievement of the zoom lens of the present embodiment. To further improve the stability of aberration correction throughout the entire zooming range for higher optical performance, however, it is preferred to satisfy at least one of the following features or conditions:

(i) Letting the focal length of the i-th lens unit be denoted by fi, the shortest and longest focal lengths of the entire system by fW and fT respectively, and the back focal distances for the wide angle and telephoto ends by bfW and bfT respectively, $$0.5<(fW\cdot(bfT-f5))/(fT\cdot(bfW-f5))<0.95 \qquad (54)$$

is satisfied.

The inequalities of condition (54) have an aim to correct all aberrations in good balance at the increased zoom ratio. When the lower limit of the condition (54) is exceeded, it becomes difficult to achieve the much increase of the zoom ratio, while still maintaining minimization of the size of the entire lens system to be achieved. Particularly the diameter of the fifth lens unit is caused to increase objectionably. When the upper limit of the condition (54) is exceeded, the total zooming movement of the fifth lens unit increases to increase the Petzval sum in the negative direction. Therefore, over-correction of field curvature results. This is undesirable.

It is to be noted that, in the present embodiment, from the standpoint of aberration correction, it is more preferred to alter the condition (54) as follows:

$$0.6<(fW\cdot(bfT-f5))/(fT\cdot(bfW-f5))<0.9 \qquad (54a)$$

(ii) Letting the focal length of the i-th lens unit be denoted by fi and the shortest focal length of the entire system by fW, $$0.75 < |f1|/fW < 2.2 \quad (55)$$

$$0.48 < f2/fW < 1.3 \quad (56)$$

$$0.41 < |f5|/fW < 1.3 \quad (57)$$

are satisfied.

The inequalities of condition (55) are concerned with the negative refractive power of the first lens unit and have an aim chiefly to correct distortion for the wide angle end and spherical aberration for the telephoto end in good balance. When the upper limit of condition (55) is exceeded, the diameter of the front lens members comes to increase. When the lower limit of the condition (55) is exceeded, negative distortion increased in the wide angle region and overcorrection of spherical aberration results in the telephoto region. So, it should be avoided.

The inequalities of condition (56) are concerned with the positive refractive power of the second lens unit and have an aim chiefly to well correct spherical aberration. When the upper limit of the condition (56) is exceeded, it becomes difficult to form the entire system as a telephoto type in the telephoto region and also to secure the hold of the F-number at the fast speed. When the lower limit of the condition (56) is exceeded, it becomes difficult to well correct spherical aberration in the telephoto region well.

The inequalities of condition (57) are concerned with the negative refractive power of the fifth lens unit and have an aim chiefly to simultaneously fulfill the requirement of obtaining a predetermined value of the zoom ratio and of minimizing the size of the entire lens system with production of an advantage. When the upper limit of the condition (57) is exceeded, the total zooming movement of the fifth lens unit increases to increase the difficulty of achieving the much increase of the zoom ratio with the limitation of the size of the entire system to a minimum. When the lower limit of the condition (57) is exceeded, positive distortion increases in the wide angle region objectionably.

It is to be noted that, in the present embodiment, from the standpoint of aberration correction, it is more preferred to alter the conditions (55) to (57) as follows:

$$0.9 < |f1|/fW < 2 \quad (55a)$$

$$0.58 < f2/fW < 1 \quad (56a)$$

$$0.49 < |f5|/fW < 1 \quad (57a)$$

(iii) Taking the moving direction from the image side to the object side as positive and letting the movement of the i-th lens unit be denoted by Mi, $$0 < M1 \quad (58)$$

$$0 < M3 \quad (59)$$

are satisfied.

In application of the zoom lens to the camera using the external finder, it occurs in the general case that when zoomed to the wide angle end, the lens barrel vignettes the field of view of the finder. To avoid this, limitations must be laid on the finder arrangement and the layout of the camera.

To solve this problem, in the present embodiment, the total length of the entire system becomes as short in the wide angle region of the zooming range as possible.

The inequality of condition (58) is concerned with the zooming movement of the first lens unit and has an aim to shorten the total length of the entire system in the wide angle region. When the condition (58) is violated, it becomes difficult to assure shortening of the total length of the entire system in the wide angle region.

The inequality of condition (59) is concerned with the zooming movement of the third lens unit and has an aim chiefly to reduce the total zooming movements of the fourth lens unit that follows and the fifth lens unit, for the minimization of the size of the entire lens system is achieved. When the condition (59) is violated, some wide room has to be made for the separations for the wide angle end between the third and fourth lens units and between the fourth and fifth lens units. As a result, the diameter of the fifth lens unit increases objectionably.

(iv) The second and fourth lens units each have a cemented lens.

Figure 112A:
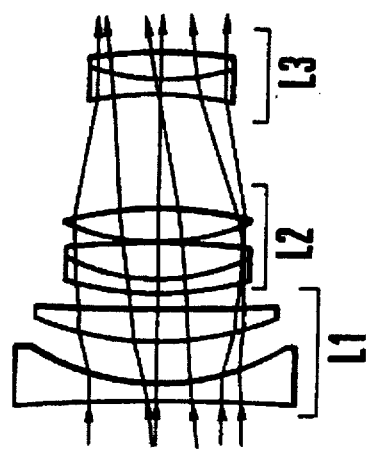
FIGS. 112(A), 112(B) and 112(C) are block diagrams of part of a zoom lens of the invention with the optical paths shown.
Figure 112B:
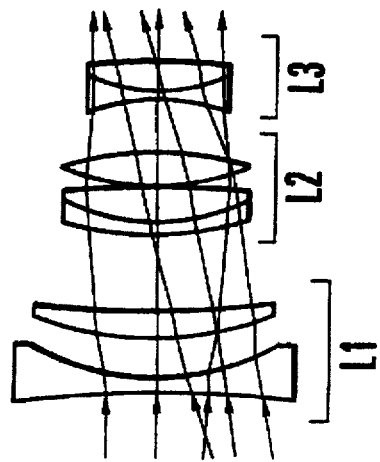
Figure 112C:
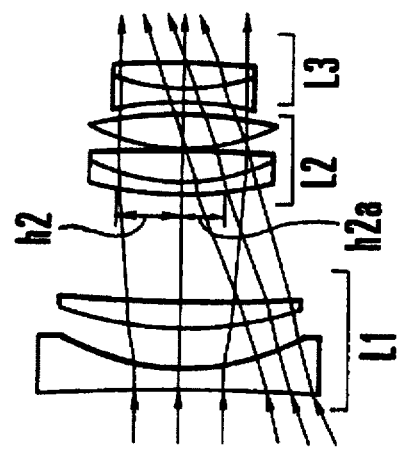

For the zoom lens of the present embodiment, as shown in FIGS. 112(A) to 112(C), the marginal ray of an axial light beam that determines the F-number (or the Fno ray) and the principal ray of an off-axial light beam enter the second lens unit L2 at relatively high heights $h_2$ and $h_{2a}$ respectively.

Figure 113C:
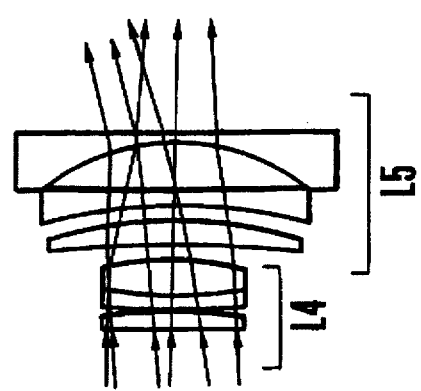
FIGS. 113(A), 113(B) and 113(C) are block diagrams of part of a zoom lens of the invention with the optical paths shown.
Figure 113B:
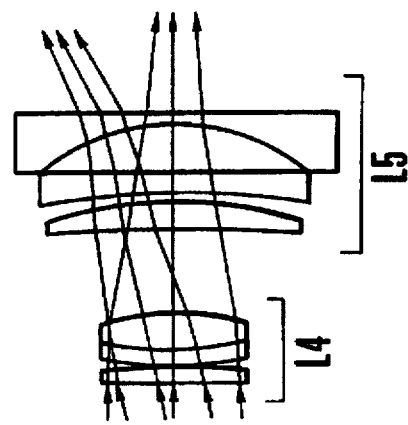
Figure 113A:
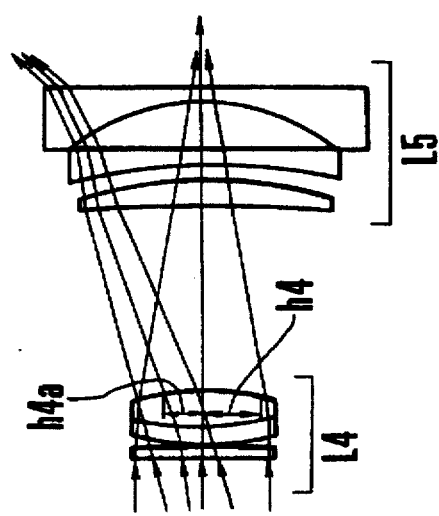

From this reason, in the present embodiment, a cemented lens is used in the second lens unit so that the second lens unit is corrected for longitudinal and lateral chromatic aberrations in itself, thus lessening the variation of chromatic aberrations with zooming. This is valid about the fourth lens unit as shown in FIGS. 113(A) to 113(C). Because the heights $h_4$ and $h_{4a}$ of incidence of the Fno and principal rays are high, another cemented lens is used in the fourth lens unit to thereby lessen the variation of chromatic aberrations with zooming. Notice that FIGS. 112(A) and 113(A) are in the wide angle end, FIGS. 112(B) and 113(B) in the intermediate position and FIGS. 112(C) and 113(C) in the telephoto end.

(v) Concerning the movements of the lens units during zooming, the present embodiment may be modified in such a way that two or more of the lens units, for example, the first and third lens units, or the first and fourth lens units, or the second and fourth lens units, move in unison. If so, an advantage is produced when the operating mechanism is simplified in structure.

(vi) During zooming, the stop may be moved either in differential relation to the lens units, or in unison with one of the lens units. It is thus made possible to keep the stop in the neighborhood of the entrance pupil that moves axially when zooming, thereby giving an advantage of preventing occurrence of variation of field curvature when the stop has a small aperture.

(vii) For focusing purposes, any one or ones of the lens units may be used provided the focusing lens unit changes its lateral magnification across unity at a station during zooming. If the first lens unit has a somewhat strong refractive power, it is better to employ the method of moving the first lens unit forward, because the focusing amount for the equivalent object distance remains constant throughout the entire zooming range, for a simplification of the operating mechanism can be expected.

(viii) In the present embodiment, to maintain good stability of optical performance over the entire area of the image frame throughout the entire zooming range, it is better to construct the first lens unit with inclusion of at least one negative lens having a concave surface facing the image side, the third lens unit with inclusion of at least one negative lens having a concave surface facing the object side, the fourth lens unit with inclusion of a positive lens whose rear surface has a strong refracting power and is convex toward the image side, and the fifth lens unit with inclusion of at least one negative lens having a concave surface facing the object side. To further improve the optical performance, it is preferred to introduce an aspheric surface or surfaces into one or more of the lens units.

Next, numerical examples 41 to 51 of the invention are shown. The values of the factors in the above-described conditions for the numerical examples 41 to 51 are also listed in a Table 7.

NUMERICAL EXAMPLE 41

| f = 29.00~100.96 | Fno = 3.12~8.20 | 2Ω = 73.5°~24.2° |
|---|---|---|
| R 1 = -297.03 | D 1 = 1.30 | N 1 = 1.77259 | ν 1 = 49.6 |
| R 2 = 29.39 | D 2 = 1.13 | | |
| R 3 = 47.46 | D 3 = 1.20 | N 2 = 1.69679 | ν 2 = 55.5 |
| R 4 = 25.11 | D 4 = 0.30 | | |
| R 5 = 25.73 | D 5 = 2.50 | N 3 = 1.80518 | ν 3 = 25.4 |
| R 6 = 53.07 | D 6 = Variable | | |
| R 7 = 26.63 | D 7 = 1.00 | N 4 = 1.84665 | ν 4 = 23.8 |
| R 8 = 15.07 | D 8 = 2.90 | N 5 = 1.48749 | ν 5 = 70.2 |
| R 9 = 128.19 | D 9 = 0.20 | | |
| R10 = 17.88 | D10 = .2.60 | N 6 = 1.60311 | ν 6 = 60.7 |
| R11 = -148.99 | D11 = Variable | | |
| R12 = -25.44 | D12 = 1.00 | N 7 = 1.71999 | ν 7 = 50.3 |
| R13 = 23.54 | D13 = 2.50 | N 8 = 1.68893 | ν 8 = 31.1 |
| R14 = -100.91 | D14 = Variable | | |
| R15 = (Stop) | D15 = 1.10 | | |
| R16 = -66.17 | D16 = 0.80 | N 9 = 1.48749 | ν 9 = 70.2 |
| R17 = 20.30 | D17 = 2.68 | N10 = 1.78589 | ν 10 = 44.2 |
| R18 = -24.52 | D18 = 0.21 | | |
| R19 = 206.69 | D19 = 4.16 | N11 = 1.48749 | ν 11 = 70.2 |
| R20 = -13.39 | D20 = 1.10 | N12 = 1.80518 | ν 12 = 25.4 |
| R21 = -44.24 | D21 = Variable | | |
| R22 = -68.32 | D22 = 2.56 | N13 = 1.84665 | ν 13 = 23.8 |
| R23 = -26.63 | D23 = 0.20 | | |
| R24 = -29.94 | D24 = 1.30 | N14 = 1.80400 | ν 14 = 46.6 |
| R25 = -281.20 | D25 = 3.20 | | |
| R26 = -22.29 | D26 = 1.50 | N15 = 1.77249 | ν 15 = 49.6 |
| R27 = 2631.38 | | | |

| Variable | Focal Length | | |
|---|---|---|---|
| Separation | 29.00 | 53.69 | 100.96 |
| D 6 | 8.50 | 4.97 | 1.04 |
| D11 | 1.80 | 5.60 | 7.89 |
| D14 | 4.80 | 2.91 | 0.78 |
| D21 | 11.84 | 4.63 | 1.20 |

Aspheric Coefficient

| R21 | K = -5.761 e+00 | A = 0 | B = 1.538 e-05 | C = 8.104 e-08 |
|---|---|---|---|---|

NUMERICAL EXAMPLE 42

| f = 29.00~100.99 | Fno = 3.52~8.20 | 2Ω = 73.5°~24.2° |
|---|---|---|
| R 1 = -237.63 | D 1 = 1.30 | N 1 = 1.80400 | ν 1 = 46.6 |
| R 2 = 33.35 | D 2 = 1.72 | | |
| R 3 = 64.78 | D 3 = 1.20 | N 2 = 1.71299 | ν 2 = 53.8 |
| R 4 = 26.36 | D 4 = 0.56 | | |
| R 5 = 28.91 | D 5 = 2.50 | N 3 = 1.80518 | ν 3 = 25.4 |
| R 6 = 72.21 | D 6 = Variable | | |
| R 7 = 37.52 | D 7 = 1.00 | N 4 = 1.80518 | ν 4 = 25.4 |
| R 8 = 17.70 | D 8 = 2.80 | N 5 = 1.51633 | ν 5 = 64.2 |
| R 9 = -502.10 | D 9 = 0.20 | | |
| R10 = 22.01 | D10 = 2.70 | N 6 = 1.60311 | ν 6 = 60.7 |
| R11 = -68.45 | D11 = Variable | | |
| R12 = -24.97 | D12 = 1.00 | N 7 = 1.71999 | ν 7 = 50.3 |
| R13 = 16.77 | D13 = 2.50 | N 8 = 1.68893 | ν 8 = 31.1 |
| R14 = -86.83 | D14 = Variable | | |
| R15 = (Stop) | D15 = 1.10 | | |
| R16 = -65.07 | D16 = 0.80 | N 9 = 1.48749 | ν 9 = 70.2 |
| R17 = 20.49 | D17 = 2.23 | N10 = 1.83400 | ν 10 = 37.2 |
| R18 = -50.90 | D18 = 0.20 | | |
| R19 = 81.08 | D19 = 1.10 | N11 = 1.84665 | ν 11 = 23.8 |
| R20 = 13.78 | D20 = 4.66 | N12 = 1.58312 | ν 12 = 59.4 |
| R21 = -30.25 | D21 = Variable | | |
| R22 = -44.80 | D22 = 3.00 | N13 = 1.84665 | ν 13 = 23.8 |
| R23 = -22.73 | D23 = 0.20 | | |
| R24 = -27.73 | D24 = 1.30 | N14 = 1.80400 | ν 14 = 46.6 |
| R25 = -118.33 | D25 = 3.80 | | |
| R26 = -21.19 | D26 = 1.50 | N15 = 1.77249 | ν 15 = 49.6 |
| R27 = -1377.12 | | | |

| Variable | Focal Length | | |
|---|---|---|---|
| Separation | 29.00 | 51.68 | 100.99 |
| D 6 | 8.61 | 5.52 | 1.29 |
| D11 | 1.80 | 6.04 | 12.38 |
| D14 | 4.16 | 3.18 | 0.81 |
| D21 | 13.36 | 6.40 | 1.23 |

Aspheric Coefficient

| R21 | K = -1.196 e+02 | A = 0 | B = 2.531 e-05 | C = 8.288 e-08 |
|---|---|---|---|---|

NUMERICAL EXAMPLE 43

| f = 29.00~101.37 | Fno = 3.42~8.20 | 2Ω = 73.5°~24.1° |
|---|---|---|
| R 1 = -114.83 | D 1 = 1.30 | N 1 = 1.77249 | ν 1 = 49.6 |
| R 2 = 21.12 | D 2 = 3.30 | | |
| R 3 = 32.47 | D 3 = 2.50 | N 2 = 1.80518 | ν 2 = 25.4 |
| R 4 = 113.62 | D 4 = Variable | | |
| R 5 = 35.32 | D 5 = 1.00 | N 3 = 1.80518 | ν 3 = 25.4 |
| R 6 = 17.88 | D 6 = 3.10 | N 4 = 1.48749 | ν 4 = 70.2 |
| R 7 = -697.99 | D 7 = 0.20 | | |
| R 8 = 22.07 | D 8 = 3.50 | N 5 = 1.48749 | ν 5 = 70.2 |
| R 9 = -39 47 | D 9 = Variable | | |
| R10 = -23.11 | D10 = 1,00 | N 6 = 1.71999 | ν 6 = 50.3 |
| R11 = 17.00 | D11 = 2.50 | N 7 = 1.68893 | ν 7 = 31.1 |
| R12 = -119.13 | D12 = Variable | | |
| R13 = (Stop) | D13 = 1.1o | | |
| R14 = 569.24 | D14 = 1.50 | N 8 = 1.69894 | ν 8 = 30.1 |
| R15 = -65.51 | D15 = 0.12 | | |
| R16 = 90.69 | D16 = 1.10 | N 9 = 1.84665 | ν 9 = 23.8 |
| R17 = 22.61 | D17 = 3.70 | N10 = 1.58312 | ν 10 = 594 |
| R18 = -22.21 | D18 = Variable | | |
| R19 = -135.40 | D19 = 2.20 | N11 = 1.80518 | ν 11 = 25.4 |
| R20 = -46.00 | D20 = 1.58 | | |
| R21 = -70.09 | D21 = 1.80 | N12 = 1.77249 | ν 12 = 49.6 |
| R22 = 337.46 | D22 = 4.00 | | |
| R23 = -20.42 | D23 = 1.50 | N13 = 1.77249 | ν 13 = 49.6 |
| R24 = 802.78 | | | |

| Variable | Focal Length | | |
|---|---|---|---|
| Separation | 29.00 | 52.82 | 101.37 |
| D 4 | 9.30 | 5.88 | 1.74 |
| D 9 | 1.80 | 5.56 | 10.90 |
| D12 | 2.98 | 2.45 | 0.80 |
| D18 | 15.38 | 7.04 | 0.97 |

Aspheric Coefficient

| R18 | K = -3.871 e+01 | A = 0 | B = 1.348 e-05 | C = 3.546 e-08 |
|---|---|---|---|---|

NUMERICAL EXAMPLE 44

| f = 29.00~100.99 | Fno = 3.13~8.20 | 2Ω = 73.5°~24.2° |
|---|---|---|
| R 1 = -92.61 | D 1 = 1.30 | N 1 = 1.77249 | ν 1 = 49.6 |
| R 2 = 22.41 | D 2 = 3.19 | | |
| R 3 = 28.98 | D 3 = 2.50 | N 2 = 1.80518 | ν 2 = 25.4 |
| R 4 = 82.62 | D 4 = Variable | | |

-continued

| | | | |
|---|---|---|---|
| R 5 = 42.90 | D 5 = 1.00 | N 3 = 1.80518 | ν 3 = 25.4 |
| R 6 = 17.61 | D 6 = 3.10 | N 4 = 1.48749 | ν 4 = 70.2 |
| R 7 = −224.38 | D 7 = 0.20 | | |
| R 8 = 21.69 | D 8 = 3.00 | N 5 = 1.58312 | ν 5 = 59.4 |
| R 9 = −60.66 | D 9 = Variable | | |
| R10 = −22.32 | D10 = 1.00 | N 6 = 1.71999 | ν 6 = 50.3 |
| R11 = 27.66 | D11 = 2.50 | N 7 = 1.68893 | ν 7 = 31.1 |
| R12 = −54.13 | D12 = Variable | | |
| R13 = (Stop) | D13 = 1.10 | | |
| R14 = 308.85 | D14 = 1.80 | N 8 = 1.80518 | ν 8 = 25.4 |
| R15 = −50.98 | D15 = 0.12 | | |
| R16 = 91.64 | D16 = 1.10 | N 9 = 1.84665 | ν 9 = 23.8 |
| R17 = 20.47 | D17 = 3.90 | N10 = 1.48749 | ν 10 = 70.2 |
| R18 = −19.97 | D18 = Variable | | |
| R19 = −69.49 | D19 = 2.20 | N11 = 1.84665 | ν 11 = 23.8 |
| R20 = −33.75 | D20 = 2.27 | | |
| R21 = −43.23 | D21 = 1.50 | N12 = 1.77249 | ν 12 = 49.6 |
| R22 = 473.67 | D22 = 4.00 | | |
| R23 = −16.98 | D23 = 1.50 | N13 = 1.77249 | ν 13 = 49.6 |
| R24 = −248.23 | | | |

| Variable | Focal Length | | |
|---|---|---|---|
| Separation | 29.00 | 52.34 | 100.99 |
| D 4 | 9.30 | 5.85 | 0.86 |
| D 9 | 1.80 | 4.90 | 8.02 |
| D2 | 3.21 | 2.26 | 0.63 |
| D18 | 10.43 | 4.50 | 1.09 |

Aspheric Coefficient

| | | | | |
|---|---|---|---|---|
| R15 | K = −1.105 e+01 | A = 0 | B = 8.344 e−06 | C = 3.774 e−08 |

NUMERICAL EXAMPLE 45 f = 29.00~101.00  Fno = 3.17~8.20  2Ω = 73.5°~24.2°

| | | | |
|---|---|---|---|
| R 1 = −157.56 | D 1 = 1.30 | N 1 = 1.77249 | ν 1 = 49.6 |
| R 2 = 19.49 | D 2 = 2.61 | | |
| R 3 = 23.29 | D 3 = 2.90 | N 2 = 1.80518 | ν 2 = 25.4 |
| R 4 = 63.37 | D 4 = Variable | | |
| R 5 = 34.06 | D 5 = 1.00 | N 3 = 1.80518 | ν 3 = 25.4 |
| R 6 = 15.39 | D 6 = 3.30 | N 4 = 1.48749 | ν 4 = 70.2 |
| R 7 = −769.72 | D 7 = 0.20 | | |
| R 8 = 19.03 | D 8 = 3.20 | N 5 = 1.48749 | ν 5 = 70.2 |
| R 9 = −49.38 | D 9 = Variable | | |
| R10 = −22.32 | D10 = 1.00 | N 6 = 1.71999 | ν 6 = 50.3 |

-continued

| | | | |
|---|---|---|---|
| R11 = 21.42 | D11 = 2.10 | N 7 = 1.68893 | ν 7 = 31.1 |
| R12 = −65.35 | D12 = Variable | | |
| R13 = (Stop) | D13 = 1.50 | | |
| R14 = 67.74 | D14 = 1.10 | N 8 = 1.84665 | ν 8 = 23.8 |
| R15 = 29.22 | D15 = 3.90 | N 9 = 1.58312 | ν 9 = 59.4 |
| R16 = −19.25 | D16 = Variable | | |
| R17 = −57.44 | D17 = 2.20 | N10 = 1.80518 | ν 10 = 25.4 |
| R18 = −33.31 | D18 = 5.04 | | |
| R19 = −16.26 | D19 = 1.50 | N11 = 1.77249 | ν 11 = 49.6 |
| R20 = 131.42 | | | |

-continued

| Variable | Focal Length | | |
|---|---|---|---|
| Separation | 29.00 | 53.69 | 101.00 |
| D 4 | 10.18 | 5.77 | 0.92 |
| D 9 | 2.20 | 5.33 | 8.26 |
| D12 | 2.25 | 2.11 | 0.72 |
| D16 | 13.60 | 5.77 | 1.20 |

Aspheric Coefficient

| | | | | |
|---|---|---|---|---|
| R16 | K = 0.0 | A = 0 | B = 3.123 e−05 | C = 4.838 e−08 |
| R20 | K = 0.0 | A = 0 | B = −1.536 e−05 | C = 1.069 e−08 |

NUMERICAL EXAMPLE 46 f = 29.00~101.00  Fno = 3.26~8.20  2Ω = 73.5°~24.2°

| | | | |
|---|---|---|---|
| R 1 = −347.24 | D 1 = 1.30 | N 1 = 1.77249 | ν 1 = 49.6 |
| R 2 = 17.69 | D 2 = 3.12 | | |
| R 3 = 21.95 | D 3 = 2.70 | N 2 = 1.80518 | ν 2 = 25.4 |
| R 4 = 45.05 | D 4 = Variable | | |
| R 5 = 17.25 | D 5 = 1.00 | N 3 = 1.80518 | ν 3 = 25.4 |
| R 6 = 11.74 | D 6 = 5.70 | N 4 = 1.48749 | ν 4 = 70.2 |
| R 7 = −26.86 | D 7 = Variable | | |
| R 8 = −18.37 | D 8 = 1.00 | N 5 = 1.71999 | ν 5 = 50.3 |
| R 9 = 55.71 | D 9 = 2.00 | N 6 = 1.68893 | ν 6 = 31.1 |
| R10 = −36.03 | D10 = Variable | | |
| R11 = (Stop) | D11 = 1.50 | | |
| R12 = 74.83 | D12 = 1.10 | N 7 = 1.84665 | ν 7 = 23.8 |
| R13 = 27.50 | D13 = 3.90 | N 8 = 1.58312 | ν 8 = 59.4 |
| R14 = −18.57 | D14 = Variable | | |
| R15 = −50.63 | D15 = 2.20 | N 9 = 1.84665 | ν 9 = 23.8 |
| R16 = −30.58 | D16 = 5.07 | | |
| R17 = −21.09 | D17 = 1.50 | N10 = 1.77249 | ν 10 = 49.6 |
| R18 = 64.43 | | | |

| Variable | Focal Length | | |
|---|---|---|---|
| Separation | 29.00 | 50.86 | 101.00 |
| D 4 | 8.18 | 5.77 | 1.13 |
| D 7 | 2.20 | 5.20 | 12.29 |
| D10 | 3.31 | 2.79 | 0.52 |
| D14 | 15.48 | 6.89 | 1.01 |

Aspheric Coefficient

| | | | | | |
|---|---|---|---|---|---|
| R 1 | K = 0.0 | A = 0 | B = 2.618 e−09 | C = −1.654 e−08 | D = 1.046 e−11 |
| R 5 | K = 0.0 | A = 0 | B = −8.775 e−06 | C = 2.009 e−08 | |
| R14 | K = 0.0 | A = 0 | B = 2.651 e−05 | C = 2.720 e−08 | |
| R18 | K = 0.0 | A = 0 | B = −1.017 e−05 | C = 6.138 e−09 | D = 2.720 e−11 |

NUMERICAL EXAMPLE 47 f = 29.00~100.99  Fno = 2.91~8.20  2ω = 73.5°~24.2°

| | | | |
|---|---|---|---|
| R 1 = −68.08 | D 1 = 1.30 | N 1 = 1.77249 | ν 1 = 49.6 |
| R 2 = 21.38 | D 2 = 1.52 | | |
| R 3 = 27.45 | D 3 = 2.50 | N 2 = 1.80518 | ν 2 = 25.4 |
| R 4 = 72.60 | D 4 = Variable | | |
| R 5 = 43.77 | D 5 = 1.00 | N 3 = 1.80518 | ν 3 = 25.4 |
| R 6 = 18.88 | D 6 = 3.10 | N 4 = 1.48749 | ν 4 = 70.2 |
| R 7 = −100.47 | D 7 = 0.20 | | |
| R 8 = 21.37 | D 8 = 3.00 | N 5 = 1.58312 | ν 5 = 59.4 |
| R 9 = −62.73 | D 9 = Variable | | |
| R10 = −25.60 | D10 = 1.00 | N 6 = 1.71999 | ν 6 = 50.3 |

-continued

| | | | |
|---|---|---|---|
| R11 = 38.33 | D11 = 2.50 | N 7 = 1.68893 | ν 7 = 31.1 |
| R12 = −56.02 | D12 = Variable | | |
| R13 = (Stop) | D13 = 1.10 | | |
| R14 = 405.22 | D14 = 1.80 | N 8 = 1.80518 | ν 8 = 25.4 |
| R15 = −49.94 | D15 = 0.12 | | |
| R16 = 130.24 | D16 = 1.10 | N 9 = 1.84665 | ν 9 = 23.8 |
| R17 = 22.52 | D17 = 3.90 | N10 = 1.48749 | ν 10 = 70.2 |
| R18 = −19.77 | D18 = Variable | | |
| R19 = −77.79 | D19 = 2.20 | N11 = 1.84665 | ν 11 = 23.8 |
| R20 = −31.11 | D20 = 1.22 | | |
| R21 = −50.83 | D21 = 1.50 | N12 = 1.77249 | ν 12 = 49.6 |
| R22 = 155.32 | D22 = 4.00 | | |
| R23 = −18.60 | D23 = 1.50 | N13 = 1.77249 | ν 13 = 49.6 |
| R24 = 146.90 | | | |

| Variable | Focal Length | | |
|---|---|---|---|
| Separation | 29.00 | 52.54 | 100.99 |
| D 4 | 8.75 | 6.46 | 3.73 |
| D 9 | 1.80 | 4.09 | 6.83 |
| D12 | 5.02 | 2.73 | 0.00 |
| D18 | 9.77 | 4.27 | 0.99 |

Aspheric Coefficient

| | | | | |
|---|---|---|---|---|
| R15 | K = −2.833 e−01 | A = 0 | B = −1.93 e−06 | C = 1.313 e−07 |

NUMERICAL EXAMPLE 48

| f = 29.00~100.96 | Fno = 3.34~8.20 | 2ω = 73.5°~24.2° | |
|---|---|---|---|
| R 1 = −87.20 | D 1 = 1.30 | N 1 = 1.77249 | ν 1 = 49.6 |
| R 2 = 22.28 | D 2 = 2.40 | | |
| R 3 = 29.29 | D 3 = 2.50 | N 2 = 1.80518 | ν 2 = 25.4 |
| R 4 = 85.63 | D 4 = Variable | | |
| R 5 = 42.51 | D 5 = 1.00 | N 3 = 1.80518 | ν 3 = 25.4 |
| R 6 = 17.86 | D 6 = 3.10 | N 4 = 1.48749 | ν 4 = 70.2 |
| R 7 = −199.28 | D 7 = 0.20 | | |
| R 8 = 21.73 | D 8 = 3.00 | N 5 = 1.58312 | ν 5 = 59.4 |
| R 9 = −55.14 | D 9 = Variable | | |
| R10 = −21.86 | D10 = 1.00 | N 6 = 1.71999 | ν 6 = 50.3 |
| R11 = 23.02 | D11 = 2.50 | N 7 = 1.68893 | ν 7 = 31.1 |
| R12 = −62.92 | D12 = Variable | | |
| R13 = (Stop) | D13 = 1.10 | | |
| R14 = 231.67 | D14 = 1.80 | N 8 = 1.80518 | ν 8 = 25.4 |
| R15 = −49.50 | D15 = 0.12 | | |
| R16 = 88.82 | D16 = 1.10 | N 9 = 1.84665 | ν 9 = 23.8 |
| R17 = 19.67 | D17 = 3.90 | N10 = 1.48749 | ν 10 = 70.2 |
| R18 = −19.84 | D18 = Variable | | |
| R19 = −64.71 | D19 = 2.20 | N11 = 1.84665 | ν 11 = 23.8 |
| R20 = −31.72 | D20 = 1.74 | | |
| R21 = −34.44 | D21 = 1.50 | N12 = 1.77249 | ν 12 = 49.6 |
| R22 = −12902.89 | D22 = 4.20 | | |
| R23 = −16.92 | D23 = 1.50 | N13 = 1.77249 | ν 13 = 49.6 |
| R24 = −115.97 | | | |

| Variable | Focal Length | | |
|---|---|---|---|
| Separation | 29.00 | 53.46 | 100.96 |
| D 4 | 9.49 | 6.05 | 3.05 |
| D 9 | 1.80 | 5.87 | 10.42 |
| D12 | 2.54 | 1.91 | 0.36 |
| D18 | 12.49 | 5.80 | 0.90 |

Aspheric Coefficient

| | | | | |
|---|---|---|---|---|
| R15 | K = −2.062 e−01 | A = 0 | B = −4.947 e−06 | C = 9.557 e−08 |

NUMERICAL EXAMPLE 49

| f = 29.00~100.99 | Fno = 3.18~8.20 | 2ω = 73.5°~24.2° | |
|---|---|---|---|
| R 1 = −85.15 | D 1 = 1.30 | N 1 = 1.77249 | ν 1 = 49.6 |
| R 2 = 23.07 | D 2 = 2.72 | | |
| R 3 = 29.02 | D 3 = 2.50 | N 2 = 1.80518 | ν 2 = 25.4 |
| R 4 = 85.84 | D 4 = Variable | | |
| R 5 = 42.56 | D 5 = 1.00 | N 3 = 1.80518 | ν 3 = 25.4 |
| R 6 = 17.54 | D 6 = 3.10 | N 4 = 1.48749 | ν 4 = 70.2 |
| R 7 = −210.28 | D 7 = 0.20 | | |
| R 8 = 21.73 | D 8 = 3.00 | N 5 = 1.58312 | ν 5 = 59.4 |
| R 9 = −60.88 | D 9 = Variable | | |
| R10 = −22.03 | D10 = 1.00 | N 6 = 1.71999 | ν 6 = 50.3 |
| R11 = 25.73 | D11 = 2.50 | N 7 = 1.68893 | ν 7 = 31.1 |
| R12 = −55.05 | D12 = Variable | | |
| R13 = (Stop) | D13 = 1.10 | | |
| R14 = 268.33 | D14 = 1.80 | N 8 = 1.80518 | ν 8 = 25.4 |
| R15 = −50.17 | D15 = 0.12 | | |
| R16 = 94.21 | D16 = 1.10 | N 9 = 1.84665 | ν 9 = 23.g |
| R17 = 20.33 | D17 = 3.90 | N10 = 1.48749 | ν 10 = 70.2 |
| R18 = −20.09 | D18 = Variable | | |
| R19 = −66.99 | D19 = 2.20 | N11 = 1.84665 | ν 11 = 23.8 |
| R20 = −32.55 | D20 = 2.02 | | |
| R21 = −40.85 | D21 = 1.50 | N12 = 1.77249 | ν 12 = 49.6 |
| R22 = 383.87 | D22 = 4.00 | | |
| R23 = −16.57 | D23 = 1.50 | N13 = 1.77249 | ν 13 = 49.6 |
| R24 = −140.37 | | | |

| Variable | Focal Length | | |
|---|---|---|---|
| Separation | 29.00 | 53.41 | 100.99 |
| D 4 | 9.48 | 5.91 | 2.28 |
| D 9 | 1.80 | 5.37 | 9.00 |
| D12 | 2.92 | 2.15 | 0.46 |
| D18 | 11.64 | 5.17 | 0.97 |

Aspheric Coefficient

| | | | | |
|---|---|---|---|---|
| R15 | K = −1.893 e−01 | A = 0 | B = −1.146 e−06 | C = 6.913 e−08 |

NUMERICAL EXAMPLE 50

| f = 29.01~131.00 | Fno = 2.87~8.20 | 2ω = 73.4°~18.8° | |
|---|---|---|---|
| R 1 = −84.87 | D 1 = 1.30 | N 1 = 1.69679 | ν 1 = 55.5 |
| R 2 = 25.87 | D 2 = 1.20 | | |
| R.3 = 41.75 | D 3 = 2.20 | N 2 = 1.80518 | ν 2 = 25.4 |
| R 4 = 76.84 | D 4 = Variable | | |
| R 5 = 43.26 | D 5 = 1.00 | N 3 = 1.84665 | ν 3 = 23.8 |
| R 6 = 24.61 | D 6 = 3.60 | N 4 = 1.48749 | ν 4 = 70.2 |
| R 7 = −105.99 | D 7 = 0.12 | | |
| R 8 = 24.83 | D 8 = 4.50 | N 5 = 1.48749 | ν 5 = 70.2 |
| R 9 = −42.42 | D 9 = Variable | | |
| R10 = −19.62 | D10 = 0.80 | N 6 = 1.69679 | ν 6 = 55.5 |
| R11 = 20.71 | D11 = 2.50 | N 7 = 1.84665 | ν 7 = 23.8 |
| R12 = −520.66 | D12 = Variable | | |
| R13 = (Stop) | D13 = 1.10 | | |
| R14 = 51.22 | D14 = 2.60 | N 8 = 1.48749 | ν 8 = 70.2 |
| R15 = −32.83 | D15 = 0.15 | | |
| R16 = 136.53 | D16 = 0.80 | N 9 = 1.84665 | ν 9 = 23.8 |
| R17 = 17.86 | D17 = 4.00 | N10 = 1.58312 | ν 10 = 59.4 |
| R18 = −23.72 | D18 = Variable | | |
| R19 = −327.69 | D19 = 2.80 | N11 = 1.84665 | ν 11 = 23.8 |
| R20 = −36.41 | D20 = 0.30 | | |
| R21 = −54.64 | D21 = 1.20 | N12 = 1.80609 | ν 12 = 41.0 |
| R22 = 75.63 | D22 = 3.80 | | |
| R23 = −22.99 | D23 = 1.30 | N13 = 1.77249 | ν 13 = 49.6 |
| R24 = 54.69 | D24 = 2.10 | N14 = 1.84665 | ν 14 = 23.8 |
| R25 = 160.01 | | | |

-continued

| Variable | Focal Length | | |
|---|---|---|---|
| Separation | 29.01 | 62.36 | 131.00 |
| D 4 | 10.50 | 5.38 | 1.98 |
| D 9 | 2.00 | 8.53 | 15.23 |
| D12 | 3.48 | 2.75 | 1.01 |
| D18 | 13.93 | 6.13 | 1.03 |

Aspheric Coefficient

| R 3 | K = 0 | A = 0 | B = −1.522 e−06 | |
|---|---|---|---|---|
| R15 | K = −1.498 e+01 | A = 0 | B = 8.561 e−06 | C = 8.532 e−08 |

TABLE 7

| | Numerical Examples | | | | | | | | | | |
|---|---|---|---|---|---|---|---|---|---|---|---|
| Conditions | 41 | 42 | 43 | 44 | 45 | 46 | 47 | 48 | 49 | 50 | 51 |
| D1T-D1W | −7.46 | −7.32 | −7.56 | −8.64 | −9.26 | −7.05 | −5.02 | −6.44 | −7.20 | −8.52 | −8.78 |
| D2T-D2W | 6.09 | 10.58 | 9.1 | 6.22 | 6.06 | 10.9 | 5.02 | 8.62 | 7.20 | 13.23 | 5.28 |
| D3T-D3W | −4.02 | −3.35 | −2.18 | −2.58 | −1.53 | −2.79 | −5.02 | −2.18 | −2.46 | −2.47 | −2.31 |
| D4T-D4W | −10.64 | −12.13 | −14.41 | −9.34 | −12.4 | −14.47 | −8.78 | −11.59 | −10.67 | −12.9 | −9.23 |
| fW(bfT-f5)/fT(bfW-f5) | 0.77 | 0.74 | 0.76 | 0.85 | 0.77 | 0.74 | 0.85 | 0.80 | 0.81 | 0.69 | 0.79 |
| If1I/fW | 1.33 | 1.29 | 1.48 | 1.53 | 1.70 | 1.41 | 1.22 | 1.45 | 1.55 | 1.31 | 1.31 |
| f2/fW | 0.84 | 0.84 | 0.89 | 0.89 | 0.91 | 0.94 | 0.82 | 0.86 | 0.89 | 0.88 | 0.81 |
| If5I/fW | 0.85 | 0.85 | 0.84 | 0.71 | 0.84 | 0.97 | 0.68 | 0.72 | 0.71 | 0.81 | 0.69 |
| M1 | 37.35 | 37.59 | 37.81 | 35.51 | 37.12 | 42.81 | 41.59 | 37.89 | 37.10 | 53.70 | 35.19 |
| M2 | 38.72 | 34.33 | 36.27 | 37.93 | 40.31 | 39.76 | 41.59 | 35.71 | 37.10 | 49.00 | 38.69 |

Aspheric Coefficient

| R15 | K = −8.849 e−01 | A = 0 | B = −1.929 e−05 | C = 3.133 e−08 |
|---|---|---|---|---|

NUMERICAL EXAMPLE 51

| f = 24.70–90.98 | Fno = 2.98–8.20 | 2ω = 82.4°–26.8° |
|---|---|---|
| R 1 = −104.26 | D 1 = 1.30 | N 1 = 1.77249  ν 1 = 49.6 |
| R 2 = 19.96 | D 2 = 4.15 | |
| R 3 = 29.74 | D 3 = 2.50 | N 2 = 1.80518  ν 2 = 25.4 |
| R 4 = 79.44 | D 4 = Variable | |
| R 5 = 37.82 | D 5 = 1.00 | N 3 = 1.80518  ν 3 = 25.4 |
| R 6 = 17.82 | D 6 = 3.10 | N 4 = 1.48749  ν 4 = 70.2 |
| R 7 = −233.50 | D 7 = 0.20 | |
| R 8 = 20.69 | D 8 = 3.00 | N 5 = 1.58312  ν 5 = 59.4 |
| R 9 = −56.63 | D 9 = Variable | |
| R10 = −22.65 | D10 = 1.00 | N 6 = 1.71999  ν 6 = 50.3 |
| R11 = 32.13 | D11 = 2.50 | N 7 = 1.68893  ν 7 = 31.1 |
| R12 = −58.66 | D12 = | |
| R13 = (Stop) | D13 = 1.10 | |
| R14 = 308.63 | D14 = 1.80 | N 8 = 1.80518  ν 8 = 25.4 |
| R15 = −47.03 | D15 = 0.12 | |
| R16 = 105.42 | D16 = 1.10 | N 9 = 1.84665  ν 9 = 23.8 |
| R17 = 20.15 | D17 = 3.90 | N10 = 1.48749  ν 10 = 70.2 |
| R18 = −19.14 | D18 = Variable | |
| R19 = −71.00 | D19 = 2.20 | N11 = 1.80518  ν 11 = 25.4 |
| R20 = −29.06 | D20 = 0.66 | |
| R21 = −45.05 | D21 = 1.30 | N12 = 1.80609  ν 12 = 41.0 |
| R22 = 298.42 | D22 = 4.20 | |
| R23 = −15.06 | D23 = 1.50 | N13 = 1.69679  ν 13 = 55.5 |
| R24 = −716.50 | | |

| Variable | Focal Length | | |
|---|---|---|---|
| Separation | 24.70 | 46.02 | 90.98 |
| D 4 | 9.50 | 5.96 | 0.72 |
| D 9 | 1.80 | 4.47 | 7.08 |
| D12 | 2.82 | 1.94 | 0.51 |
| D18 | 10.27 | 4.11 | 1.04 |

Another embodiment of the invention in which further improvements are made is described by reference to FIGS. 114(A) and 114(B) through FIGS. 126(A) to 126(C).

This zoom lens has a first lens unit of positive refractive power, a second lens unit of negative refractive power, a third lens unit of positive refractive power, a fourth lens unit of negative refractive power, a fifth lens unit of positive refractive power and a sixth lens unit of negative refractive power arranged in this order from the object side, wherein letting the separation for the wide angle end between the i-th and j-th lens units be denoted by $D_{W(i-j)}$ and the separation for the telephoto end between the i-th and j-th lens units by $D_{T(i-j)}$, the following conditions are satisfied:

$$D_{W(2-3)} > D_{T(2-3)}$$

$$D_{W(3-4)} < D_{T(3-4)}$$

$$D_{W(4-5)} < D_{T(4-5)}$$

$$D_{W(5-6)} > D_{T(5-6)}$$

whereby a zoom lens system is achieved which has a short back focal distance, covers a wide angular field, and is high in the zoom ratio.

Figure 114A:
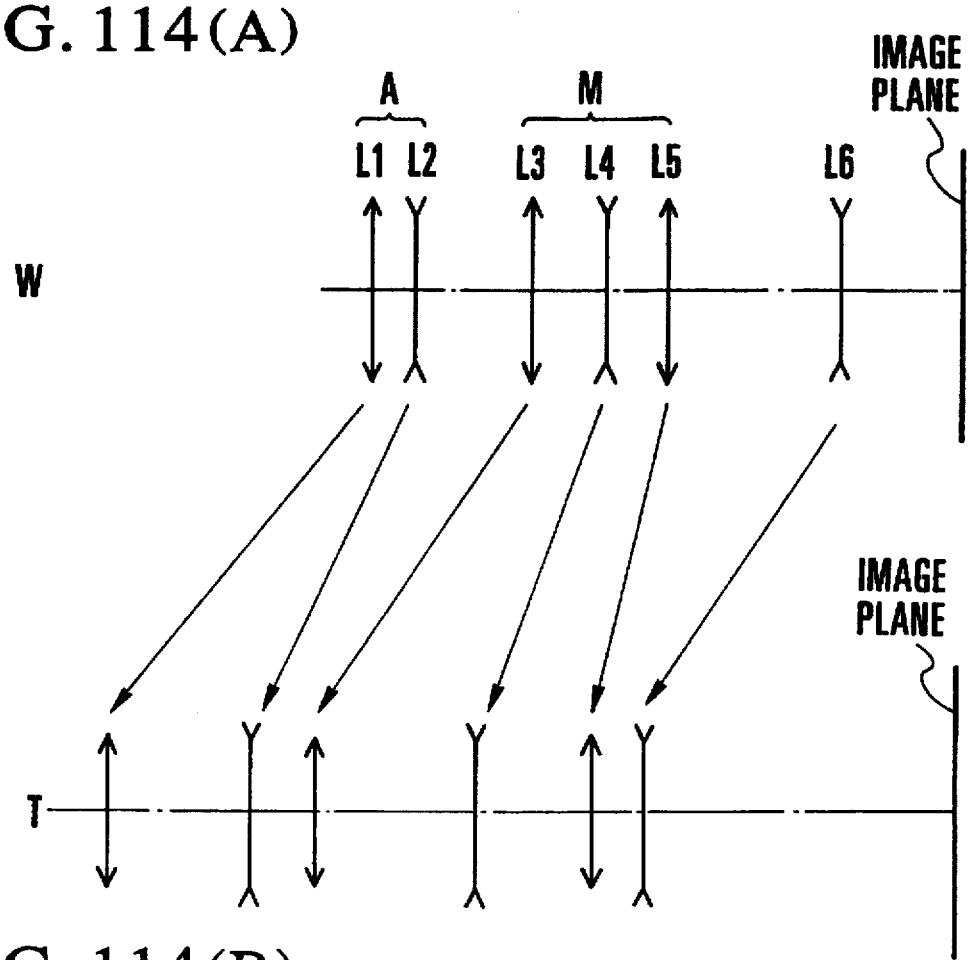
FIGS. 114(A) and 114(B) are diagrams showing the paraxial refractive power arrangements of a zoom lens of the invention.
Figure 114B:
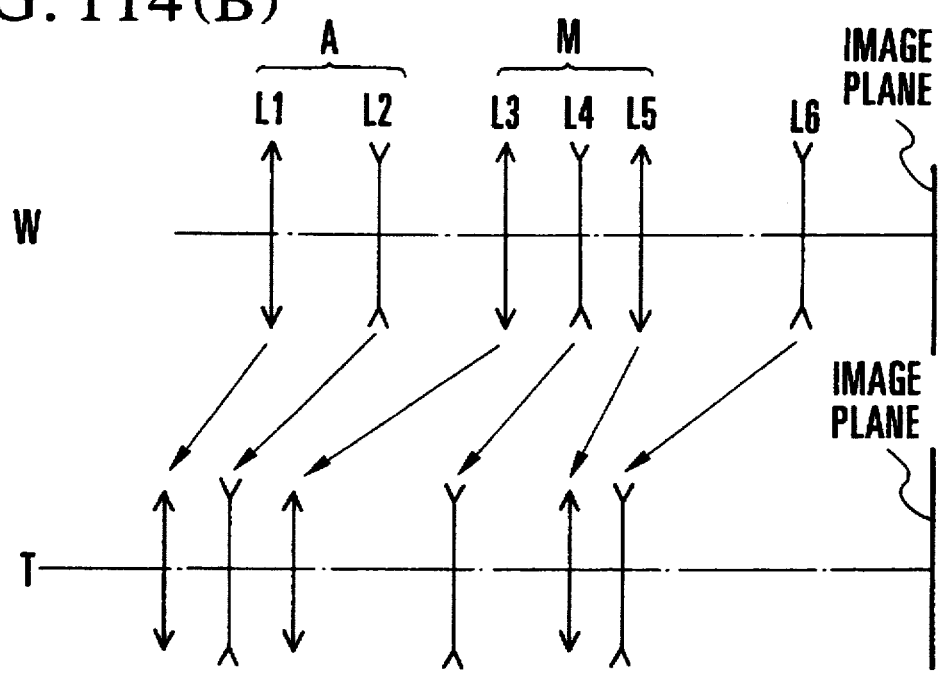
Figure 115:
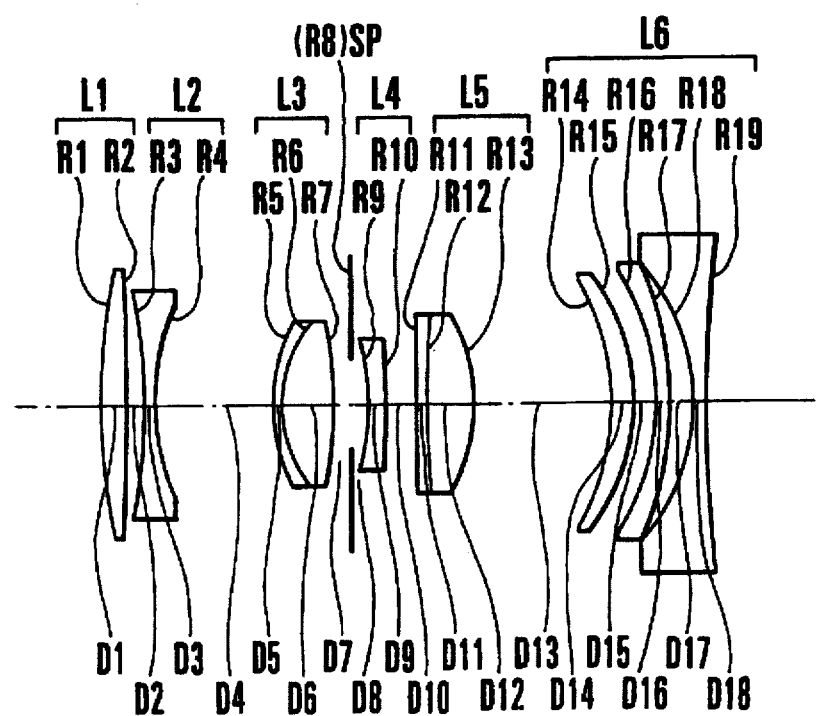
FIG. 115 is a lens block diagram of a numerical example 52 of the invention.
Figure 116:
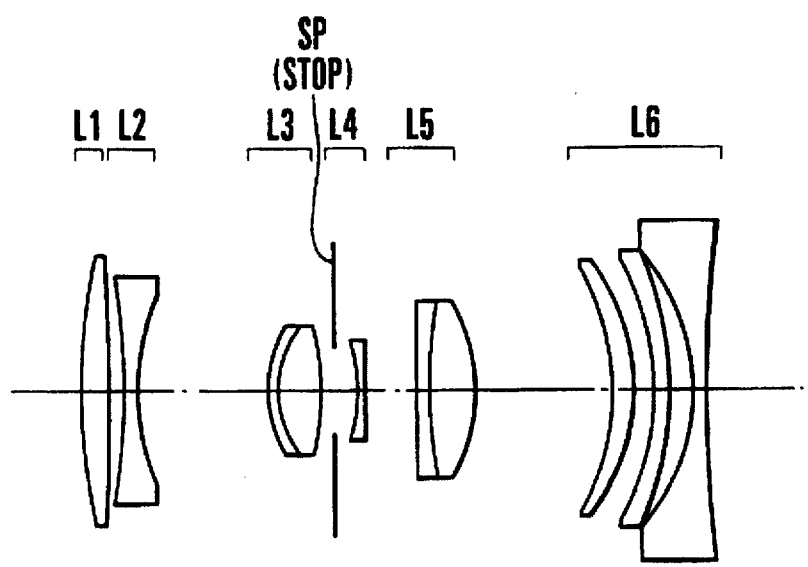
FIG. 116 is a lens block diagram of a numerical example 53 of the invention.
Figure 117:
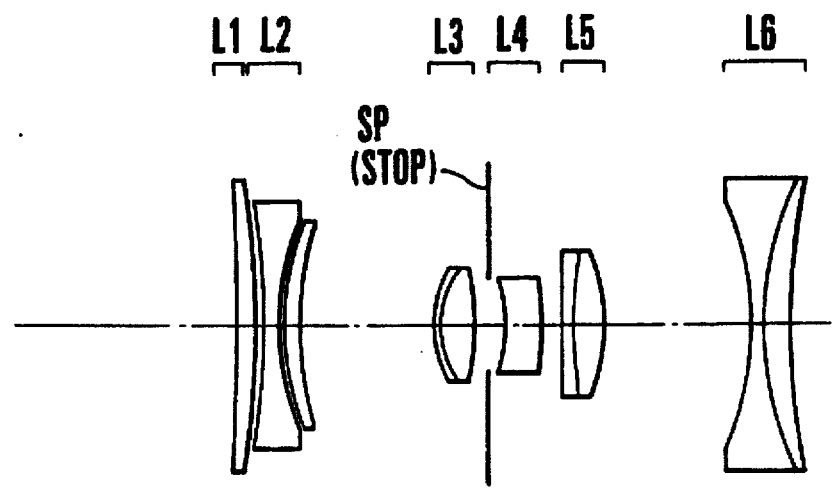
FIG. 117 is a lens block diagram of a numerical example 54 of the invention.
Figure 118:
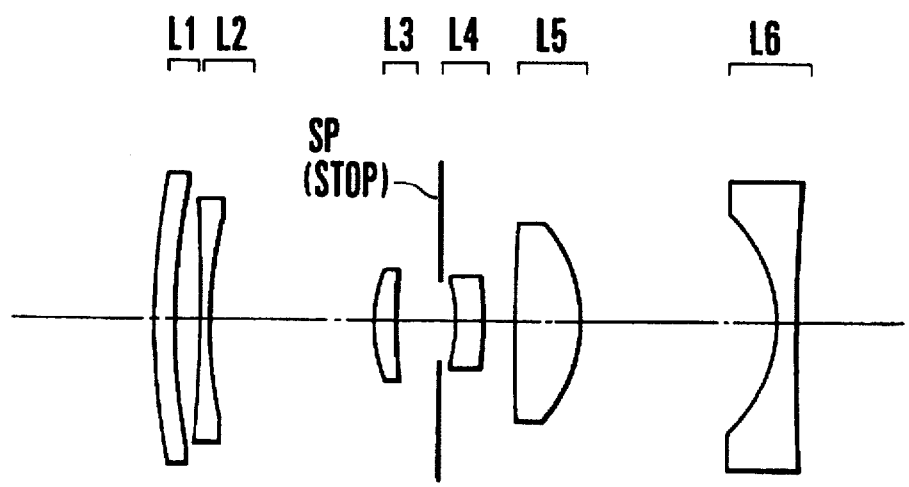
FIG. 118 is a lens block diagram of a numerical example 55 of the invention.
Figure 119:
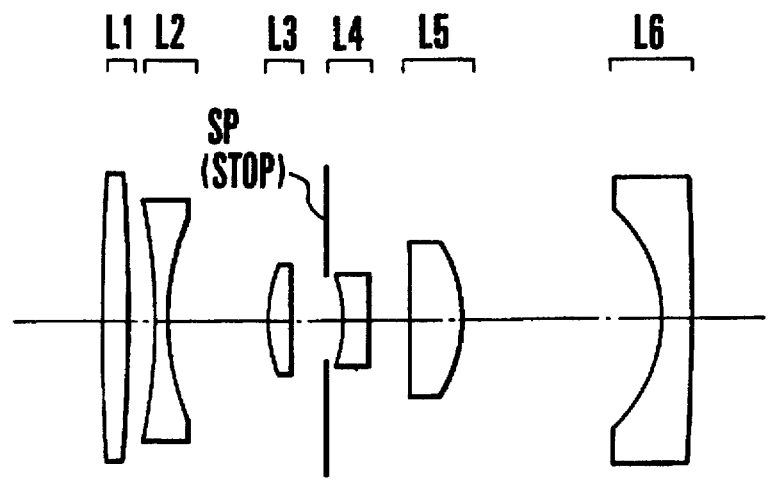
FIG. 119 is a lens block diagram of a numerical example 56 of the invention.
Figure 120:
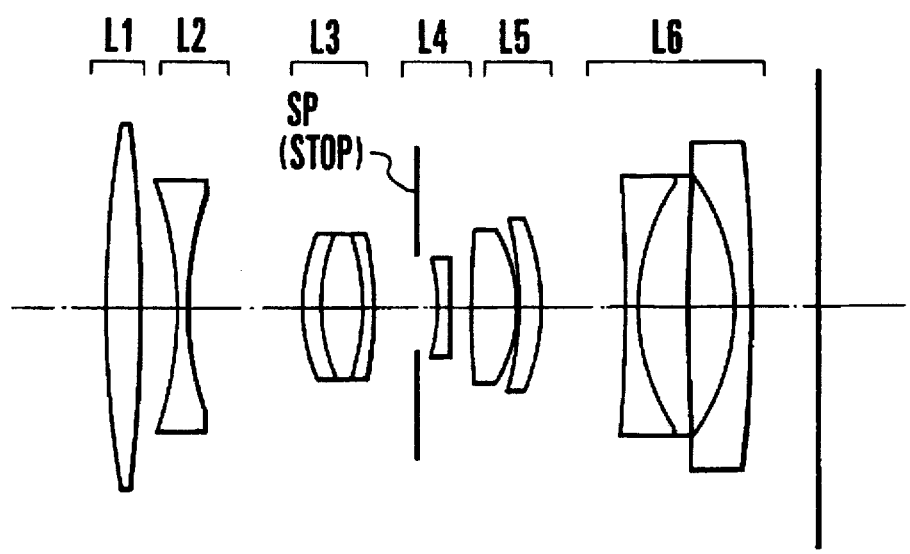

Examples of the present embodiment are explained below. FIGS. 114(A) and 114(B) show zoom lenses according to the present embodiment with the lens units as a thin lens system. In these diagrams, label W stands for the wide angle end, and label T for the telephoto end. All the lens units move axially forward when zooming from the wide angle end to the telephoto end. Particularly for the wide angle end, the total length of the entire system is shortened without causing the lens units to mechanically interfere with each other.

In recent years, for the compact, high range zoom lenses, the use of three components in total, or the 3-component type, of plus-plus-minus power arrangement is becoming the main stream. With this lens type, when to increase the maximum field angle and reduce the size, the first and second components have to get strong positive refractive powers. In general, however, because of the increase of the components, and, particularly when to increase the maximum field angle, because the asymmetry of the entire lens system is intensified, deterioration of aberrations results. It is, therefore, difficult to achieve a compact, excellent optical system.

In the present embodiment, on the other hand, the positive first lens unit L1 and the negative second lens unit L2 which are closest to each other in the wide angle end (hereinafter called the "A" group) are followed after a somewhat long distance by the third, fourth and fifth lens units which are closest to each other in the wide angle end so that their overall focal length is positive (hereinafter called the "M" group), then after another somewhat long distance by the sixth lens unit whose refractive power is negative. So, the entire system is considered on setting in the wide angle end to take a symmetric configuration with the three components of minus-plus-minus power arrangement. This allows the refractive power of the M group to be strengthened, while still permitting all aberrations to be corrected well at an increased maximum field angle with the limitation of the size to a minimum. Also it is desirable that the A group has a negative refractive power. Because the M group of positive refractive power is spaced from the A group by the appreciably long distance, it results that the A and M groups take the form of the retrofocus type, thereby making it easy to secure the back focal distance which constitutes a problem for increasing the maximum field angle. At the same time, it becomes easy to achieve good optical performance. For the telephoto end, the separations between the third and fourth lens units and between the fourth and fifth lens units are made wider than those for the wide angle end, while the separations between the second and third lens units and between the fifth and sixth lens units are made narrower than those for the wide angle end.

In here, taking an example of the 2-component zoom lens, its refractive power $\phi12$ is expressed by $$\phi12=\phi1+\phi2-\phi1\cdot\phi2\cdot e \qquad (A)$$

where $\phi1$: the refractive power of the first component;

$\phi2$: the refractive power of the second component;

e: the interval between the principal points of the first and second components.

Since the second and third lens units have their refractive powers taking opposite signs to each other, and the fifth and sixth lens units have their refractive powers taking opposite signs to each other, as is understandable from the equation (A), the overall refractive power of each of these pairs of the lens units becomes smaller (the overall focal length becomes longer). This is combined with the function of increasing the magnifications of the third and sixth lens units to improve the efficiency with which the longest focal length of the entire system increases. Thus, it is made possible to produce an advantage of increasing the zoom ratio. Even in such cases, the entire system takes a symmetric configuration of the lens units, giving rise to an advantage of correcting aberrations well.

During zooming, the separation between the first and second lens units may be varied so as to favor aberration correction. However, it is desired that the first and second lens units are made closer to each other in the wide angle end. In other words, the relationship: $D_{W(1-2)} < D_{T(1-2)}$ is satisfied, thereby making it possible for the first lens unit to be used particularly in correcting negative distortion that the second lens unit produces at the increased maximum field angle. Another advantage is that the outer diameter of the first lens unit can be suppressed prevented from increasing.

Further since the second lens unit has a negative lateral magnification in the wide angle end (or the first and second lens units in combination form a virtual image of an object), the separation between the first and second lens units is widened as zooming to the telephoto end, thereby making it possible for the second lens unit to contribute to an effect of varying the focal length. This is advantageous at increasing the zoom ratio.

Meanwhile, the lateral magnification of the fourth lens unit is desired to satisfy the following conditions:

$$|1/\beta4W|<1.0 \qquad (60)$$

$$|1/\beta4T|<1.0 \qquad (61)$$

where $\beta4W$: the lateral magnification for the wide angle end of the fourth lens unit;

$\beta4T$: the lateral magnification for the telephoto end of the fourth lens unit.

According to the before-described equation (A), it can be said that, for the longest focal length to increase, it is better to narrow the separation between the fourth lens unit of negative refractive power and the fifth lens unit of positive refractive power. With the use of such a lens unit arrangement, however, because the lens form becomes entirely asymmetric in the telephoto end, it is disadvantageous to the performance of good correction of aberrations. To maintain good stability of aberration correction throughout the entire zooming range, therefore, the total number of lens elements has to increase. This leads to a high possibility of increasing greatly the size of the entire lens system.

In particular, even if the total number of lens elements is reduced to assure minimization of the size of the entire lens system, all aberrations are corrected well. For this purpose, the conditions (60) and (61) are set forth. Since the back focal distance is longer when in the telephoto end than when in the wide angle end, the the exit pupil from the last lens surface shifts its position toward the object side when zooming to the telephoto end. To balance the on-axial and off-axial aberrations, it is effective to adjust the heights of incidence of the on-axial and off-axial light beams on the distant lens units from the pupil position in accordance with variation of the separations between the lens units. Particularly with regard to the above-described light beams, it is desired that the height of incidence of the off-axial one is made somewhat higher than that of incidence of the on-axial one.

From this reason, for the telephoto end, the separation between the fourth and fifth lens units has to be made longer than that for the wide angle end, as will be seen from the before-described relationship of the exit pupil position.

However, this measure comes to be not favorable to increasing the longest focal length (gives a greater effect on decreasing the magnification), as has been described in connection with the relationship of the equation (A). For this reason, it is better that the lateral magnification of the fourth lens unit take a value falling within the range given by the conditions (60) and (61). Or otherwise it would constitute a reducing system. With this, even if the separation between the fourth and fifth lens units is longer when in the telephoto end than when in the wide angle end, no effect of reducing the magnification is produced. Thus, the balance between the on-axial and off-axial aberrations is maintained excellent throughout the entire zooming range. Hence, if the conditions (60) and (61) are not satisfied, it is not easy to achieve a zoom lens of compact form with a high range.

To obtain particularly good optical performance, it is better to alter the conditions (60) and (61) as follows:

$$|1/\beta4W|0.5 \qquad (60a)$$

$$|1/\beta4T|0.5 \qquad (61a)$$

To make a good compromise between the reduction of the size of the entire lens system and the stability of optical performance, it is better to satisfy the following conditions:

$$0.3 < |f3|/(fW \cdot fT)^{1/2} < 0.8 \tag{62}$$

$$0.2 < |f5|/(fW \cdot fT)^{1/2} < 0.6 \tag{63}$$

where fi: the focal length of the i-th lens unit;
fW: the shortest focal length of the entire system;
fT: the longest focal length of the entire system.

The inequalities of condition (62) are concerned with the ratio of the focal length of the third lens unit to the focal length for an intermediate zooming position of the entire lens system.

When the upper limit of the condition (62) is exceeded, as this implies that the refractive power of the third lens unit is too weak, the total zooming movement of the third lens unit has to increase to obtain a predetermined value of the zoom ratio, that is, to make a predetermined contribution to the effect of increasing the zoom ratio. Moreover, to assure prevention of the second lens unit from mechanically interfering with it in the telephoto end, it becomes necessary to widen the separation between the second and third lens units by a surplus amount in the wide angle end. As a result, the total length of the entire system and the diameter of the front lens members are caused to increase simultaneously.

Meanwhile, when the refractive power of the third lens unit is strengthened from the lower limit, it produces spherical aberrations of higher order and coma, which are difficult to correct.

The inequalities of condition (63) are concerned with the ratio of the focal length of the fifth lens unit to the focal length for an intermediate zooming position of the entire system.

When the upper limit is exceeded, as this implies that the refractive power of the fifth lens unit is too weak, necessity arises that the separation between the fifth and sixth lens units widen to obtain a predetermined value of the shortest focal length, causing the total length of the entire system to increase objectionably.

When the refractive power is stronger than the lower limit, on the other hand, limitations have to be laid on the form of the sixth lens unit to retain a positive value of the back focal distance. Therefore, it becomes difficult to maintain good stability of optical performance throughout the entire zooming range.

The foregoing suffices for accomplishing the object of the invention. But, if an iris stop is used for adjusting the light amount, it is desirable to position the stop in the space of from the frontmost surface of the third lens unit to the frontmost surface of the fifth lens unit, for the entrance pupil takes an appropriate position to minimize the outer diameter of the lenses in the first lens units, while suppressing the variation of aberrations with zooming, To further improve the optical performance, it is desirable to satisfy the following additional conditions:

$$0.55 < f_{345W}/fW < 1.0 \tag{64}$$

$$0.5 < |fW^2/(f2 \cdot fT)| < 0.45 \tag{65}$$

$$0.05 < |fW^2/(f6 \cdot fT)| < 0.55 \tag{66}$$

where $f_{345W}$: the overall focal length for the wide angle end of the third, fourth and fifth lens units.

f6: the focal length of the sixth lens unit

The inequalities of condition (64) are concerned with the ratio of the overall focal length of the third, fourth and fifth lens units to the shortest focal length of the entire system and have an aim chiefly to simultaneously fulfill the requirements of minimizing the size of the entire lens system and of maintaining good stability of optical performance. When the upper limit of the condition (64) is exceeded, either the separation between the first and second lens units or the separation between the fourth and fifth lens units has to widen to retain the refractive power of the entire lens system. Or otherwise the predetermined value of the shortest focal length could not be obtained. Thus, the total length of the entire system is caused to increase. When the lower limit is exceeded, on the other hand, as this implies that the overall refractive power of the third, fourth and fifth lens units is too strong, large negative spherical aberration is produced, which is difficult to correct well.

The inequalities of conditions (65) and (66) are concerned with the zoom ratio of the lens system and respectively with the ratios of the refractive powers of the second and sixth lens units to the shortest focal length of the entire system.

When the upper limit of the condition (65) is exceeded, as this implies that the refractive power of the second lens unit is too strong, negative distortion and field curvature increase largely. Meanwhile, when the lower limit is exceeded, the outer diameter of the first lens unit and the total length of the entire system are caused to increase.

When the upper limit of the condition (66) is exceeded, as this implies that the refractive power of the sixth lens unit is too strong, it becomes difficult to correct various aberrations well, because limitations are laid on the form of the sixth lens units to obtain a positive value of the back focal distance.

When the lower limit is exceeded, the effect of varying the focal length to the equivalent movement of the sixth lens unit is caused to decrease so that the total length for the telephoto end of the entire system increases objectionably.

It is to be noted that if the lower limit of the condition (64) is altered from 0.55 to 0.6, more desirable results are attained. For the factor of the condition (66), a more proper range is:

$$0.05 < |fW^2/(f6 \cdot fT)| < 0.45 \tag{66a}$$

An even more proper range is:

$$0.2 < |fW^2/(f6 \cdot fT)| < 0.45 \tag{66b}$$

The construction of the constituent lenses of each of the lens units is shown in FIGS. 115 to 120, wherein it is preferred that the second lens unit has at least one negative lens having a concave surface facing the image side, the fourth lens unit has at least one negative lens having a concave surface facing the object side, the fifth lens unit has at least one positive lens having a strong convex surface facing the image side, and the sixth lens unit has at least one negative lens having a strong concave surface facing the object side. The term "strong" used here means the relative curvature to the other surfaces.

Further, to introduce an aspheric surface into one of the lens units is effective to further improve the optical performance. In the practical examples of the invention, the aspheric surface is introduced into one of the second, third, fourth, fifth and sixth lens units to heighten the image quality.

Particularly when the aspheric surface is introduced into the fifth lens unit, it is recommended to form it to such a shape that the refractive power gets progressively weaker as the distance from the optical axis increases. Particularly the lens surface of convex curvature toward the image side is better to introduce the asphericity into.

Of course, to introduce another more aspheric surface into one of the other lens surfaces is advantageous to improve the optical performance.

Turning to a different matter from the above, with regard to the movements of the lens units during zooming, if the method of moving two or more lens units in unison is employed, the operating mechanism is so far simplified in structure. For example, the third and sixth lens units move in unison.

For a case that the lens system has the stop, the stop may be made to move either in differential relation to all the lens units, or in unison with one of the lens units. If so, the stop can be kept in the neighborhood of the entrance pupil that moves when zooming, thereby giving an advantage of preventing variation of field curvature from occurring when the stop has a small aperture.

It is to be noted that, in the present embodiment, for the focusing purposes, any lens unit may be used, provided that the lateral magnification of the focusing lens unit does not become unity at any station during zooming.

For a case that the first lens unit has a considerably strong refractive power, the use of the method of moving the first lens unit forward assures maintenance of the constant focusing amount for the equivalent object distance at any station during zooming. Therefore, a simplification of the operating mechanism can be expected.

For another case that, when in the wide angle end, the back focal distance is left long enough, it is recommended to use the method of moving the sixth lens unit toward the image side. In this case, an advantage of reducing the outer diameter of the first lens unit is produced.

Another method of moving two or more of the first to the sixth lens units simultaneously may be used.

It is to be noted that if the focusing lens unit contains the stop, it is preferred that the stop remains axially stationary during focusing, because the driving torque is reduced by an amount which would otherwise be necessary to move the diaphragm mechanism when focusing.

Next, numerical examples 52 to 57 of the invention are shown. The values of the factors of the above-described conditions for the numerical examples 52 to 57 are also listed in a Table-8.

NUMERICAL EXAMPLE 52 f = 28.86–101.62    Fno = 1:4–6.8    2ω = 73.7°–24.0°

| | | |
|---|---|---|
| R 1 = 67.651 | D 1 = 2.40 | N 1 = 1.84666 | ν 1 = 23.8 |
| R 2 = −210.243 | D 2 = Variable | | |
| R 3 = −57.111 | D 3 = 1.20 | N 2 = 1.69680 | ν 2 = 55.5 |
| R 4 = 25.245 | D 4 = Variable | | |
| R 5 = 14.735 | D 5 = 0.90 | N 3 = 1.84666 | ν 3 = 23.8 |
| R 6 = 11.795 | D 5 = 5.20 | N 4 = 1.48749 | ν 4 = 70.2 |
| R 7 = −34.908 | D 7 = Variable | | |
| R 8 = (Stop) | D 8 = 1.80 | | |
| R 9 = −20.722 | D 9 = 1.20 | N 5 = 1.80518 | ν 5 = 254 |
| R10 = −139.003 | D10 = Variable | | |
| R11 = −601.244 | D11 = 1.10 | N 6 = 1.84666 | ν 6 = 23.8 |
| R12 = 55.479 | D12 = 4.80 | N 7 = 1.80440 | ν 7 = 39.6 |
| R13 = −16.038 | D13 = Variable | | |
| R14 = −23.754 | D14 = 2.20 | N 8 = 1.80518 | ν 8 = 25.4 |
| R15 = −18.995 | D15 = 1.76 | | |
| R16 = −26.193 | D16 = 1.30 | N 9 = L69680 | ν 9 = 55.5 |
| R17 = −35.687 | D17 = 2.16 | | |
| R18 = −20.887 | D18 = 1.40 | N10 = 1.69580 | ν 10 = 55.5 |
| R19 = 138.030 | | | |

| Variable | Focal Length | | |
|---|---|---|---|
| Separation | 28.86 | 54.15 | 101.62 |
| D 2 | 1.55 | 2.04 | 2.83 |
| D 4 | 10.90 | 7.35 | 0.80 |
| D 7 | 1.59 | 4.33 | 6.76 |
| D10 | 2.96 | 4.56 | 6.36 |
| D13 | 12.65 | 4.12 | 0.78 |

Aspheric Coefficient

R 9   K = 3.96689   A = 0   B = −1.84402 × 10⁻⁵   C = 5.52186 × 10⁻⁸   D = −1.27174 × 10⁻⁹
R13   K = −2.97329   A = 0   B = −7.57432 × 10⁻⁵   C = 2.46583 × 10⁻⁷   D = −8.50518 × 10⁻¹⁰

NUMERICAL EXAMPLE 53 f = 28.67–101.27    Fno = 1:4–8.8    2ω = 74.1°–24.1°

| | | | |
|---|---|---|---|
| R 1 = 63.941 | D 1 = 2.40 | N 1 = 1.84666 | ν 1 = 23.8 |
| R 2 = −448.376 | D 2 = Variable | | |
| R 3 = −73.061 | D 3 = 1.20 | N 2 = 1.69680 | ν 2 = 55.5 |
| R 4 = 25.948 | D 4 = Variable | | |
| R 5 = 1694 | D 5 = 0.90 | N 3 = 1.84668 | ν 3 = 23.8 |
| R 6 = 12.457 | D 6 = 3.50 | N 4 = 1.48749 | ν 4 = 70.2 |
| R 7 = −30.104 | D 7 = 0.90 | N 5 = 1.84666 | ν 5 = 23.8 |
| R 8 = −36.674 | D 8 = 1.00 | | |
| R 9 = (Stop) | D 9 = Variable | | |
| R10 = −20.078 | D10 = 1.67 | N 6 = 1.75520 | ν 6 = 27.5 |
| R11 = −229.674 | D11 = Variable | | |
| R12 = −492.615 | D12 = 1.10 | N 7 = 1.84666 | ν 7 = 23.,8 |
| R13 = 53.475 | D13 = 80 | N 8 = 1.80440 | ν 8 = 39.6 |
| R14 = −15.750 | D14 = Variable | | |
| R15 = −23.941 | D15 = 2.20 | N 9 = 1.80518 | ν 9 = 25.4 |
| R16 = −18.391 | D16 = 1.03 | | |
| R17 = −23.056 | D17 = 1.30 | N10 = 1.69680 | ν 10 = 55.5 |
| R18 = −31.324 | D18 = 2.06 | | |
| R19 = −20.656 | D19 = 1.40 | N11 = 1.77250 | ν 11 = 49.6 |
| R20 = 865.263 | | | |

| Variable | Focal Length | | |
|---|---|---|---|
| Separation | 28.67 | 53.88 | 101.27 |
| D 2 | 1.53 | 1.39 | 3.05 |
| D 4 | 12.63 | 8.70 | 0.80 |
| D 9 | 3.34 | 6.09 | 8.23 |
| D11 | 2.46 | 4.54 | 6.34 |
| D14 | 13.06 | 4.06 | 0.79 |

Aspheric Coefficient

| | | | | | |
|---|---|---|---|---|---|
| R10 | K = 4.18575 | A = 0 | B = −2.16198 × 10⁻⁵ | C = −1.03282 × 10⁻⁸ | D = −3.75551 × 10⁻⁹ |
| R14 | K = −2.87992 | A = 0 | B = −7.67224 × 10⁻⁶ | C = 1.92183 × 10⁻⁷ | D = −5.25309 × 10⁻¹⁰ |

NUMERICAL EXAMPLE 54

| f = 28.70~101.14 | | Fno = 1:3.5~9.0 | 2ω = 74.0°~24.1° |
|---|---|---|---|
| R 1 = −474.441 | D 1 = 2.30 | N 1 = 1.51633 | ν 1 = 64.2 |
| R 2 = −86.318 | D 2 = Variable | | |
| R 3 = −53.852 | D 3 = 1.30 | N 2 = 1.48749 | ν 2 = 70.2 |
| R 4 = 20.545 | D 4 = 0.43 | | |
| R 5 = 19.938 | D 5 = 2.20 | N 3 = 1.84666 | ν 3 = 23.3 |
| R 6 = 28.569 | D 6 = Variable | | |
| R 7 = 13.552 | D 7 = 0.90 | N 4 = 1.84666 | ν 4 = 23.8 |
| R 8 = 11.028 | D 8 = 3.40 | N 5 = 1.48749 | ν 5 = 70.2 |
| R 9 = −5664 | D 9 = Variable | | |
| R10 = (Stop) | D10 = 1.30 | | |
| R11 = −19.884 | D11 = 3.34 | N 6 = 1.80518 | ν 6 = 25.4 |
| R12 = −99.255 | D12 = Variable | | |
| R13 = −535.200 | D13 = 1.10 | N 7 = 1.84666 | ν 7 = 23.8 |
| R14 = 56.062 | D14 = 4.80 | N 8 = 1.80440 | ν 8 = 39.6 |
| R15 = −15.486 | D15 = Variable | | |
| R16 = −20.343 | D16 = 1.50 | N 9 = 1.67790 | ν 9 = 54.9 |
| R17 = 41.355 | D17 = 2.40 | N10 = 1.84666 | ν 10 = 23.8 |
| R18 = 81.462 | | | |

| Variable | Focal Length | | |
|---|---|---|---|
| Separation | 28.70 | 53.87 | 101.14 |
| D 2 | 1.32 | 1.60 | 3.50 |
| D 6 | 10.84 | 7.50 | 0.79 |
| D 9 | 1.84 | 5.07 | 6.75 |
| D12 | 2.57 | 5.19 | 6.95 |
| D15 | 12.92 | 4.81 | 0.81 |

Aspheric Coefficient

| | | | | | |
|---|---|---|---|---|---|
| R11 | K = 4.37101 | A = 0 | B = −1.10863 × 10⁻⁵ | C = −2.79493 × 10⁻⁹ | D = 9.80348 × 10⁻⁹ |
| R15 | K = −2.61082 | A = 0 | B = −6.00470 × 10⁻⁵ | C = 1.98630 × 10⁻⁷ | D = −9.07033 × 10⁻¹⁰ |
| R16 | K = 9.03869 × 10⁻¹ | A = 0 | B = 2.93900 × 10⁻⁵ | C = 6.78396 × 10⁻⁸ | D = 3.91359 × 10⁻¹¹ |

NUMERICAL EXAMPLE 55

| f = 28.87~101.00 | | Fno = 1:3.7~10 | 2ω = 73.7°~24.2° |
|---|---|---|---|
| R 1 = 47.595 | D 1 = 2.50 | N 1 = 1.84666 | ν 1 = 23.8 |
| R 2 = 53.399 | D 2 = Variable | | |
| R 3 = −180.203 | D 3 = 1.30 | N 2 = 1.45600 | ν 2 = 90.3 |
| R 4 = 40.791 | D 4 = Variable | | |
| R 5 = 13.405 | D 5 = 2.50 | N 3 = 1.49700 | ν 3 = 81.6 |
| R 6 = 108.690 | D 6 = Variable | | |
| R 7 = (Stop) | D 7 = 0.84 | | |
| R 8 = −21.419 | D 8 = 2.80 | N 4 = 1.80518 | ν 4 = 25.4 |
| R 9 = −56.767 | D 9 = Variable | | |
| R10 = 248.820 | D10 = 5.50 | N 5 = 1.77250 | ν 5 = 49.6 |
| R11 = −17.332 | D11 = Variable | | |
| R12 = −18.204 | D12 = 1.80 | N 6 = 1.67790 | ν 6 = 55.3 |
| R13 = 212.231 | | | |

-continued

| Variable | Focal Length | | |
|---|---|---|---|
| Separation | 28.87 | 51.91 | 101.00 |
| D 2 | 3.02 | 5.31 | 6.29 |
| D 4 | 9.55 | 20.45 | 0.79 |
| D 6 | 3.94 | 8.73 | 9.72 |
| D 9 | 2.80 | 11.66 | 22.73 |
| D11 | 13.38 | 3.33 | 0.80 |

Aspheric Coefficient

| | | | | | |
|---|---|---|---|---|---|
| R 4 | K = −1.09941 | A = 0 | B = −3.55580 × $10^{-7}$ | C = −5.22896 × $10^{-9}$ | D = 9.77417 × $10^{-12}$ |
| R 5 | K = 3.41025 × $10^{-5}$ | A = 0 | B = 3.74294 × $10^{-5}$ | C = 1.80904 × $10^{-7}$ | D = 3.90208 × $10^{-9}$ |
| R 8 | K = 5.23706 | A = 0 | B = 3.74294 × $10^{-5}$ | C = −1.80904 × $10^{-6}$ | D = 8.06124 × $10^{-9}$ |
| R11 | K = −2.45460 | A = 0 | B = −3.44656 × $10^{-5}$ | C = 1.50383 × $10^{-7}$ | D = −4.30846 × $10^{-10}$ |
| R12 | K = −1.69839 | A = 0 | B = −1.29388 × $10^{-5}$ | C = 1.07317 × 10−7 | D = −3.92455 × $10^{-10}$ |

NUMERICAL EXAMPLE 56 f = 28.83~102.38   Fno = 1:4.6~10   2ω = 73.8°~23.9°
R 1 = 519.615   D 1 = 1.60   N 1 = 1.80518   ν 1 = 25.4
R 2 = −351.512   D 2 = Variable
R 3 = −112.822   D3 = 1.30   N 2 = 1.49700   ν 2 = 81.6
R 4 = 28.784   D 4 = Variable
R 5 = 13.788   D 5 = 2.50   N 3 = 1.49700   ν 3 = 81.6
R.6 = 268.810   D 6 = Variable
R 7 = (Stop)   D 7 = 1.00
R 8 = −35.816   D 8 = 2.80   N 4 = 1.84666   ν 4 = 23.8
R 9 = 145.825   D 9 = Variable
R10 = −317.500   D10 = 4.50   N 5 = 1.77250   ν 5 = 49.6
R11 = −16.390   D11 = Variable
R12 = −15.813   D12 = 1.80   N 6 = 1.64000   ν 6 = 60.1
R13 = −425.932

| Variable | Focal Length | | |
|---|---|---|---|
| Separation | 28.83 | 54.33 | 102.38 |
| D 2 | 1.49 | 1.64 | 3.36 |
| D 4 | 8.73 | 14.25 | 0.80 |
| D 6 | 3.06 | 7.24 | 8.88 |
| D 9 | 2.85 | 5.91 | 10.58 |
| D11 | 17.12 | 5.44 | 4.31 |

Aspheric Coefficient

| | | | | | |
|---|---|---|---|---|---|
| R 8 | K = −2.28261 × 10 | A = 0 | B = 1.47455 × $10^{-4}$ | C = −1.14509 × $10^{-6}$ | D = −5.66621 × $10^{-9}$ |
| R11 | K = −2.72643 × $10^{-2}$ | A = 0 | B = 6.30714 × $10^{-5}$ | C = 3.23693 × $10^{-6}$ | D = −5.51574 × $10^{-11}$ |
| R12 | K = −5.7940 × $10^{-1}$ | A = 0 | B = 1.05221 × $10^{-5}$ | C = 3.60446 × $10^{-6}$ | D = −9.83182 × $10^{-11}$ |

NUMERICAL EXAMPLE 57 f = 29.02~102.93   Fno = 4.30~9.06   2ω = 73.4°~23.7°
R 1 = 116.600   D 1 = 2.90   N 1 = 1.1846659   ν 1 = 23.8
R 2 = −133.737   D 2 = Variable
R 3 = −38.396   D 3 = 1.20   N 2 = 1.743198   ν 2 = 49.3
R 4 = 31.715   D 4 = Variable
R 5 = 16.188   D 5 = 1.80   N 3 = 1.834000   ν 3 = 37.2
R 6 = 17.832   D 6 = 3.65   N 4 = 1.589130   ν 4 = 61.2
R 7 = −17.609   D 7 = 1.00   N 5 = 1.755199   ν 5 = 27.5
R 8 = −35.961   D 8 = Variable
R 9 = (Stop)   D 9 = 2.00
R10 = −17.346   D10 = 1.20   N 6 = 1.805181   ν 6 = 25.4

-continued

| | | | |
|---|---|---|---|
| R11 = −99.210 | D11 = Variable | | |
| R12 = 100.108 | D12 = 3.70 | N 7 = 1.730770 | ν 7 = 40.6 |
| R13 = −18.145 | D13 = 0.30 | | |
| R14 = −26.073 | D14 = 2.30 | N 8 = 1.516330 | ν 8 = 64.2 |
| R15 = −17.716 | D15 = Variable | | |
| R16 = −83.277 | D16 = 1.20 | N 9 = 1.804000 | ν 9 = 46.6 |
| R17 = 21.161 | D17 = 4.30 | N10 = 1.698947 | ν 10 = 30.1 |
| R18 = 283.203 | D18 = 22 | | |
| R19 = −21.138 | D19 = 1.50 | N11 = 1.772499 | ν 11 = 49.6 |
| R20 = −110.226 | | | |

| Variable | Focal Length | | |
|---|---|---|---|
| Separation | 29.02 | 57.35 | 102.93 |
| D 2 | 3.23 | 2.74 | 2.06 |
| D 4 | 10.22 | 6.98 | 1.48 |
| D 8 | 3.94 | 6.28 | 7.61 |
| D 11 | 1.89 | 3.65 | 4.98 |
| D 15 | 7.47 | 1.60 | 0.94 |

Aspheric Coefficient

| | | | | |
|---|---|---|---|---|
| R 3 | k = 4.24469e−02 | A = 0  B = 1.352843e−06 | C = 5.73837e−09 | D = 8.67295e−12 |
| R 4 | k = −5.47589e−01 | A = 0  B = 7.02788e−06 | C = −1.35496e−08 | D = 4.21134e−10 |
| R10 | k = 2.23721 | A = 0  B = −5.06631e−05 | C = −3.08300e−07 | D = 4.80718e−10 |
| R13 | k = −3.70488 | A = 0  B = −6.74890e−05 | C = 2.51964e−07 | D = 6.44437e−10 |

TABLE 8

| | Numerical Examples | | | | | |
|---|---|---|---|---|---|---|
| Conditions | 52 | 53 | 54 | 55 | 56 | 57 |
| $\left|\dfrac{1}{\text{84W}}\right|$ | 0.27 | 0.23 | 0.02 | 0.13 | 0.05 | 0.10 |
| $\left|\dfrac{1}{\text{84T}}\right|$ | 0.38 | 0.32 | 0.04 | 0.21 | 0.04 | 0.32 |
| $\dfrac{f3}{(fW \cdot ft)^{1/2}}$ | 0.46 | 0.47 | 0.48 | 0.57 | 0.51 | 0.38 |
| $\dfrac{f5}{(fW \cdot ft)^{1/2}}$ | 0.38 | 0.38 | 0.37 | 0.39 | 0.41 | 0.33 |
| $\dfrac{f_{345W}}{fW}$ | 0.75 | 0.77 | 0.73 | 0.73 | 0.74 | 0.69 |
| $\left|\dfrac{fW^2}{f2 \cdot fT}\right|$ | 0.33 | 0.30 | 0.16 | 0.13 | 0.18 | 0.35 |
| $\left|\dfrac{fW^2}{f6 \cdot fT}\right|$ | 0.30 | 0.29 | 0.33 | 0.33 | 0.32 | 0.41 |

Another embodiment of the invention in which further improvements are made is described by reference to FIG. 127 through FIGS. 138(A) to 138(C).

This zoom lens has a first lens unit of negative refractive power, a second lens unit of positive refractive power and a third lens unit of negative refractive power, totaling three lens units, being characterized in that the second lens units has a 2a member, a 2b member, a 2c member and a 2d member, totaling four members, wherein zooming is performed by varying the air separation between any adjacent two of the four members in the second lens unit, whereby letting the overall focal lengths for the wide angle and telephoto ends of the second lens unit be denoted by f2W and f2T respectively, the following condition is satisfied:

$$f2W < f2T \quad (67)$$

FIG. 127 to FIG. 130 are diagrams showing the paraxial refractive power arrangements of numerical examples 58 to 61 of the invention. FIG. 131 to FIG. 134 are lens block diagrams of the numerical example 58 to 61 of the invention in the wide angle end. In FIG. 127 to FIG. 130, W stands for the wide angle end, and T for the telephoto end. FIGS. 135(A) to 135(C) through FIGS. 138(A) to 138(C) are graphic representations of the various aberrations of the numerical examples 58 to 61 of the invention, where the figure numbers suffixed with (A) are in the wide angle end, with (B) in an intermediate position and with (C) in the telephoto end.

In the drawings, reference character L1 denotes the first lens unit of negative refractive power, reference character L2 denotes the second lens unit of positive refractive power and reference character L3 denotes the third lens unit of negative refractive power. SP stands for an aperture stop and IP for an image plane.

For the zoom lens of the invention, the second lens unit is constructed with a plurality of members. In each of the numerical examples of FIG. 127 through FIG. 130, for the purpose of convenience, the entire system is divided into three groups, namely, the first lens unit L1 of negative refractive power, the second lens unit L2 of positive refractive power and the third lens unit L3 of negative refractive power. When zooming from the wide angle end to the telephoto end, these lens units axially move forward. In the present embodiment, the 2a member L2a and the 2b member L2b constitute a front sub-unit 2F whose overall refractive power is positive, and the 2c member and the 2d member constitute a rear sub-unit 2R whose overall refractive power is positive.

Another feature of the invention is that, as the plurality of members are used, the lateral magnifications for the wide angle and telephoto ends of the second lens unit are determined so as to satisfy the before-described condition (67). With this, for the maximum field angle to widen and for the zooming range to increase, the variation of aberrations is well corrected to obtain high optical performance throughout the entire zooming range. When the condition (67) is violated, it becomes difficult to improve the efficiency with which the focal length varies.

Next, the features of the constituent lens units and members of the zoom lens which are characteristic of the present embodiment are explained below.

In the zoom lens of the present embodiment, for the wide angle end, the first lens unit L1 of negative refractive power, when counted from the object side, is followed after a somewhat long spacing by the second lens unit L2 of positive overall refractive power and then after another somewhat long spacing by the third lens unit L3 of negative refractive power. The use of such a minus-plus-minus refractive power arrangement, or a symmetric type optical configuration, in the wide angle end allows the second lens unit L2 to strengthen in refractive power. By this, it is made possible to correct all aberrations well at an increased maximum field angle, while still permitting minimization of the size of the zoom lens to be achieved.

Another feature is that, because the negative first lens unit L1 and the second lens unit L2 whose overall refractive power is made positive are arranged in spaced relation by a considerably long distance, these two lens units take the form of the retrofocus type, thereby making it easy to secure the back focal distance which constitutes a problem for increasing the maximum field angle. In addition, the second lens unit L2 is made constructed from the 2a member L2a having a positive or negative refractive power, the 2b member L2b having a positive or negative refractive power, the 2c member L2c having a negative refractive power and the 2d member L2d having a positive refractive power arranged in this order from the object side.

When zooming from the wide angle to the telephoto end, all the members axially move forward in such relation that the separation between the members L2a and L2b decreases, the separation between the members L2b and L2c increases and the separation between the members L2c and L2d increases. At this time, the overall refractive power of the second lens unit L2 is weaker when in the telephoto end than when in the wide angle end. With such a construction and arrangement of the constituent lenses of the second lens unit, when the entire lens system is made to have a form of negative, positive, positive and negative components, the variation of aberrations whose range increases with the widening of the maximum field angle and with the increase of the zoom ratio is well corrected in order to maintain good stability of high optical performance throughout the entire zooming range.

In the present embodiment, by setting forth such rules of design, a zoom lens which, though being wide in the field angle, is compact and has a high range is obtained. To achieve further improvements, it is preferred to satisfy at least one of the following features or conditions.

(i) Letting the focal length of the third lens unit be denoted by f3 and the shortest focal length of the entire system by fW, $$0.9 \leq |fW/f3| \leq 2.2 \tag{68}$$

$$1.0 \leq fW/f2W < 1.8 \tag{69}$$

are satisfied.

The inequalities of condition (68) are concerned with the refractive power of the third lens unit L3. When the upper limit of the condition (68) is exceeded, as this implies that the refractive power of the third lens unit L3 is too strong, limitations are laid on the form of the third lens unit L3 to obtain a positive value of the back focal distance in the wide angle end. Therefore, it becomes difficult to correct all aberrations. When the refractive power of the third lens unit L3 is weaker than the lower limit, the third lens unit L3 contributes to a weaker effect on varying the focal length. As a result, the total zooming movement of each of the lens units has to increase. Or otherwise a predetermined value of the zoom ratio could not be secured. Thus, the total length of the entire system increases objectionably.

In the present embodiment, to achieve a further improvement of the optical performance, it is desirable that the condition (68) takes the following range:

$$1.0 \leq |fW/f3| \leq 1.8 \tag{68a}$$

The inequalities of condition (69) are concerned with the refractive power of the second lens unit L2. When the upper limit of the condition (69) is exceeded, as this implies that the refractive power of the second lens unit L2 is too strong, the second and third lens unit get too strong of a telephoto function. So, the back focal distance is hardly secured. When the lower limit of the condition (69) is exceeded, as this implies that the refractive power of the second lens unit L2 is too weak, the refractive powers of the negative lens units weaken to obtain the predetermined value of the shortest focal length. As a result, the total length of the entire system increases objectionably.

It is desirable that the condition (69) is altered to the following range:

$$1.1 < fW/f2W < 1.5 \tag{69a}$$

When this condition is satisfied, a higher optical performance can be achieved, although the entire system is very compact.

(ii) Letting the overall refractive powers for the wide angle end of the before-described sub-units 2F and 2R be denoted by f2FW and f2RW respectively and the shortest focal length of the entire system by fW, $$0.5 \leq fW/f2FW \leq 1.7 \tag{70}$$

$$0.5 \leq fW/f2RW \leq 1.5 \tag{71}$$

are satisfied.

When the upper limit of either one of the conditions (70) and (71) is exceeded, as this implies that the refractive power of the front or rear sub-unit 2F or 2R is too strong, it becomes difficult to secure the back focal distance in the wide angle end. Conversely when the refractive power of the sub-unit 2F or 2R is too weak as exceeding the lower limit, the refractive powers of the negative lens units have to weaken to obtain the predetermined value of the shortest foal length. As a result, the entire system gets a long total length. It is, therefore, difficult to become more compact.

To facilitate simultaneous fulfillment of the requirements of minimizing the size and of securing the back focal distance, while still permitting a zoom lens of good optical performance to be obtained, it is recommended that the conditions (70) and (71) take the following ranges:

$$0.6 \leq fW/f2FW \leq 1.2 \tag{70a}$$

$$0.6 \leq fW/f2RW \leq 1.3 \tag{71a}$$

(iii) Letting the separation for the wide angle and telephoto ends between the 2c and 2d members be denoted by $DW_{c-d}$ and $DT_{c-d}$ respectively, $$DW_{c-d} < DT_{c-d} \tag{72}$$

is satisfied.

Now, suppose a system comprises a first component (of refractive power $\phi1$) and a second component (of refractive power $\phi2$), totaling two components, with the separation therebetween being varied to effect zooming, then such a 2-component zoom lens has its overall refractive power $\phi12$ given by the following expression:

$$\phi12 = \phi1 + \phi2 - e\phi1\phi2 \tag{a}$$

where e is the interval between the principal points of the first and second components.

The inequality of condition (72) is concerned with the separations for the wide angle and telephoto ends between the 2c and 2d members. As is understandable from the equation (a), in principle, it can be said that when to increase the longest focal length, it is better that the 2c member of negative refractive power and the 2d member of positive refractive power have their separation made narrow. However, the use of such an arrangement of the components leads to an asymmetic form over these components in the telephoto end. This is disadvantageous at performing good correction of aberrations. To maintain good stability of aberration correction throughout the entire zooming range, therefore, a necessity arises to increase the total number of constituent lens elements, causing the lens system to increase in size. From this reason, in the present embodiment, the condition (72) is set forth to thereby make it easy to increase the zoom ratio and, at the same time, to well correct the various aberrations well.

(iv) Letting the lateral magnifications for the wide angle and telephoto ends of the 2c member be denoted by $\beta W_{2c}$ and $BT_{2c}$ respectively, $$|\beta W_{2c}| \mathopen{}\mathclose{}1.0 \tag{73}$$

$$|\beta T_{2c}| \mathopen{}\mathclose{}1.0 \tag{74}$$

are satisfied.

The conditions (73) and (74) have an aim to obtain an optical system which is corrected well with the limitation of the total number of lens elements to a small value. The exit pupil from the last lens surface takes a more front axial position in the telephoto end, because the back focal distance increases when zooming from the wide angle end to the telephoto end. To balance between the on-axial and off-axial aberrations, it is effective to adjust the heights of incidence of the axial and skew light beams on the ones of the lens units which are far away from the pupil in accordance with variation of the separations between the lens units. Particularly with regard to the above-described light beams, it is desired that the skew light beam enters at a somewhat higher height than the axial one does. To this purpose, for the telephoto end, owing to the above-described positional relationship of the exit pupil, the separation between the 2c member and the 2d member has to be made longer than that for the wide angle end.

However, this is reflected to a disadvantage when the longest focal length is increased, (because the effect on reducing the magnification becomes large), as explained in connection with the equation (a). Therefore, it is better that the lateral magnification of the 2c member takes a value in a range that does not make a reduction system of it, that is, in the range given by the conditions (73) and (74). With this, despite a wider separation between the 2c and 2d members in the telephoto end than in the wide angle end, a large effect on reducing the magnification is not produced. Thus, the on-axial and off-axial aberrations are maintained in good balance throughout the entire zooming range.

(v) Letting the lateral magnification for the wide angle end of the second lens unit be denoted by $\beta 2W$, $$-0.6 < \beta 2W < -1.0 \tag{75}$$

is satisfied.

The inequalities of condition (75) are concerned with the lateral magnification for the wide angle end of the second lens unit. When the upper limit of the condition (75) is exceeded, the back focal distance is hardly created in the wide angle end. As a result, the diameter of the third lens unit has to increase. When the lower limit is exceeded, the refractive powers of the other lens units become stronger than acceptable to obtain the predetermined focal length. So, many large aberrations are produced objectionably.

In particular, for the correction of all aberrations and the minimization of the size to stand at once, it is desirable that the condition (75) takes the following range:

$$-0.5 < \beta 2W < -0.15 \tag{75a}$$

(vi) The stop is positioned in a space between the sub-units 2F and 2R and arranged to move with zooming. The entrance pupil thus takes an appropriate place to suppress the variation of aberrations with zooming. It is to be noted that, in the invention, the stop may be in another space in the second lens unit L2. Also, instead of moving the stop in unison with the 2c member, it may otherwise be moved in unison with one of the other members or units.

(vii) The rear sub-unit 2R is provided with at least one aspheric surface of such shape that the refractive power, if positive, gets progressively weaker, or if negative, stronger, as the distance from the optical axial increases. According to this, the optical performance over the entire area of the image frame can be further improved.

In the zoom lens in the present embodiment, for focusing purposes, any one or ones of the lens units can be used provided that the focusing lens unit does not take a magnification of unity at any station during zooming. For a case that the first lens unit has a somewhat strong refractive power, if this first lens unit is used, the focusing amount for the equivalent object distance can be kept constant during zooming. Therefore, the use of this method assures simplification of the structure of the operating mechanism. For another case that the back focal distance is long enough in the wide angle end, and that, as the last lens unit has a negative refractive power, this refractive power is considerably strong, it is better to use this last lens unit for focusing, as it moves toward the image side, because a reduction of the outer diameter of the first lens unit can be expected.

It is also possible to use a method of moving two of the first to the third lens units simultaneously. Also, if the focusing lens unit contains the stop, it is preferred that the stop remains axially stationary during focusing, because the driving torque for moving the diaphragm can be reduced at the focusing time.

It should be pointed out that in the present embodiment, the four members constituting the second lens unit may have either a plus-plus-plus-plus, or minus-minus-minus-plus, or plus-minus-minus-minus, or plus-plus-minus-minus refractive power arrangement.

Next, numerical examples 58 to 61 of the invention are shown. The values of the factors of the above-described conditions for the numerical examples 58 to 61 are also listed in a Table-9.

NUMERICAL EXAMPLE 58

| f = 28.17~90.19 | Fno = 3.64–9.00 | 2ω = 76.0°~27.0° |
|---|---|---|
| R 1 = 690.43 | D 1 = 1.30 | N 1 = 1.49699 ν 1 = 81.6 |
| R 2 = 26.19 | D 2 = Variable | |
| R 3 = 20.65 | D 3 = 2.30 | N 2 = 1.77249 ν 2 = 49.6 |
| R 4 = 23.31 | D 4 = Variable | |
| R 5 = 14.34 | D 5 = 2.50 | N 3 = 1.61800 ν 3 = 63.4 |
| R 6 = 68.41 | D 6 = Variable | |
| R 7 = (Stop) | D 7 = 0.99 | |
| R 8 = −25.73 | D 8 = 2.80 | N 4 = 1.84665 ν 4 = 23.#8 |
| R 9 = −161.40 | D 9 = Variable | |
| R10 = 1328.46 | D10 = 4.50 | N 5 = 1.77249 ν 5 = 49.6 |
| R11 = −16.85 | D11 = Variable | |
| R12 = −14.43 | D12 = 1.80 | N 6 = 1.60970 ν 6 = 57.8 |
| R13 = −102.98 | | |

| Variable | Focal Length | | |
|---|---|---|---|
| Separation | 28.17 | 52.60 | 90.19 |
| D 2 | 6.71 | 4.51 | 1.51 |
| D 4 | 3.06 | 14.08 | 0.81 |
| D 6 | 2.60 | 6.37 | 7.65 |
| D 9 | 1.33 | 4.63 | 10.58 |
| D11 | 15.92 | 3.66 | 2.15 |

Aspheric Coefficient

| | | | | | |
|---|---|---|---|---|---|
| R 2 | K = −5.789e−02 | A = 0 | B = 6.189e−06 | C = 8.330e−09 | D = 6.659e−11 |
| R 5 | K = 2.190e−01 | A = 0 | B = 1.507e−06 | C = 3.397e−07 | D = −8.543e−09 |
| R 8 | K = 1.323e+01 | A = 0 | B = 2.082e−05 | C = −8.274e−07 | D = 8.719e−08 |
| R11 | K = −2.612e+00 | A = 0 | B = −4.988e−05 | C = −1.792e−06 | D = −1.183e−10 |
| R12 | K = −2.825e−01 | A = 0 | B = 3.173e−05 | C = −1.666e−07 | D = 3.858e−10 |

NUMERICAL EXAMPLE 59 f = 28.84–90.01　　Fno = 3.46–9.00　　2ω = 73.8°–27.0°
R 1 = −65.83　　D 1 = 1.30　　N 1 = 1.49699　ν 1 = 81.6
R 2 = 249.68　　D 2 = Variable
R 3 = −691.61　D 3 = 1.60　　N 2 = 1.496.99　ν 2 = 81.6
R 4 = 54.33　　D 4 = Variable
R 5 = 13.16　　D 5 = 2.50　　N 3 = 1.51633　ν 3 = 64.2
R 6 = −993.17　D 6 = Variable
R 7 = (Stop)　　D 7 = 1.00
R 8 = −19.61　　D 8 = 2.50　　N 4 = 1.80518　ν 4 = 25.4
R 9 = −78.22　　D 9 = Variable
R10 = −2685.70　D10 = 4.00　　N 5 = 1.77249　ν 5 = 49.6
R11 = −15.54　　D11 = Variable
R12 = −14.51　　D12 = 1.80　　N 6 = 1.63999　ν 6 = 60.1
R13 = −137.90

| Variable | Focal Length | | |
|---|---|---|---|
| Separation | 28.84 | 51.85 | 90.01 |
| D 2 | 1.98 | 2.66 | 4.17 |
| D 4 | 3.94 | 9.24 | 0.81 |
| D 6 | 2.86 | 6.21 | 7.57 |
| D 9 | 1.16 | 3.33 | 6.25 |
| D11 | 16.95 | 5.44 | 3.37 |

Aspheric Coefficient

| | | | | | |
|---|---|---|---|---|---|
| R 2 | K = −3.345e−02 | A = 0 | B = 6.074e−06 | C = −1.144e−08 | D = −1.574e−11 |
| R 4 | K = 1.789e+01 | A = 0 | B = −7.283e−06 | C = −4.857e−08 | D = −8.630e−11 |
| R 5 | K = 1.336e−01 | A = 0 | B = 0 | C = 1.090e−07 | D = −2.087e−09 |
| R 8 | K = 6.635e+00 | A = 0 | B = −2.746e−06 | C = −3.565e−08 | D = 3.803e−08 |
| R11 | K = −9.879e−01 | A = 0 | B = −3.036e−05 | C = −2.304e−08 | D = −1.023e−09 |
| R12 | K = −2.850e−01 | A = 0 | B = 7.882e−06 | C = −6.264e−08 | D = −4.413e−11 |

NUMERICAL EXAMPLE 60 f = 28.32–90.13　　Fno = 3.61–9.00　　2ω = 74.8°–27.0°
R 1 = 102.60　　D 1 = 1.30　　N 1 = 1.49699　ν 1 = 81.6
R 2 = 31.00　　D 2 = Variable
R 3 = 220.75　　D 3 = 1.60　　N 2 = 1.48749　ν 2 = 70.2
R 4 = 46.13　　D 4 = Variable
R 5 = 11.73　　D 5 = 2.80　　N 3 = 1.51633　ν 3 = 64.2
R 6 = 127.74　　D 6 = Variable
R 7 = (Stop)　　D 7 = 1.35
R 8 = −19.05　　D 8 = 2.80　　N 4 = 1.80518　ν 4 = 25.4
R 9 = −73.28.　D 9 = Variable
R10 = 956.98　　D10 = 4.50　　N 5 = 1.77249　ν 5 = 49.6
R11 = −16.14　　D11 = Variable
R12 = −15.53　　D12 = 1.80　　N 6 = 1.63999　ν 6 = 60.1
R13 = −196.08

103

-continued

| Variable | Focal Length | | |
|---|---|---|---|
| Separation | 28.32 | 50.79 | 90.13 |
| D 2 | 8.34 | 4.27 | 1.59 |
| D 4 | 3.65 | 10.67 | 0.82 |
| D 6 | 3.75 | 7.05 | 7.78 |
| D 9 | 0.88 | 5.28 | 7.36 |
| D11 | 16.30 | 4.47 | 3.27 |

Aspheric Coefficient

| R 2 | K = 5.012e−01 | A = 0 | B = −5.015e−07 | C = 2.129e−08 | D = 9.775e−13 |
| R 4 | K = 1.090e+00 | A = 0 | B = −1.301e−06 | C = −2.099e−08 | D = −3.339e−10 |
| R 5 | K = 6.031e−03 | A = 0 | B = −1.005e−05 | C = 1.109e−07 | D = −2.227e−09 |
| R 8 | K = 6.733e+00 | A = 0 | B = 4.456e−06 | C = 2.597e−07 | D = 3.168e−08 |
| R11 | K = −1.150e+00 | A = 0 | B = −2.883e−05 | C = −3.543e−08 | D = 3.957e−10 |
| R12 | K = −2.731e−01 | A = 0 | B = 1.062e−05 | C = −1.954e−08 | D = 2.997e−11 |

NUMERICAL EXAMPLE 61

| f = 30.00–94.65 | Fno = 3.27–10.00 | 2ω = 71.6°–25.8° |
|---|---|---|
| R 1 = 68.48 | D 1 = 1.60 | N 1 = 1.53171 ν 1 = 48.9 |
| R 2 = 26.02 | D 2 = Variable | |
| R 3 = 22.41 | D 3 = 3.50 | N 2 = 1.60300 ν 2 = 65.5 |
| R 4 = −166.95 | D 4 = Variable | |
| R 5 = 35.84 | D 5 = 2.50 | N 3 = 1.51822 ν 3 = 59.0 |
| R 6 = 23.94 | D 6 = Variable | |
| R 7 = (Stop) | D 7 = 3.90 | |
| R 8 = −35.74 | D 8 = 2.00 | N 4 = 1.76182 ν 4 = 26.5 |
| R 9 = −77.77 | D 9 = Variable | |
| R10 = 58.70 | D10 = 4.50 | N 5 = 1.72915 ν 5 = 54.7 |
| R11 = −21.35 | D11 = Variable | |
| R12 = −18.13 | D12 = 1.80 | N 6 = 1.69679 ν 6 = 55.5 |
| R13 = 155.55 | | |

| Variable | Focal Length | | |
|---|---|---|---|
| Separation | 30.00 | 55.69 | 94.65 |
| D 2 | 5.91 | 2.13 | 1.51 |
| D 4 | 2.00 | 8.04 | 0.98 |
| D 6 | 2.39 | 4.34 | 1.49 |
| D 9 | 2.19 | 4.78 | 10.90 |
| D11 | 14.07 | 6.31 | 2.57 |

Aspheric Coefficient

| R 2 | K = −2.125e−00 | A = 0 | B = 2.249e−05 | C = 2.949e−08 | D = 6.979e−10 |
| R 3 | K = 8.158e−01 | A = 0 | B = −8.155e−06 | C = 3.714e−09 | D = 6.233e−10 |
| R 5 | K = −4.506e+00 | A = 0 | B = −3.222e−06 | C = 2.563e−07 | D = −1.031e−08 |
| R 8 | K = 3.452e+01 | A = 0 | B = 1.358e−04 | C = 1.630e−07 | D = 7.988e−08 |
| R10 | K = −1.605e+01 | A = 0 | B = −1.283e−06 | C = −3.407e−07 | D = 2.543e−10 |
| R11 | K = −7.763e+00 | A = 0 | B = −4.113e−05 | C = −1.022e−08 | D = −1.826e−09 |
| R12 | K = −1.626e+00 | A = 0 | B = 4.315e−05 | C = −3.382e−07 | D = 6.583e−10 |

TABLE 9

| | Numerical Examples | | | |
|---|---|---|---|---|
| Conditions | 58 | 59 | 60 | 61 |
| fZW | 21.05 | 21.20 | 22.03 | 23.01 |
| f2T | 30.44 | 25.28 | 26.93 | 25.94 |
| |fw/f3| | 1.02 | 1.13 | 1.07 | 1.30 |

TABLE 9-continued

| | Numerical Examples | | | |
|---|---|---|---|---|
| Conditions | 58 | 59 | 60 | 61 |
| fw/f2W | 1.34 | 1.36 | 1.29 | 1.30 |
| fw/f2FW | 1.08 | 0.91 | 0.93 | 0.77 |
| fw/f2RW | 0.75 | 0.78 | 0.74 | 1.12 |
| $DW_{c-d}$ | 1.33 | 1.16 | 0.88 | 2.19 |
| $DT_{c-d}$ | 10.58 | 6.25 | 7.36 | 10.90 |
| $|1/\beta W_{2c}|$ | 0.02 | 0.22 | 0.13 | 0.30 |

TABLE 9-continued

| | Numerical Examples | | | |
|---|---|---|---|---|
| Conditions | 58 | 59 | 60 | 61 |
| $|1/\beta T_{2c}|$ | 0.02 | 0.14 | 0.11 | 0.23 |
| β2W | −0.40 | −0.21 | −0.24 | −0.30 |

According to the invention, as has been described above, for a zoom lens to have a plurality of lens units, proper rules of lens design for all the lens units are set forth, thereby making it possible to correct the various aberrations well which become serious when the maximum field angle widens and the zooming range increases. Thus, a zoom lens whose total length is minimized and which has high optical performance throughout the entire zooming range can be achieved.

What is claimed is:

1. A zoom lens comprising, a front lens group having a first, a second and a third lens units in this order from the object side, and whose overall refractive power for the wide angle end is positive, and a rear lens group having a lens unit of positive refractive power and a lens unit of negative refractive power, wherein when zooming from the wide angle end to the telephoto end, the separations between the lens units in said front lens group vary so that the overall refractive power of said front lens group is weaker in the telephoto end than in the wide angle end, and the separation between said positive lens unit and said negative lens unit narrows, whereby letting the focal length of the i-th lens unit be denoted by fi, the shortest focal length of the entire lens system by fW and the lateral magnification for the wide angle end of the i-th lens unit by βiW, the following conditions are satisfied:

$$0.5 < |f5/fw| < 1.5$$

$1.1 < \beta 5W < 1.7$.

2. A zoom lens according to claim 1, wherein the overall focal length for the wide angle end of said first and said second lens units is negative and the refractive power of said third lens unit is positive.

3. A zoom lens according to claim 2, satisfying the following conditions:

$$0.2 < fW \cdot \phi_{123W} < 1.0$$

$$0.6 < \beta/fW < 2.2$$

where $\phi_{123W}$ is the overall focal length for the wide angle end of said front lens group.

4. A zoom lens according to claim 3, wherein said front lens group has a first lens unit of negative refractive power, a second lens unit of negative refractive power and a third lens unit of positive refractive power, whereby when zooming from the wide angle end to the telephoto end, said lens units axially move in such relation that the separation between said first and said second lens units decreases and the separation between said second and said third lens units increases.

5. A zoom lens according to claim 3, wherein said front lens group has a first lens unit of negative refractive power, a second lens unit of negative refractive power and a third lens unit of positive refractive power, whereby when zooming from the wide angle end to the telephoto end, said lens units axially move in such relation that the separation between said first and said second lens units increases and the separation between said second and said third lens units decreases.

6. A zoom lens according to claim 3, wherein said front lens group has a first lens unit of positive refractive power, a second lens unit of negative refractive power and a third lens unit of positive refractive power, whereby when zooming from the wide angle end to the telephoto end, said lens units axially move in such relation that the separation between said first and said second lens units increases and the separation between said second and said third lens units decreases.

7. A zoom lens according to claim 2, wherein said first and said third lens units move in unison during zooming.

8. A zoom lens comprising a front lens group having a first lens unit of positive refractive power, a second lens unit of negative refractive power and a third lens unit of positive refractive power in this order from the object side and whose overall refractive power when in the wide angle end is positive, and a rear lens group having a positive lens unit and a negative lens unit, wherein when zooming from the wide angle end to the telephoto end, said first, said second and said third lens units axially move in such relation that the overall refractive power is weaker when in the telephoto end than when in the wide angle end, and said positive lens unit of said rear lens group and said negative lens unit of said rear lens group axially move in such relation that the separation therebetween narrows, whereby letting the focal length of the i-th lens unit be denoted by fi, the shortest focal length of the entire system by fW and the lateral magnification for the wide angle end of the i-th lens unit by $\beta iW$, the following conditions are satisfied:

$$0.45 < |f5|/fW < 1.5$$

$$1.1 < \beta 5W < 1.9.$$

9. A zoom lens according to claim 8, wherein when zooming from the wide angle end to the telephoto end, said first, said second and said third all move axially toward the object side in such relation that the separation between said first and said second lens units increases, the separation between said second and said third lens units decreases.

10. A zoom lens according to claim 9, satisfying the following conditions:

$$0.3 < fW \cdot \phi_{123W} < 1.2$$

$$0.6 < |f2|/fW < 3.0$$

where $\phi_{123W}$ is the overall refractive power for the wide angle end of said front lens group.

11. A zoom lens comprising a front lens group having a first lens unit of negative refractive power, a second lens unit of positive refractive power and a third lens unit of positive refractive power in this order from the object side and whose overall refractive power when in the wide angle end is positive, and a rear lens group having a positive lens unit and a negative lens unit, wherein when zooming from the wide angle end to the telephoto end, said first, said second and said third lens units axially move in such relation that the overall refractive power of said front lens group is weaker in the telephoto end than in the wide angle end, and said positive lens unit of said rear lens group and said negative lens unit of said rear lens group axially move in such relation that the separation therebetween narrows.

12. A zoom lens according to claim 11, wherein letting the focal length of the i-th lens unit be denoted by fi, the shortest focal length of the entire system by fW and the lateral magnification for the wide angle end of the i-th lens unit by $\beta iW$, the following conditions are satisfied:

$$0.4 < |\beta 5|/fW < 1.5$$

$$1.1 < \beta 5W < 1.9.$$

13. A zoom lens according to claim 11, wherein when zooming from the wide angle end to the telephoto end, the lens units move in such relation that the separation between said first and said second lens units decreases and the separation between said second and said third lens unit increases.

14. A zoom lens according to claim 12, satisfying the following conditions:

$$0.3 < fW \cdot \phi_{123W} < 1.8$$

$$0.6 < \beta/fW < 2.5$$

where $\phi_{123W}$ is the overall refractive power for the wide angle end of said front lens group.

15. A zoom lens comprising a front lens group having a first lens unit of negative refractive power, a second lens unit of negative refractive power and a third lens unit of positive refractive power in this order from the object side and whose overall refractive power when in the wide angle end is positive, and a rear lens group having a positive lens unit and a negative lens unit in this order from the object side, wherein when zooming from the wide angle end to the telephoto end, said first lens unit, said second lens unit and said third lens unit axially move in such relation that the overall refractive power of said front lens group is weaker in the telephoto end than in the wide angle end, and said positive lens unit of said rear lens group and said negative lens unit of said rear lens group axially move in such relation that the separation therebetween narrows.

16. A zoom lens according to claim 15, wherein letting the focal length of the i-th lens unit be denoted by fi, the shortest focal length for the wide angle end of the entire system by fW and the lateral magnification for the wide angle end of the i-th lens unit by $\beta iW$, the following conditions are satisfied:

$$0.5 < |f5|/fW < 1.5$$

$$1.1 < \beta 5W < 1.8.$$

17. A zoom lens according to claim 15, wherein when zooming from the wide angle end to the telephoto end, the lens units axially move in such relation that the separation between said first and said second lens units increases and the separation between said second and said third lens units decreases.

18. A zoom lens according to claim 16, satisfying the following conditions:

$$0.3 < fW \cdot \phi_{123W} < 0.9$$

$$0.6 < f3/fW < 2.0$$

where $\phi_{123W}$ is the overall refractive power for the wide angle end of said front lens group.

19. A zoom lens comprising, from front to rear, a first lens unit of positive refractive power, a second lens unit of negative refractive power, a third lens unit of positive refractive power, a fourth lens unit of positive refractive power and a fifth lens unit of negative refractive power, wherein all said lens units take more front positions when in the telephoto end than when in the wide angle end, whereby letting the separation for the wide angle end between the i-th lens unit and the (i+1)st lens unit be denoted by DiW, the separation for the telephoto end between the i-th lens unit and the (i+1)st lens unit by DiT, the shortest and longest focal lengths of the entire system by fW and fT respectively, and the separation between said first and said second lens units for a zooming position where the focal length of the entire system is $(fW \cdot fT)^{1/2}$ by D1M, the following conditions are satisfied:

$$D1W < D1M$$

$$D1T < D1M$$

$$D2W > D2T$$

$$D3W < D3T$$

$$D4W > D4T.$$

20. A zoom lens according to claim 19, satisfying the following conditions:

$$0.45 < |f5|/fW < 1.5$$

$$1.1 < \beta 5W < 1.9$$

where f5 is the focal length of said fifth lens unit and $\beta 5W$ is the lateral magnification for the wide angle end of said fifth lens unit.

21. A zoom lens according to claim 20, satisfying the following conditions:

$$0.3 < fW \cdot \phi_{123W} < 1.2$$

$$0.6 < |f2|/fW < 3.0$$

where $\phi_{123W}$ is the overall refractive power for the wide angle end of said first, said second and said third lens units and f2 is the focal length of said second lens unit.

22. A zoom lens comprising, from front to rear, a first lens unit of negative refractive power, a second lens unit of positive refractive power, a third lens unit of negative refractive power, a fourth lens unit of positive refractive power and a fifth lens unit of negative refractive power, wherein all said lens units axially move in such relation that when in the telephoto end as zoomed from the wide angle end, the separation between said first and said second lens units is shorter, the separation between said second and said third lens unit is longer, the separation between said third and said fourth lens unit is longer, and the separation between said fourth and said fifth lens unit is shorter.

23. A zoom lens according to claim 22, satisfying the following conditions:

$$|1/\beta 3W| \leq 1.0$$

$$|1/\beta 3T| \leq 1.0$$

where $\beta 3W$ and $\beta 3T$ are the lateral magnifications for the wide angle and telephoto ends of said third lens unit respectively.

24. A zoom lens according to claim 23, wherein letting the focal length of the i-th lens unit be denoted by fi, and the shortest and longest focal lengths of the entire system by fW and fT respectively, the following conditions are satisfied:

$$0.27 < f2/\sqrt{fW \cdot fT} < 0.8$$

$$0.2 < f4/\sqrt{fW \cdot fT} < 0.6.$$

25. A zoom lens comprising, from front to rear, a first lens unit of negative refractive power, a second lens unit of positive refractive power, a third lens unit of negative refractive power, a fourth lens unit of positive refractive power and a fifth lens unit of negative refractive power, wherein letting the separation for the wide angle end between the i-th lens unit and the (i+1)st lens unit be denoted by DiW, and the separation for the telephoto end between the i-th lens unit and the (i+1)st lens unit by DiT, the following conditions are satisfied:

$$D1T - D1W < 0$$

$$0 < D2T - D2W$$

$$D3T - D3W < 0$$

$$D4T - D4W < 0.$$

26. A zoom lens according to claim 25, wherein letting the focal length of the i-th lens unit be denoted by fi, the shortest and longest focal lengths of the entire system by fW and fT respectively, and the back focal distances for the wide angle and telephoto ends by bfW and bfT respectively, the following condition is satisfied:

$$0.5 < (fW \cdot (bfT - f5))/(fT \cdot (bfW - f5)) < 0.95.$$

27. A zoom lens according to claim 25 or 26, wherein letting the focal length of the i-th lens unit be denoted by fi, and the shortest focal length of the entire system by fW, the following conditions are satisfied:

$$0.75 < |f1|/fW < 2.2$$

$$0.48 < f2/fW < 1.3$$

$$0.41 < |f5|/fw < 1.3.$$

28. A zoom lens according to claim 26, wherein taking the moving direction from the image side to the object side as positive and letting the zooming movement of the i-th lens unit be denoted by Mi, the following conditions are satisfied:

$$0 < M1$$

$$0 < M3.$$

29. A zoom lens according to claim 25, wherein said second and said fourth lens units each have a cemented lens.

30. A zoom lens comprising, from front to rear, a first lens unit of positive refractive, a second lens unit of negative refractive power, a third lens unit of positive refractive power, a fourth lens unit of negative refractive power, a fifth lens unit of positive refractive power and a sixth lens unit of negative refractive power, wherein letting the separation for the wide angle end between the i-th lens unit and the j-th lens unit be denoted by $D_{W(i-j)}$ and the separation for the telephoto end between the i-th lens unit and the j-th lens unit by $D_{T(i-j)}$, the following conditions are satisfied:

$$D_{W(2-3)} > D_{T(2-3)}$$

$$D_{W(3-4)} < D_{T(3-4)}$$

$$D_{W(4-5)} < D_{T(4-5)}$$

$$D_{W(5-6)} > D_{T(5-6)}.$$

31. A zoom lens according to claim 30, wherein when in the wide angle end, the overall refractive power of said first and said second lens units is negative.

32. A zoom lens according to claim 31, satisfying the following conditions:

$$|1/\beta 4W| < 1.0$$

$$|1/\beta 4T| < 1.0$$

where $\beta 4W$: the lateral magnification for the wide angle end of said fourth lens unit; and $\beta 4T$: the lateral magnification for the telephoto end of said fourth lens unit.

33. A zoom lens according to claim 32, satisfying the following conditions:

$$0.3 < f3/(fW \cdot fT)^{1/2} < 0.8$$

$$0.2 < f5/(fW \cdot fT)^{1/2} < 0.6$$

where fi: the focal length of the i-th lens unit;

fW: the shortest focal length; and fT: the longest focal length.

34. A zoom lens according to claim 30, wherein the diameters of said first, said second and said sixth lens units are larger than those of said third, said fourth and said fifth lens units.

35. A zoom lens according to claim 30, wherein said second lens unit has at least one negative lens having a concave surface facing the image side, said fourth lens unit has at least one negative lens having a concave surface facing the object side, said fifth lens unit has at least one positive lens having a strong convex surface facing the image side, and said sixth lens unit has at least one negative lens having a strong concave surface facing the object side.

36. A zoom lens comprising, from front to rear, a first lens unit of negative refractive power, a second lens unit of positive refractive power, and a third lens unit of negative refractive power, said second lens unit having a first member 2a, a second member 2b, a third member 2c and a fourth member 2d, totaling four members, wherein the air separations between said four members in said second lens unit are made variable to vary the image magnification, whereby letting the overall refractive powers for the wide angle and telephoto ends of said second lens unit be denoted by f2W and f2T respectively, the following condition is satisfied:

$$f2W < f2T.$$

37. A zoom lens according to claim 36, wherein for the wide angle end, said second lens unit is constructed with a front sub-unit 2F comprising said first and said second members 2a and 2b and whose overall refractive power is positive, and a rear sub-unit 2R comprising said third member 2c of negative refractive power and said fourth member 2d of positive refractive power and whose overall refractive power is positive.

38. A zoom lens according to claim 36, satisfying the following conditions:

$$0.9 \leq |fW/f3| 2.2$$

$$1.0 \leq fW/f2W < 1.8$$

where f3 is the focal length of said third lens unit and fW is the shortest focal length of the entire system.

39. A zoom lens according to claim 37, satisfying the following conditions:

$$0.5 \leq fW/f2FW1.7$$

$$0.5 \leq fW/f2RW1.5$$

where f2FW and f2RW are the overall refractive powers of said front and said rear sub-units 2F and 2R at the shortest focal length of the entire system respectively and fW is the shortest focal length of the entire system.

40. A zoom lens according to claim 37, satisfying the following condition:

$$DW_{c-d} < DT_{c-d}$$

where $DW_{c-d}$ and $DT_{c-d}$ are the air separations for the wide angle and telephoto ends between said third and fourth members 2c and 2d respectively.

41. A zoom lens according to claim 37, wherein said first member 2a has a positive refractive power and said second member 2b has a positive refractive power.

42. A zoom lens according to claim 37, wherein said first member 2a has a positive refractive power and said second member 2b has a negative refractive power.

43. A zoom lens according to claim 37, wherein said first member 2a has a negative refractive power and said second member 2b has a positive refractive power.

44. A zoom lens according to claim 39, satisfying the following conditions:

$$|1/\beta W_{2c}| < 1.0$$

$$|1/\beta T_{2c}| < 1.0$$

where $\beta W_{2c}$ and $\beta T_{2c}$ are the lateral magnifications for the wide angle and telephoto ends of said third member 2c respectively.

45. A zoom lens according to claim 36, satisfying the following condition:

$$-0.6 < \beta 2W < -0.1$$

where $\beta 2W$ is the lateral magnification for the wide angle end of said second lens unit.

46. A zoom lens according to claim 37, further including a stop arranged in a space between said front and said rear sub-units to move with zooming.

47. A zoom lens according to claim 37, wherein when zooming from the wide angle to the telephoto end, said first lens unit, said four members in said second lens unit and said third lens unit all are made to move axially forward.

48. A zoom lens comprising a front lens group having a first lens unit of negative refractive power, a second lens unit of negative refractive power and a third lens unit of positive refractive power in this order from the object side and whose overall refractive power when in the wide angle end is positive, and a rear lens group having a positive lens unit and a negative lens unit, and including a non-spherical lens surface, wherein when zooming from the wide angle end to the telephoto end, said first lens unit, said second lens unit and said third lens unit axially move in such relation that the overall refractive power of said front lens group is weaker in the telephoto end than in the wide angle end, and said positive lens unit of said rear lens group and said negative lens unit of said rear lens group axially move in such relation that the separation therebetween narrows.

* * * * *

UNITED STATES PATENT AND TRADEMARK OFFICE
CERTIFICATE OF CORRECTION

PATENT NO. : 5,691,851
DATED : November 25, 1997
INVENTOR(S) : AKIHIRO NISHIO, ET AL.

It is certified that error appears in the above-indentified patent and that said Letters Patent is hereby corrected as shown below:

ON THE COVER PAGE

[References Cited]
    "Hirawaka" should read --Hirakawa--.

COLUMN 1

Line 12, "at" should read --at a--.
    Line 55, "previously" should read --previously been--.

COLUMN 5

Line 31, "is" should read --are--.

COLUMN 21

Line 23, "W" should read --T--.

COLUMN 24

Line 55, "comes to increase" should read --increases--.
    Line 60, "taken" should be deleted.

COLUMN 25

Line 48, "number" should read --numbers--.

UNITED STATES PATENT AND TRADEMARK OFFICE
CERTIFICATE OF CORRECTION

PATENT NO. : 5,691,851        Page 2 of 9
DATED      : November 25, 1997
INVENTOR(S): AKIHIRO NISHIO, ET AL.

It is certified that error appears in the above-indentified patent and that said Letters Patent is hereby corrected as shown below:

COLUMN 32

Line 55, "strong" should be --strong of--.

COLUMN 33

Line 58, "$0.4<fW\bullet\phi_{123W}1.5$" should read --$0.4<fW\bullet\phi_{123W}<1.5$--.

COLUMN 34

Line 41, "be hardly" should read --hardly--.

COLUMN 36

Line 52, insert

--
| R21= | -17.94  | D21= 0.20 |              |         |
|------|---------|-----------|--------------|---------|
| R22= | -22.10  | D22= 1.30 | N13=1.80610  | ν 13= 41.0 |
| R23= | -317.84 | D23= 4.89 |              |         |
| R24= | -18.10  | D24= 1.50 | N14=1.78590  | ν 14= 44.2 |
| R25= | -63.65  |           |              |         |

--.

COLUMN 45

Line 12, "of the" should read --the--.
Line 19, "group haves" should read --front lens-- and "increase greatly." should read --greatly increase.--.
Line 65, "lenses" should read --lens--.

UNITED STATES PATENT AND TRADEMARK OFFICE
CERTIFICATE OF CORRECTION

| | | |
|---|---|---|
| PATENT NO. : | 5,691,851 | Page 3 of 9 |
| DATED : | November 25, 1997 | |
| INVENTOR(S) : | AKIHIRO NISHIO, ET AL. | |

It is certified that error appears in the above-indentified patent and that said Letters Patent is hereby corrected as shown below:

COLUMN 52

Line 58, "$0.75|fz/fW|2.0$" should read --$0.75<|fz/fW|<2.0$--.

COLUMN 53

Line 67, "correct" should read --corrects--.

COLUMN 54

Line 6, "mainly" should be deleted.
Line 9, "lenses" should read --lens--.

COLUMN 57

Line 58, "C=-1.19449e-06" should read --C=1.19449e-06--.

COLUMN 62

Line 16, "ration" should read --ratio--.

COLUMN 67

Line 30, "$B=-7.777 \times 10^{-6}$" should read --$B=7.777 \times 10^{-6}$--.

UNITED STATES PATENT AND TRADEMARK OFFICE
CERTIFICATE OF CORRECTION

PATENT NO. : 5,691,851     Page 4 of 9
DATED : November 25, 1997
INVENTOR(S) : AKIHIRO NISHIO, ET AL.

It is certified that error appears in the above-indentified patent and that said Letters Patent is hereby corrected as shown below:

COLUMN 72

Line 26, "$B=2.794 \times 10^{-6}$" should read --$B=-2.794 \times 10^{-6}$--.

COLUMN 75

Line 18, "well" should be deleted.
    Line 22, "well" should be deleted.

COLUMN 78

Line 18, "$K=-1.196e+02$" should read --$K=-1.196e-02$--.
    Line 57, "$K=-3.871e+01$" should read --$K=-3.871e-01$--.

COLUMN 79

Line 24, "D2" should read --D12--.

COLUMN 81

Line 27, "$K=-2.833e-01$" should read --$K=-2.833e+01$--.
    Line 65, "$K=-2.062e-01$" should read --$K=-2.062e+01$--.

UNITED STATES PATENT AND TRADEMARK OFFICE
CERTIFICATE OF CORRECTION

PATENT NO. : 5,691,851
DATED : November 25, 1997
INVENTOR(S) : AKIHIRO NISHIO, ET AL.

It is certified that error appears in the above-indentified patent and that said Letters Patent is hereby corrected as shown below:

COLUMN 82

Line 16, "$\nu 9=23.g$" should read --$\nu 9=23.8$--.
Line 38, "K=-1.893e-01" should read --K=-1.893e+01--.

COLUMN 83

Line 32, "R15" should read --R18--.

COLUMN 84

Line 4, "B=-1.522e-06" should read --B=1.522e-06--.

COLUMN 85

Line 64, "suppressed" should be deleted.

COLUMN 86

Line 31, "the the" should read --the--.
Line 62, "$|1/\beta 4W|0.5$" should read --$|1/\beta 4W|<0.5$--.
Line 64, "$|1/\beta 4T|0.5$" should read --$|1/\beta 4T|<0.5$--.

COLUMN 87

Line 49, "zooming," should read --zooming.--.

UNITED STATES PATENT AND TRADEMARK OFFICE
CERTIFICATE OF CORRECTION

PATENT NO. : 5,691,851
DATED : November 25, 1997
INVENTOR(S) : AKIHIRO NISHIO, ET AL.

It is certified that error appears in the above-indentified patent and that said Letters Patent is hereby corrected as shown below:

COLUMN 91

Line 40, "D=3.91359x10$^{-11}$" should read --D=-3.91359x10$^{-11}$--.

COLUMN 93

Line 16, "D=9.77417x10$^{-12}$" should read --D=-9.77417x10$^{-12}$--.
    Line 17, "K=3.41025x10$^{-5}$" should read --K=3.41025x10$^{-2}$--, and "C=1.80904x10$^{-7}$" should read --C=-1.80904x10$^{-7}$--.
    Line 18, "B=3.74294x10$^{-5}$" should read --B=-7.18312x10$^{-5}$--, and "C=-1.80904x10$^{-6}$" should read --C=3.7609x10$^{-6}$--.
    Line 50, "C=-1.14509x10$^{-6}$" should read --C=1.14509x10$^{-6}$--.

COLUMN 95

Line 37, "$|1/84W|$" should read --$|1/\beta 4W|$--.
    Line 39, "$|1/84T|$" should read --$|1/\beta 4T|$--.

COLUMN 97

Line 5, "made" should be deleted.
    Line 23, "well corrected" should read --corrected well--.
    Line 45, "aberrations." should read --aberrations well.--.

UNITED STATES PATENT AND TRADEMARK OFFICE
CERTIFICATE OF CORRECTION

PATENT NO. : 5,691,851
DATED : November 25, 1997
INVENTOR(S) : AKIHIRO NISHIO, ET AL.

It is certified that error appears in the above-indentified patent and that said Letters Patent is hereby corrected as shown below:

COLUMN 98

Line 28, "foal" should read --focal--.
Line 36, "$06 \leq fW/f2FW \leq 1.2$" should read --$0.6 \leq fW/f2FW \leq 1.2$--.
Line 59, "when" should be deleted.

COLUMN 99

Line 5, "well correct" should read --correct--.
Line 10, "$|1\beta W_{2c}|1.0$" should read --$|1/\beta W_{2c}|<1.0$--.
Line 12, "$|1\beta T_{2c}|1.0$" should read --$|1/\beta T_{2c}|<1.0$--.

COLUMN 100

Line 41, "a" should be deleted.

COLUMN 101

Line 1, "C=8.330e-09" should read --C=-8.330e-9--.
Line 38, "K=-3.345e-02" should read --K=3.345e+02--, and "B=6.074e-06" should read --B=-6.074e-06--.

COLUMN 106

Line 28, "$0.4<|\beta f5/fW|<1.5$" should read --$0.4<|f5/fW|<1.5$--.
Line 34, "units" should read --unit--.

UNITED STATES PATENT AND TRADEMARK OFFICE
CERTIFICATE OF CORRECTION

PATENT NO. : 5,691,851
DATED : November 25, 1997
INVENTOR(S) : AKIHIRO NISHIO, ET AL.

It is certified that error appears in the above-indentified patent and that said Letters Patent is hereby corrected as shown below:

COLUMN 107

Line 4, "units" should read --unit--.
Line 5, "units" should read --unit--.
Line 54, "units" should read --unit--.
Line 64, "units" should read --unit--.

COLUMN 108

Line 5, "$|1/\beta 3T \leq 1.0$" should read --$|1/\beta 3T| \leq 1.0$--.
Line 54, "$.41 < |\overline{f}5/fw < 1.3.$" should read --$.41 < |f5|/fW < 1.3.$--.
Line 65, "units" should read --unit--.
Line 67, "refractive" should read --refractive power--.

COLUMN 109

Line 17, "units" should read --unit--.
Line 42, "units" should read --unit--.
Line 44, "units" should read --unit--.

UNITED STATES PATENT AND TRADEMARK OFFICE
CERTIFICATE OF CORRECTION

PATENT NO. : 5,691,851
DATED : November 25, 1997
INVENTOR(S) : AKIHIRO NISHIO, ET AL.

It is certified that error appears in the above-indentified patent and that said Letters Patent is hereby corrected as shown below:

<u>COLUMN 110</u>

Line 8, "$0.9 \leq |fW/f3| 2.2$" should read --$0.9 \leq |fW/f3| \leq 2.2$--.
Line 17, "$0.5 \leq fW/f2FW 1.7$" should read --$0.5 \leq fW/f2FW \leq 1.7$--.
Line 19, "$0.5 \leq fW/f2RW 1.5$" should read --$0.5 \leq fW/f2RW \leq 1.5$--.

Signed and Sealed this

Ninth Day of February, 1999

Attest:

Attesting Officer

*Acting Commissioner of Patents and Trademarks*